United States Patent
Osterhout et al.

(10) Patent No.: US 11,042,035 B2
(45) Date of Patent: Jun. 22, 2021

(54) SEE-THROUGH COMPUTER DISPLAY SYSTEMS WITH ADJUSTABLE ZOOM CAMERAS

(71) Applicant: Mentor Acquisition One, LLC, Plantation, FL (US)

(72) Inventors: Ralph F. Osterhout, San Francisco, CA (US); Robert Michael Lohse, Palo Alto, CA (US)

(73) Assignee: Mentor Acquisition One, LLC, Plantation, FL (US)

( * ) Notice: Subject to any disclaimer, the term of this patent is extended or adjusted under 35 U.S.C. 154(b) by 0 days.

(21) Appl. No.: 16/719,818

(22) Filed: Dec. 18, 2019

(65) Prior Publication Data
US 2020/0201050 A1     Jun. 25, 2020

Related U.S. Application Data

(63) Continuation of application No. 15/657,442, filed on Jul. 24, 2017, now Pat. No. 10,578,869.

(51) Int. Cl.
*G02B 27/01*     (2006.01)
*G02B 27/00*     (2006.01)
(Continued)

(52) U.S. Cl.
CPC ..... *G02B 27/0172* (2013.01); *G02B 27/0093* (2013.01); *G02B 27/0176* (2013.01);
(Continued)

(58) Field of Classification Search
CPC ............. G02B 27/0101; G02B 27/017; G02B 27/0172; G02B 27/0176; G02B 27/0075; G02B 27/0093; G02B 2027/0127; G02B 2027/0134; G02B 2027/0138; G02B 2027/0178; G02B 27/2228; G02B 2027/0185; G02B 2027/0198; G03B 37/04; G06F 1/163; G06F 3/005; G09G 2340/04; G06T 2207/10012; H04N 5/23238; H04N 5/23296; H04N 5/2628; H04N 9/317; H04N 13/0203; H04N 13/0239; H04N 13/0296;
(Continued)

(56) References Cited

U.S. PATENT DOCUMENTS

| 1,897,833 A | 2/1933 | Benway |
| 3,305,294 A | 2/1967 | Alvarez |

(Continued)

FOREIGN PATENT DOCUMENTS

| CN | 104977785 A | 10/2015 |
| EP | 368898 A1 | 5/1990 |

(Continued)

OTHER PUBLICATIONS

US 8,743,465 B2, 06/2014, Totani (withdrawn)
(Continued)

*Primary Examiner* — Michael J Eurice
(74) *Attorney, Agent, or Firm* — Morrison & Foerster LLP

(57) ABSTRACT

Aspects of the present invention relate to methods and systems for the see-through computer display systems with adjustable-zoom cameras positioned such that their respective capture fields-of-view at least partially overlap at a target distance.

24 Claims, 221 Drawing Sheets

(51) Int. Cl.
  *H04N 5/232* (2006.01)
  *H04N 13/239* (2018.01)
  *H04N 13/296* (2018.01)
  *H04N 13/383* (2018.01)
  *H04N 5/33* (2006.01)
  *H04N 13/344* (2018.01)
  *H04N 5/247* (2006.01)
  *G03B 37/04* (2021.01)
  *G06F 1/16* (2006.01)
  *G06F 3/00* (2006.01)
  *H04N 5/262* (2006.01)
  *H04N 9/31* (2006.01)

(52) U.S. Cl.
  CPC ......... *H04N 5/232* (2013.01); *H04N 5/23296* (2013.01); *H04N 5/247* (2013.01); *H04N 5/33* (2013.01); *H04N 13/239* (2018.05); *H04N 13/296* (2018.05); *H04N 13/344* (2018.05); *H04N 13/383* (2018.05); *G02B 27/0075* (2013.01); *G02B 27/0101* (2013.01); *G02B 27/017* (2013.01); *G03B 37/04* (2013.01); *G06F 1/163* (2013.01); *G06F 3/005* (2013.01); *H04N 5/23238* (2013.01); *H04N 5/2628* (2013.01); *H04N 9/317* (2013.01)

(58) Field of Classification Search
  CPC ........... H04N 13/0431; H04N 13/0434; H04N 13/044; H04N 13/0055; H04N 2213/008
  See application file for complete search history.

(56) References Cited

U.S. PATENT DOCUMENTS

| | | |
|---|---|---|
| 4,859,031 A | 8/1989 | Berman |
| D327,674 S | 7/1992 | Kuo |
| 5,257,094 A | 10/1993 | Larussa |
| 5,305,124 A | 4/1994 | Chern |
| D376,790 S | 12/1996 | Taylor |
| 5,596,451 A | 1/1997 | Handschy |
| 5,699,194 A | 12/1997 | Takahashi |
| 5,717,422 A | 2/1998 | Fergason |
| 5,741,446 A | 4/1998 | Tahara |
| 5,808,589 A | 9/1998 | Fergason |
| 5,808,800 A | 9/1998 | Handschy |
| 5,889,567 A | 3/1999 | Swanson |
| 5,914,818 A | 6/1999 | Tejada |
| 5,943,171 A | 8/1999 | Budd |
| 5,949,583 A | 9/1999 | Rallison |
| 5,969,756 A | 10/1999 | Buckley |
| 6,147,805 A | 11/2000 | Fergason |
| 6,195,136 B1 | 2/2001 | Handschy |
| 6,204,974 B1 | 3/2001 | Spitzer |
| 6,359,723 B1 | 3/2002 | Handschy |
| 6,369,952 B1 | 4/2002 | Rallison |
| 6,379,009 B1 | 4/2002 | Fergason |
| 6,384,982 B1 | 5/2002 | Spitzer |
| 6,433,760 B1 | 8/2002 | Vaissie |
| 6,456,438 B1 | 9/2002 | Lee |
| 6,461,000 B1 | 10/2002 | Magarill |
| 6,478,429 B1 | 11/2002 | Aritake |
| 6,490,095 B2 | 12/2002 | Okuyama |
| D470,144 S | 2/2003 | Li |
| 6,535,182 B2 | 3/2003 | Stanton |
| D473,871 S | 4/2003 | Santos |
| 6,683,584 B2 | 1/2004 | Ronzani |
| 6,747,611 B1 | 6/2004 | Budd |
| 6,814,442 B2 | 11/2004 | Okuyama |
| 6,816,141 B1 | 11/2004 | Fergason |
| 6,847,336 B1 | 1/2005 | Lemelson |
| 6,847,496 B1 | 1/2005 | Presby |
| 6,906,836 B2 | 6/2005 | Parker |
| 6,943,754 B2 | 9/2005 | Aughey |
| 6,987,787 B1 | 1/2006 | Mick |
| 7,088,234 B2 | 8/2006 | Naito |
| 7,119,971 B2 | 10/2006 | Kobayashi |
| 7,158,096 B1 | 1/2007 | Spitzer |
| 7,199,934 B2 | 4/2007 | Yamasaki |
| 7,206,134 B2 | 4/2007 | Weissman |
| 7,401,920 B1 | 7/2008 | Kranz |
| 7,417,617 B2 | 8/2008 | Eichenlaub |
| 7,543,943 B1 | 6/2009 | Hubby, Jr. |
| 7,656,585 B1 | 2/2010 | Powell |
| 7,690,799 B2 | 4/2010 | Nestorovic |
| 7,733,571 B1 | 6/2010 | Li |
| 7,758,185 B2 | 7/2010 | Lewis |
| 7,777,690 B2 | 8/2010 | Winsor |
| 7,777,960 B2 | 8/2010 | Freeman |
| 7,830,370 B2 | 11/2010 | Yamazaki |
| 7,855,743 B2 | 12/2010 | Sako |
| 7,928,926 B2 | 4/2011 | Yamamoto |
| 8,004,765 B2 | 8/2011 | Amitai |
| 8,018,579 B1 | 9/2011 | Krah |
| 8,079,713 B2 | 12/2011 | Ashkenazi |
| 8,125,716 B2 | 2/2012 | Bryant |
| 8,166,421 B2 | 4/2012 | Magal |
| 8,184,067 B1 | 5/2012 | Braun |
| 8,187,481 B1 | 5/2012 | Hobbs |
| 8,228,315 B1 | 7/2012 | Starner |
| 8,353,594 B2 | 1/2013 | Lewis |
| 8,376,548 B2 | 2/2013 | Schultz |
| 8,378,924 B2 | 2/2013 | Jacobsen |
| 8,384,999 B1 | 2/2013 | Crosby |
| 8,427,396 B1 | 4/2013 | Kim |
| 8,467,133 B2 | 6/2013 | Miller |
| 8,472,120 B2 | 6/2013 | Border |
| 8,477,425 B2 | 7/2013 | Border |
| 8,482,859 B2 | 7/2013 | Border |
| 8,488,246 B2 | 7/2013 | Border |
| 8,494,215 B2 | 7/2013 | Kimchi |
| 8,520,310 B2 | 8/2013 | Shimizu |
| 8,564,883 B2 | 10/2013 | Totani |
| 8,570,273 B1 | 10/2013 | Smith |
| 8,570,656 B1 | 10/2013 | Weissman |
| 8,576,276 B2 | 11/2013 | Bar-zeev |
| 8,576,491 B2 | 11/2013 | Takagi |
| 8,587,869 B2 | 11/2013 | Totani |
| 8,594,467 B2 | 11/2013 | Lu |
| 8,662,686 B2 | 3/2014 | Takagi |
| 8,670,183 B2 | 3/2014 | Clavin |
| 8,696,113 B2 | 4/2014 | Lewis |
| 8,698,157 B2 | 4/2014 | Hanamura |
| 8,711,487 B2 | 4/2014 | Takeda |
| 8,733,927 B1 | 5/2014 | Lewis |
| 8,733,928 B1 | 5/2014 | Lewis |
| 8,736,692 B1 * | 5/2014 | Wong .................. H04N 9/3194 348/208.4 |
| 8,743,052 B1 | 6/2014 | Keller |
| 8,745,058 B1 | 6/2014 | Garcia-barrio |
| 8,750,541 B1 | 6/2014 | Dong |
| 8,752,963 B2 | 6/2014 | Mcculloch |
| 8,786,675 B2 | 7/2014 | Deering |
| 8,787,006 B2 | 7/2014 | Golko |
| 8,803,867 B2 | 8/2014 | Oikawa |
| 8,823,071 B2 | 9/2014 | Oyamada |
| 8,832,557 B2 | 9/2014 | Fadell |
| 8,836,768 B1 | 9/2014 | Rafii |
| 8,837,880 B2 | 9/2014 | Takeda |
| 8,854,735 B2 | 10/2014 | Totani |
| 8,922,530 B2 | 12/2014 | Pance |
| 8,963,068 B2 | 2/2015 | Hagopian |
| 8,982,471 B1 | 3/2015 | Starner |
| 9,010,929 B2 | 4/2015 | Lewis |
| 9,076,368 B2 | 7/2015 | Evans |
| 9,091,851 B2 | 7/2015 | Border |
| 9,213,403 B1 * | 12/2015 | Raffle .................... G02B 27/01 |
| 9,235,064 B2 | 1/2016 | Lewis |
| 9,239,473 B2 | 1/2016 | Lewis |
| 9,244,293 B2 | 1/2016 | Lewis |
| 9,298,001 B2 | 3/2016 | Border |
| 9,298,002 B2 | 3/2016 | Border |
| 9,310,610 B2 | 4/2016 | Border |
| 9,316,833 B2 | 4/2016 | Border |

(56) References Cited

U.S. PATENT DOCUMENTS

| | | |
|---|---|---|
| 9,329,387 B2 | 5/2016 | Border |
| 9,366,867 B2 | 6/2016 | Border |
| 9,366,868 B2 | 6/2016 | Border |
| 9,370,302 B2 | 6/2016 | Krueger |
| 9,377,625 B2 | 6/2016 | Border |
| 9,436,006 B2 | 9/2016 | Border |
| 9,448,409 B2 | 9/2016 | Border |
| 9,494,800 B2 | 11/2016 | Border |
| 9,532,714 B2 | 1/2017 | Border |
| 9,538,915 B2 | 1/2017 | Border |
| 9,594,246 B2 | 3/2017 | Border |
| 9,651,783 B2 | 5/2017 | Border |
| 9,651,788 B2 | 5/2017 | Osterhout |
| 9,651,789 B2 | 5/2017 | Osterhout |
| 9,658,473 B2 | 5/2017 | Lewis |
| 9,671,613 B2 | 6/2017 | Border |
| 9,684,171 B2 | 6/2017 | Border |
| 9,684,172 B2 | 6/2017 | Border |
| 9,720,227 B2 | 8/2017 | Border |
| 9,720,234 B2 | 8/2017 | Border |
| 9,720,235 B2 | 8/2017 | Border |
| 9,740,012 B2 | 8/2017 | Border |
| 9,766,463 B2 | 9/2017 | Border |
| 9,798,148 B2 | 10/2017 | Border |
| 9,829,707 B2 | 11/2017 | Border |
| 9,836,122 B2 | 12/2017 | Border |
| 9,841,599 B2 | 12/2017 | Border |
| 9,910,284 B1 | 3/2018 | Nortrup |
| 9,927,612 B2 | 3/2018 | Border |
| 9,933,622 B2 | 4/2018 | Border |
| 9,971,156 B2 | 5/2018 | Border |
| 10,001,644 B2 | 6/2018 | Border |
| 10,007,118 B2 | 6/2018 | Border |
| 10,012,838 B2 | 7/2018 | Border |
| 10,012,840 B2 | 7/2018 | Border |
| 10,078,224 B2 | 9/2018 | Border |
| 10,151,937 B2 | 12/2018 | Lewis |
| 10,185,147 B2 | 1/2019 | Lewis |
| 10,578,869 B2 | 3/2020 | Osterhout |
| 2001/0019240 A1 | 9/2001 | Takahashi |
| 2002/0021498 A1 | 2/2002 | Ohtaka |
| 2002/0101568 A1 | 8/2002 | Eberl |
| 2002/0109903 A1 | 8/2002 | Kaeriyama |
| 2002/0181115 A1 | 12/2002 | Massof |
| 2002/0191297 A1 | 12/2002 | Gleckman |
| 2002/0196554 A1 | 12/2002 | Cobb |
| 2003/0002166 A1 | 1/2003 | Wilmington |
| 2003/0016942 A1* | 1/2003 | Tojo ............... H04N 5/772 386/230 |
| 2003/0030597 A1 | 2/2003 | Geist |
| 2003/0030912 A1 | 2/2003 | Gleckman |
| 2003/0048531 A1 | 3/2003 | Luecke |
| 2003/0133025 A1* | 7/2003 | Ojima ............... H04N 5/2628 348/240.2 |
| 2003/0151834 A1 | 8/2003 | Penn |
| 2004/0066547 A1 | 4/2004 | Parker |
| 2004/0162211 A1 | 8/2004 | Domey |
| 2004/0169791 A1 | 9/2004 | Nilsen |
| 2004/0174497 A1 | 9/2004 | Sharma |
| 2004/0194880 A1 | 10/2004 | Jiang |
| 2004/0227994 A1 | 11/2004 | Bruzzone |
| 2005/0041289 A1 | 2/2005 | Berman |
| 2005/0053274 A1 | 3/2005 | Mayer |
| 2005/0062869 A1 | 3/2005 | Gourley |
| 2005/0099592 A1 | 5/2005 | Lee |
| 2005/0157949 A1 | 7/2005 | Aiso |
| 2005/0212980 A1 | 9/2005 | Miyazaki |
| 2006/0048286 A1* | 3/2006 | Donato ............... G02B 27/0176 2/422 |
| 2006/0072215 A1 | 4/2006 | Nishi |
| 2006/0087561 A1* | 4/2006 | Kojima ............... H04N 5/23287 348/208.5 |
| 2006/0098293 A1 | 5/2006 | Garoutte |
| 2006/0215111 A1 | 9/2006 | Mihashi |
| 2006/0221266 A1 | 10/2006 | Kato |
| 2006/0250322 A1 | 11/2006 | Hall |
| 2006/0250696 A1 | 11/2006 | Mcguire |
| 2006/0285223 A1 | 12/2006 | Watanabe |
| 2007/0024750 A1 | 2/2007 | Wing |
| 2007/0024763 A1 | 2/2007 | Chung |
| 2007/0024764 A1 | 2/2007 | Chung |
| 2007/0024820 A1 | 2/2007 | Chung |
| 2007/0024823 A1 | 2/2007 | Chung |
| 2007/0025273 A1 | 2/2007 | Chung |
| 2007/0030379 A1 | 2/2007 | Agranov |
| 2007/0030456 A1 | 2/2007 | Duncan |
| 2007/0070859 A1 | 3/2007 | Hirayama |
| 2007/0091431 A1 | 4/2007 | Mezouari |
| 2007/0120806 A1 | 5/2007 | Schmidt |
| 2007/0263174 A1 | 11/2007 | Cheng |
| 2007/0274080 A1 | 11/2007 | Negley |
| 2008/0062297 A1 | 3/2008 | Sako |
| 2008/0088793 A1 | 4/2008 | Sverdrup |
| 2008/0169998 A1 | 7/2008 | Jacobsen |
| 2008/0266645 A1 | 10/2008 | Dharmatilleke |
| 2008/0276178 A1 | 11/2008 | Fadell |
| 2008/0298639 A1 | 12/2008 | Tsunekawa |
| 2009/0015735 A1 | 1/2009 | Simmonds |
| 2009/0015736 A1 | 1/2009 | Weller |
| 2009/0147331 A1 | 6/2009 | Ashkenazi |
| 2009/0180194 A1 | 7/2009 | Yamaguchi |
| 2009/0189974 A1 | 7/2009 | Deering |
| 2009/0195875 A1 | 8/2009 | Pasca |
| 2009/0279180 A1 | 11/2009 | Amitai |
| 2009/0324121 A1 | 12/2009 | Bhagavathy |
| 2010/0007852 A1 | 1/2010 | Bietry |
| 2010/0073376 A1 | 3/2010 | Schmale |
| 2010/0079733 A1 | 4/2010 | Lu |
| 2010/0097580 A1 | 4/2010 | Yamamoto |
| 2010/0103075 A1 | 4/2010 | Kalaboukis |
| 2010/0111489 A1 | 5/2010 | Presler |
| 2010/0130140 A1 | 5/2010 | Waku |
| 2010/0149073 A1 | 6/2010 | Chaum |
| 2010/0149510 A1 | 6/2010 | Zaczek |
| 2010/0238161 A1* | 9/2010 | Varga ............... G06T 17/05 345/419 |
| 2010/0240988 A1 | 9/2010 | Varga |
| 2010/0245546 A1 | 9/2010 | Kuroki |
| 2010/0245585 A1* | 9/2010 | Fisher ............... H04N 5/23218 348/164 |
| 2010/0254017 A1 | 10/2010 | Martins |
| 2010/0283774 A1 | 11/2010 | Bovet |
| 2010/0290124 A1 | 11/2010 | Tohara |
| 2010/0290127 A1 | 11/2010 | Kessler |
| 2010/0321535 A1* | 12/2010 | Rodriguez ............... G06T 3/00 348/240.2 |
| 2011/0012874 A1 | 1/2011 | Kurozuka |
| 2011/0043644 A1 | 2/2011 | Munger |
| 2011/0096120 A1 | 4/2011 | Sprague |
| 2011/0130958 A1 | 6/2011 | Stahl |
| 2011/0131495 A1 | 6/2011 | Bull |
| 2011/0164047 A1 | 7/2011 | Pance |
| 2011/0164163 A1 | 7/2011 | Bilbrey |
| 2011/0164221 A1 | 7/2011 | Tilleman |
| 2011/0169825 A1 | 7/2011 | Ishiyama |
| 2011/0196610 A1 | 8/2011 | Waldman |
| 2011/0199171 A1 | 8/2011 | Prest |
| 2011/0199460 A1 | 8/2011 | Gallagher |
| 2011/0199469 A1 | 8/2011 | Gallagher |
| 2011/0201213 A1 | 8/2011 | Dabov |
| 2011/0202823 A1 | 8/2011 | Berger |
| 2011/0205209 A1 | 8/2011 | Kurokawa |
| 2011/0221672 A1 | 9/2011 | Osterhout |
| 2011/0248963 A1 | 10/2011 | Lawrence |
| 2011/0316413 A1 | 12/2011 | Ghosh |
| 2012/0050140 A1 | 3/2012 | Border |
| 2012/0050493 A1 | 3/2012 | Ernst |
| 2012/0062444 A1 | 3/2012 | Cok |
| 2012/0062850 A1 | 3/2012 | Travis |
| 2012/0062998 A1 | 3/2012 | Schultz |
| 2012/0068913 A1 | 3/2012 | Bar-zeev |
| 2012/0069413 A1 | 3/2012 | Schultz |
| 2012/0075168 A1 | 3/2012 | Osterhout |
| 2012/0081800 A1 | 4/2012 | Cheng |

(56) References Cited

U.S. PATENT DOCUMENTS

| | | |
|---|---|---|
| 2012/0113514 A1 | 5/2012 | Rodman |
| 2012/0119978 A1 | 5/2012 | Border |
| 2012/0120103 A1 | 5/2012 | Border |
| 2012/0120498 A1 | 5/2012 | Harrison |
| 2012/0163013 A1 | 6/2012 | Buelow, II |
| 2012/0176682 A1 | 7/2012 | Dejong |
| 2012/0188245 A1 | 7/2012 | Hyatt |
| 2012/0194553 A1 | 8/2012 | Osterhout |
| 2012/0200935 A1 | 8/2012 | Miyao |
| 2012/0206817 A1 | 8/2012 | Totani |
| 2012/0212398 A1 | 8/2012 | Border |
| 2012/0212400 A1 | 8/2012 | Border |
| 2012/0212484 A1 | 8/2012 | Haddick |
| 2012/0212593 A1 | 8/2012 | Na |
| 2012/0218301 A1 | 8/2012 | Miller |
| 2012/0223885 A1 | 9/2012 | Perez |
| 2012/0235885 A1 | 9/2012 | Miller |
| 2012/0236133 A1 | 9/2012 | Gallagher |
| 2012/0242678 A1 | 9/2012 | Border |
| 2012/0242697 A1 | 9/2012 | Border |
| 2012/0250152 A1 | 10/2012 | Larson |
| 2012/0264510 A1 | 10/2012 | Wigdor |
| 2012/0287398 A1 | 11/2012 | Baker |
| 2012/0306850 A1 | 12/2012 | Balan |
| 2012/0327116 A1 | 12/2012 | Liu |
| 2013/0009366 A1 | 1/2013 | Hannegan |
| 2013/0021658 A1 | 1/2013 | Miao |
| 2013/0027437 A1 | 1/2013 | Gu |
| 2013/0044042 A1 | 2/2013 | Olsson |
| 2013/0070344 A1 | 3/2013 | Takeda |
| 2013/0083055 A1 | 4/2013 | Piemonte |
| 2013/0088413 A1 | 4/2013 | Raffle |
| 2013/0088415 A1 | 4/2013 | Totani |
| 2013/0100259 A1 | 4/2013 | Ramaswamy |
| 2013/0101253 A1 | 4/2013 | Popovich |
| 2013/0106674 A1 | 5/2013 | Wheeler |
| 2013/0120841 A1 | 5/2013 | Shpunt |
| 2013/0127980 A1 | 5/2013 | Haddick |
| 2013/0135198 A1 | 5/2013 | Hodge |
| 2013/0147685 A1 | 6/2013 | Gupta |
| 2013/0154913 A1 | 6/2013 | Genc |
| 2013/0162673 A1 | 6/2013 | Bohn |
| 2013/0169530 A1 | 7/2013 | Bhaskar |
| 2013/0176626 A1 | 7/2013 | Heinrich |
| 2013/0196757 A1 | 8/2013 | Latta |
| 2013/0201080 A1 | 8/2013 | Evans |
| 2013/0201081 A1 | 8/2013 | Evans |
| 2013/0207887 A1 | 8/2013 | Raffle |
| 2013/0207970 A1 | 8/2013 | Shpunt |
| 2013/0222919 A1 | 8/2013 | Komatsu |
| 2013/0230215 A1 | 9/2013 | Gurman |
| 2013/0242405 A1 | 9/2013 | Gupta |
| 2013/0248691 A1 | 9/2013 | Mirov |
| 2013/0250207 A1 | 9/2013 | Bohn |
| 2013/0250430 A1 | 9/2013 | Robbins |
| 2013/0257622 A1 | 10/2013 | Davalos |
| 2013/0265227 A1 | 10/2013 | Julian |
| 2013/0278631 A1 | 10/2013 | Border |
| 2013/0321265 A1 | 12/2013 | Bychkov |
| 2013/0321271 A1 | 12/2013 | Bychkov |
| 2013/0321932 A1 | 12/2013 | Hsu |
| 2013/0342571 A1 | 12/2013 | Kinnebrew |
| 2014/0028704 A1 | 1/2014 | Wu |
| 2014/0043682 A1 | 2/2014 | Hussey |
| 2014/0062854 A1 | 3/2014 | Cho |
| 2014/0063055 A1 | 3/2014 | Osterhout |
| 2014/0063473 A1 | 3/2014 | Pasolini |
| 2014/0111838 A1 | 4/2014 | Han |
| 2014/0125785 A1 | 5/2014 | Na |
| 2014/0129328 A1 | 5/2014 | Mathew |
| 2014/0146394 A1 | 5/2014 | Tout |
| 2014/0147829 A1 | 5/2014 | Jerauld |
| 2014/0152530 A1 | 6/2014 | Venkatesha |
| 2014/0152558 A1 | 6/2014 | Salter |
| 2014/0152676 A1 | 6/2014 | Rohn |
| 2014/0159995 A1 | 6/2014 | Adams |
| 2014/0160055 A1 | 6/2014 | Margolis |
| 2014/0160157 A1 | 6/2014 | Poulos |
| 2014/0160170 A1 | 6/2014 | Lyons |
| 2014/0160576 A1 | 6/2014 | Robbins |
| 2014/0168735 A1 | 6/2014 | Yuan |
| 2014/0176603 A1 | 6/2014 | Kumar |
| 2014/0177023 A1 | 6/2014 | Gao |
| 2014/0204759 A1 | 7/2014 | Guo et al. |
| 2014/0225812 A1* | 8/2014 | Hosoya ............... G06F 3/04815 345/8 |
| 2014/0232651 A1 | 8/2014 | Kress |
| 2014/0240313 A1* | 8/2014 | Varga ..................... G06F 3/013 345/419 |
| 2014/0253605 A1 | 9/2014 | Border |
| 2014/0268354 A1 | 9/2014 | Choi |
| 2014/0304891 A1* | 10/2014 | Waters ................... A42B 1/244 2/209.13 |
| 2014/0361957 A1 | 12/2014 | Hua |
| 2015/0002528 A1 | 1/2015 | Bohn |
| 2015/0002676 A1* | 1/2015 | Yoo ..................... G02B 27/017 348/159 |
| 2015/0015977 A1 | 1/2015 | Karasawa |
| 2015/0035744 A1 | 2/2015 | Robbins |
| 2015/0078678 A1* | 3/2015 | Grandin ............. H04N 5/23296 382/284 |
| 2015/0138064 A1* | 5/2015 | Li ........................... G06F 3/012 345/156 |
| 2015/0147000 A1 | 5/2015 | Salvador Marcos |
| 2015/0185480 A1 | 7/2015 | Ouderkirk |
| 2015/0185503 A1* | 7/2015 | Tate ....................... G02C 7/083 351/158 |
| 2015/0205035 A1 | 7/2015 | Border |
| 2015/0205105 A1* | 7/2015 | Border ................... G06F 1/163 348/78 |
| 2015/0205107 A1 | 7/2015 | Border |
| 2015/0205108 A1 | 7/2015 | Border |
| 2015/0205111 A1 | 7/2015 | Border |
| 2015/0205113 A1 | 7/2015 | Border |
| 2015/0205114 A1 | 7/2015 | Border |
| 2015/0205115 A1 | 7/2015 | Border |
| 2015/0205116 A1 | 7/2015 | Border |
| 2015/0205117 A1 | 7/2015 | Border |
| 2015/0205118 A1 | 7/2015 | Border |
| 2015/0205119 A1 | 7/2015 | Osterhout |
| 2015/0205120 A1 | 7/2015 | Border |
| 2015/0205121 A1 | 7/2015 | Border |
| 2015/0205122 A1 | 7/2015 | Border |
| 2015/0205125 A1 | 7/2015 | Border |
| 2015/0205127 A1 | 7/2015 | Border |
| 2015/0205128 A1 | 7/2015 | Border |
| 2015/0205129 A1 | 7/2015 | Border |
| 2015/0205130 A1 | 7/2015 | Border |
| 2015/0205131 A1 | 7/2015 | Border |
| 2015/0205132 A1 | 7/2015 | Osterhout |
| 2015/0205135 A1 | 7/2015 | Border |
| 2015/0213754 A1 | 7/2015 | Amjad |
| 2015/0260887 A1 | 9/2015 | Salisbury |
| 2015/0277120 A1 | 10/2015 | Border |
| 2015/0296150 A1 | 10/2015 | Benmokhtar Benabdellah |
| 2015/0309313 A1 | 10/2015 | Border |
| 2015/0309314 A1 | 10/2015 | Border |
| 2015/0316769 A1 | 11/2015 | Border |
| 2015/0316770 A1 | 11/2015 | Border |
| 2015/0316771 A1 | 11/2015 | Border |
| 2015/0316772 A1 | 11/2015 | Border |
| 2015/0355466 A1 | 12/2015 | Border |
| 2015/0355468 A1 | 12/2015 | Osterhout |
| 2015/0365628 A1 | 12/2015 | Ben-bassat |
| 2015/0370321 A1* | 12/2015 | Lundberg ................. G06K 9/48 382/190 |
| 2015/0378074 A1 | 12/2015 | Kollin |
| 2015/0378159 A1* | 12/2015 | Lundberg ............. G02B 27/017 345/8 |
| 2016/0007849 A1 | 1/2016 | Krueger |
| 2016/0011417 A1 | 1/2016 | Border |
| 2016/0018644 A1 | 1/2016 | Border |
| 2016/0018645 A1 | 1/2016 | Haddick |

(56) References Cited

U.S. PATENT DOCUMENTS

| | | |
|---|---|---|
| 2016/0018650 A1 | 1/2016 | Haddick |
| 2016/0018651 A1 | 1/2016 | Haddick |
| 2016/0018652 A1 | 1/2016 | Haddick |
| 2016/0018653 A1 | 1/2016 | Haddick |
| 2016/0018654 A1 | 1/2016 | Haddick |
| 2016/0035136 A1* | 2/2016 | Sendai .................... G06F 3/012 345/633 |
| 2016/0035139 A1 | 2/2016 | Fuchs |
| 2016/0048018 A1 | 2/2016 | De Matos Pereira Vieira |
| 2016/0048021 A1 | 2/2016 | Border |
| 2016/0050345 A1* | 2/2016 | Longbotham ........ G02B 27/017 348/47 |
| 2016/0055675 A1 | 2/2016 | Kasahara |
| 2016/0062121 A1 | 3/2016 | Border |
| 2016/0062122 A1 | 3/2016 | Border |
| 2016/0085071 A1 | 3/2016 | Border |
| 2016/0085072 A1 | 3/2016 | Haddick |
| 2016/0091718 A1 | 3/2016 | Border |
| 2016/0091719 A1 | 3/2016 | Border |
| 2016/0103320 A1 | 4/2016 | Kovaluk |
| 2016/0109711 A1 | 4/2016 | Border |
| 2016/0116745 A1 | 4/2016 | Osterhout |
| 2016/0147070 A1 | 5/2016 | Border |
| 2016/0154242 A1 | 6/2016 | Border |
| 2016/0154244 A1 | 6/2016 | Border |
| 2016/0170207 A1 | 6/2016 | Haddick |
| 2016/0170208 A1 | 6/2016 | Border |
| 2016/0170209 A1 | 6/2016 | Border |
| 2016/0170481 A1 | 6/2016 | Fateh |
| 2016/0171769 A1 | 6/2016 | Haddick |
| 2016/0187658 A1 | 6/2016 | Osterhout |
| 2016/0202492 A1 | 7/2016 | Mercer |
| 2016/0216516 A1 | 7/2016 | Border |
| 2016/0216517 A1 | 7/2016 | Border |
| 2016/0231571 A1 | 8/2016 | Border |
| 2016/0241842 A1 | 8/2016 | Newbery |
| 2016/0252325 A1 | 9/2016 | Sammut |
| 2016/0252731 A1 | 9/2016 | Border |
| 2016/0259166 A1 | 9/2016 | Border |
| 2016/0274361 A1 | 9/2016 | Border |
| 2016/0274365 A1 | 9/2016 | Bailey |
| 2016/0282626 A1 | 9/2016 | Border |
| 2016/0286177 A1 | 9/2016 | Border |
| 2016/0286203 A1 | 9/2016 | Border |
| 2016/0286210 A1 | 9/2016 | Border |
| 2016/0299569 A1* | 10/2016 | Fisher ................ G02B 27/0172 |
| 2016/0357019 A1 | 12/2016 | Border |
| 2017/0023790 A1 | 1/2017 | Border |
| 2017/0039881 A1 | 2/2017 | Belch |
| 2017/0099430 A1* | 4/2017 | Fukui ................ H04N 5/23293 |
| 2017/0115486 A1 | 4/2017 | Border |
| 2017/0153455 A1 | 6/2017 | Takahashi |
| 2017/0185214 A1* | 6/2017 | Kojima ................ G06T 19/006 |
| 2017/0188013 A1 | 6/2017 | Presler |
| 2017/0188021 A1 | 6/2017 | Lo |
| 2017/0205877 A1 | 7/2017 | Qin |
| 2017/0206417 A1 | 7/2017 | Aoyama |
| 2017/0235152 A1 | 8/2017 | Border |
| 2017/0236330 A1* | 8/2017 | Seif ...................... G06F 3/0202 345/633 |
| 2017/0242250 A1 | 8/2017 | Border |
| 2017/0242251 A1 | 8/2017 | Border |
| 2017/0242255 A1 | 8/2017 | Border |
| 2017/0242256 A1 | 8/2017 | Border |
| 2017/0243561 A1 | 8/2017 | Border |
| 2017/0329138 A1 | 11/2017 | Haddick |
| 2017/0343810 A1 | 11/2017 | Bietry |
| 2017/0343812 A1 | 11/2017 | Border |
| 2017/0343813 A1 | 11/2017 | Bietry |
| 2017/0343814 A1 | 11/2017 | Bietry |
| 2017/0343815 A1 | 11/2017 | Border |
| 2017/0343816 A1 | 11/2017 | Bietry |
| 2017/0343817 A1 | 11/2017 | Bietry |
| 2017/0343822 A1 | 11/2017 | Border |
| 2017/0363872 A1 | 12/2017 | Border |
| 2017/0363949 A1 | 12/2017 | Valente |
| 2018/0063397 A1* | 3/2018 | Sudou ................ G06F 3/04845 |
| 2018/0067314 A1 | 3/2018 | Nortrup |
| 2018/0067319 A1 | 3/2018 | Border |
| 2018/0070023 A1 | 3/2018 | Oh |
| 2018/0102846 A1 | 4/2018 | Aoyama |
| 2018/0114566 A1 | 4/2018 | Aoyama |
| 2018/0129056 A1 | 5/2018 | Nortrup |
| 2018/0249151 A1 | 8/2018 | Freeman |
| 2018/0267303 A1 | 9/2018 | Border |
| 2018/0307310 A1 | 10/2018 | Mccombe |
| 2019/0344713 A1* | 11/2019 | Kim ........................ B60Q 1/50 |

FOREIGN PATENT DOCUMENTS

| | | |
|---|---|---|
| EP | 777867 A1 | 6/1997 |
| EP | 2486450 A1 | 8/2012 |
| EP | 2502410 A1 | 9/2012 |
| WO | 8809942 A1 | 12/1988 |
| WO | 9606378 A1 | 2/1996 |
| WO | 2010062481 A1 | 6/2010 |
| WO | 2011060525 A1 | 5/2011 |
| WO | 2011143655 A1 | 11/2011 |
| WO | 2012058175 A1 | 5/2012 |
| WO | 2012064546 A1 | 5/2012 |
| WO | 2012082807 A2 | 6/2012 |
| WO | 2012118573 A1 | 9/2012 |
| WO | 2012118575 A2 | 9/2012 |
| WO | 2013043288 A2 | 3/2013 |
| WO | 2013049248 A2 | 4/2013 |
| WO | 2013050650 A1 | 4/2013 |
| WO | 2013103825 A1 | 7/2013 |
| WO | 2013110846 A1 | 8/2013 |
| WO | 2013170073 A1 | 11/2013 |
| WO | 2017070417 A1 | 4/2017 |

OTHER PUBLICATIONS

US 8,792,178 B2, 07/2014, Totani (withdrawn)
US 9,195,056 B2, 11/2015, Border (withdrawn)
Allison, R S. et al. "Tolerance of Temporal Delay in Virtual Environments," VR '01 Proceedings of the Virtual Reality 2001 Conference (VR'01), Centre for Vision Research and Departments of Computer Science and Psychology, Mar. 2-8, 2001.
Cheng et al. "Design of an Optical See-Through Head-Mounted Display with a Low f-Number and Large Field of View Using a Freedom Prism," Applied Optics, vol. 48, No. 14, May 10, 2009, pp. 2655-2668.
Final Office Action dated Jan. 28, 2019, for U.S. Appl. No. 15/657,442, filed Jul. 24, 2017, eleven pages.
Lang, Manuel et al. "Nonlinear Disparity Mapping for Stereoscopic 3D", Jul. 2010, pp. 1-10.
Logbar Inc., "Ring: Shortcut Everything", https://www.kickstarter.com/projects/1761670738/ring-shrotcut-everything, Dec. 2014, 22 pages.
Non-Final Office Action dated Jun. 28, 2019, for U.S. Appl. No. 15/657,442, filed Jul. 24, 2017, 21 pages.
Non-Final Office Action dated May 3, 2018, for U.S. Appl. No. 15/657,442, filed Jul. 24, 2017, ten pages.
Norland Products, (Sep. 20, 2003-Apr. 27, 2016), "Norland Optical Adhesive 61," https://www.norlandprod.com/adhesives/noa%2061.html, p. 1-2, last visited May 30, 2016.
Notice of Allowance dated Oct. 23, 2019, for U.S. Appl. No. 15/657,442, filed Jul. 24, 2017, five pages.
PCT/US2016/058023, Application Serial No. PCT/US2016/058023, International Preliminary Report on Patentability and Written Opinion dated Apr. 24, 2018, Osterhout Group, Inc., eight pages.
PCT/US2016/058023, Application Serial No. PCT/US2016/058023, International Search Report and Written Opinion dated Dec. 30, 2016, Osterhout Group, Inc., 13 pages.
Perl, E. E. et al. "Ultrabroadband and Wide-Angle Hyubrid Antireflection Coatings with Nanostructure," IEEE Journal of Photovoltaics, vol. 4, No. 3, May 2014. pp. 962-967.
Schedwill, "Bidirectional OLED Microdisplay", Fraunhofer Research Institution for Organics, Materials and Electronic Device COMEDD, Apr. 11, 2014, 2 pages.

(56) References Cited

OTHER PUBLICATIONS

Schott, "Optical Components," http://www.schott.com/d/advanced_optics/12e2a122-b34d=4e84-9e3d-46185e01e0/1.0/schott-optical-components-product-overview-may-2013-eng.pdf, Product Information, May 2013, 2 pages.
Vogel, et al., "Data glasses controlled by eye movements", Information and communication, Fraunhofer-Gesellschaft, Sep. 22, 2013, 2 pages.
"Genius Ring Mice," http://www.geniusnet.com/Genius/wSite/productCompare/compare.jsp, Dec. 23, 2014, one page.
Azuma, Ronald T. (Aug. 1997). "A Survey of Augmented Reality," In Presence: Teleoperators and Virtual Environments 6, 4, Hughes Research Laboratories, Malibu, CA, located at: https://web.archive.org/web/20010604100006/http://www.cs.unc.edu/~azuma/ARpresence.pdf , retrieved on Oct. 26, 2020.
Bimber, Oliver et al. (2005). "Spatial Augmented Reality: Merging Real and Virtual Worlds," A. K. Peters, Ltd., Wellesley, MA.

\* cited by examiner

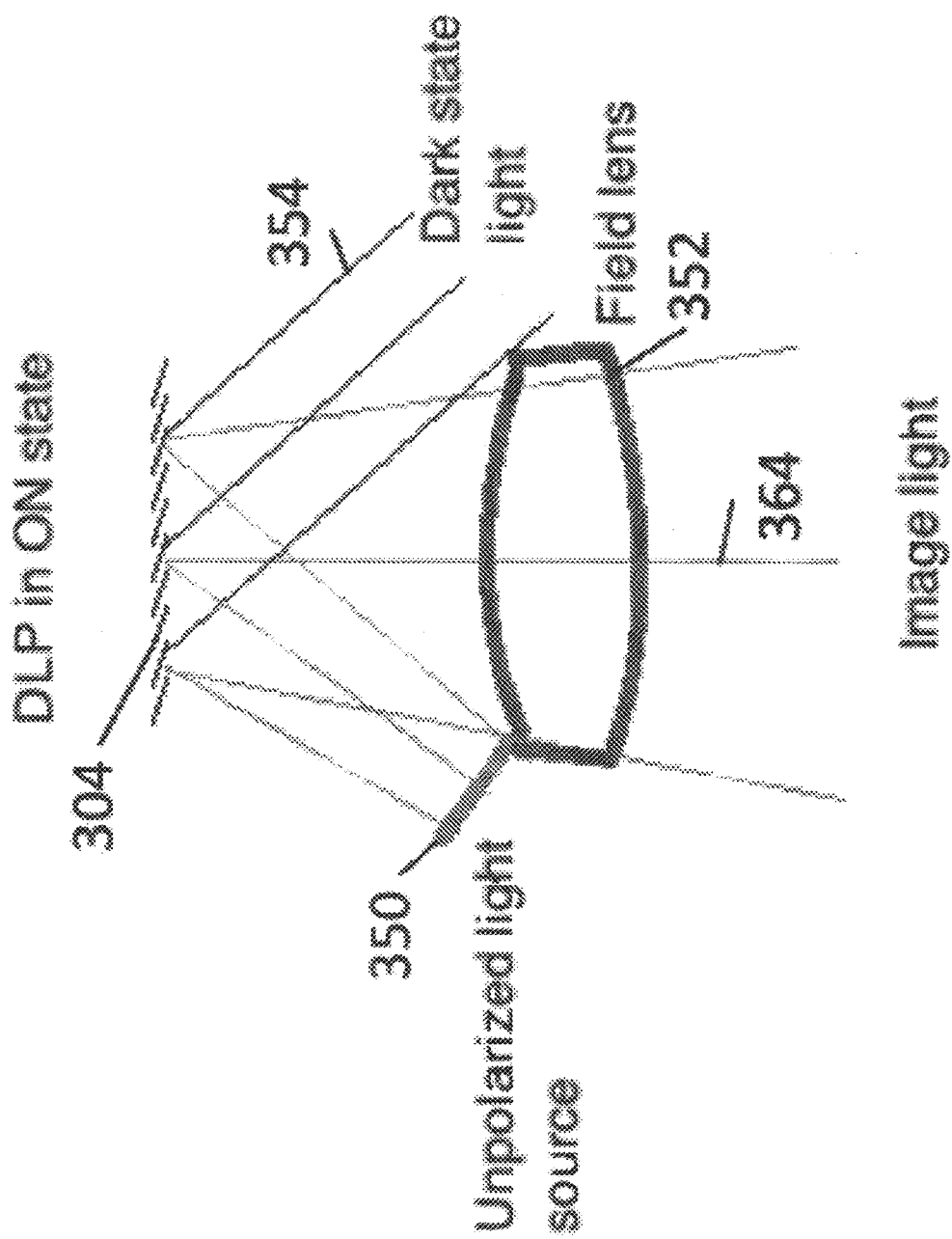

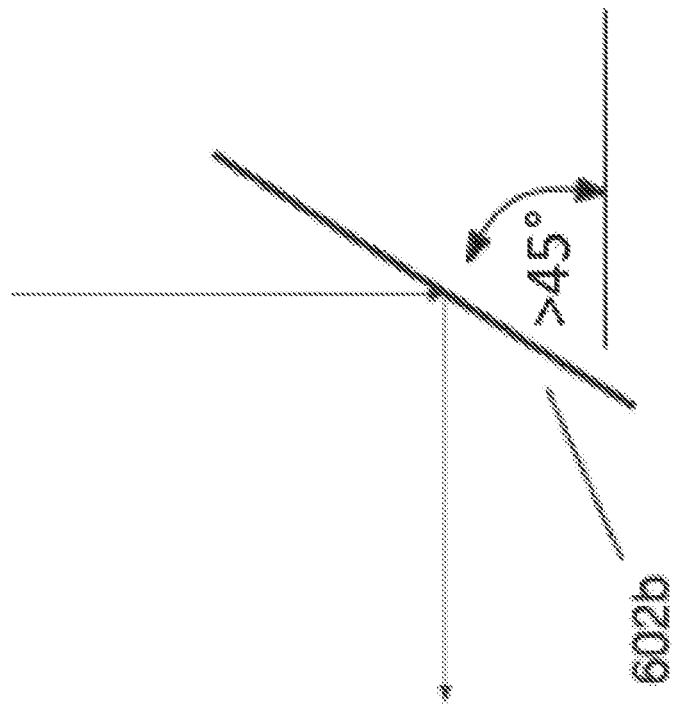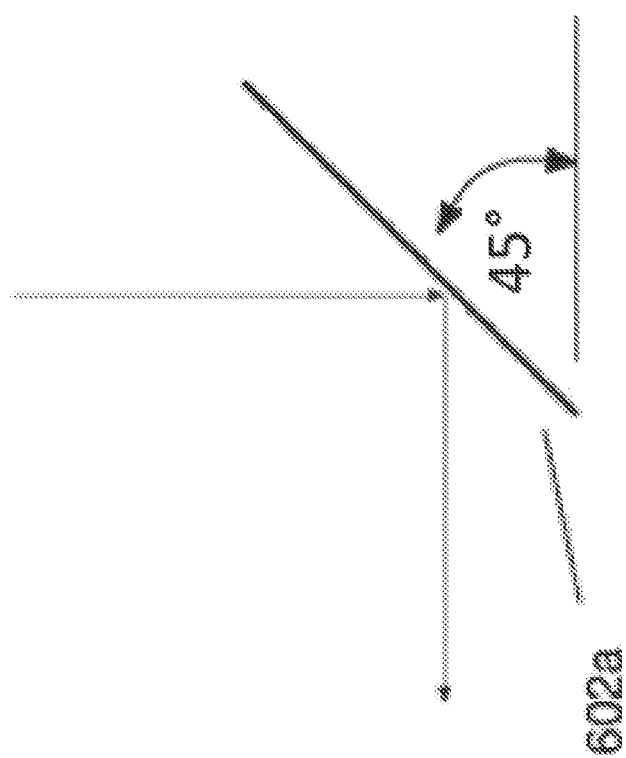
Figure 7

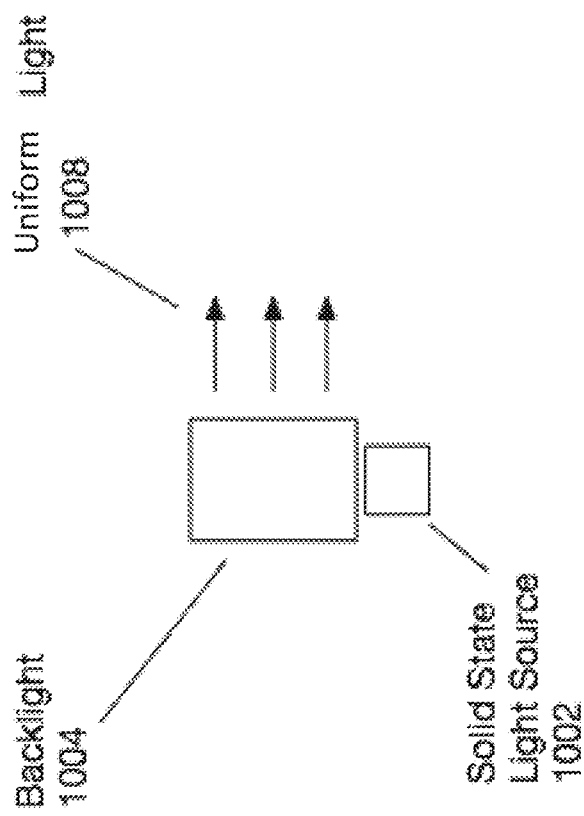

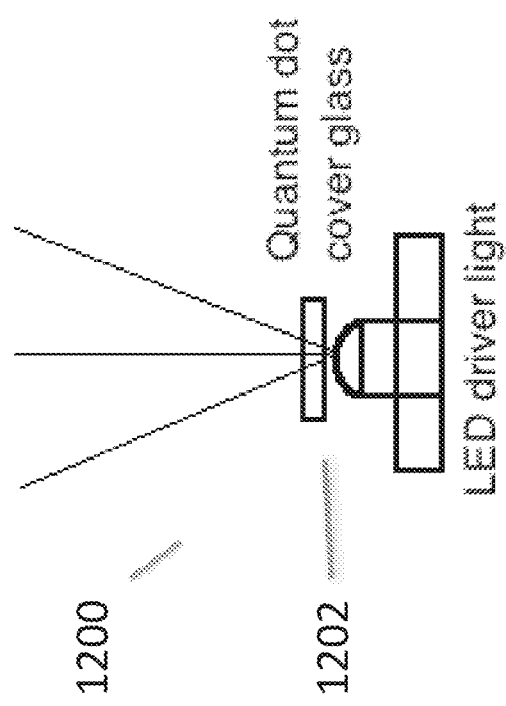

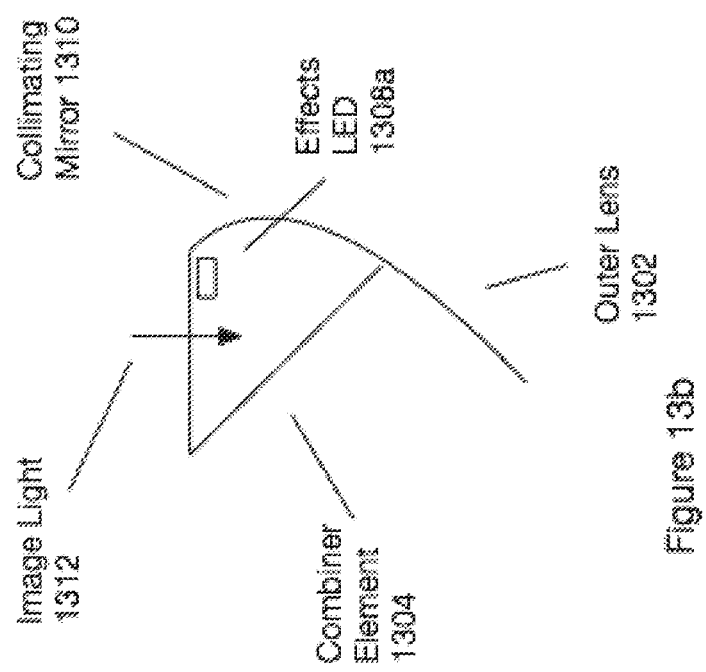

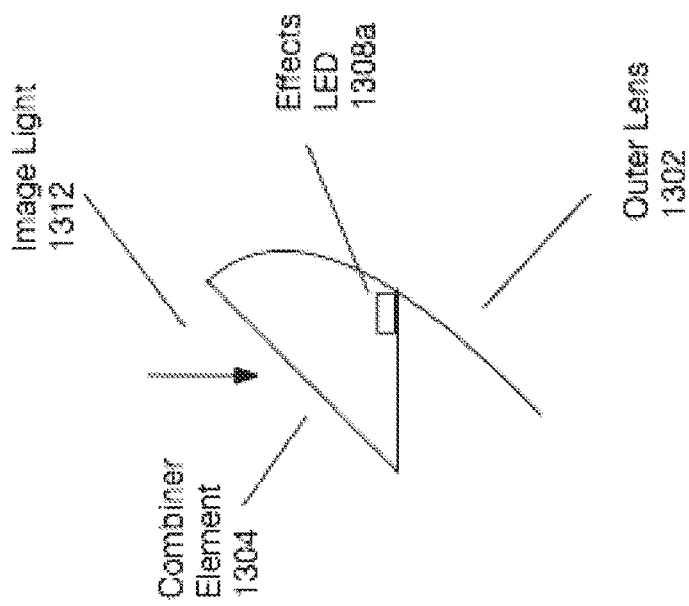

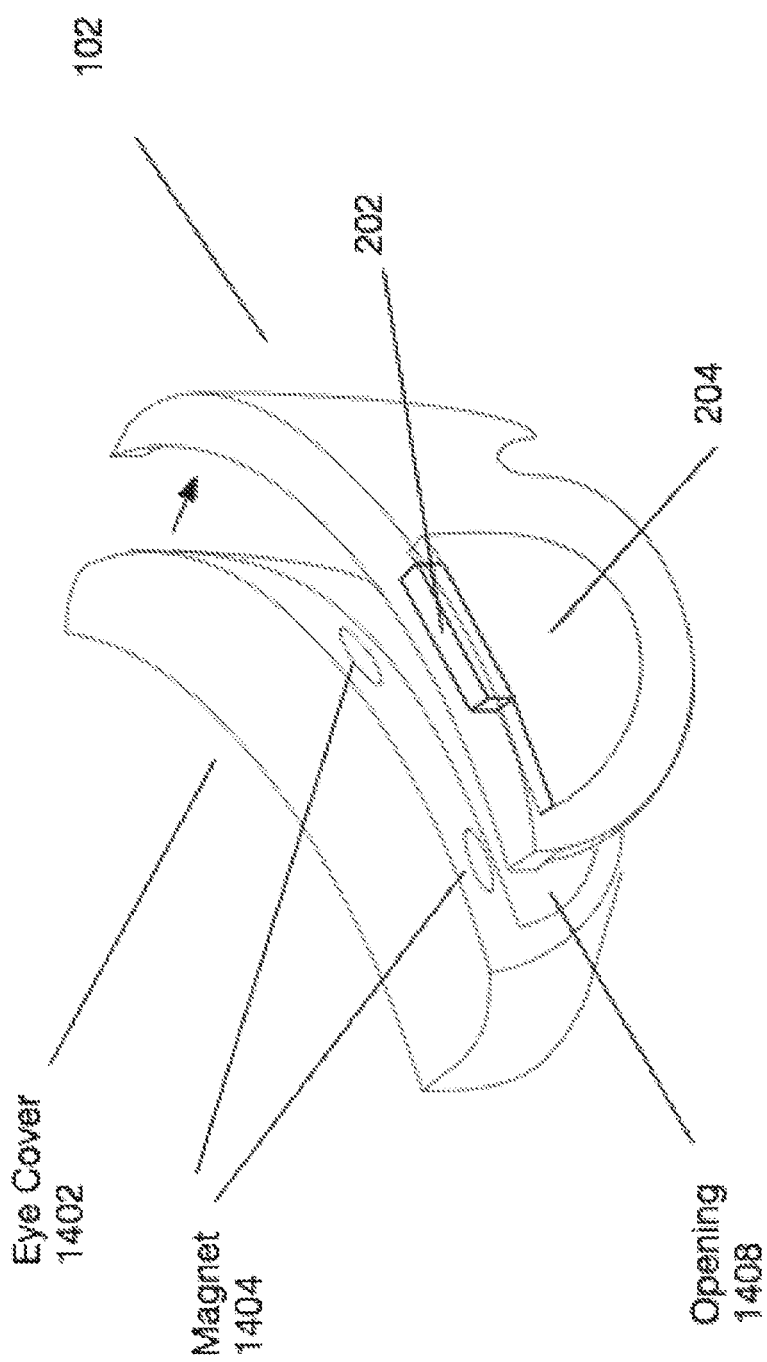

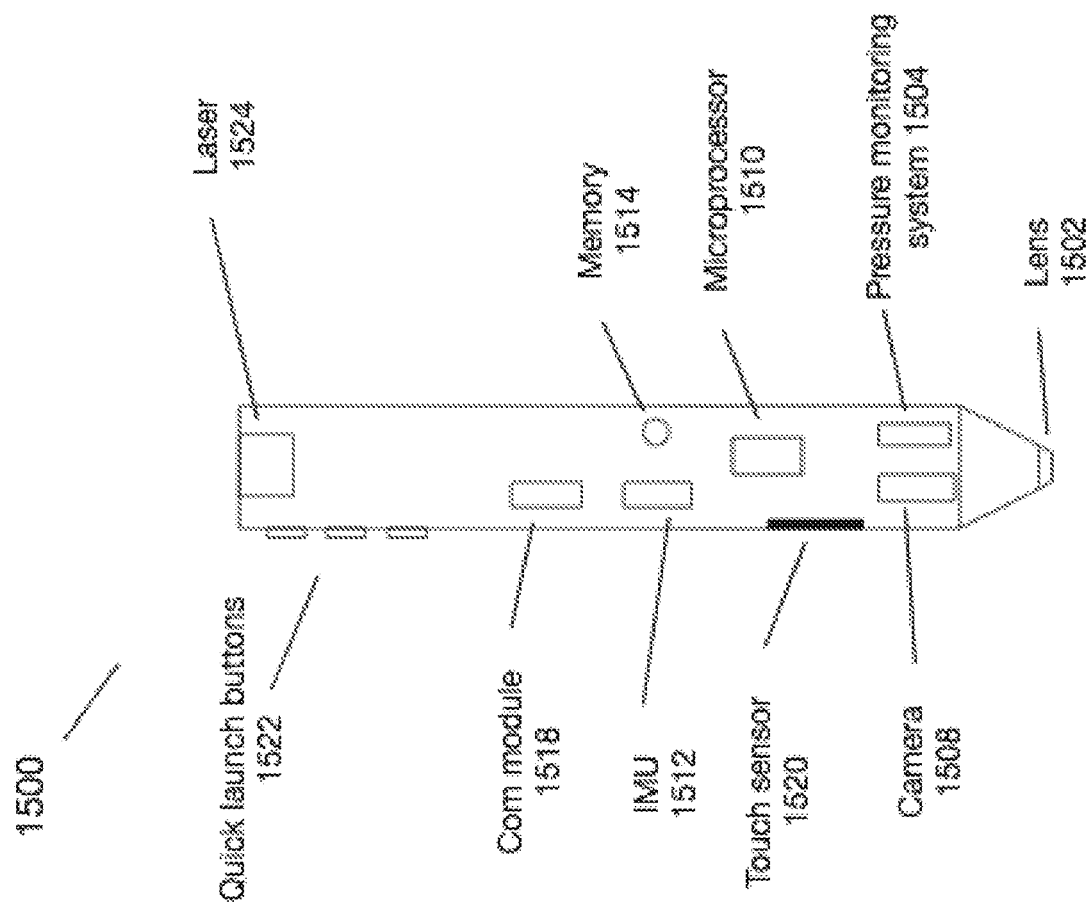

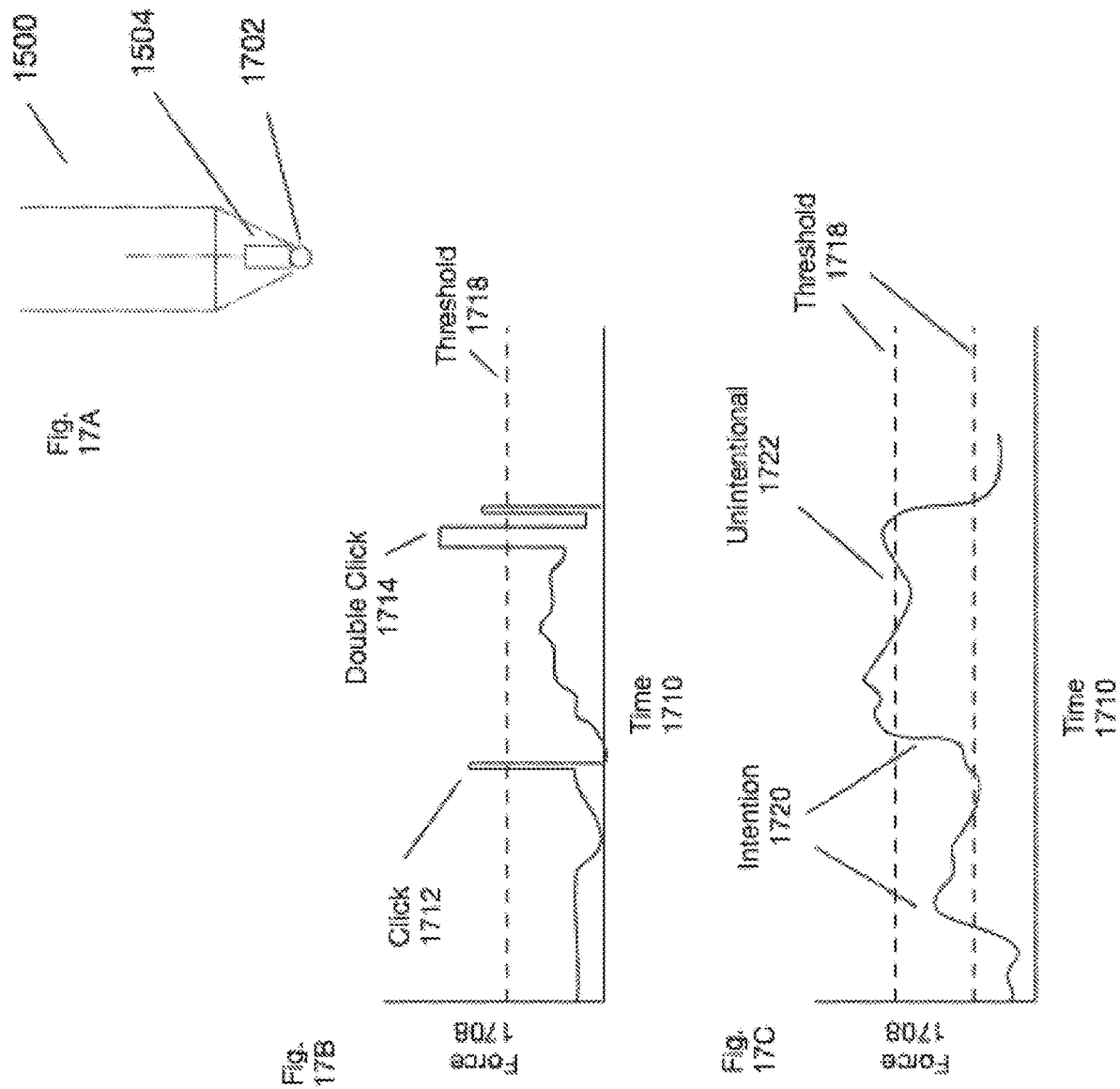

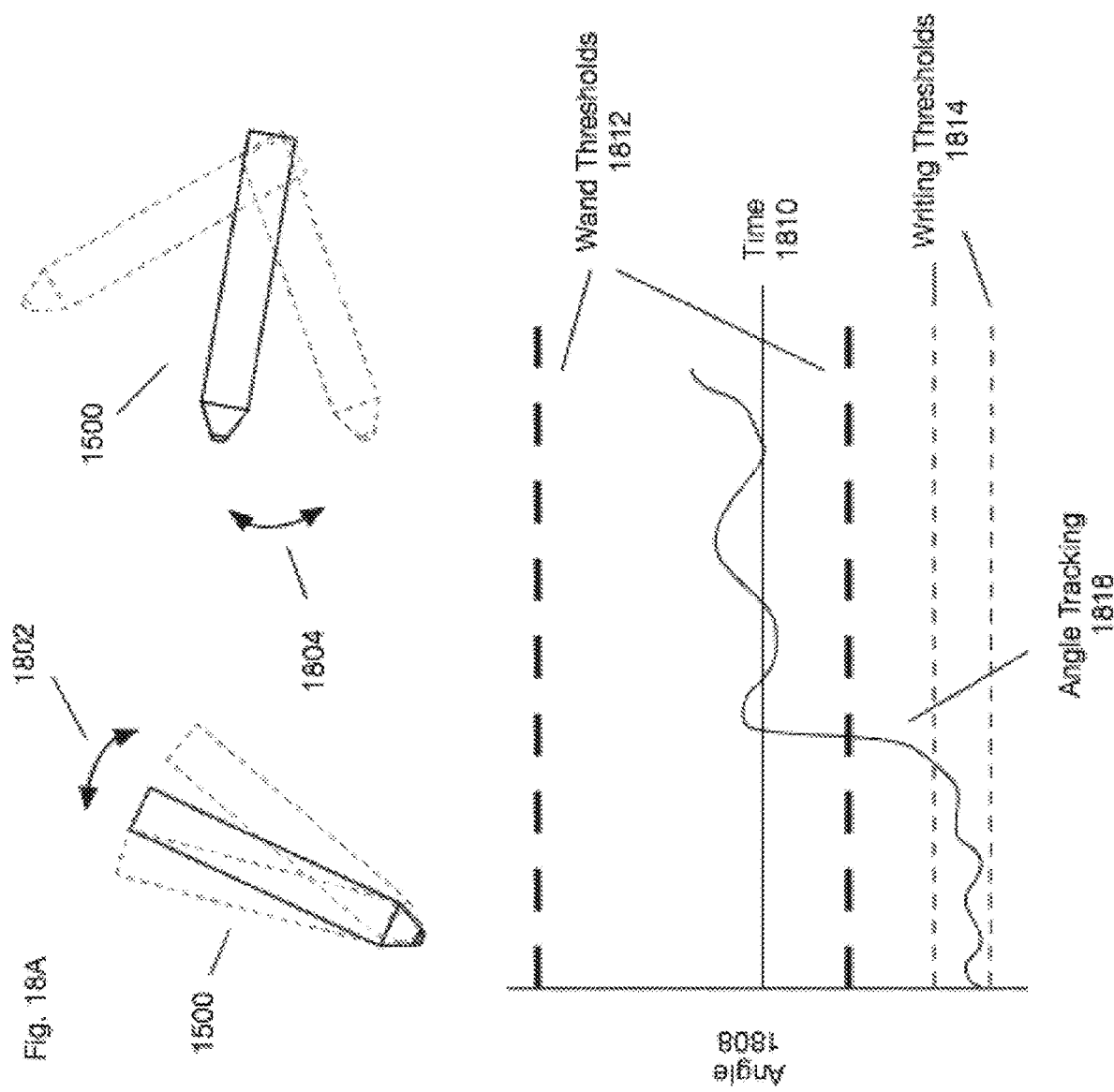

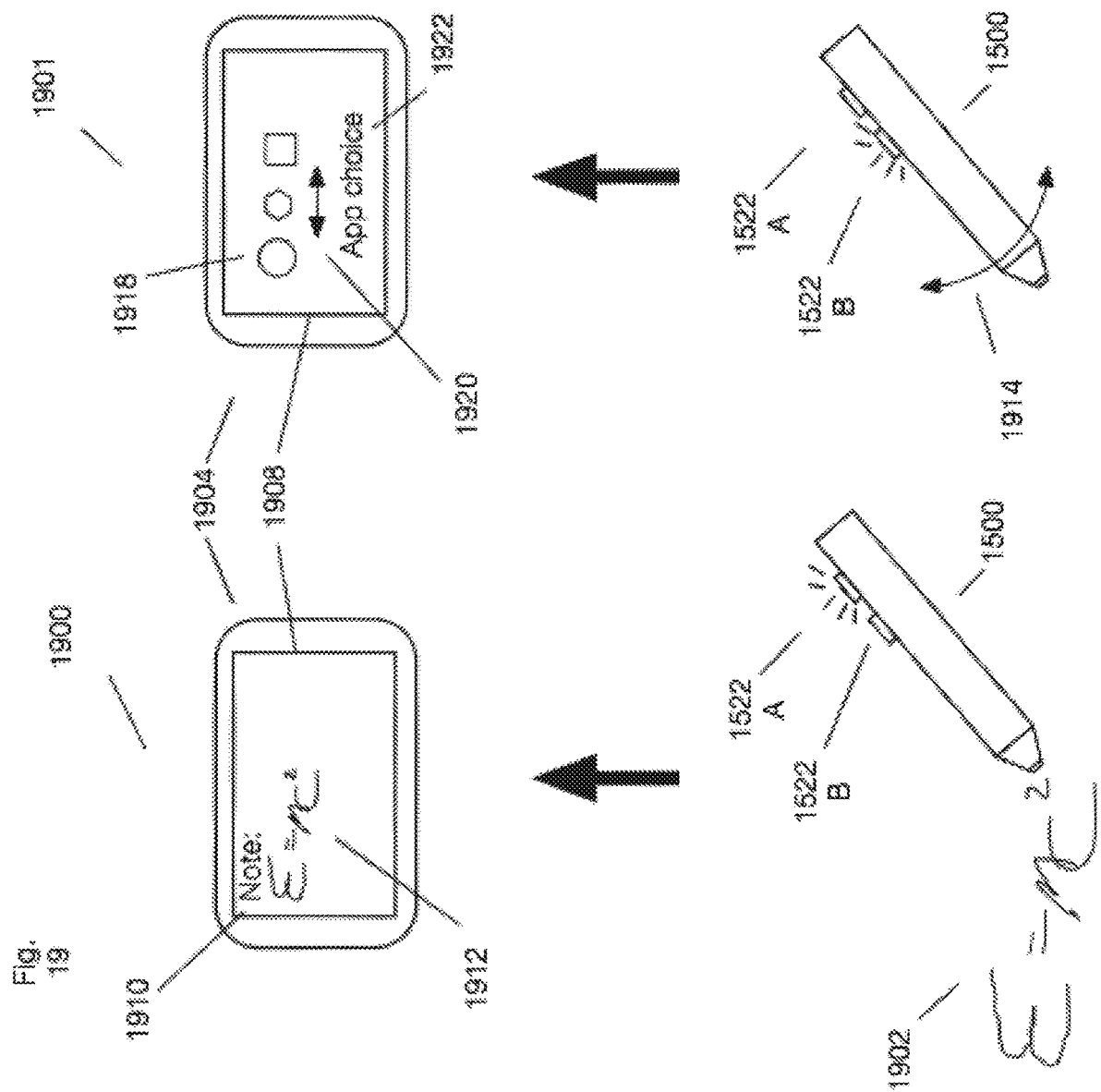

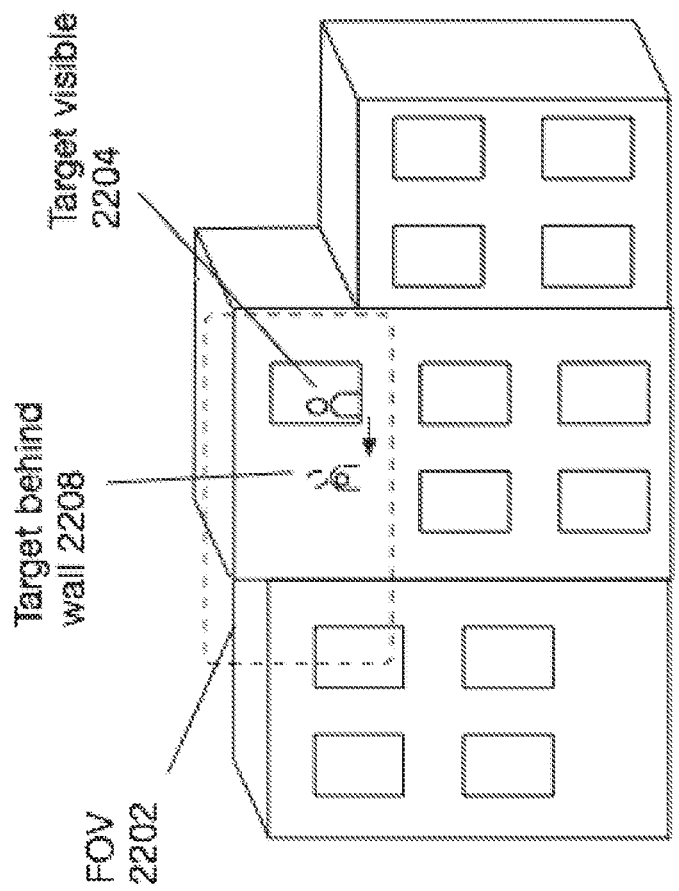

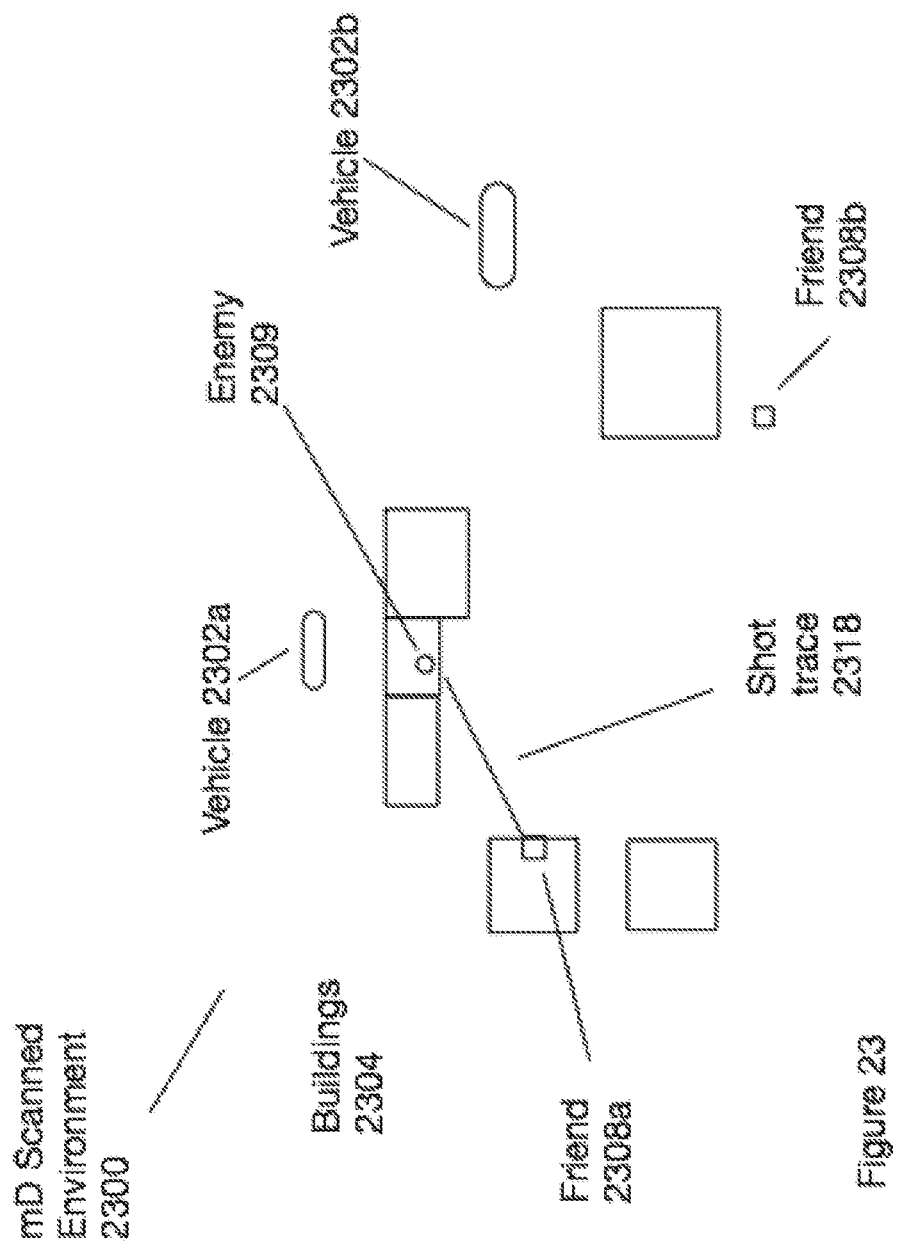

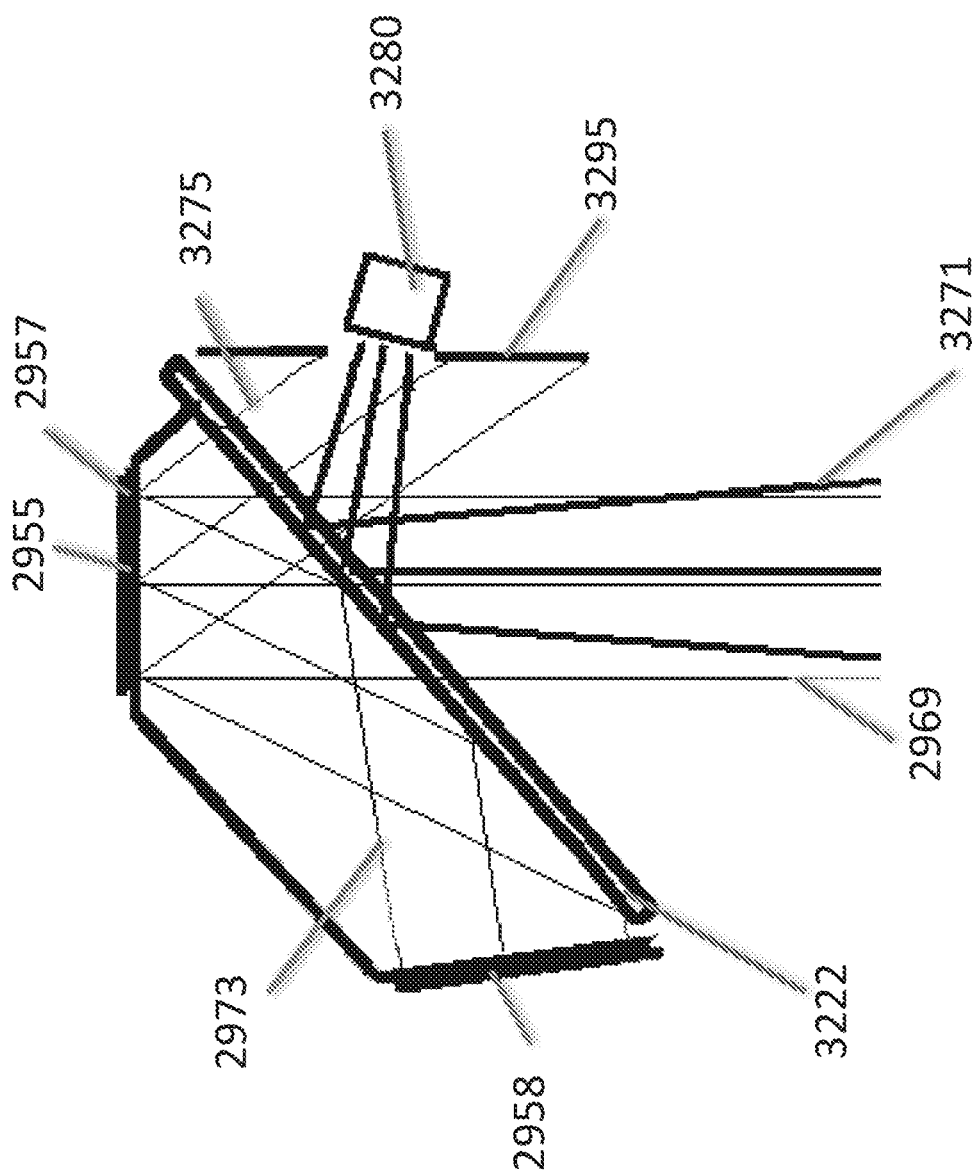

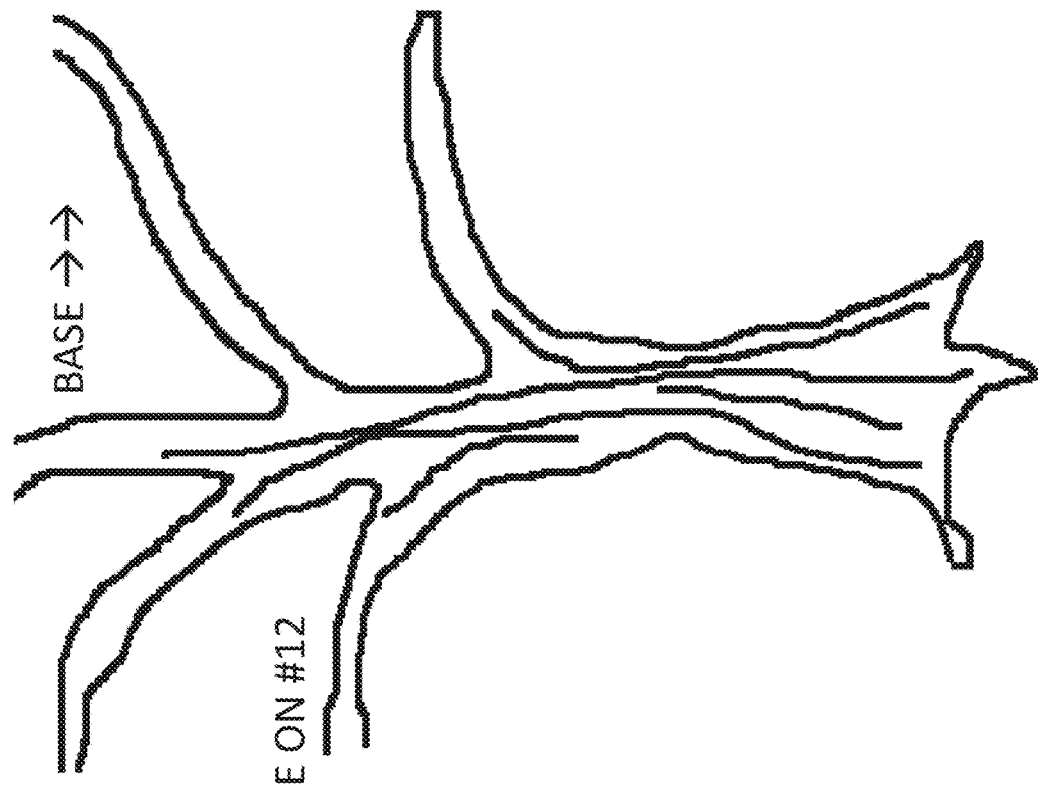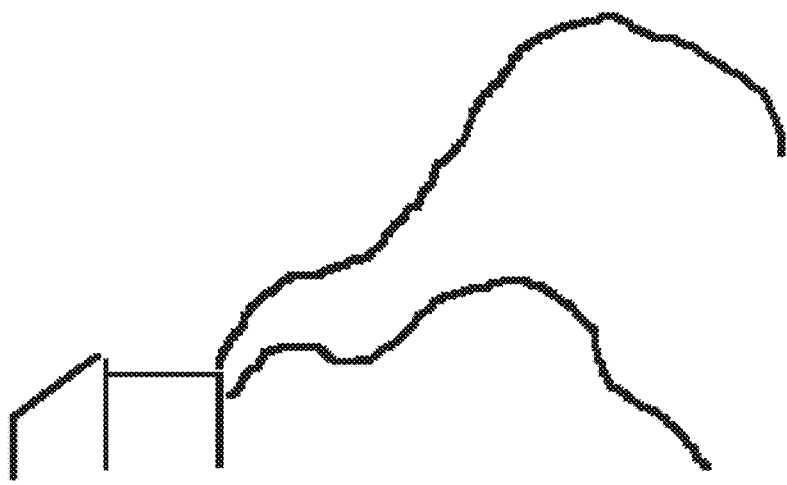
Figure 47

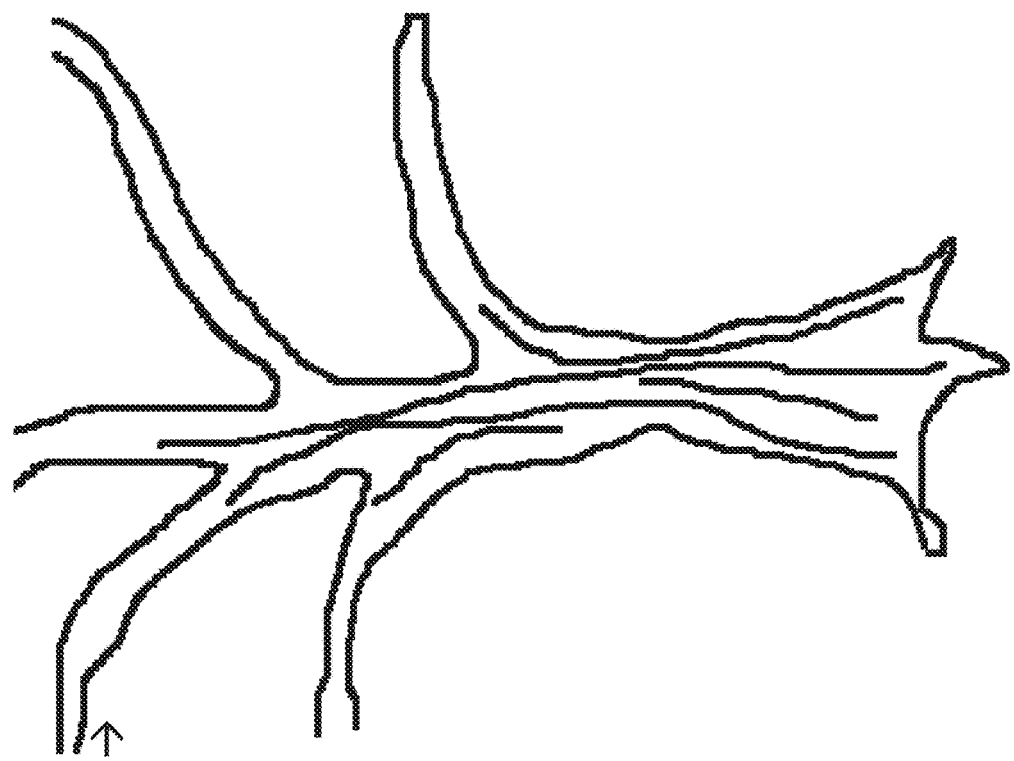
BASE →→
INSTRUCTIONS:
TRAVEL 10 MILES ENE ON #12
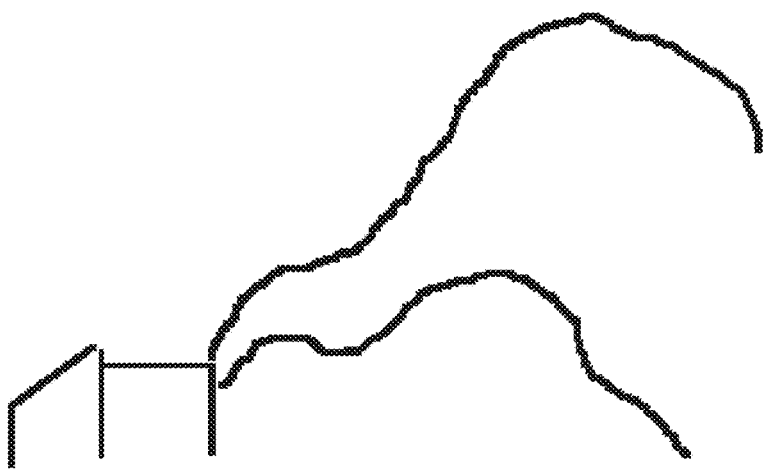
Figure 48

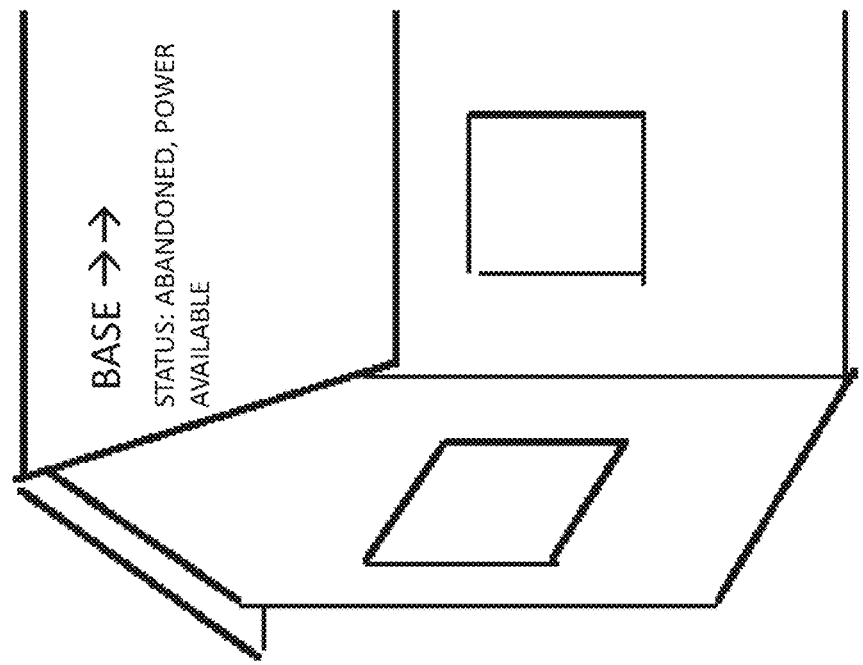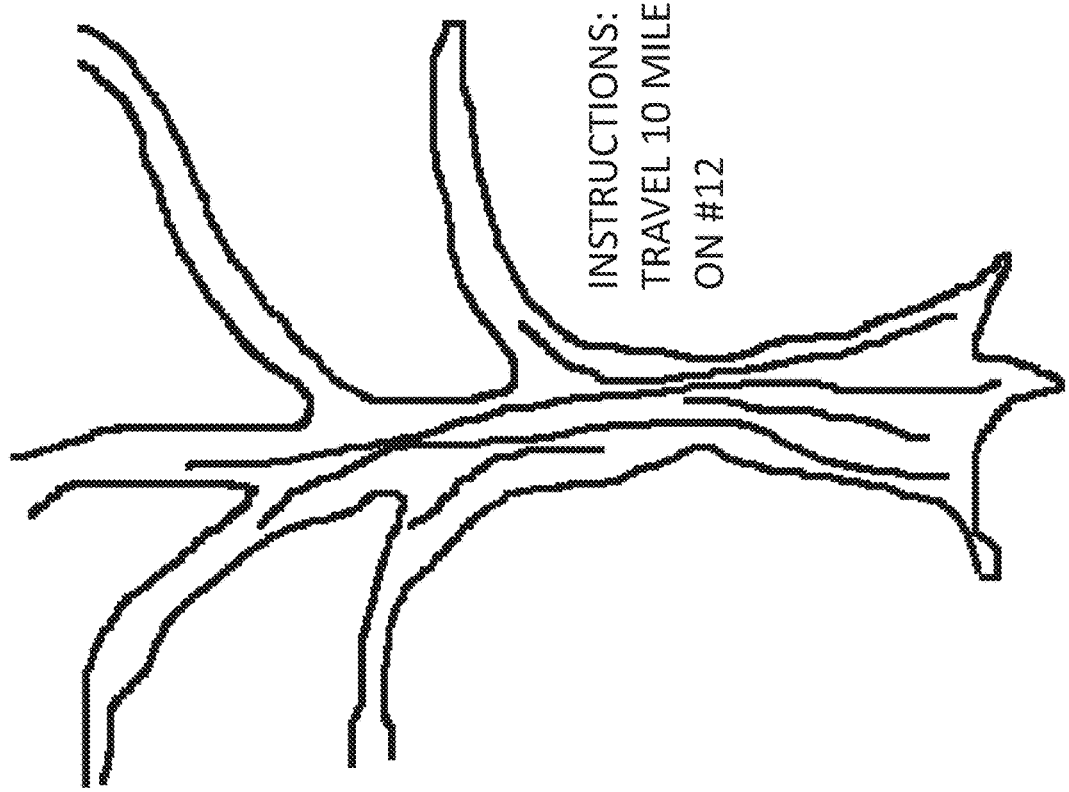
Figure 49

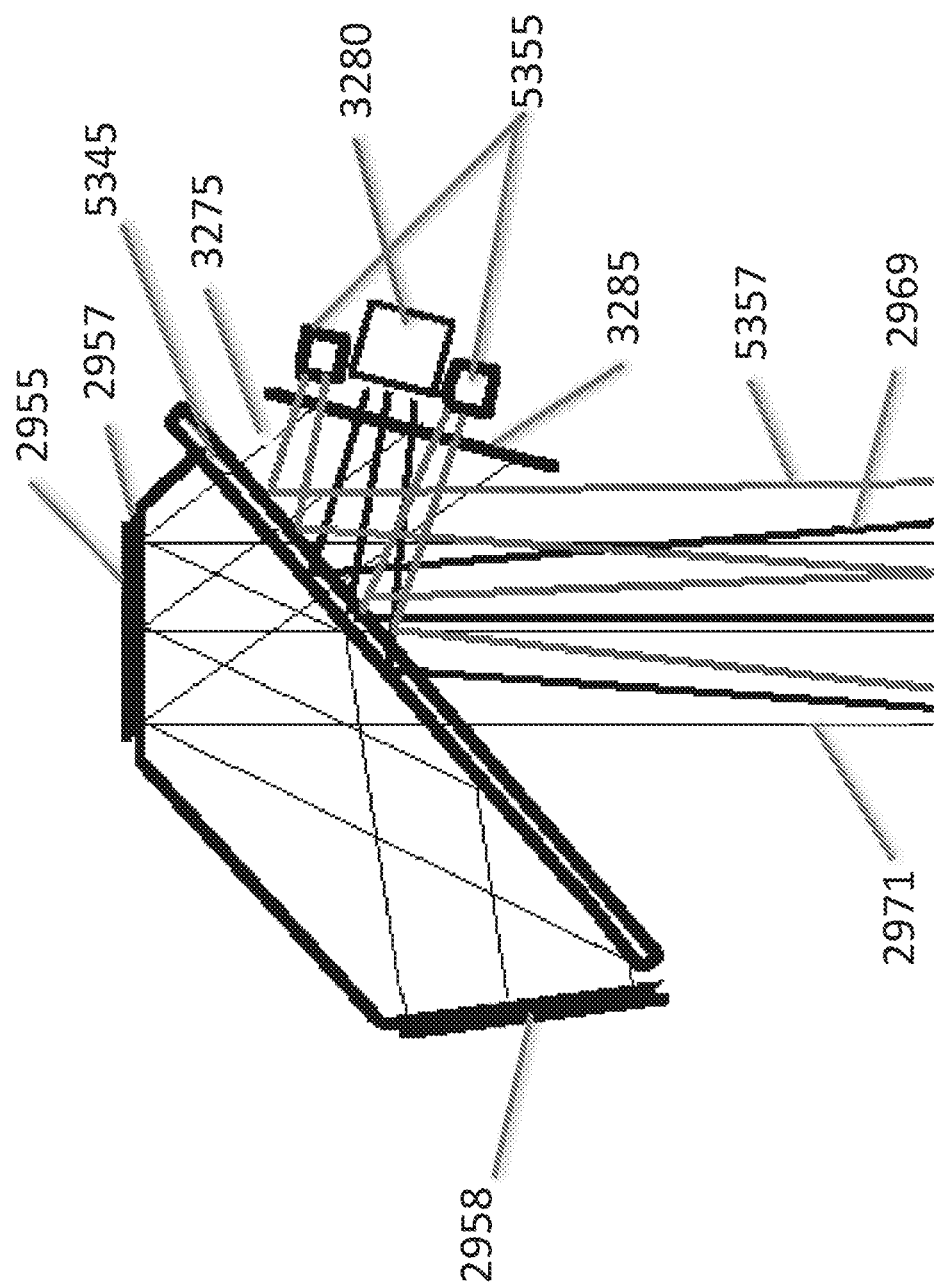

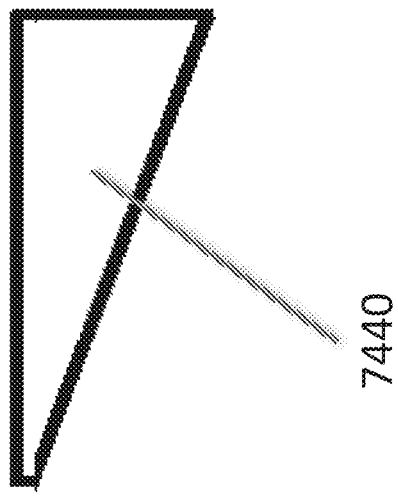
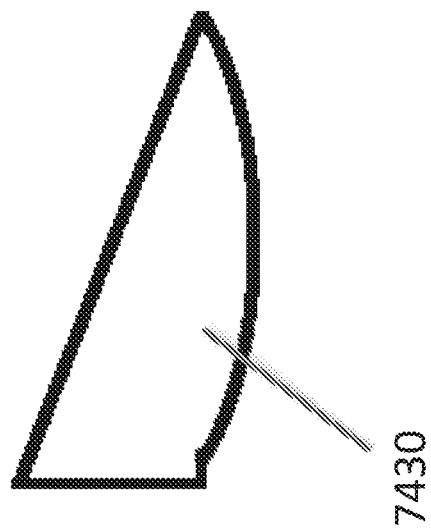
Figure 74

Figurer 77

10700

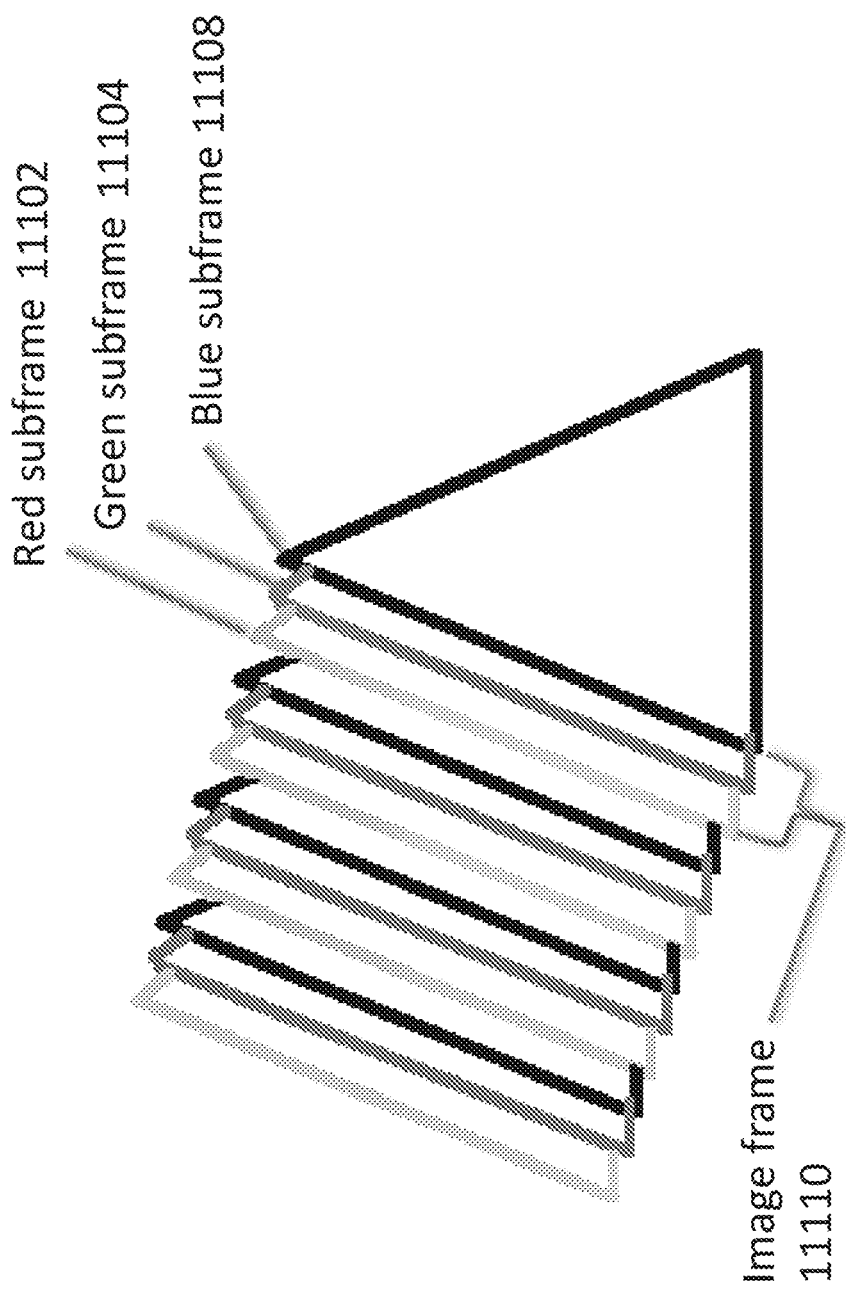

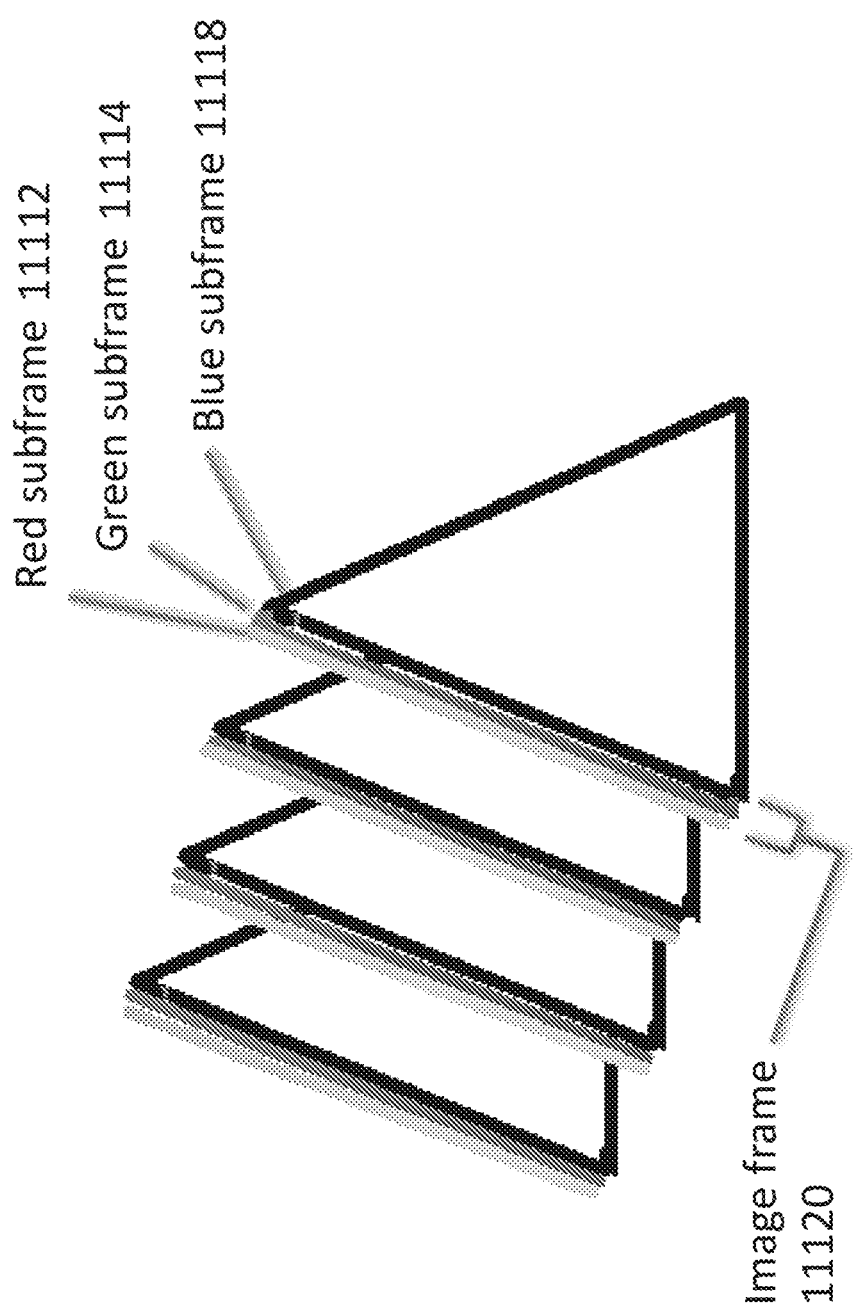

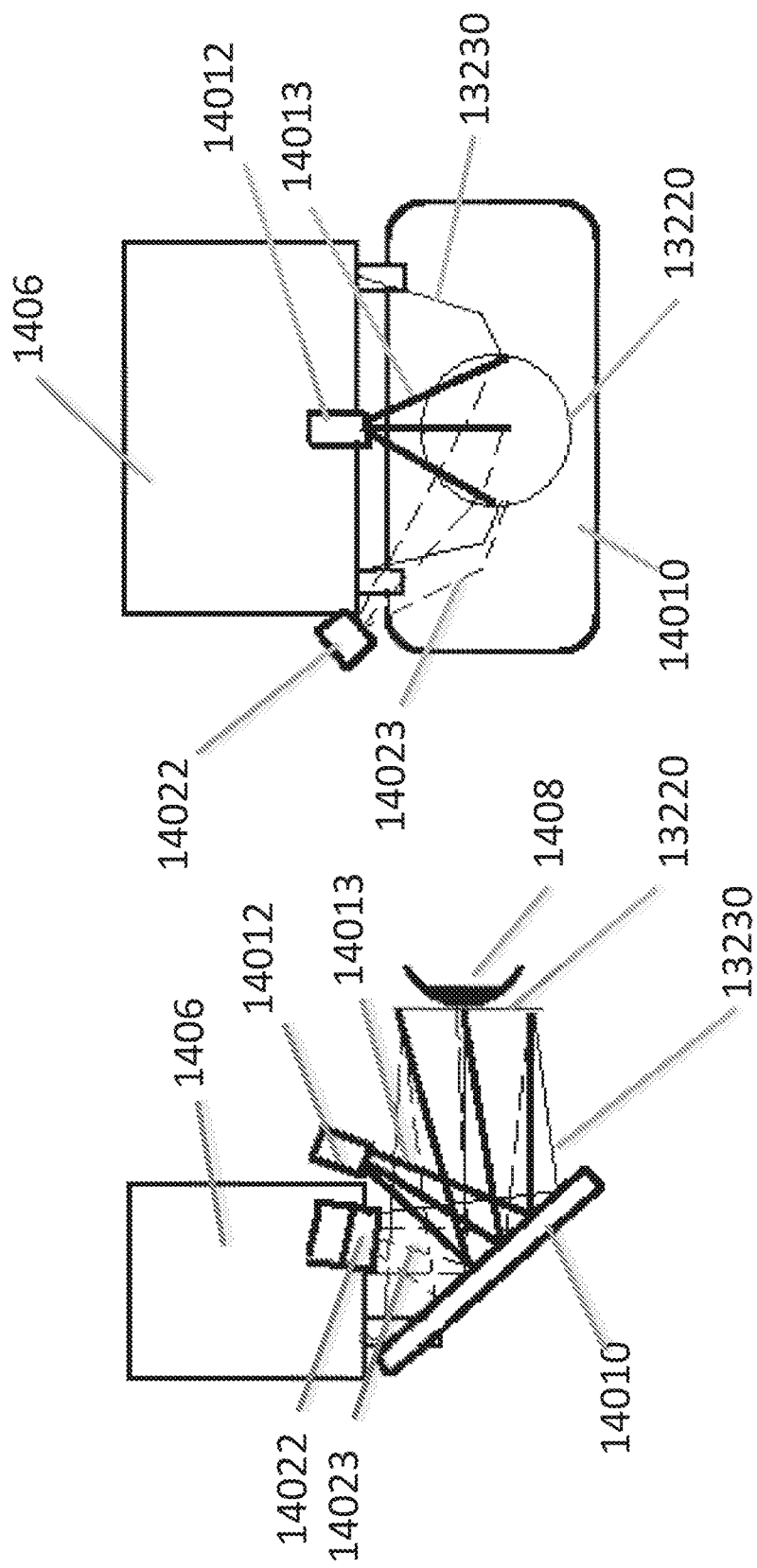

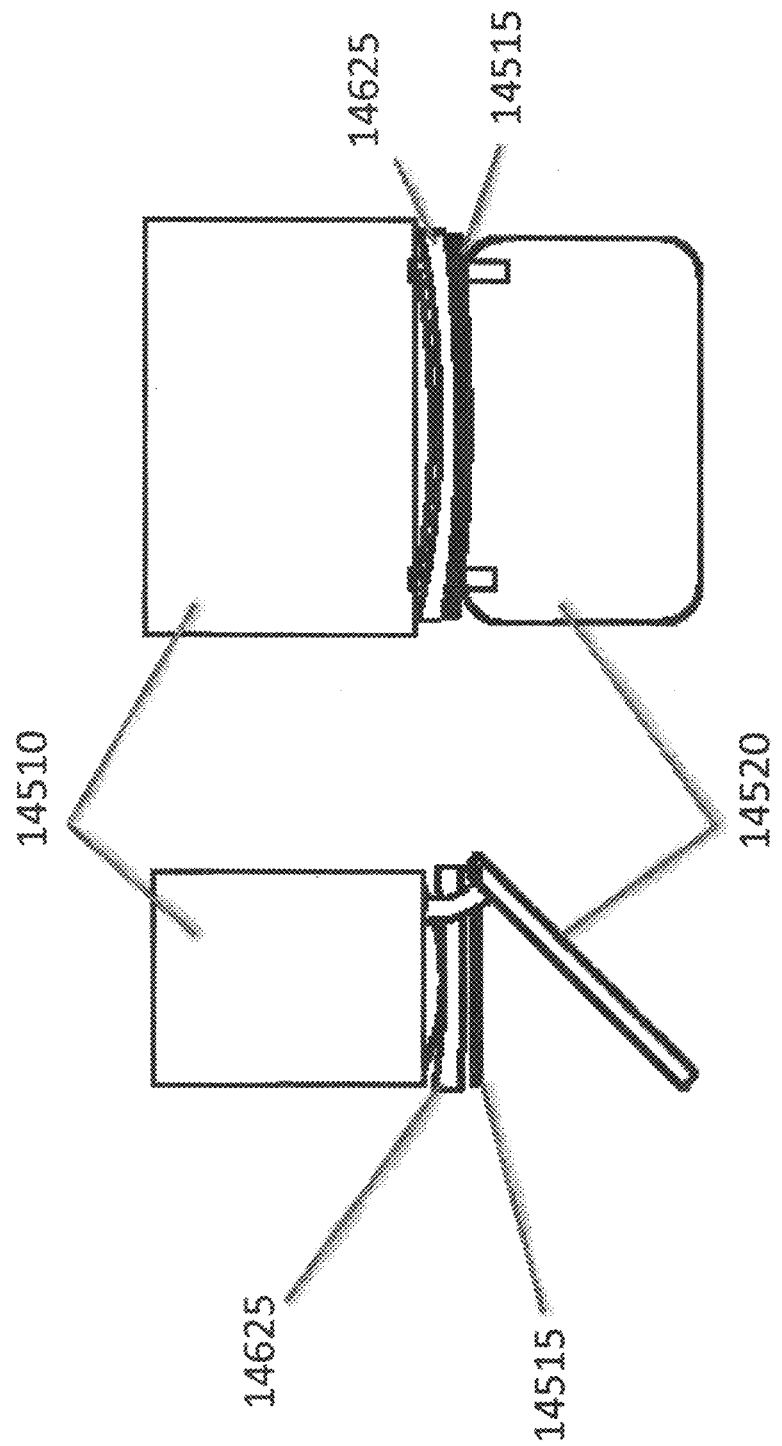

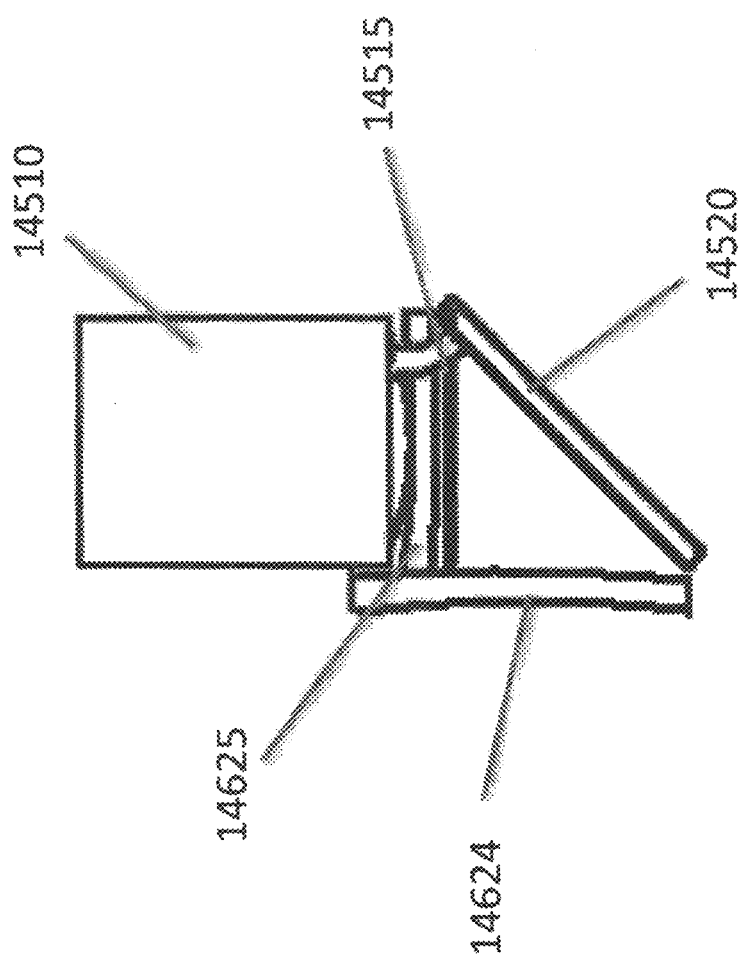

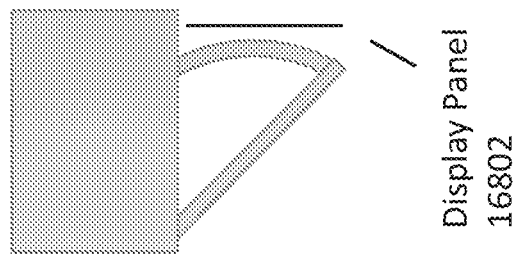
Figure 168C
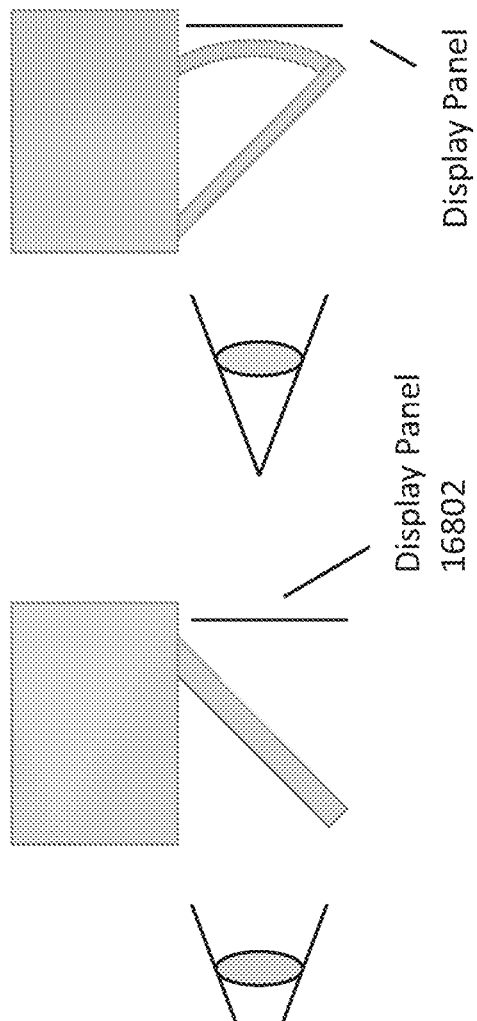
Figure 168B
Figure 168A
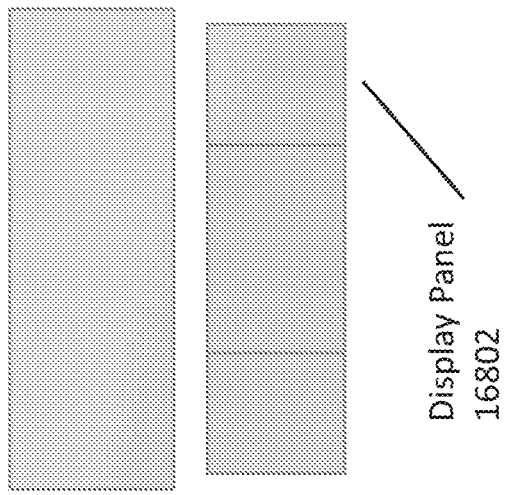
Figure 168E
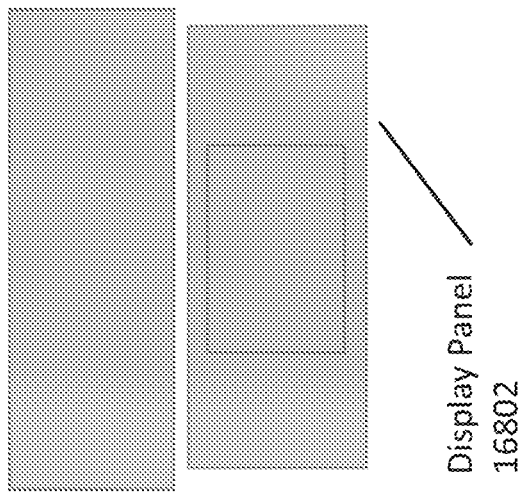
Figure 168D

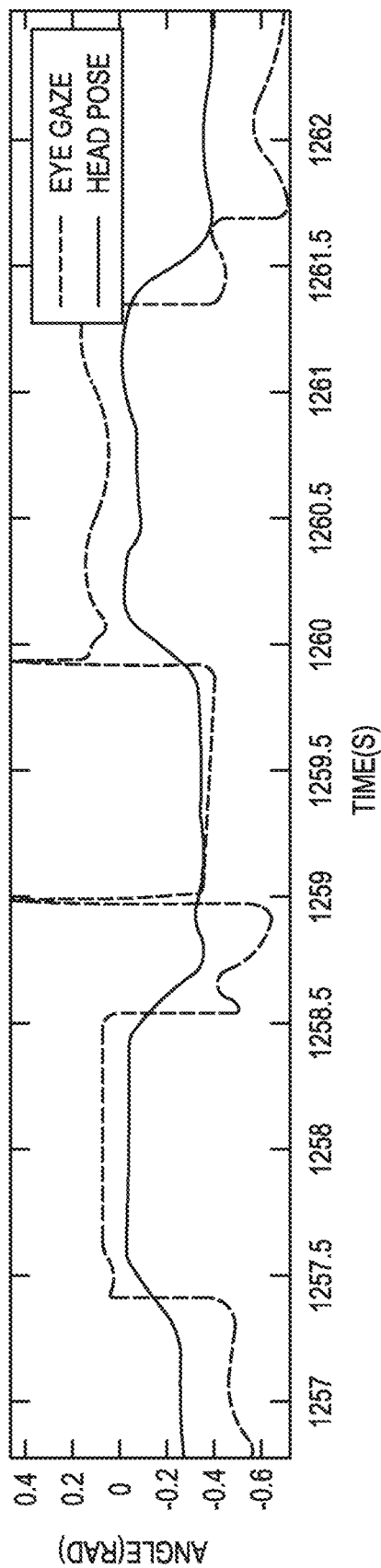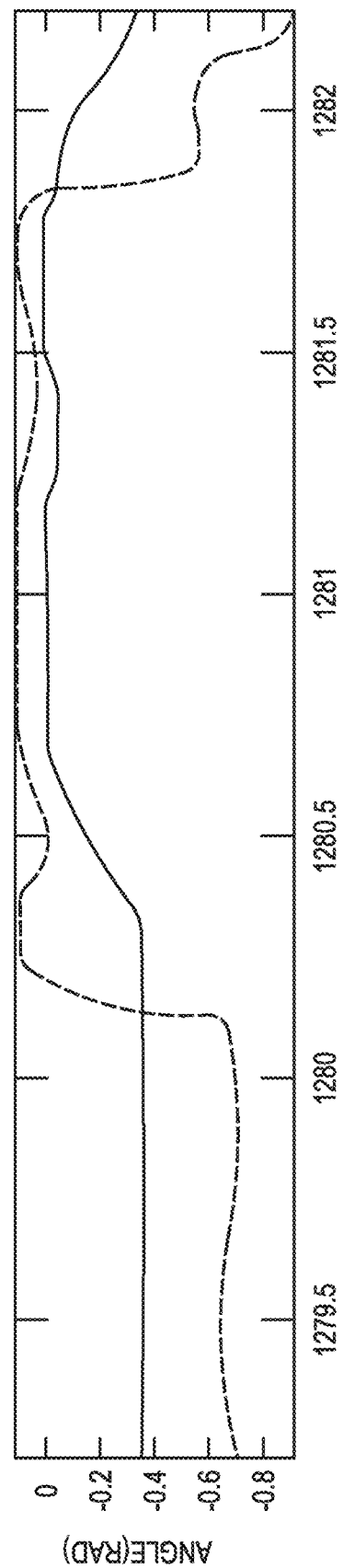
FIG. 174A

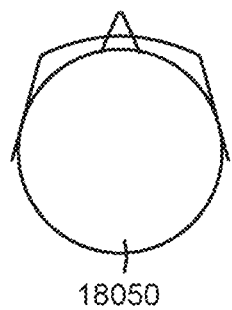 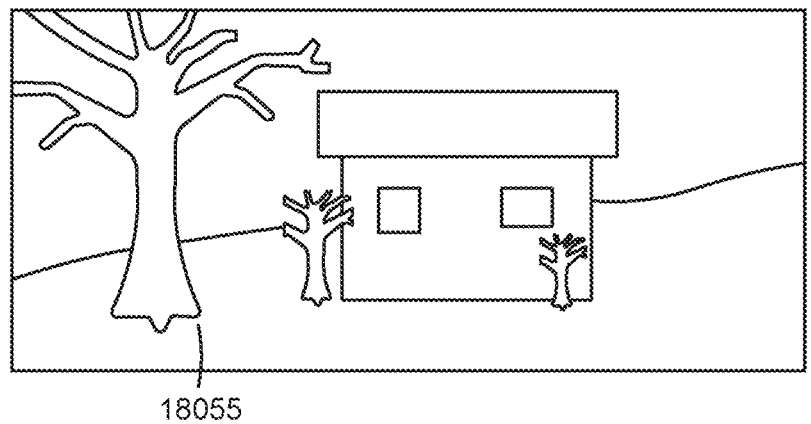
FIG. 180
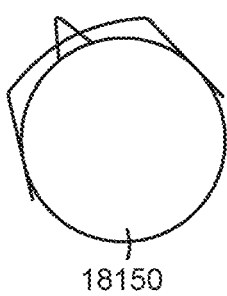 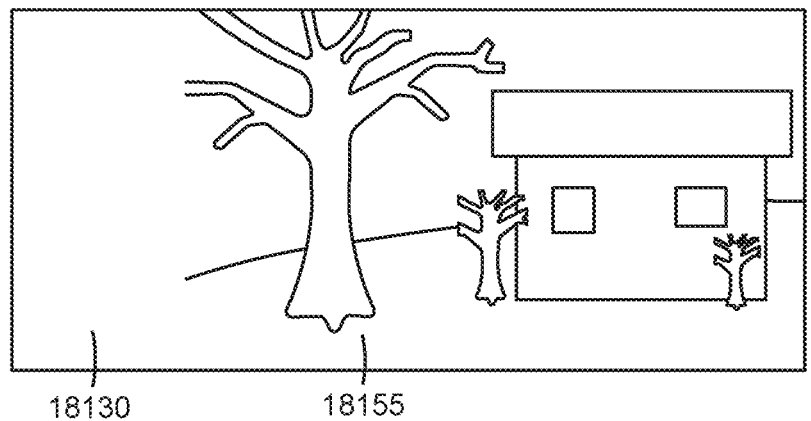
FIG. 181
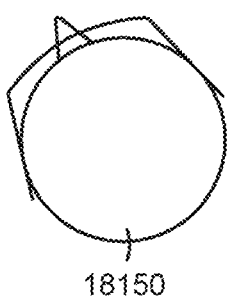 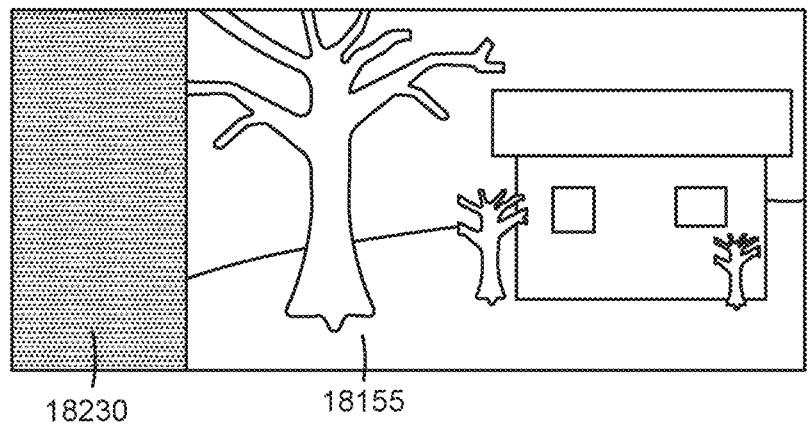
FIG. 182

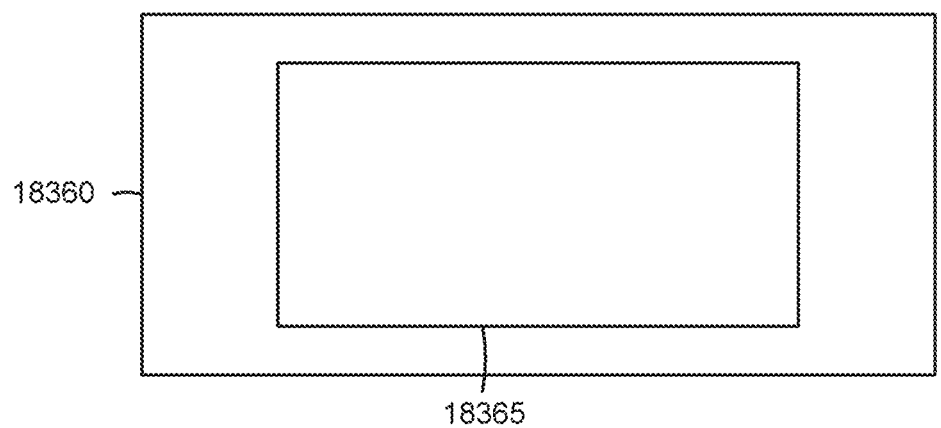
FIG. 183
 
FIG. 184   FIG. 185
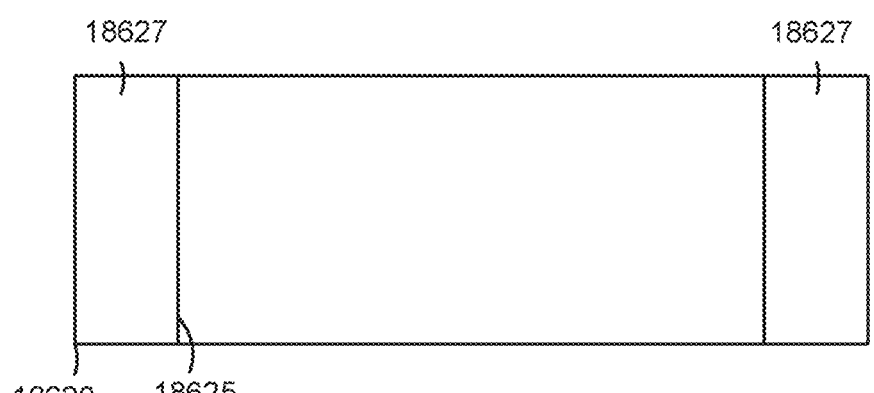
FIG. 186

SEE-THROUGH COMPUTER DISPLAY SYSTEMS WITH ADJUSTABLE ZOOM CAMERAS

CROSS-REFERENCE TO RELATED APPLICATIONS

This application is a continuation to U.S. Non-Provisional application Ser. No. 15/657,442, filed on Jul. 24, 2017, the contents of which are incorporated by reference herein in their entirety.

BACKGROUND

Field of Invention

This disclosure relates to see-through computer display systems.

Description of Related Art

Head mounted displays (HMDs) and particularly HMDs that provide a see-through view of the environment are valuable instruments. The presentation of content in the see-through display can be a complicated operation when attempting to ensure that the user experience is optimized. Improved systems and methods for presenting content in the see-through display are required to improve the user experience.

SUMMARY

Aspects of the present disclosure relate to methods and systems for the see-through computer display systems with improved stray light management systems.

These and other systems, methods, objects, features, and advantages of the present disclosure will be apparent to those skilled in the art from the following detailed description of the preferred embodiment and the drawings. All documents mentioned herein are hereby incorporated in their entirety by reference.

BRIEF DESCRIPTION OF THE DRAWINGS

Embodiments are described with reference to the following Figures. The same numbers may be used throughout to reference like features and components that are shown in the Figures.

FIG. 3a illustrates a large prior art optical arrangement.

FIG. 7 illustrates angles of combiner elements in accordance with the principles of the present disclosure.

FIG. 10 illustrates a light source in accordance with the principles of the present disclosure.

FIGS. 12a to 12c illustrate light source and quantum dot systems in accordance with the principles of the present disclosure.

FIGS. 13a to 13c illustrate peripheral lighting systems in accordance with the principles of the present disclosure.

FIGS. 14a to 14c illustrate a light suppression systems in accordance with the principles of the present disclosure.

FIG. 15 illustrates an external user interface in accordance with the principles of the present disclosure.

FIGS. 17a to 17c illustrate force interpretation systems in accordance with the principles of the present disclosure.

FIGS. 18a to 18c illustrate user interface mode selection systems in accordance with the principles of the present disclosure.

FIG. 19 illustrates interaction systems in accordance with the principles of the present disclosure.

FIG. 22 illustrates mD trace representations presented in accordance with the principles of the present disclosure.

FIG. 23 illustrates an mD scanned environment in accordance with the principles of the present disclosure.

FIG. 47 illustrates content position dependent on sensor feedback in accordance with the principles of the present disclosure.

FIG. 48 illustrates content position dependent on sensor feedback in accordance with the principles of the present disclosure.

FIG. 49 illustrates content position dependent on sensor feedback in accordance with the principles of the present disclosure.

FIG. 53 illustrates an optics module in accordance with the principles of the present disclosure.

FIG. 74 illustrates an optical element in accordance with the principles of the present disclosure.

FIG. 105 illustrates a blocking optic in accordance with the principles of the present disclosure.

Figure 106C:
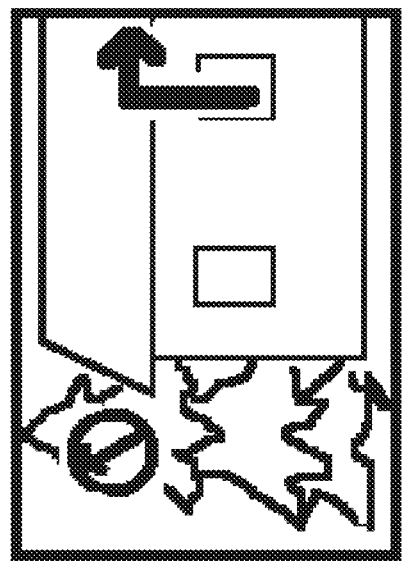
Figure 106A:
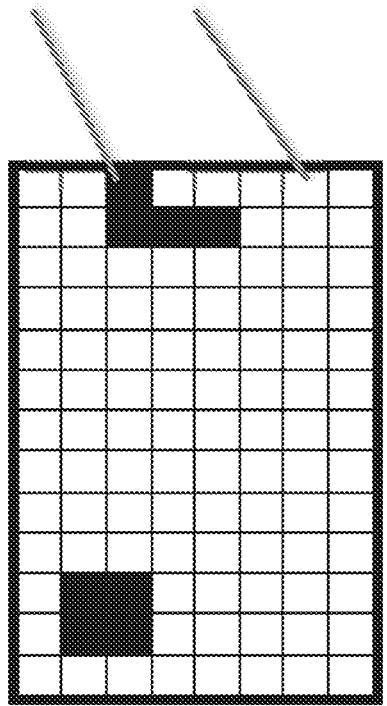
Figure 106B:
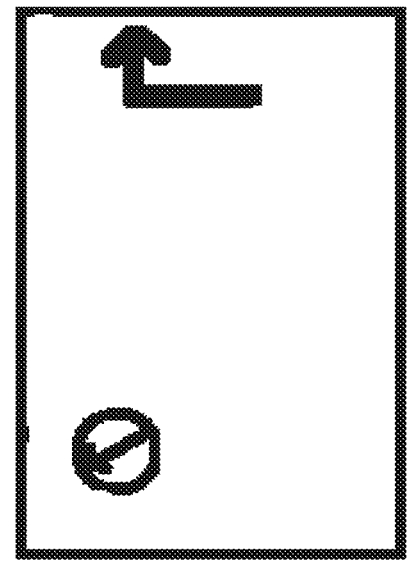

FIGS. 106a, 106b, and 106c illustrate a blocking optic system in accordance with the principles of the present disclosure.

Figure 107:

FIG. 107 illustrates a full color image in accordance with the principles of the present disclosure.

Figure 108B:
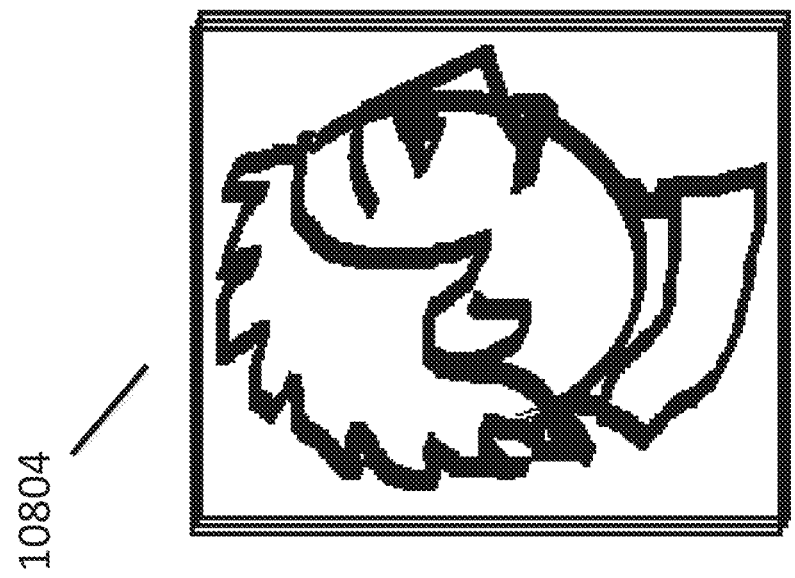
Figure 108A:
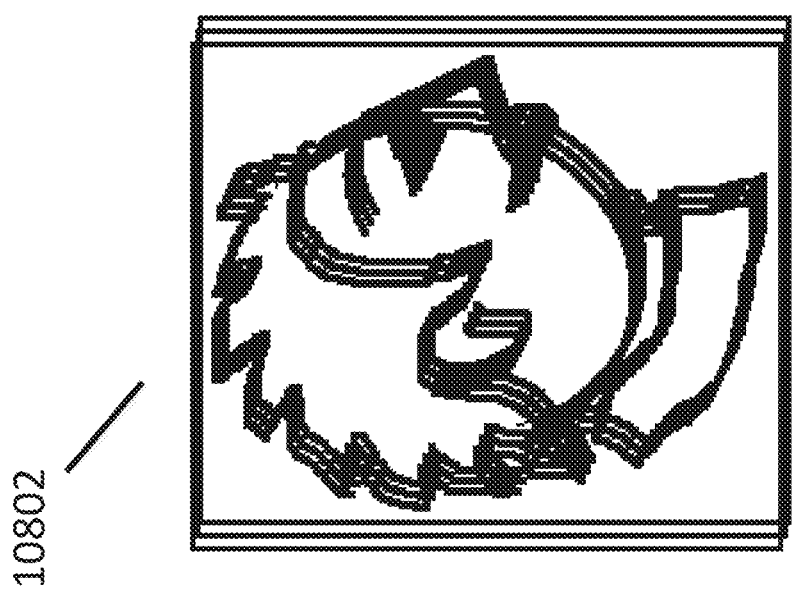

FIGS. 108A and 108B illustrate color breakup management in accordance with the principles of the present disclosure.

Figure 109:
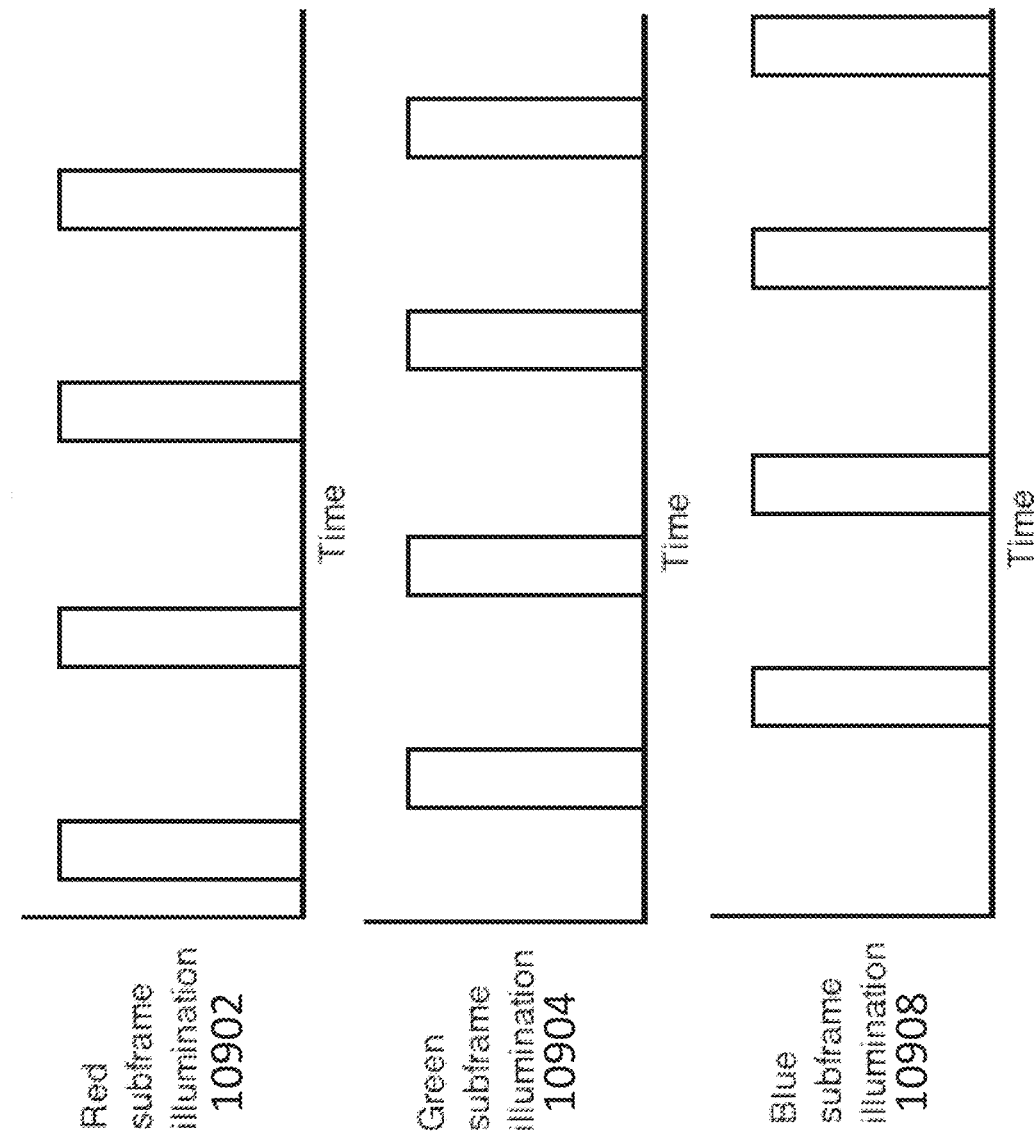

FIG. 109 illustrates timing sequences in accordance with the principles of the present disclosure.

Figure 110:
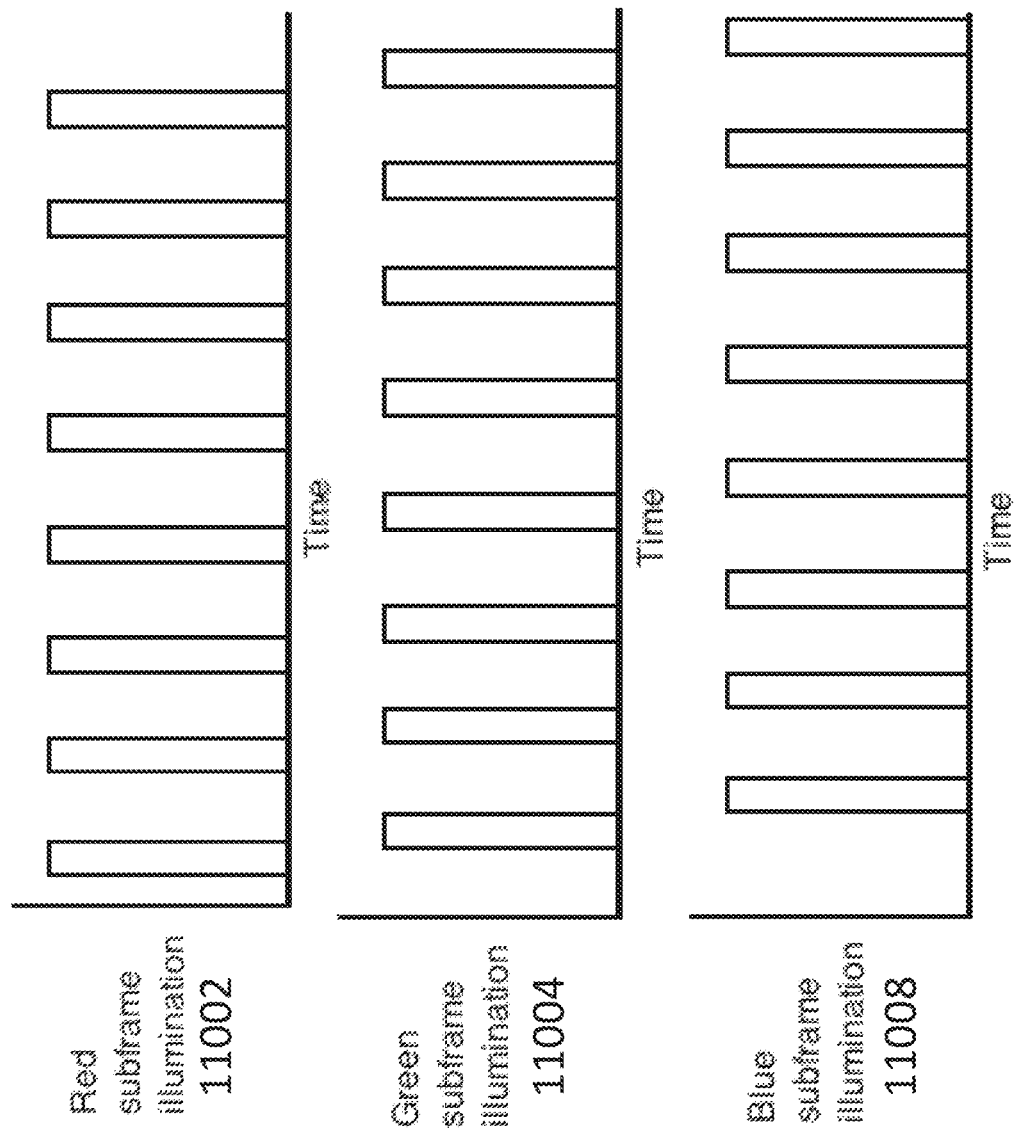

FIG. 110 illustrates timing sequences in accordance with the principles of the present disclosure.

FIGS. 111a and 111b illustrate sequentially displayed images in accordance with the principles of the present disclosure.

Figure 112:
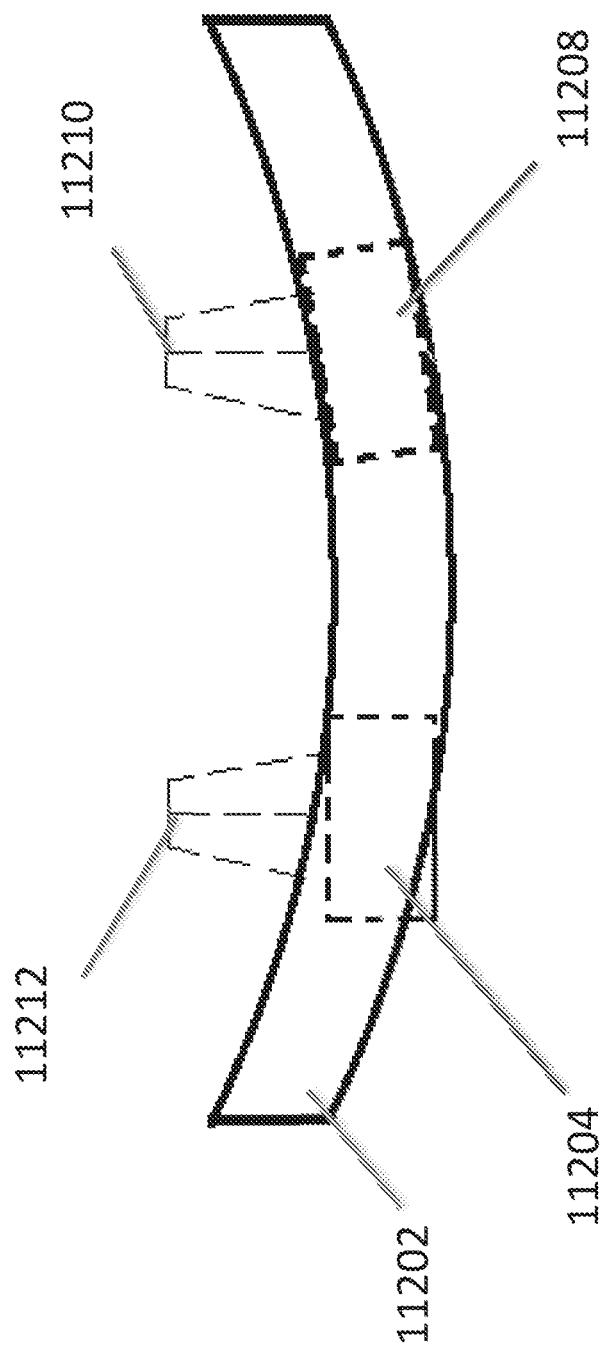

FIG. 112 illustrates a see-through display with rotated components in accordance with the principles of the present disclosure.

Figure 113:
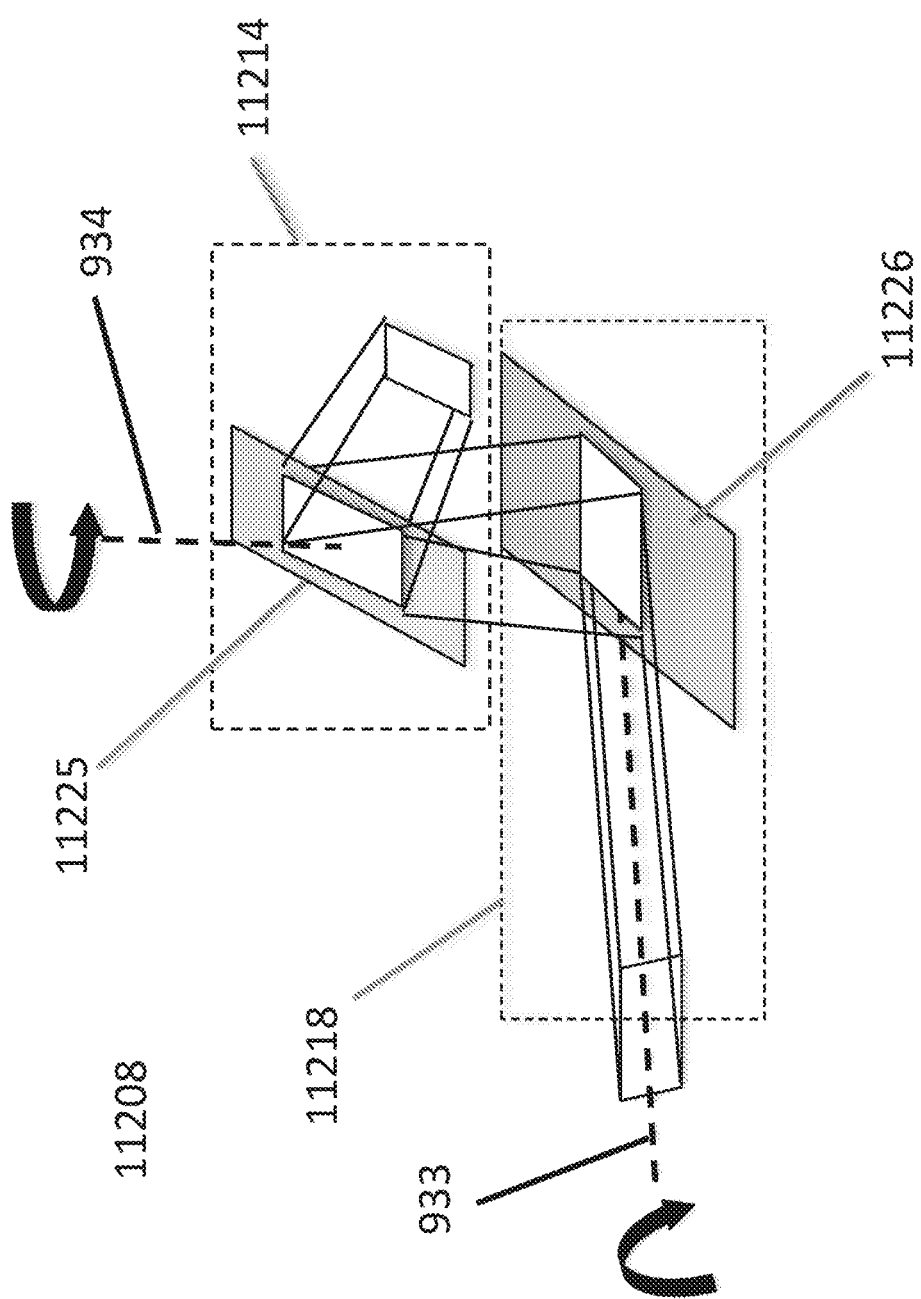

FIG. 113 illustrates an optics module with twisted reflective surfaces in accordance with the principles of the present disclosure.

Figure 114:
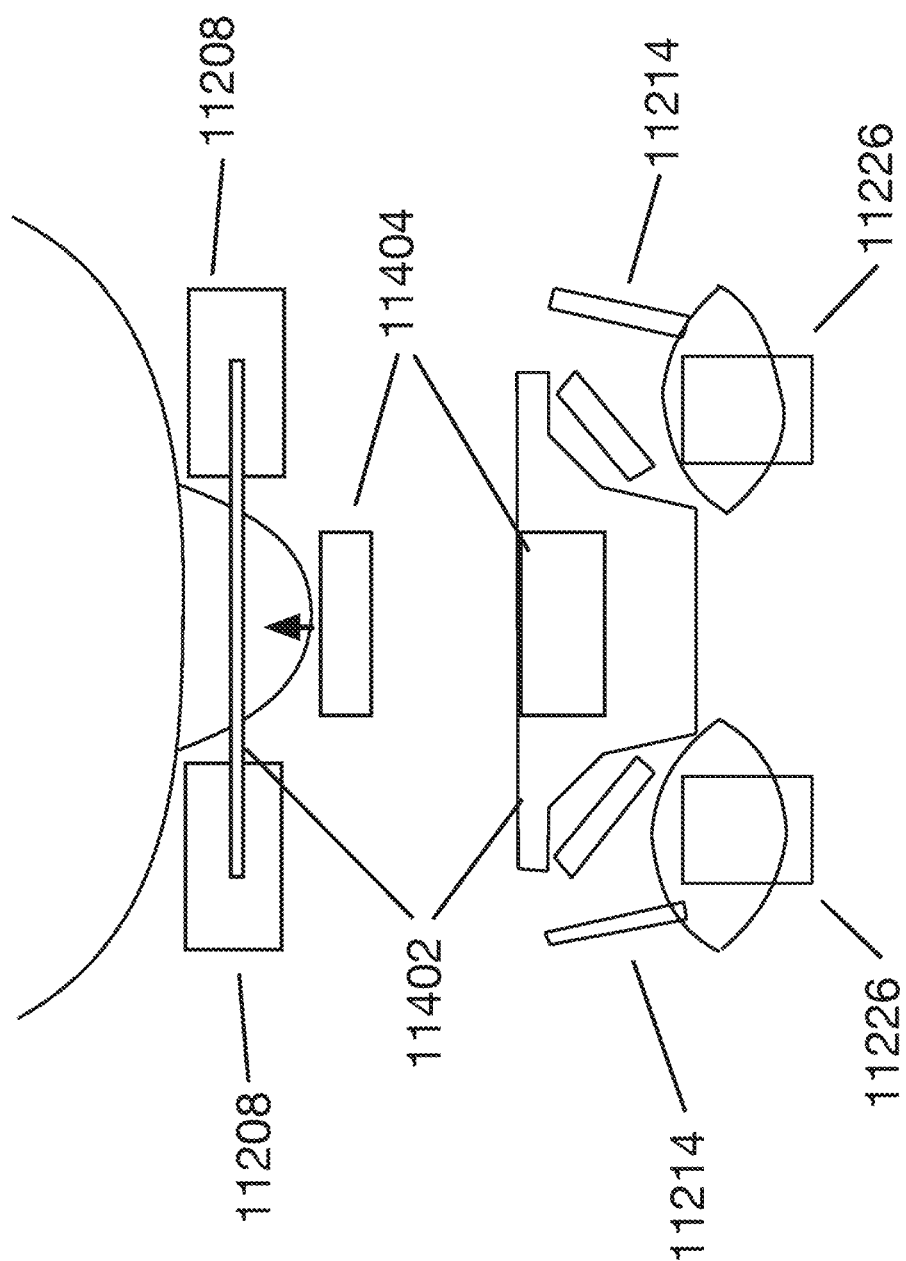

FIG. 114 illustrates PCB and see-through optics module positions within a glasses form factor in accordance with the principles of the present disclosure.

Figure 115:
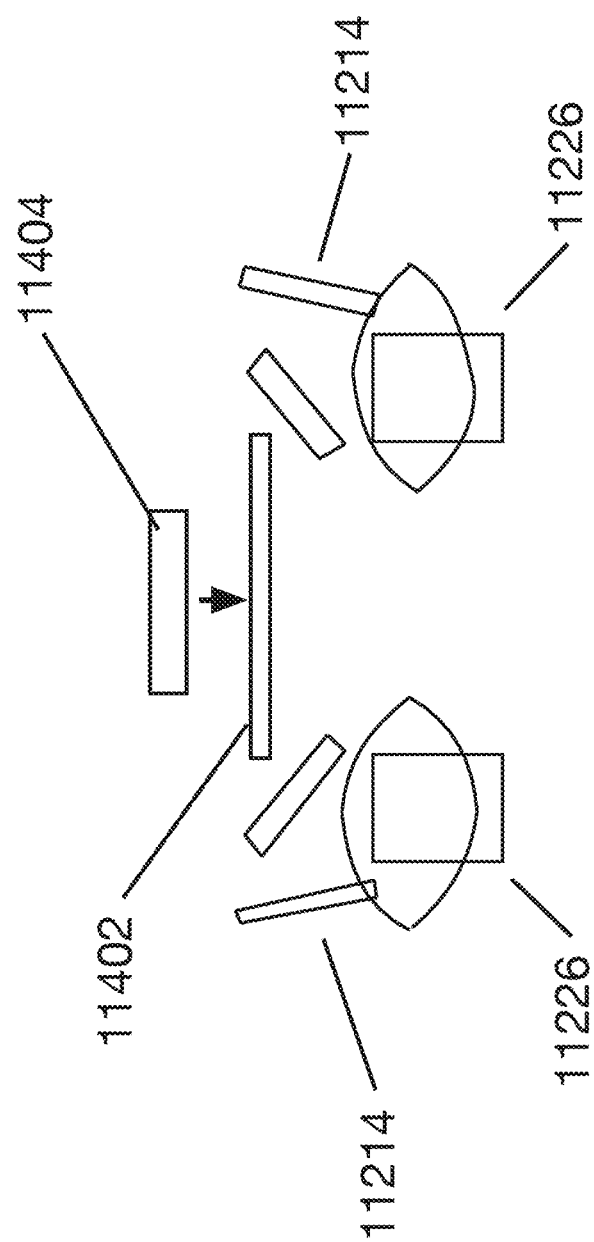

FIG. 115 illustrates PCB and see-through optics module positions within a glasses form factor in accordance with the principles of the present disclosure.

Figure 116:
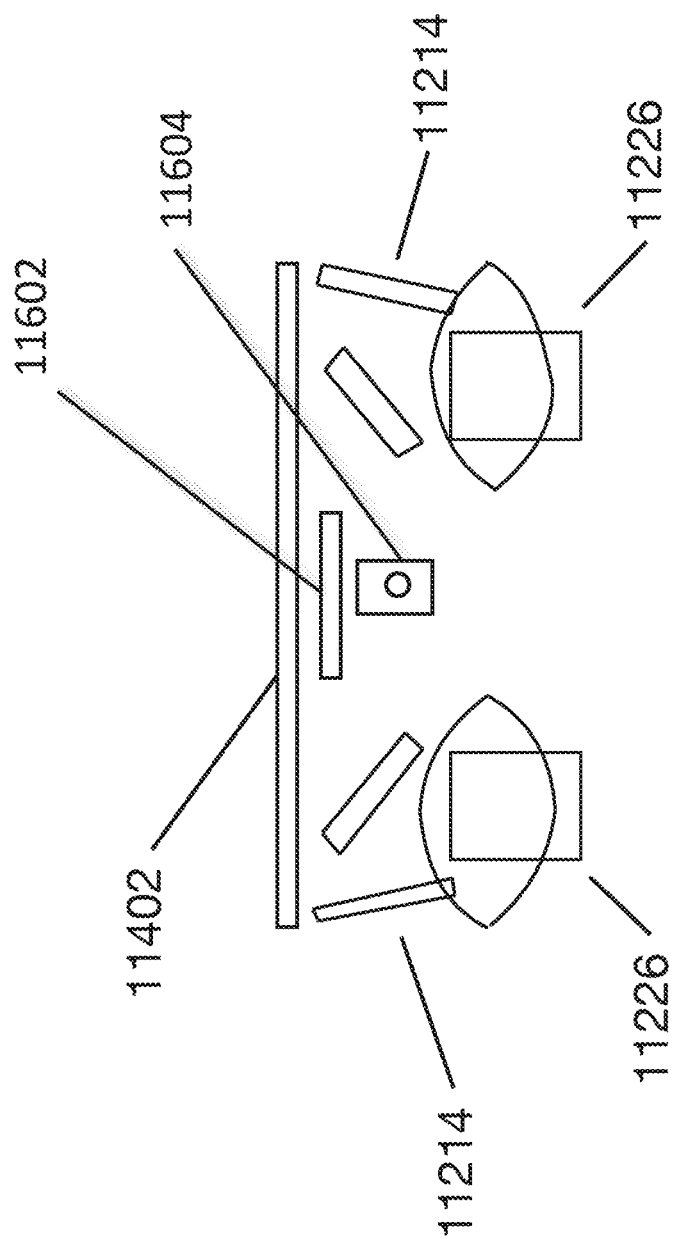

FIG. 116 illustrates PCB and see-through optics module positions within a glasses form factor in accordance with the principles of the present disclosure.

Figure 117:
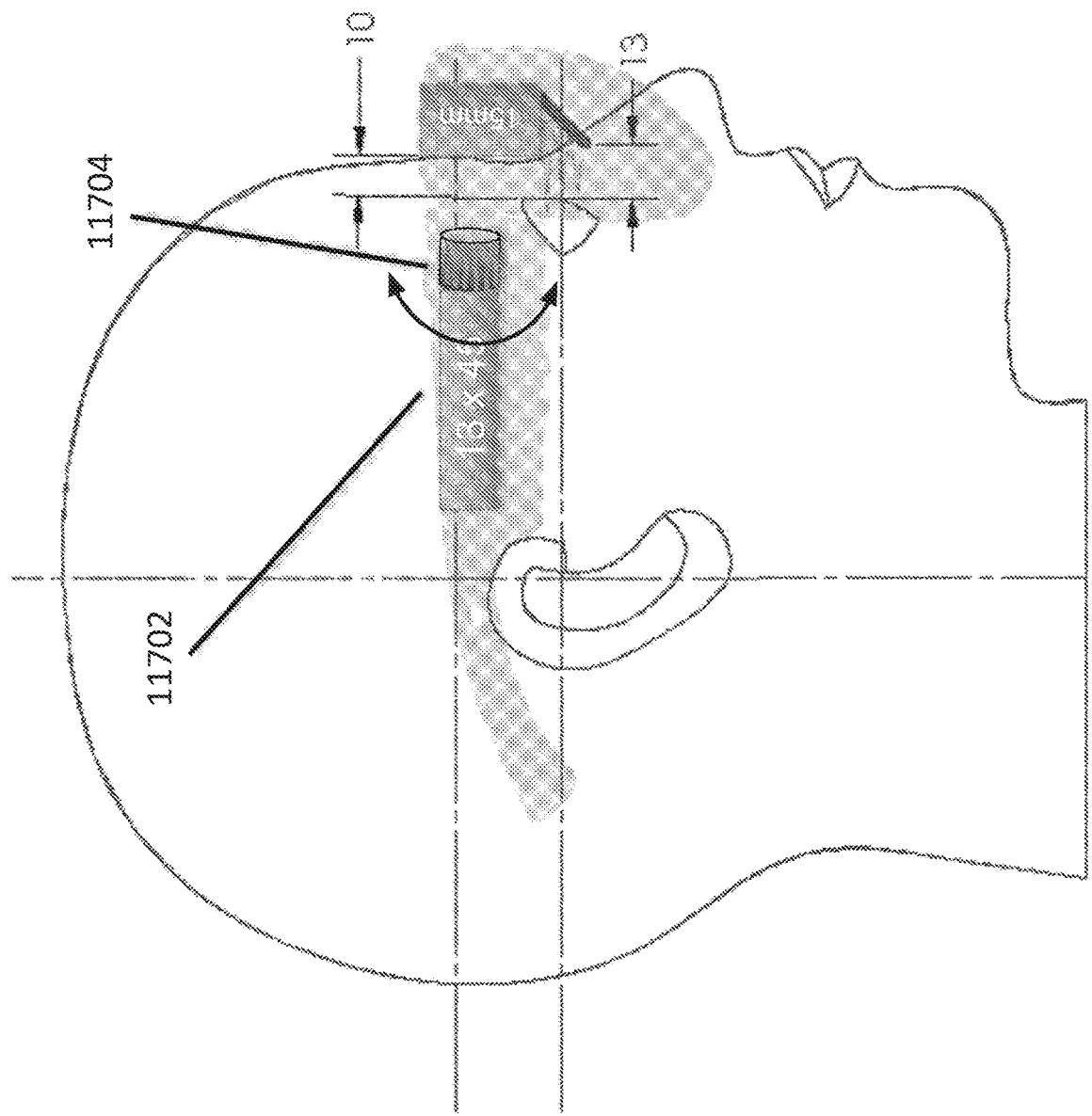

FIG. 117 illustrates a user interface in accordance with the principles of the present disclosure.

Figure 118:
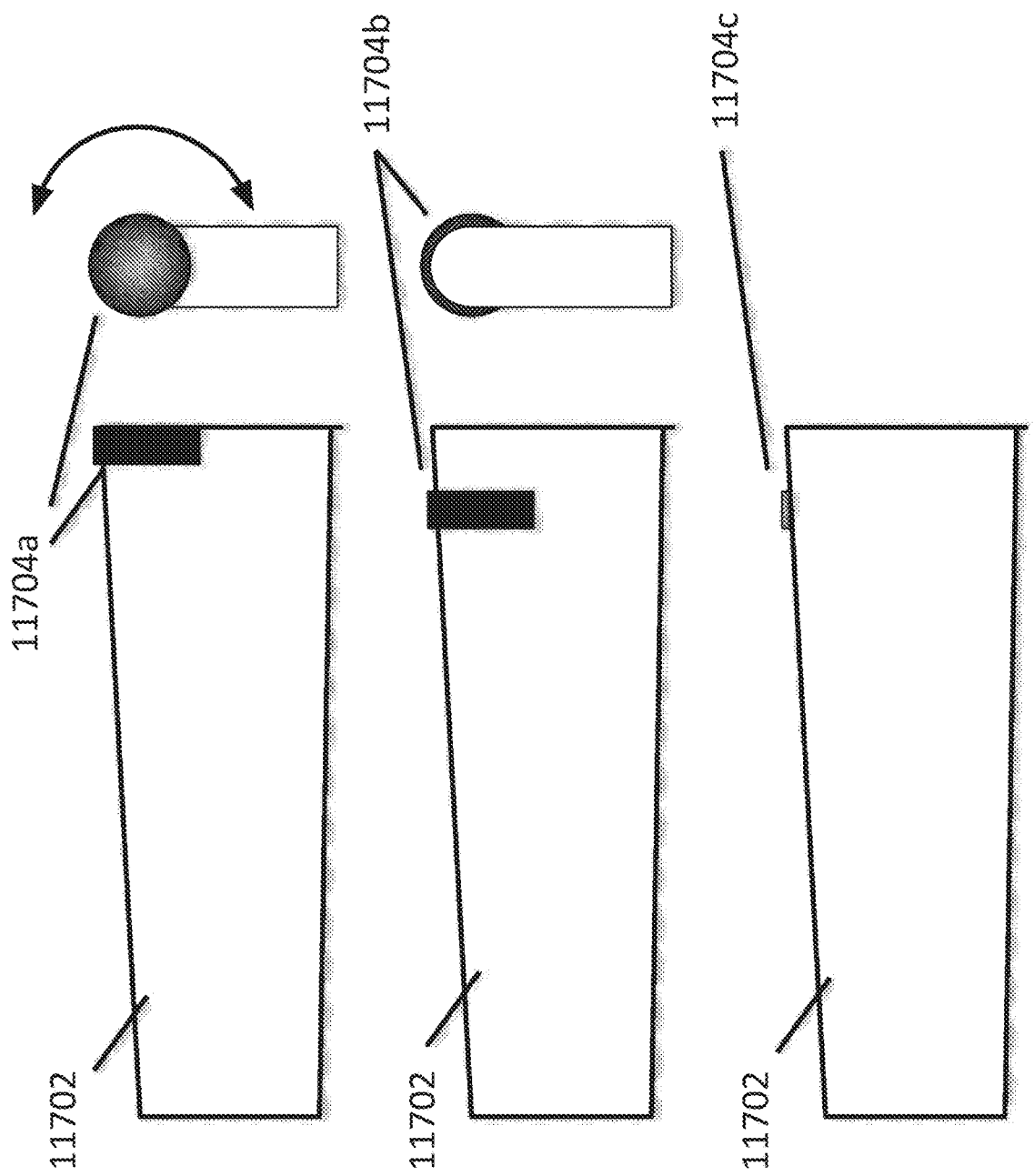

FIG. 118 illustrates a user interface in accordance with the principles of the present disclosure.

Figure 119:
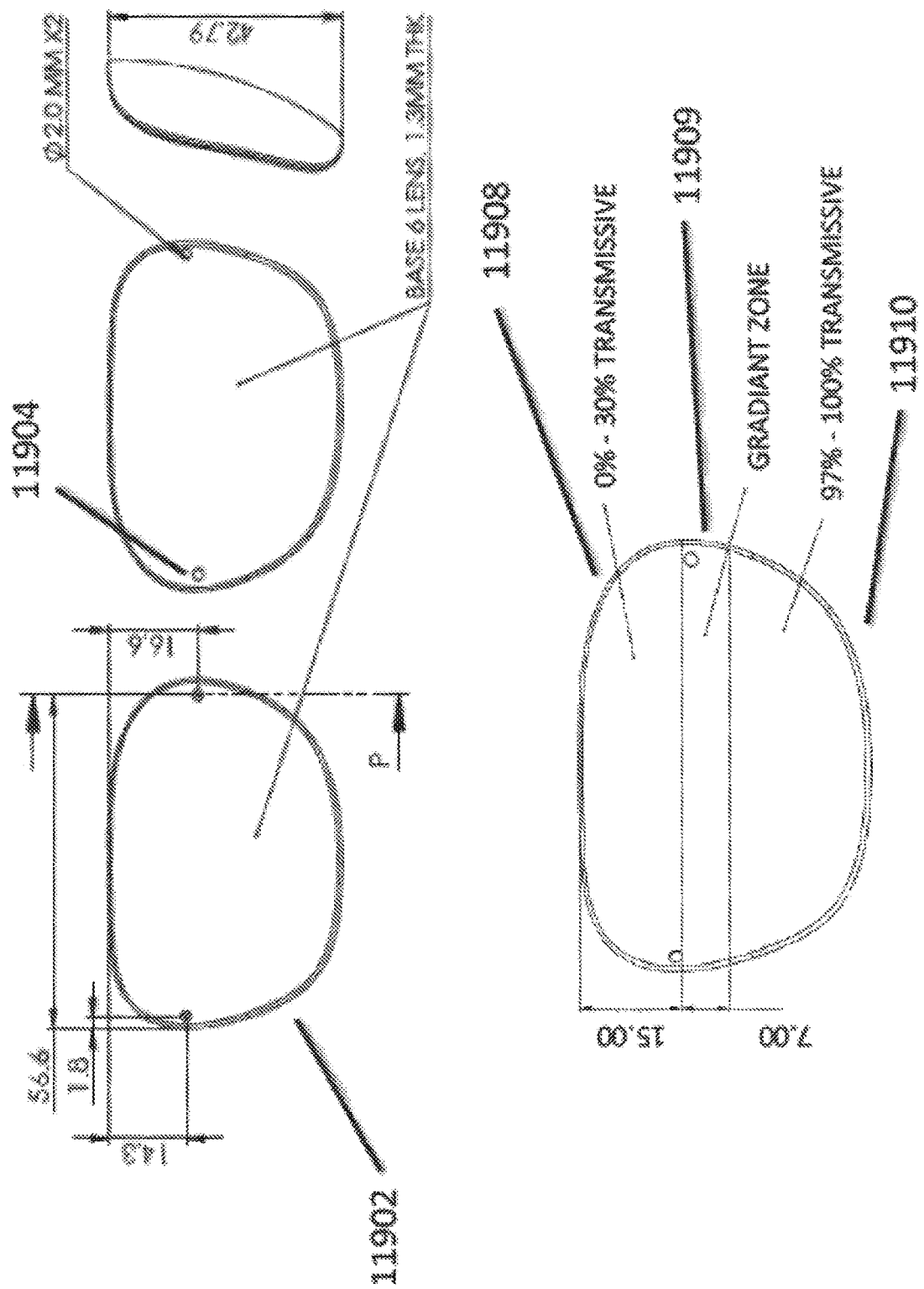

FIG. 119 illustrates a lens arrangement in accordance with the principles of the present disclosure.

Figure 120:
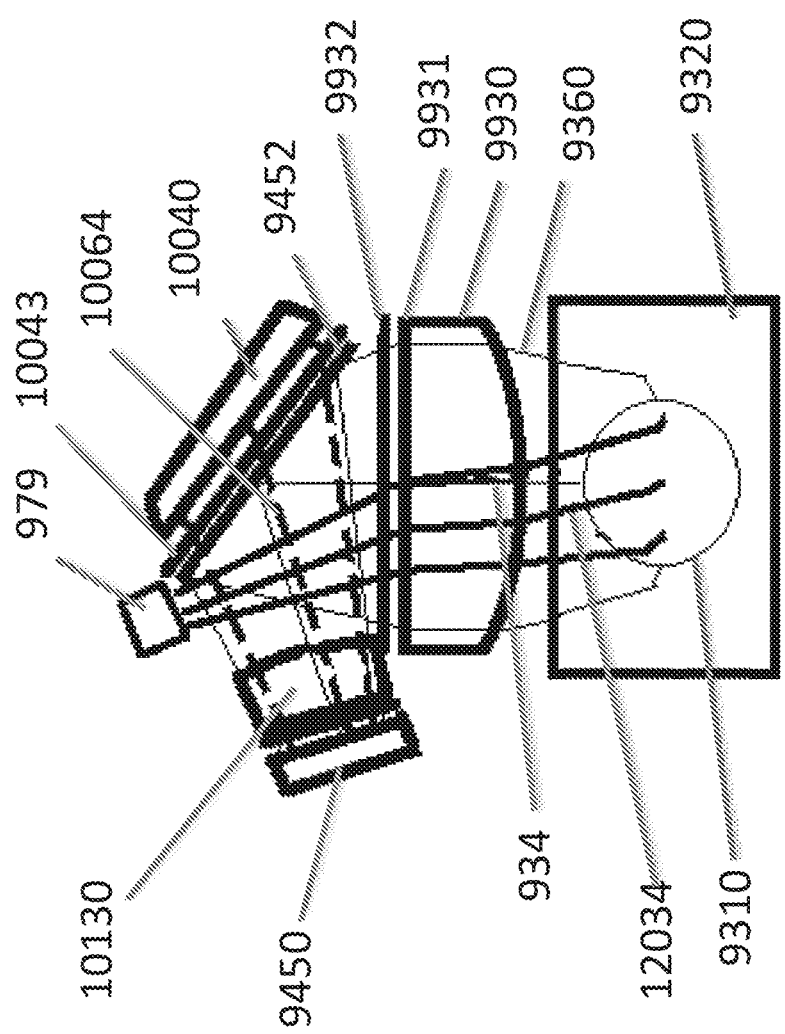
Figure 121:
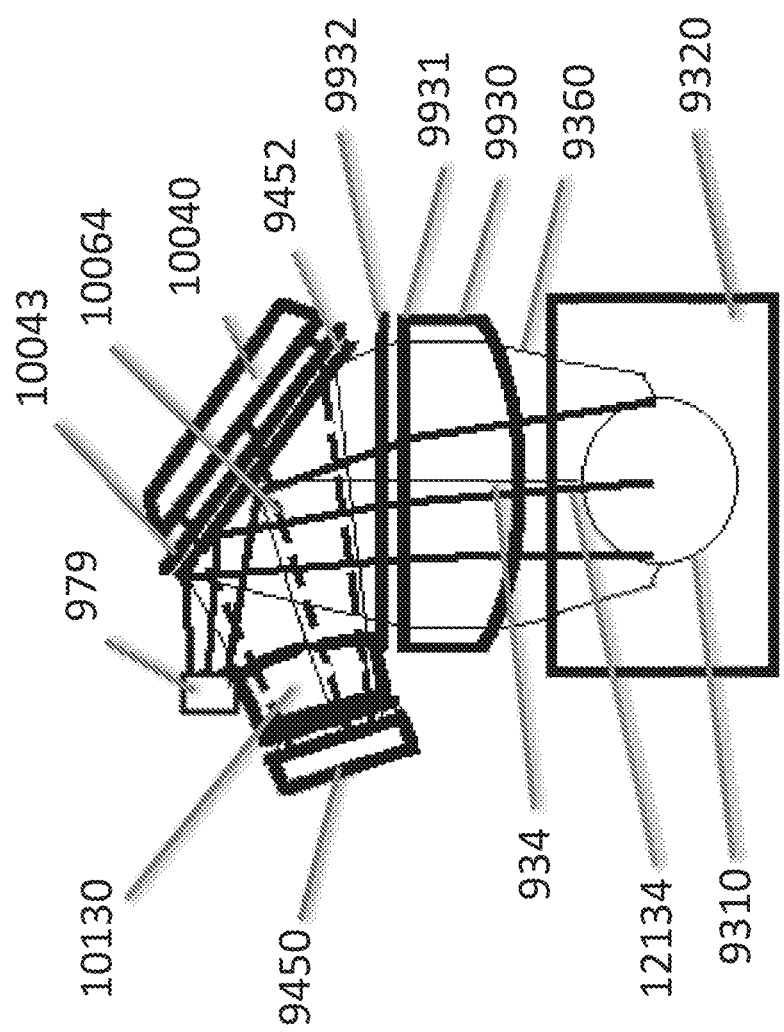

FIGS. 120 and 121 illustrate eye imaging systems in accordance with the principles of the present disclosure.

Figure 122:
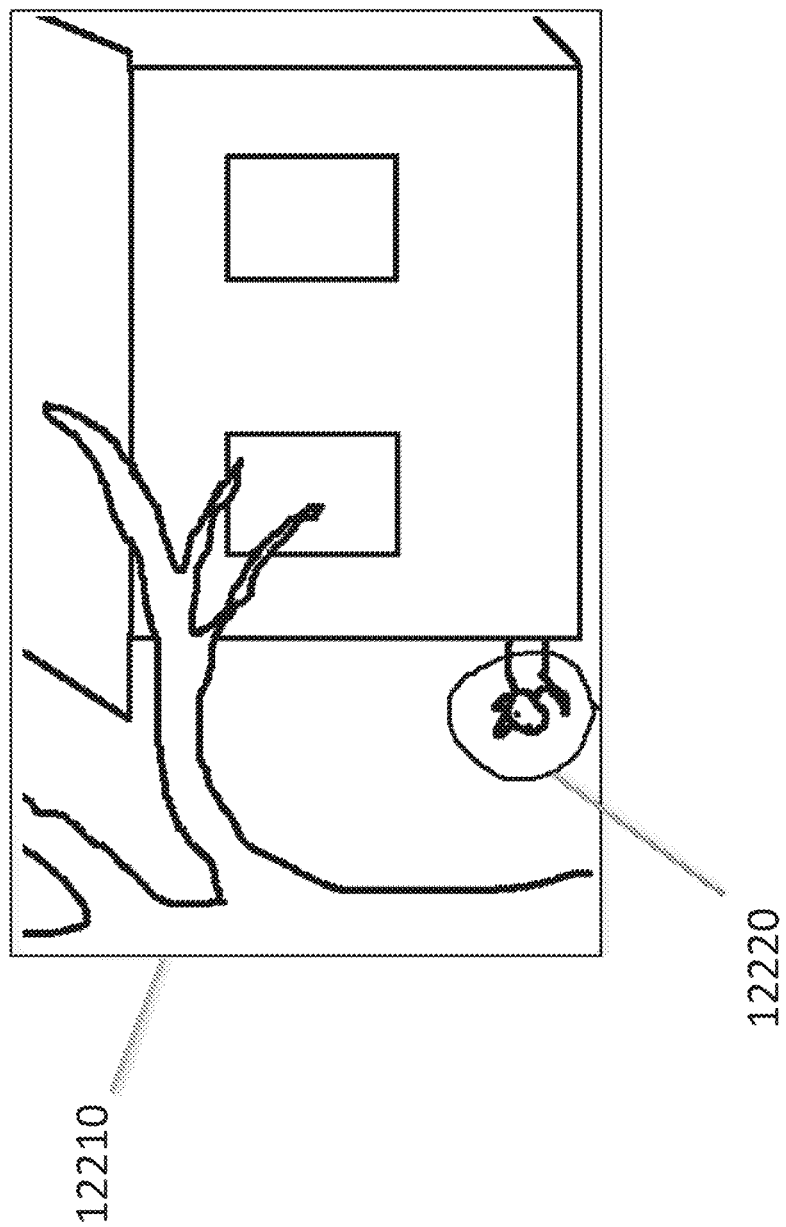

FIG. 122 illustrates an identification process in accordance with the principles of the present disclosure.

Figure 123:
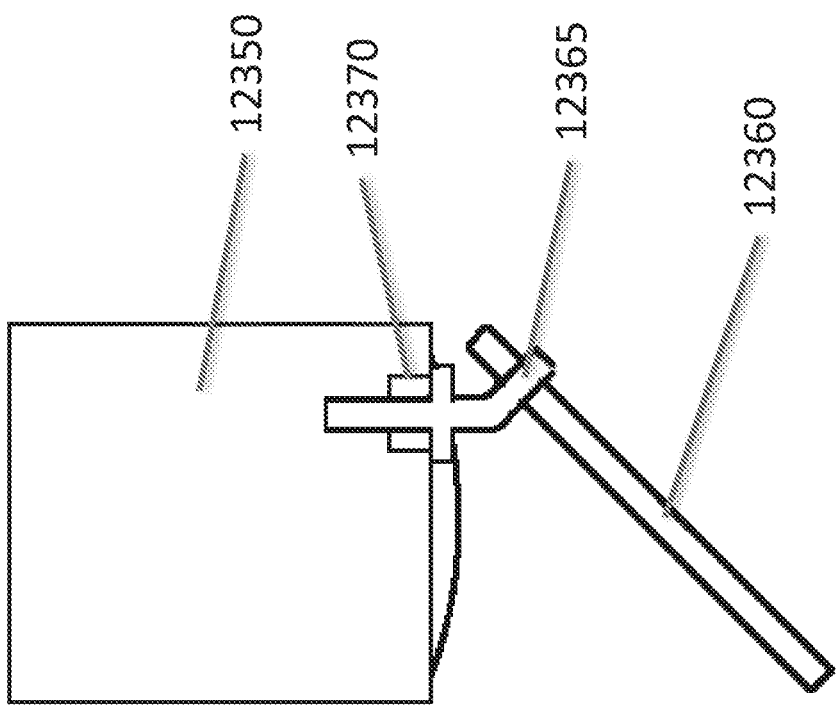
Figure 124:
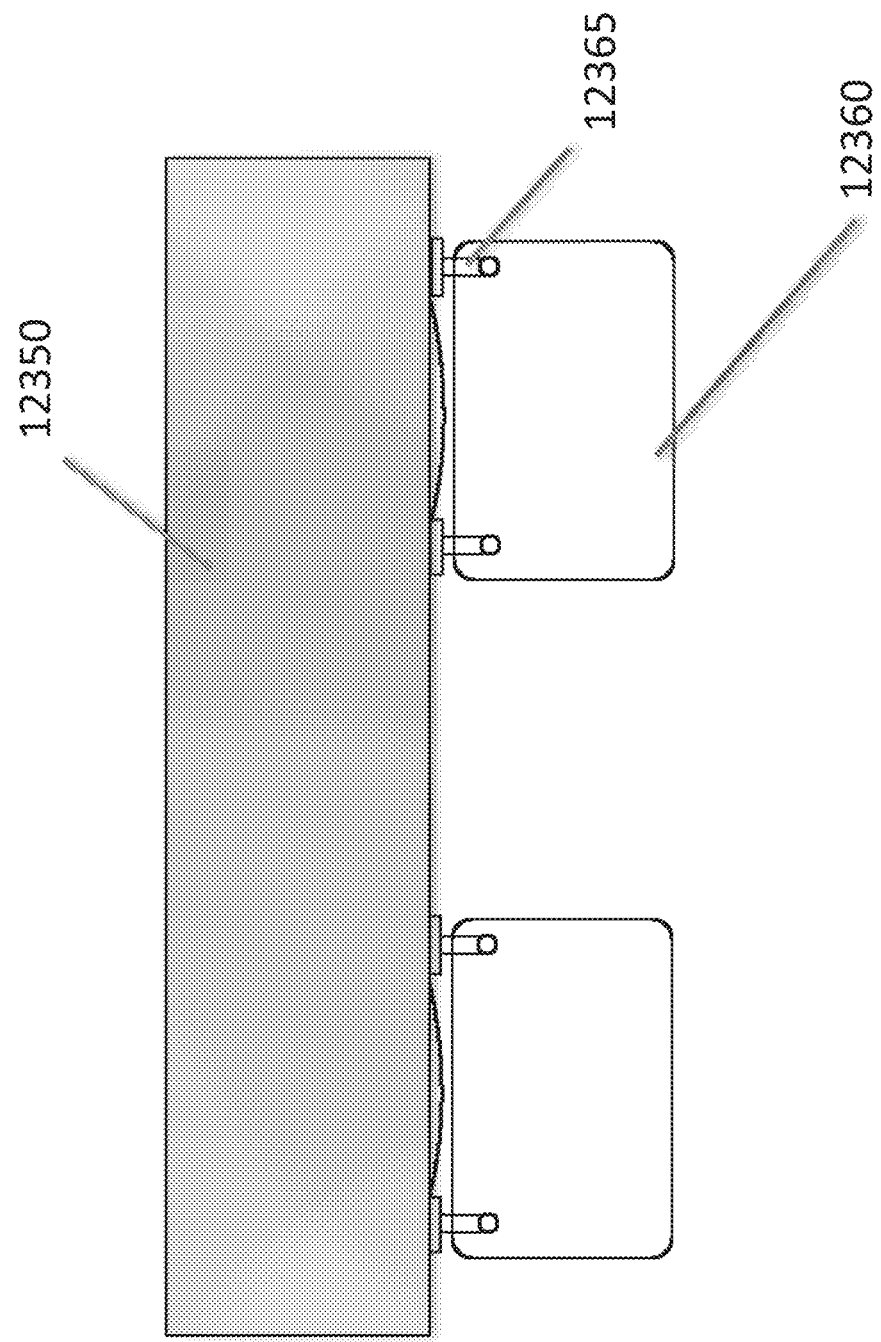

FIGS. 123 and 124 illustrate combiner assemblies in accordance with the principles of the present disclosure.

Figure 125:
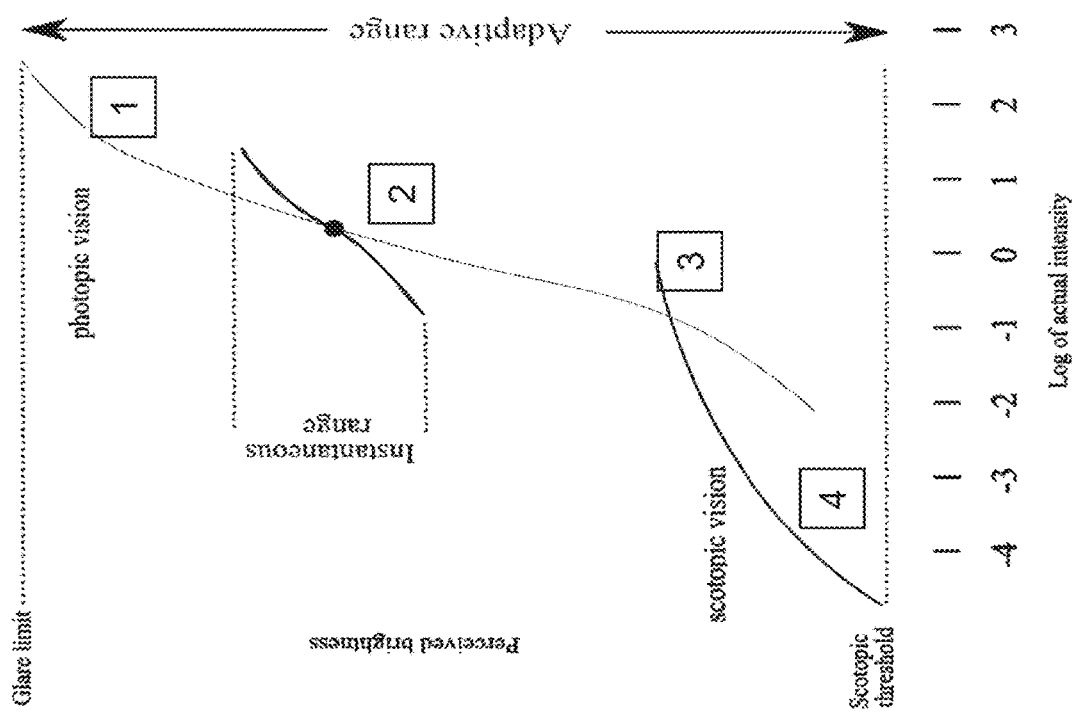

FIG. 125 shows a chart of the sensitivity of the human eye versus brightness.

Figure 126:
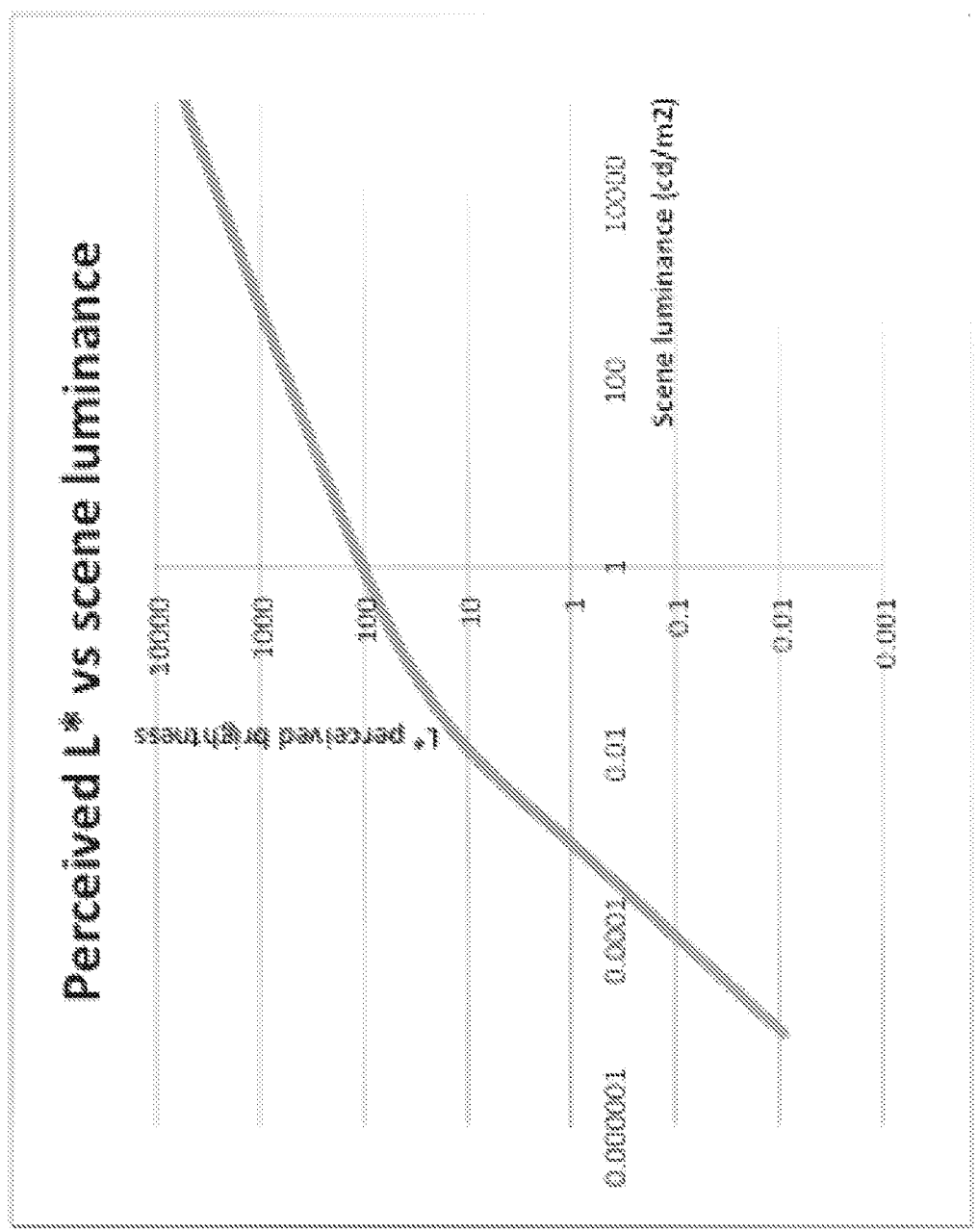

FIG. 126 is a chart that shows the brightness (L*) perceived by the human eye relative to a measured brightness (luminance) of a scene.

Figure 127:
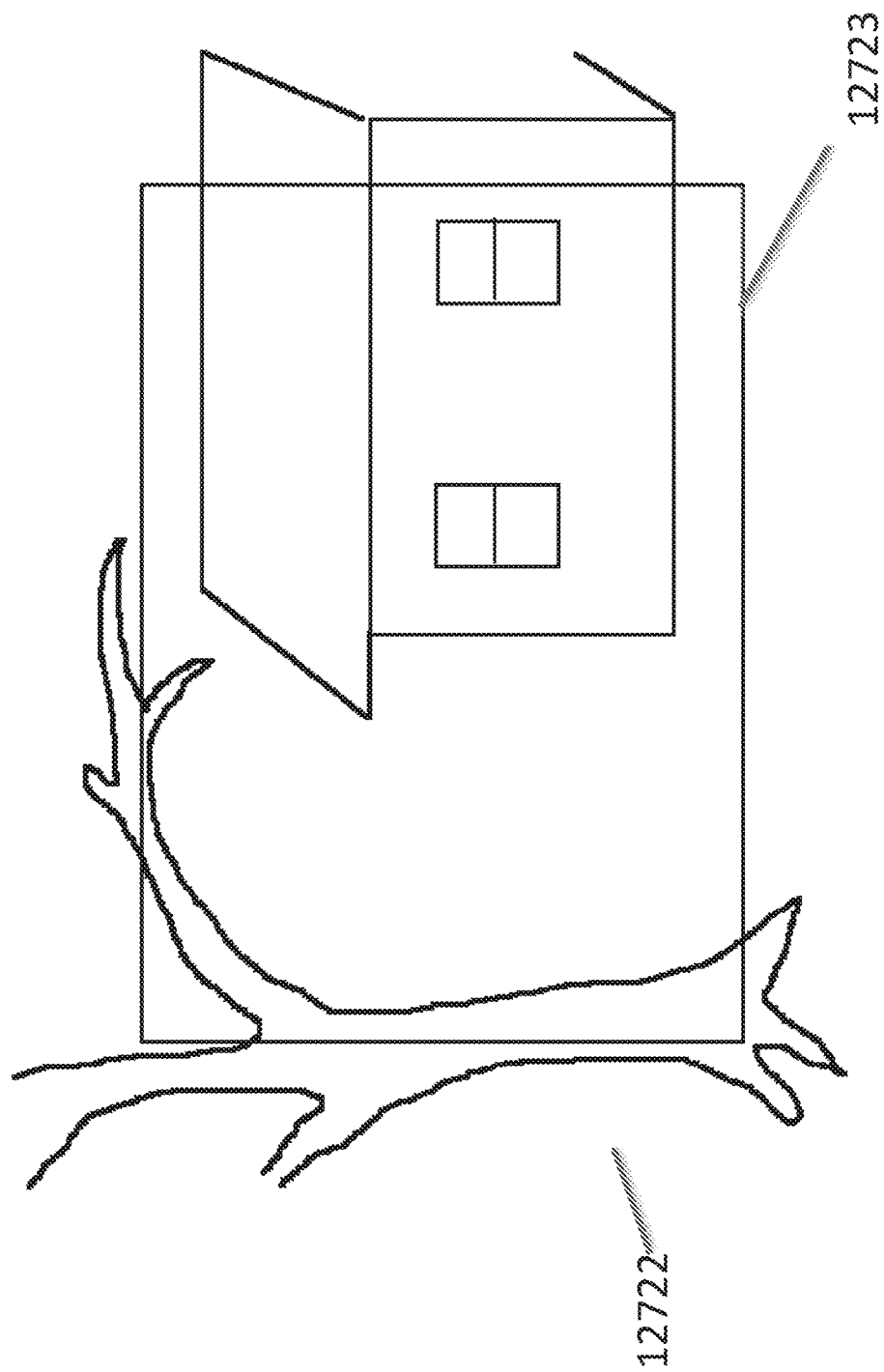

FIG. 127 is illustration of a see-through view of the surrounding environment with an outline showing the display field of view being smaller than the see-through field of view as is typical.

Figure 128:
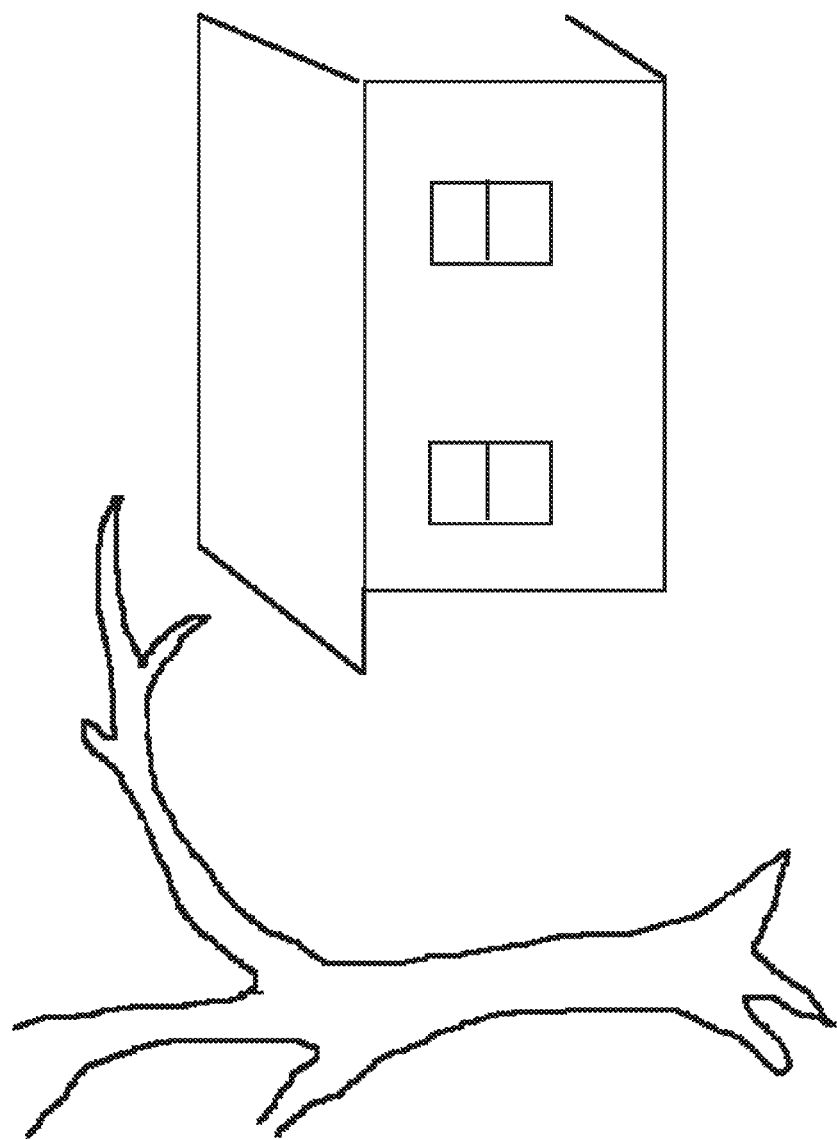

FIG. 128 is an illustration of a captured image of the surrounding environment which can be a substantially larger field of view than the displayed image so that a cropped version of the captured image of the environment can be used for the alignment process.

Figure 129B:
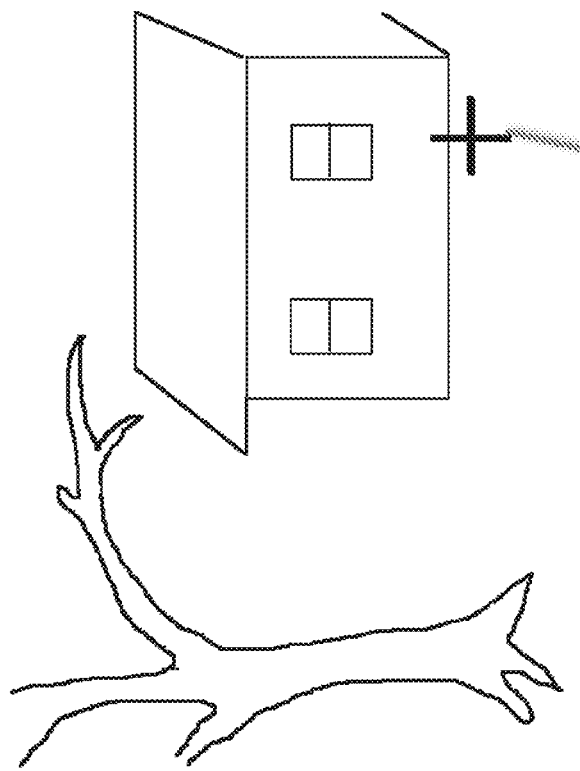
Figure 129A:
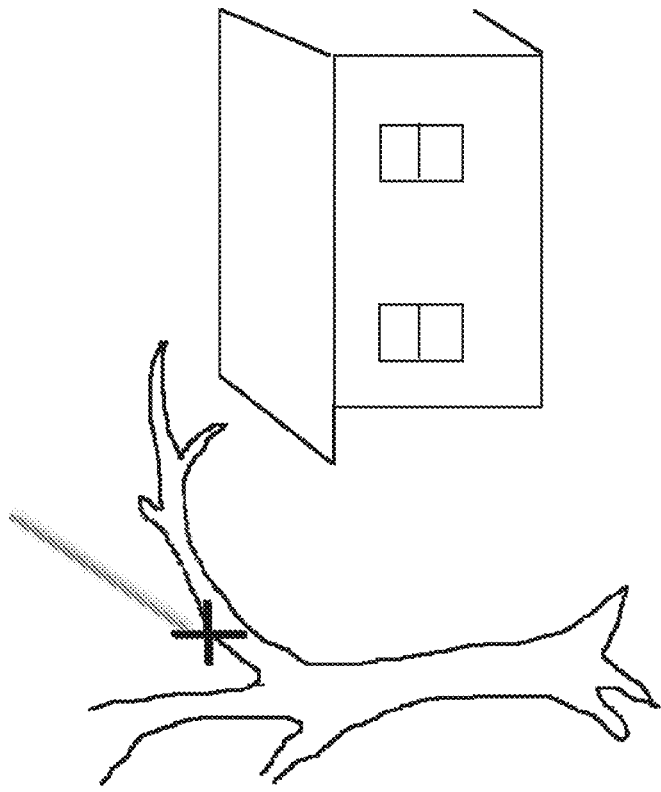

FIGS. 129a and 129b illustrate first and second target images with invisible markers.

Figure 130:
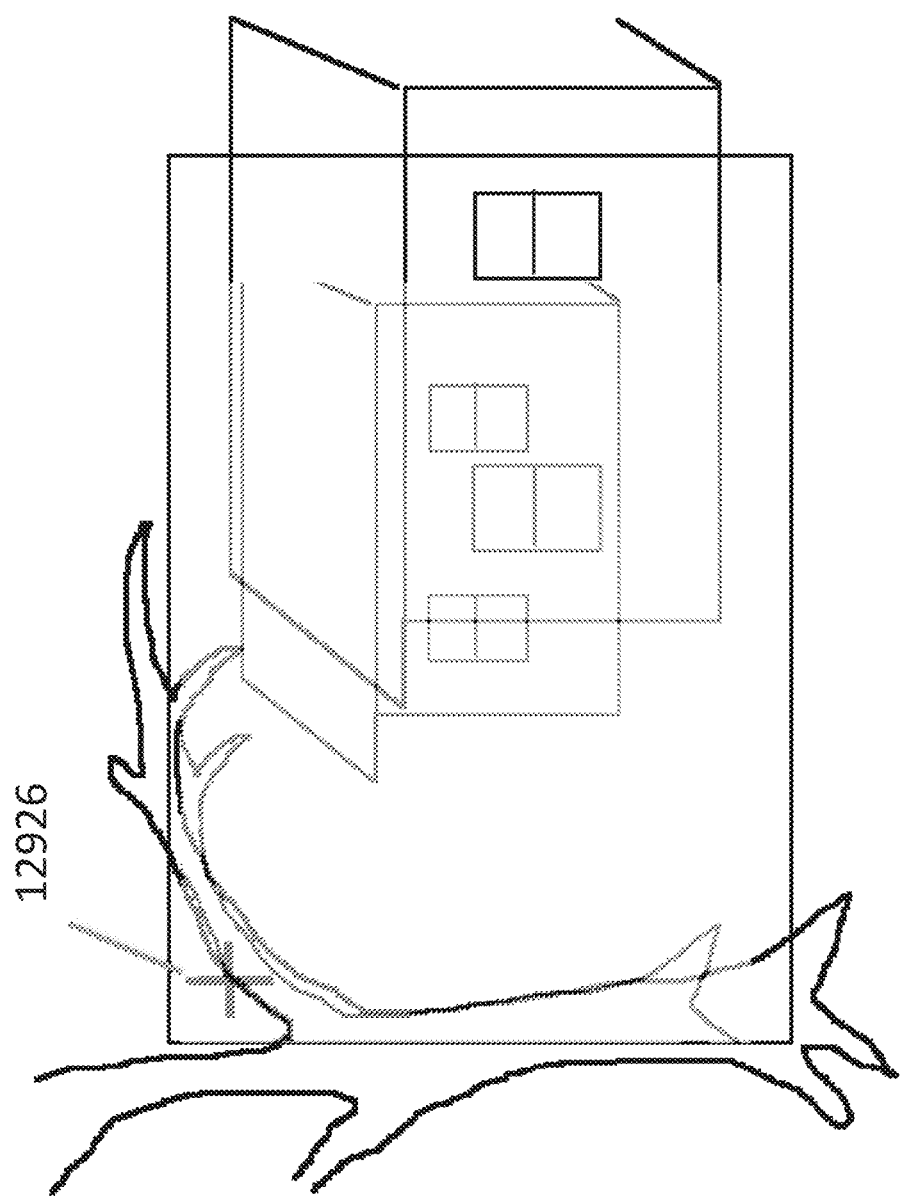
Figure 131:
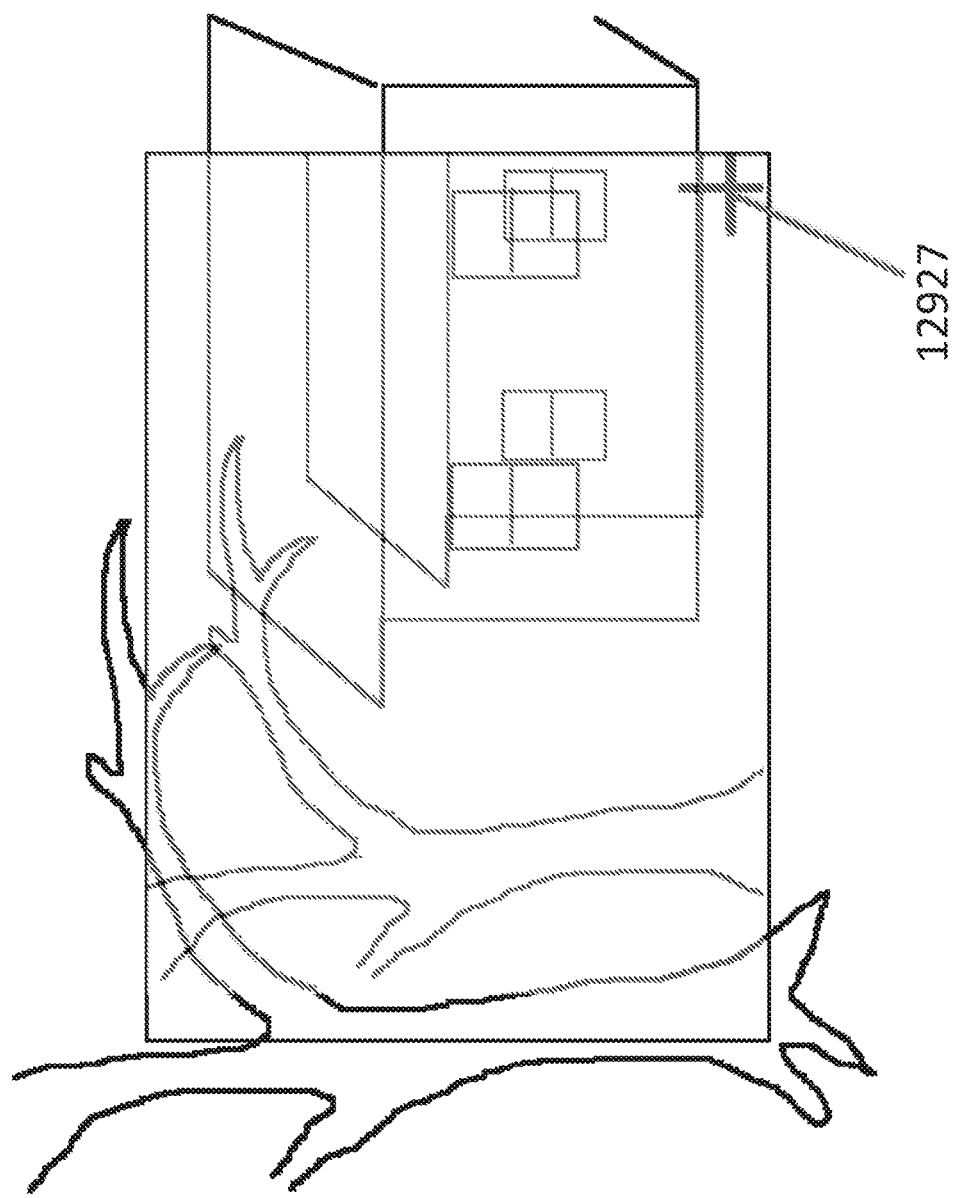

FIGS. 130 and 131 illustrate targets overlaid onto a see-through view, wherein the target is moved using eye tracking control, in accordance with the principles of the present disclosure.

Figure 132:
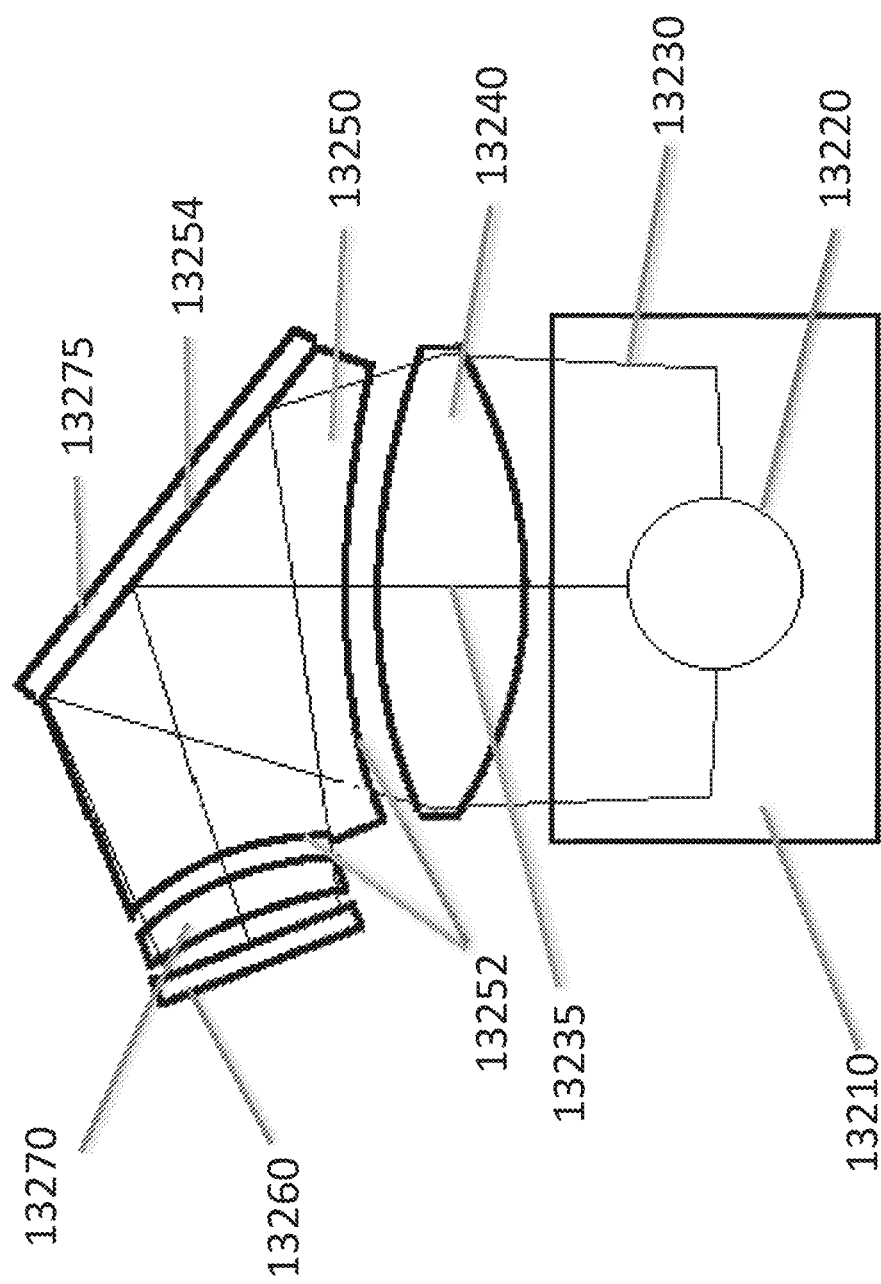

FIG. 132 shows an illustration of multiply folded optics for a head worn display that includes a solid prism in accordance with the principles of the present disclosure.

Figures 133A, 133B, 133C:
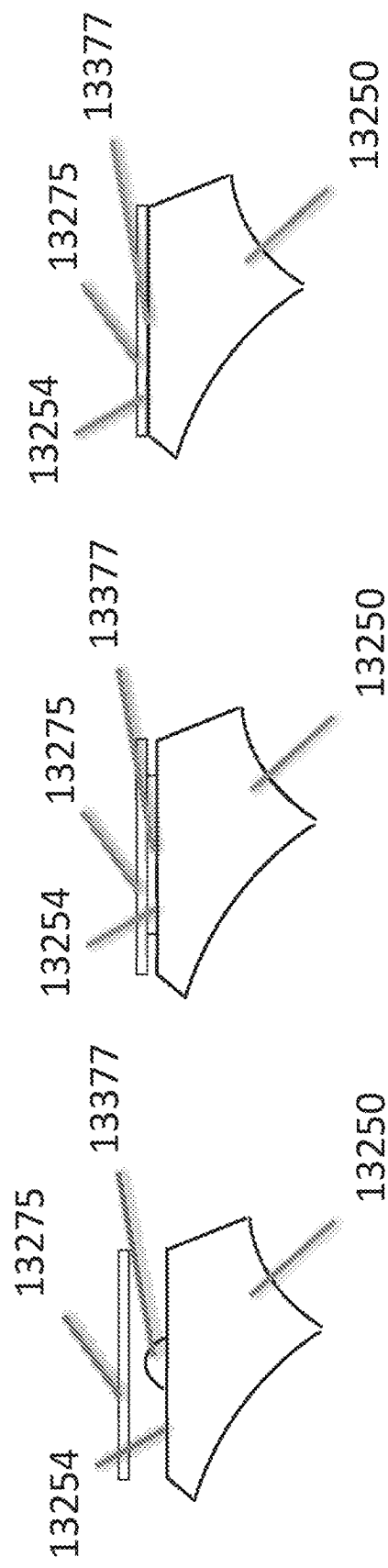

FIGS. 133a, 133b and 133c show illustrations of steps associated with bonding the reflective plate to the solid prism in accordance with the principles of the present disclosure.

Figure 134:
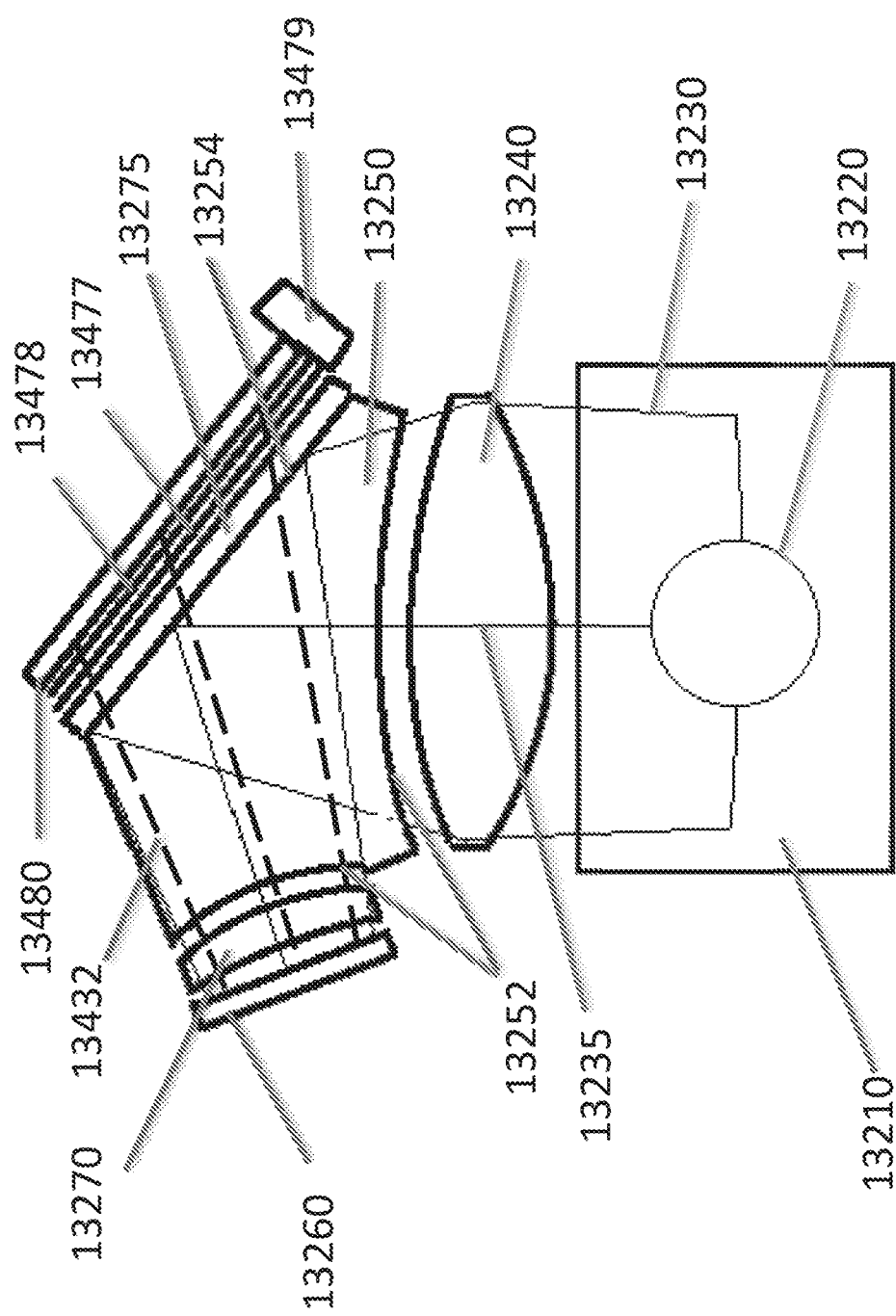

FIG. 134 shows an illustration of multiply folded optics for a reflective image source with a backlight assembly positioned behind the reflective plate in accordance with the principles of the present disclosure.

Figure 135:
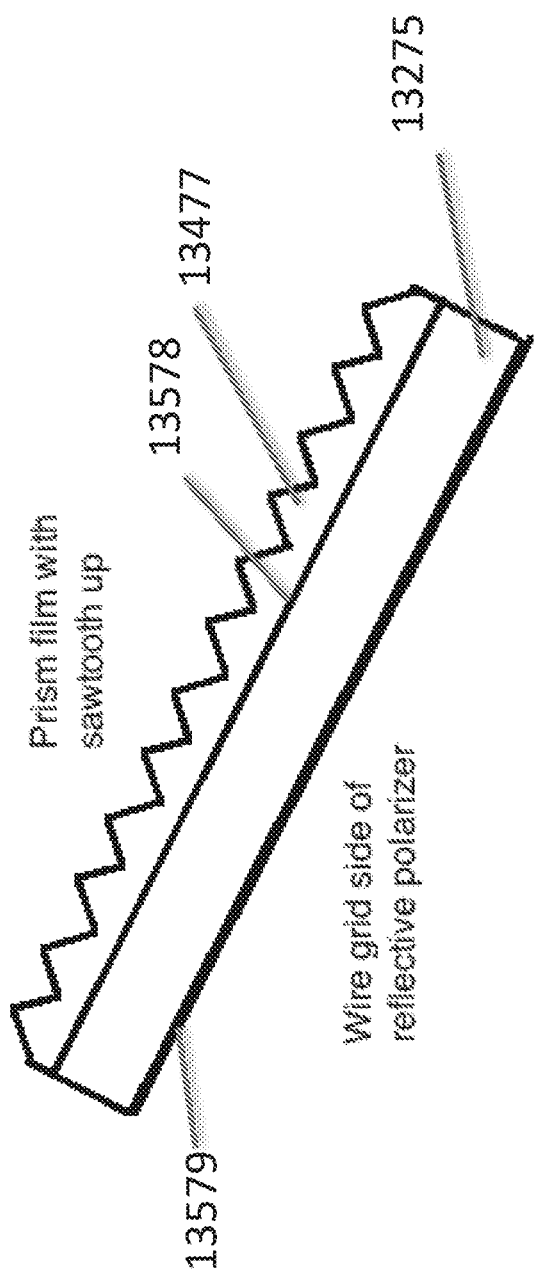

FIG. 135 shows an illustration of a prism film bonded to a reflective plate in accordance with the principles of the present disclosure.

Figure 135A:
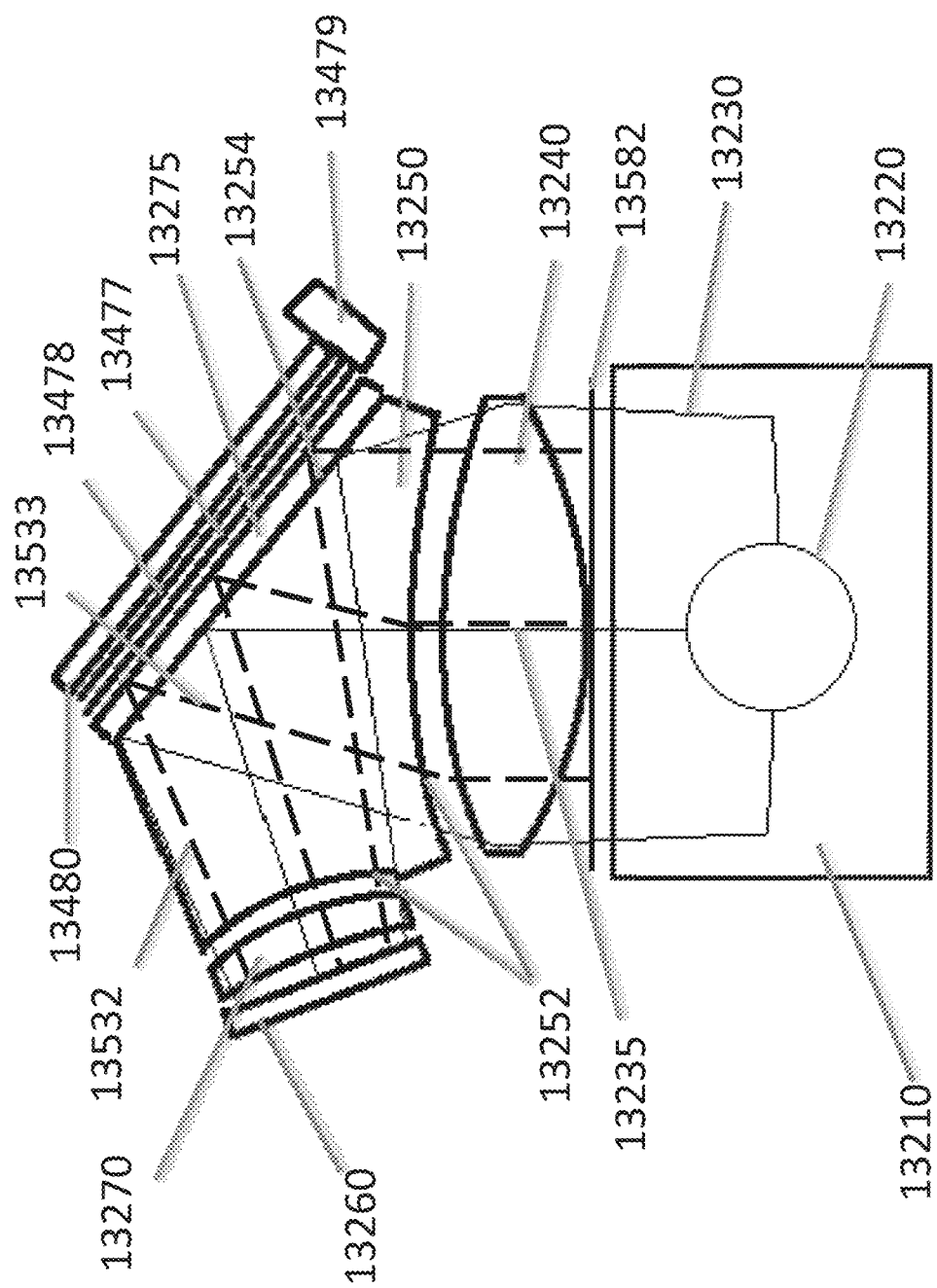

FIG. 135a shows an illustration of multiply folded optics in which two cones of illumination light provided by the prism film are shown in accordance with the principles of the present disclosure.

Figure 136:
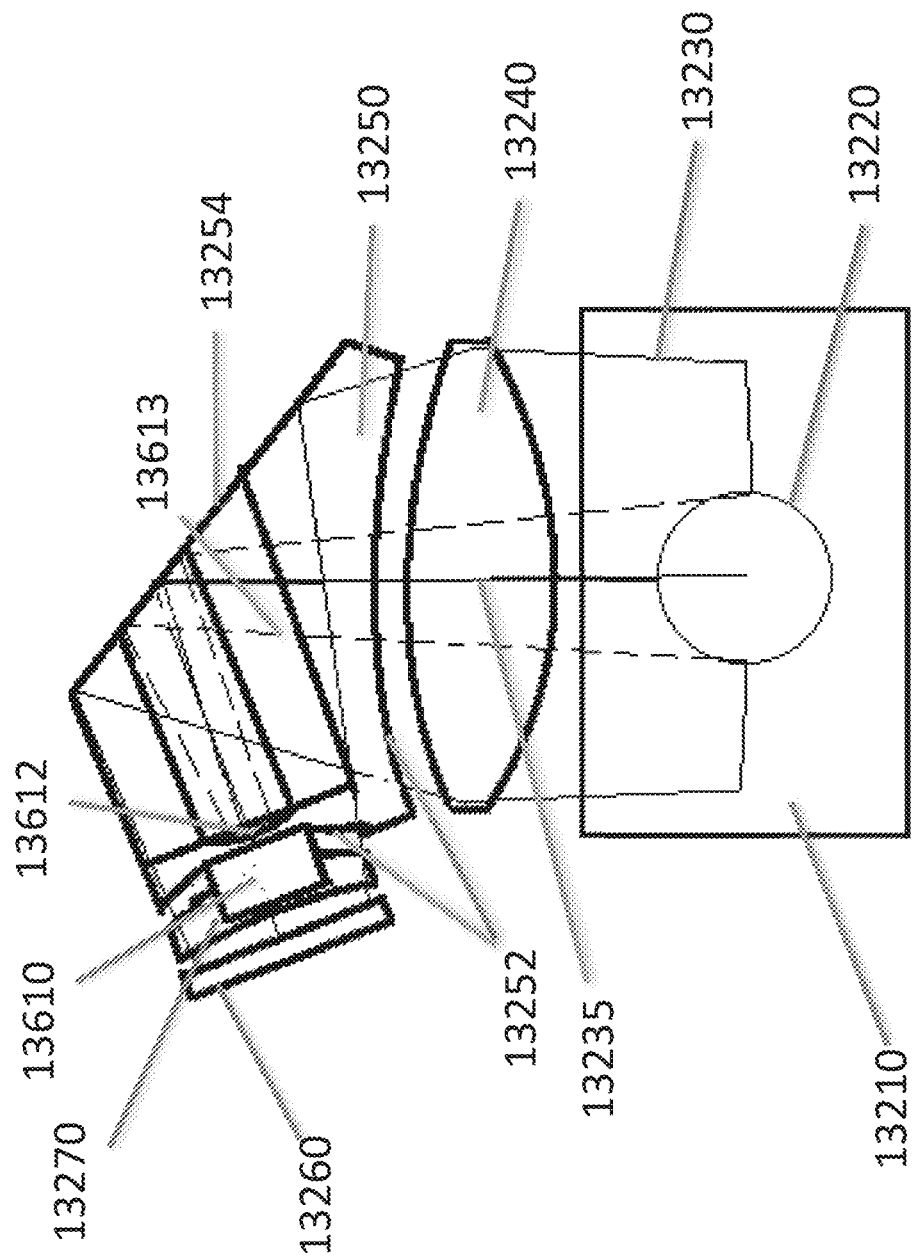
Figure 137:
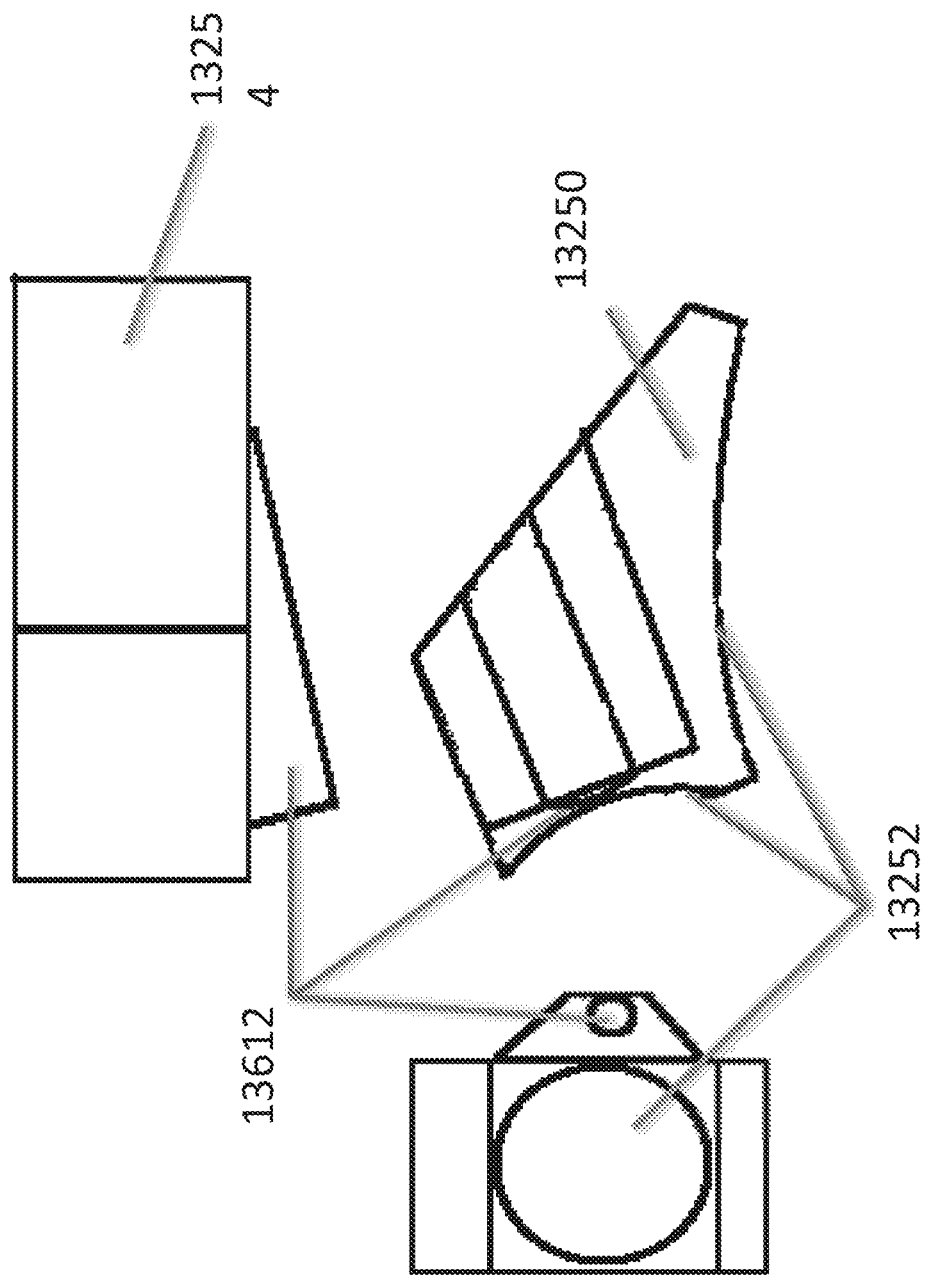
Figure 138:
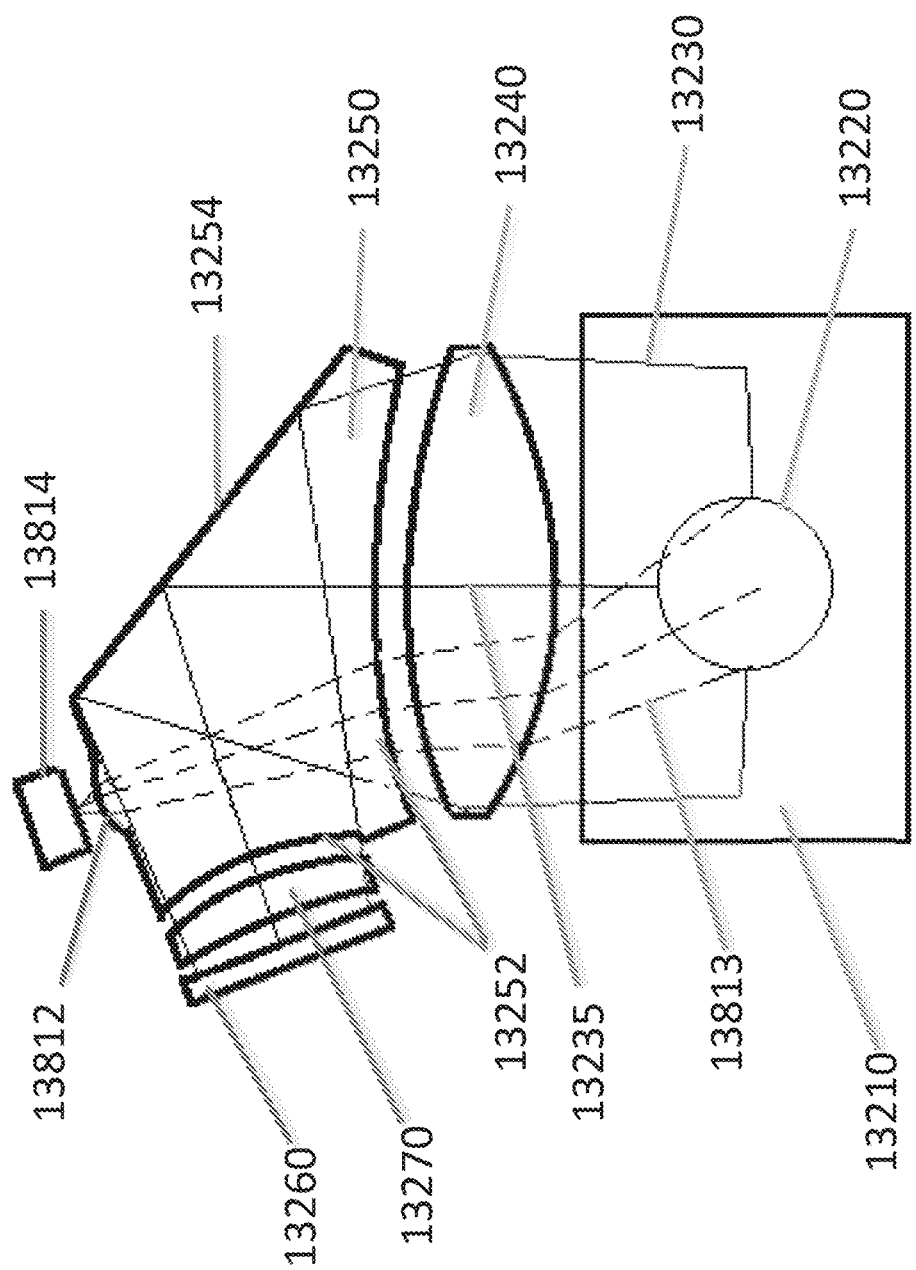

FIGS. 136, 137 and 138 show illustrations of different embodiments of additional optical elements included in the solid prism for imaging the eye of the user in accordance with the principles of the present disclosure.

Figure 139:
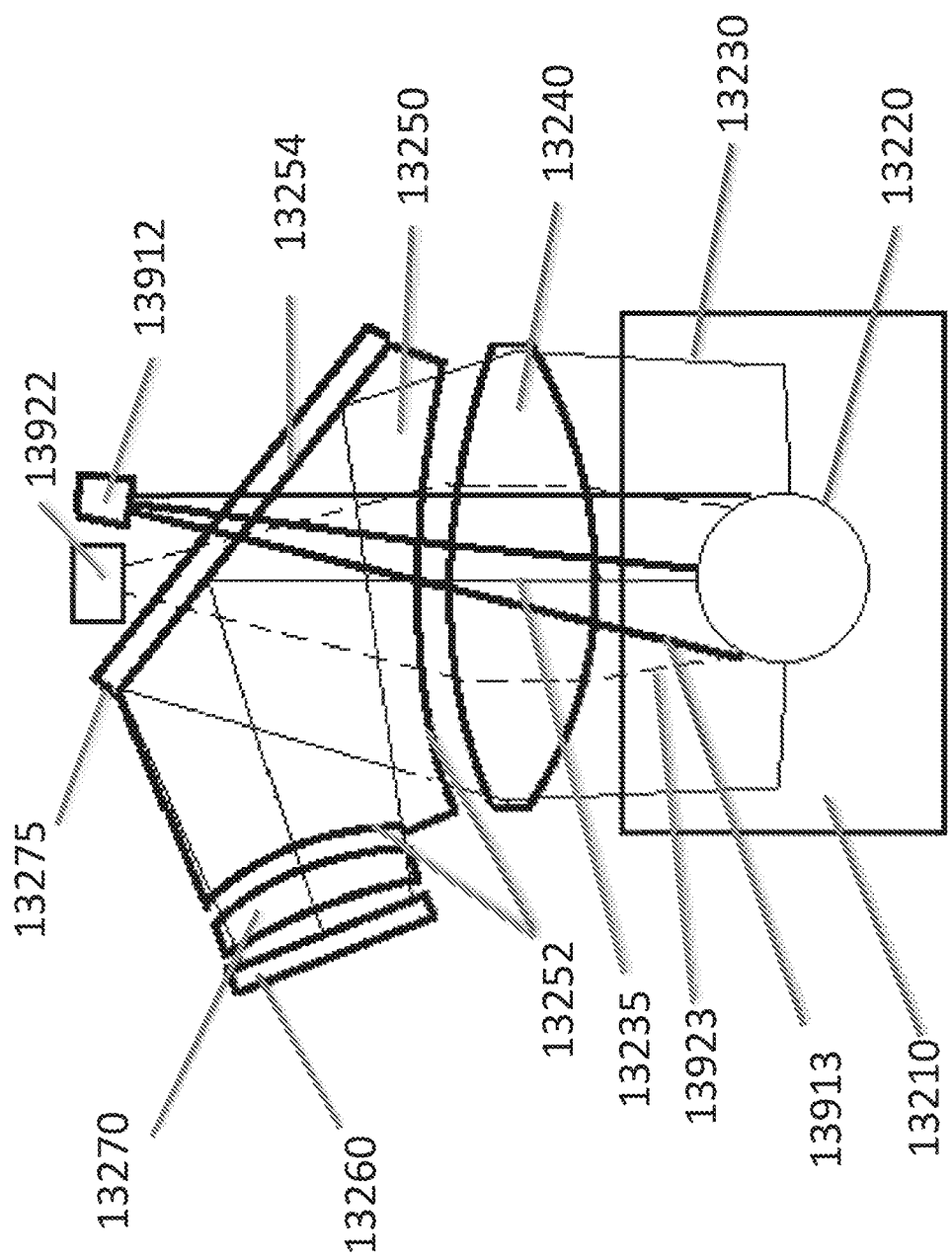

FIG. 139 shows an illustration of an eye imaging system for multiply folded optics in which the image source is a self-luminous display in accordance with the principles of the present disclosure.

FIGS. 140a and 140b are illustrations of an eye imaging system in accordance with the principles of the present disclosure.

Figure 141A:
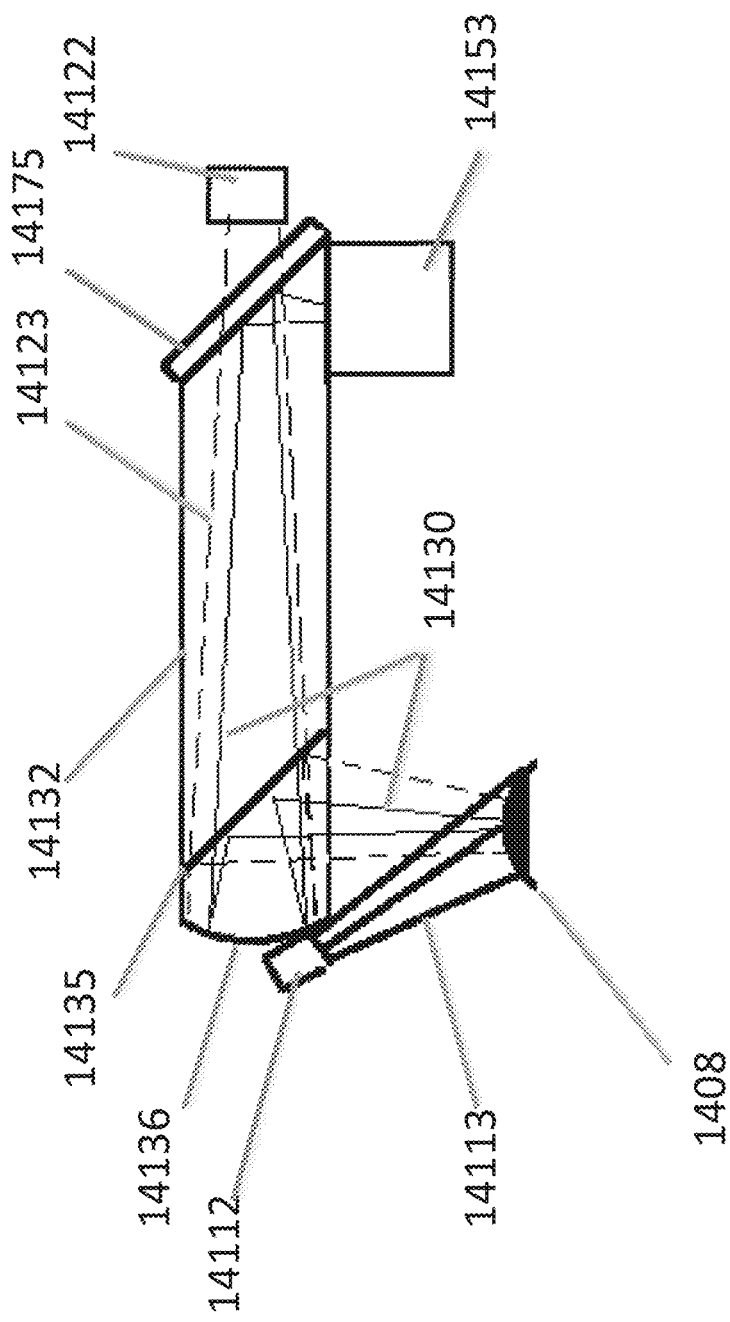
Figure 141B:
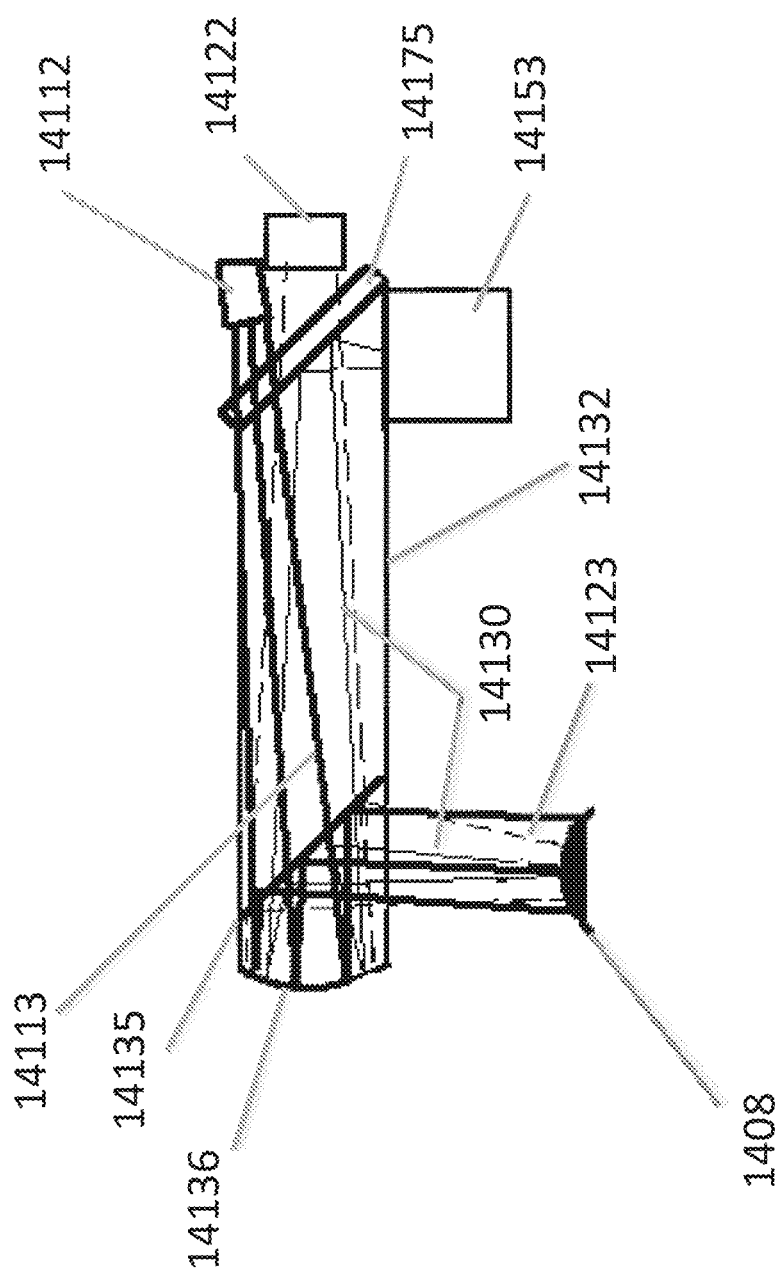

FIGS. 141a and 141b are illustrations of folded optics that include a waveguide with an angled partially reflective surface and a powered reflective surface in accordance with the principles of the present disclosure.

Figure 142A:
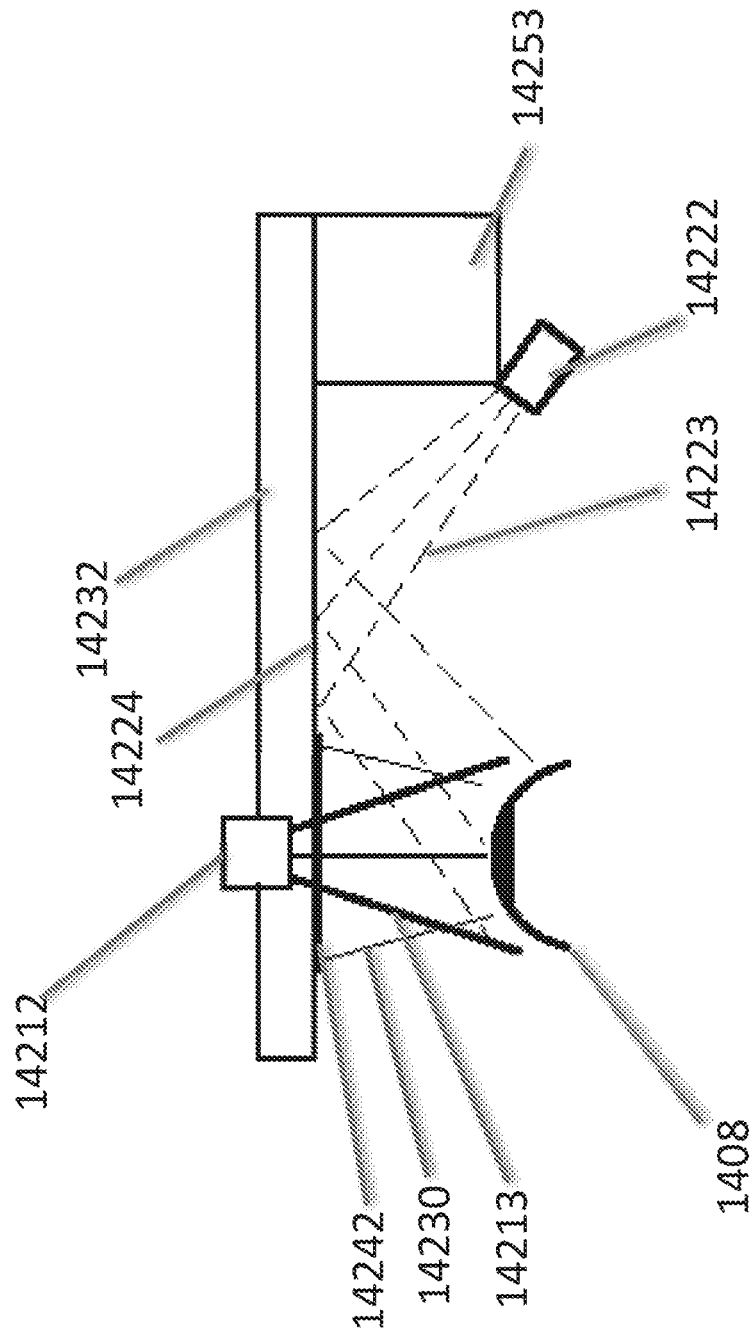
Figure 142B:
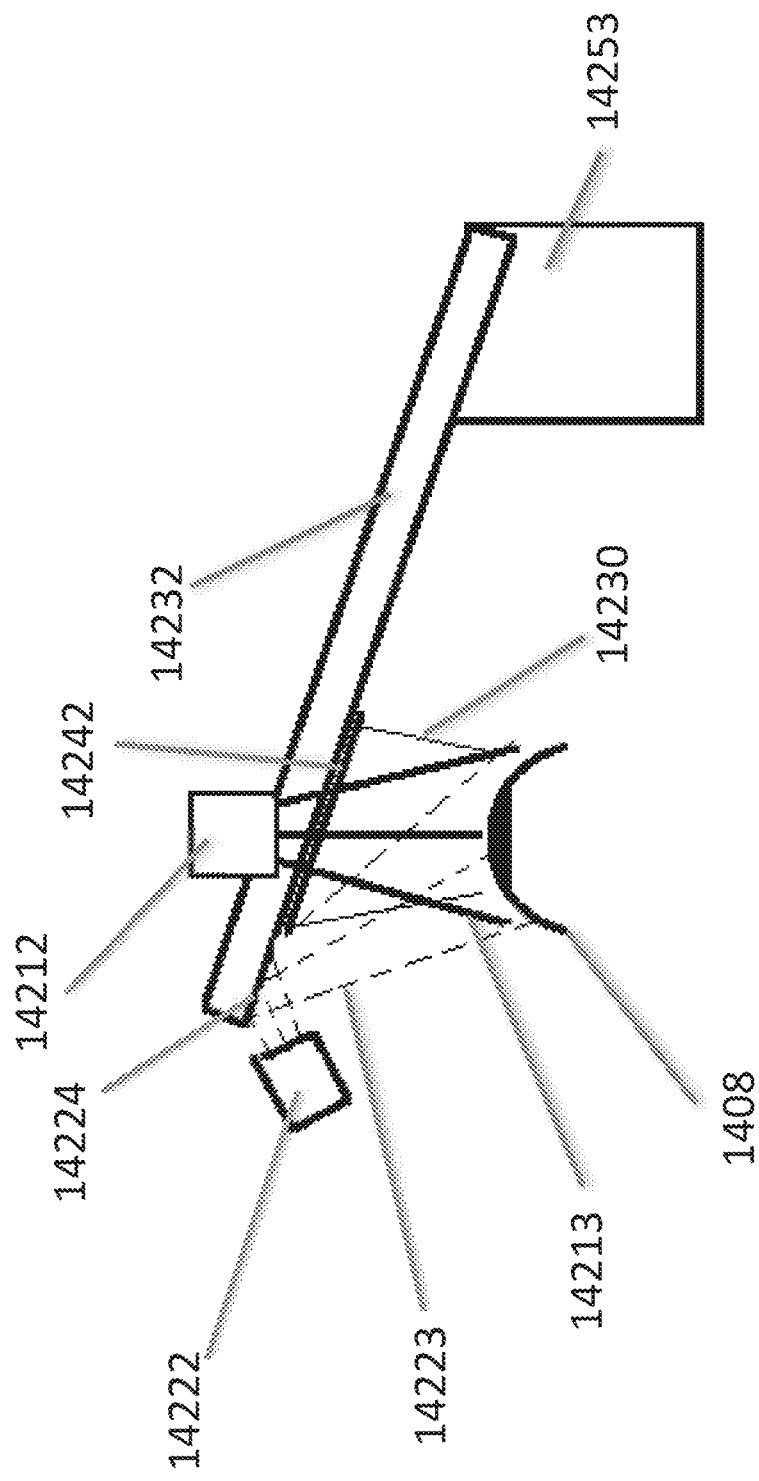

FIGS. 142a and 142b are illustrations of folded optics for a head-worn display that include waveguides with at least one holographic optical element and image source in accordance with the principles of the present disclosure.

Figure 143:
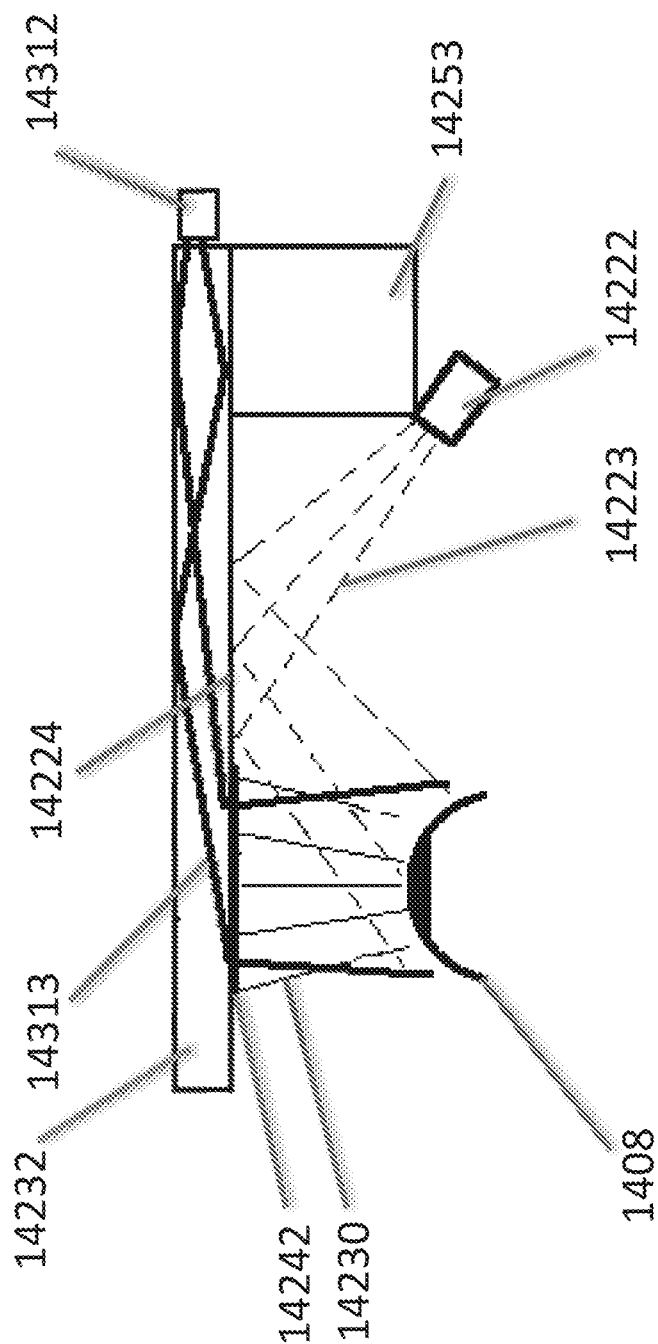

FIG. 143 is an illustration of folded optics for a head-worn display in which the illumination light is injected into the waveguide and redirected by the holographic optical element so that the user's eye is illuminated in accordance with the principles of the present disclosure.

Figure 144:
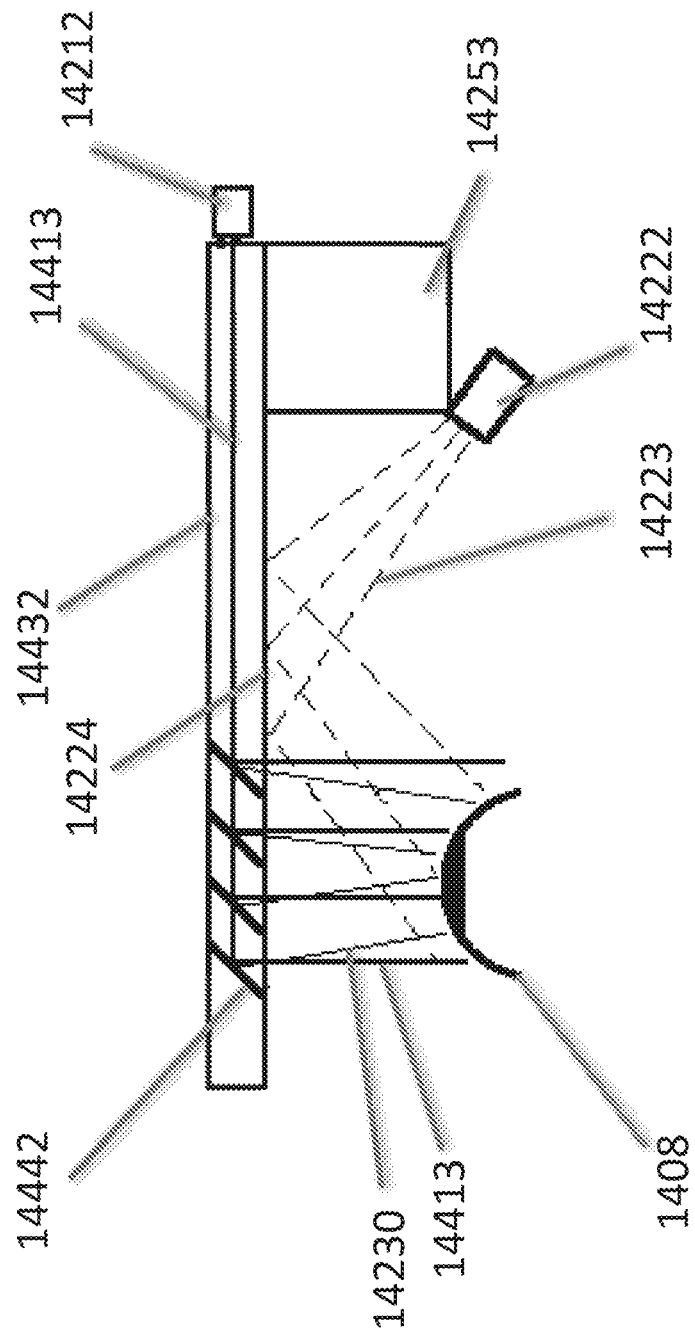

FIG. 144 shows an illustration of folded optics for a head-worn display where a series of angled partial mirrors are included in the waveguide in accordance with the principles of the present disclosure.

Figure 145:
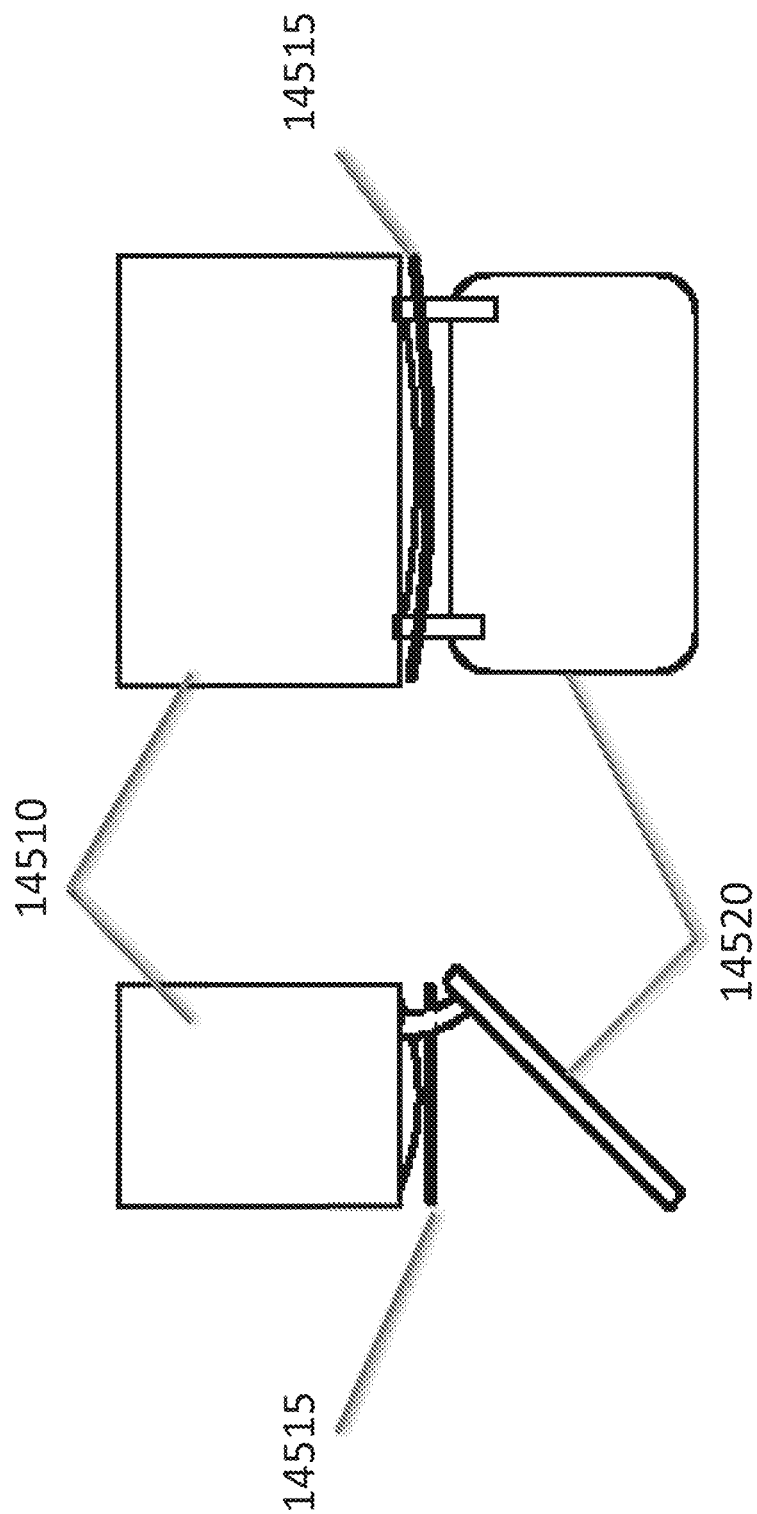

FIG. 145 shows an illustration of a beam splitter based optical module for a head-worn display in accordance with the principles of the present disclosure.

FIG. 146 shows an illustration of an optical module for a head-worn display in accordance with the principles of the present disclosure.

FIG. 146a shows an illustration of a side view of an optics module that includes a corrective lens element.

Figure 147:
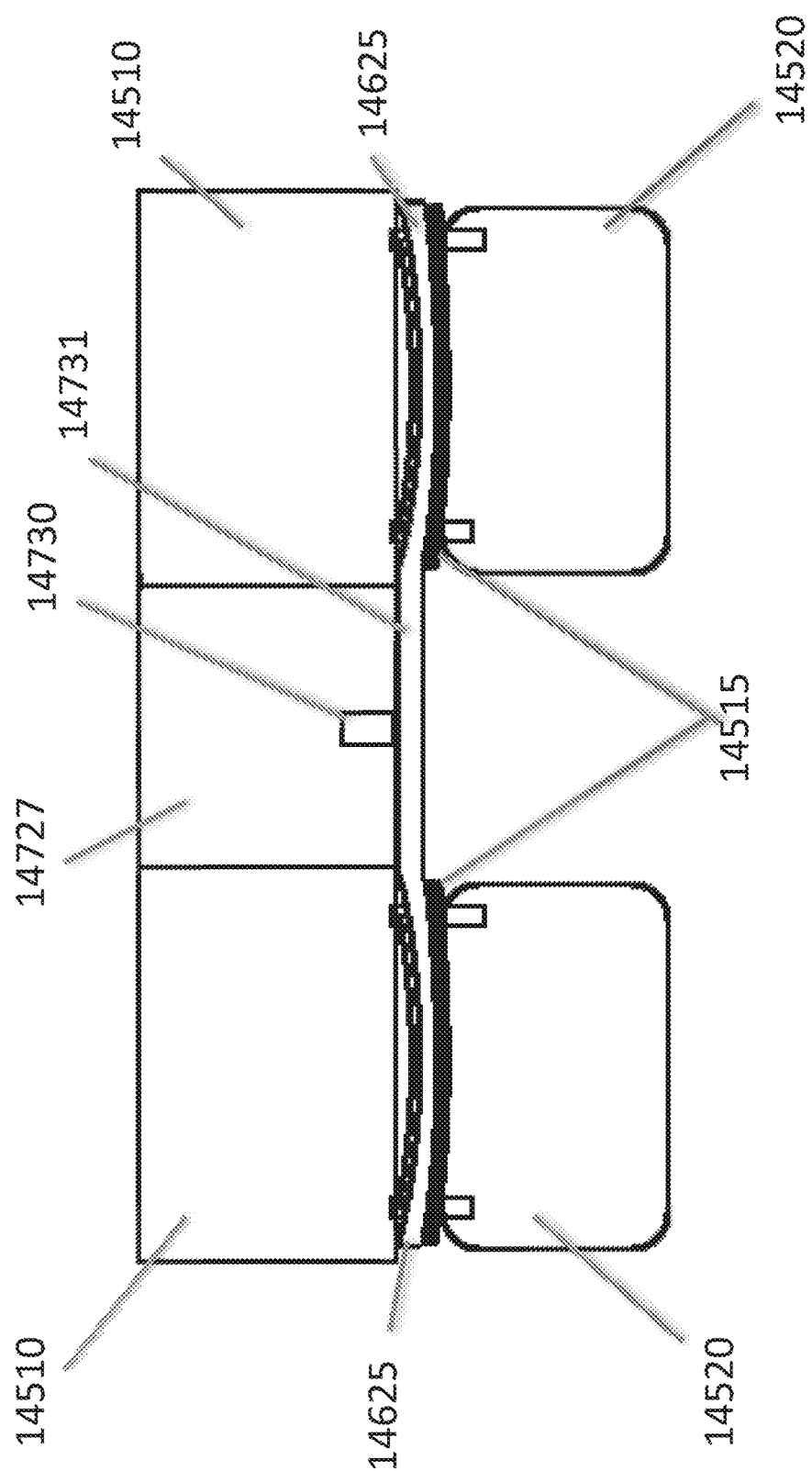

FIG. 147 shows an illustration of left and right optics modules that are connected together in a chassis in accordance with the principles of the present disclosure.

Figure 148:
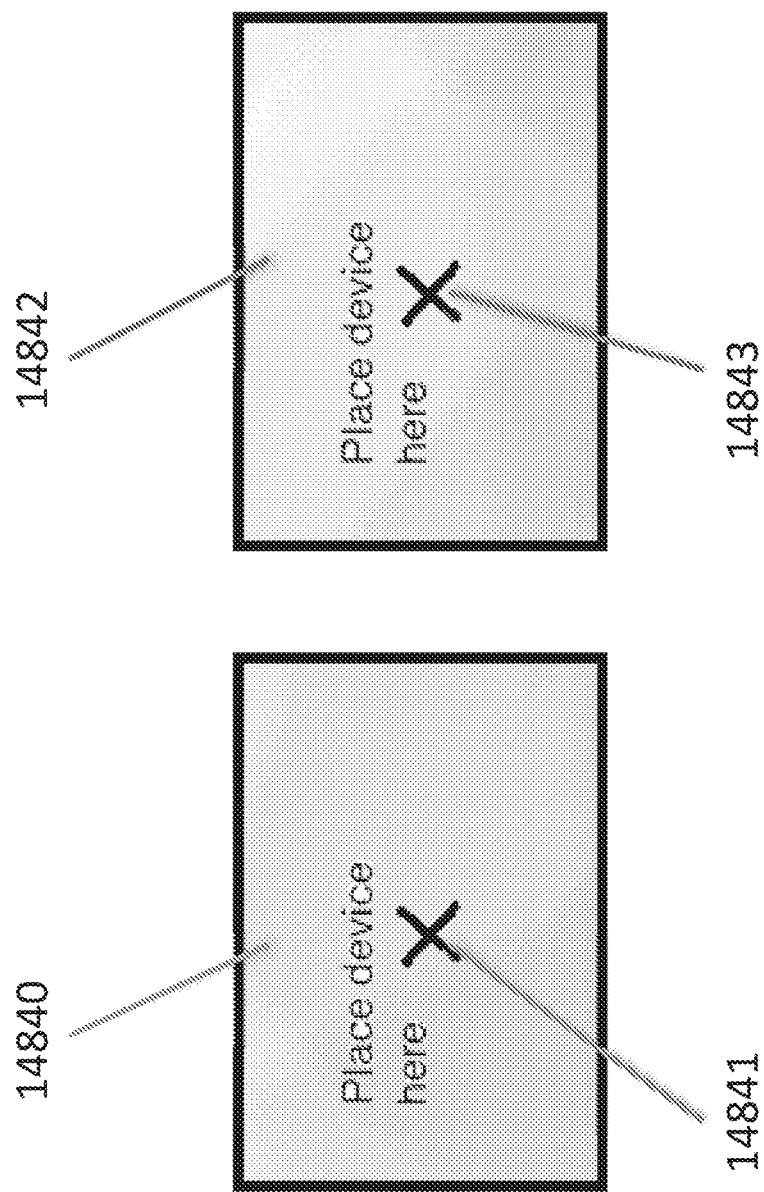

FIG. 148 shows the left and right images provided at the nominal vergence distance within the left and right display fields of view in accordance with the principles of the present disclosure.

Figure 149:
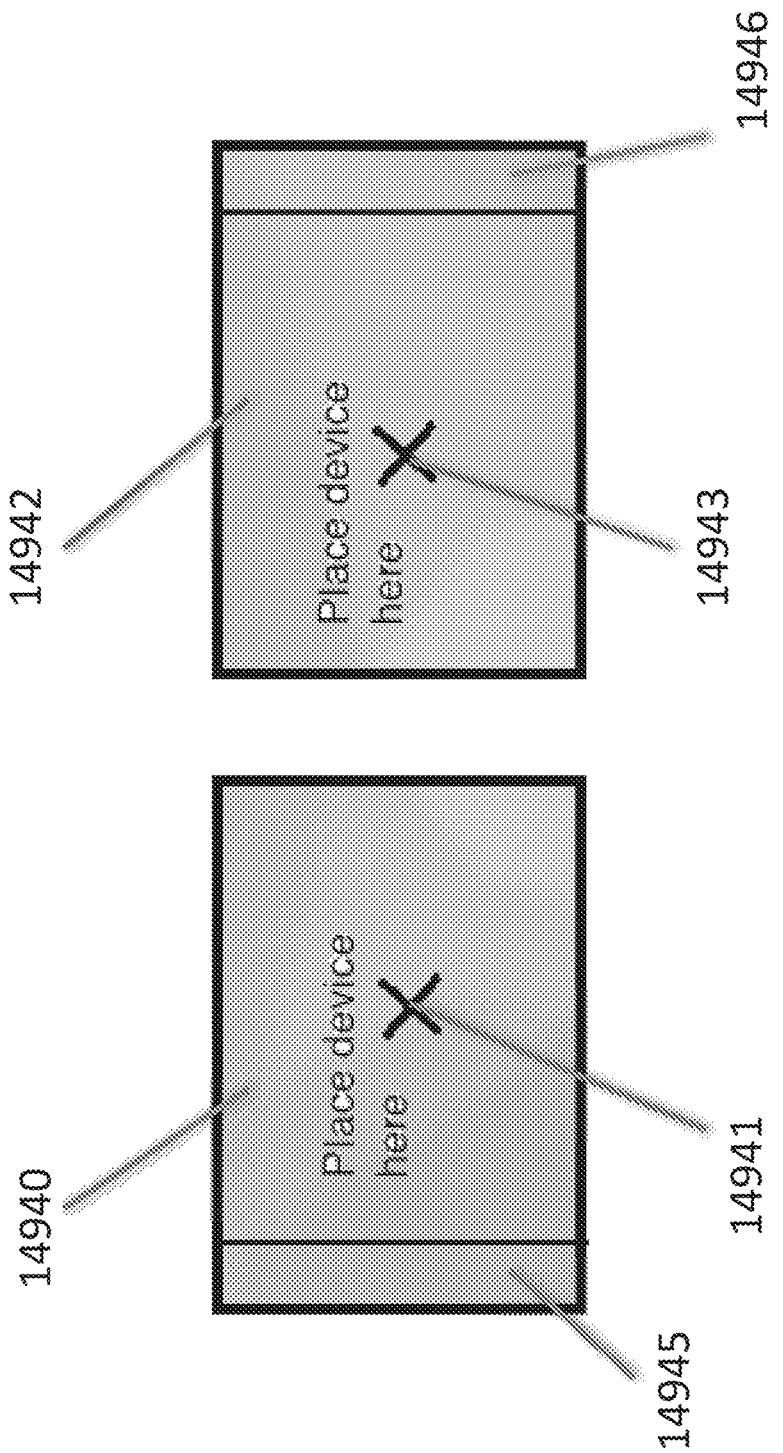

FIG. 149 shows how the left and right images are shifted laterally towards each other within the left and right display fields of view in accordance with the principles of the present disclosure.

Figure 150A:
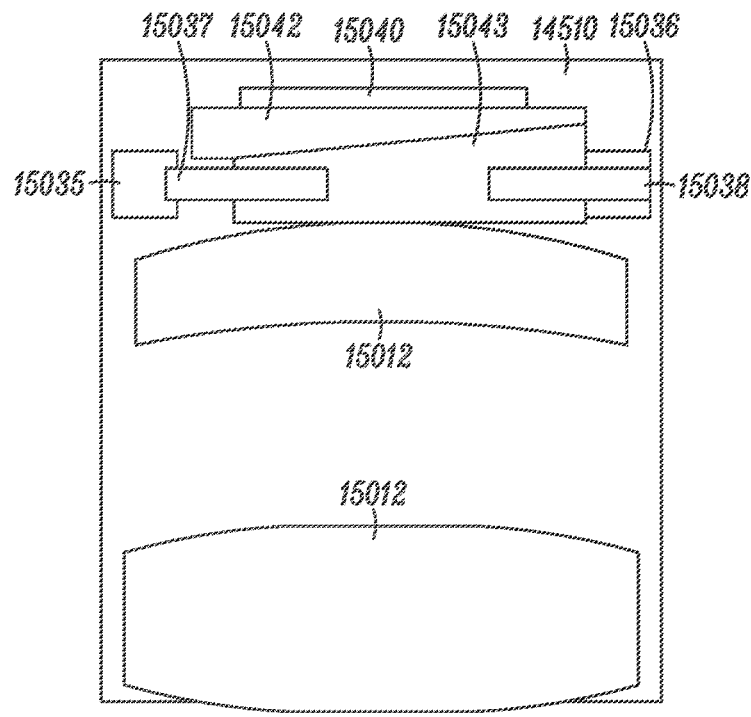
Figure 150B:
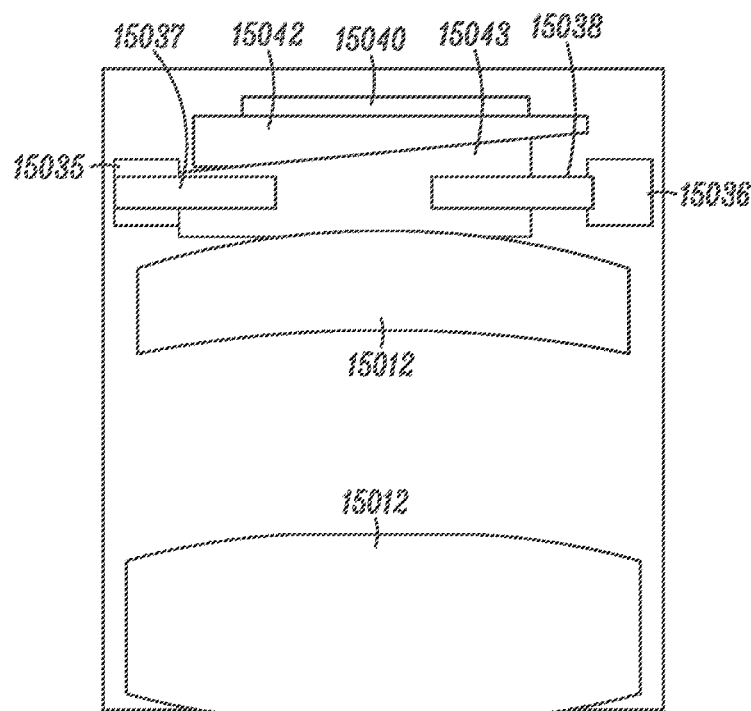

FIGS. 150a and 150b show a mechanism for moving the image source in accordance with the principles of the present disclosure.

Figure 151A:
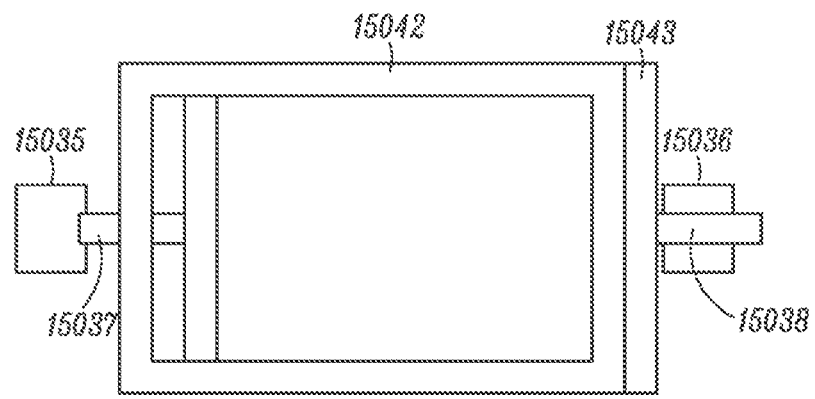
Figure 151B:
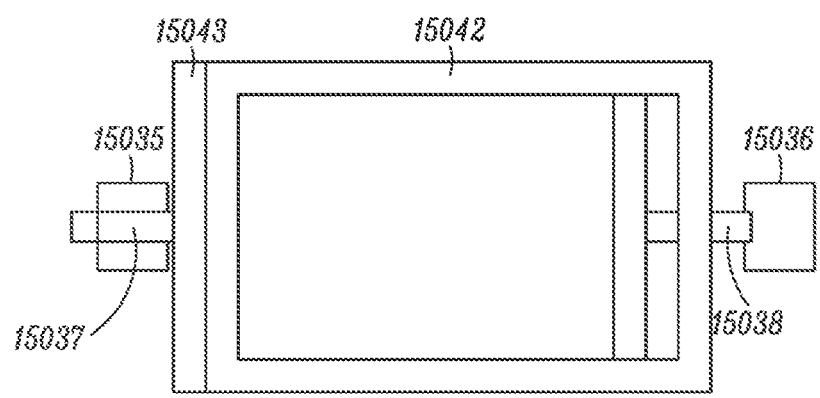

FIGS. 151a and 151b show illustrations of an upper wedge and lower wedge from the position of the image source in accordance with the principles of the present disclosure.

Figure 152:
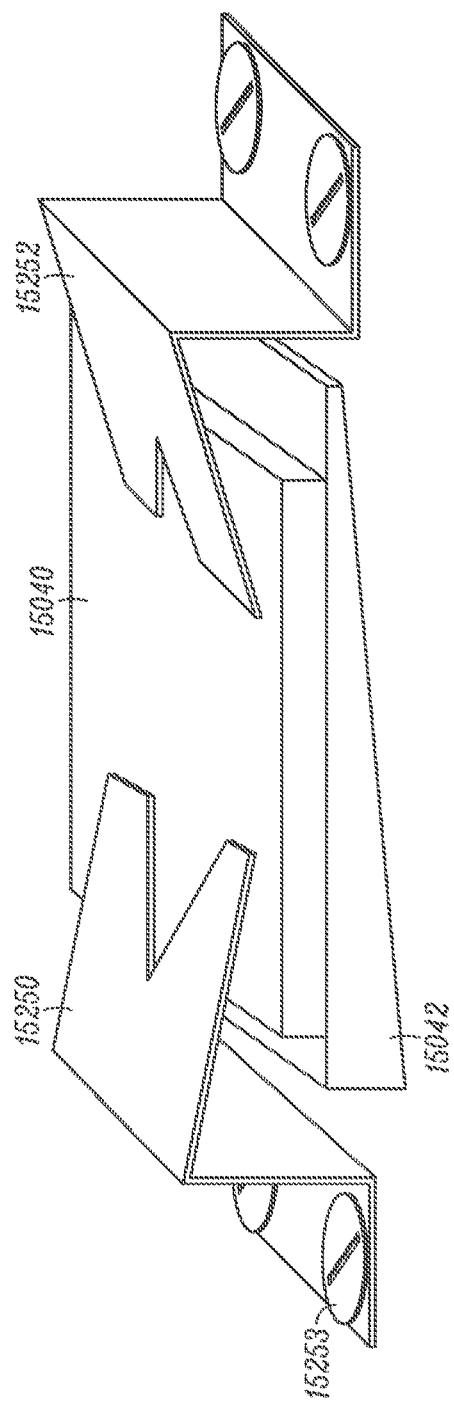

FIG. 152 shows an illustration of spring clips applying a force to an image source in accordance with the principles of the present disclosure.

Figure 153A:
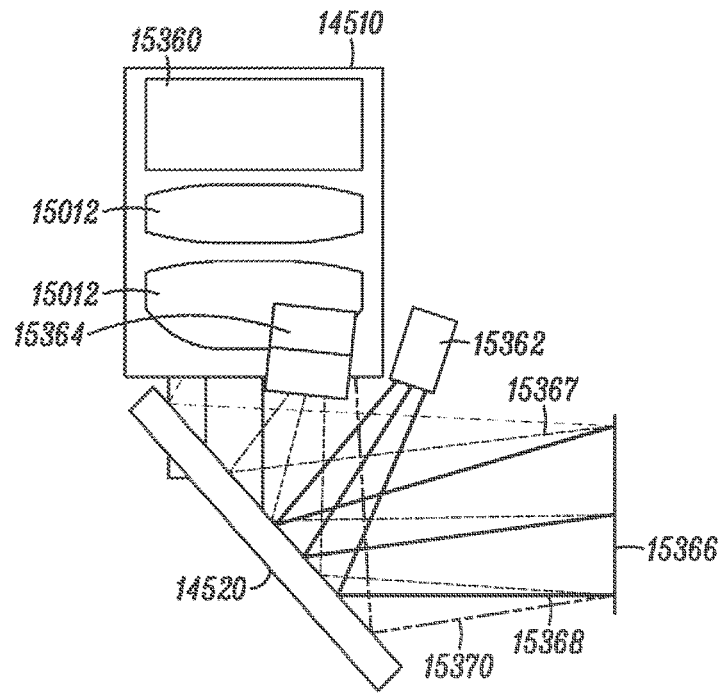
Figure 153B:
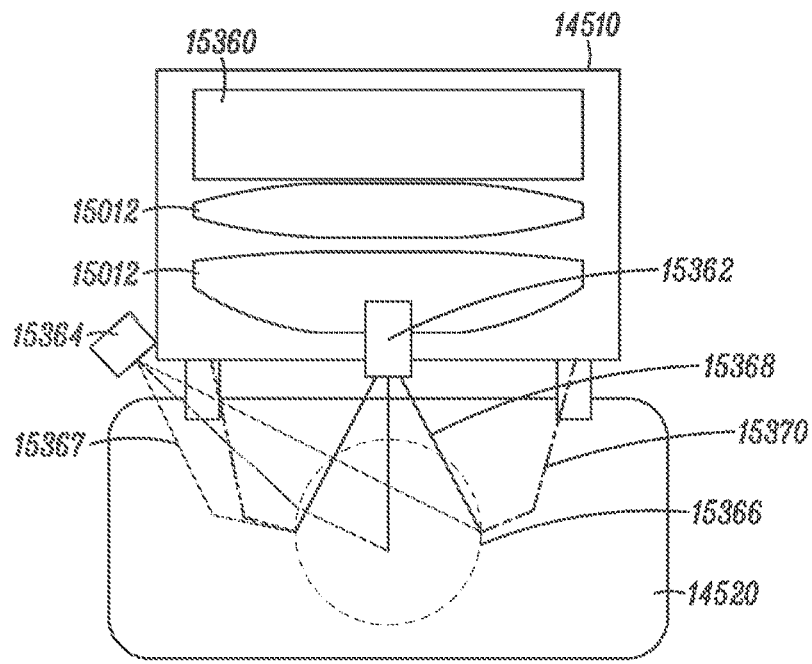
Figure 154:
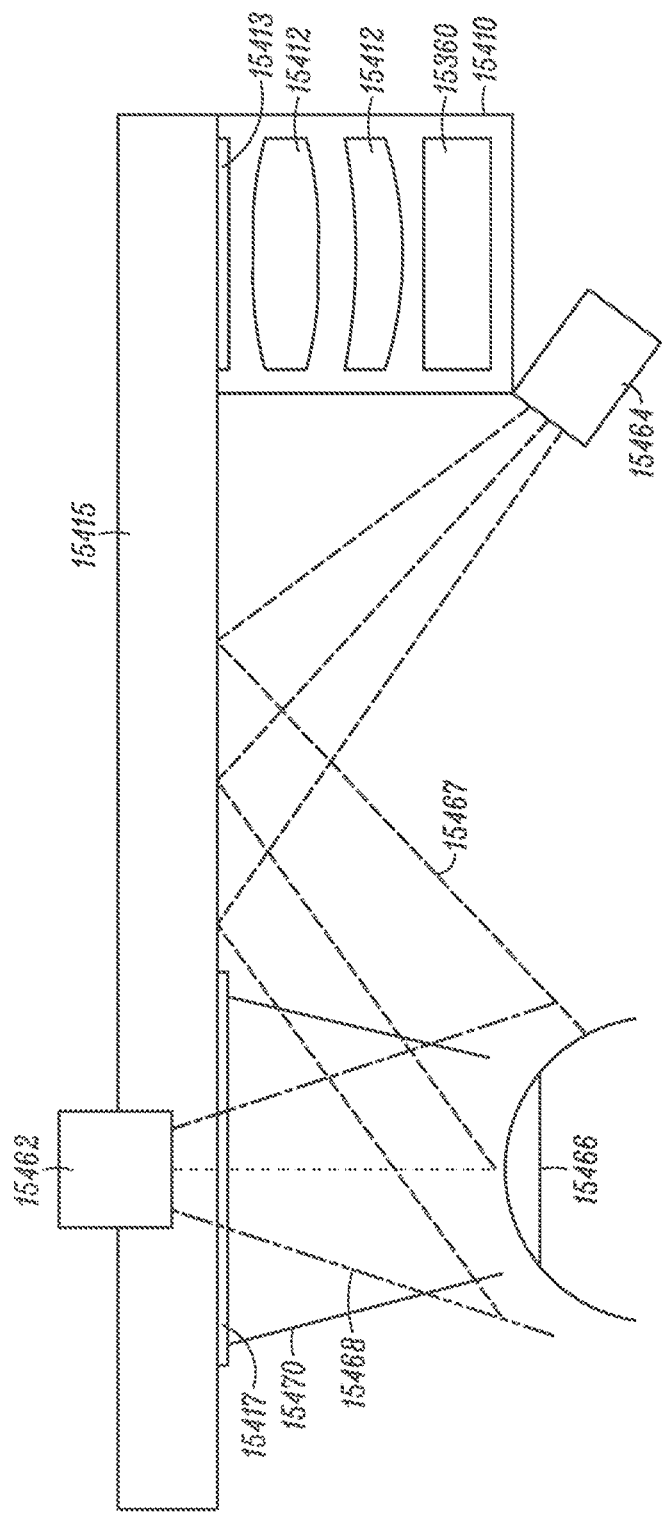

FIGS. 153a, 153b and 154 shows illustrations of example display optics that include eye imaging in accordance with the principles of the present disclosure.

FIGS. 155a, 155b, 156a, 156b, 157a, 157b, 158a, 158b, 159a and 159b show illustrations of focus adjustment modules in accordance with the principles of the present disclosure.

Figure 160:
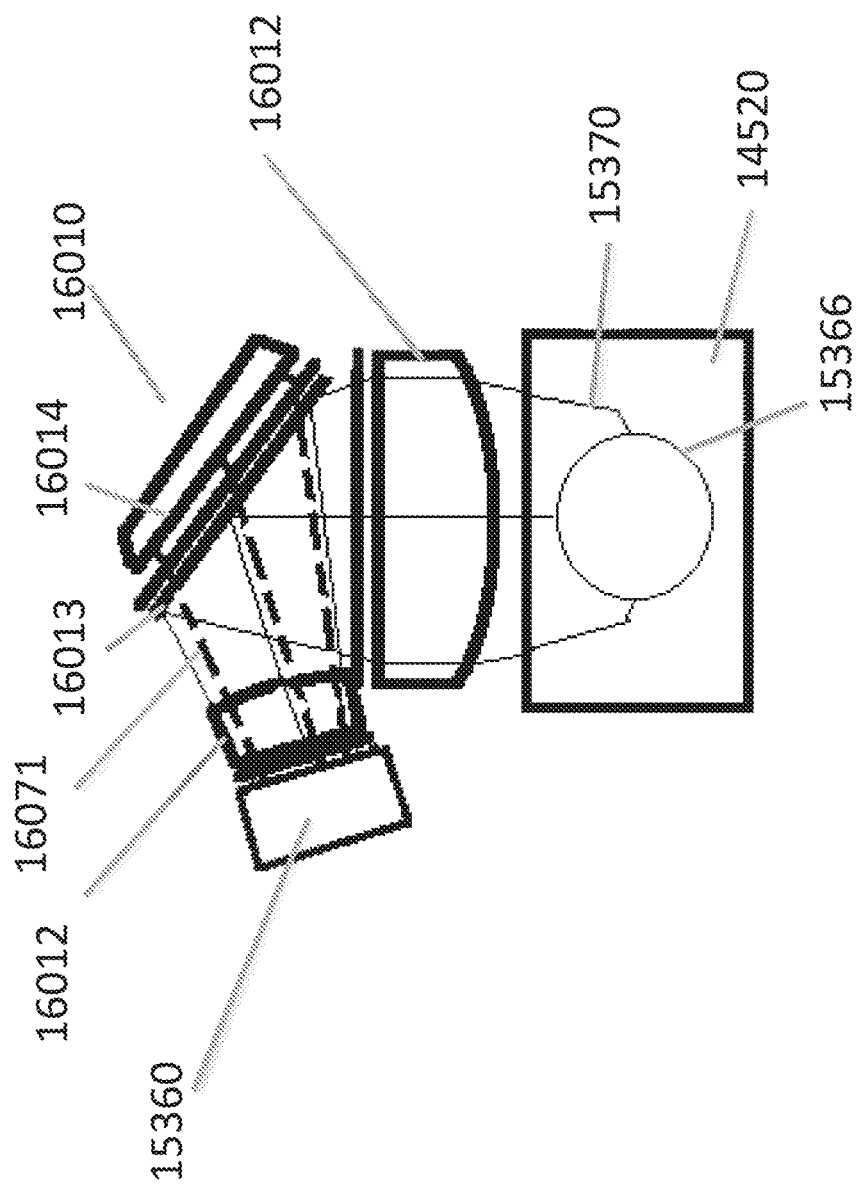

FIG. 160 shows an illustration of an example of multiply folded optics as viewed from the eye position in accordance with the principles of the present disclosure.

Figure 161:
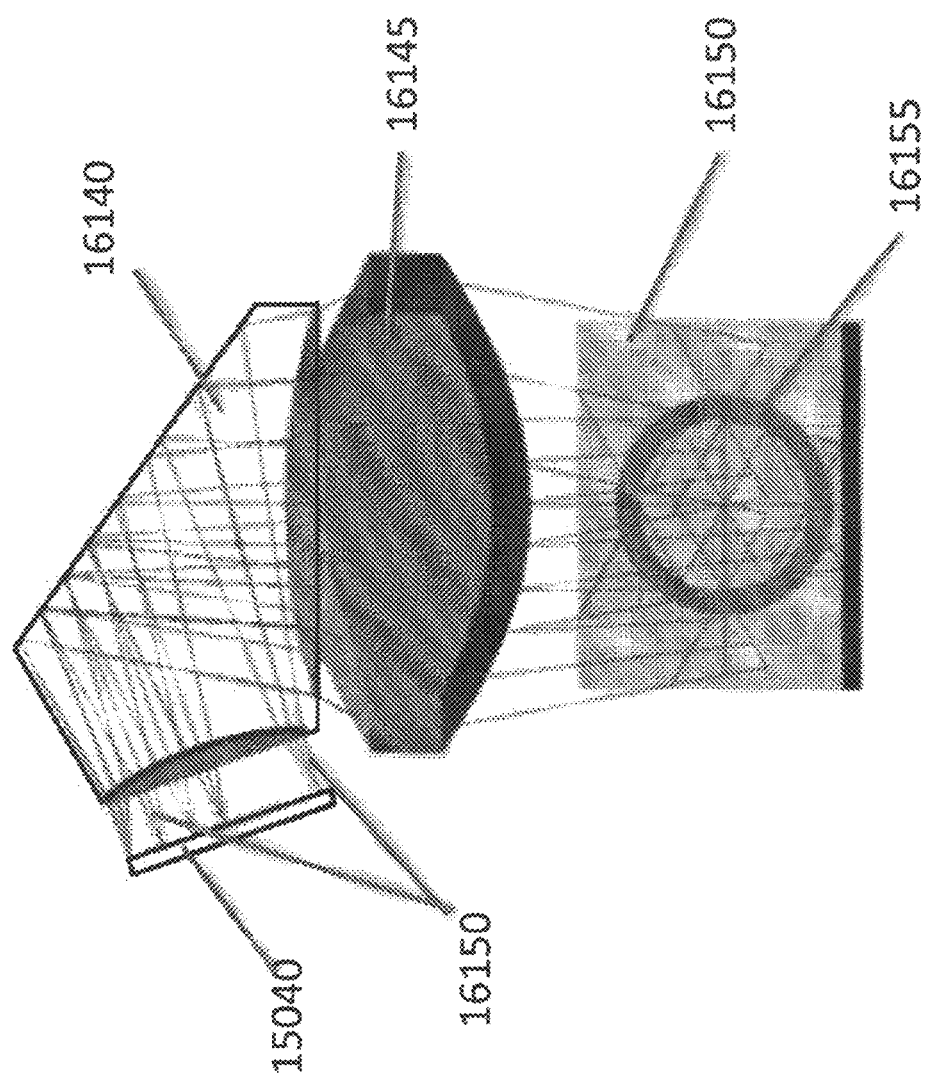
Figure 162:
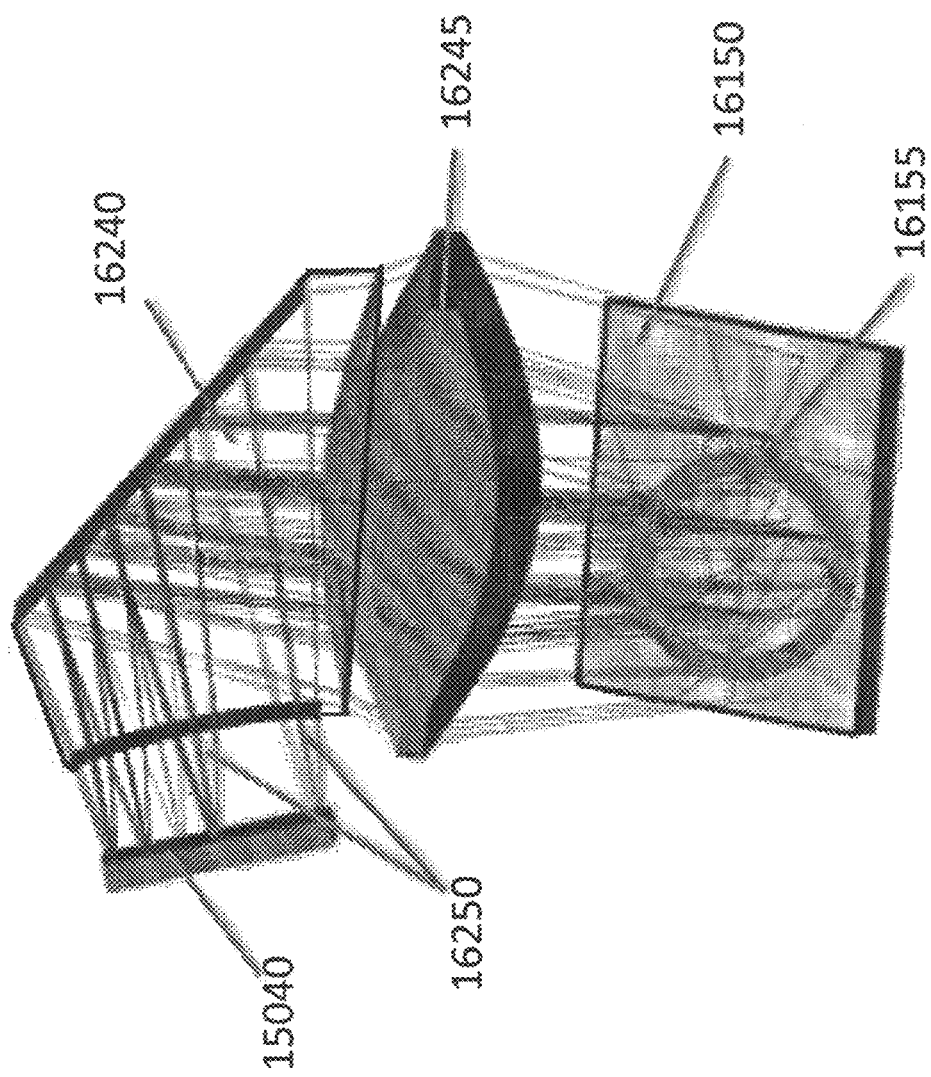

FIGS. 161 and 162 illustrate optical systems in accordance with the principles of the present disclosure.

Figure 163B:
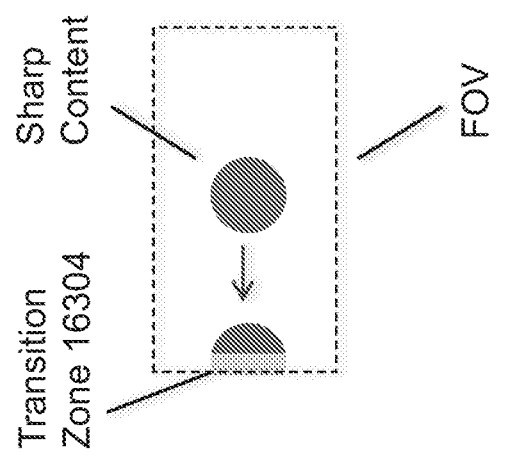
Figure 163A:
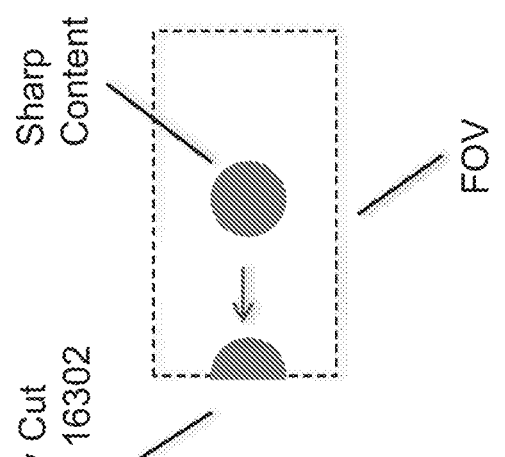

FIG. 163A illustrates an abrupt change in appearance of content in the field of view of a see-through display.

FIG. 163B illustrates a managed appearance system where the content is reduced in appearance as it enters a transitional zone near the edge of the field of view.

Figure 164:
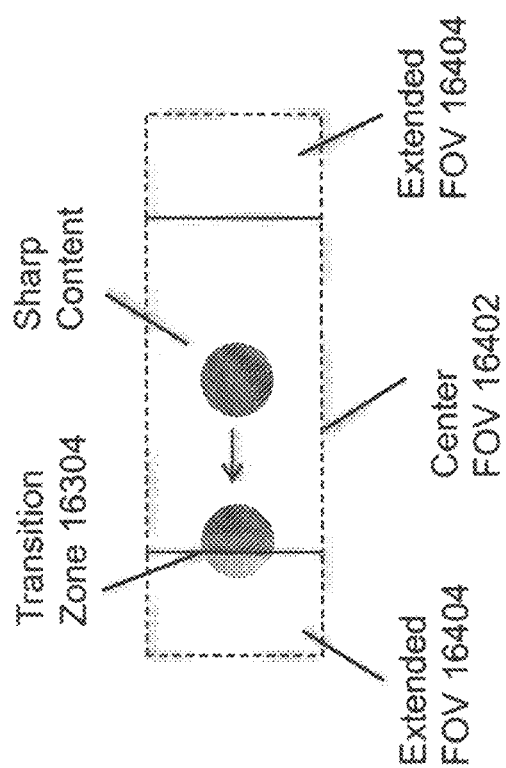

FIG. 164 illustrates a hybrid field of view that includes a centered field of view and an extended field of view that is positioned at or near or overlapping with an edge of the centered field of view.

Figure 165:
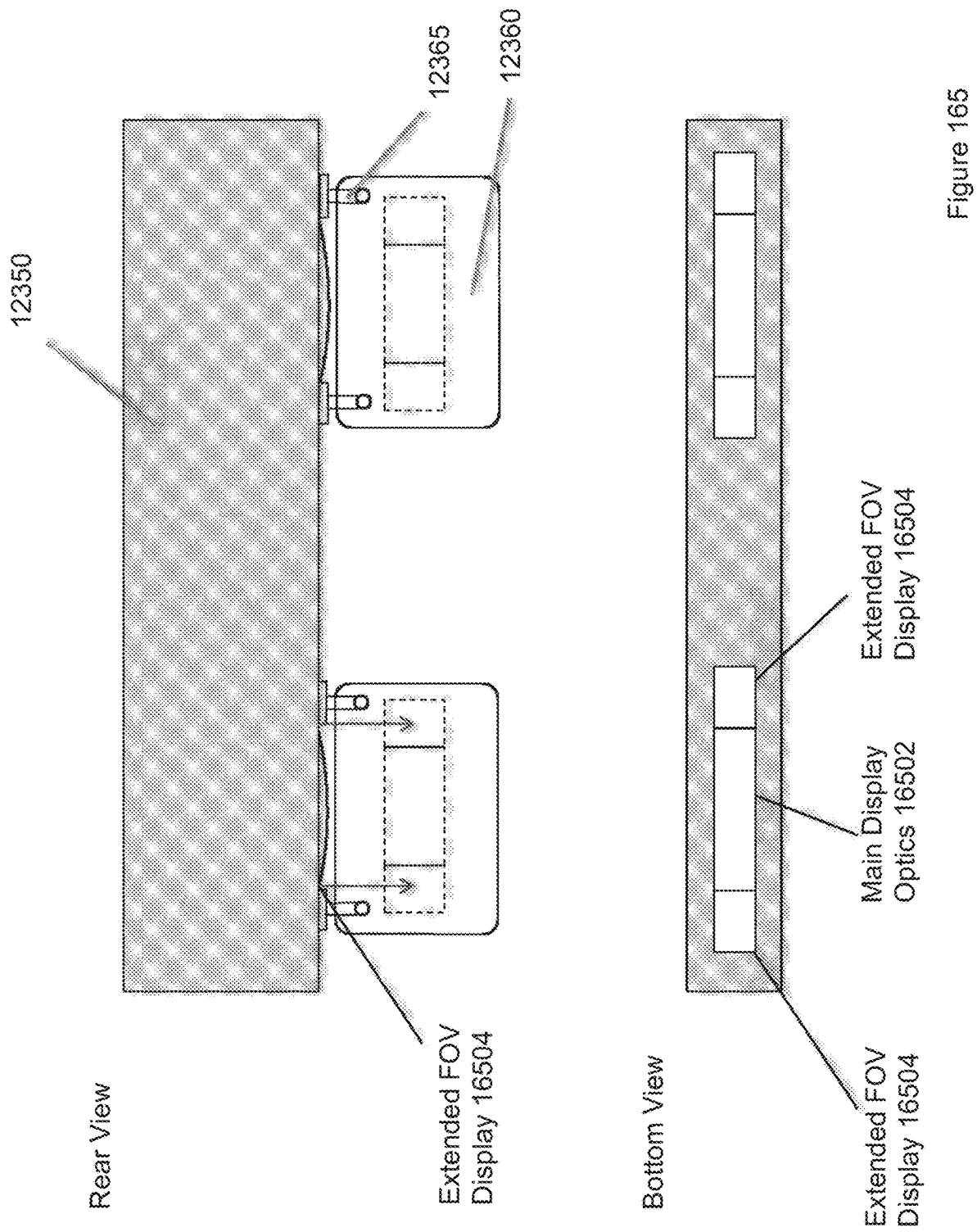
Figures 166A, 166B, 166C, 166D:
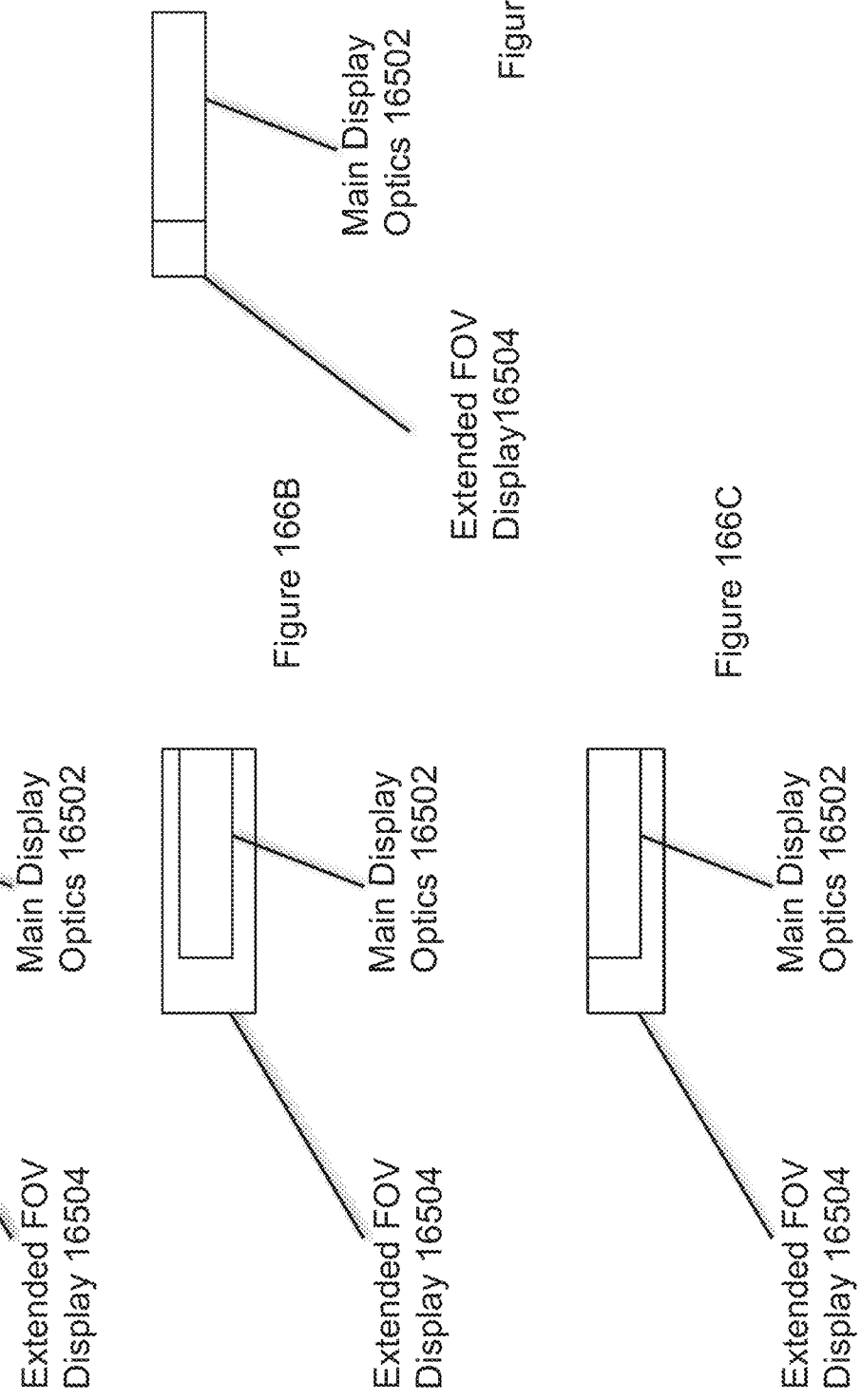

FIG. 165 illustrates a hybrid display system where the main, centered, field of view is generated with optics in an upper module and the extended field of view is generated with a display system mounted above the combiner.

FIGS. 166A-166D illustrate examples of extended display, or extended image content optic, configurations.

Figure 167:
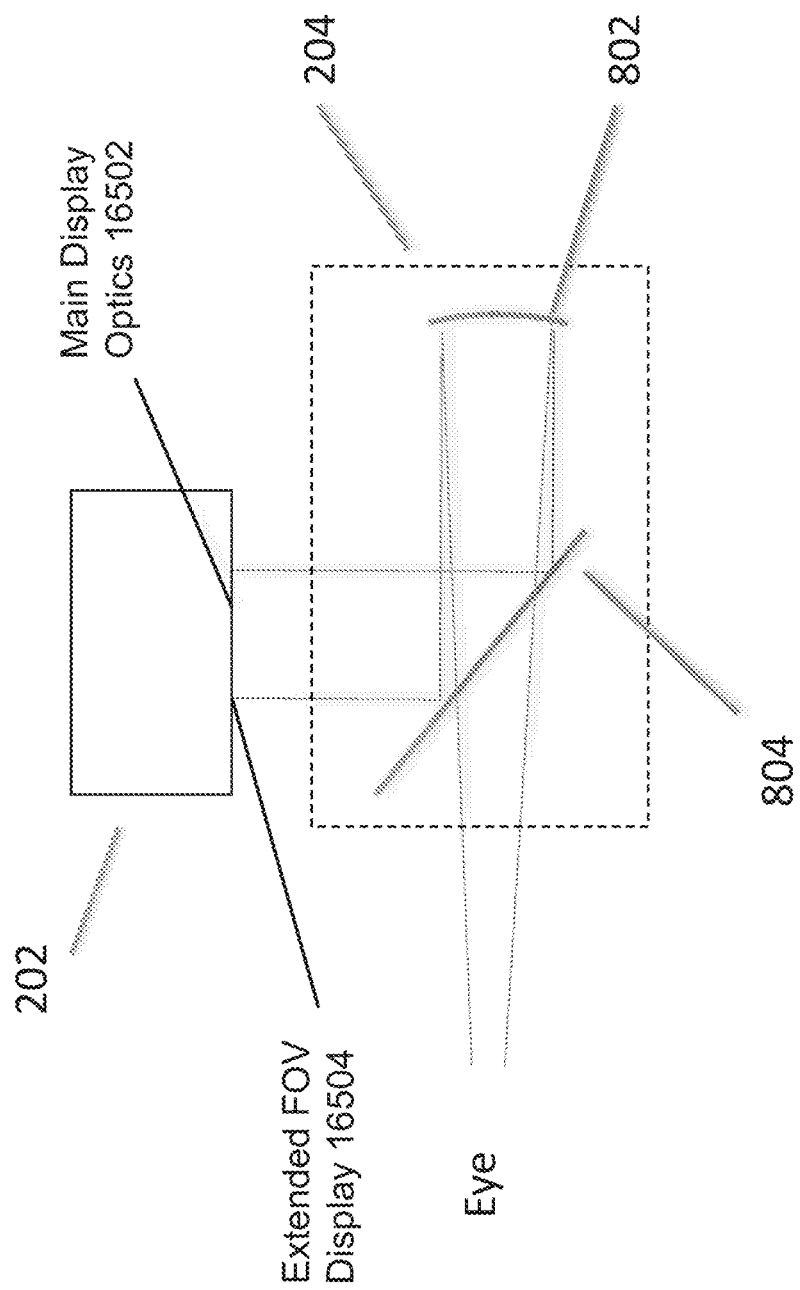

FIG. 167 illustrates another optical system that uses a hybrid optical system that includes a main display optical system and an extended field of view optical system.

FIGS. 168A-168E illustrate various embodiments where a see-through display panel is positioned directly in front of the user's eye in the head-worn computer to provide the extended and/or overlapping field of view in a hybrid display system.

Figure 169:
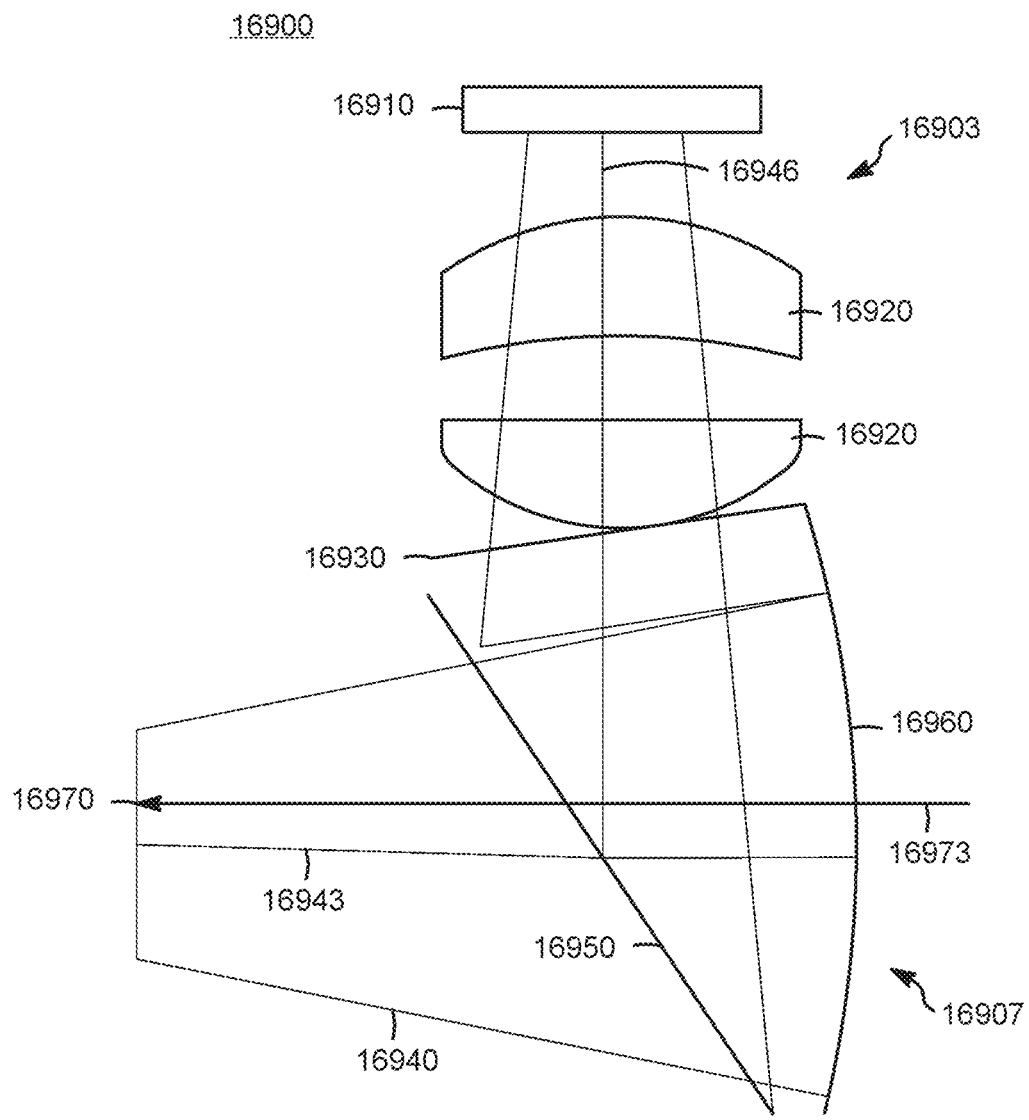

FIG. 169 shows a cross sectional illustration of an example optics assembly for a head worn display in accordance with the principles of the present disclosure.

Figure 170:
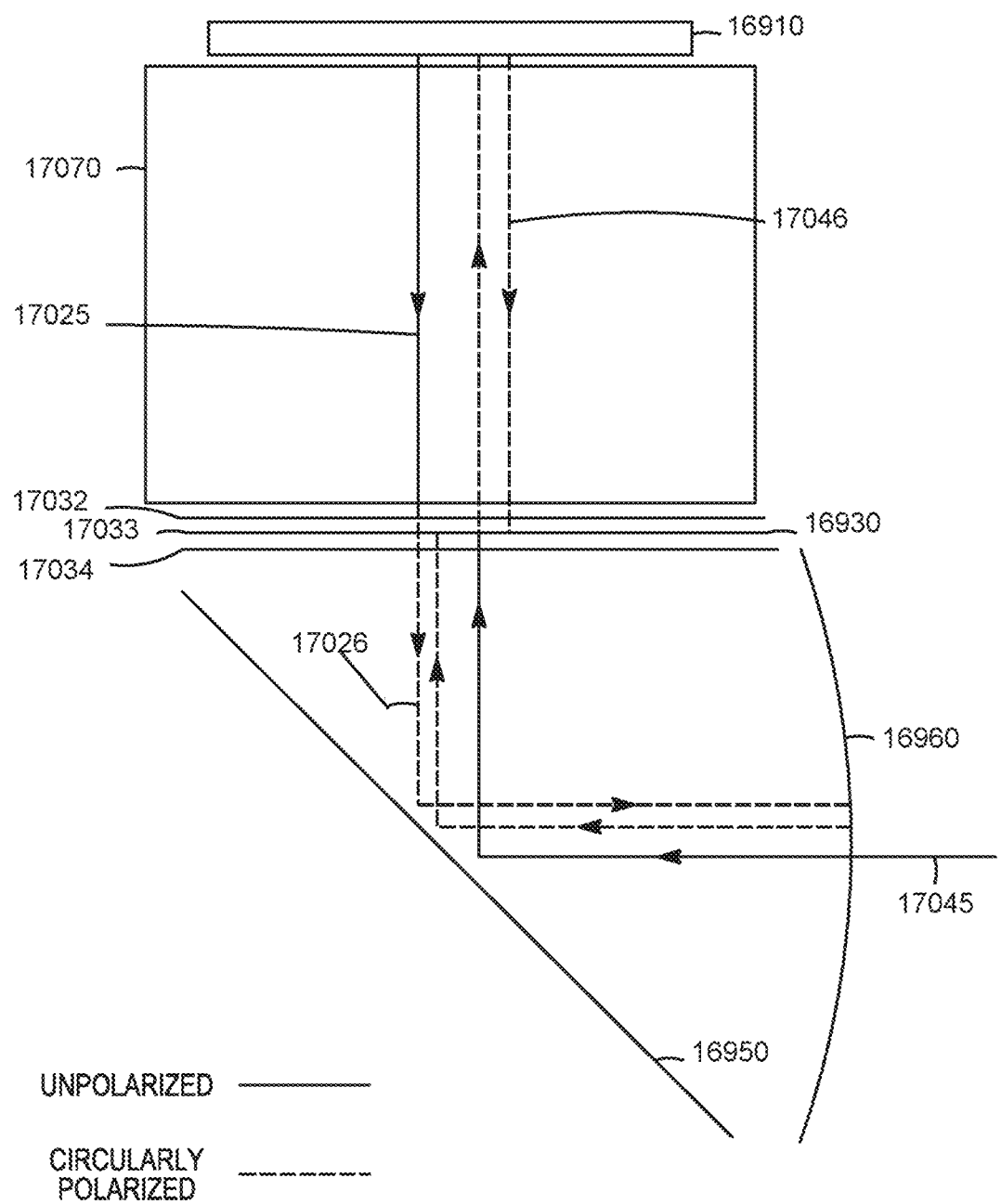

FIG. 170 shows an illustration of the light trap operating to reduce stray light in accordance with the principles of the present disclosure.

Figure 171:
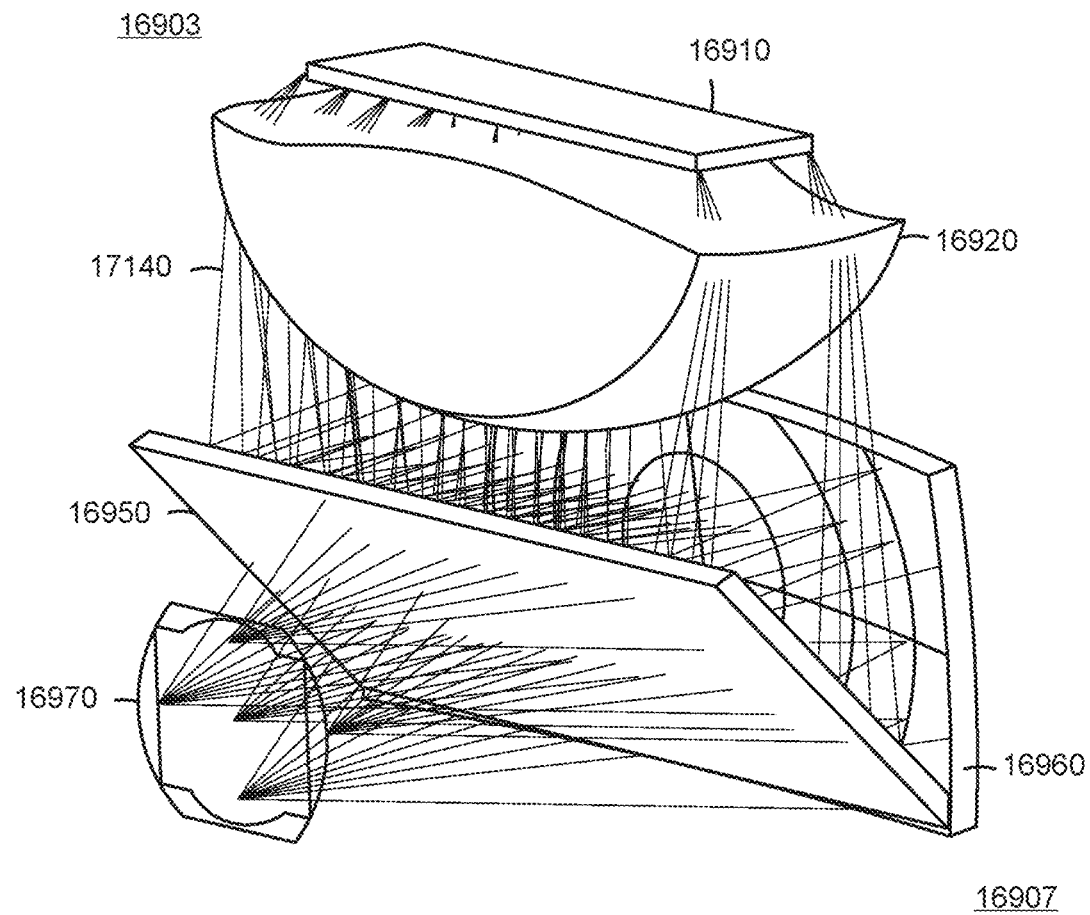

FIG. 171 shows an illustration of a simple optical system that provides a 60 degree display field of view in accordance with the principles of the present disclosure.

Figure 172:
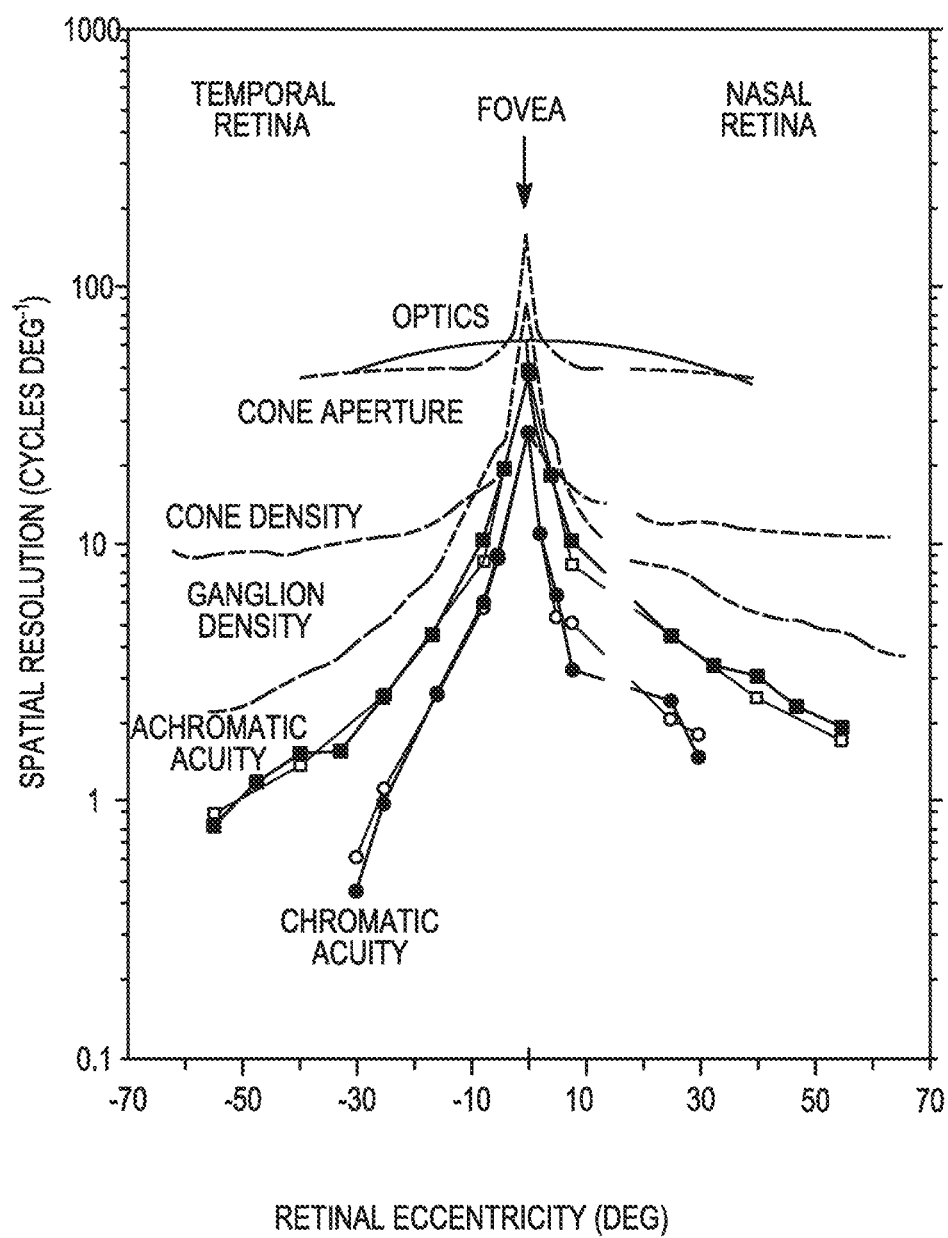

FIG. 172 shows a chart of the acuity of a typical human eye relative to the angular position in the field of view.

Figure 173:
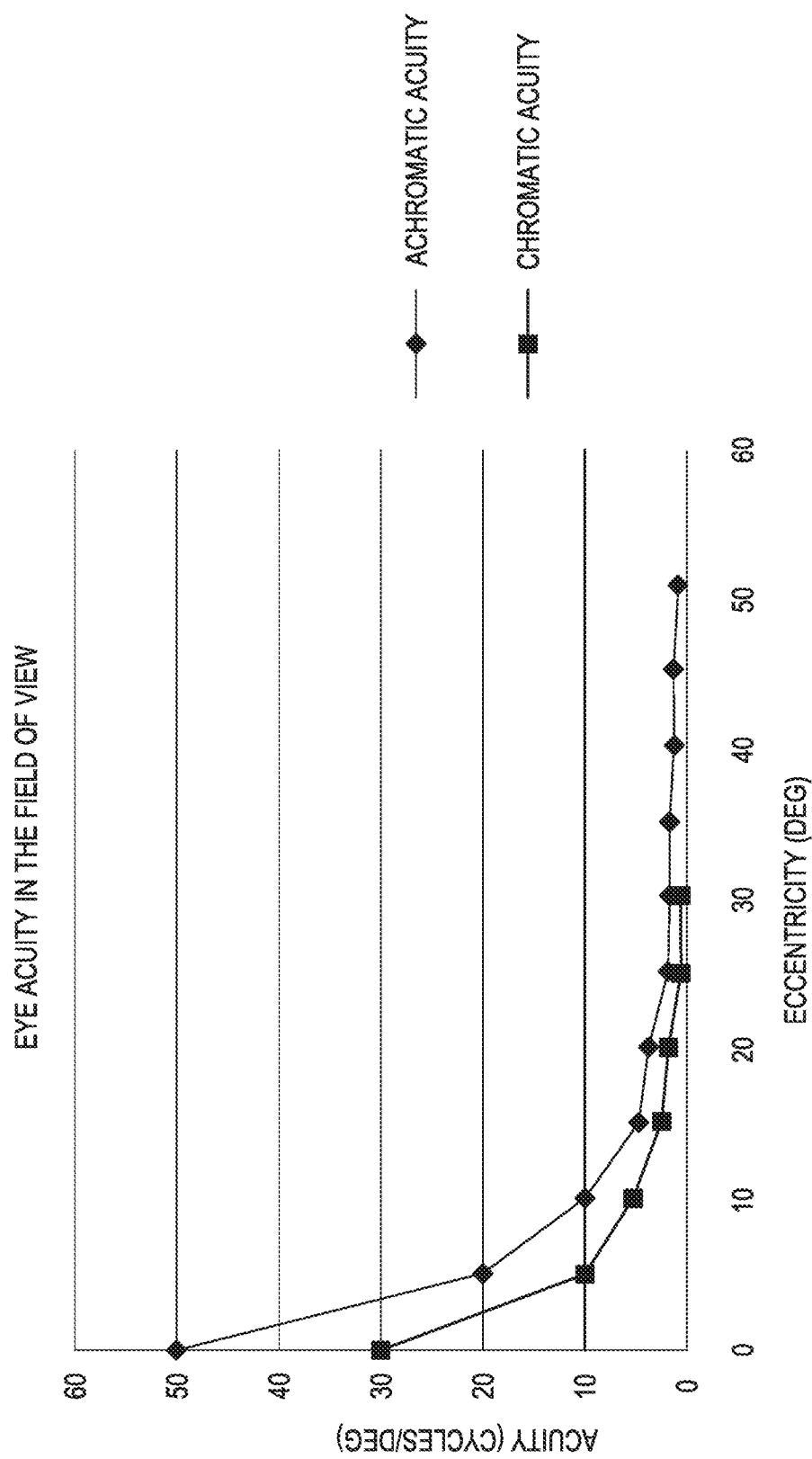

FIG. 173 shows a chart of the typical acuity of the human eye vs the eccentricity in a simplified form that highlights the dropoff in acuity with eccentricity along with the difference between achromatic acuity and chromatic acuity.

Figure 174B:
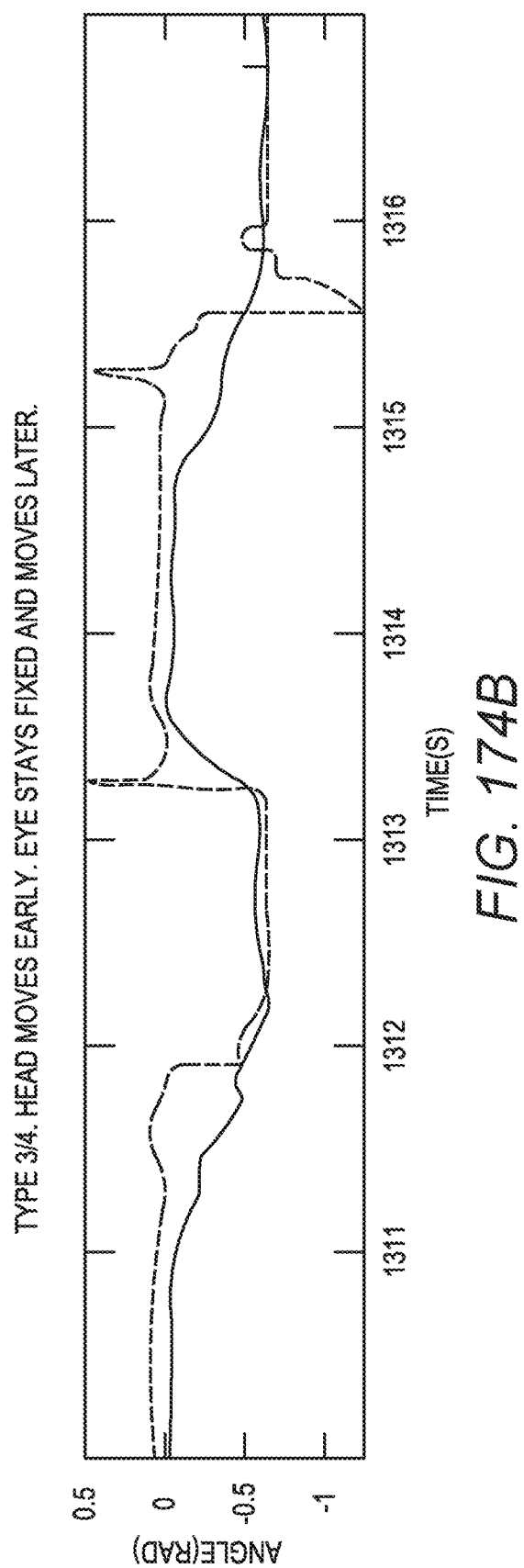

FIG. 174A and FIG. 174B show typical charts of angular eye movements and head movements given in radians vs time.

Figure 175:
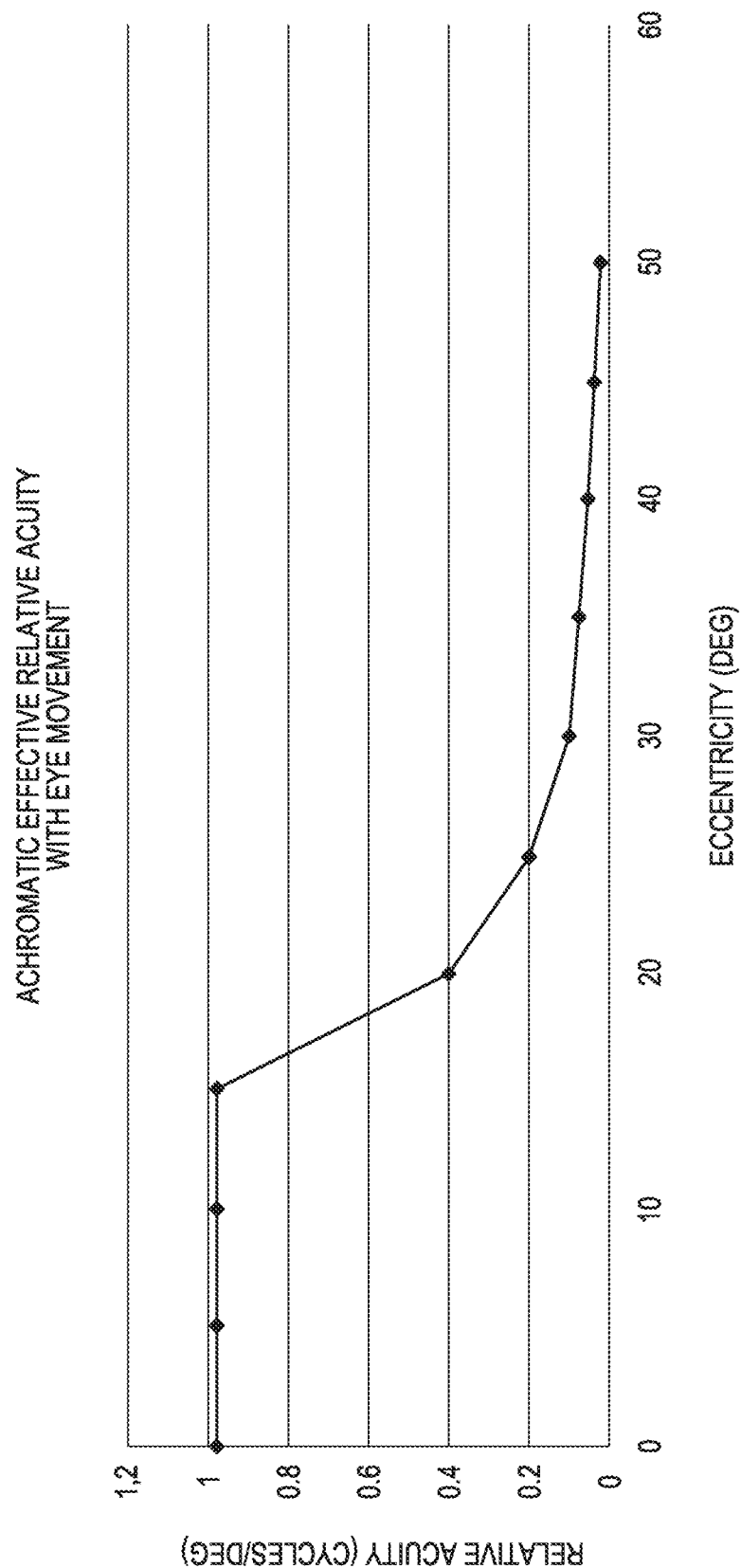

FIG. 175 is a chart that shows the effective relative achromatic acuity, compared to the acuity of the fovea, provided by a typical human eye within the eye's field of view when the movement of the eye is included.

Figure 176:
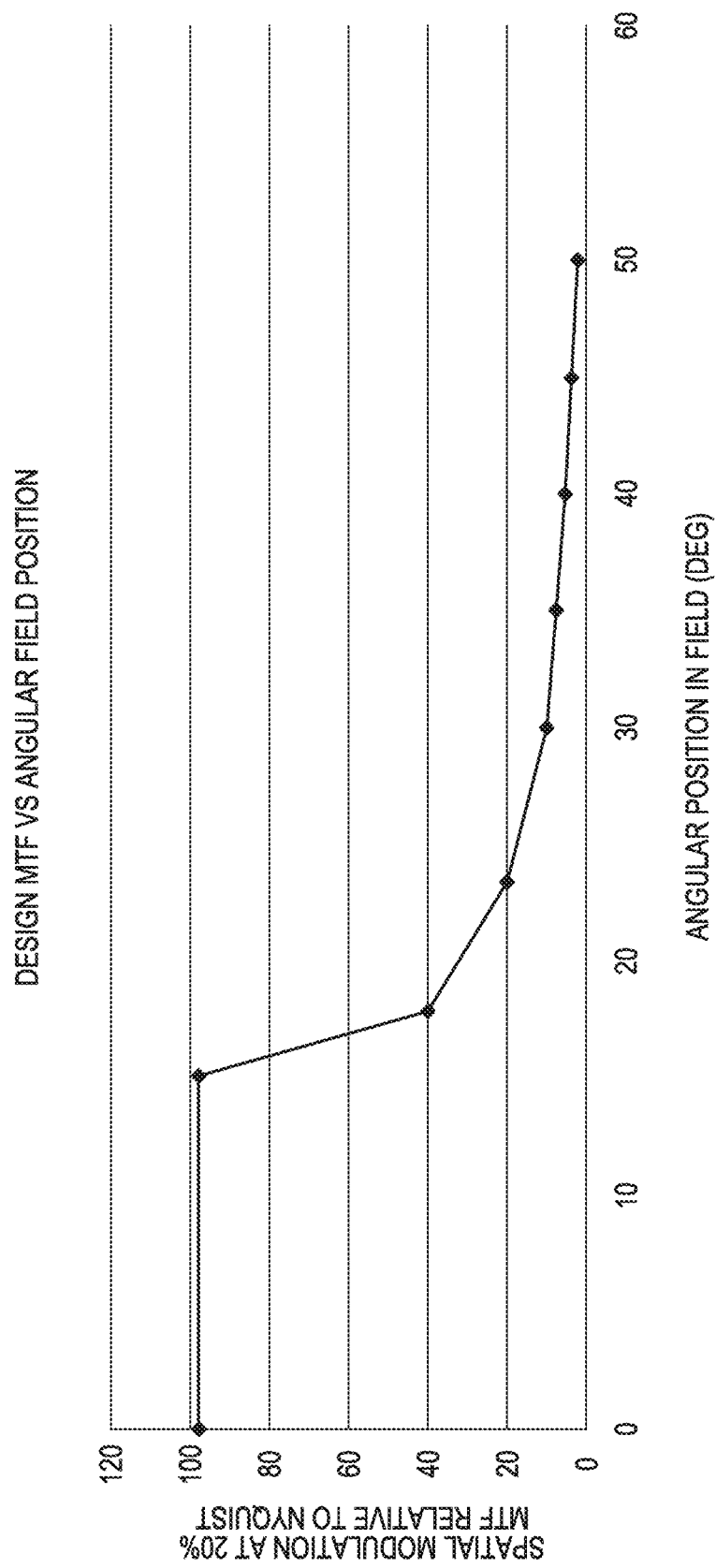

FIG. 176 is a chart that shows the minimum design MTF vs angular field position needed to provide a uniformly sharp looking image in a wide field of view displayed image.

Figure 177:
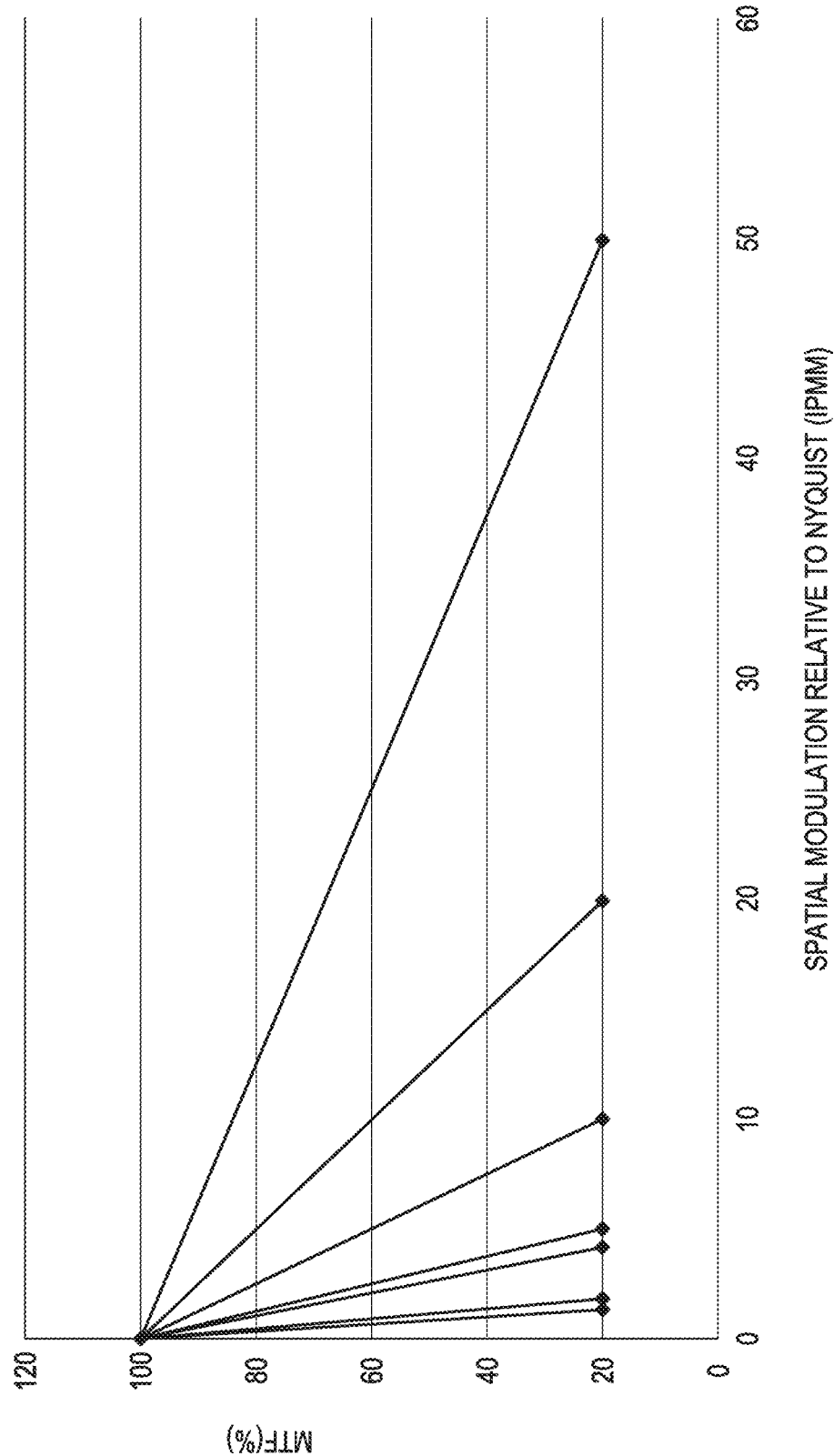

FIG. 177 is a chart that shows the relative MTF needed to be provided by the display optics for a wide field of view display to provide a sharpness that matches the acuity of the human eye in the peripheral zone of the display field of view.

Figure 178:
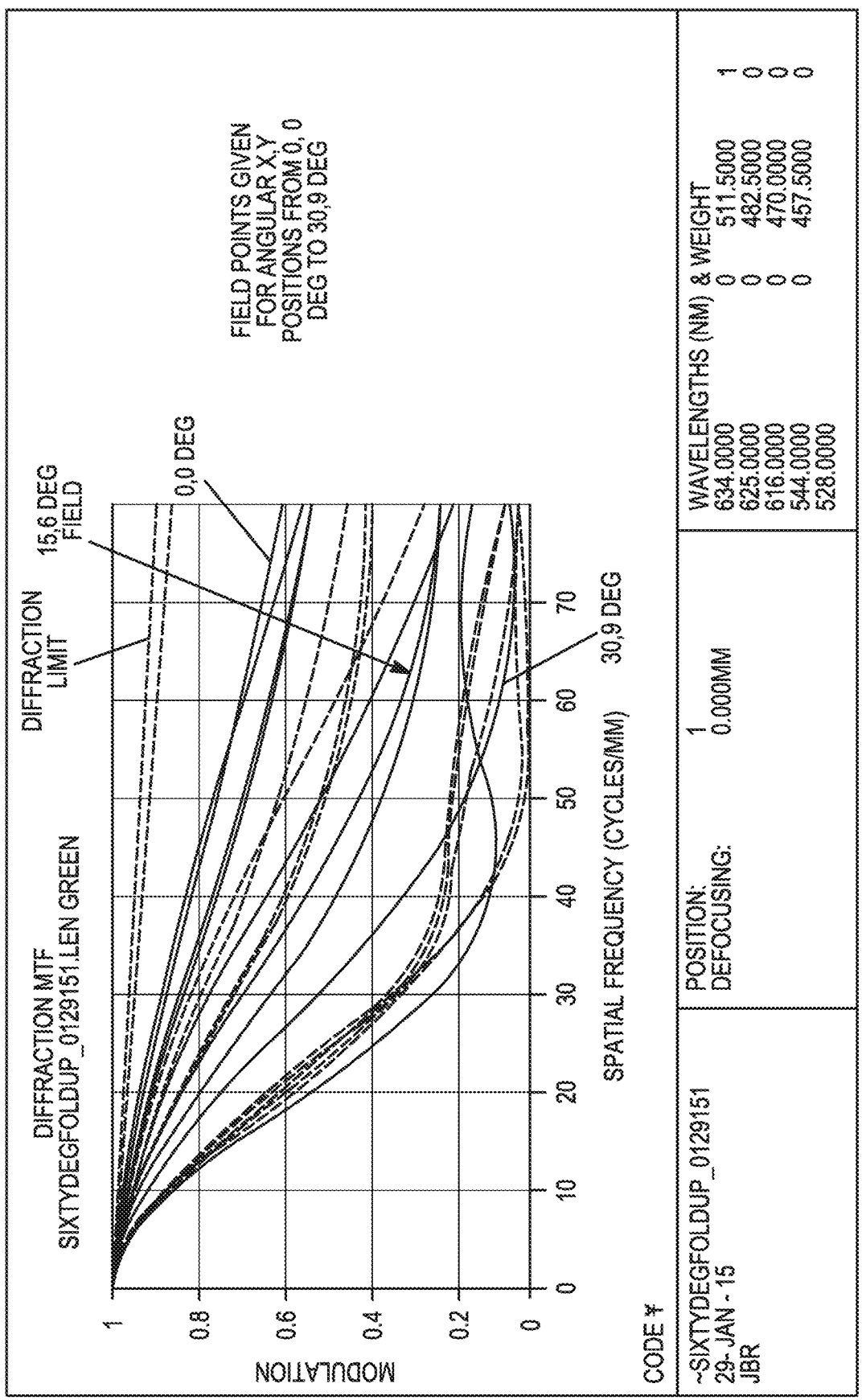

FIG. 178 shows a modeled MTF curve associated with the optical system of FIG. 171 wherein MTF curves for a variety of different angular positions within the display field of view are shown.

Figure 179:
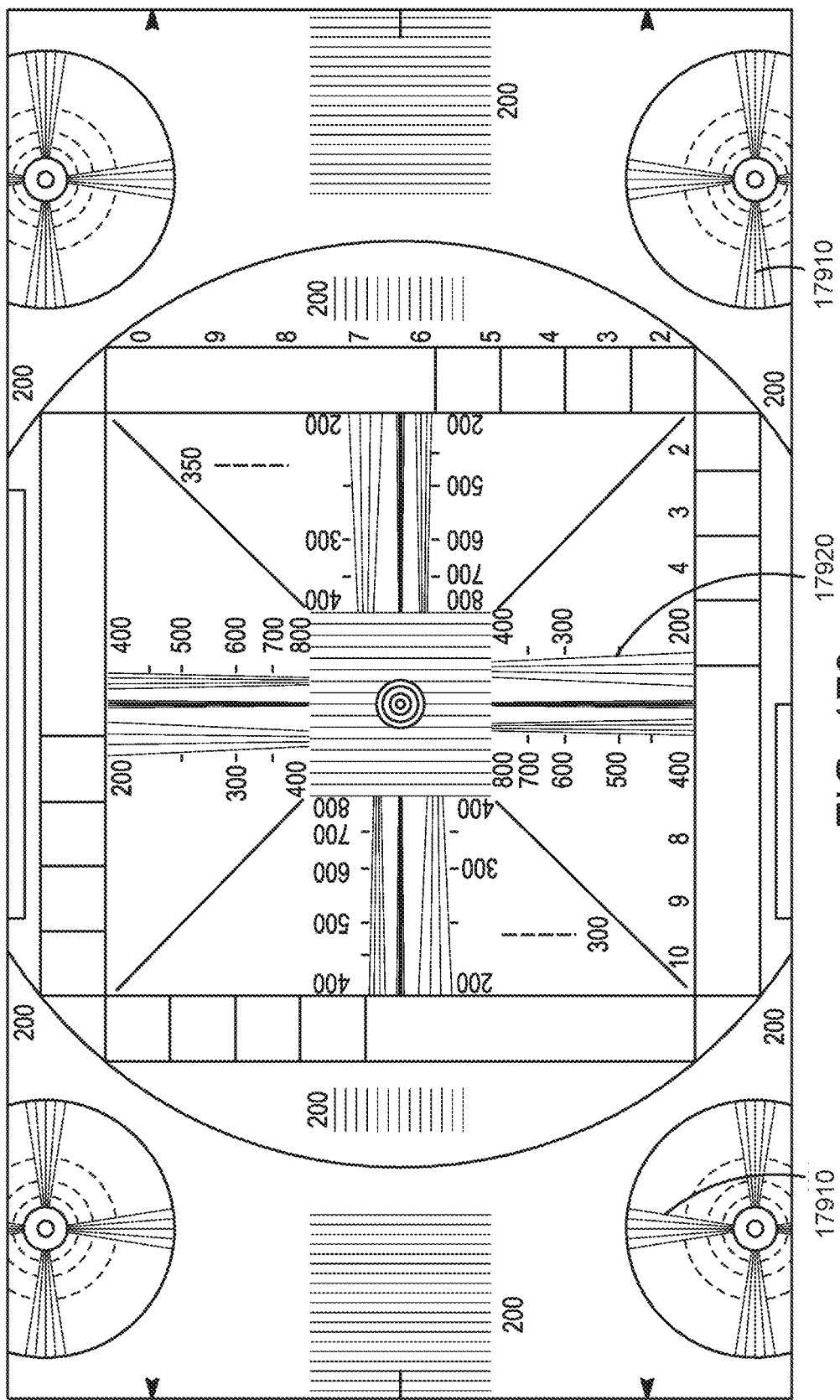

FIG. 179 is an illustration of a resolution chart wherein the sharpness of the image has been reduced by blurring the peripheral portion of the image to simulate an image from optics that provide a central sharp zone of +/−15 degrees with a peripheral zone that is less sharp.

FIGS. 180 and 181 are illustrations that show how the image is shifted within the display field of view as the user moves their head in accordance with the principles of the present disclosure.

FIG. 182 illustrates the blank portion of the display field of view where the image has been shifted away from is displayed as a dark region to enable the user to see-through to the surrounding environment in the blank portion in accordance with the principles of the present disclosure.

FIG. 183 shows an illustration of a wide display field of view, wherein a user can choose to display a smaller field of view for a given image or application (e.g. a game) to improve the personal viewing experience in accordance with the principles of the present disclosure.

FIGS. 184 and 185 should physical arrangements of optical systems in accordance with the principles of the present disclosure.

FIG. 186 shows a 30:9 format field of view and a 22:9 format field of view, wherein the two fields of view have the same vertical field of view and different horizontal field of view in accordance with the principles of the present disclosure.

Figure 187:
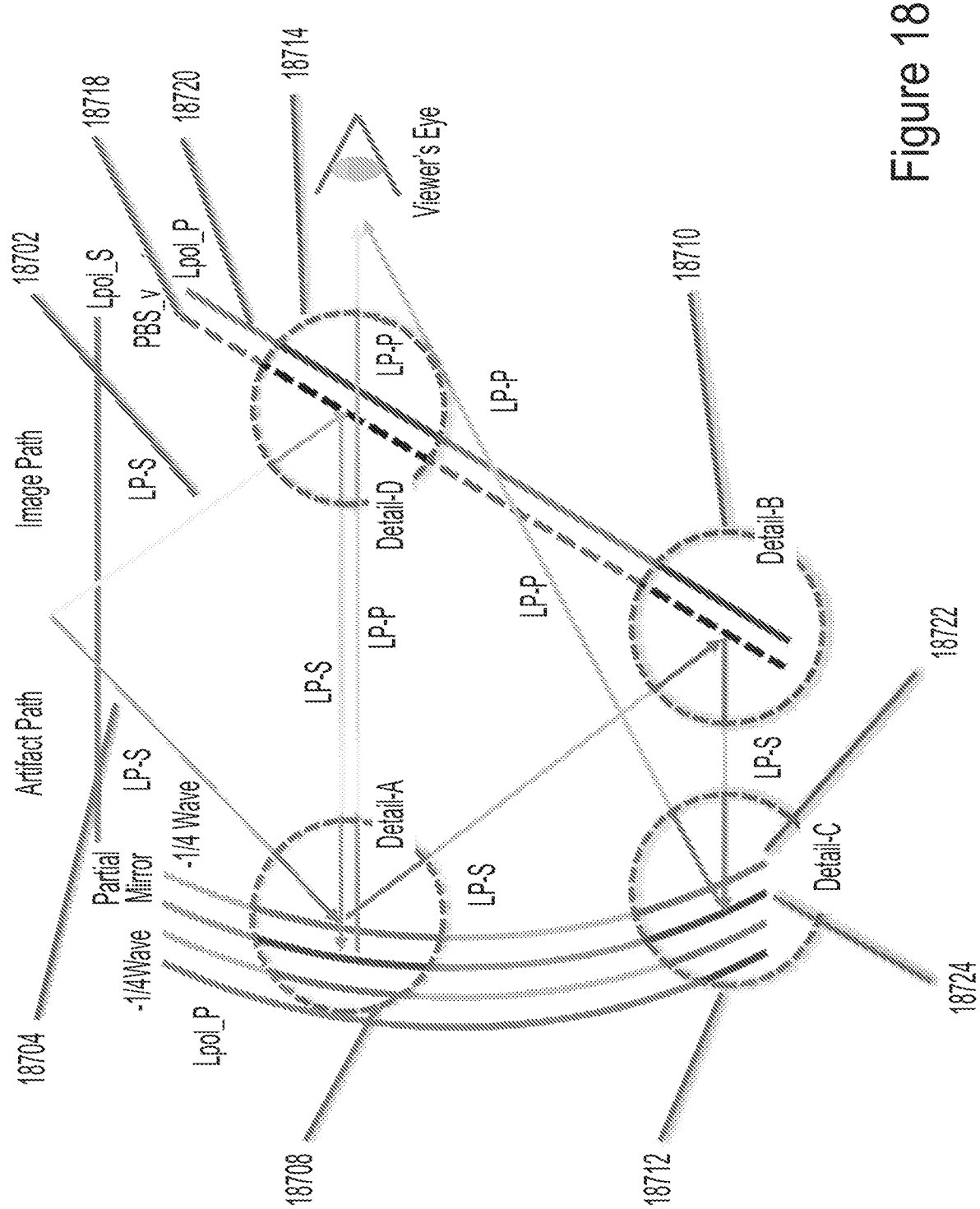

FIG. 187 illustrates a see-through display system with an undesirable artifact light path.

Figure 188:
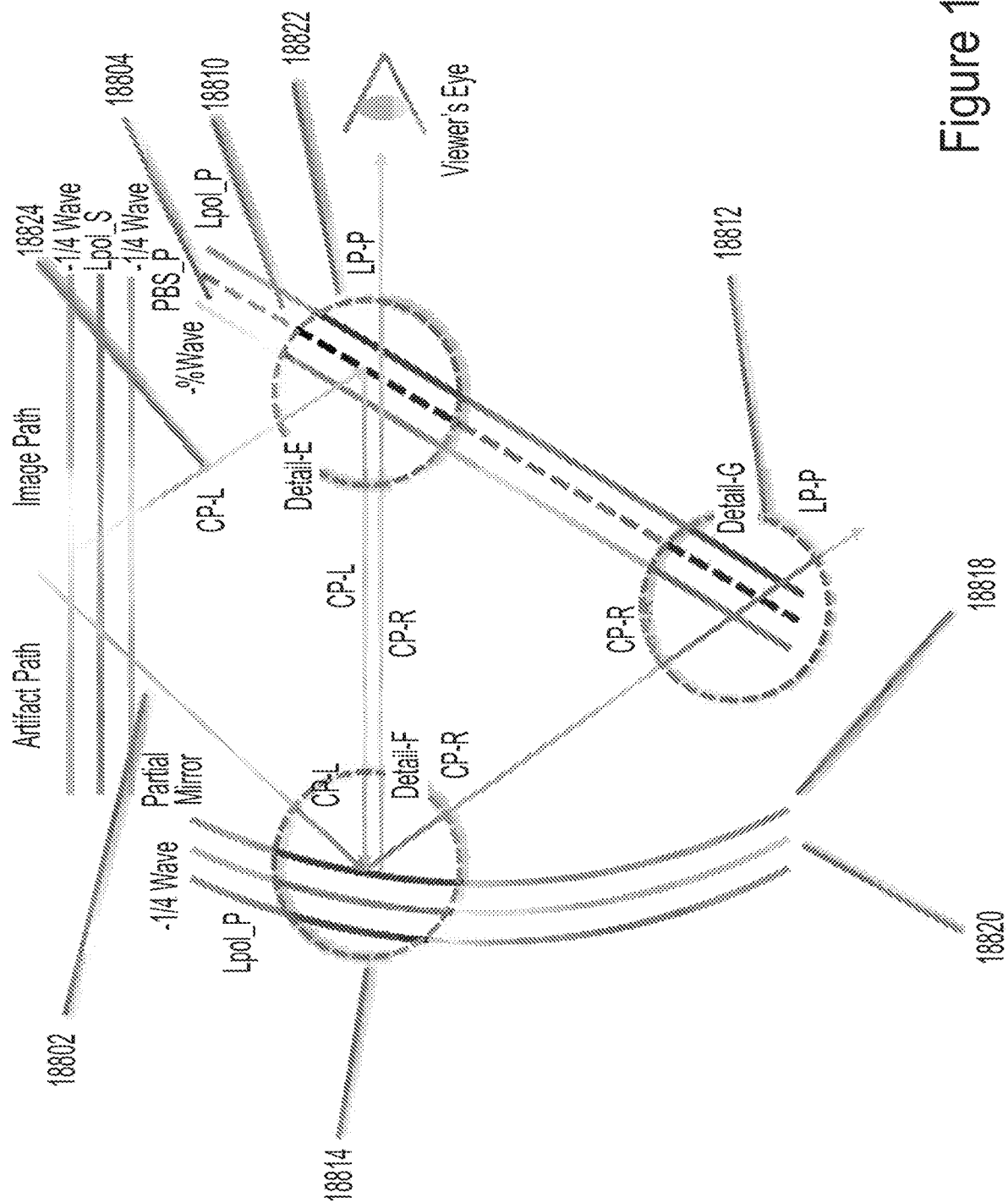

FIG. 188 illustrates a see-through display system with a polarization technology adapted to manage an undesirable artifact light path.

Figure 189:
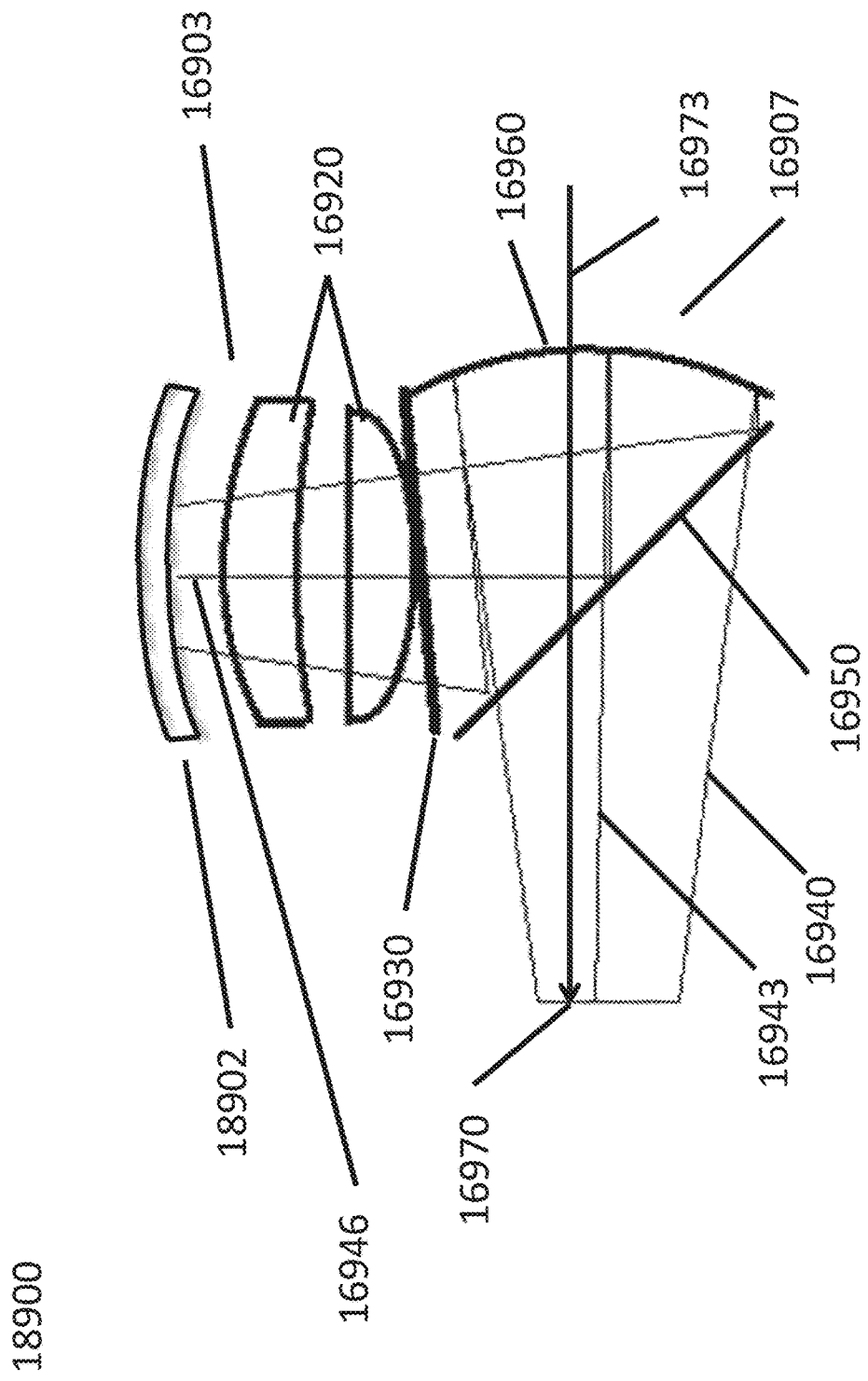

FIG. 189 illustrates a see-through display system with a curved OLED display panel.

Figure 190:
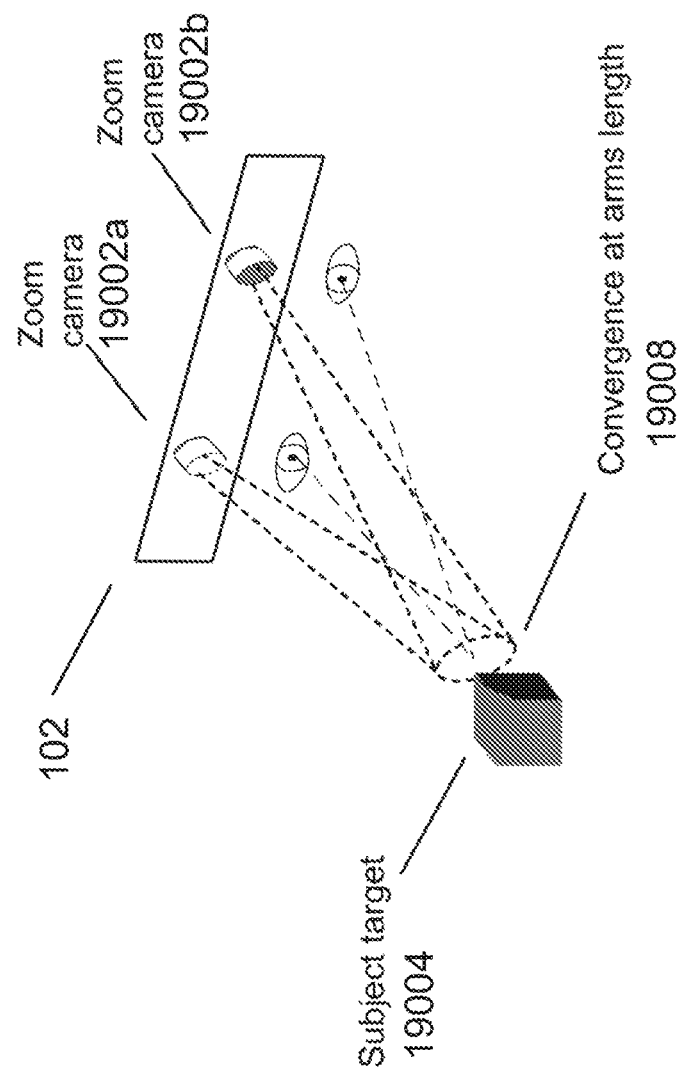

FIG. 190 depicts dual cameras with zoom capabilities that provide a stereo view of a target.

While the disclosure has been described in connection with certain preferred embodiments, other embodiments would be understood by one of ordinary skill in the art and are encompassed herein.

DETAILED DESCRIPTION OF THE PREFERRED EMBODIMENT(S)

Aspects of the present disclosure relate to head-worn computing ("HWC") systems. HWC involves, in some instances, a system that mimics the appearance of head-worn glasses or sunglasses. The glasses may be a fully developed computing platform, such as including computer displays presented in each of the lenses of the glasses to the eyes of the user. In embodiments, the lenses and displays may be configured to allow a person wearing the glasses to see the environment through the lenses while also seeing, simultaneously, digital imagery, which forms an overlaid image that is perceived by the person as a digitally augmented image of the environment, or augmented reality ("AR").

HWC involves more than just placing a computing system on a person's head. The system may need to be designed as a lightweight, compact and fully functional computer display, such as wherein the computer display includes a high resolution digital display that provides a high level of emersion comprised of the displayed digital content and the see-through view of the environmental surroundings. User interfaces and control systems suited to the HWC device may be required that are unlike those used for a more conventional computer such as a laptop. For the HWC and associated systems to be most effective, the glasses may be equipped with sensors to determine environmental conditions, geographic location, relative positioning to other points of interest, objects identified by imaging and movement by the user or other users in a connected group, and the like. The HWC may then change the mode of operation to match the conditions, location, positioning, movements, and the like, in a method generally referred to as a contextually aware HWC. The glasses also may need to be connected, wirelessly or otherwise, to other systems either locally or through a network. Controlling the glasses may be achieved through the use of an external device, automatically through contextually gathered information, through user gestures captured by the glasses sensors, and the like. Each technique may be further refined depending on the software application being used in the glasses. The glasses may further be used to control or coordinate with external devices that are associated with the glasses.

Figure 1:
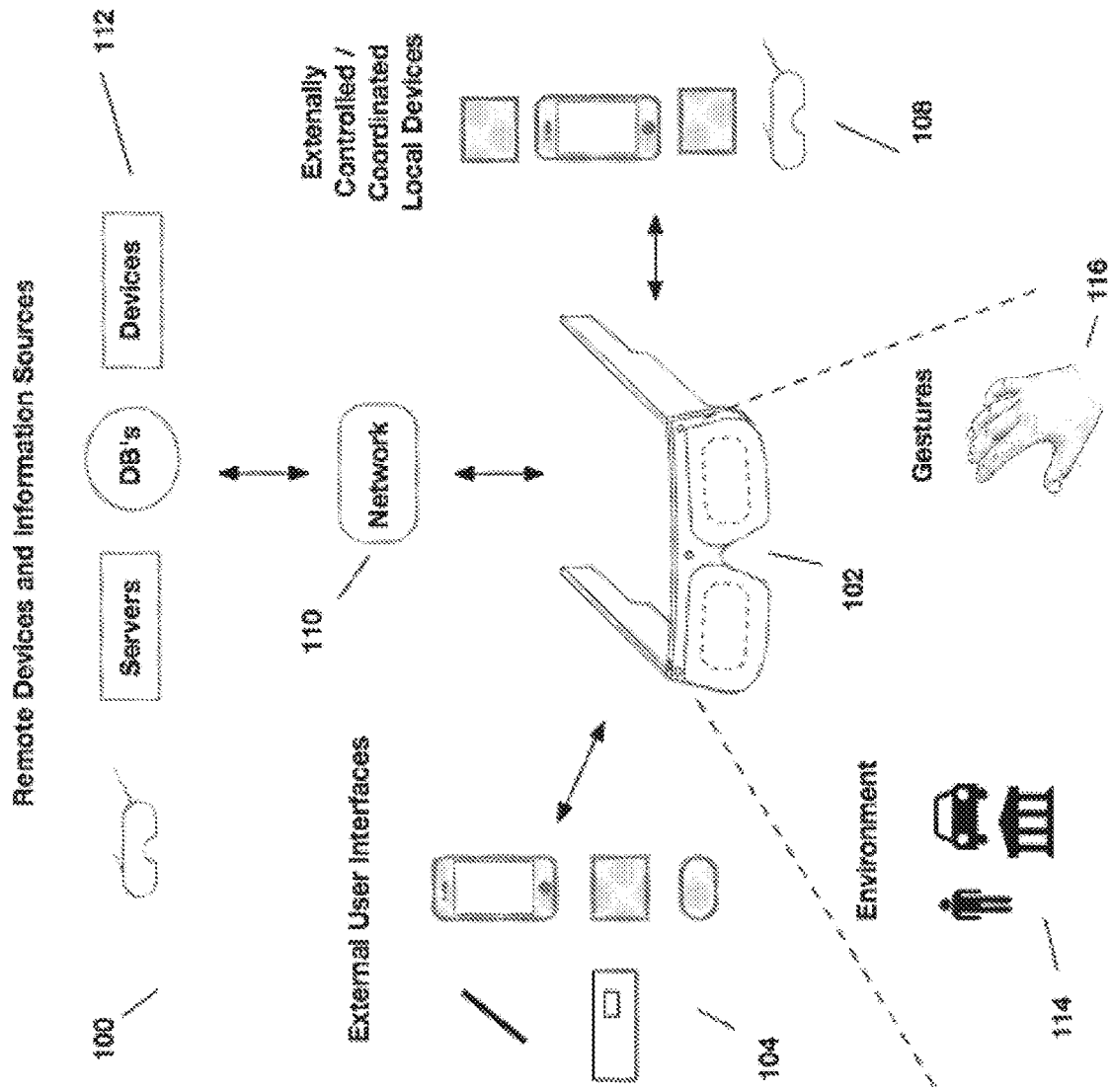
FIG. 1 illustrates a head worn computing system in accordance with the principles of the present disclosure.

Referring to FIG. 1, an overview of the HWC system 100 is presented. As shown, the HWC system 100 comprises a HWC 102, which in this instance is configured as glasses to be worn on the head with sensors such that the HWC 102 is aware of the objects and conditions in the environment 114. In this instance, the HWC 102 also receives and interprets control inputs such as gestures and movements 116. The HWC 102 may communicate with external user interfaces 104. The external user interfaces 104 may provide a physical user interface to take control instructions from a user of the HWC 102 and the external user interfaces 104 and the HWC 102 may communicate bi-directionally to affect the user's command and provide feedback to the external device 108. The HWC 102 may also communicate bi-directionally with externally controlled or coordinated local devices 108. For example, an external user interface 104 may be used in connection with the HWC 102 to control an externally controlled or coordinated local device 108. The externally controlled or coordinated local device 108 may provide feedback to the HWC 102 and a customized GUI may be presented in the HWC 102 based on the type of device or specifically identified device 108. The HWC 102 may also interact with remote devices and information sources 112 through a network connection 110. Again, the external user interface 104 may be used in connection with the HWC 102 to control or otherwise interact with any of the remote devices 108 and information sources 112 in a similar way as when the external user interfaces 104 are used to control or otherwise interact with the externally controlled or coordinated local devices 108. Similarly, HWC 102 may interpret gestures 116 (e.g. captured from forward, downward, upward, rearward facing sensors such as camera(s), range finders, IR sensors, etc.) or environmental conditions sensed in the environment 114 to control either local or remote devices 108 or 112.

We will now describe each of the main elements depicted on FIG. 1 in more detail; however, these descriptions are intended to provide general guidance and should not be construed as limiting. Additional description of each element may also be further described herein.

The HWC 102 is a computing platform intended to be worn on a person's head. The HWC 102 may take many different forms to fit many different functional requirements. In some situations, the HWC 102 will be designed in the form of conventional glasses. The glasses may or may not have active computer graphics displays. In situations where the HWC 102 has integrated computer displays the displays may be configured as see-through displays such that the digital imagery can be overlaid with respect to the user's view of the environment 114. There are a number of see-through optical designs that may be used, including ones that have a reflective display (e.g. LCoS, DLP), emissive displays (e.g. OLED, LED), hologram, TIR waveguides, and the like. In embodiments, lighting systems used in connection with the display optics may be solid state lighting systems, such as LED, OLED, quantum dot, quantum dot LED, etc. In addition, the optical configuration may be monocular or binocular. It may also include vision corrective optical components. In embodiments, the optics may be packaged as contact lenses. In other embodiments, the HWC 102 may be in the form of a helmet with a see-through shield, sunglasses, safety glasses, goggles, a mask, fire helmet with see-through shield, police helmet with see through shield, military helmet with see-through shield, utility form customized to a certain work task (e.g. inventory control, logistics, repair, maintenance, etc.), and the like.

The HWC 102 may also have a number of integrated computing facilities, such as an integrated processor, integrated power management, communication structures (e.g. cell net, WiFi, Bluetooth, local area connections, mesh connections, remote connections (e.g. client server, etc.)), and the like. The HWC 102 may also have a number of positional awareness sensors, such as GPS, electronic compass, altimeter, tilt sensor, IMU, and the like. It may also have other sensors such as a camera, rangefinder, hyperspectral camera, Geiger counter, microphone, spectral illumination detector, temperature sensor, chemical sensor, biologic sensor, moisture sensor, ultrasonic sensor, and the like.

The HWC 102 may also have integrated control technologies. The integrated control technologies may be contextual based control, passive control, active control, user control, and the like. For example, the HWC 102 may have an integrated sensor (e.g. camera) that captures user hand or body gestures 116 such that the integrated processing system can interpret the gestures and generate control commands for the HWC 102. In another example, the HWC 102 may have sensors that detect movement (e.g. a nod, head shake, and the like) including accelerometers, gyros and other inertial measurements, where the integrated processor may interpret the movement and generate a control command in response. The HWC 102 may also automatically control itself based on measured or perceived environmental conditions. For example, if it is bright in the environment the HWC 102 may increase the brightness or contrast of the displayed image. In embodiments, the integrated control technologies may be mounted on the HWC 102 such that a user can interact with it directly. For example, the HWC 102 may have a button(s), touch capacitive interface, and the like.

As described herein, the HWC 102 may be in communication with external user interfaces 104. The external user interfaces may come in many different forms. For example, a cell phone screen may be adapted to take user input for control of an aspect of the HWC 102. The external user interface may be a dedicated UI, such as a keyboard, touch surface, button(s), joy stick, and the like. In embodiments, the external controller may be integrated into another device such as a ring, watch, bike, car, and the like. In each case, the external user interface 104 may include sensors (e.g. IMU, accelerometers, compass, altimeter, and the like) to provide additional input for controlling the HWD 104.

As described herein, the HWC 102 may control or coordinate with other local devices 108. The external devices 108 may be an audio device, visual device, vehicle, cell phone, computer, and the like. For instance, the local external device 108 may be another HWC 102, where information may then be exchanged between the separate HWCs 108.

Similar to the way the HWC 102 may control or coordinate with local devices 106, the HWC 102 may control or coordinate with remote devices 112, such as the HWC 102 communicating with the remote devices 112 through a network 110. Again, the form of the remote device 112 may have many forms. Included in these forms is another HWC 102. For example, each HWC 102 may communicate its GPS position such that all the HWCs 102 know where all of HWC 102 are located.

Figure 2:
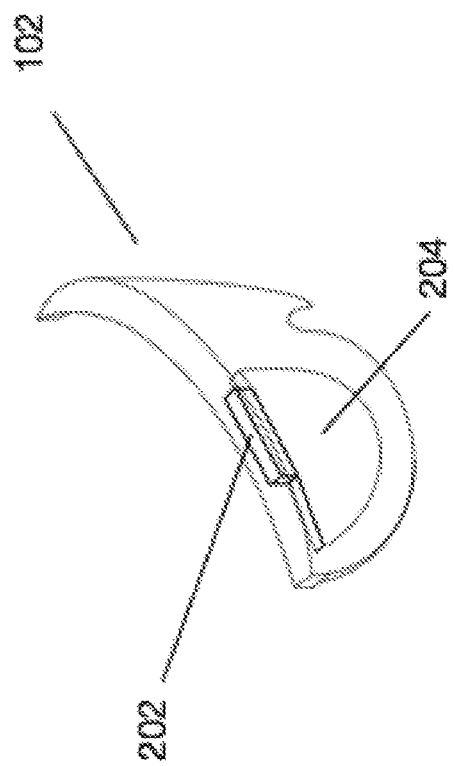
FIG. 2 illustrates a head worn computing system with optical system in accordance with the principles of the present disclosure.

FIG. 2 illustrates a HWC 102 with an optical system that includes an upper optical module 202 and a lower optical module 204. While the upper and lower optical modules 202 and 204 will generally be described as separate modules, it should be understood that this is illustrative only and the present disclosure includes other physical configurations, such as that when the two modules are combined into a single module or where the elements making up the two modules are configured into more than two modules. In embodiments, the upper module 202 includes a computer controlled display (e.g. LCoS, DLP, OLED, etc.) and image light delivery optics. In embodiments, the lower module includes eye delivery optics that are configured to receive the upper module's image light and deliver the image light to the eye of a wearer of the HWC. In FIG. 2, it should be noted that while the upper and lower optical modules 202 and 204 are illustrated in one side of the HWC such that image light can be delivered to one eye of the wearer, that it is envisioned by the present disclosure that embodiments will contain two image light delivery systems, one for each eye.

Figure 3B:
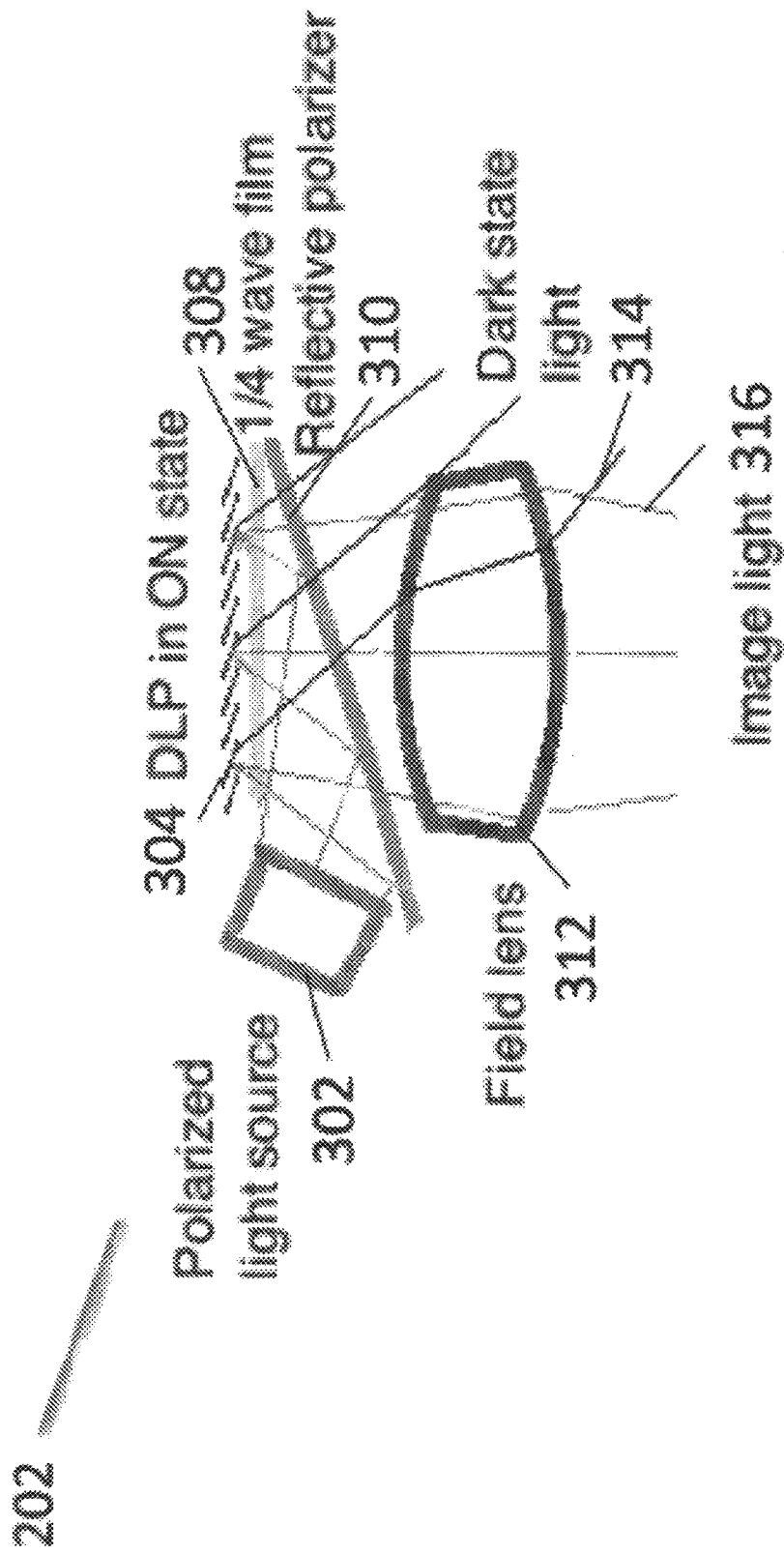
FIG. 3b illustrates an upper optical module in accordance with the principles of the present disclosure.

FIG. 3b illustrates an upper optical module 202 in accordance with the principles of the present disclosure. In this embodiment, the upper optical module 202 includes a DLP (also known as DMD or digital micromirror device) computer operated display 304 which includes pixels comprised of rotatable mirrors (such as, for example, the DLP3000 available from Texas Instruments), polarized light source 302, ¼ wave retarder film 308, reflective polarizer 310 and a field lens 312. The polarized light source 302 provides substantially uniform polarized light that is generally directed towards the reflective polarizer 310. The reflective polarizer reflects light of one polarization state (e.g. S polarized light) and transmits light of the other polarization state (e.g. P polarized light). The polarized light source 302 and the reflective polarizer 310 are oriented so that the polarized light from the polarized light source 302 is reflected generally towards the DLP 304. The light then passes through the ¼ wave film 308 once before illuminating the pixels of the DLP 304 and then again after being reflected by the pixels of the DLP 304. In passing through the ¼ wave film 308 twice, the light is converted from one polarization state to the other polarization state (e.g. the light is converted from S to P polarized light). The light then passes through the reflective polarizer 310. In the event that the DLP pixel(s) are in the "on" state (i.e. the mirrors are positioned to reflect light towards the field lens 312, the "on" pixels reflect the light generally along the optical axis and into the field lens 312. This light that is reflected by "on" pixels and which is directed generally along the optical axis of the field lens 312 will be referred to as image light 316. The image light 316 then passes through the field lens to be used by a lower optical module 204.

The light that is provided by the polarized light source 302, which is subsequently reflected by the reflective polarizer 310 before it reflects from the DLP 304, will generally be referred to as illumination light. The light that is reflected by the "off" pixels of the DLP 304 is reflected at a different angle than the light reflected by the "on" pixels, so that the light from the "off" pixels is generally directed away from the optical axis of the field lens 312 and toward the side of the upper optical module 202 as shown in FIG. 3. The light that is reflected by the "off" pixels of the DLP 304 will be referred to as dark state light 314.

The DLP 304 operates as a computer controlled display and is generally thought of as a MEMs device. The DLP pixels are comprised of small mirrors that can be directed.

The mirrors generally flip from one angle to another angle. The two angles are generally referred to as states. When light is used to illuminate the DLP the mirrors will reflect the light in a direction depending on the state. In embodiments herein, we generally refer to the two states as "on" and "off," which is intended to depict the condition of a display pixel. "On" pixels will be seen by a viewer of the display as emitting light because the light is directed along the optical axis and into the field lens and the associated remainder of the display system. "Off" pixels will be seen by a viewer of the display as not emitting light because the light from these pixels is directed to the side of the optical housing and into a light trap or light dump where the light is absorbed. The pattern of "on" and "off" pixels produces image light that is perceived by a viewer of the display as a computer generated image. Full color images can be presented to a user by sequentially providing illumination light with complimentary colors such as red, green and blue. Where the sequence is presented in a recurring cycle that is faster than the user can perceive as separate images and as a result the user perceives a full color image comprised of the sum of the sequential images. Bright pixels in the image are provided by pixels that remain in the "on" state for the entire time of the cycle, while dimmer pixels in the image are provided by pixels that switch between the "on" state and "off" state within the time of the cycle, or frame time when in a video sequence of images.

FIG. 3a shows an illustration of a system for a DLP 304 in which the unpolarized light source 350 is pointed directly at the DLP 304. In this case, the angle required for the illumination light is such that the field lens 352 must be positioned substantially distant from the DLP 304 to avoid the illumination light from being clipped by the field lens 352. The large distance between the field lens 352 and the DLP 304 along with the straight path of the dark state light 354, means that the light trap for the dark state light 354 is also located at a substantial distance from the DLP. For these reasons, this configuration is larger in size compared to the upper optics module 202 of the preferred embodiments.

The configuration illustrated in FIG. 3b can be lightweight and compact such that it fits into a small portion of a HWC. For example, the upper modules 202 illustrated herein can be physically adapted to mount in an upper frame of a HWC such that the image light can be directed into a lower optical module 204 for presentation of digital content to a wearer's eye. The package of components that combine to generate the image light (i.e. the polarized light source 302, DLP 304, reflective polarizer 310 and ¼ wave film 308) is very light and is compact. The height of the system, excluding the field lens, may be less than 8 mm. The width (i.e. from front to back) may be less than 8 mm. The weight may be less than 2 grams. The compactness of this upper optical module 202 allows for a compact mechanical design of the HWC and the light weight nature of these embodiments help make the HWC lightweight to provide for a HWC that is comfortable for a wearer of the HWC.

The configuration illustrated in FIG. 3b can produce sharp contrast, high brightness and deep blacks, especially when compared to LCD or LCoS displays used in HWC. The "on" and "off" states of the DLP provide for a strong differentiator in the light reflection path representing an "on" pixel and an "off" pixel. As will be discussed in more detail below, the dark state light from the "off" pixel reflections can be managed to reduce stray light in the display system to produce images with high contrast.

Figure 4:
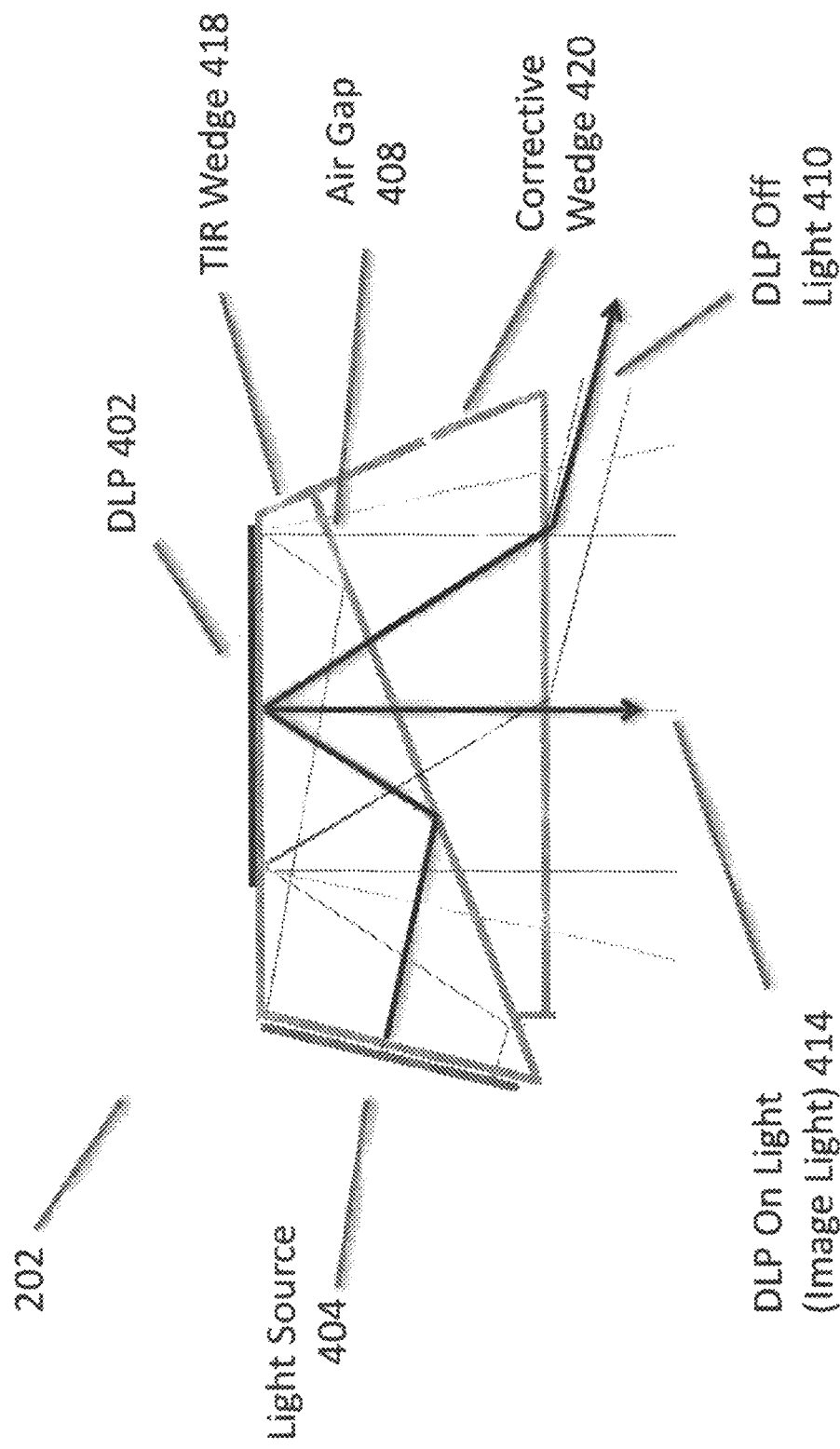
FIG. 4 illustrates an upper optical module in accordance with the principles of the present disclosure.

FIG. 4 illustrates another embodiment of an upper optical module 202 in accordance with the principles of the present disclosure. This embodiment includes a light source 404, but in this case, the light source can provide unpolarized illumination light. The illumination light from the light source 404 is directed into a TIR wedge 418 such that the illumination light is incident on an internal surface of the TIR wedge 418 (shown as the angled lower surface of the TRI wedge 418 in FIG. 4) at an angle that is beyond the critical angle as defined by Eqn 1.

$$\text{Critical angle} = \arcsin(1/n) \quad \text{Eqn 1}$$

Where the critical angle is the angle beyond which the illumination light is reflected from the internal surface when the internal surface comprises an interface from a solid with a higher refractive index (n) to air with a refractive index of 1 (e.g. for an interface of acrylic, with a refractive index of n=1.5, to air, the critical angle is 41.8 degrees; for an interface of polycarbonate, with a refractive index of n=1.59, to air the critical angle is 38.9 degrees). Consequently, the TIR wedge 418 is associated with a thin air gap 408 along the internal surface to create an interface between a solid with a higher refractive index and air. By choosing the angle of the light source 404 relative to the DLP 402 in correspondence to the angle of the internal surface of the TIR wedge 418, illumination light is turned toward the DLP 402 at an angle suitable for providing image light 414 as reflected from "on" pixels. Wherein, the illumination light is provided to the DLP 402 at approximately twice the angle of the pixel mirrors in the DLP 402 that are in the "on" state, such that after reflecting from the pixel mirrors, the image light 414 is directed generally along the optical axis of the field lens. Depending on the state of the DLP pixels, the illumination light from "on" pixels may be reflected as image light 414 which is directed towards a field lens and a lower optical module 204, while illumination light reflected from "off" pixels (generally referred to herein as "dark" state light, "off" pixel light or "off" state light) 410 is directed in a separate direction, which may be trapped and not used for the image that is ultimately presented to the wearer's eye.

The light trap for the dark state light 410 may be located along the optical axis defined by the direction of the dark state light 410 and in the side of the housing, with the function of absorbing the dark state light. To this end, the light trap may be comprised of an area outside of the cone of image light 414 from the "on" pixels. The light trap is typically made up of materials that absorb light including coatings of black paints or other light absorbing materials to prevent light scattering from the dark state light degrading the image perceived by the user. In addition, the light trap may be recessed into the wall of the housing or include masks or guards to block scattered light and prevent the light trap from being viewed adjacent to the displayed image.

The embodiment of FIG. 4 also includes a corrective wedge 420 to correct the effect of refraction of the image light 414 as it exits the TIR wedge 418. By including the corrective wedge 420 and providing a thin air gap 408 (e.g. 25 micron), the image light from the "on" pixels can be maintained generally in a direction along the optical axis of the field lens (i.e. the same direction as that defined by the image light 414) so it passes into the field lens and the lower optical module 204. As shown in FIG. 4, the image light 414 from the "on" pixels exits the corrective wedge 420 generally perpendicular to the surface of the corrective wedge 420 while the dark state light exits at an oblique angle. As a result, the direction of the image light 414 from the "on" pixels is largely unaffected by refraction as it exits from the surface of the corrective wedge 420. In contrast, the dark state light 410 is substantially changed in direction by refraction when the dark state light 410 exits the corrective wedge 420.

Figure 4A:
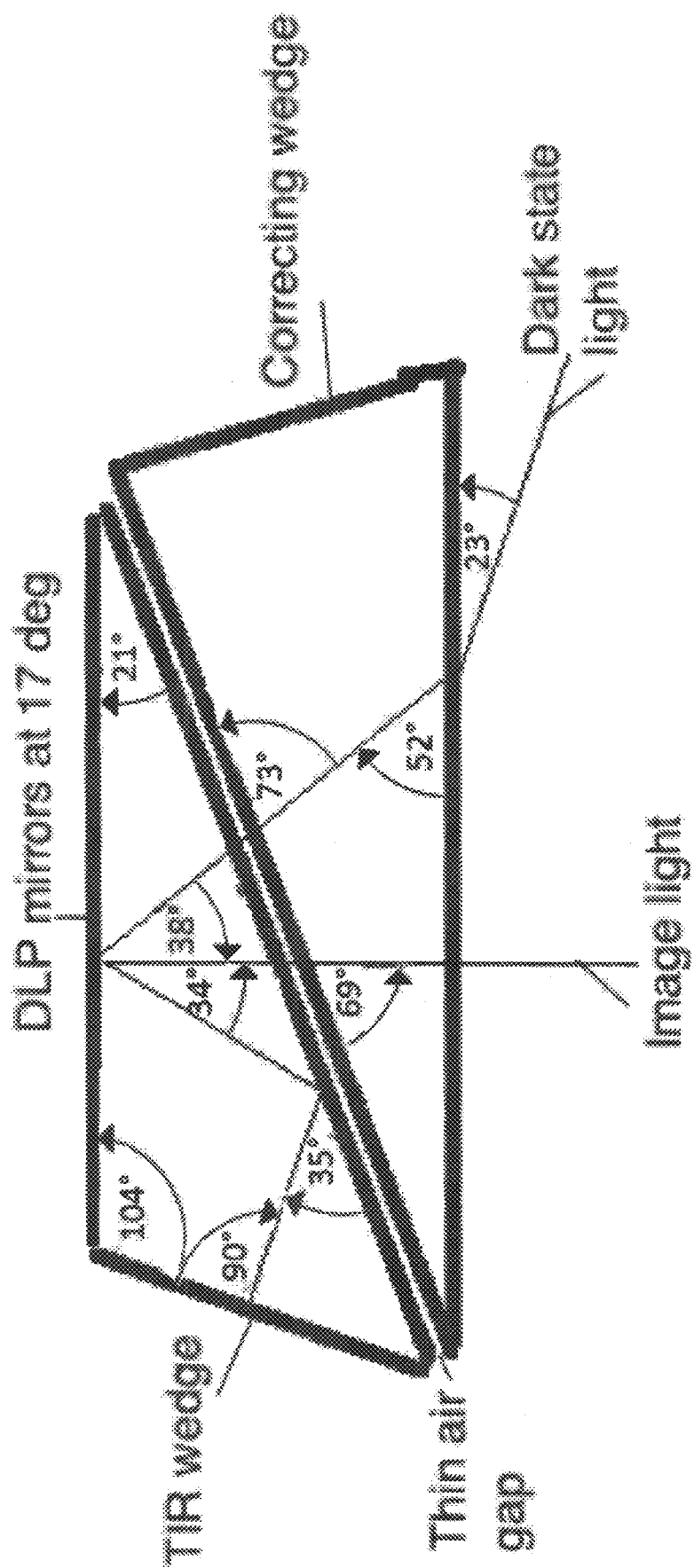
FIG. 4a illustrates an upper optical module in accordance with the principles of the present disclosure.

The embodiment illustrated in FIG. 4 has the similar advantages of those discussed in connection with the embodiment of FIG. 3b. The dimensions and weight of the upper module 202 depicted in FIG. 4 may be approximately 8×8 mm with a weight of less than 3 grams. A difference in overall performance between the configuration illustrated in FIG. 3b and the configuration illustrated in FIG. 4 is that the embodiment of FIG. 4 doesn't require the use of polarized light as supplied by the light source 404. This can be an advantage in some situations as will be discussed in more detail below (e.g. increased see-through transparency of the HWC optics from the user's perspective). Polarized light may be used in connection with the embodiment depicted in FIG. 4, in embodiments. An additional advantage of the embodiment of FIG. 4 compared to the embodiment shown in FIG. 3b is that the dark state light (shown as DLP off light 410) is directed at a steeper angle away from the optical axis of the image light 414 due to the added refraction encountered when the dark state light 410 exits the corrective wedge 420. This steeper angle of the dark state light 410 allows for the light trap to be positioned closer to the DLP 402 so that the overall size of the upper module 202 can be reduced. The light trap can also be made larger since the light trap doesn't interfere with the field lens, thereby the efficiency of the light trap can be increased and as a result, stray light can be reduced and the contrast of the image perceived by the user can be increased. FIG. 4a illustrates the embodiment described in connection with FIG. 4 with an example set of corresponding angles at the various surfaces with the reflected angles of a ray of light passing through the upper optical module 202. In this example, the DLP mirrors are provided at 17 degrees to the surface of the DLP device. The angles of the TIR wedge are selected in correspondence to one another to provide TIR reflected illumination light at the correct angle for the DLP mirrors while allowing the image light and dark state light to pass through the thin air gap, various combinations of angles are possible to achieve this.

Figure 5:
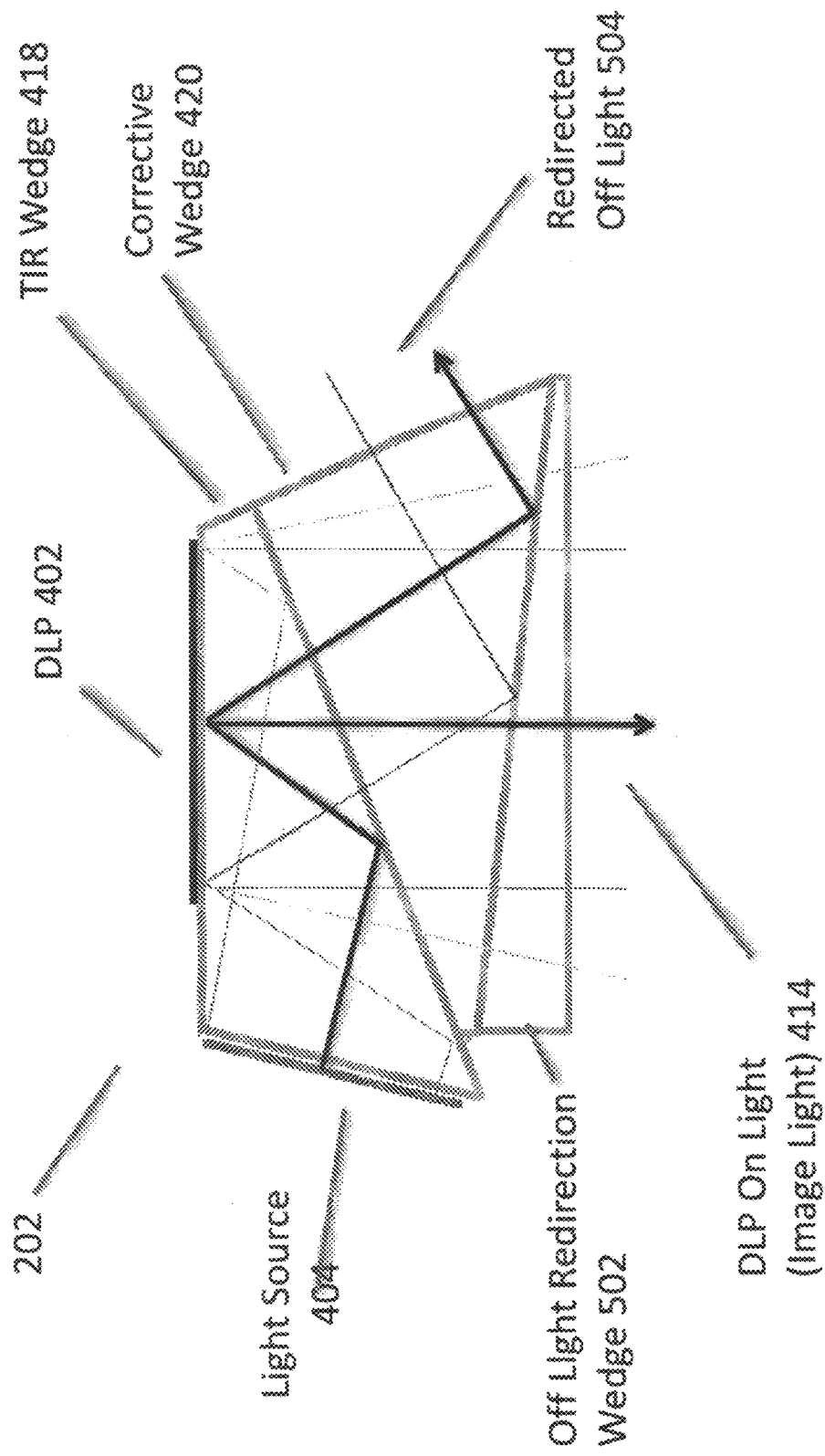
FIG. 5 illustrates an upper optical module in accordance with the principles of the present disclosure.
Figure 5A:
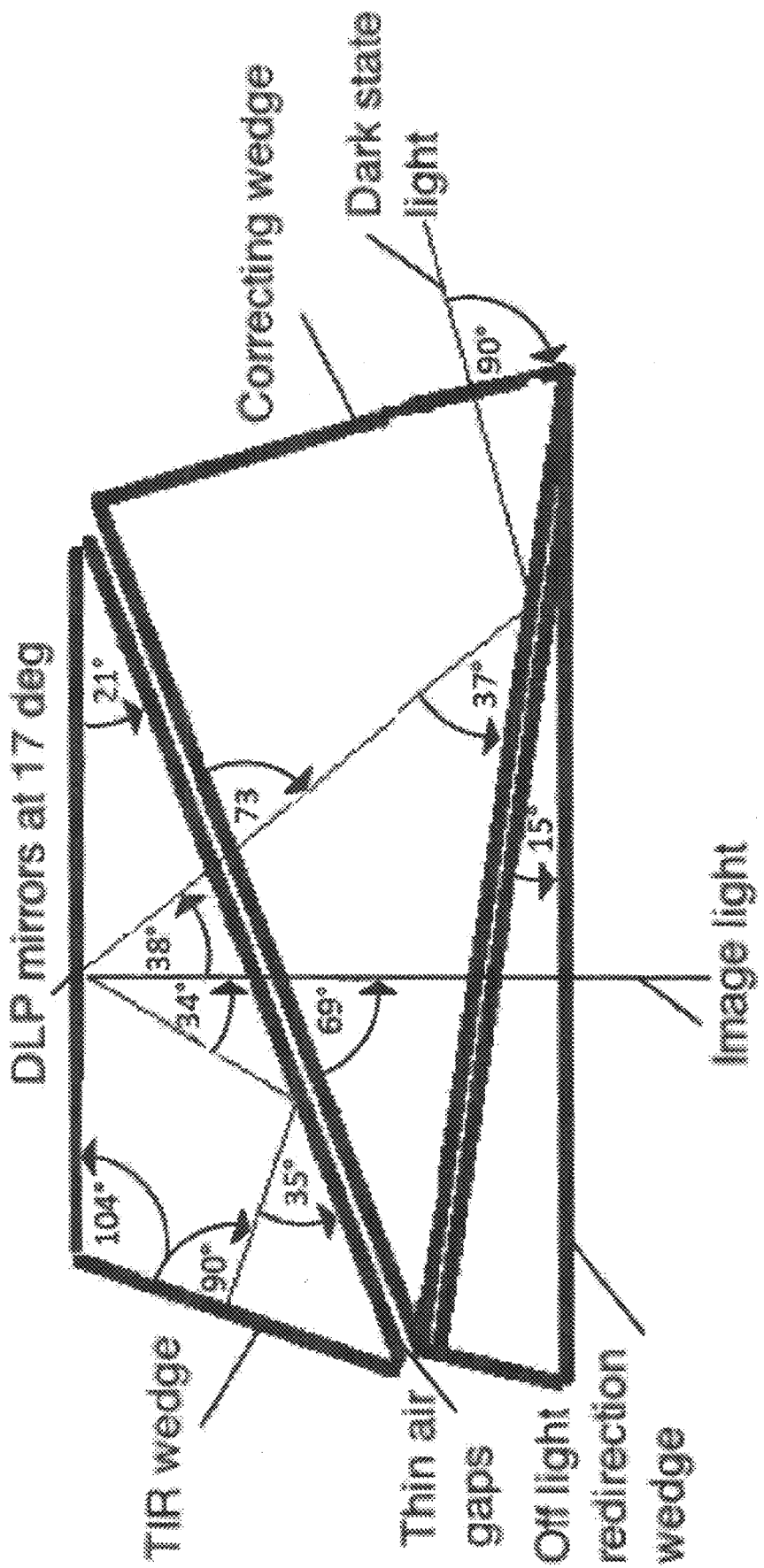
FIG. 5a illustrates an upper optical module in accordance with the principles of the present disclosure.

FIG. 5 illustrates yet another embodiment of an upper optical module 202 in accordance with the principles of the present disclosure. As with the embodiment shown in FIG. 4, the embodiment shown in FIG. 5 does not require the use of polarized light. Polarized light may be used in connection with this embodiment, but it is not required. The optical module 202 depicted in FIG. 5 is similar to that presented in connection with FIG. 4; however, the embodiment of FIG. 5 includes an off light redirection wedge 502. As can be seen from the illustration, the off light redirection wedge 502 allows the image light 414 to continue generally along the optical axis toward the field lens and into the lower optical module 204 (as illustrated). However, the off light 504 is redirected substantially toward the side of the corrective wedge 420 where it passes into the light trap. This configuration may allow further height compactness in the HWC because the light trap (not illustrated) that is intended to absorb the off light 504 can be positioned laterally adjacent the upper optical module 202 as opposed to below it. In the embodiment depicted in FIG. 5 there is a thin air gap between the TIR wedge 418 and the corrective wedge 420 (similar to the embodiment of FIG. 4). There is also a thin air gap between the corrective wedge 420 and the off light redirection wedge 502. There may be HWC mechanical configurations that warrant the positioning of a light trap for the dark state light elsewhere and the illustration depicted in FIG. 5 should be considered illustrative of the concept that the off light can be redirected to create compactness of the overall HWC. FIG. 5a illustrates an example of the embodiment described in connection with FIG. 5 with the addition of more details on the relative angles at the various surfaces and a light ray trace for image light and a light ray trace for dark light are shown as it passes through the upper optical module 202. Again, various combinations of angles are possible.

Figure 4B:
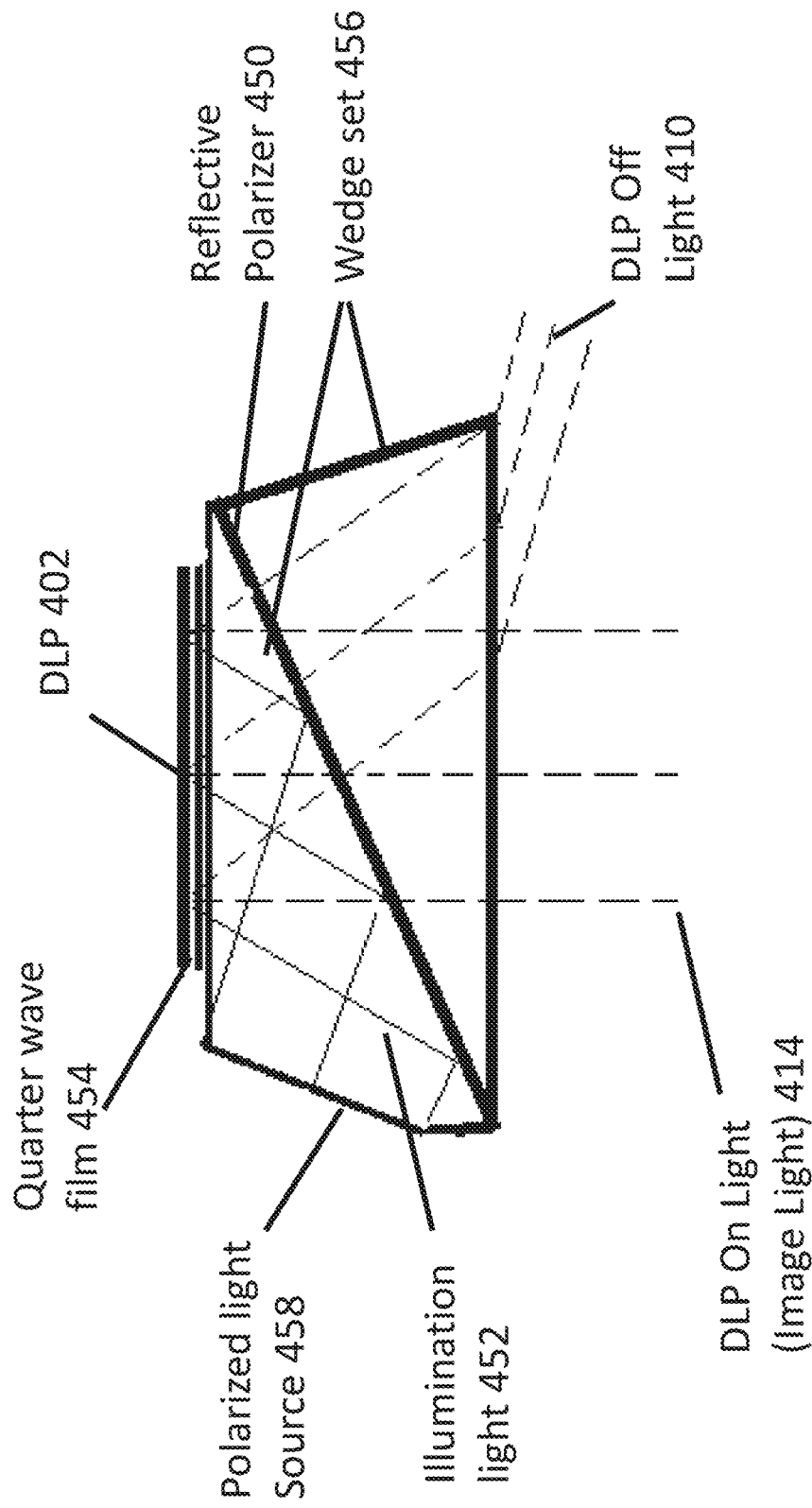
FIG. 4b illustrates an upper optical module in accordance with the principles of the present disclosure.

FIG. 4b shows an illustration of a further embodiment in which a solid transparent matched set of wedges 456 is provided with a reflective polarizer 450 at the interface between the wedges. Wherein the interface between the wedges in the wedge set 456 is provided at an angle so that illumination light 452 from the polarized light source 458 is reflected at the proper angle (e.g. 34 degrees for a 17 degree DLP mirror) for the DLP mirror "on" state so that the reflected image light 414 is provided along the optical axis of the field lens. The general geometry of the wedges in the wedge set 456 is similar to that shown in FIGS. 4 and 4a. A quarter wave film 454 is provided on the DLP 402 surface so that the illumination light 452 is one polarization state (e.g. S polarization state) while in passing through the quarter wave film 454, reflecting from the DLP mirror and passing back through the quarter wave film 454, the image light 414 is converted to the other polarization state (e.g. P polarization state). The reflective polarizer is oriented such that the illumination light 452 with its polarization state is reflected and the image light 414 with its other polarization state is transmitted. Since the dark state light from the "off" pixels 410 also passes through the quarter wave film 454 twice, it is also the other polarization state (e.g. P polarization state) so that it is transmitted by the reflective polarizer 450.

The angles of the faces of the wedge set 450 correspond to the needed angles to provide illumination light 452 at the angle needed by the DLP mirrors when in the "on" state so that the reflected image light 414 is reflected from the DLP along the optical axis of the field lens. The wedge set 456 provides an interior interface where a reflective polarizer film can be located to redirect the illumination light 452 toward the mirrors of the DLP 402. The wedge set also provides a matched wedge on the opposite side of the reflective polarizer 450 so that the image light 414 from the "on" pixels exits the wedge set 450 substantially perpendicular to the exit surface, while the dark state light from the 'off' pixels 410 exits at an oblique angle to the exit surface. As a result, the image light 414 is substantially unrefracted upon exiting the wedge set 456, while the dark state light from the "off" pixels 410 is substantially refracted upon exiting the wedge set 456 as shown in FIG. 4b.

By providing a solid transparent matched wedge set, the flatness of the interface is reduced, because variations in the flatness have a negligible effect as long as they are within the cone angle of the illuminating light 452. Which can be f #2.2 with a 26 degree cone angle. In a preferred embodiment, the reflective polarizer is bonded between the matched internal surfaces of the wedge set 456 using an optical adhesive so that Fresnel reflections at the interfaces on either side of the reflective polarizer 450 are reduced. The optical adhesive can be matched in refractive index to the material of the wedge set 456 and the pieces of the wedge set 456 can be all made from the same material such as BK7 glass or cast acrylic. Wherein the wedge material can be selected to have low birefringence as well to reduce non-uniformities in brightness. The wedge set 456 and the quarter wave film 454 can also be bonded to the DLP 402 to further reduce Fresnel reflections at the DLP interface losses. In addition, since the image light 414 is substantially normal to the exit surface of the wedge set 456, the flatness of the surface is not critical to maintain the wavefront of the image light 414 so that high image quality can be obtained in the displayed image without requiring very tightly toleranced flatness on the exit surface.

A yet further embodiment of the disclosure that is not illustrated, combines the embodiments illustrated in FIG. 4b and FIG. 5. In this embodiment, the wedge set 456 is comprised of three wedges with the general geometry of the wedges in the wedge set corresponding to that shown in FIGS. 5 and 5a. A reflective polarizer is bonded between the first and second wedges similar to that shown in FIG. 4b, however, a third wedge is provided similar to the embodiment of FIG. 5. Wherein there is an angled thin air gap between the second and third wedges so that the dark state light is reflected by TIR toward the side of the second wedge where it is absorbed in a light trap. This embodiment, like the embodiment shown in FIG. 4b, uses a polarized light source as has been previously described. The difference in this embodiment is that the image light is transmitted through the reflective polarizer and is transmitted through the angled thin air gap so that it exits normal to the exit surface of the third wedge.

Figure 5B:
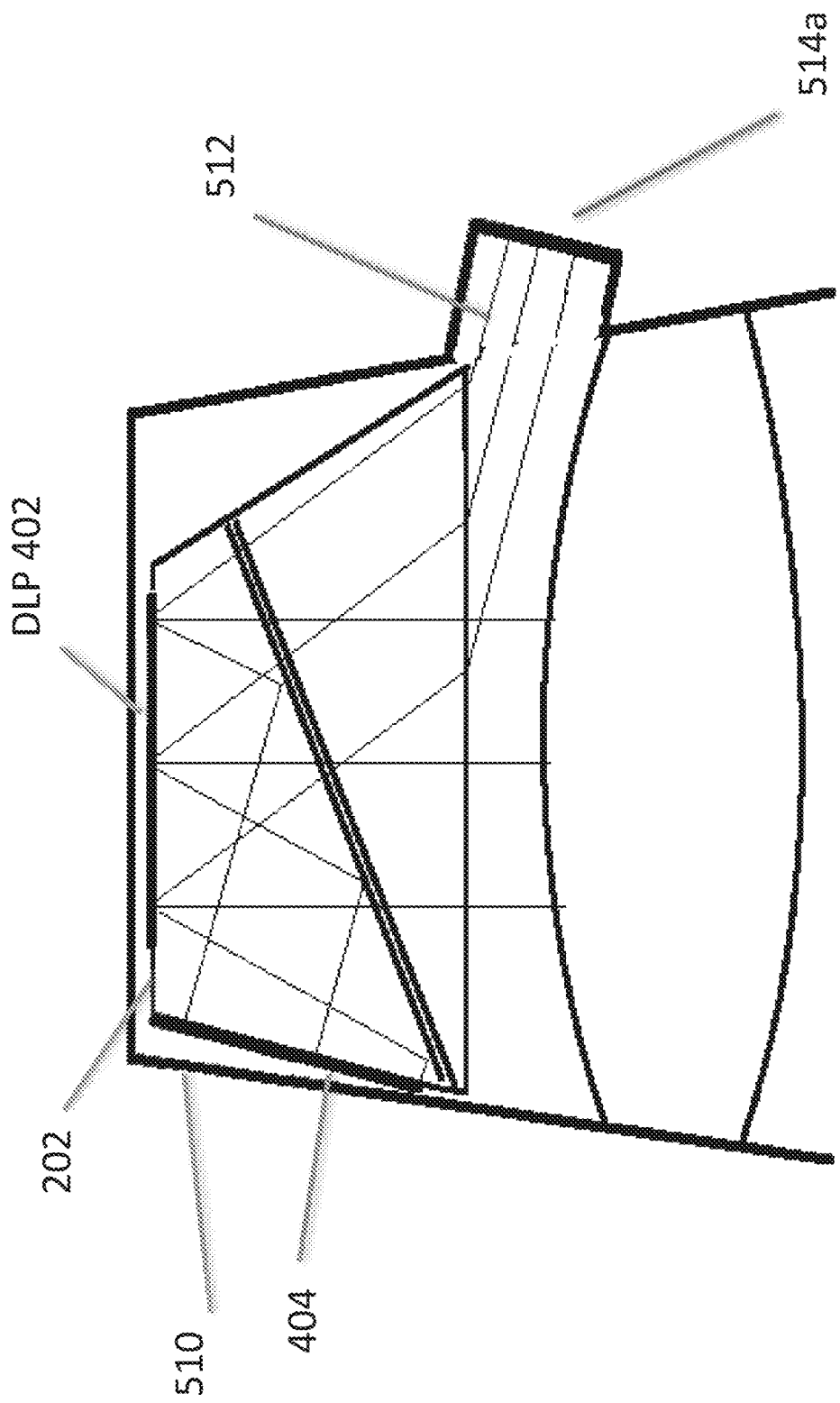
FIG. 5b illustrates an upper optical module and dark light trap according to the principles of the present disclosure.

FIG. 5b illustrates an upper optical module 202 with a dark light trap 514a. As described in connection with FIGS. 4 and 4a, image light can be generated from a DLP when using a TIR and corrective lens configuration. The upper module may be mounted in a HWC housing 510 and the housing 510 may include a dark light trap 514a. The dark light trap 514a is generally positioned/constructed/formed in a position that is optically aligned with the dark light optical axis 512. As illustrated, the dark light trap may have depth such that the trap internally reflects dark light in an attempt to further absorb the light and prevent the dark light from combining with the image light that passes through the field lens. The dark light trap may be of a shape and depth such that it absorbs the dark light. In addition, the dark light trap 514b, in embodiments, may be made of light absorbing materials or coated with light absorbing materials. In embodiments, the recessed light trap 514a may include baffles to block a view of the dark state light. This may be combined with black surfaces and textured or fibrous surfaces to help absorb the light. The baffles can be part of the light trap, associated with the housing, or field lens, etc.

Figure 5C:
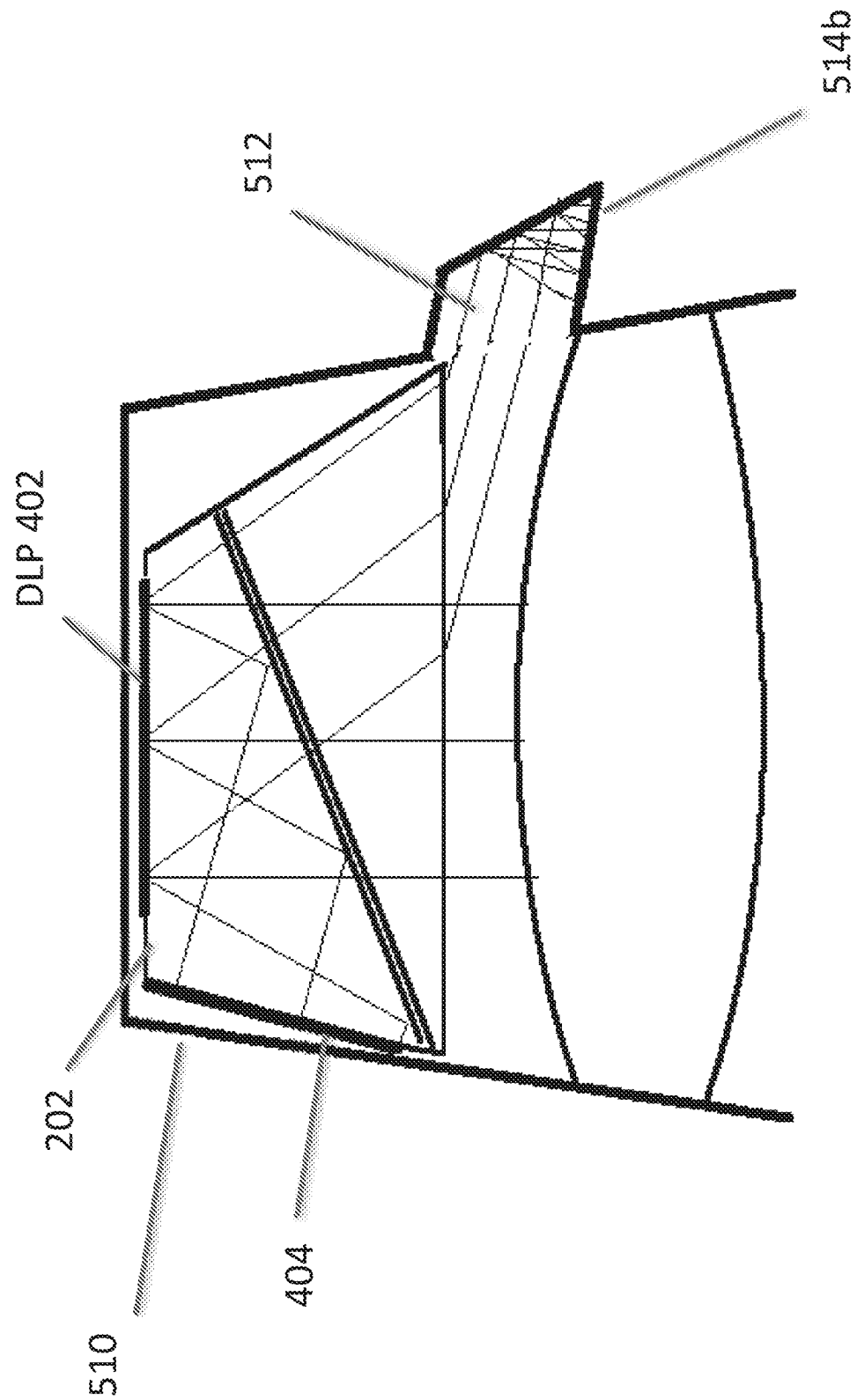
FIG. 5c illustrates an upper optical module and dark light trap according to the principles of the present disclosure.
Figure 5D:
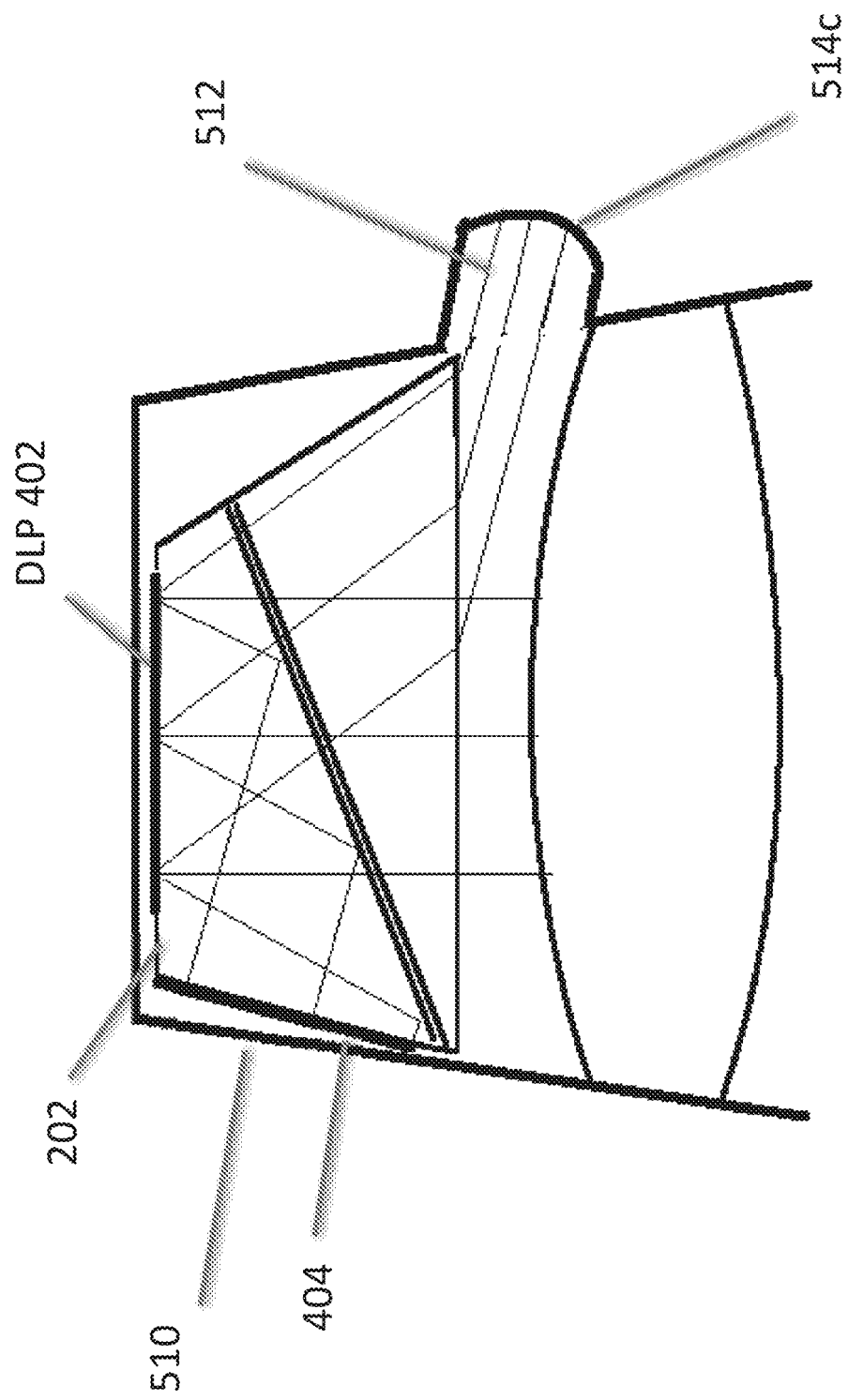
FIG. 5d illustrates an upper optical module and dark light trap according to the principles of the present disclosure.

FIG. 5c illustrates another embodiment with a light trap 514b. As can be seen in the illustration, the shape of the trap is configured to enhance internal reflections within the light trap 514b to increase the absorption of the dark light 512. FIG. 5d illustrates another embodiment with a light trap 514c. As can be seen in the illustration, the shape of the trap 514c is configured to enhance internal reflections to increase the absorption of the dark light 512.

Figure 5E:
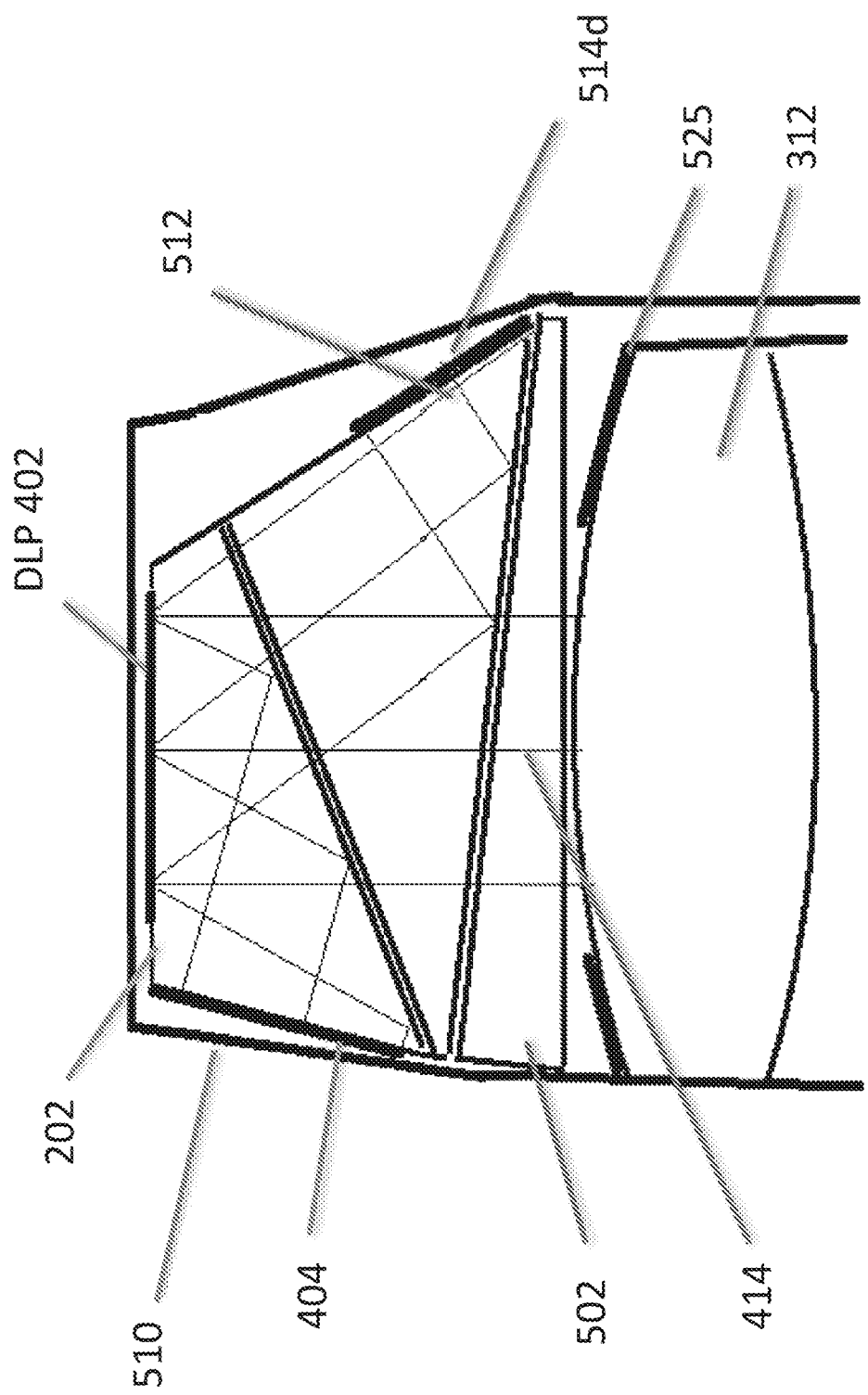
FIG. 5e illustrates an upper optical module and dark light trap according to the principles of the present disclosure.

Figure 5e illustrates another embodiment of an upper optical module 202 with a dark light trap 514d. This embodiment of upper module 202 includes an off light reflection wedge 502, as illustrated and described in connection with the embodiment of FIG. 5 and 5a. As can be seen in figure 5e, the light trap 514d is positioned along the optical path of the dark light 512. The dark light trap 514d may be configured as described in other embodiments herein. The embodiment of the light trap 514d illustrated in figure 5e includes a black area on the side wall of the wedge, wherein the side wall is located substantially away from the optical axis of the image light 414. In addition, baffles 5252 may be added to one or more edges of the field lens 312 to block the view of the light trap 514d adjacent to the displayed image seen by the user.

Figure 6:
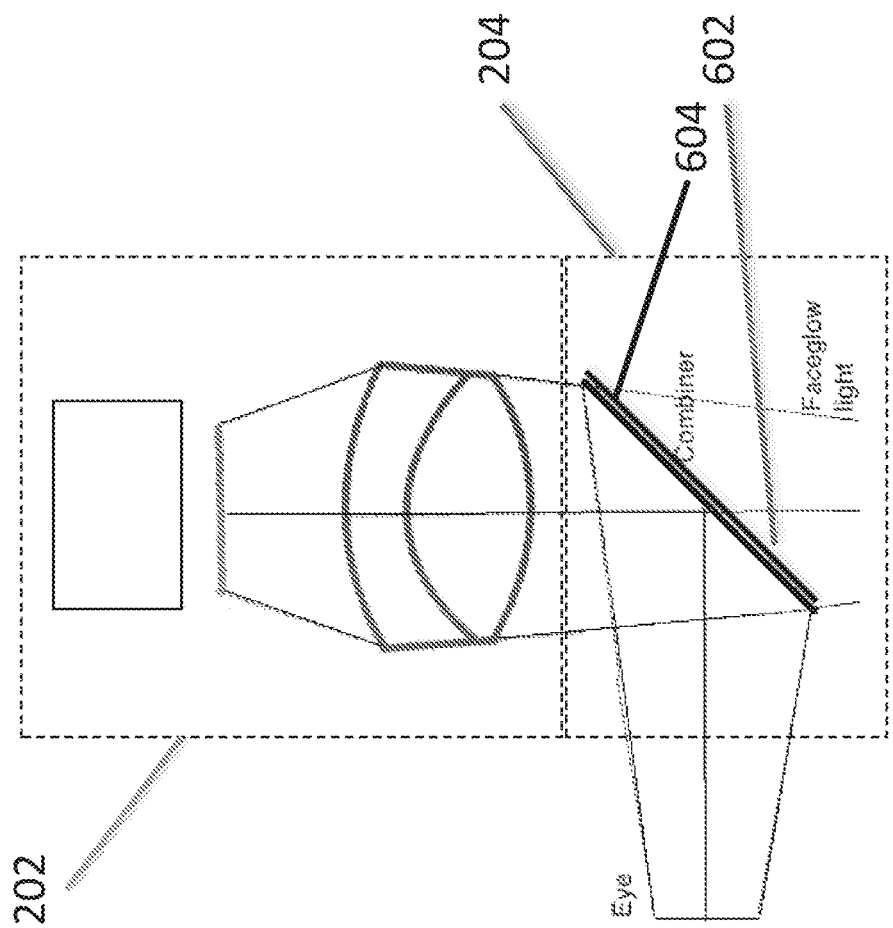
FIG. 6 illustrates upper and lower optical modules in accordance with the principles of the present disclosure.

FIG. 6 illustrates a combination of an upper optical module 202 with a lower optical module 204. In this embodiment, the image light projected from the upper optical module 202 may or may not be polarized. The image light is reflected off a flat combiner element 602 such that it is directed towards the user's eye. Wherein, the combiner element 602 is a partial mirror that reflects image light while transmitting a substantial portion of light from the environment so the user can look through the combiner element and see the environment surrounding the HWC.

The combiner 602 may include a holographic pattern, to form a holographic mirror. If a monochrome image is desired, there may be a single wavelength reflection design for the holographic pattern on the surface of the combiner 602. If the intention is to have multiple colors reflected from the surface of the combiner 602, a multiple wavelength holographic mirror maybe included on the combiner surface. For example, in a three-color embodiment, where red, green and blue pixels are generated in the image light, the holographic mirror may be reflective to wavelengths substantially matching the wavelengths of the red, green and blue light provided by the light source. This configuration can be used as a wavelength specific mirror where pre-determined wavelengths of light from the image light are reflected to the user's eye. This configuration may also be made such that substantially all other wavelengths in the visible pass through the combiner element 602 so the user has a substantially clear view of the surroundings when looking through the combiner element 602. The transparency between the user's eye and the surrounding may be approximately 80% when using a combiner that is a holographic mirror. Wherein holographic mirrors can be made using lasers to produce interference patterns in the holographic material of the combiner where the wavelengths of the lasers correspond to the wavelengths of light that are subsequently reflected by the holographic mirror.

In another embodiment, the combiner element 602 may include a notch mirror comprised of a multilayer coated substrate wherein the coating is designed to substantially reflect the wavelengths of light provided by the light source and substantially transmit the remaining wavelengths in the visible spectrum. For example, in the case where red, green and blue light is provided by the light source to enable full color images to be provided to the user, the notch mirror is a tristimulus notch mirror wherein the multilayer coating is designed to reflect narrow bands of red, green and blue light that are matched to the what is provided by the light source and the remaining visible wavelengths are transmitted through the coating to enable a view of the environment through the combiner. In another example where monochrome images are provided to the user, the notch mirror is designed to reflect a single narrow band of light that is matched to the wavelength range of the light provided by the light source while transmitting the remaining visible wavelengths to enable a see-thru view of the environment. The combiner 602 with the notch mirror would operate, from the user's perspective, in a manner similar to the combiner that includes a holographic pattern on the combiner element 602. The combiner, with the tristimulus notch mirror, would reflect the "on" pixels to the eye because of the match between the reflective wavelengths of the notch mirror and the color of the image light, and the wearer would be able to see with high clarity the surroundings. The transparency between the user's eye and the surrounding may be approximately 80% when using the tristimulus notch mirror. In addition, the image provided by the upper optical module 202 with the notch mirror combiner can provide higher contrast images than the holographic mirror combiner due to less scattering of the imaging light by the combiner.

Light can escape through the combiner 602 and may produce face glow as the light is generally directed downward onto the cheek of the user. When using a holographic mirror combiner or a tristimulus notch mirror combiner, the escaping light can be trapped to avoid face glow. In embodiments, if the image light is polarized before the combiner, a linear polarizer, also known herein as a stray light suppression system 604, can be laminated, or otherwise associated, to the combiner, with the transmission axis of the polarizer oriented relative to the polarized image light so that any escaping image light is absorbed by the polarizer. In embodiments, the image light would be polarized to provide S polarized light to the combiner for better reflection. As a result, the linear polarizer on the combiner would be oriented to absorb S polarized light and pass P polarized light. This provides the preferred orientation of polarized sunglasses as well.

If the image light is unpolarized, a microlouvered film, also known herein as a stray light suppression system 604, such as a privacy filter can be used to absorb the escaping image light while providing the user with a see-thru view of the environment. In this case, the absorbance or transmittance of the microlouvered film is dependent on the angle of the light. Where steep angle light is absorbed and light at less of an angle is transmitted. For this reason, in an embodiment, the combiner with the microlouver film is angled at greater than 45 degrees to the optical axis of the image light (e.g. the combiner can be oriented at 50 degrees so the image light from the file lens is incident on the combiner at an oblique angle.

FIG. 7 illustrates an embodiment of a combiner element 602 at various angles when the combiner element 602 includes a holographic mirror. Normally, a mirrored surface reflects light at an angle equal to the angle that the light is incident to the mirrored surface. Typically, this necessitates that the combiner element be at 45 degrees, 602a, if the light is presented vertically to the combiner so the light can be reflected horizontally towards the wearer's eye. In embodiments, the incident light can be presented at angles other than vertical to enable the mirror surface to be oriented at other than 45 degrees, but in all cases wherein a mirrored surface is employed (including the tristimulus notch mirror described previously), the incident angle equals the reflected angle. As a result, increasing the angle of the combiner 602a requires that the incident image light be presented to the combiner 602a at a different angle which positions the upper optical module 202 to the left of the combiner as shown in FIG. 7. In contrast, a holographic mirror combiner, included in embodiments, can be made such that light is reflected at a different angle from the angle that the light is incident onto the holographic mirrored surface. This allows freedom to select the angle of the combiner element 602b independent of the angle of the incident image light and the angle of the light reflected into the wearer's eye. In embodiments, the angle of the combiner element 602b is greater than 45 degrees (shown in FIG. 7) as this allows a more laterally compact HWC design. The increased angle of the combiner element 602b decreases the front to back width of the lower optical module 204 and may allow for a thinner HWC display (i.e. the furthest element from the wearer's eye can be closer to the wearer's face).

Figure 8:
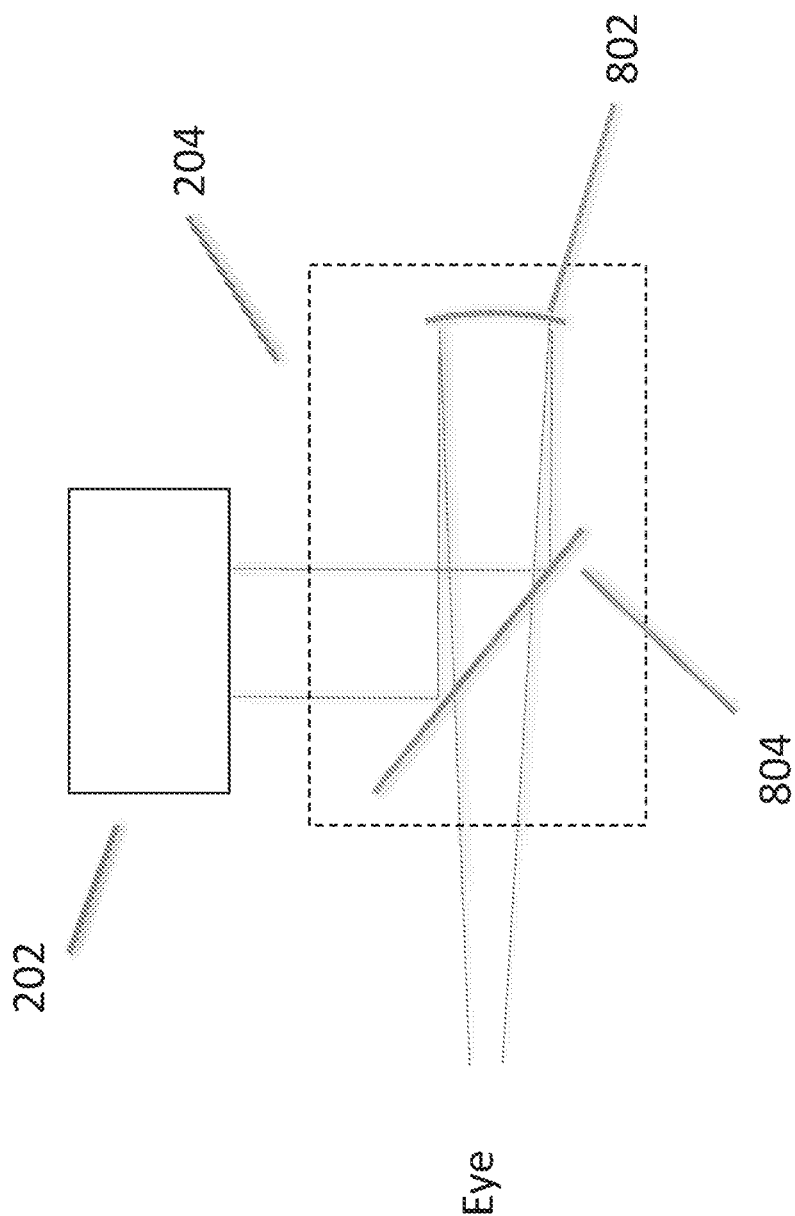
FIG. 8 illustrates upper and lower optical modules in accordance with the principles of the present disclosure.

FIG. 8 illustrates another embodiment of a lower optical module 204. In this embodiment, polarized image light provided by the upper optical module 202, is directed into the lower optical module 204. The image light reflects off a polarized mirror 804 and is directed to a focusing partially reflective mirror 802, which is adapted to reflect the polarized light. An optical element such as a ¼ wave film located between the polarized mirror 804 and the partially reflective mirror 802, is used to change the polarization state of the image light such that the light reflected by the partially reflective mirror 802 is transmitted by the polarized mirror 804 to present image light to the eye of the wearer. The user can also see through the polarized mirror 804 and the partially reflective mirror 802 to see the surrounding environment. As a result, the user perceives a combined image comprised of the displayed image light overlaid onto the see-thru view of the environment.

While many of the embodiments of the present disclosure have been referred to as upper and lower modules containing certain optical components, it should be understood that the image light and dark light production and management functions described in connection with the upper module may be arranged to direct light in other directions (e.g. upward, sideward, etc.). In embodiments, it may be preferred to mount the upper module 202 above the wearer's eye, in which case the image light would be directed downward. In other embodiments it may be preferred to produce light from the side of the wearer's eye, or from below the wearer's eye. In addition, the lower optical module is generally configured to deliver the image light to the wearer's eye and allow the wearer to see through the lower optical module, which may be accomplished through a variety of optical components.

Figure 8A:
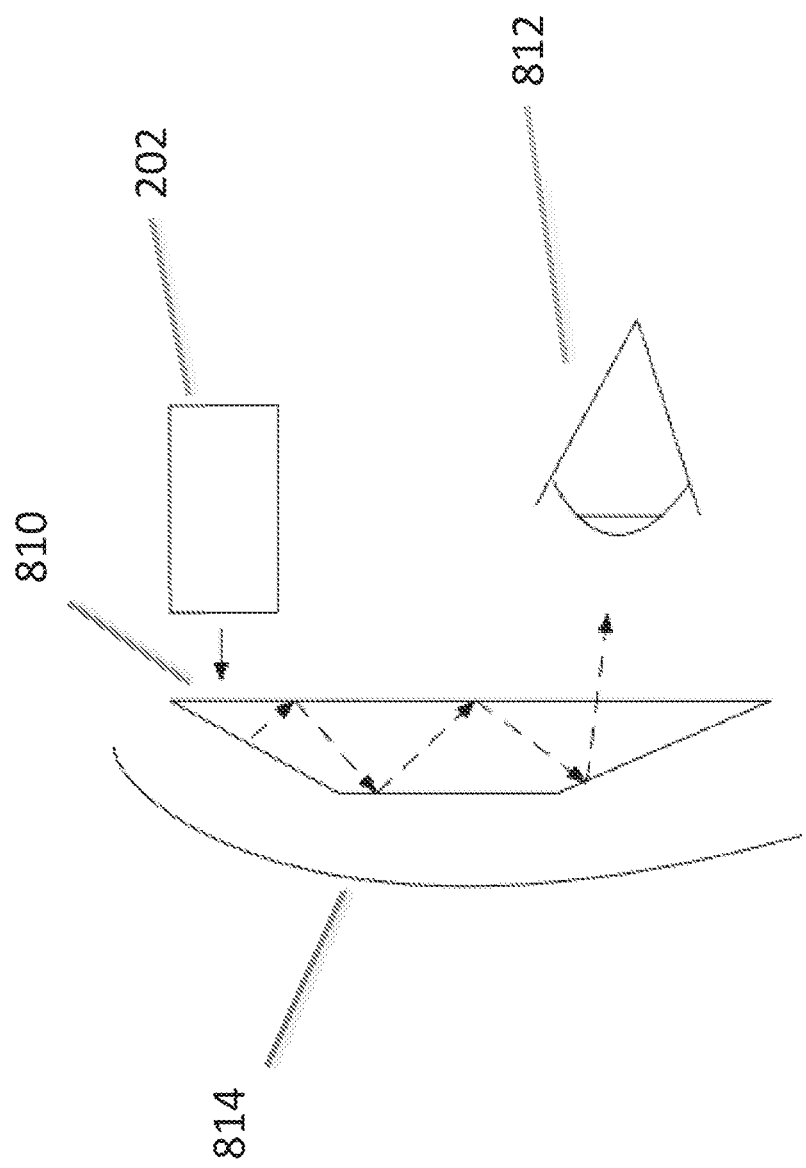
FIG. 8a illustrates upper and lower optical modules in accordance with the principles of the present disclosure.

FIG. 8a illustrates an embodiment of the present disclosure where the upper optical module 202 is arranged to direct image light into a TIR waveguide 810. In this embodiment, the upper optical module 202 is positioned above the wearer's eye 812 and the light is directed horizontally into the TIR waveguide 810. The TIR waveguide is designed to internally reflect the image light in a series of downward TIR reflections until it reaches the portion in front of the wearer's eye, where the light passes out of the TIR waveguide 812 into the wearer's eye. In this embodiment, an outer shield 814 is positioned in front of the TIR waveguide 810.

Figure 8B:
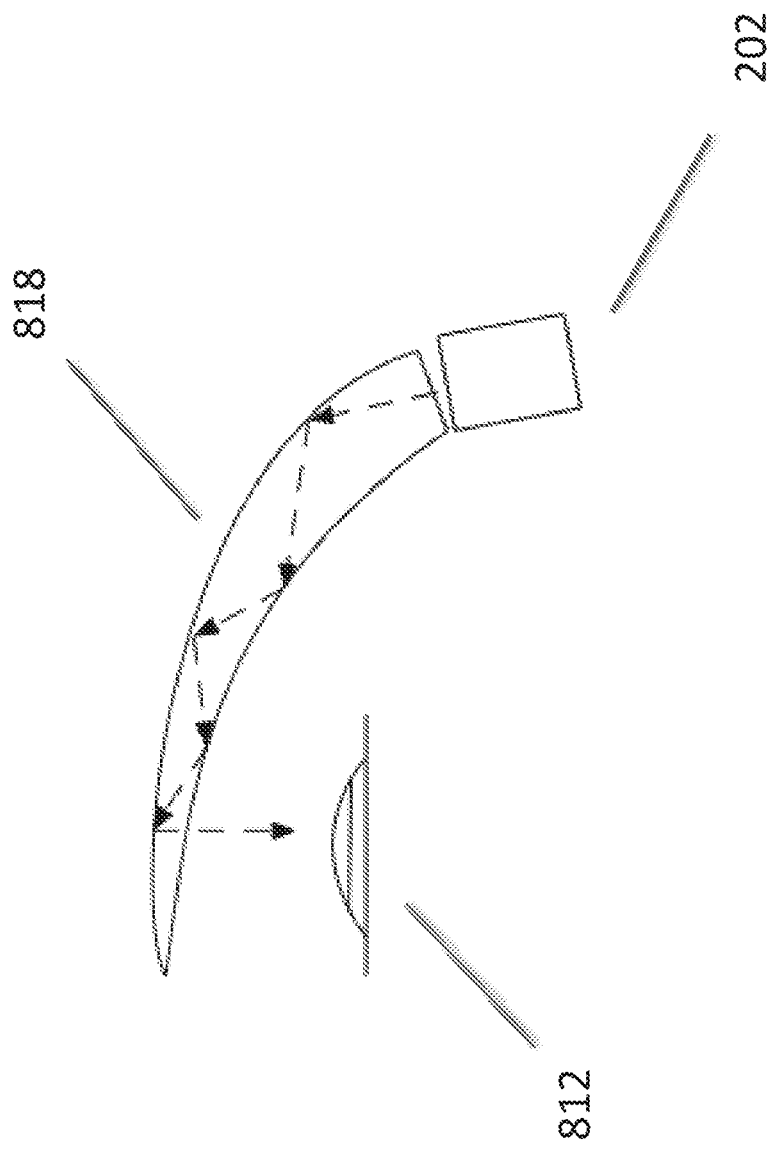
FIG. 8b illustrates upper and lower optical modules in accordance with the principles of the present disclosure.

FIG. 8b illustrates an embodiment of the present disclosure where the upper optical module 202 is arranged to direct image light into a TIR waveguide 818. In this embodiment, the upper optical module 202 is arranged on the side of the TIR waveguide 818. For example, the upper optical module may be positioned in the arm or near the arm of the HWC when configured as a pair of head worn glasses. The TIR waveguide 818 is designed to internally reflect the image light in a series of TIR reflections until it reaches the portion in front of the wearer's eye, where the light passes out of the TIR waveguide 812 into the wearer's eye.

Figure 8C:
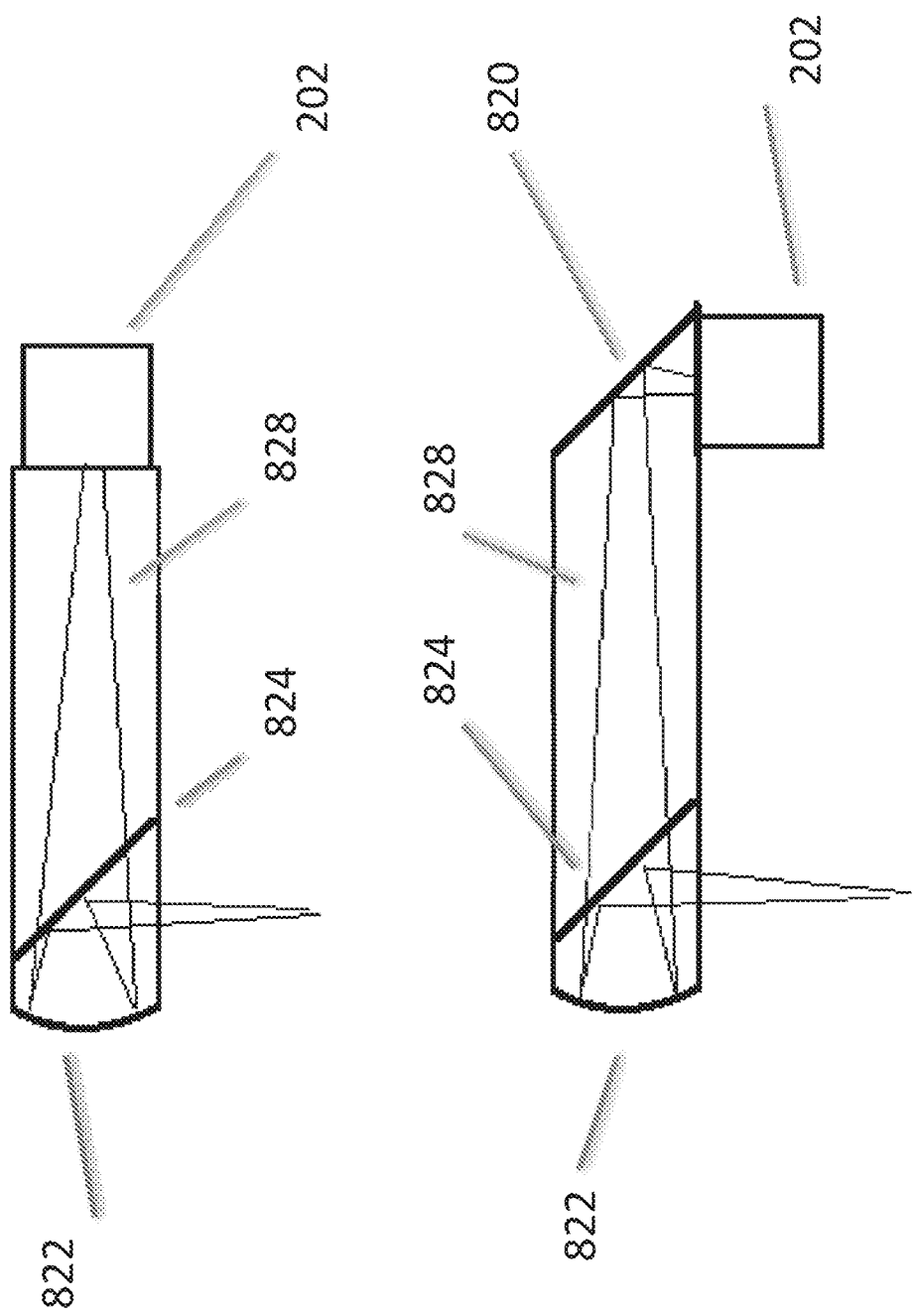
FIG. 8c illustrates upper and lower optical modules in accordance with the principles of the present disclosure.

FIG. 8c illustrates yet further embodiments of the present disclosure where an upper optical module 202 is directing polarized image light into an optical guide 828 where the image light passes through a polarized reflector 824, changes polarization state upon reflection of the optical element 822 which includes a ¼ wave film for example and then is reflected by the polarized reflector 824 towards the wearer's eye, due to the change in polarization of the image light. The upper optical module 202 may be positioned to direct light to a mirror 820, to position the upper optical module 202 laterally, in other embodiments, the upper optical module 202 may direct the image light directly towards the polarized reflector 824. It should be understood that the present disclosure comprises other optical arrangements intended to direct image light into the wearer's eye.

Figure 9:
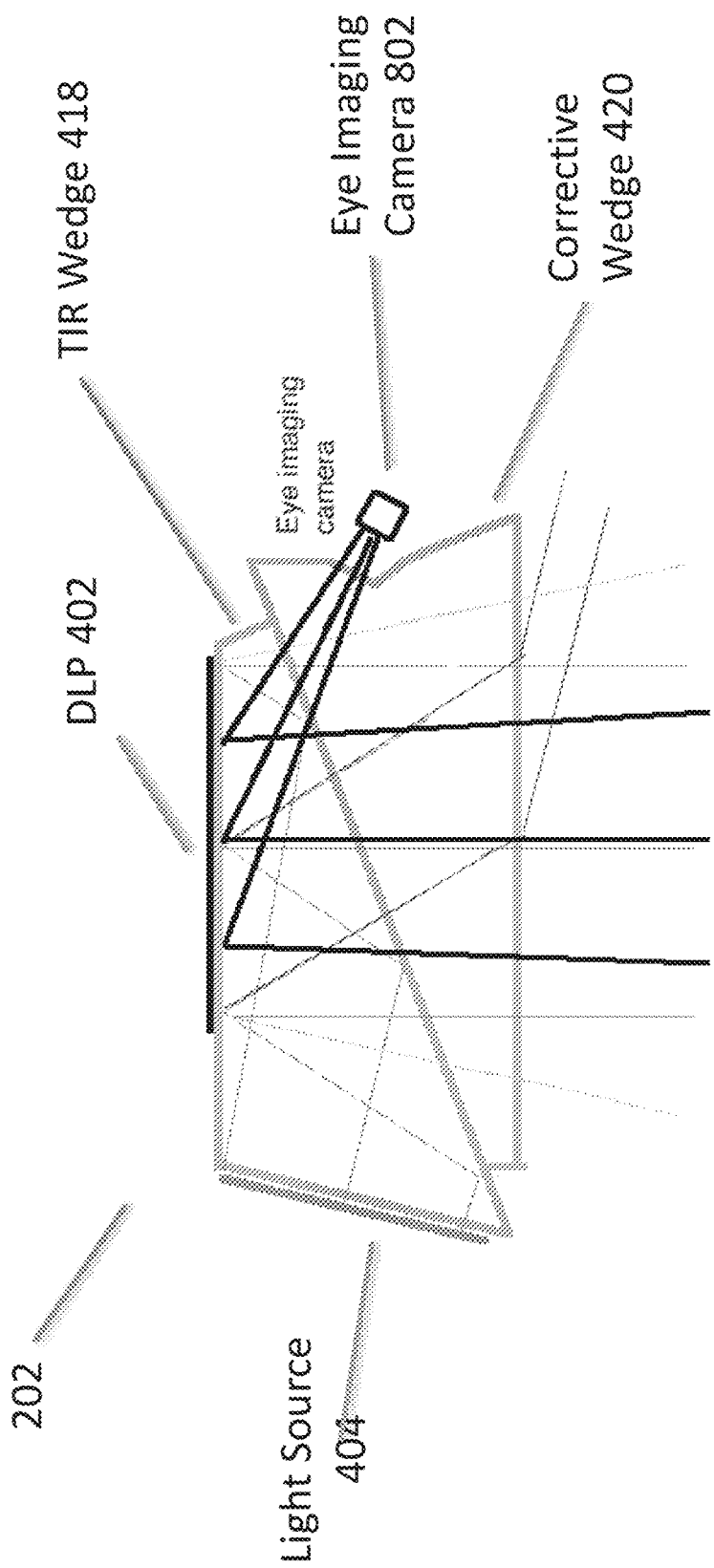
FIG. 9 illustrates an eye imaging system in accordance with the principles of the present disclosure.

Another aspect of the present disclosure relates to eye imaging. In embodiments, a camera is used in connection with an upper optical module 202 such that the wearer's eye can be imaged using pixels in the "off" state on the DLP. FIG. 9 illustrates a system where the eye imaging camera 802 is mounted and angled such that the field of view of the eye imaging camera 802 is redirected toward the wearer's eye by the mirror pixels of the DLP 402 that are in the "off" state. In this way, the eye imaging camera 802 can be used to image the wearer's eye along the same optical axis as the displayed image that is presented to the wearer. Wherein, image light that is presented to the wearer's eye illuminates the wearer's eye so that the eye can be imaged by the eye imaging camera 802. In the process, the light reflected by the eye passes back though the optical train of the lower optical module 204 and a portion of the upper optical module to where the light is reflected by the "off" pixels of the DLP 402 toward the eye imaging camera 802.

In embodiments, the eye imaging camera may image the wearer's eye at a moment in time where there are enough "off" pixels to achieve the required eye image resolution. In another embodiment, the eye imaging camera collects eye image information from "off" pixels over time and forms a time lapsed image. In another embodiment, a modified image is presented to the user wherein enough "off" state pixels are included that the camera can obtain the desired resolution and brightness for imaging the wearer's eye and the eye image capture is synchronized with the presentation of the modified image.

The eye imaging system may be used for security systems. The HWC may not allow access to the HWC or other system if the eye is not recognized (e.g. through eye characteristics including retina or iris characteristics, etc.). The HWC may be used to provide constant security access in some embodiments. For example, the eye security confirmation may be a continuous, near-continuous, real-time, quasi real-time, periodic, etc. process so the wearer is effectively constantly being verified as known. In embodiments, the HWC may be worn and eye security tracked for access to other computer systems.

The eye imaging system may be used for control of the HWC. For example, a blink, wink, or particular eye movement may be used as a control mechanism for a software application operating on the HWC or associated device.

The eye imaging system may be used in a process that determines how or when the HWC 102 delivers digitally displayed content to the wearer. For example, the eye imaging system may determine that the user is looking in a direction and then HWC may change the resolution in an area of the display or provide some content that is associated with something in the environment that the user may be looking at. Alternatively, the eye imaging system may identify different user's and change the displayed content or enabled features provided to the user. User's may be identified from a database of users eye characteristics either located on the HWC 102 or remotely located on the network 110 or on a server 112. In addition, the HWC may identify a primary user or a group of primary users from eye characteristics wherein the primary user(s) are provided with an enhanced set of features and all other users are provided with a different set of features. Thus in this use case, the HWC 102 uses identified eye characteristics to either enable features or not and eye characteristics need only be analyzed in comparison to a relatively small database of individual eye characteristics.

FIG. 10 illustrates a light source that may be used in association with the upper optics module 202 (e.g. polarized light source if the light from the solid state light source is polarized such as polarized light source 302 and 458), and light source 404. In embodiments, to provide a uniform surface of light 1008 to be directed into the upper optical module 202 and towards the DLP of the upper optical module, either directly or indirectly, the solid state light source 1002 may be projected into a backlighting optical system 1004. The solid state light source 1002 may be one or more LEDs, laser diodes, OLEDs. In embodiments, the backlighting optical system 1004 includes an extended section with a length/distance ratio of greater than 3, wherein the light undergoes multiple reflections from the sidewalls to mix of homogenize the light as supplied by the solid state light source 1002. The backlighting optical system 1004 can also include structures on the surface opposite (on the left side as shown in FIG. 10) to where the uniform light 1008 exits the backlight 1004 to change the direction of the light toward the DLP 302 and the reflective polarizer 310 or the DLP 402 and the TIR wedge 418. The backlighting optical system 1004 may also include structures to collimate the uniform light 1008 to provide light to the DLP with a smaller angular distribution or narrower cone angle. Diffusers or polarizers can be used on the entrance or exit surface of the backlighting optical system. Diffusers can be used to spread or uniformize the exiting light from the backlight to improve the uniformity or increase the angular spread of the uniform light 1008. Elliptical diffusers that diffuse the light more in some directions and less in others can be used to improve the uniformity or spread of the uniform light 1008 in directions orthogonal to the optical axis of the uniform light 1008. Linear polarizers can be used to convert unpolarized light as supplied by the solid state light source 1002 to polarized light so the uniform light 1008 is polarized with a desired polarization state. A reflective polarizer can be used on the exit surface of the backlight 1004 to polarize the uniform light 1008 to the desired polarization state, while reflecting the other polarization state back into the backlight where it is recycled by multiple reflections within the backlight 1004 and at the solid state light source 1002. Therefore by including a reflective polarizer at the exit surface of the backlight 1004, the efficiency of the polarized light source is improved.

Figure 10A:
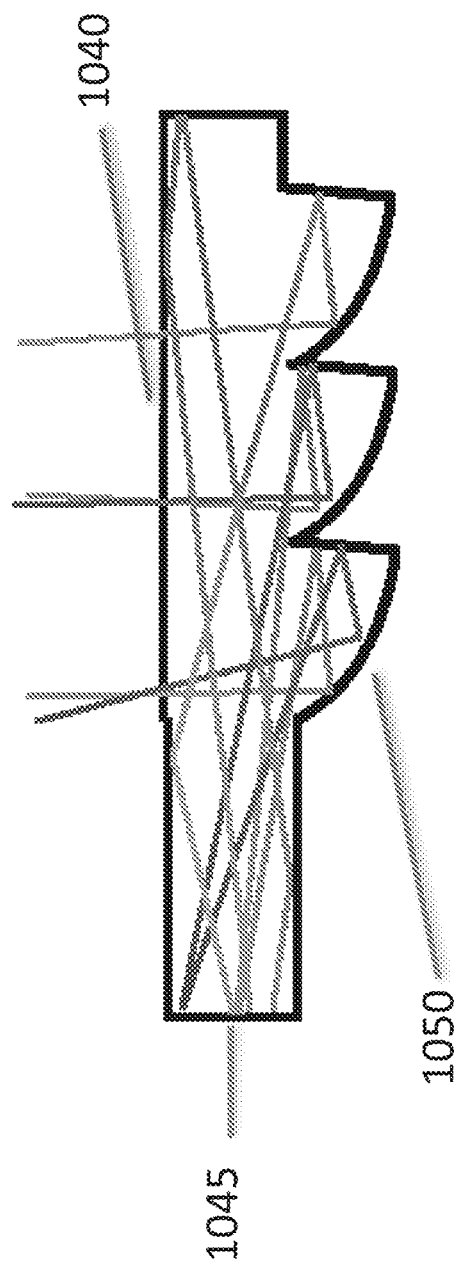
FIG. 10a illustrates a back lighting system in accordance with the principles of the present disclosure.
Figure 10B:
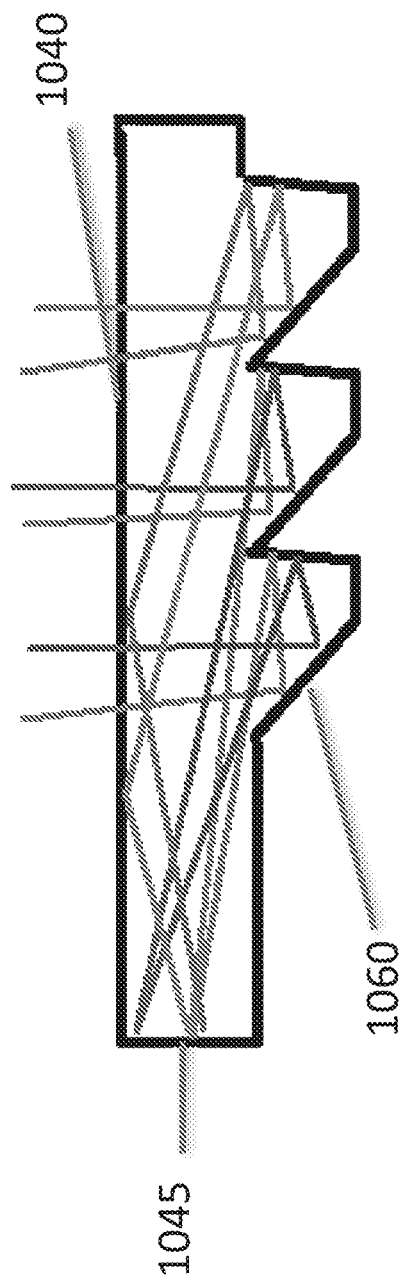
FIG. 10b illustrates a back lighting system in accordance with the principles of the present disclosure.

FIGS. 10a and 10b show illustrations of structures in backlight optical systems 1004 that can be used to change the direction of the light provided to the entrance face 1045 by the light source and then collimates the light in a direction lateral to the optical axis of the exiting uniform light 1008. Structure 1060 includes an angled sawtooth pattern in a transparent waveguide wherein the left edge of each sawtooth clips the steep angle rays of light thereby limiting the angle of the light being redirected. The steep surface at the right (as shown) of each sawtooth then redirects the light so that it reflects off the left angled surface of each sawtooth and is directed toward the exit surface 1040. The sawtooth surfaces shown on the lower surface in FIGS. 10a and 10b, can be smooth and coated (e.g. with an aluminum coating or a dielectric mirror coating) to provide a high level of reflectivity without scattering. Structure 1050 includes a curved face on the left side (as shown) to focus the rays after they pass through the exit surface 1040, thereby providing a mechanism for collimating the uniform light 1008. In a further embodiment, a diffuser can be provided between the solid state light source 1002 and the entrance face 1045 to homogenize the light provided by the solid state light source 1002. In yet a further embodiment, a polarizer can be used between the diffuser and the entrance face 1045 of the backlight 1004 to provide a polarized light source. Because the sawtooth pattern provides smooth reflective surfaces, the polarization state of the light can be preserved from the entrance face 1045 to the exit face 1040. In this embodiment, the light entering the backlight from the solid state light source 1002 passes through the polarizer so that it is polarized with the desired polarization state. If the polarizer is an absorptive linear polarizer, the light of the desired polarization state is transmitted while the light of the other polarization state is absorbed. If the polarizer is a reflective polarizer, the light of the desired polarization state is transmitted into the backlight 1004 while the light of the other polarization state is reflected back into the solid state light source 1002 where it can be recycled as previously described, to increase the efficiency of the polarized light source.

Figure 11A:
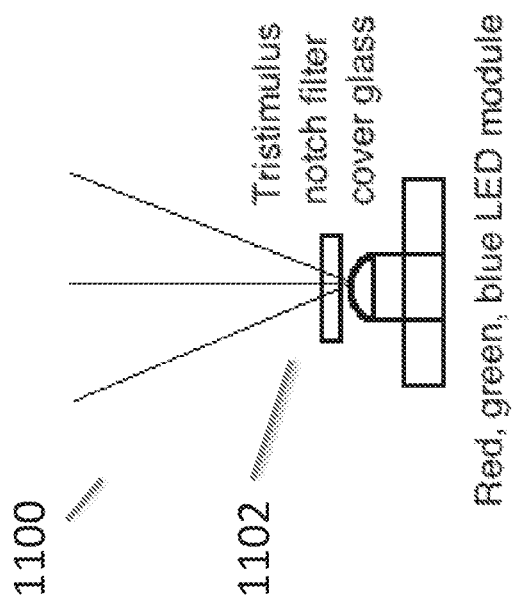
FIGS. 11a to 11d illustrate light source and filters in accordance with the principles of the present disclosure.
Figure 11B:
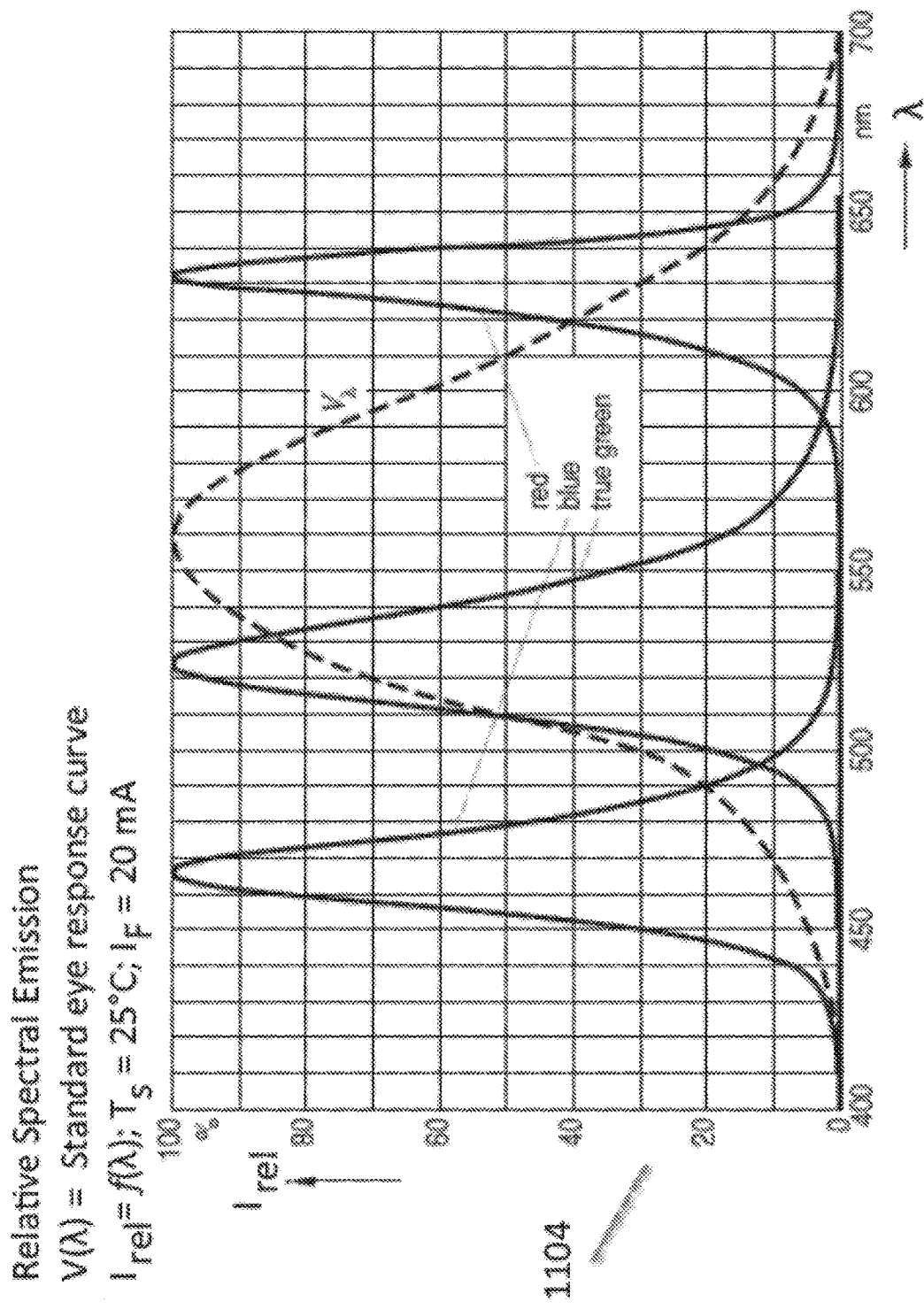
Figure 11C:
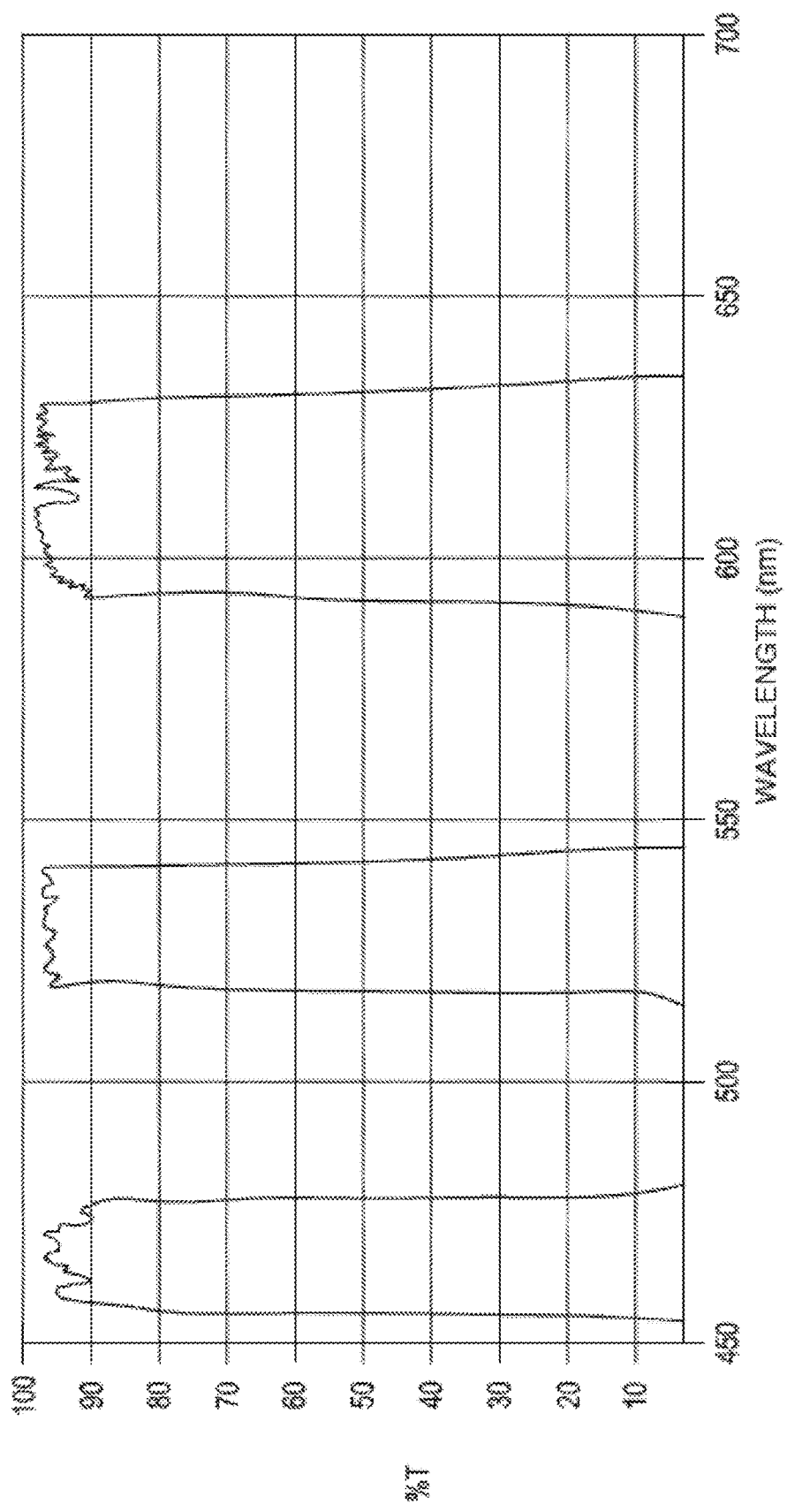
Figure 11D:
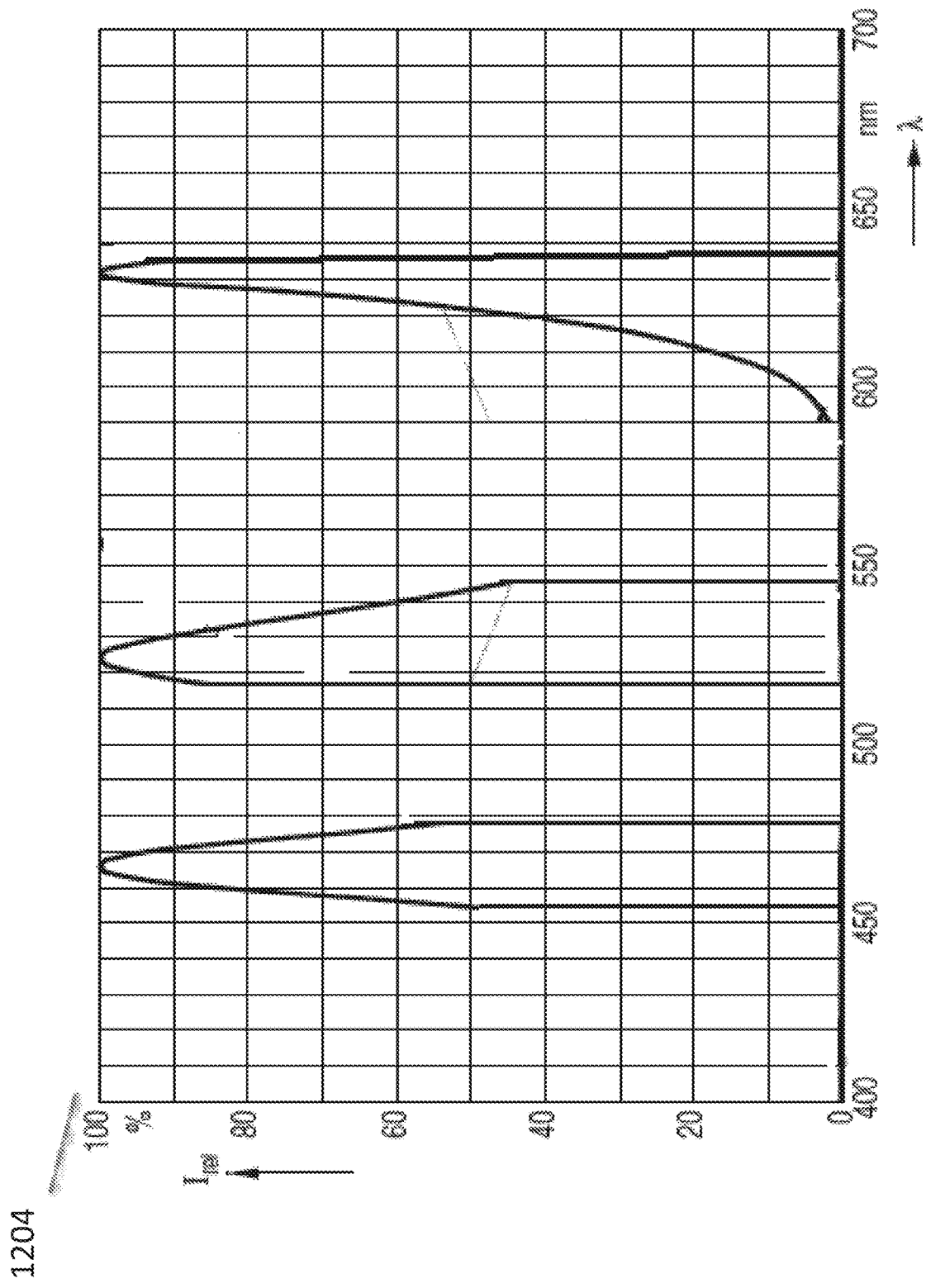

FIG. 11*a* illustrates a light source 1100 that may be used in association with the upper optics module 202. In embodiments, the light source 1100 may provide light to a backlighting optical system 1004 as described above in connection with FIG. 10. In embodiments, the light source 1100 includes a tristimulus notch filter 1102. The tristimulus notch filter 1102 has narrow band pass filters for three wavelengths, as indicated in FIG. 11*c* in a transmission graph 1108. The graph shown in FIG. 11*b*, as 1104 illustrates an output of three different colored LEDs. One can see that the bandwidths of emission are narrow, but they have long tails. The tristimulus notch filter 1102 can be used in connection with such LEDs to provide a light source 1100 that emits narrow filtered wavelengths of light as shown in FIG. 11*d* as the transmission graph 1110. Wherein the clipping effects of the tristimulus notch filter 1102 can be seen to have cut the tails from the LED emission graph 1104 to provide narrower wavelength bands of light to the upper optical module 202. The light source 1100 can be used in connection with a combiner 602 with a holographic mirror or tristimulus notch mirror to provide narrow bands of light that are reflected toward the wearer's eye with less waste light that does not get reflected by the combiner, thereby improving efficiency and reducing escaping light that can cause faceglow.

Figure 12B:
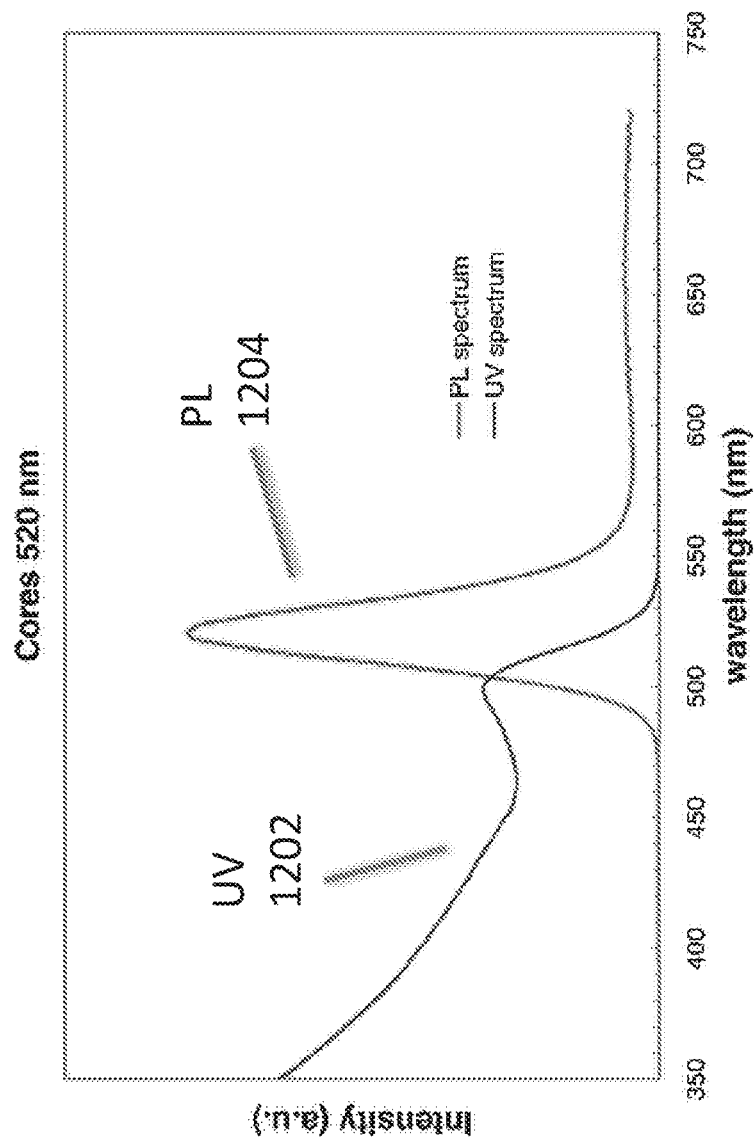
Figure 12C:
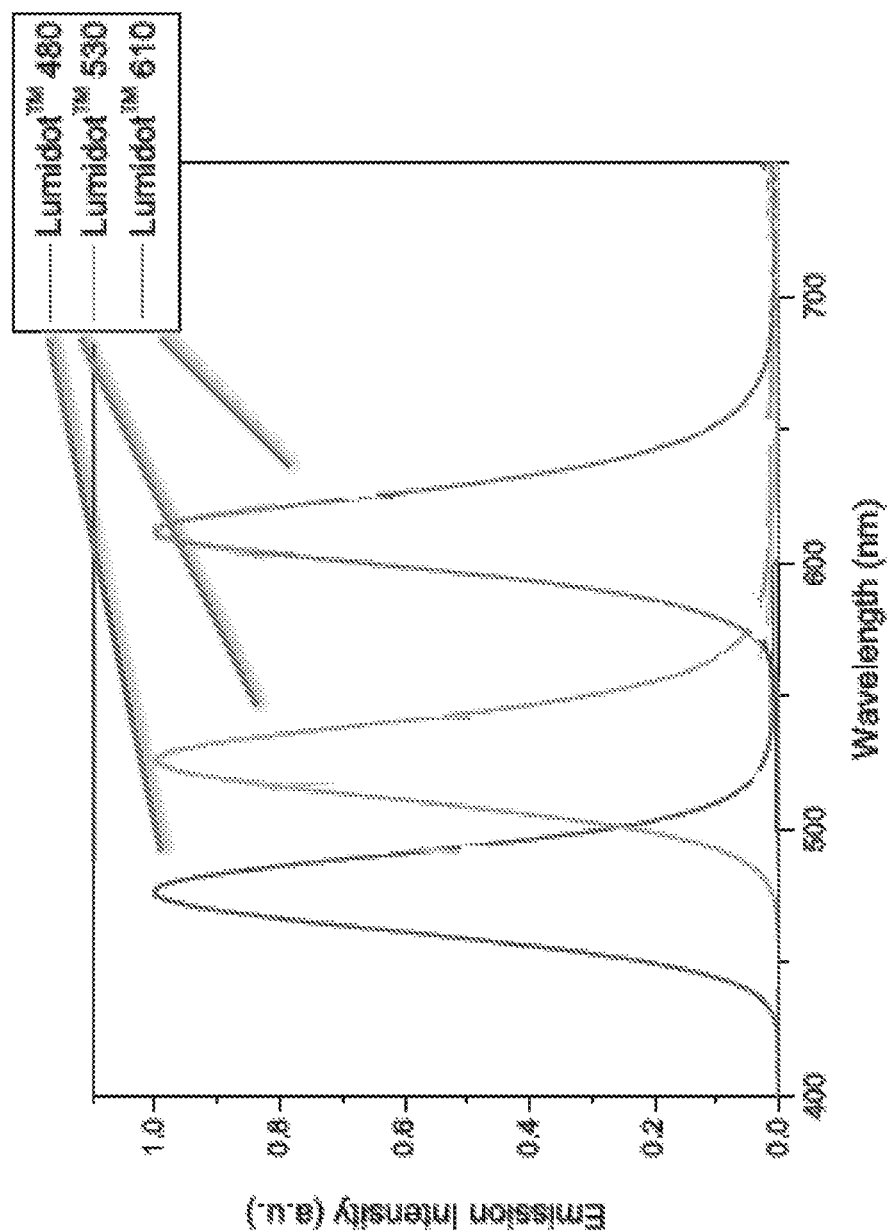

FIG. 12*a* illustrates another light source 1200 that may be used in association with the upper optics module 202. In embodiments, the light source 1200 may provide light to a backlighting optical system 1004 as described above in connection with FIG. 10. In embodiments, the light source 1200 includes a quantum dot cover glass 1202. Where the quantum dots absorb light of a shorter wavelength and emit light of a longer wavelength (FIG. 12*b* shows an example wherein a UV spectrum 1202 applied to a quantum dot results in the quantum dot emitting a narrow band shown as a PL spectrum 1204) that is dependent on the material makeup and size of the quantum dot. As a result, quantum dots in the quantum dot cover glass 1202 can be tailored to provide one or more bands of narrow bandwidth light (e.g. red, green and blue emissions dependent on the different quantum dots included as illustrated in the graph shown in FIG. 12*c* where three different quantum dots are used. In embodiments, the LED driver light emits UV light, deep blue or blue light. For sequential illumination of different colors, multiple light sources 1200 would be used where each light source 1200 would include a quantum dot cover glass 1202 with a quantum dot selected to emit at one of the desired colors. The light source 1100 can be used in connection with a combiner 602 with a holographic mirror or tristimulus notch mirror to provide narrow transmission bands of light that are reflected toward the wearer's eye with less waste light that does not get reflected.

Another aspect of the present disclosure relates to the generation of peripheral image lighting effects for a person wearing a HWC. In embodiments, a solid state lighting system (e.g. LED, OLED, etc), or other lighting system, may be included inside the optical elements of a lower optical module 204. The solid state lighting system may be arranged such that lighting effects outside of a field of view (FOV) of the presented digital content is presented to create an immersive effect for the person wearing the HWC. To this end, the lighting effects may be presented to any portion of the HWC that is visible to the wearer. The solid state lighting system may be digitally controlled by an integrated processor on the HWC. In embodiments, the integrated processor will control the lighting effects in coordination with digital content that is presented within the FOV of the HWC. For example, a movie, picture, game, or other content, may be displayed or playing within the FOV of the HWC. The content may show a bomb blast on the right side of the FOV and at the same moment, the solid state lighting system inside of the upper module optics may flash quickly in concert with the FOV image effect. The effect may not be fast, it may be more persistent to indicate, for example, a general glow or color on one side of the user. The solid state lighting system may be color controlled, with red, green and blue LEDs, for example, such that color control can be coordinated with the digitally presented content within the field of view.

Figure 13A:
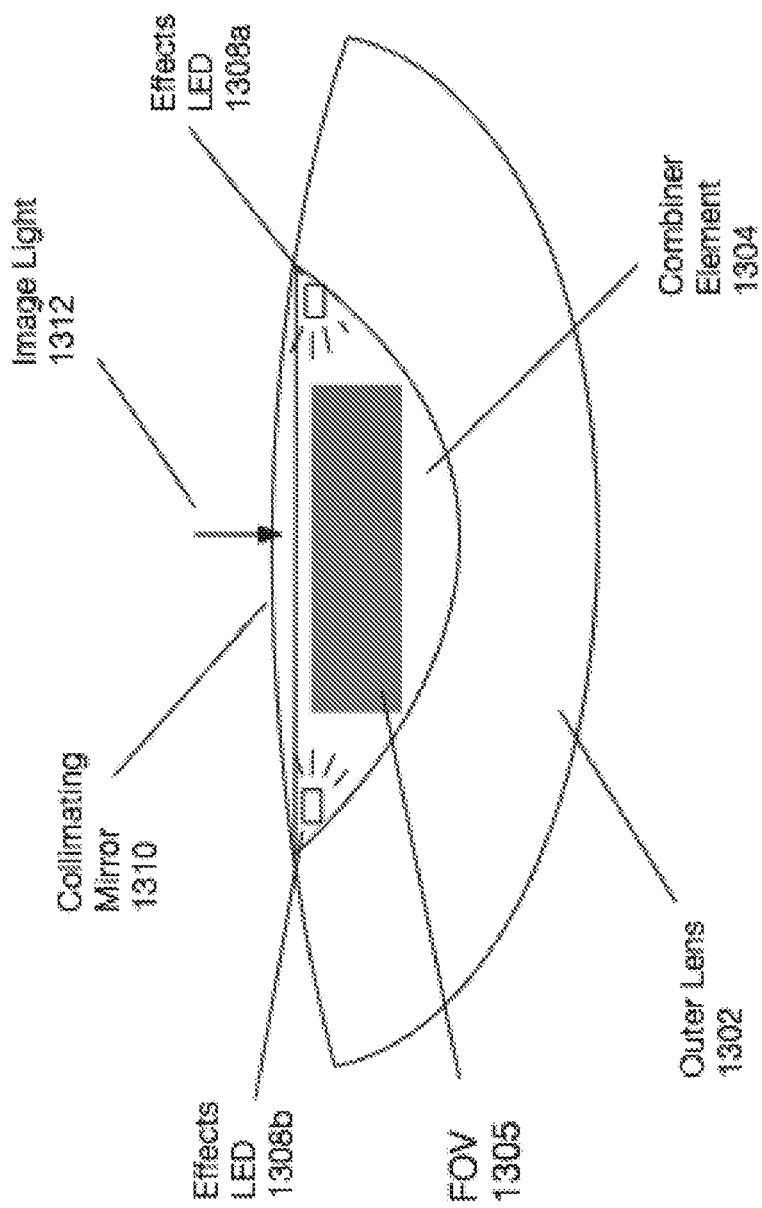

FIG. 13*a* illustrates optical components of a lower optical module 204 together with an outer lens 1302. FIG. 13*a* also shows an embodiment including effects LED's 1308*a* and 1308*b*. FIG. 13*a* illustrates image light 1312, as described herein elsewhere, directed into the upper optical module where it will reflect off of the combiner element 1304, as described herein elsewhere. The combiner element 1304 in this embodiment is angled towards the wearer's eye at the top of the module and away from the wearer's eye at the bottom of the module, as also illustrated and described in connection with FIG. 8 (e.g. at a 45 degree angle). The image light 1312 provided by an upper optical module 202 (not shown in FIG. 13*a*) reflects off of the combiner element 1304 towards the collimating mirror 1310, away from the wearer's eye, as described herein elsewhere. The image light 1312 then reflects and focuses off of the collimating mirror 1304, passes back through the combiner element 1304, and is directed into the wearer's eye. The wearer can also view the surrounding environment through the transparency of the combiner element 1304, collimating mirror 1310, and outer lens 1302 (if it is included). As described herein elsewhere, various surfaces are polarized to create the optical path for the image light and to provide transparency of the elements such that the wearer can view the surrounding environment. The wearer will generally perceive that the image light forms an image in the FOV 1305. In embodiments, the outer lens 1302 may be included. The outer lens 1302 is an outer lens that may or may not be corrective and it may be designed to conceal the lower optical module components in an effort to make the HWC appear to be in a form similar to standard glasses or sunglasses.

In the embodiment illustrated in FIG. 13*a*, the effects LEDs 1308*a* and 1308*b* are positioned at the sides of the combiner element 1304 and the outer lens 1302 and/or the collimating mirror 1310. In embodiments, the effects LEDs 1308*a* are positioned within the confines defined by the combiner element 1304 and the outer lens 1302 and/or the collimating mirror. The effects LEDs 1308*a* and 1308*b* are also positioned outside of the FOV 1305. In this arrangement, the effects LEDs 1308*a* and 1308*b* can provide lighting effects within the lower optical module outside of the FOV 1305. In embodiments the light emitted from the effects LEDs 1308*a* and 1308*b* may be polarized such that the light passes through the combiner element 1304 toward the wearer's eye and does not pass through the outer lens 1302 and/or the collimating mirror 1310. This arrangement provides peripheral lighting effects to the wearer in a more private setting by not transmitting the lighting effects through the front of the HWC into the surrounding environment. However, in other embodiments, the effects LEDs 1308*a* and 1308*b* may be unpolarized so the lighting effects provided are made to be purposefully viewable by others in the environment for entertainment such as giving the effect of the wearer's eye glowing in correspondence to the image content being viewed by the wearer.

FIG. 13*b* illustrates a cross section of the embodiment described in connection with FIG. 13*a*. As illustrated, the effects LED 1308*a* is located in the upper-front area inside of the optical components of the lower optical module. It should be understood that the effects LED 1308*a* position in the described embodiments is only illustrative and alternate placements are encompassed by the present disclosure. Additionally, in embodiments, there may be one or more effects LEDs 1308*a* in each of the two sides of HWC to provide peripheral lighting effects near one or both eyes of the wearer.

FIG. 13*c* illustrates an embodiment where the combiner element 1304 is angled away from the eye at the top and towards the eye at the bottom (e.g. in accordance with the holographic or notch filter embodiments described herein). In this embodiment, the effects LED 1308*a* is located on the outer lens 1302 side of the combiner element 1304 to provide a concealed appearance of the lighting effects. As with other embodiments, the effects LED 1308*a* of FIG. 13*c* may include a polarizer such that the emitted light can pass through a polarized element associated with the combiner element 1304 and be blocked by a polarized element associated with the outer lens 1302.

Another aspect of the present disclosure relates to the mitigation of light escaping from the space between the wearer's face and the HWC itself. Another aspect of the present disclosure relates to maintaining a controlled lighting environment in proximity to the wearer's eyes. In embodiments, both the maintenance of the lighting environment and the mitigation of light escape are accomplished by including a removable and replaceable flexible shield for the HWC. Wherein the removable and replaceable shield can be provided for one eye or both eyes in correspondence to the use of the displays for each eye. For example, in a night vision application, the display to only one eye could be used for night vision while the display to the other eye is turned off to provide good see-thru when moving between areas where visible light is available and dark areas where night vision enhancement is needed.

FIG. 14*a* illustrates a removable and replaceable flexible eye cover 1402 with an opening 1408 that can be attached and removed quickly from the HWC 102 through the use of magnets. Other attachment methods may be used, but for illustration of the present disclosure we will focus on a magnet implementation. In embodiments, magnets may be included in the eye cover 1402 and magnets of an opposite polarity may be included (e.g. embedded) in the frame of the HWC 102. The magnets of the two elements would attract quite strongly with the opposite polarity configuration. In another embodiment, one of the elements may have a magnet and the other side may have metal for the attraction.

Figure 14B:
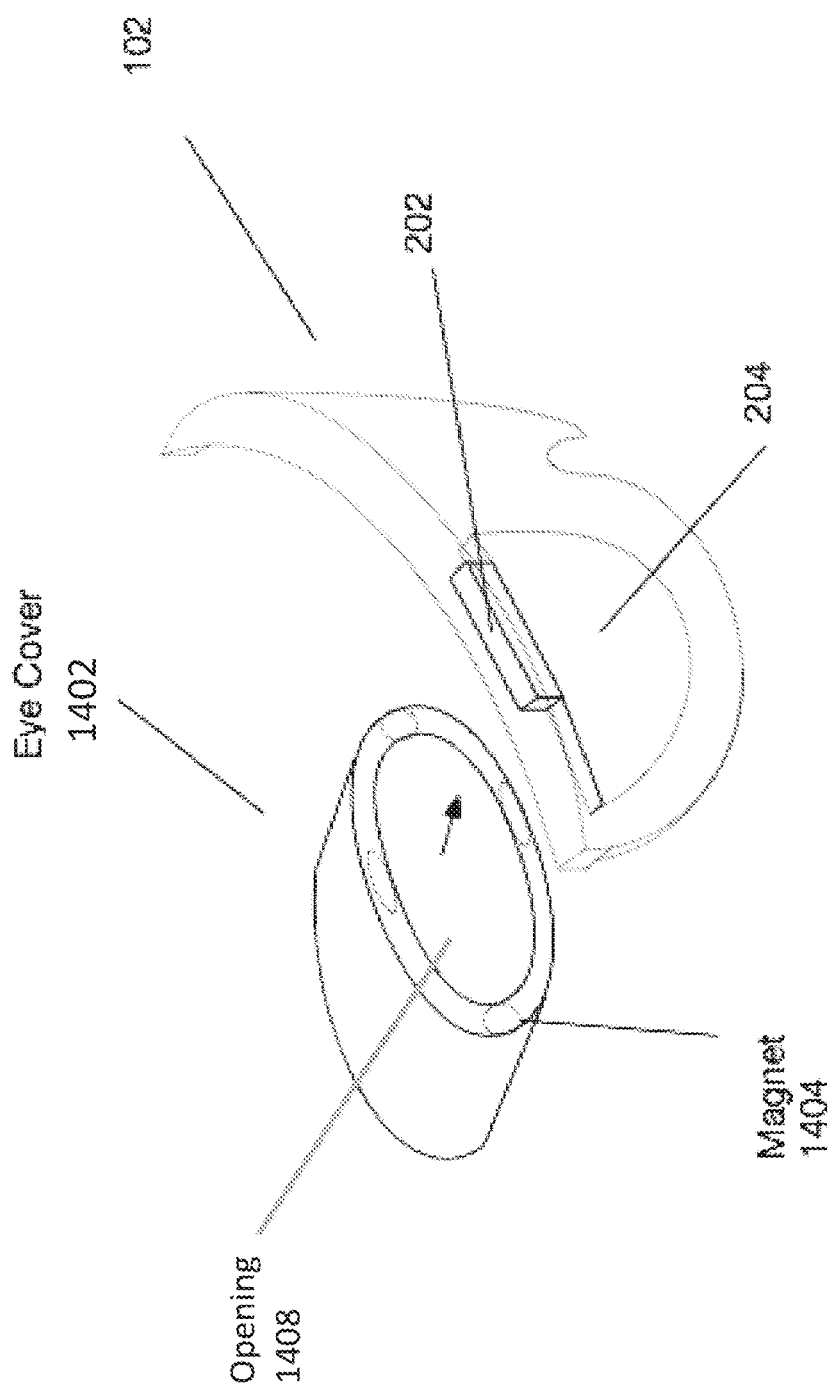

In embodiments, the eye cover 1402 is a flexible elastomeric shield. In embodiments, the eye cover 1402 may be an elastomeric bellows design to accommodate flexibility and more closely align with the wearer's face. FIG. 14*b* illustrates a removable and replaceable flexible eye cover 1404 that is adapted as a single eye cover. In embodiments, a single eye cover may be used for each side of the HWC to cover both eyes of the wearer. In embodiments, the single eye cover may be used in connection with a HWC that includes only one computer display for one eye. These configurations prevent light that is generated and directed generally towards the wearer's face by covering the space between the wearer's face and the HWC. The opening 1408 allows the wearer to look through the opening 1408 to view the displayed content and the surrounding environment through the front of the HWC. The image light in the lower optical module 204 can be prevented from emitting from the front of the HWC through internal optics polarization schemes, as described herein, for example.

Figure 14C:
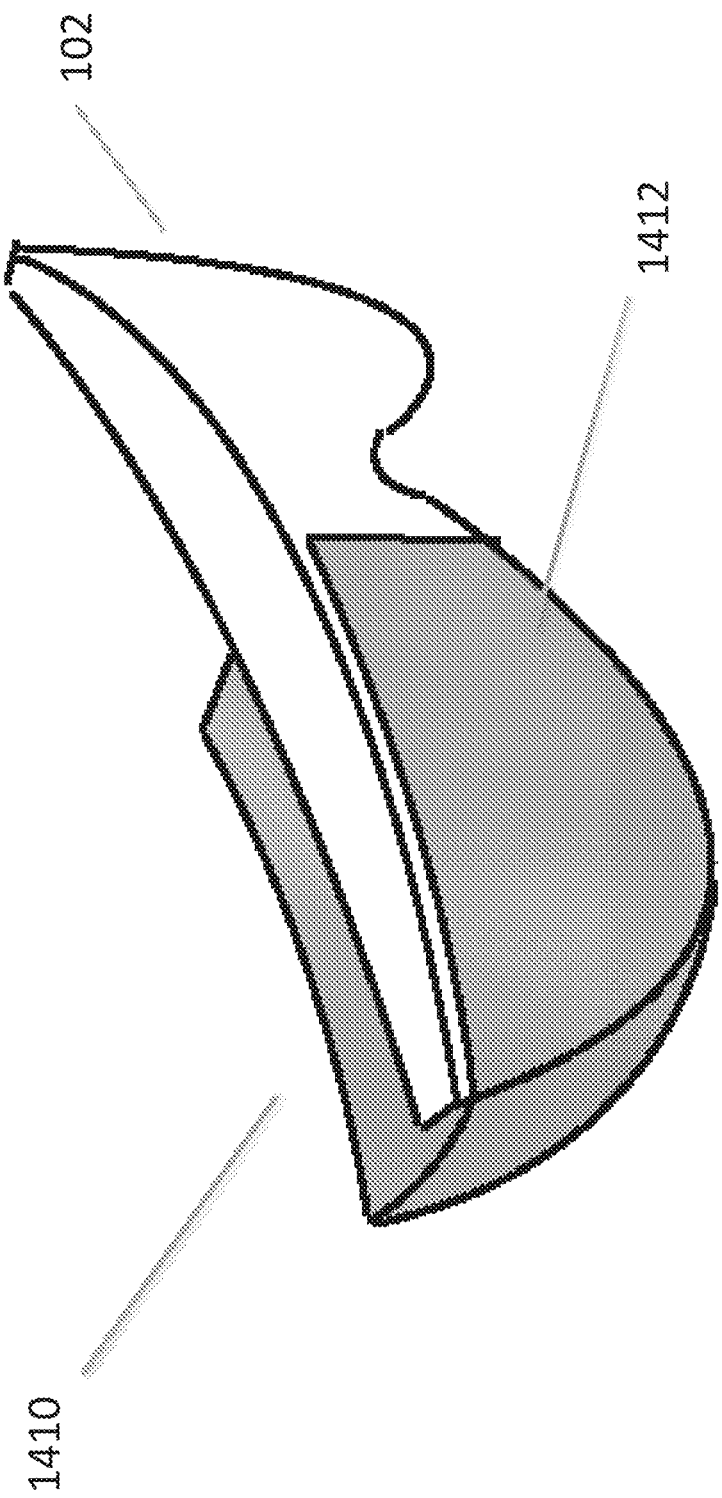

FIG. 14*c* illustrates another embodiment of a light suppression system. In this embodiment, the eye cover 1410 may be similar to the eye cover 1402, but eye cover 1410 includes a front light shield 1412. The front light shield 1412 may be opaque to prevent light from escaping the front lens of the HWC. In other embodiments, the front light shield 1412 is polarized to prevent light from escaping the front lens. In a polarized arrangement, in embodiments, the internal optical elements of the HWC (e.g. of the lower optical module 204) may polarize light transmitted towards the front of the HWC and the front light shield 1412 may be polarized to prevent the light from transmitting through the front light shield 1412.

In embodiments, an opaque front light shield 1412 may be included and the digital content may include images of the surrounding environment such that the wearer can visualize the surrounding environment. One eye may be presented with night vision environmental imagery and this eye's surrounding environment optical path may be covered using an opaque front light shield 1412. In other embodiments, this arrangement may be associated with both eyes.

Another aspect of the present disclosure relates to automatically configuring the lighting system(s) used in the HWC 102. In embodiments, the display lighting and/or effects lighting, as described herein, may be controlled in a manner suitable for when an eye cover 1408 is attached or removed from the HWC 102. For example, at night, when the light in the environment is low, the lighting system(s) in the HWC may go into a low light mode to further control any amounts of stray light escaping from the HWC and the areas around the HWC. Covert operations at night, while using night vision or standard vision, may require a solution which prevents as much escaping light as possible so a user may clip on the eye cover(s) 1408 and then the HWC may go into a low light mode. The low light mode may, in some embodiments, only go into a low light mode when the eye cover 1408 is attached if the HWC identifies that the environment is in low light conditions (e.g. through environment light level sensor detection). In embodiments, the low light level may be determined to be at an intermediate point between full and low light dependent on environmental conditions.

Another aspect of the present disclosure relates to automatically controlling the type of content displayed in the HWC when eye covers 1408 are attached or removed from the HWC. In embodiments, when the eye cover(s) 1408 is attached to the HWC, the displayed content may be restricted in amount or in color amounts. For example, the display(s) may go into a simple content delivery mode to restrict the amount of information displayed. This may be done to reduce the amount of light produced by the display(s). In an embodiment, the display(s) may change from color displays to monochrome displays to reduce the amount of light produced. In an embodiment, the monochrome lighting may be red to limit the impact on the wearer's eyes to maintain an ability to see better in the dark.

Referring to FIG. 15, we now turn to describe a particular external user interface 104, referred to generally as a pen 1500. The pen 1500 is a specially designed external user interface 104 and can operate as a user interface, such as to many different styles of HWC 102. The pen 1500 generally follows the form of a conventional pen, which is a familiar user handled device and creates an intuitive physical interface for many of the operations to be carried out in the HWC system 100. The pen 1500 may be one of several user interfaces 104 used in connection with controlling operations within the HWC system 100. For example, the HWC 102 may watch for and interpret hand gestures 116 as control signals, where the pen 1500 may also be used as a user interface with the same HWC 102. Similarly, a remote keyboard may be used as an external user interface 104 in concert with the pen 1500. The combination of user interfaces or the use of just one control system generally depends on the operation(s) being executed in the HWC's system 100.

While the pen 1500 may follow the general form of a conventional pen, it contains numerous technologies that enable it to function as an external user interface 104. FIG. 15 illustrates technologies comprised in the pen 1500. As can be seen, the pen 1500 may include a camera 1508, which is arranged to view through lens 1502. The camera may then be focused, such as through lens 1502, to image a surface upon which a user is writing or making other movements to interact with the HWC 102. There are situations where the pen 1500 will also have an ink, graphite, or other system such that what is being written can be seen on the writing surface. There are other situations where the pen 1500 does not have such a physical writing system so there is no deposit on the writing surface, where the pen would only be communicating data or commands to the HWC 102. The lens configuration is described in greater detail herein. The function of the camera is to capture information from an unstructured writing surface such that pen strokes can be interpreted as intended by the user. To assist in the predication of the intended stroke path, the pen 1500 may include a sensor, such as an IMU 1512. Of course, the IMU could be included in the pen 1500 in its separate parts (e.g. gyro, accelerometer, etc.) or an IMU could be included as a single unit. In this instance, the IMU 1512 is used to measure and predict the motion of the pen 1500. In turn, the integrated microprocessor 1510 would take the IMU information and camera information as inputs and process the information to form a prediction of the pen tip movement.

The pen 1500 may also include a pressure monitoring system 1504, such as to measure the pressure exerted on the lens 1502. As will be described in greater detail herein, the pressure measurement can be used to predict the user's intention for changing the weight of a line, type of a line, type of brush, click, double click, and the like. In embodiments, the pressure sensor may be constructed using any force or pressure measurement sensor located behind the lens 1502, including for example, a resistive sensor, a current sensor, a capacitive sensor, a voltage sensor such as a piezoelectric sensor, and the like.

The pen 1500 may also include a communications module 1518, such as for bi-directional communication with the HWC 102. In embodiments, the communications module 1518 may be a short distance communication module (e.g. Bluetooth). The communications module 1518 may be security matched to the HWC 102. The communications module 1518 maybe arranged to communicate data and commands to and from the microprocessor 1510 of the pen 1500. The microprocessor 1510 may be programmed to interpret data generated from the camera 1508, IMU 1512, and pressure sensor 1504, and the like, and then pass a command onto the HWC 102 through the communications module 1518, for example. In another embodiment, the data collected from any of the input sources (e.g. camera 1508, IMU 1512, pressure sensor 1504) by the microprocessor may be communicated by the communication module 1518 to the HWC 102, and the HWC 102 may perform data processing and prediction of the user's intention when using the pen 1500. In yet another embodiment, the data may be further passed on through a network 110 to a remote device 112, such as a server, for the data processing and prediction. The commands may then be communicated back to the HWC 102 for execution (e.g. display writing in the glasses display, make a selection within the UI of the glasses display, control a remote external device 112, control a local external device 108), and the like. The pen may also include memory 1514 for long or short term uses.

The pen 1500 may also include a number of physical user interfaces, such as quick launch buttons 1522, a touch sensor 1520, and the like. The quick launch buttons 1522 may be adapted to provide the user with a fast way of jumping to a software application in the HWC system 100. For example, the user may be a frequent user of communication software packages (e.g. email, text, Twitter, Instagram, Facebook, Google+, and the like), and the user may program a quick launch button 1522 to command the HWC 102 to launch an application. The pen 1500 may be provided with several quick launch buttons 1522, which may be user programmable or factory programmable. The quick launch button 1522 may be programmed to perform an operation. For example, one of the buttons may be programmed to clear the digital display of the HWC 102. This would create a fast way for the user to clear the screens on the HWC 102 for any reason, such as for example to better view the environment. The quick launch button functionality will be discussed in further detail below. The touch sensor 1520 may be used to take gesture style input from the user. For example, the user may be able to take a single finger and run it across the touch sensor 1520 to affect a page scroll.

The pen 1500 may also include a laser pointer 1524. The laser pointer 1524 may be coordinated with the IMU 1512 to coordinate gestures and laser pointing. For example, a user may use the laser 1524 in a presentation to help with guiding the audience with the interpretation of graphics and the IMU 1512 may, either simultaneously or when the laser 1524 is off, interpret the user's gestures as commands or data input.

Figure 16A:
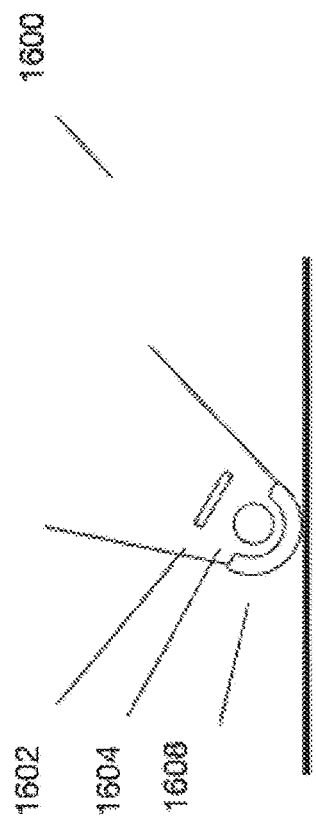
FIGS. 16a to 16c illustrate distance control systems in accordance with the principles of the present disclosure.
Figure 16B:
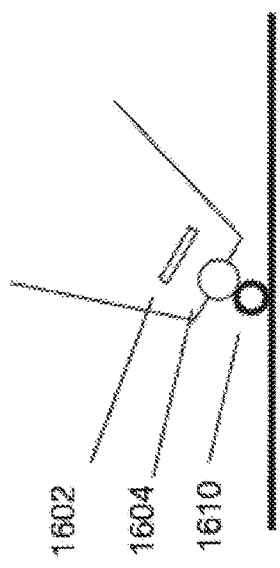
Figure 16C:
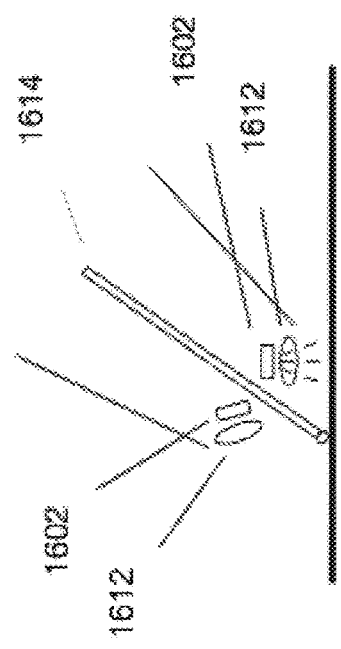

FIGS. 16A-C illustrate several embodiments of lens and camera arrangements 1600 for the pen 1500. One aspect relates to maintaining a constant distance between the camera and the writing surface to enable the writing surface to be kept in focus for better tracking of movements of the pen 1500 over the writing surface. Another aspect relates to maintaining an angled surface following the circumference of the writing tip of the pen 1500 such that the pen 1500 can be rolled or partially rolled in the user's hand to create the feel and freedom of a conventional writing instrument.

FIG. 16A illustrates an embodiment of the writing lens end of the pen 1500. The configuration includes a ball lens 1604, a camera or image capture surface 1602, and a domed cover lens 1608. In this arrangement, the camera views the writing surface through the ball lens 1604 and dome cover lens 1608. The ball lens 1604 causes the camera to focus such that the camera views the writing surface when the pen 1500 is held in the hand in a natural writing position, such as with the pen 1500 in contact with a writing surface. In embodiments, the ball lens 1604 should be separated from the writing surface to obtain the highest resolution of the writing surface at the camera 1602. In embodiments, the ball lens 1604 is separated by approximately 1 to 3 mm. In this configuration, the domed cover lens 1608 provides a surface that can keep the ball lens 1604 separated from the writing surface at a constant distance, such as substantially independent of the angle used to write on the writing surface. For instance, in embodiments the field of view of the camera in this arrangement would be approximately 60 degrees.

The domed cover lens, or other lens 1608 used to physically interact with the writing surface, will be transparent or transmissive within the active bandwidth of the camera 1602. In embodiments, the domed cover lens 1608 may be spherical or other shape and comprised of glass, plastic, sapphire, diamond, and the like. In other embodiments where low resolution imaging of the surface is acceptable. The pen 1500 can omit the domed cover lens 1608 and the ball lens 1604 can be in direct contact with the surface.

FIG. 16B illustrates another structure where the construction is somewhat similar to that described in connection with FIG. 16A; however this embodiment does not use a dome cover lens 1608, but instead uses a spacer 1610 to maintain a predictable distance between the ball lens 1604 and the writing surface, wherein the spacer may be spherical, cylindrical, tubular or other shape that provides spacing while allowing for an image to be obtained by the camera 1602 through the lens 1604. In a preferred embodiment, the spacer 1610 is transparent. In addition, while the spacer 1610 is shown as spherical, other shapes such as an oval, doughnut shape, half sphere, cone, cylinder or other form may be used.

FIG. 16C illustrates yet another embodiment, where the structure includes a post 1614, such as running through the center of the lensed end of the pen 1500. The post 1614 may be an ink deposition system (e.g. ink cartridge), graphite deposition system (e.g. graphite holder), or a dummy post whose purpose is mainly only that of alignment. The selection of the post type is dependent on the pen's use. For instance, in the event the user wants to use the pen 1500 as a conventional ink depositing pen as well as a fully functional external user interface 104, the ink system post would be the best selection. If there is no need for the 'writing' to be visible on the writing surface, the selection would be the dummy post. The embodiment of FIG. 16C includes camera (s) 1602 and an associated lens 1612, where the camera 1602 and lens 1612 are positioned to capture the writing surface without substantial interference from the post 1614. In embodiments, the pen 1500 may include multiple cameras 1602 and lenses 1612 such that more or all of the circumference of the tip 1614 can be used as an input system. In an embodiment, the pen 1500 includes a contoured grip that keeps the pen aligned in the user's hand so that the camera 1602 and lens 1612 remains pointed at the surface.

Another aspect of the pen 1500 relates to sensing the force applied by the user to the writing surface with the pen 1500. The force measurement may be used in a number of ways. For example, the force measurement may be used as a discrete value, or discontinuous event tracking, and compared against a threshold in a process to determine a user's intent. The user may want the force interpreted as a 'click' in the selection of an object, for instance. The user may intend multiple force exertions interpreted as multiple clicks. There may be times when the user holds the pen 1500 in a certain position or holds a certain portion of the pen 1500 (e.g. a button or touch pad) while clicking to affect a certain operation (e.g. a 'right click'). In embodiments, the force measurement may be used to track force and force trends. The force trends may be tracked and compared to threshold limits, for example. There may be one such threshold limit, multiple limits, groups of related limits, and the like. For example, when the force measurement indicates a fairly constant force that generally falls within a range of related threshold values, the microprocessor 1510 may interpret the force trend as an indication that the user desires to maintain the current writing style, writing tip type, line weight, brush type, and the like. In the event that the force trend appears to have gone outside of a set of threshold values intentionally, the microprocessor may interpret the action as an indication that the user wants to change the current writing style, writing tip type, line weight, brush type, and the like. Once the microprocessor has made a determination of the user's intent, a change in the current writing style, writing tip type, line weight, brush type, and the like may be executed. In embodiments, the change may be noted to the user (e.g. in a display of the HWC 102), and the user may be presented with an opportunity to accept the change.

FIG. 17A illustrates an embodiment of a force sensing surface tip 1700 of a pen 1500. The force sensing surface tip 1700 comprises a surface connection tip 1702 (e.g. a lens as described herein elsewhere) in connection with a force or pressure monitoring system 1504. As a user uses the pen 1500 to write on a surface or simulate writing on a surface the force monitoring system 1504 measures the force or pressure the user applies to the writing surface and the force monitoring system communicates data to the microprocessor 1510 for processing. In this configuration, the microprocessor 1510 receives force data from the force monitoring system 1504 and processes the data to make predictions of the user's intent in applying the particular force that is currently being applied. In embodiments, the processing may be provided at a location other than on the pen (e.g. at a server in the HWC system 100, on the HWC 102). For clarity, when reference is made herein to processing information on the microprocessor 1510, the processing of information contemplates processing the information at a location other than on the pen. The microprocessor 1510 may be programmed with force threshold(s), force signature(s), force signature library and/or other characteristics intended to guide an inference program in determining the user's intentions based on the measured force or pressure. The microprocessor 1510 may be further programmed to make inferences from the force measurements as to whether the user has attempted to initiate a discrete action (e.g. a user interface selection 'click') or is performing a constant action (e.g. writing within a particular writing style). The inferencing process is important as it causes the pen 1500 to act as an intuitive external user interface 104.

FIG. 17B illustrates a force 1708 versus time 1710 trend chart with a single threshold 1718. The threshold 1718 may be set at a level that indicates a discrete force exertion indicative of a user's desire to cause an action (e.g. select an object in a GUI). Event 1712, for example, may be interpreted as a click or selection command because the force quickly increased from below the threshold 1718 to above the threshold 1718. The event 1714 may be interpreted as a double click because the force quickly increased above the threshold 1718, decreased below the threshold 1718 and then essentially repeated quickly. The user may also cause the force to go above the threshold 1718 and hold for a period indicating that the user is intending to select an object in the GUI (e.g. a GUI presented in the display of the HWC 102) and 'hold' for a further operation (e.g. moving the object).

While a threshold value may be used to assist in the interpretation of the user's intention, a signature force event trend may also be used. The threshold and signature may be used in combination or either method may be used alone. For example, a single-click signature may be represented by a certain force trend signature or set of signatures. The single-click signature(s) may require that the trend meet a criteria of a rise time between x any y values, a hold time of between a and b values and a fall time of between c and d values, for example. Signatures may be stored for a variety of functions such as click, double click, right click, hold, move, etc. The microprocessor 1510 may compare the real-time force or pressure tracking against the signatures from a signature library to make a decision and issue a command to the software application executing in the GUI.

FIG. 17C illustrates a force 1708 versus time 1710 trend chart with multiple thresholds 1718. By way of example, the force trend is plotted on the chart with several pen force or pressure events. As noted, there are both presumably intentional events 1720 and presumably non-intentional events 1722. The two thresholds 1718 of FIG. 4C create three zones of force: a lower, middle and higher range. The beginning of the trend indicates that the user is placing a lower zone amount of force. This may mean that the user is writing with a given line weight and does not intend to change the weight, the user is writing. Then the trend shows a significant increase 1720 in force into the middle force range. This force change appears, from the trend to have been sudden and thereafter it is sustained. The microprocessor 1510 may interpret this as an intentional change and as a result change the operation in accordance with preset rules (e.g. change line width, increase line weight, etc.). The trend then continues with a second apparently intentional event 1720 into the higher-force range. During the performance in the higher-force range, the force dips below the upper threshold 1718. This may indicate an unintentional force change and the microprocessor may detect the change in range however not affect a change in the operations being coordinated by the pen 1500. As indicated above, the trend analysis may be done with thresholds and/or signatures.

Generally, in the present disclosure, instrument stroke parameter changes may be referred to as a change in line type, line weight, tip type, brush type, brush width, brush pressure, color, and other forms of writing, coloring, painting, and the like.

Another aspect of the pen 1500 relates to selecting an operating mode for the pen 1500 dependent on contextual information and/or selection interface(s). The pen 1500 may have several operating modes. For instance, the pen 1500 may have a writing mode where the user interface(s) of the pen 1500 (e.g. the writing surface end, quick launch buttons 1522, touch sensor 1520, motion based gesture, and the like) is optimized or selected for tasks associated with writing. As another example, the pen 1500 may have a wand mode where the user interface(s) of the pen is optimized or selected for tasks associated with software or device control (e.g. the HWC 102, external local device, remote device 112, and the like). The pen 1500, by way of another example, may have a presentation mode where the user interface(s) is optimized or selected to assist a user with giving a presentation (e.g. pointing with the laser pointer 1524 while using the button(s) 1522 and/or gestures to control the presentation or applications relating to the presentation). The pen may, for example, have a mode that is optimized or selected for a particular device that a user is attempting to control. The pen 1500 may have a number of other modes and an aspect of the present disclosure relates to selecting such modes.

FIG. 18A illustrates an automatic user interface(s) mode selection based on contextual information. The microprocessor 1510 may be programmed with IMU thresholds 1814 and 1812. The thresholds 1814 and 1812 may be used as indications of upper and lower bounds of an angle 1804 and 1802 of the pen 1500 for certain expected positions during certain predicted modes. When the microprocessor 1510 determines that the pen 1500 is being held or otherwise positioned within angles 1802 corresponding to writing thresholds 1814, for example, the microprocessor 1510 may then institute a writing mode for the pen's user interfaces. Similarly, if the microprocessor 1510 determines (e.g. through the IMU 1512) that the pen is being held at an angle 1804 that falls between the predetermined wand thresholds 1812, the microprocessor may institute a wand mode for the pen's user interface. Both of these examples may be referred to as context based user interface mode selection as the mode selection is based on contextual information (e.g. position) collected automatically and then used through an automatic evaluation process to automatically select the pen's user interface(s) mode.

As with other examples presented herein, the microprocessor 1510 may monitor the contextual trend (e.g. the angle of the pen over time) in an effort to decide whether to stay in a mode or change modes. For example, through signatures, thresholds, trend analysis, and the like, the microprocessor may determine that a change is an unintentional change and therefore no user interface mode change is desired.

Figure 18B:
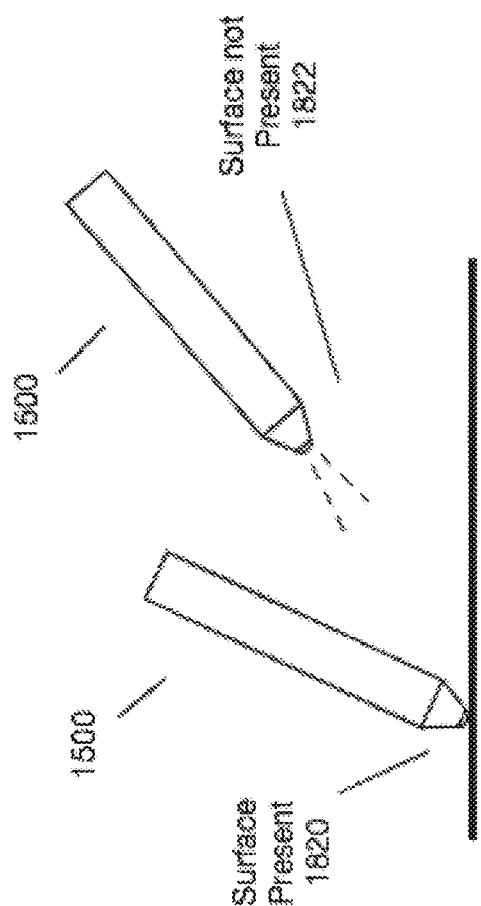

FIG. 18B illustrates an automatic user interface(s) mode selection based on contextual information. In this example, the pen 1500 is monitoring (e.g. through its microprocessor) whether or not the camera at the writing surface end 1508 is imaging a writing surface in close proximity to the writing surface end of the pen 1500. If the pen 1500 determines that a writing surface is within a predetermined relatively short distance, the pen 1500 may decide that a writing surface is present 1820 and the pen may go into a writing mode user interface(s) mode. In the event that the pen 1500 does not detect a relatively close writing surface 1822, the pen may predict that the pen is not currently being used to as a writing instrument and the pen may go into a non-writing user interface(s) mode.

Figure 18C:
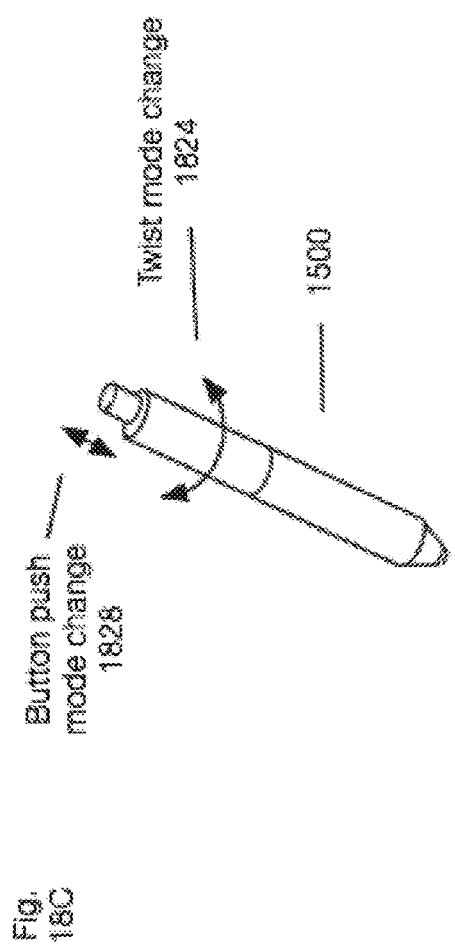

FIG. 18C illustrates a manual user interface(s) mode selection. The user interface(s) mode may be selected based on a twist of a section 1824 of the pen 1500 housing, clicking an end button 1828, pressing a quick launch button 1522, interacting with touch sensor 1520, detecting a predetermined action at the pressure monitoring system (e.g. a click), detecting a gesture (e.g. detected by the IMU), etc. The manual mode selection may involve selecting an item in a GUI associated with the pen 1500 (e.g. an image presented in the display of HWC 102).

In embodiments, a confirmation selection may be presented to the user in the event a mode is going to change. The presentation may be physical (e.g. a vibration in the pen 1500), through a GUI, through a light indicator, etc.

FIG. 19 illustrates a couple pen use-scenarios 1900 and 1901. There are many use scenarios and we have presented a couple in connection with FIG. 19 as a way of illustrating use scenarios to further the understanding of the reader. As such, the use-scenarios should be considered illustrative and non-limiting.

Use scenario 1900 is a writing scenario where the pen 1500 is used as a writing instrument. In this example, quick launch button 122A is pressed to launch a note application 1910 in the GUI 1908 of the HWC 102 display 1904. Once the quick launch button 122A is pressed, the HWC 102 launches the note program 1910 and puts the pen into a writing mode. The user uses the pen 1500 to scribe symbols 1902 on a writing surface, the pen records the scribing and transmits the scribing to the HWC 102 where symbols representing the scribing are displayed 1912 within the note application 1910.

Use scenario 1901 is a gesture scenario where the pen 1500 is used as a gesture capture and command device. In this example, the quick launch button 122B is activated and the pen 1500 activates a wand mode such that an application launched on the HWC 102 can be controlled. Here, the user sees an application chooser 1918 in the display(s) of the HWC 102 where different software applications can be chosen by the user. The user gestures (e.g. swipes, spins, turns, etc.) with the pen to cause the application chooser 1918 to move from application to application. Once the correct application is identified (e.g. highlighted) in the chooser 1918, the user may gesture or click or otherwise interact with the pen 1500 such that the identified application is selected and launched. Once an application is launched, the wand mode may be used to scroll, rotate, change applications, select items, initiate processes, and the like, for example.

In an embodiment, the quick launch button 122A may be activated and the HWC 102 may launch an application chooser presenting to the user a set of applications. For example, the quick launch button may launch a chooser to show all communication programs (e.g. SMS, Twitter, Instagram, Facebook, email, etc.) available for selection such that the user can select the program the user wants and then go into a writing mode. By way of further example, the launcher may bring up selections for various other groups that are related or categorized as generally being selected at a given time (e.g. Microsoft Office products, communication products, productivity products, note products, organizational products, and the like)

Figure 20:
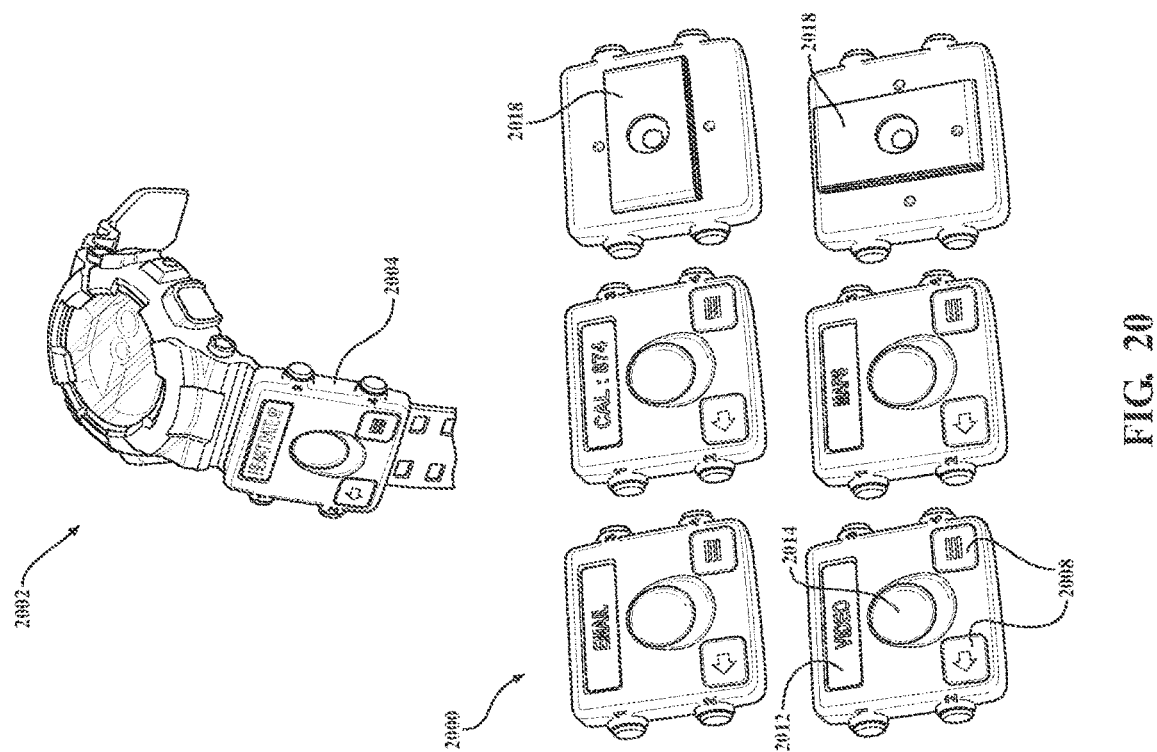
FIG. 20 illustrates external user interfaces in accordance with the principles of the present disclosure.

FIG. 20 illustrates yet another embodiment of the present disclosure. FIG. 2000 illustrates a watchband clip on controller 2000. The watchband clip on controller may be a controller used to control the HWC 102 or devices in the HWC system 100. The watchband clip on controller 2000 has a fastener 2018 (e.g. rotatable clip) that is mechanically adapted to attach to a watchband, as illustrated at 2004.

The watchband controller 2000 may have quick launch interfaces 2008 (e.g. to launch applications and choosers as described herein), a touch pad 2014 (e.g. to be used as a touch style mouse for GUI control in a HWC 102 display) and a display 2012. The clip 2018 may be adapted to fit a wide range of watchbands so it can be used in connection with a watch that is independently selected for its function. The clip, in embodiments, is rotatable such that a user can position it in a desirable manner. In embodiments the clip may be a flexible strap. In embodiments, the flexible strap may be adapted to be stretched to attach to a hand, wrist, finger, device, weapon, and the like.

In embodiments, the watchband controller may be configured as a removable and replaceable watchband. For example, the controller may be incorporated into a band with a certain width, segment spacing's, etc. such that the watchband, with its incorporated controller, can be attached to a watch body. The attachment, in embodiments, may be mechanically adapted to attach with a pin upon which the watchband rotates. In embodiments, the watchband controller may be electrically connected to the watch and/or watch body such that the watch, watch body and/or the watchband controller can communicate data between them.

The watchband controller may have 3-axis motion monitoring (e.g. through an IMU, accelerometers, magnetometers, gyroscopes, etc.) to capture user motion. The user motion may then be interpreted for gesture control.

In embodiments, the watchband controller may comprise fitness sensors and a fitness computer. The sensors may track heart rate, calories burned, strides, distance covered, and the like. The data may then be compared against performance goals and/or standards for user feedback.

Another aspect of the present disclosure relates to visual display techniques relating to micro Doppler ("mD") target tracking signatures ("mD signatures"). mD is a radar technique that uses a series of angle dependent electromagnetic pulses that are broadcast into an environment and return pulses are captured. Changes between the broadcast pulse and return pulse are indicative of changes in the shape, distance and angular location of objects or targets in the environment. These changes provide signals that can be used to track a target and identify the target through the mD signature. Each target or target type has a unique mD signature. Shifts in the radar pattern can be analyzed in the time domain and frequency domain based on mD techniques to derive information about the types of targets present (e.g. whether people are present), the motion of the targets and the relative angular location of the targets and the distance to the targets. By selecting a frequency used for the mD pulse relative to known objects in the environment, the pulse can penetrate the known objects to enable information about targets to be gathered even when the targets are visually blocked by the known objects. For example, pulse frequencies can be used that will penetrate concrete buildings to enable people to be identified inside the building. Multiple pulse frequencies can be used as well in the mD radar to enable different types of information to be gathered about the objects in the environment. In addition, the mD radar information can be combined with other information such as distance measurements or images captured of the environment that are analyzed jointly to provide improved object identification and improved target identification and tracking. In embodiments, the analysis can be performed on the HWC or the information can be transmitted to a remote network for analysis and results transmitted back to the HWC. Distance measurements can be provided by laser range finding, structured lighting, stereoscopic depth maps or sonar measurements. Images of the environment can be captured using one or more cameras capable of capturing images from visible, ultraviolet or infrared light. The mD radar can be attached to the HWC, located adjacently (e.g. in a vehicle) and associated wirelessly with the HWC or located remotely. Maps or other previously determined information about the environment can also be used in the analysis of the mD radar information. Embodiments of the present disclosure relate to visualizing the mD signatures in useful ways.

Figure 21:
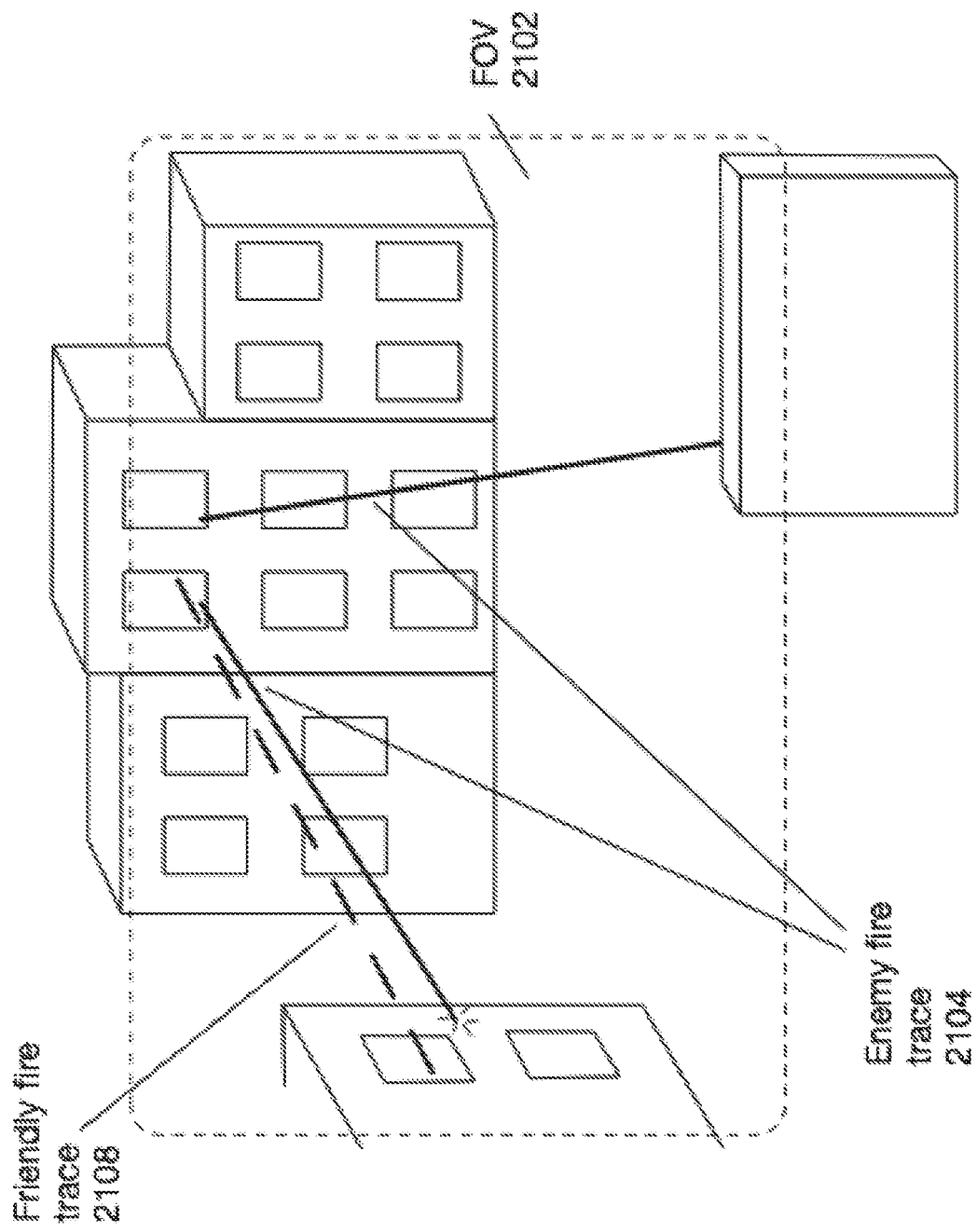
FIG. 21 illustrates mD trace representations presented in accordance with the principles of the present disclosure.

FIG. 21 illustrates a FOV 2102 of a HWC 102 from a wearer's perspective. The wearer, as described herein elsewhere, has a see-through FOV 2102 wherein the wearer views adjacent surroundings, such as the buildings illustrated in FIG. 21. The wearer, as described herein elsewhere, can also see displayed digital content presented within a portion of the FOV 2102. The embodiment illustrated in FIG. 21 is indicating that the wearer can see the buildings and other surrounding elements in the environment and digital content representing traces, or travel paths, of bullets being fired by different people in the area. The surroundings are viewed through the transparency of the FOV 2102. The traces are presented via the digital computer display, as described herein elsewhere. In embodiments, the trace presented is based on a mD signature that is collected and communicated to the HWC in real time. The mD radar itself may be on or near the wearer of the HWC 102 or it may be located remote from the wearer. In embodiments, the mD radar scans the area, tracks and identifies targets, such as bullets, and communicates traces, based on locations, to the HWC 102.

There are several traces 2108 and 2104 presented to the wearer in the embodiment illustrated in FIG. 21. The traces communicated from the mD radar may be associated with GPS locations and the GPS locations may be associated with objects in the environment, such as people, buildings, vehicles, etc, both in latitude and longitude perspective and an elevation perspective. The locations may be used as markers for the HWC such that the traces, as presented in the FOV, can be associated, or fixed in space relative to the markers. For example, if the friendly fire trace 2108 is determined, by the mD radar, to have originated from the upper right window of the building on the left, as illustrated in FIG. 21, then a virtual marker may be set on or near the window. When the HWC views, through its camera or other sensor, for example, the building's window, the trace may then virtually anchor with the virtual marker on the window. Similarly, a marker may be set near the termination position or other flight position of the friendly fire trace 2108, such as the upper left window of the center building on the right, as illustrated in FIG. 21. This technique fixes in space the trace such that the trace appears fixed to the environmental positions independent of where the wearer is looking. So, for example, as the wearer's head turns, the trace appears fixed to the marked locations.

In embodiments, certain user positions may be known and thus identified in the FOV. For example, the shooter of the friendly fire trace 2108 may be from a known friendly combatant and as such his location may be known. The position may be known based on his GPS location based on a mobile communication system on him, such as another HWC 102. In other embodiments, the friendly combatant may be marked by another friendly. For example, if the friendly position in the environment is known through visual contact or communicated information, a wearer of the HWC 102 may use a gesture or external user interface 104 to mark the location. If a friendly combatant location is known the originating position of the friendly fire trace 2108 may be color coded or otherwise distinguished from unidentified traces on the displayed digital content. Similarly, enemy fire traces 2104 may be color coded or otherwise distinguished on the displayed digital content. In embodiments, there may be an additional distinguished appearance on the displayed digital content for unknown traces.

In addition to situationally associated trace appearance, the trace colors or appearance may be different from the originating position to the terminating position. This path appearance change may be based on the mD signature. The mD signature may indicate that the bullet, for example, is slowing as it propagates and this slowing pattern may be reflected in the FOV 2102 as a color or pattern change. This can create an intuitive understanding of where the shooter is located. For example, the originating color may be red, indicative of high speed, and it may change over the course of the trace to yellow, indicative of a slowing trace. This pattern changing may also be different for a friendly, enemy and unknown combatant. The enemy may go blue to green for a friendly trace, for example.

FIG. 21 illustrates an embodiment where the user sees the environment through the FOV and may also see color coded traces, which are dependent on bullet speed and combatant type, where the traces are fixed in environmental positions independent on the wearer's perspective. Other information, such as distance, range, range rings, time of day, date, engagement type (e.g. hold, stop firing, back away, etc.) may also be displayed in the FOV.

Another aspect of the present disclosure relates to mD radar techniques that trace and identify targets through other objects, such as walls (referred to generally as through wall mD), and visualization techniques related therewith. FIG. 22 illustrates a through wall mD visualization technique according to the principles of the present disclosure. As described herein elsewhere, the mD radar scanning the environment may be local or remote from the wearer of a HWC 102. The mD radar may identify a target (e.g. a person) that is visible 2204 and then track the target as he goes behind a wall 2208. The tracking may then be presented to the wearer of a HWC 102 such that digital content reflective of the target and the target's movement, even behind the wall, is presented in the FOV 2202 of the HWC 102. In embodiments, the target, when out of visible sight, may be represented by an avatar in the FOV to provide the wearer with imagery representing the target.

mD target recognition methods can identify the identity of a target based on the vibrations and other small movements of the target. This can provide a personal signature for the target. In the case of humans, this may result in a personal identification of a target that has been previously characterized. The cardio, heartbeat, lung expansion and other small movements within the body may be unique to a person and if those attributes are pre-identified they may be matched in real time to provide a personal identification of a person in the FOV 2202. The person's mD signatures may be determined based on the position of the person. For example, the database of personal mD signature attributes may include mD signatures for a person standing, sitting, laying down, running, walking, jumping, etc. This may improve the accuracy of the personal data match when a target is tracked through mD signature techniques in the field. In the event a person is personally identified, a specific indication of the person's identity may be presented in the FOV 2202. The indication may be a color, shape, shade, name, indication of the type of person (e.g. enemy, friendly, etc.), etc. to provide the wearer with intuitive real time information about the person being tracked. This may be very useful in a situation where there is more than one person in an area of the person being tracked. If just one person in the area is personally identified, that person or the avatar of that person can be presented differently than other people in the area.

FIG. 23 illustrates an mD scanned environment 2300. An mD radar may scan an environment in an attempt to identify objects in the environment. In this embodiment, the mD scanned environment reveals two vehicles 2302*a* and 2302*b*, an enemy combatant 2309, two friendly combatants 2308*a* and 2308*b* and a shot trace 2318. Each of these objects may be personally identified or type identified. For example, the vehicles 2302a and 2302b may be identified through the mD signatures as a tank and heavy truck. The enemy combatant 2309 may be identified as a type (e.g. enemy combatant) or more personally (e.g. by name). The friendly combatants may be identified as a type (e.g. friendly combatant) or more personally (e.g. by name). The shot trace 2318 may be characterized by type of projectile or weapon type for the projectile, for example.

Figure 23A:
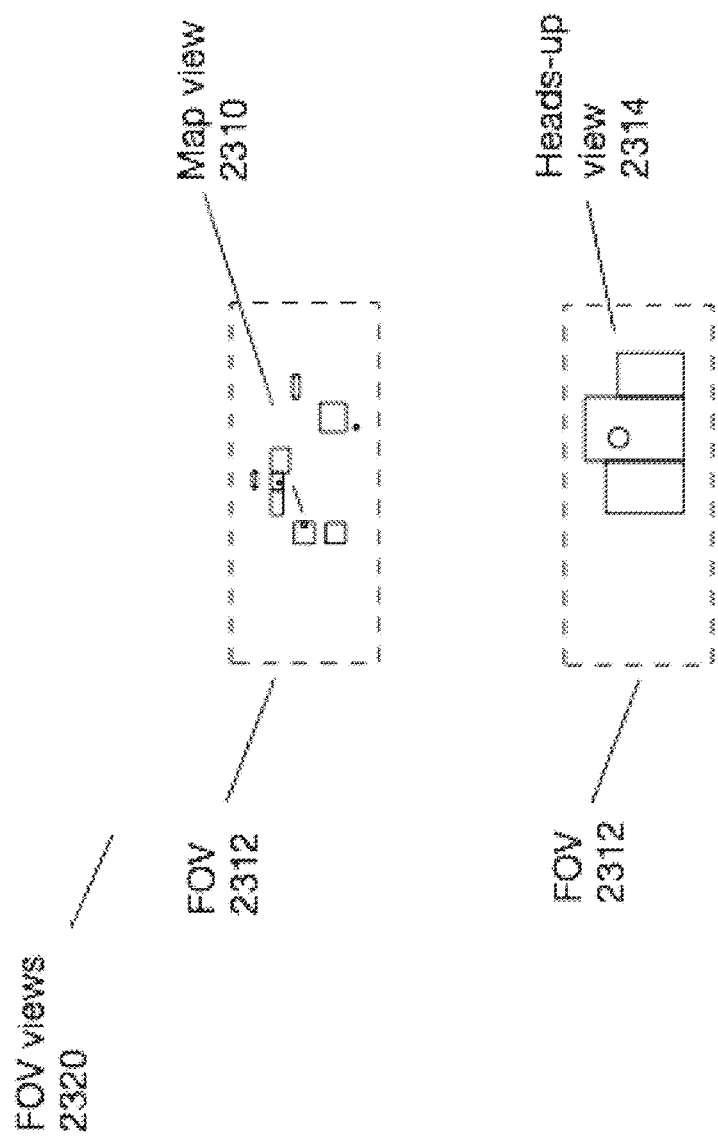
FIG. 23a illustrates mD trace representations presented in accordance with the principles of the present disclosure.

FIG. 23a illustrates two separate HWC 102 FOV display techniques according to the principles of the present disclosure. FOV 2312 illustrates a map view 2310 where the mD scanned environment is presented. Here, the wearer has a perspective on the mapped area so he can understand all tracked targets in the area. This allows the wearer to traverse the area with knowledge of the targets. FOV 2312 illustrates a heads-up view to provide the wearer with an augmented reality style view of the environment that is in proximity of the wearer.

An aspect of the present disclosure relates to suppression of extraneous or stray light. As discussed herein elsewhere, eyeglow and faceglow are two such artifacts that develop from such light. Eyeglow and faceglow can be caused by image light escaping from the optics module. The escaping light is then visible, particularly in dark environments when the user is viewing bright displayed images with the HWC. Light that escapes through the front of the HWC is visible as eyeglow as it that light that is visible in the region of the user's eyes. Eyeglow can appear in the form of a small version of the displayed image that the user is viewing. Light that escapes from the bottom of the HWC shines onto the user's face, cheek or chest so that these portions of the user appear to glow. Eyeglow and faceglow can both increase the visibility of the user and highlight the use of the HWC, which may be viewed negatively by the user. As such, reducing eyeglow and faceglow is advantageous. In combat situations (e.g. the mD trace presentation scenarios described herein) and certain gaming situations, the suppression of extraneous or stray light is very important.

The disclosure relating to FIG. 6 shows an example where a portion of the image light passes through the combiner 602 such that the light shines onto the user's face, thereby illuminating a portion of the user's face in what is generally referred to herein as faceglow. Faceglow can be caused by any portion of light from the HWC that illuminates the user's face.

An example of the source for the faceglow light can come from wide cone angle light associated with the image light incident onto the combiner 602. Where the combiner can include a holographic mirror or a notch mirror in which the narrow bands of high reflectivity are matched to wavelengths of light by the light source. The wide cone angle associated with the image light corresponds with the field of view provided by the HWC. Typically the reflectivity of holographic mirrors and notch mirrors is reduced as the cone angle of the incident light is increased above 8 degrees. As a result, for a field of view of 30 degrees, substantial image light can pass through the combiner and cause faceglow.

Figure 24:
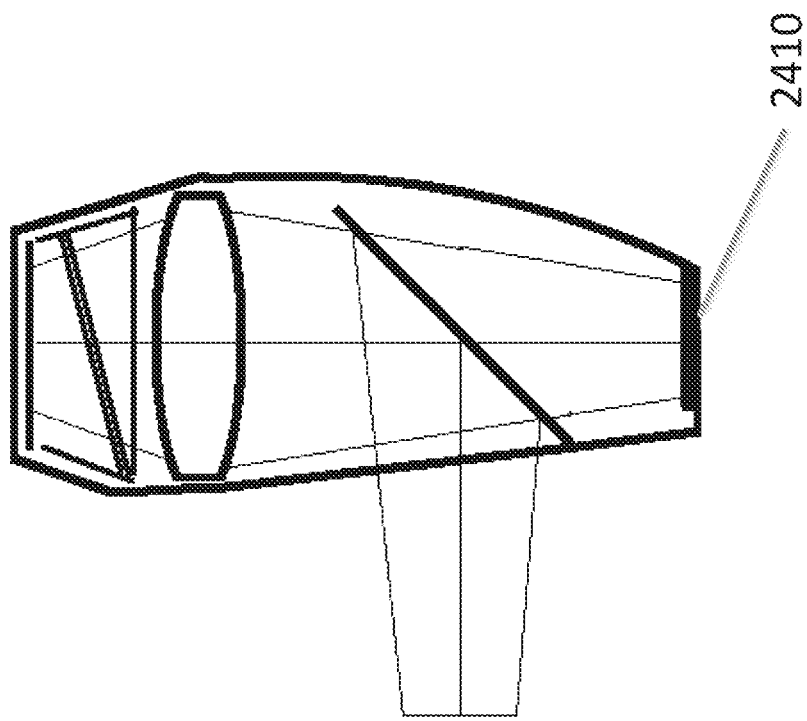
FIG. 24 illustrates a stray light suppression technology in accordance with the principles of the present disclosure.

FIG. 24 shows an illustration of a light trap 2410 for the faceglow light. In this embodiment, an extension of the outer shield lens of the HWC is coated with a light absorbing material in the region where the converging light responsible for faceglow is absorbed in a light trap 2410. The light absorbing material can be black or it can be a filter designed to absorb only the specific wavelengths of light provided by the light source(s) in the HWC. In addition, the surface of the light trap 2410 may be textured or fibrous to further improve the absorption.

Figure 25:
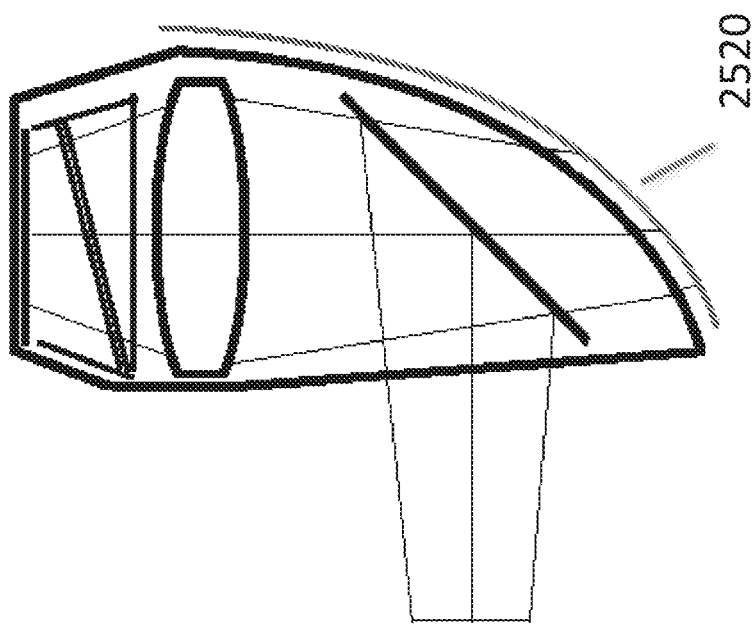
FIG. 25 illustrates a stray light suppression technology in accordance with the principles of the present disclosure.

FIG. 25 illustrates an optical system for a HWC that includes an outer absorptive polarizer 2520 to block the faceglow light. In this embodiment, the image light is polarized and as a result the light responsible for faceglow is similarly polarized. The absorptive polarizer is oriented with a transmission axis such that the faceglow light is absorbed and not transmitted. In this case, the rest of the imaging system in the HWC may not require polarized image light and the image light may be polarized at any point before the combiner. In embodiments, the transmission axis of the absorptive polarizer 2520 is oriented vertically so that external glare from water (S polarized light) is absorbed and correspondingly, the polarization of the image light is selected to be horizontal (S polarization). Consequently, image light that passes through the combiner 602 and is then incident onto the absorptive polarizer 2520, is absorbed. In FIG. 25 the absorptive polarizer 2520 is shown outside the shield lens, alternatively the absorptive polarizer 2520 can be located inside the shield lens.

Figure 26:
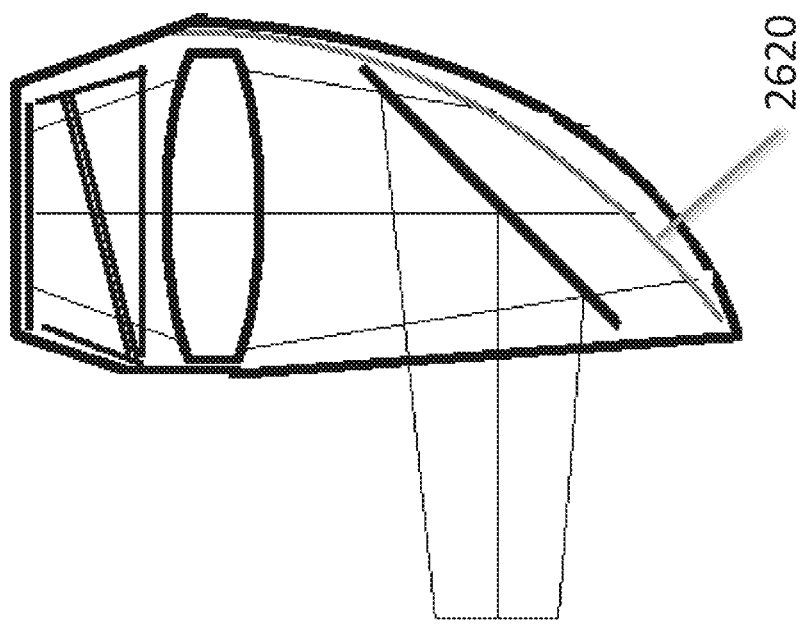
FIG. 26 illustrates a stray light suppression technology in accordance with the principles of the present disclosure.

FIG. 26 illustrates an optical system for a HWC that includes a film with an absorptive notch filter 2620. In this case, the absorptive notch filter absorbs narrow bands of light that are selected to match the light provided by the optical system's light source. As a result, the absorptive notch filter is opaque with respect to the faceglow light and is transparent to the remainder of the wavelengths included in the visible spectrum so that the user has a clear view of the surrounding environment. A triple notch filter suitable for this approach is available from Iridian Spectral Technologies, Ottawa, ON: http://www.ilphotonics.com/cdv2/Iridian-Interference%20Filters/New%20filters/Triple%20Notch%20Filter.pdf In embodiments, the combiner 602 may include a notch mirror coating to reflect the wavelengths of light in the image light and a notch filter 2620 can be selected in correspondence to the wavelengths of light provided by the light source and the narrow bands of high reflectivity provided by the notch mirror. In this way, image light that is not reflected by the notch mirror is absorbed by the notch filter 2620. In embodiments of the disclosure the light source can provide one narrow band of light for a monochrome imaging or three narrow bands of light for full color imaging. The notch mirror and associated notch filter would then each provide one narrow band or three narrow bands of high reflectivity and absorption respectively.

Figure 27:
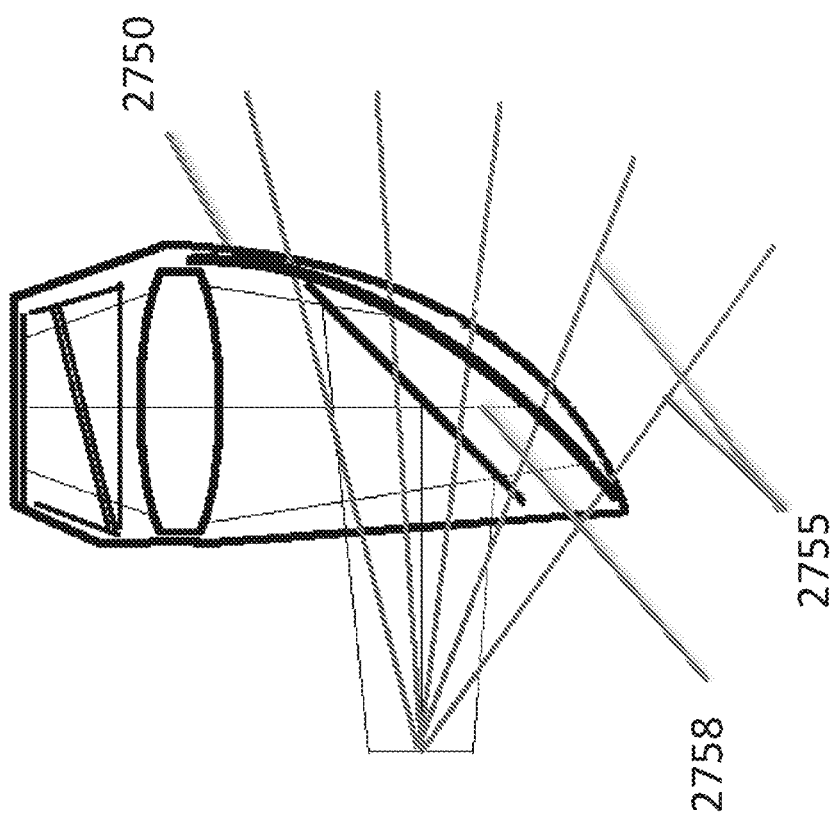
FIG. 27 illustrates a stray light suppression technology in accordance with the principles of the present disclosure.

FIG. 27 includes a microlouver film 2750 to block the faceglow light. Microlouver film is sold by 3M as ALCF-P, for example and is typically used as a privacy filter for computer. See http://multimedia.3 m.com/mws/mediawebserver?mwsId=SSSSSuH8gc7nZxtUoY_xIY_eevUqe17zHvTSevTSeSSSSSS--&fn=ALCF-P_ABR2_Control_Film_DS.pdf The microlouver film transmits light within a somewhat narrow angle (e.g. 30 degrees of normal and absorbs light beyond 30 degrees of normal). In FIG. 27, the microlouver film 2750 is positioned such that the faceglow light 2758 is incident beyond 30 degrees from normal while the see-through light 2755 is incident within 30 degrees of normal to the microlouver film 2750. As such, the faceglow light 2758 is absorbed by the microlouver film and the see-through light 2755 is transmitted so that the user has a bright see-thru view of the surrounding environment.

We now turn back to a description of eye imaging technologies. Aspects of the present disclosure relate to various methods of imaging the eye of a person wearing the HWC 102. In embodiments, technologies for imaging the eye using an optical path involving the "off" state and "no power" state, which is described in detail below, are described. In embodiments, technologies for imaging the eye with optical configurations that do not involve reflecting the eye image off of DLP mirrors is described. In embodiments, unstructured light, structured light, or controlled lighting conditions, are used to predict the eye's position based on the light reflected off of the front of the wearer's eye. In embodiments, a reflection of a presented digital content image is captured as it reflects off of the wearer's eye and the reflected image may be processed to determine the quality (e.g. sharpness) of the image presented. In embodiments, the image may then be adjusted (e.g. focused differently) to increase the quality of the image presented based on the image reflection.

Figure 28A:
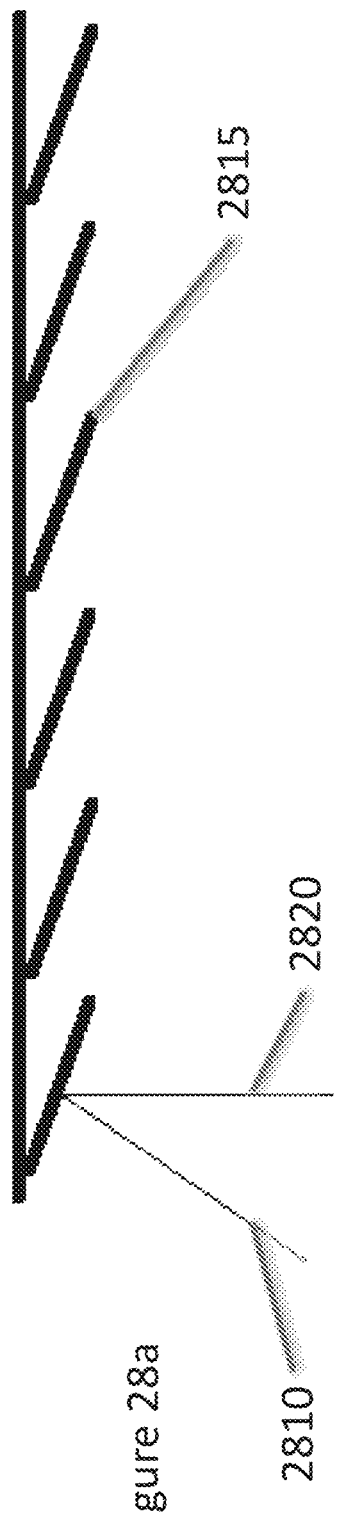
FIGS. 28a to 28c illustrate DLP mirror angles.
Figure 28B:
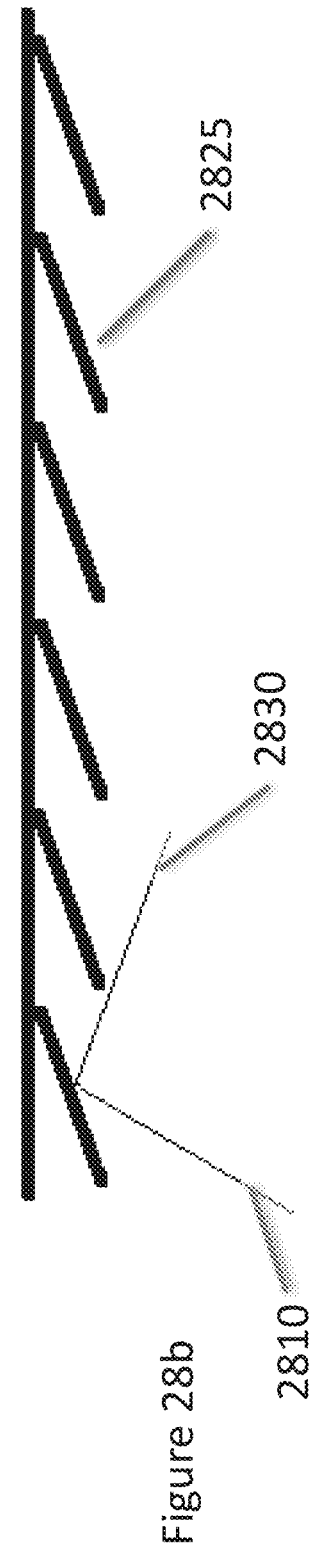
Figure 28C:
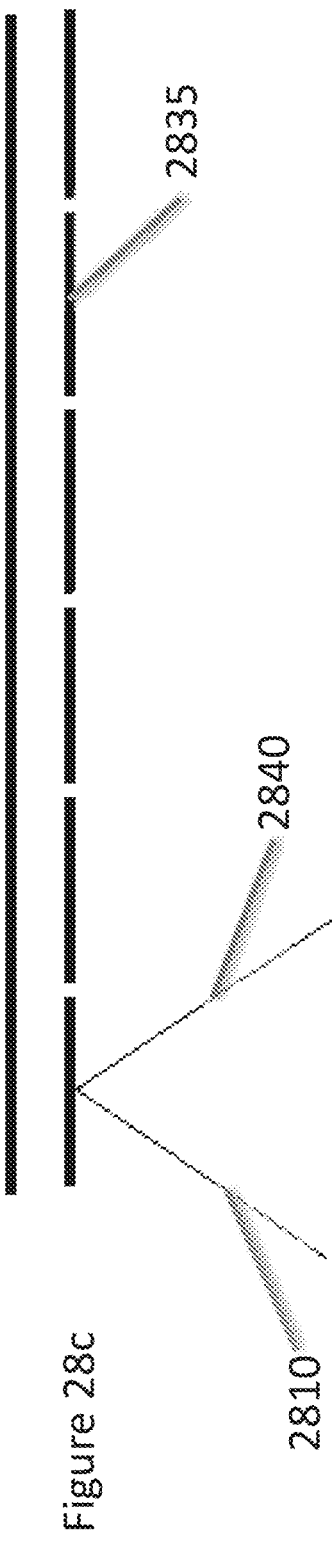

FIGS. 28a, 28b and 28c show illustrations of the various positions of the DLP mirrors. FIG. 28a shows the DLP mirrors in the "on" state 2815. With the mirror in the "on" state 2815, illumination light 2810 is reflected along an optical axis 2820 that extends into the lower optical module 204. FIG. 28b shows the DLP mirrors in the "off" state 2825. With the mirror in the "off" state 2825, illumination light 2810 is reflected along an optical axis 2830 that is substantially to the side of optical axis 2820 so that the "off" state light is directed toward a dark light trap as has been described herein elsewhere. FIG. 28c shows the DLP mirrors in a third position, which occurs when no power is applied to the DLP. This "no power" state differs from the "on" and "off" states in that the mirror edges are not in contact with the substrate and as such are less accurately positioned. FIG. 28c shows all of the DLP mirrors in the "no power" state 2835. The "no power" state is achieved by simultaneously setting the voltage to zero for the "on" contact and "off" contact for a DLP mirror, as a result, the mirror returns to a no stress position where the DLP mirror is in the plane of the DLP platform as shown in FIG. 28c. Although not normally done, it is also possible to apply the "no power" state to individual DLP mirrors. When the DLP mirrors are in the "no power" state they do not contribute image content. Instead, as shown in FIG. 28c, when the DLP mirrors are in the "no power" state, the illumination light 2810 is reflected along an optical axis 2840 that is between the optical axes 2820 and 2830 that are respectively associated with the "on" and "off" states and as such this light doesn't contribute to the displayed image as a bright or dark pixel. This light can however contribute scattered light into the lower optical module 204 and as a result the displayed image contrast can be reduced or artifacts can be created in the image that detract from the image content. Consequently, it is generally desirable, in embodiments, to limit the time associated with the "no power" state to times when images are not displayed or to reduce the time associated with having DLP mirrors in the "no power" state so that the effect of the scattered light is reduced.

Figure 29:
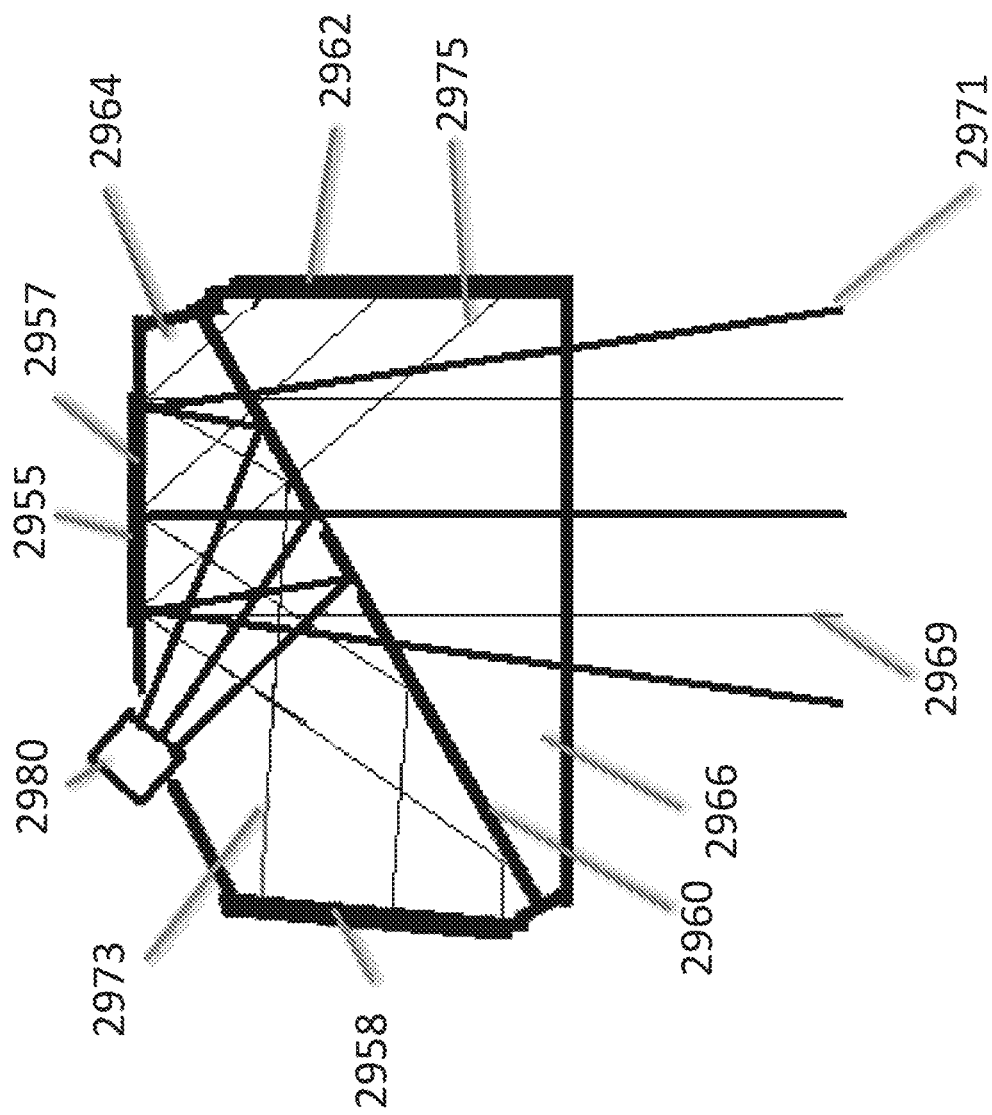
FIGS. 29 to 33 illustrate eye imaging systems according to the principles of the present disclosure.

FIG. 29 shows an embodiment of the disclosure that can be used for displaying digital content images to a wearer of the HWC 102 and capturing images of the wearer's eye. In this embodiment, light from the eye 2971 passes back through the optics in the lower module 204, the solid corrective wedge 2966, at least a portion of the light passes through the partially reflective layer 2960, the solid illumination wedge 2964 and is reflected by a plurality of DLP mirrors on the DLP 2955 that are in the "no power" state. The reflected light then passes back through the illumination wedge 2964 and at least a portion of the light is reflected by the partially reflective layer 2960 and the light is captured by the camera 2980.

For comparison, illuminating light rays 2973 from the light source 2958 are also shown being reflected by the partially reflective layer 2960. Where the angle of the illuminating light 2973 is such that the DLP mirrors, when in the "on" state, reflect the illuminating light 2973 to form image light 2969 that substantially shares the same optical axis as the light from the wearer's eye 2971. In this way, images of the wearer's eye are captured in a field of view that overlaps the field of view for the displayed image content. In contrast, light reflected by DLP mirrors in the "off" state form dark light 2975 which is directed substantially to the side of the image light 2969 and the light from eye 2971. Dark light 2975 is directed toward a light trap 2962 that absorbs the dark light to improve the contrast of the displayed image as has been described above in this specification.

In an embodiment, partially reflective layer 2960 is a reflective polarizer. The light that is reflected from the eye 2971 can then be polarized prior to entering the corrective wedge 2966 (e.g. with an absorptive polarizer between the upper module 202 and the lower module 204), with a polarization orientation relative to the reflective polarizer that enables the light reflected from the eye 2971 to substantially be transmitted by the reflective polarizer. A quarter wave retarder layer 2957 is then included adjacent to the DLP 2955 (as previously disclosed in FIG. 3b) so that the light reflected from the eye 2971 passes through the quarter wave retarder layer 2957 once before being reflected by the plurality of DLP mirrors in the "no power" state and then passes through a second time after being reflected. By passing through the quarter wave retarder layer 2957 twice, the polarization state of the light from the eye 2971 is reversed, such that when it is incident upon the reflective polarizer, the light from the eye 2971 is then substantially reflected toward the camera 2980. By using a partially reflective layer 2960 that is a reflective polarizer and polarizing the light from the eye 2971 prior to entering the corrective wedge 2964, losses attributed to the partially reflective layer 2960 are reduced.

FIG. 28c shows the case wherein the DLP mirrors are simultaneously in the "no power" state, this mode of operation can be particularly useful when the HWC 102 is first put onto the head of the wearer. When the HWC 102 is first put onto the head of the wearer, it is not necessary to display an image yet. As a result, the DLP can be in a "no power" state for all the DLP mirrors and an image of the wearer's eyes can be captured. The captured image of the wearer's eye can then be compared to a database, using iris identification techniques, or other eye pattern identification techniques to determine, for example, the identity of the wearer.

In a further embodiment illustrated by FIG. 29 all of the DLP mirrors are put into the "no power" state for a portion of a frame time (e.g. 50% of a frame time for the displayed digital content image) and the capture of the eye image is synchronized to occur at the same time and for the same duration. By reducing the time that the DLP mirrors are in the "no power" state, the time where light is scattered by the DLP mirrors being in the "no power" state is reduced such that the wearer doesn't perceive a change in the displayed image quality. This is possible because the DLP mirrors have a response time on the order of microseconds while typical frame times for a displayed image are on the order of 0.016 seconds. This method of capturing images of the wearer's eye can be used periodically to capture repetitive images of the wearer's eye. For example, eye images could be captured for 50% of the frame time of every $10^{th}$ frame displayed to the wearer. In another example, eye images could be captured for 10% of the frame time of every frame displayed to the wearer.

Alternately, the "no power" state can be applied to a subset of the DLP mirrors (e.g. 10% of the DLP mirrors) within while another subset is in busy generating image light for content to be displayed. This enables the capture of an eye image(s) during the display of digital content to the wearer. The DLP mirrors used for eye imaging can, for example, be distributed randomly across the area of the DLP to minimize the impact on the quality of the digital content being displayed to the wearer. To improve the displayed image perceived by the wearer, the individual DLP mirrors put into the "no power" state for capturing each eye image, can be varied over time such as in a random pattern, for example. In yet a further embodiment, the DLP mirrors put into the "no power" state for eye imaging may be coordinated with the digital content in such a way that the "no power" mirrors are taken from a portion of the image that requires less resolution.

In the embodiments of the disclosure as illustrated in FIGS. 9 and 29, in both cases the reflective surfaces provided by the DLP mirrors do not preserve the wavefront of the light from the wearer's eye so that the image quality of captured image of the eye is somewhat limited. It may still be useful in certain embodiments, but it is somewhat limited. This is due to the DLP mirrors not being constrained to be on the same plane. In the embodiment illustrated in FIG. 9, the DLP mirrors are tilted so that they form rows of DLP mirrors that share common planes. In the embodiment illustrated in FIG. 29, the individual DLP mirrors are not accurately positioned to be in the same plane since they are not in contact with the substrate. Examples of advantages of the embodiments associated with FIG. 29 are: first, the camera 2980 can be located between the DLP 2955 and the illumination light source 2958 to provide a more compact upper module 202. Second, the polarization state of the light reflected from the eye 2971 can be the same as that of the image light 2969 so that the optical path of the light reflected from the eye and the image light can be the same in the lower module 204.

Figure 30:
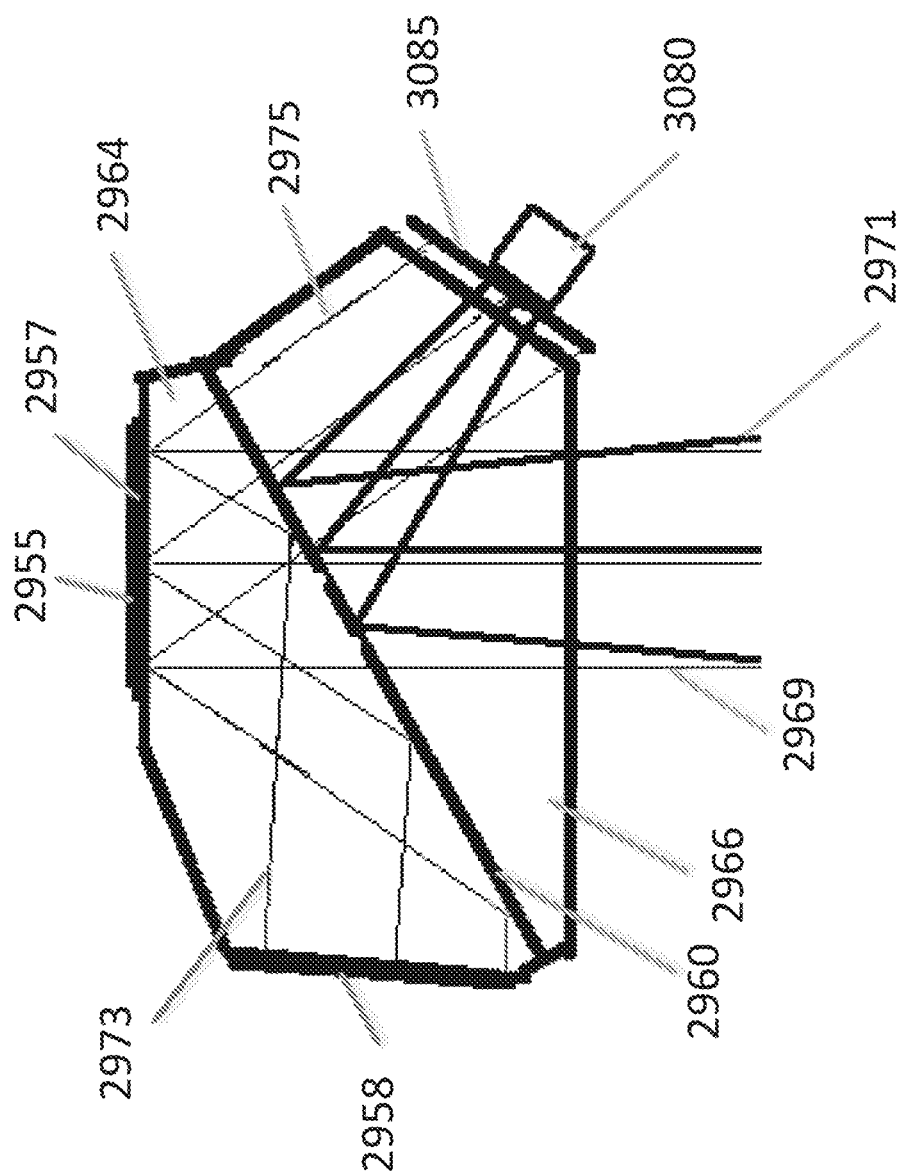

FIG. 30 shows an illustration of an embodiment for displaying images to the wearer and simultaneously capturing images of the wearer's eye, wherein light from the eye 2971 is reflected towards a camera 3080 by the partially reflective layer 2960. The partially reflective layer 2960 can be an optically flat layer such that the wavefront of the light from the eye 2971 is preserved and as a result, higher quality images of the wearer's eye can be captured. In addition, since the DLP 2955 is not included in the optical path for the light from the eye 2971, and the eye imaging process shown in FIG. 30 does not interfere with the displayed image, images of the wearer's eye can be captured independently (e.g. with independent of timing, impact on resolution, or pixel count used in the image light) from the displayed images.

In the embodiment illustrated in FIG. 30, the partially reflective layer 2960 is a reflective polarizer, the illuminating light 2973 is polarized, the light from the eye 2971 is polarized and the camera 3080 is located behind a polarizer 3085. The polarization axis of the illuminating light 2973 and the polarization axis of the light from the eye are oriented perpendicular to the transmission axis of the reflective polarizer so that they are both substantially reflected by the reflective polarizer. The illumination light 2973 passes through a quarter wave layer 2957 before being reflected by the DLP mirrors in the DLP 2955. The reflected light passes back through the quarter wave layer 2957 so that the polarization states of the image light 2969 and dark light 2975 are reversed in comparison to the illumination light 2973. As such, the image light 2969 and dark light 2975 are substantially transmitted by the reflective polarizer. Where the DLP mirrors in the "on" state provide the image light 2969 along an optical axis that extends into the lower optical module 204 to display an image to the wearer. At the same time, DLP mirrors in the "off" state provide the dark light 2975 along an optical axis that extends to the side of the upper optics module 202. In the region of the corrective wedge 2966 where the dark light 2975 is incident on the side of the upper optics module 202, an absorptive polarizer 3085 is positioned with its transmission axis perpendicular to the polarization axis of the dark light and parallel to the polarization axis of the light from the eye so that the dark light 2975 is absorbed and the light from the eye 2971 is transmitted to the camera 3080.

Figure 31:
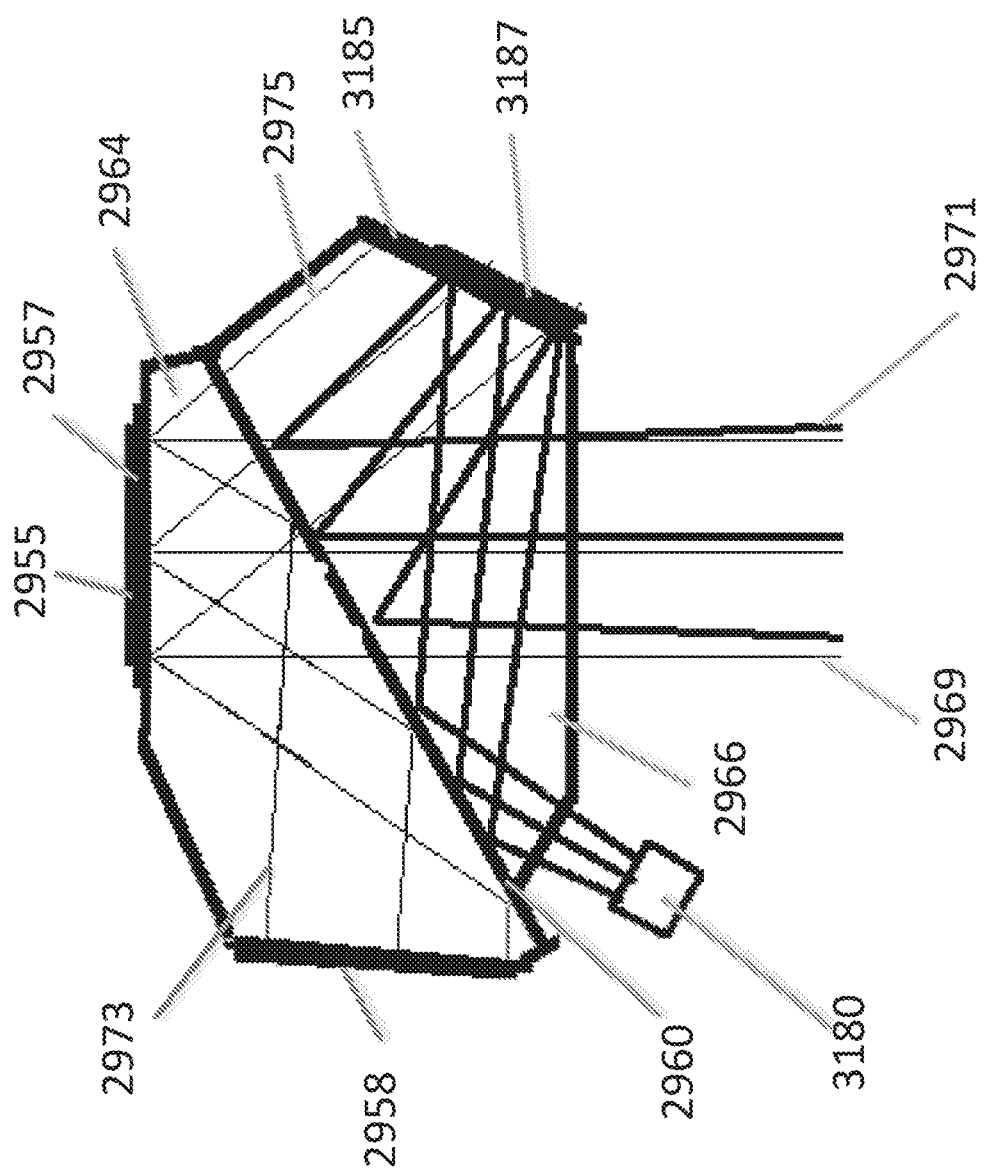

FIG. 31 shows an illustration of another embodiment of a system for displaying images and simultaneously capturing image of the wearer's eye that is similar to the one shown in FIG. 30. The difference in the system shown in FIG. 31 is that the light from the eye 2971 is subjected to multiple reflections before being captured by the camera 3180. To enable the multiple reflections, a mirror 3187 is provided behind the absorptive polarizer 3185. Therefore, the light from the eye 2971 is polarized prior to entering the corrective wedge 2966 with a polarization axis that is perpendicular to the transmission axis of the reflective polarizer that comprises the partially reflective layer 2960. In this way, the light from the eye 2971 is reflected first by the reflective polarizer, reflected second by the mirror 3187 and reflected third by the reflective polarizer before being captured by the camera 3180. While the light from the eye 2971 passes through the absorptive polarizer 3185 twice, since the polarization axis of the light from the eye 2971 is oriented parallel to the polarization axis of the light from the eye 2971, it is substantially transmitted by the absorptive polarizer 3185. As with the system described in connection with FIG. 30, the system shown in FIG. 31 includes an optically flat partially reflective layer 2960 that preserves the wavefront of the light from the eye 2971 so that higher quality images of the wearer's eye can be captured. Also, since the DLP 2955 is not included in the optical path for the light reflected from the eye 2971 and the eye imaging process shown in FIG. 31 does not interfere with the displayed image, images of the wearer's eye can be captured independently from the displayed images.

Figure 32:
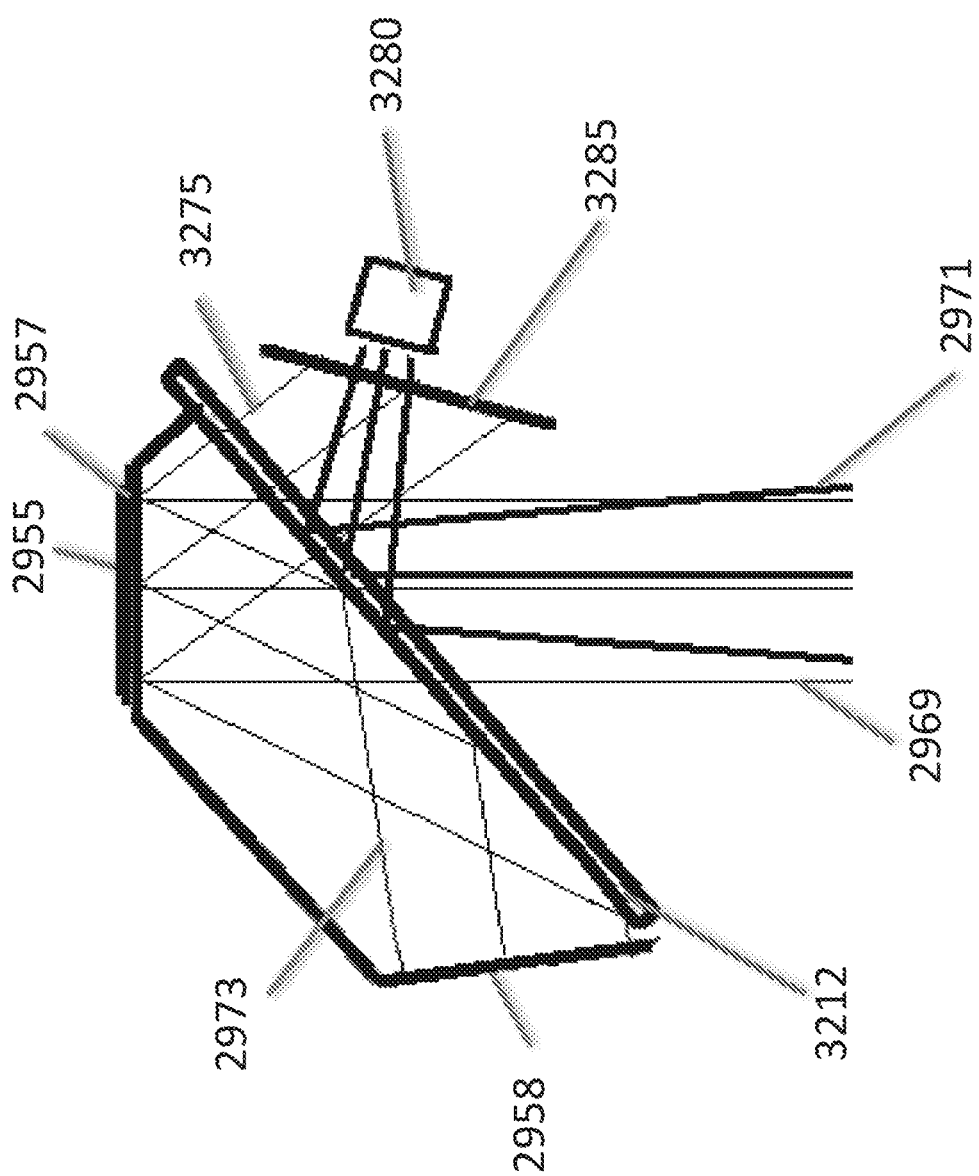

FIG. 32 shows an illustration of a system for displaying images and simultaneously capturing images of the wearer's eye that includes a beam splitter plate 3212 comprised of a reflective polarizer, which is held in air between the light source 2958, the DLP 2955 and the camera 3280. The illumination light 2973 and the light from the eye 2971 are both polarized with polarization axes that are perpendicular to the transmission axis of the reflective polarizer. As a result, both the illumination light 2973 and the light from the eye 2971 are substantially reflected by the reflective polarizer. The illumination light 2873 is reflected toward the DLP 2955 by the reflective polarizer and split into image light 2969 and dark light 3275 depending on whether the individual DLP mirrors are respectively in the "on" state or the "off" state. By passing through the quarter wave layer 2957 twice, the polarization state of the illumination light 2973 is reversed in comparison to the polarization state of the image light 2969 and the dark light 3275. As a result, the image light 2969 and the dark light 3275 are then substantially transmitted by the reflective polarizer. The absorptive polarizer 3285 at the side of the beam splitter plate 3212 has a transmission axis that is perpendicular to the polarization axis of the dark light 3275 and parallel to the polarization axis of the light from the eye 2971 so that the dark light 3275 is absorbed and the light from the eye 2971 is transmitted to the camera 3280. As in the system shown in FIG. 30, the system shown in FIG. 31 includes an optically flat beam splitter plate 3212 that preserves the wavefront of the light from the eye 2971 so that higher quality images of the wearer's eye can be captured. Also, since the DLP 2955 is not included in the optical path for the light from the eye 2971 and the eye imaging process shown in FIG. 31 does not interfere with the displayed image, images of the wearer's eye can be captured independently from the displayed images.

Eye imaging systems where the polarization state of the light from the eye 2971 needs to be opposite to that of the image light 2969 (as shown in FIGS. 30, 31 and 32), need to be used with lower modules 204 that include combiners that will reflect both polarization states. As such, these upper modules 202 are best suited for use with the lower modules 204 that include combiners that are reflective regardless of polarization state, examples of these lower modules are shown in FIGS. 6, 8a, 8b, 8c and 24-27.

Figure 33:
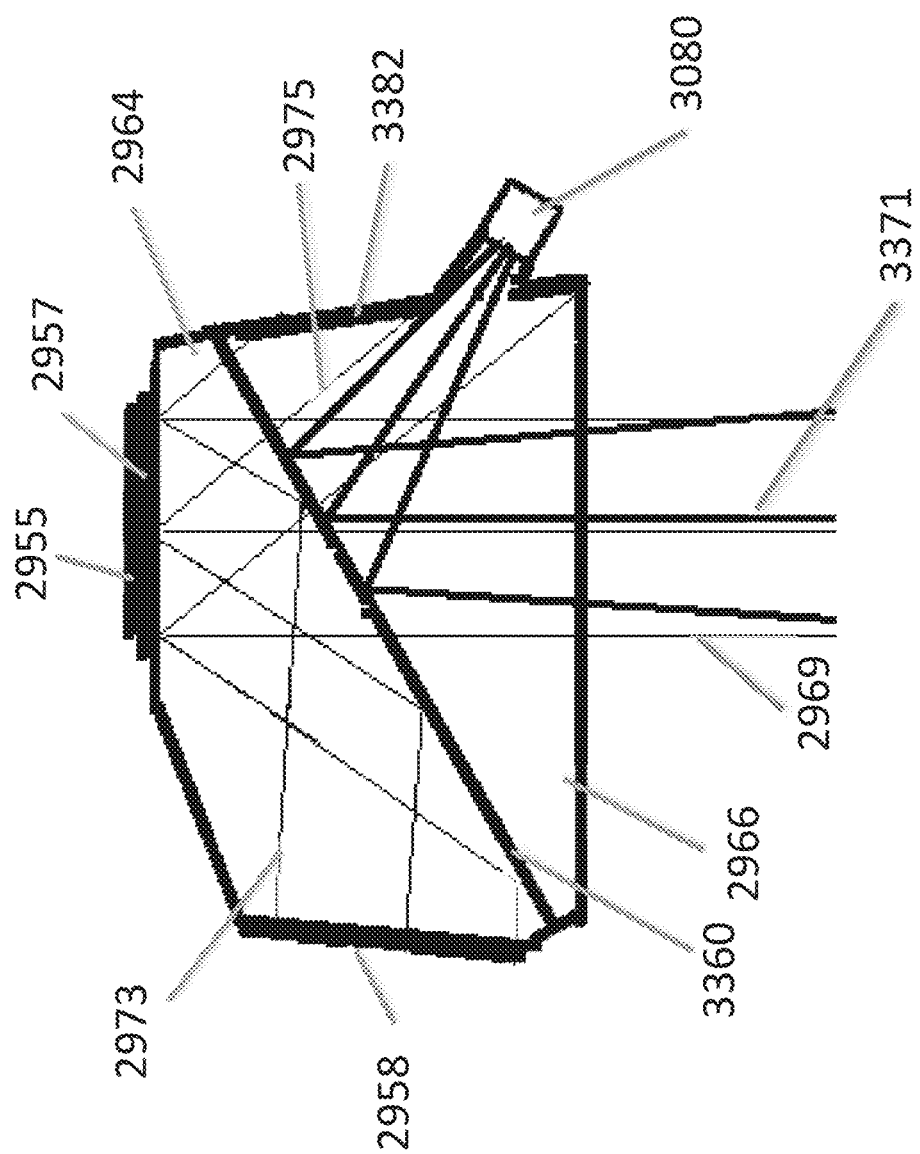

In a further embodiment shown in FIG. 33, the partially reflective layer 3360 is comprised of a reflective polarizer on the side facing the illumination light 2973 and a short pass dichroic mirror on the side facing the light from the eye 3371 and the camera 3080. Where the short pass dichroic mirror is a dielectric mirror coating that transmits visible light and reflects infrared light. The partially reflective layer 3360 can be comprised of a reflective polarizer bonded to the inner surface of the illumination wedge 2964 and a short pass dielectric mirror coating on the opposing inner surface of the corrective wedge 2966, wherein the illumination wedge 2964 and the corrective wedge 2966 are then optically bonded together. Alternatively, the partially reflective layer 3360 can be comprised of a thin substrate that has a reflective polarizer bonded to one side and a short pass dichroic mirror coating on the other side, where the partially reflective layer 3360 is then bonded between the illumination wedge 2964 and the corrective wedge 2966. In this embodiment, an infrared light is included to illuminate the eye so that the light from the eye and the images captured of the eye are substantially comprised of infrared light. The wavelength of the infrared light is then matched to the reflecting wavelength of the shortpass dichroic mirror and the wavelength that the camera can capture images, for example an 800 nm wavelength can be used. In this way, the short pass dichroic mirror transmits the image light and reflects the light from the eye. The camera 3080 is then positioned at the side of the corrective wedge 2966 in the area of the absorbing light trap 3382, which is provided to absorb the dark light 2975. By positioning the camera 3080 in a depression in the absorbing light trap 3382, scattering of the dark light 2975 by the camera 3080 can be reduced so that higher contrast images can be displayed to the wearer. An advantage of this embodiment is that the light from the eye need not be polarized, which can simplify the optical system and increase efficiency for the eye imaging system.

In yet another embodiment shown in FIG. 32a a beam splitter plate 3222 is comprised of a reflective polarizer on the side facing the illumination light 2973 and a short pass dichroic mirror on the side facing the light from the eye 3271 and the camera 3280. An absorbing surface 3295 is provided to trap the dark light 3275 and the camera 3280 is positioned in an opening in the absorbing surface 3295. In this way the system of FIG. 32 can be made to function with unpolarized light from the eye 3271.

Figure 34:
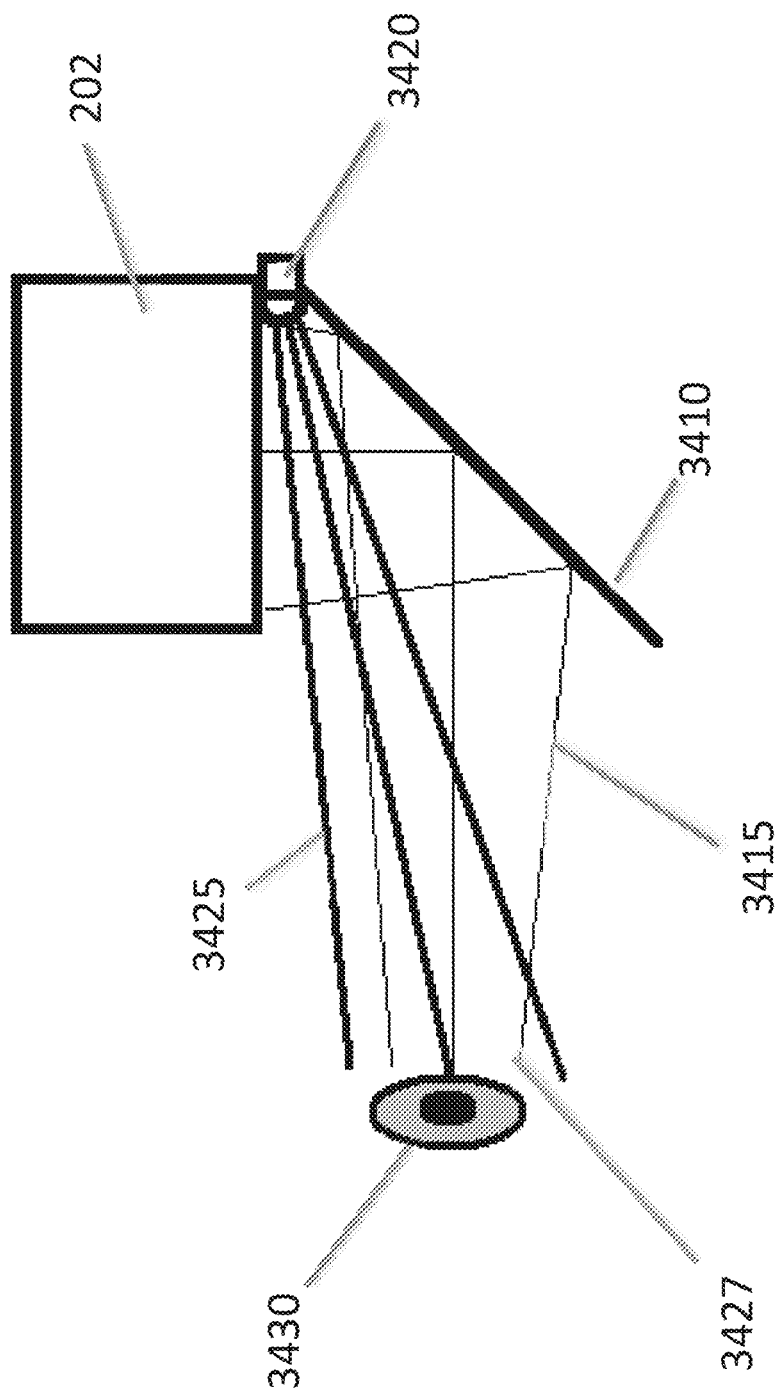
FIGS. 34 and 34a illustrate structured eye lighting systems according to the principles of the present disclosure.
Figure 34A:
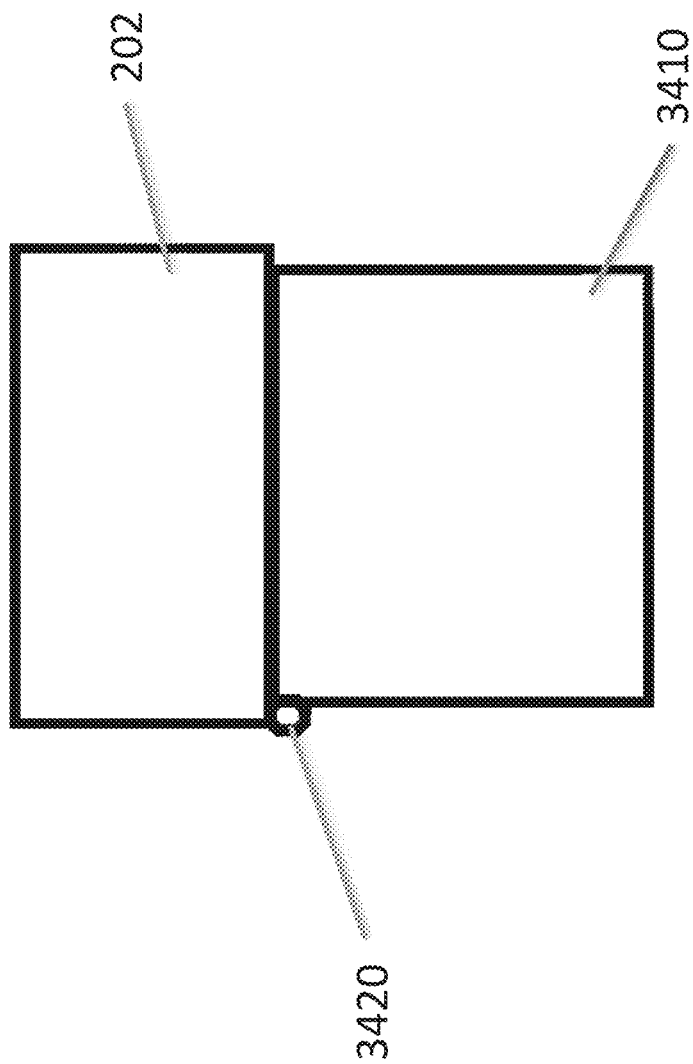

In embodiments directed to capturing images of the wearer's eye, light to illuminate the wearer's eye can be provided by several different sources including: light from the displayed image (i.e. image light); light from the environment that passes through the combiner or other optics; light provided by a dedicated eye light, etc. FIGS. 34 and 34a show illustrations of dedicated eye illumination lights 3420. FIG. 34 shows an illustration from a side view in which the dedicated illumination eye light 3420 is positioned at a corner of the combiner 3410 so that it doesn't interfere with the image light 3415. The dedicated eye illumination light 3420 is pointed so that the eye illumination light 3425 illuminates the eyebox 3427 where the eye 3430 is located when the wearer is viewing displayed images provided by the image light 3415. FIG. 34a shows an illustration from the perspective of the eye of the wearer to show how the dedicated eye illumination light 3420 is positioned at the corner of the combiner 3410. While the dedicated eye illumination light 3420 is shown at the upper left corner of the combiner 3410, other positions along one of the edges of the combiner 3410, or other optical or mechanical components, are possible as well. In other embodiments, more than one dedicated eye light 3420 with different positions can be used. In an embodiment, the dedicated eye light 3420 is an infrared light that is not visible by the wearer (e.g. 800 nm) so that the eye illumination light 3425 doesn't interfere with the displayed image perceived by the wearer.

Figure 35:
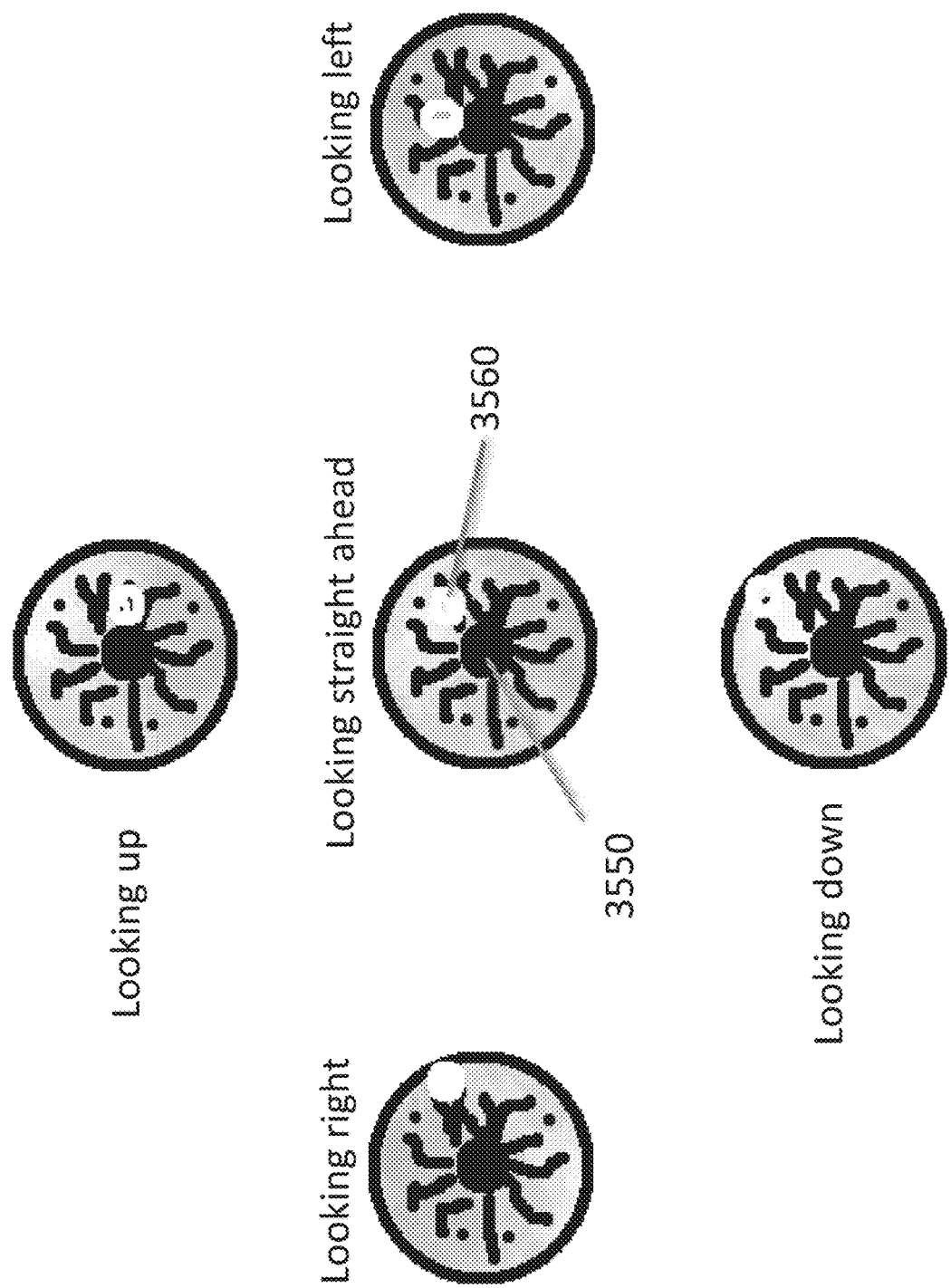
FIG. 35 illustrates eye glint in the prediction of eye direction analysis in accordance with the principles of the present disclosure.

FIG. 35 shows a series of illustrations of captured eye images that show the eye glint (i.e. light that reflects off the front of the eye) produced by a dedicated eye light. In this embodiment of the disclosure, captured images of the wearer's eye are analyzed to determine the relative positions of the iris 3550, pupil, or other portion of the eye, and the eye glint 3560. The eye glint is a reflected image of the dedicated eye light 3420 when the dedicated light is used. FIG. 35 illustrates the relative positions of the iris 3550 and the eye glint 3560 for a variety of eye positions. By providing a dedicated eye light 3420 in a fixed position, combined with the fact that the human eye is essentially spherical, or at least a reliably repeatable shape, the eye glint provides a fixed reference point against which the determined position of the iris can be compared to determine where the wearer is looking, either within the displayed image or within the see-through view of the surrounding environment. By positioning the dedicated eye light 3420 at a corner of the combiner 3410, the eye glint 3560 is formed away from the iris 3550 in the captured images. As a result, the positions of the iris and the eye glint can be determined more easily and more accurately during the analysis of the captured images, since they do not interfere with one another. In a further embodiment, the combiner includes an associated cut filter that prevents infrared light from the environment from entering the HWC and the camera is an infrared camera, so that the eye glint is only provided by light from the dedicated eye light. For example, the combiner can include a low pass filter that passes visible light while absorbing infrared light and the camera can include a high pass filter that absorbs visible light while passing infrared light.

In an embodiment of the eye imaging system, the lens for the camera is designed to take into account the optics associated with the upper module 202 and the lower module 204. This is accomplished by designing the camera to include the optics in the upper module 202 and optics in the lower module 204, so that a high MTF image is produced, at the image sensor in the camera, of the wearer's eye. In yet a further embodiment, the camera lens is provided with a large depth of field to eliminate the need for focusing the camera to enable sharp image of the eye to be captured. Where a large depth of field is typically provided by a high f/#lens (e.g. f/#>5). In this case, the reduced light gathering associated with high f/#lenses is compensated by the inclusion of a dedicated eye light to enable a bright image of the eye to be captured. Further, the brightness of the dedicated eye light can be modulated and synchronized with the capture of eye images so that the dedicated eye light has a reduced duty cycle and the brightness of infrared light on the wearer's eye is reduced.

Figure 36B:
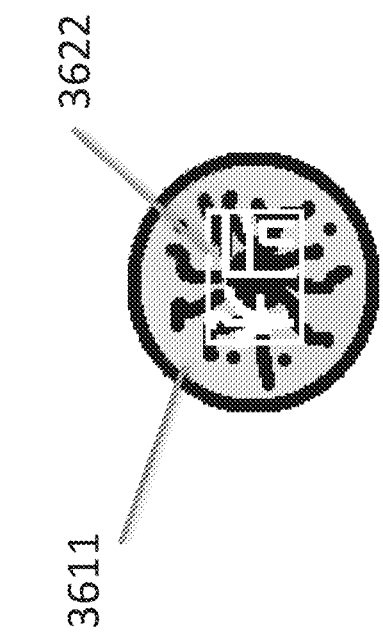
FIG. 36b illustrates a digital content presentation reflection off of the wearer's eye that may be analyzed in accordance with the principles of the present disclosure.
Figure 36A:
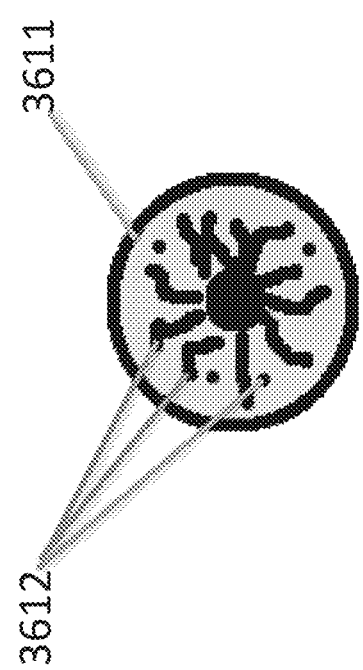
FIG. 36a illustrates eye characteristics that may be used in personal identification through analysis of a system according to the principles of the present disclosure.

In a further embodiment, FIG. 36a shows an illustration of an eye image that is used to identify the wearer of the HWC. In this case, an image of the wearer's eye 3611 is captured and analyzed for patterns of identifiable features 3612. The patterns are then compared to a database of eye images to determine the identity of the wearer. After the identity of the wearer has been verified, the operating mode of the HWC and the types of images, applications, and information to be displayed can be adjusted and controlled in correspondence to the determined identity of the wearer. Examples of adjustments to the operating mode depending on who the wearer is determined to be or not be include: making different operating modes or feature sets available, shutting down or sending a message to an external network, allowing guest features and applications to run, etc.

is an illustration of another embodiment using eye imaging, in which the sharpness of the displayed image is determined based on the eye glint produced by the reflection of the displayed image from the wearer's eye surface. By capturing images of the wearer's eye 3611, an eye glint 3622, which is a small version of the displayed image can be captured and analyzed for sharpness. If the displayed image is determined to not be sharp, then an automated adjustment to the focus of the HWC optics can be performed to improve the sharpness. This ability to perform a measurement of the sharpness of a displayed image at the surface of the wearer's eye can provide a very accurate measurement of image quality. Having the ability to measure and automatically adjust the focus of displayed images can be very useful in augmented reality imaging where the focus distance of the displayed image can be varied in response to changes in the environment or changes in the method of use by the wearer.

An aspect of the present disclosure relates to controlling the HWC 102 through interpretations of eye imagery. In embodiments, eye-imaging technologies, such as those described herein, are used to capture an eye image or series of eye images for processing. The image(s) may be process to determine a user intended action, an HWC predetermined reaction, or other action. For example, the imagery may be interpreted as an affirmative user control action for an application on the HWC 102. Or, the imagery may cause, for example, the HWC 102 to react in a pre-determined way such that the HWC 102 is operating safely, intuitively, etc.

Figure 37:
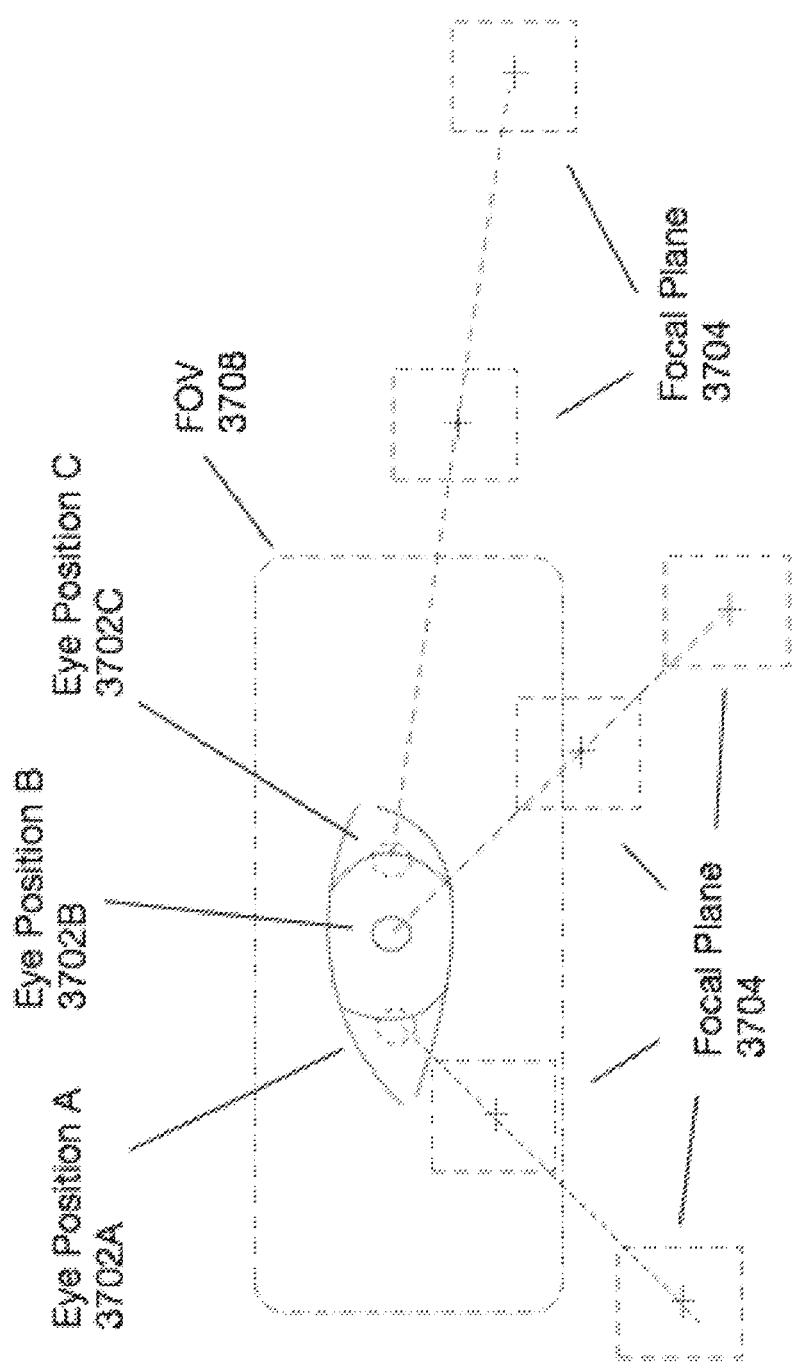
FIG. 37 illustrates eye imaging along various virtual target lines and various focal planes in accordance with the principles of the present disclosure.

FIG. 37 illustrates a eye imagery process that involves imaging the HWC 102 wearer's eye(s) and processing the images (e.g. through eye imaging technologies described herein) to determine in what position 3702 the eye is relative to its neutral or forward looking position and/or the FOV 3708. The process may involve a calibration step where the user is instructed, through guidance provided in the FOV of the HWC 102, to look in certain directions such that a more accurate prediction of the eye position relative to areas of the FOV can be made. In the event the wearer's eye is determined to be looking towards the right side of the FOV 3708 (as illustrated in FIG. 37, the eye is looking out of the page) a virtual target line may be established to project what in the environment the wearer may be looking towards or at. The virtual target line may be used in connection with an image captured by camera on the HWC 102 that images the surrounding environment in front of the wearer. In embodiments, the field of view of the camera capturing the surrounding environment matches, or can be matched (e.g. digitally), to the FOV 3708 such that making the comparison is made more clear. For example, with the camera capturing the image of the surroundings in an angle that matches the FOV 3708 the virtual line can be processed (e.g. in 2d or 3d, depending on the camera images capabilities and/or the processing of the images) by projecting what surrounding environment objects align with the virtual target line. In the event there are multiple objects along the virtual target line, focal planes may be established corresponding to each of the objects such that digital content may be placed in an area in the FOV 3708 that aligns with the virtual target line and falls at a focal plane of an intersecting object. The user then may see the digital content when he focuses on the object in the environment, which is at the same focal plane. In embodiments, objects in line with the virtual target line may be established by comparison to mapped information of the surroundings.

In embodiments, the digital content that is in line with the virtual target line may not be displayed in the FOV until the eye position is in the right position. This may be a predetermined process. For example, the system may be set up such that a particular piece of digital content (e.g. an advertisement, guidance information, object information, etc.) will appear in the event that the wearer looks at a certain object(s) in the environment. A virtual target line(s) may be developed that virtually connects the wearer's eye with an object(s) in the environment (e.g. a building, portion of a building, mark on a building, GPS location, etc.) and the virtual target line may be continually updated depending on the position and viewing direction of the wearer (e.g. as determined through GPS, e-compass, IMU, etc.) and the position of the object. When the virtual target line suggests that the wearer's pupil is substantially aligned with the virtual target line or about to be aligned with the virtual target line, the digital content may be displayed in the FOV 3704.

In embodiments, the time spent looking along the virtual target line and/or a particular portion of the FOV 3708 may indicate that the wearer is interested in an object in the environment and/or digital content being displayed. In the event there is no digital content being displayed at the time a predetermined period of time is spent looking at a direction, digital content may be presented in the area of the FOV 3708. The time spent looking at an object may be interpreted as a command to display information about the object, for example. In other embodiments, the content may not relate to the object and may be presented because of the indication that the person is relatively inactive. In embodiments, the digital content may be positioned in proximity to the virtual target line, but not in-line with it such that the wearer's view of the surroundings are not obstructed but information can augment the wearer's view of the surroundings. In embodiments, the time spent looking along a target line in the direction of displayed digital content may be an indication of interest in the digital content. This may be used as a conversion event in advertising. For example, an advertiser may pay more for an add placement if the wearer of the HWC 102 looks at a displayed advertisement for a certain period of time. As such, in embodiments, the time spent looking at the advertisement, as assessed by comparing eye position with the content placement, target line or other appropriate position may be used to determine a rate of conversion or other compensation amount due for the presentation.

Figure 38:
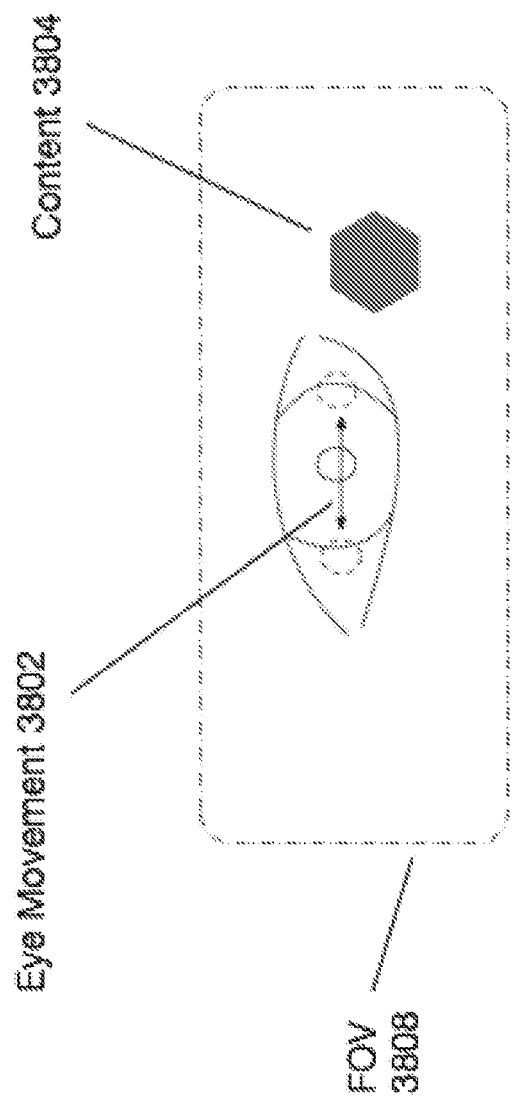
FIG. 38 illustrates content control with respect to eye movement based on eye imaging in accordance with the principles of the present disclosure.

An aspect of the disclosure relates to removing content from the FOV of the HWC 102 when the wearer of the HWC 102 apparently wants to view the surrounding environments clearly. FIG. 38 illustrates a situation where eye imagery suggests that the eye has or is moving quickly so the digital content 3804 in the FOV 3808 is removed from the FOV 3808. In this example, the wearer may be looking quickly to the side indicating that there is something on the side in the environment that has grabbed the wearer's attention. This eye movement 3802 may be captured through eye imaging techniques (e.g. as described herein) and if the movement matches a predetermined movement (e.g. speed, rate, pattern, etc.) the content may be removed from view. In embodiments, the eye movement is used as one input and HWC movements indicated by other sensors (e.g. IMU in the HWC) may be used as another indication. These various sensor movements may be used together to project an event that should cause a change in the content being displayed in the FOV.

Another aspect of the present disclosure relates to determining a focal plane based on the wearer's eye convergence. Eyes are generally converged slightly and converge more when the person focuses on something very close. This is generally referred to as convergence. In embodiments, convergence is calibrated for the wearer. That is, the wearer may be guided through certain focal plane exercises to determine how much the wearer's eyes converge at various focal planes and at various viewing angles. The convergence information may then be stored in a database for later reference. In embodiments, a general table may be used in the event there is no calibration step or the person skips the calibration step. The two eyes may then be imaged periodically to determine the convergence in an attempt to understand what focal plane the wearer is focused on. In embodiments, the eyes may be imaged to determine a virtual target line and then the eye's convergence may be determined to establish the wearer's focus, and the digital content may be displayed or altered based thereon.

Figure 39:
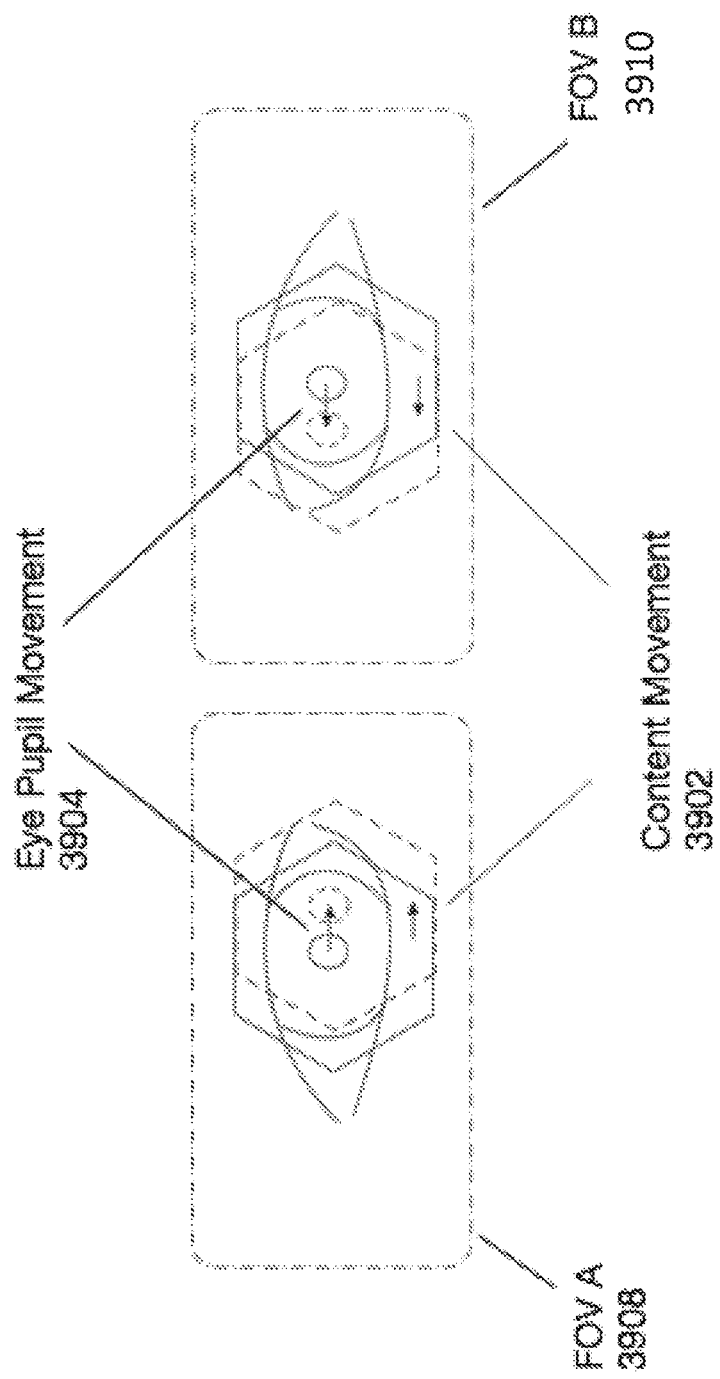
FIG. 39 illustrates eye imaging and eye convergence in accordance with the principles of the present disclosure.

FIG. 39 illustrates a situation where digital content is moved 3902 within one or both of the FOVs 3908 and 3910 to align with the convergence of the eyes as determined by the pupil movement 3904. By moving the digital content to maintain alignment, in embodiments, the overlapping nature of the content is maintained so the object appears properly to the wearer. This can be important in situations where 3D content is displayed.

An aspect of the present disclosure relates to controlling the HWC 102 based on events detected through eye imaging. A wearer winking, blinking, moving his eyes in a certain pattern, etc. may, for example, control an application of the HWC 102. Eye imaging (e.g. as described herein) may be used to monitor the eye(s) of the wearer and once a predetermined pattern is detected an application control command may be initiated.

An aspect of the disclosure relates to monitoring the health of a person wearing a HWC 102 by monitoring the wearer's eye(s). Calibrations may be made such that the normal performance, under various conditions (e.g. lighting conditions, image light conditions, etc.) of a wearer's eyes may be documented. The wearer's eyes may then be monitored through eye imaging (e.g. as described herein) for changes in their performance. Changes in performance may be indicative of a health concern (e.g. concussion, brain injury, stroke, loss of blood, etc.). If detected the data indicative of the change or event may be communicated from the HWC 102.

Aspects of the present disclosure relate to security and access of computer assets (e.g. the HWC itself and related computer systems) as determined through eye image verification. As discussed herein elsewhere, eye imagery may be compared to known person eye imagery to confirm a person's identity. Eye imagery may also be used to confirm the identity of people wearing the HWCs 102 before allowing them to link together or share files, streams, information, etc.

A variety of use cases for eye imaging are possible based on technologies described herein. An aspect of the present disclosure relates to the timing of eye image capture. The timing of the capture of the eye image and the frequency of the capture of multiple images of the eye can vary dependent on the use case for the information gathered from the eye image. For example, capturing an eye image to identify the user of the HWC may be required only when the HWC has been turned ON or when the HWC determines that the HWC has been put onto a wearer's head, to control the security of the HWC and the associated information that is displayed to the user. Wherein, the orientation, movement pattern, stress or position of the earhorns (or other portions of the HWC) of the HWC can be used to determine that a person has put the HWC onto their head with the intention to use the HWC. Those same parameters may be monitored in an effort to understand when the HWC is dismounted from the user's head. This may enable a situation where the capture of an eye image for identifying the wearer may be completed only when a change in the wearing status is identified. In a contrasting example, capturing eye images to monitor the health of the wearer may require images to be captured periodically (e.g. every few seconds, minutes, hours, days, etc.). For example, the eye images may be taken in minute intervals when the images are being used to monitor the health of the wearer when detected movements indicate that the wearer is exercising. In a further contrasting example, capturing eye images to monitor the health of the wearer for long-term effects may only require that eye images be captured monthly. Embodiments of the disclosure relate to selection of the timing and rate of capture of eye images to be in correspondence with the selected use scenario associated with the eye images. These selections may be done automatically, as with the exercise example above where movements indicate exercise, or these selections may be set manually. In a further embodiment, the selection of the timing and rate of eye image capture is adjusted automatically depending on the mode of operation of the HWC. The selection of the timing and rate of eye image capture can further be selected in correspondence with input characteristics associated with the wearer including age and health status, or sensed physical conditions of the wearer including heart rate, chemical makeup of the blood and eye blink rate.

Figure 40:
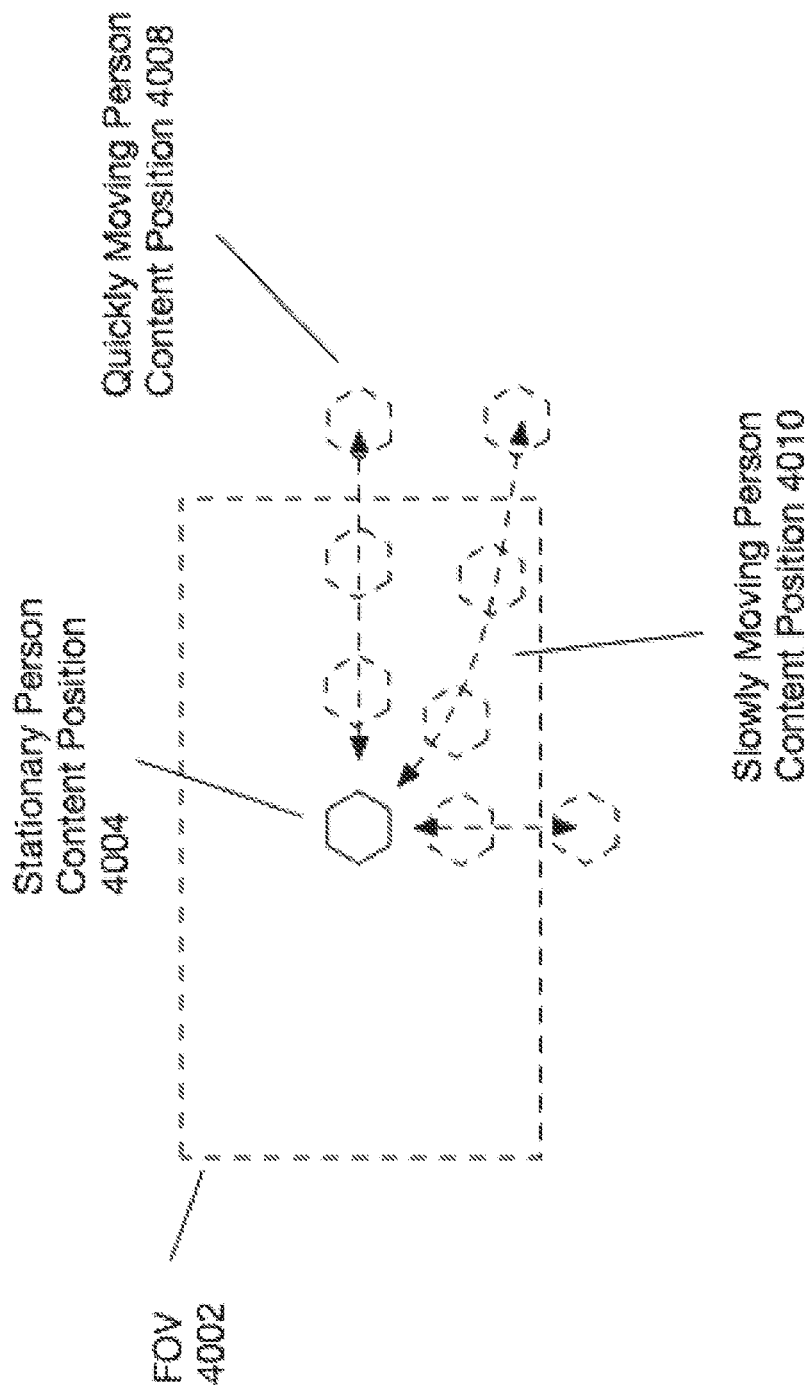
FIG. 40 illustrates content position dependent on sensor feedback in accordance with the principles of the present disclosure.

FIG. 40 illustrates an embodiment in which digital content presented in a see-through FOV is positioned based on the speed in which the wearer is moving. When the person is not moving, as measured by sensor(s) in the HWC 102 (e.g. IMU, GPS based tracking, etc.), digital content may be presented at the stationary person content position 4004. The content position 4004 is indicated as being in the middle of the see-through FOV 4002; however, this is meant to illustrate that the digital content is positioned within the see-through FOV at a place that is generally desirable knowing that the wearer is not moving and as such the wearer's surrounding see through view can be somewhat obstructed. So, the stationary person content position, or neutral position, may not be centered in the see-through FOV; it may be positioned somewhere in the see-through FOV deemed desirable and the sensor feedback may shift the digital content from the neutral position. The movement of the digital content for a quickly moving person is also shown in FIG. 40 wherein as the person turns their head to the side, the digital content moves out of the see-through FOV to content position 4008 and then moves back as the person turns their head back. For a slowly moving person, the head movement can be more complex and as such the movement of the digital content in an out of the see-through FOV can follow a path such as that shown by content position 4010.

In embodiments, the sensor that assesses the wearer's movements may be a GPS sensor, IMU, accelerometer, etc. The content position may be shifted from a neutral position to a position towards a side edge of the field of view as the forward motion increases. The content position may be shifted from a neutral position to a position towards a top or bottom edge of the field of view as the forward motion increases. The content position may shift based on a threshold speed of the assessed motion. The content position may shift linearly based on the speed of the forward motion. The content position may shift non-linearly based on the speed of the forward motion. The content position may shift outside of the field of view. In embodiments, the content is no longer displayed if the speed of movement exceeds a predetermined threshold and will be displayed again once the forward motion slows.

In embodiments, the content position may generally be referred to as shifting; it should be understood that the term shifting encompasses a process where the movement from one position to another within the see-through FOV or out of the FOV is visible to the wearer (e.g. the content appears to slowly or quickly move and the user perceives the movement itself) or the movement from one position to another may not be visible to the wearer (e.g. the content appears to jump in a discontinuous fashion or the content disappears and then reappears in the new position).

Another aspect of the present disclosure relates to removing the content from the field of view or shifting it to a position within the field of view that increases the wearer's view of the surrounding environment when a sensor causes an alert command to be issued. In embodiments, the alert may be due to a sensor or combination of sensors that sense a condition above a threshold value. For example, if an audio sensor detects a loud sound of a certain pitch, content in the field of view may be removed or shifted to provide a clear view of the surrounding environment for the wearer. In addition to the shifting of the content, in embodiments, an indication of why the content was shifted may be presented in the field of view or provided through audio feedback to the wearer. For instance, if a carbon monoxide sensor detects a high concentration in the area, content in the field of view may be shifted to the side of the field of view or removed from the field of view and an indication may be provided to the wearer that there is a high concentration of carbon monoxide in the area. This new information, when presented in the field of view, may similarly be shifted within or outside of the field of view depending on the movement speed of the wearer.

Figure 41:
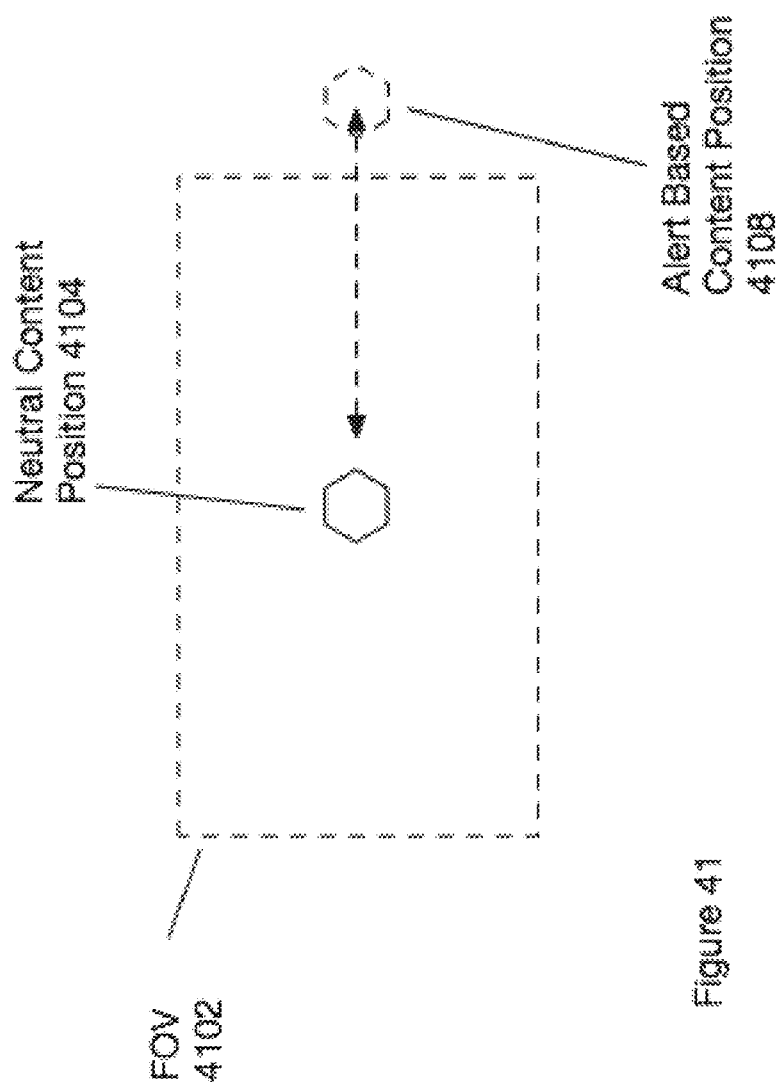
FIG. 41 illustrates content position dependent on sensor feedback in accordance with the principles of the present disclosure.

FIG. 41 illustrates how content may be shifted from a neutral position 4104 to an alert position 4108. In this embodiment, the content is shifted outside of the see-through FOV 4102. In other embodiments, the content may be shifted as described herein.

Another aspect of the present disclosure relates to identification of various vectors or headings related to the HWC 102, along with sensor inputs, to determine how to position content in the field of view. In embodiments, the speed of movement of the wearer is detected and used as an input for position of the content and, depending on the speed, the content may be positioned with respect to a movement vector or heading (i.e. the direction of the movement), or a sight vector or heading (i.e. the direction of the wearer's sight direction). For example, if the wearer is moving very fast the content may be positioned within the field of view with respect to the movement vector because the wearer is only going to be looking towards the sides of himself periodically and for short periods of time. As another example, if the wearer is moving slowly, the content may be positioned with respect to the sight heading because the user may more freely be shifting his view from side to side.

Figure 42:
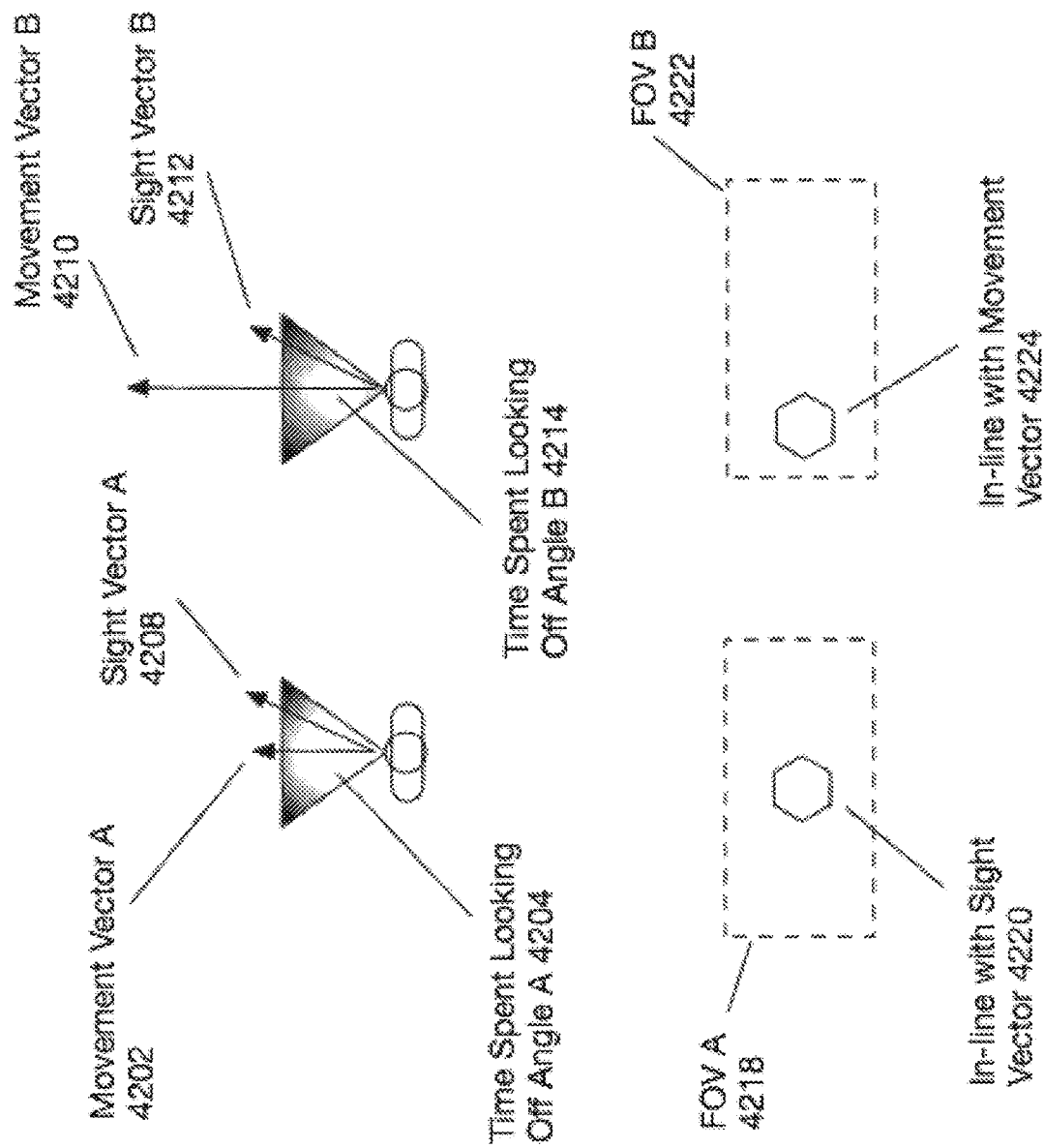
FIG. 42 illustrates content position dependent on sensor feedback in accordance with the principles of the present disclosure.

FIG. 42 illustrates two examples where the movement vector may effect content positioning. Movement vector A 4202 is shorter than movement vector B 4210 indicating that the forward speed and/or acceleration of movement of the person associated with movement vector A 4202 is lower than the person associated with movement vector B 4210. Each person is also indicated as having a sight vector or heading 4208 and 4212. The sight vectors A 4208 and B 4210 are the same from a relative perspective. The white area inside of the black triangle in front of each person is indicative of how much time each person likely spends looking at a direction that is not in line with the movement vector. The time spent looking off angle A 4204 is indicated as being more than that of the time spent looking off angle B 4214. This may be because the movement vector speed A is lower than movement vector speed B. The faster the person moves forward the more the person tends to look in the forward direction, typically. The FOVs A 4218 and B 4222 illustrate how content may be aligned depending on the movement vectors 4202 and 4210 and sight vectors 4208 and 4212. FOV A 4218 is illustrated as presenting content in-line with the sight vector 4220. This may be due to the lower speed of the movement vector A 4202. This may also be due to the prediction of a larger amount of time spent looking off angle A 4204. FOV B 4222 is illustrated as presenting content in line with the movement vector 4224. This may be due to the higher speed of movement vector B 4210. This may also be due to the prediction of a shorter amount of time spent looking off angle B 4214.

Figure 43:
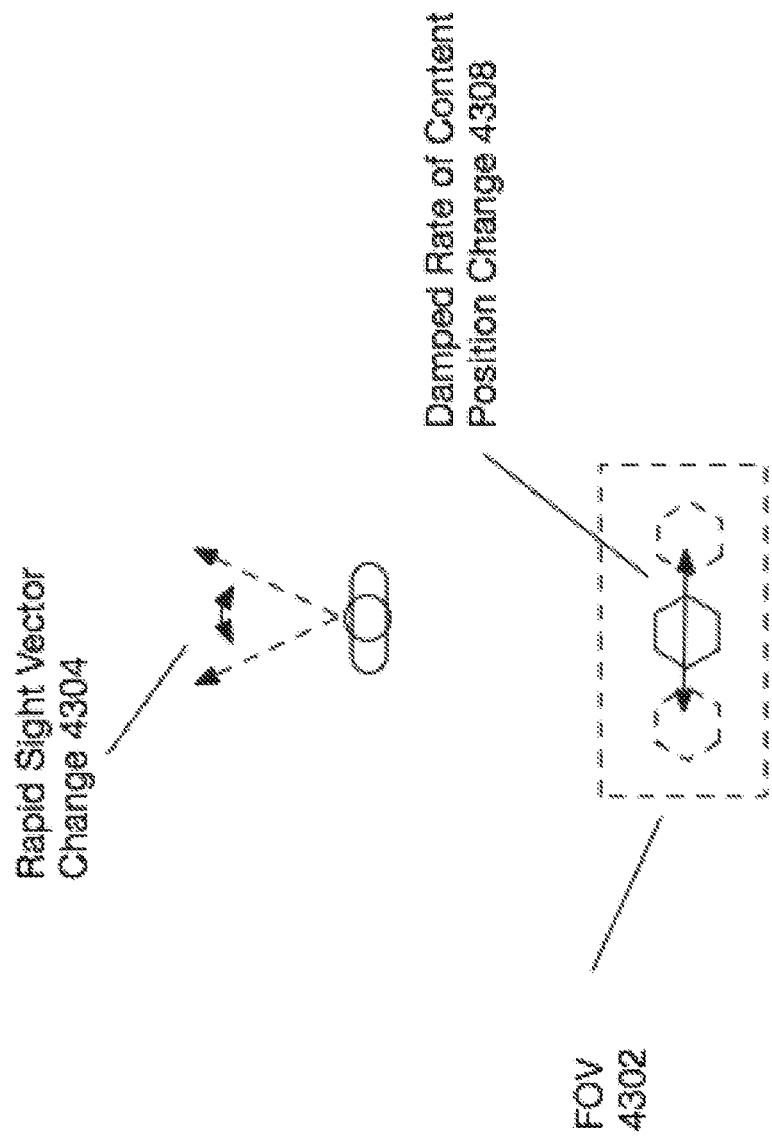
FIG. 43 illustrates content position dependent on sensor feedback in accordance with the principles of the present disclosure.

Another aspect of the present disclosure relates to damping a rate of content position change within the field of view. As illustrated in FIG. 43, the sight vector may undergo a rapid change 4304. This rapid change may be an isolated event or it may be made at or near a time when other sight vector changes are occurring. The wearer's head may be turning back and forth for some reason. In embodiments, the rapid successive changes in sight vector may cause a damped rate of content position change 4308 within the FOV 4302. For example, the content may be positioned with respect to the sight vector, as described herein, and the rapid change in sight vector may normally cause a rapid content position change; however, since the sight vector is successively changing, the rate of position change with respect to the sight vector may be damped, slowed, or stopped. The position rate change may be altered based on the rate of change of the sight vector, average of the sight vector changes, or otherwise altered.

Figure 44:
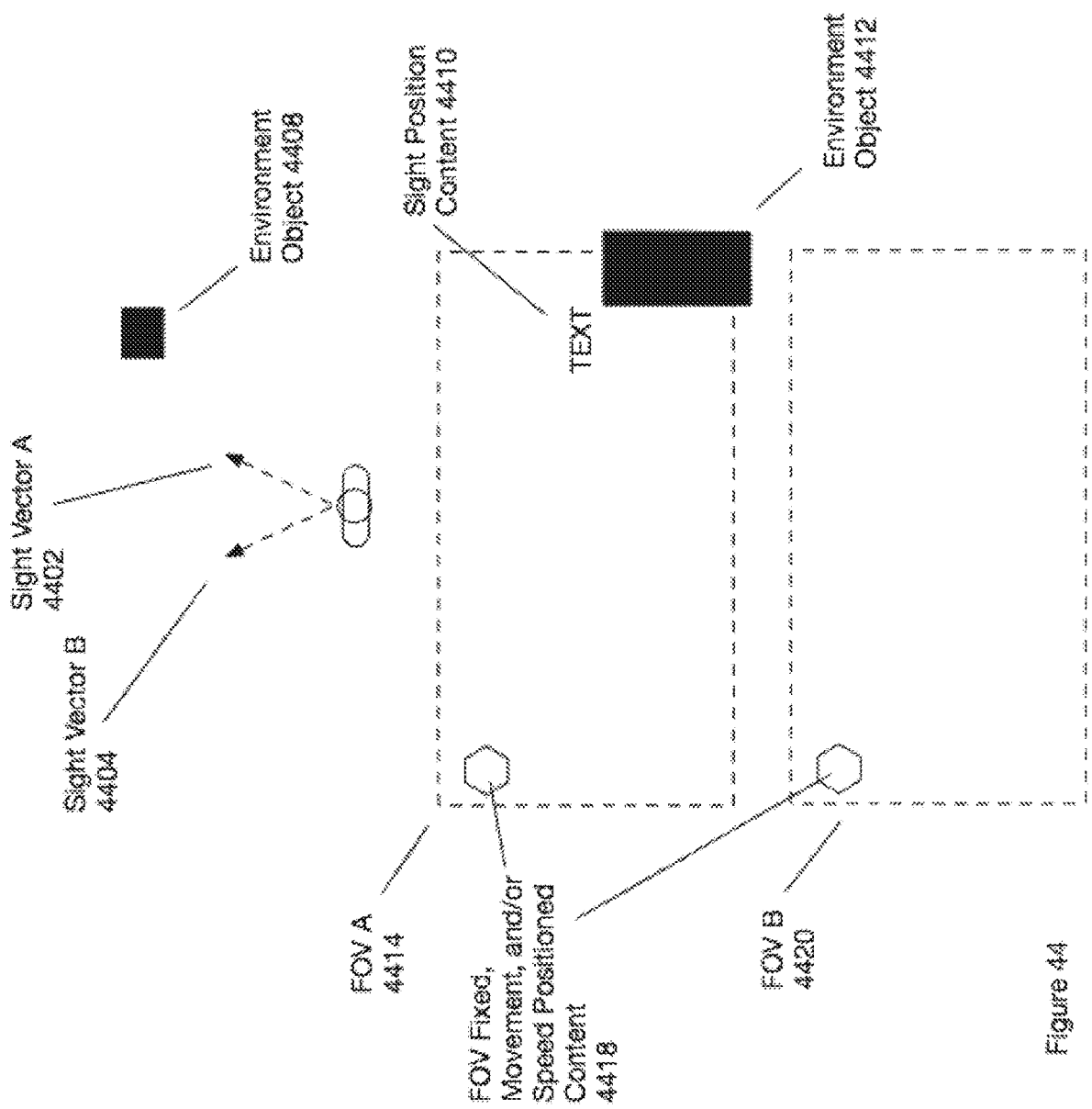
FIG. 44 illustrates content position dependent on sensor feedback in accordance with the principles of the present disclosure.

Another aspect of the present disclosure relates to simultaneously presenting more than one content in the field of view of a see-through optical system of a HWC 102 and positioning one content with the sight heading and one content with the movement heading. FIG. 44 illustrates two FOV's A 4414 and B 4420, which correspond respectively to the two identified sight vectors A 4402 and B 4404. FIG. 44 also illustrates an object in the environment 4408 at a position relative to the sight vectors A 4402 and B 4404. When the person is looking along sight vector A 4402, the environment object 4408 can be seen through the field of view A 4414 at position 4412. As illustrated, sight heading aligned content is presented as TEXT in proximity with the environment object 4412. At the same time, other content 4418 is presented in the field of view A 4414 at a position aligned in correspondence with the movement vector. As the movement speed increases, the content 4418 may shift as described herein. When the sight vector of the person is sight vector B 4404 the environmental object 4408 is not seen in the field of view B 4420. As a result, the sight aligned content 4410 is not presented in field of view B 4420; however, the movement aligned content 4418 is presented and is still dependent on the speed of the motion.

Figure 45:
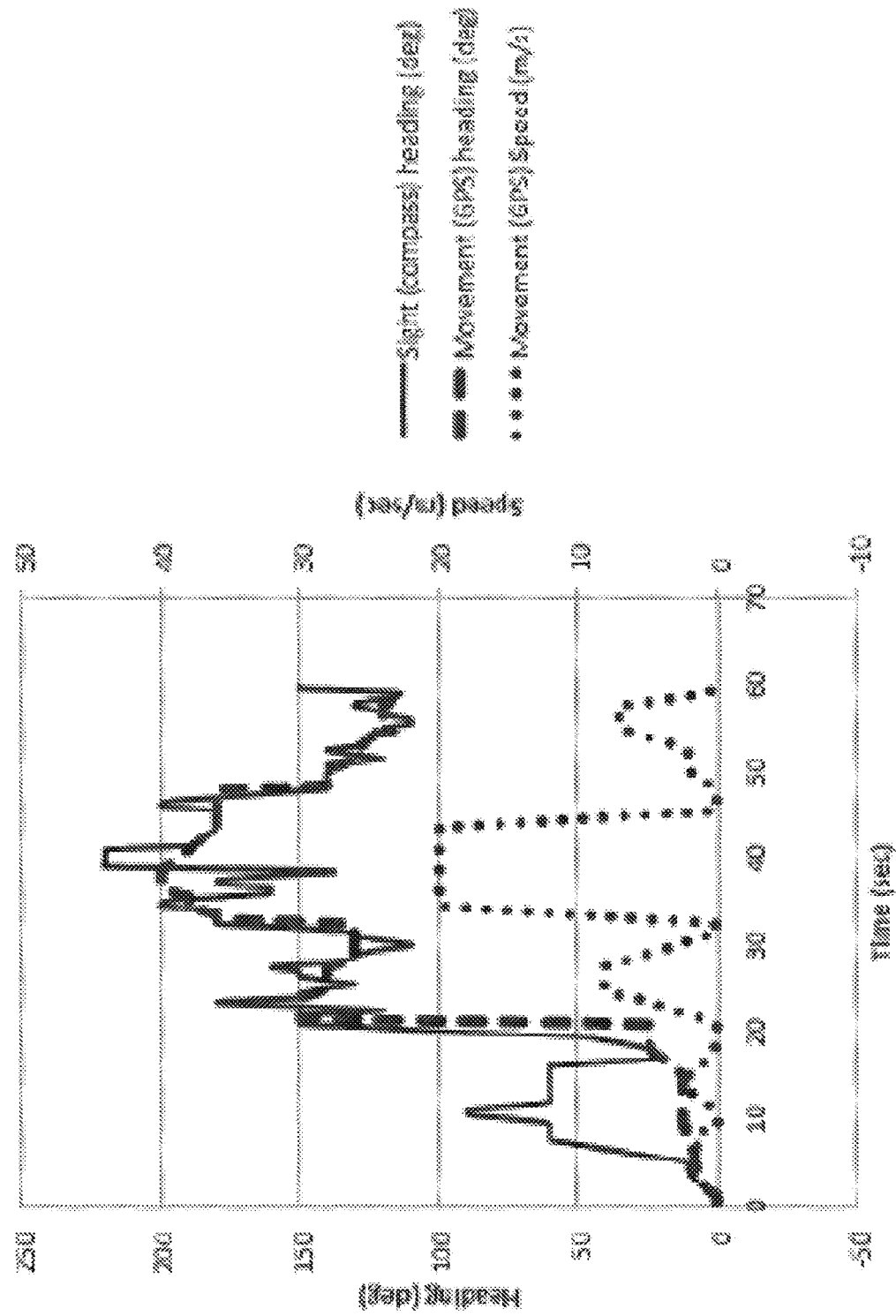
FIG. 45 illustrates various headings over time in an example.

FIG. 45 shows an example set of data for a person moving through an environment over a path that starts with a movement heading of 0 degrees and ends with a movement heading of 114 degrees during which time the speed of movement varies from 0 msec to 20 msec. The sight heading can be seen to vary on either side of the movement heading while moving as the person looks from side to side. Large changes in sight heading occur when the movement speed is 0 msec when the person is standing still, followed by step changes in movement heading.

Embodiments provide a process for determining the display heading that takes into account the way a user moves through an environment and provides a display heading that makes it easy for the user to find the displayed information while also providing unencumbered see-through views of the environment in response to different movements, speed of movement or different types of information being displayed.

Figure 46:
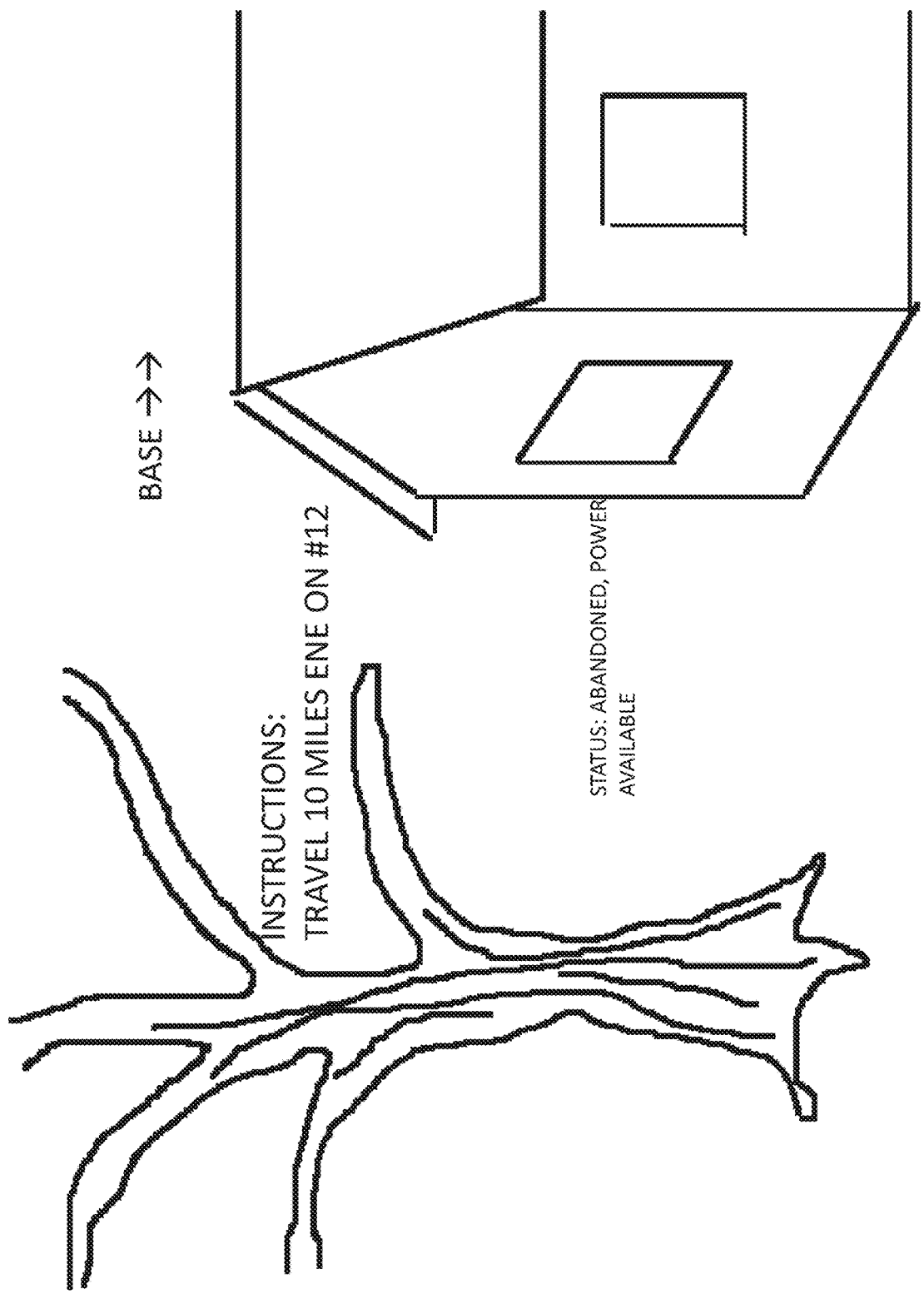
FIG. 46 illustrates content position dependent on sensor feedback in accordance with the principles of the present disclosure.

FIG. 46 illustrates a see-through view as may be seen when using a HWC wherein information is overlaid onto a see-through view of the environment. The tree and the building are actually in the environment and the text is displayed in the see-through display such that it appears overlaid on the environment. In addition to text information such as, for example, instructions and weather information, some augmented reality information is shown that relates to nearby objects in the environment.

In an embodiment, the display heading is determined based on speed of movement. At low speeds, the display heading may be substantially the same as the sight heading while at high speed the display heading may be substantially the same as the movement heading. In embodiments, as long as the user remains stationary, the displayed information is presented directly in front of the user and HWC. However, as the movement speed increases (e.g. above a threshold or continually, etc.) the display heading becomes substantially the same as the movement heading regardless of the direction the user is looking, so that when the user looks in the direction of movement, the displayed information is directly in front of the user and HMD and when the user looks to the side the displayed information is not visible.

Rapid changes in sight heading can be followed by a slower change in the display heading to provide a damped response to head rotation. Alternatively, the display heading can be substantially the time averaged sight heading so that the displayed information is presented at a heading that is in the middle of a series of sight headings over a period of time. In this embodiment, if the user stops moving their head, the display heading gradually becomes the same as the sight heading and the displayed information moves into the display field of view in front of the user and HMD. In embodiments, when there is a high rate of sight heading change, the process delays the effect of the time averaged sight heading on the display heading. In this way, the effect of rapid head movements on display heading is reduced and the positioning of the displayed information within the display field of view is stabilized laterally.

In another embodiment, display heading is determined based on speed of movement where at high-speed, the display heading is substantially the same as the movement heading. At mid-speed the display heading is substantially the same as a time averaged sight heading so that rapid head rotations are damped out and the display heading is in the middle of back and forth head movements.

In yet another embodiment, the type of information being displayed is included in determining how the information should be displayed. Augmented reality information that is connected to objects in the environment is given a display heading that substantially matches the sight heading. In this way, as the user rotates their head, augmented reality information comes into view that is related to objects that are in the see-through view of the environment. At the same time, information that is not connected to objects in the environment is given a display heading that is determined based on the type of movements and speed of movements as previously described in this specification.

In yet a further embodiment, when the speed of movement is determined to be above a threshold, the information displayed is moved downward in the display field of view so that the upper portion of the display field of view has less information or no information displayed to provide the user with an unencumbered see-through view of the environment.

FIGS. 47 and 48 show illustrations of a see-through view including overlaid displayed information. FIG. 47 shows the see-through view immediately after a rapid change in sight heading from the sight heading associated with the see-through view shown in FIG. 46 wherein the change in sight heading comes from a head rotation. In this case, the display heading is delayed. FIG. 48 shows how at a later time, the display heading catches up to the sight heading. The augmented reality information remains in positions within the display field of view where the association with objects in the environment can be readily made by the user.

FIG. 49 shows an illustration of a see-through view example including overlaid displayed information that has been shifted downward in the display field of view to provide an unencumbered see-through view in the upper portion of the see-through view. At the same time, augmented reality labels have been maintained in locations within the display field of view so they can be readily associated with objects in the environment.

In a further embodiment, in an operating mode such as when the user is moving in an environment, digital content is presented at the side of the user's see-through FOV so that the user can only view the digital content by turning their head. In this case, when the user is looking straight ahead, such as when the movement heading matches the sight heading, the see-through view FOV does not include digital content. The user then accesses the digital content by turning their head to the side whereupon the digital content moves laterally into the user's see-through FOV. In another embodiment, the digital content is ready for presentation and will be presented if an indication for its presentation is received. For example, the information may be ready for presentation and if the sight heading or predetermined position of the HWC 102 is achieved the content may then be presented. The wearer may look to the side and the content may be presented. In another embodiment, the user may cause the content to move into an area in the field of view by looking in a direction for a predetermined period of time, blinking, winking, or displaying some other pattern that can be captured through eye imaging technologies (e.g. as described herein elsewhere).

In yet another embodiment, an operating mode is provided wherein the user can define sight headings wherein the associated see-through FOV includes digital content or does not include digital content. In an example, this operating mode can be used in an office environment where when the user is looking at a wall digital content is provided within the FOV, whereas when the user is looking toward a hallway, the FOV is unencumbered by digital content. In another example, when the user is looking horizontally digital content is provided within the FOV, but when the user looks down (e.g. to look at a desktop or a cellphone) the digital content is removed from the FOV.

Another aspect of the present disclosure relates to collecting and using eye position and sight heading information. Head worn computing with motion heading, sight heading, and/or eye position prediction (sometimes referred to as "eye heading" herein) may be used to identify what a wearer of the HWC 102 is apparently interested in and the information may be captured and used. In embodiments, the information may be characterized as viewing information because the information apparently relates to what the wearer is looking at. The viewing information may be used to develop a personal profile for the wearer, which may indicate what the wearer tends to look at. The viewing information from several or many HWC's 102 may be captured such that group or crowd viewing trends may be established. For example, if the movement heading and sight heading are known, a prediction of what the wearer is looking at may be made and used to generate a personal profile or portion of a crowd profile. In another embodiment, if the eye heading and location, sight heading and/or movement heading are known, a prediction of what is being looked at may be predicted. The prediction may involve understanding what is in proximity of the wearer and this may be understood by establishing the position of the wearer (e.g. through GPS or other location technology) and establishing what mapped objects are known in the area. The prediction may involve interpreting images captured by the camera or other sensors associated with the HWC 102. For example, if the camera captures an image of a sign and the camera is in-line with the sight heading, the prediction may involve assessing the likelihood that the wearer is viewing the sign. The prediction may involve capturing an image or other sensory information and then performing object recognition analysis to determine what is being viewed. For example, the wearer may be walking down a street and the camera that is in the HWC 102 may capture an image and a processor, either on-board or remote from the HWC 102, may recognize a face, object, marker, image, etc. and it may be determined that the wearer may have been looking at it or towards it.

Figure 50:
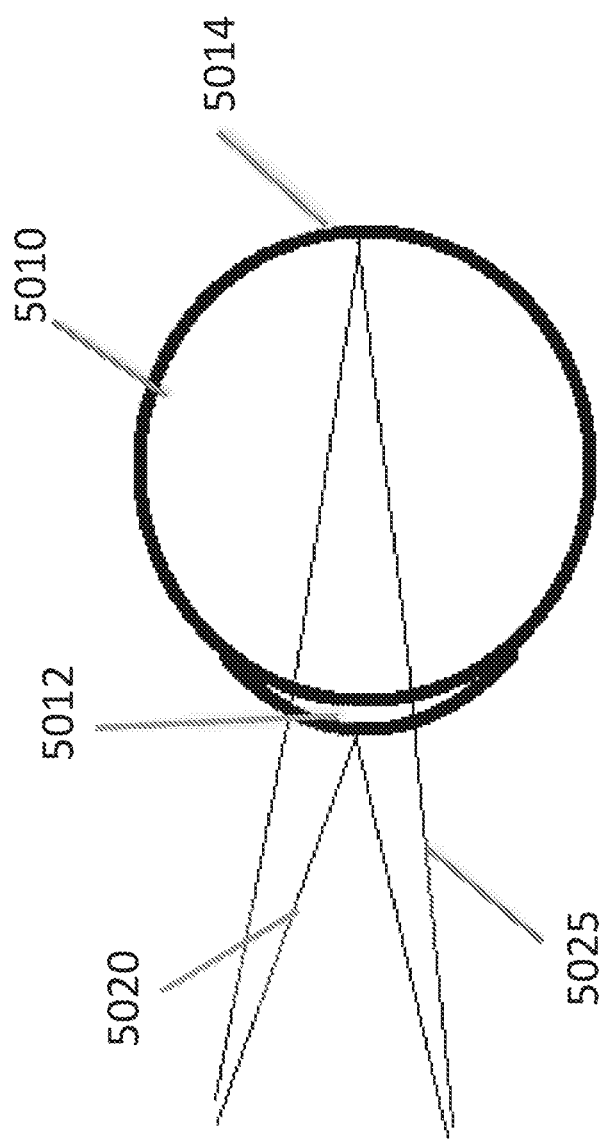
FIG. 50 illustrates light impinging an eye in accordance with the principles of the present disclosure.
Figure 51:
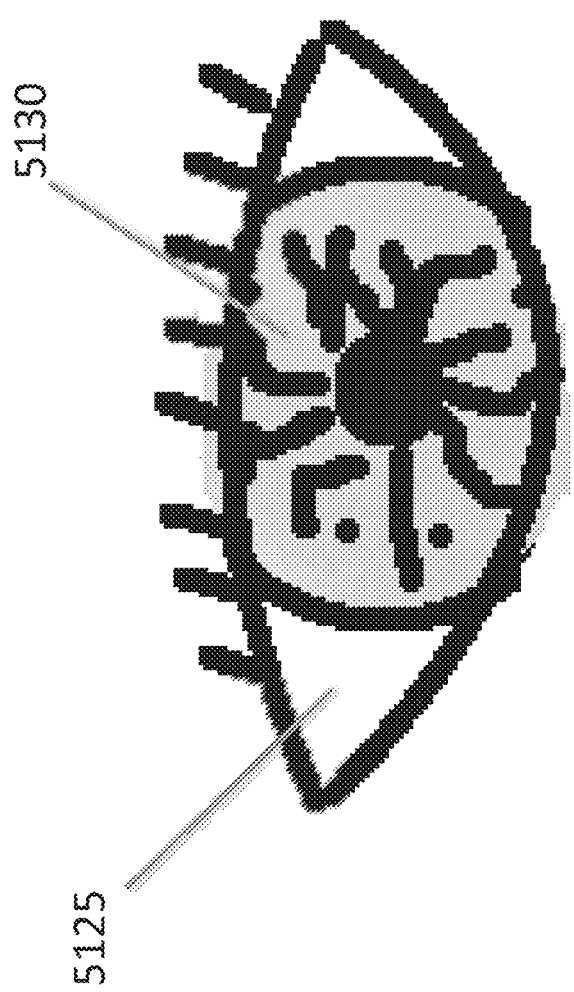
FIG. 51 illustrates a view of an eye in accordance with the principles of the present disclosure.

FIG. 50 illustrates a cross section of an eyeball of a wearer of an HWC with focus points that can be associated with the eye imaging system of the disclosure. The eyeball 5010 includes an iris 5012 and a retina 5014. Because the eye imaging system of the disclosure provides coaxial eye imaging with a display system, images of the eye can be captured from a perspective directly in front of the eye and in-line with where the user is looking. In embodiments of the disclosure, the eye imaging system can be focused at the iris 5012 and/or the retina 5014 of the wearer, to capture images of the external surface of the iris 5012 or the internal portions of the eye, which includes the retina 5014. FIG. 50 shows light rays 5020 and 5025 that are respectively associated with capturing images of the iris 5012 or the retina 5014 wherein the optics associated with the eye imaging system are respectively focused at the iris 5012 or the retina 5014. Illuminating light can also be provided in the eye imaging system to illuminate the iris 5012 or the retina 5014. FIG. 51 shows an illustration of an eye including an iris 5130 and a sclera 5125. In embodiments, the eye imaging system can be used to capture images that include the iris 5130 and portions the sclera 5125. The images can then be analyzed to determine color, shapes and patterns that are associated with the user. In further embodiments, the focus of the eye imaging system is adjusted to enable images to be captured of the iris 5012 or the retina 5014. Illuminating light can also be adjusted to illuminate the iris 5012 or to pass through the pupil of the eye to illuminate the retina 5014. The illuminating light can be visible light to enable capture of colors of the iris 5012 or the retina 5014, or the illuminating light can be ultraviolet (e.g. 340 nm), near infrared (e.g. 850 nm) or mid-wave infrared (e.g. 5000 nm) light to enable capture of hyperspectral characteristics of the eye.

FIG. 53 illustrates a display system that includes an eye imaging system. The display system includes a polarized light source 2958, a DLP 2955, a quarter wave film 2957 and a beam splitter plate 5345. The eye imaging system includes a camera 3280, illuminating lights 5355 and beam splitter plate 5345. Where the beam splitter plate 5345 can be a reflective polarizer on the side facing the polarized light source 2958 and a hot mirror on the side facing the camera 3280. Wherein the hot mirror reflects infrared light (e.g. wavelengths 700 to 2000 nm) and transmits visible light (e.g. wavelengths 400 to 670 nm). The beam splitter plate 5345 can be comprised of multiple laminated films, a substrate film with coatings or a rigid transparent substrate with films on either side. By providing a reflective polarizer on the one side, the light from the polarized light source 2958 is reflected toward the DLP 2955 where it passes through the quarter wave film 2957 once, is reflected by the DLP mirrors in correspondence with the image content being displayed by the DLP 2955 and then passes back through the quarter wave film 2957. In so doing, the polarization state of the light from the polarized light source is changed, so that it is transmitted by the reflective polarizer on the beam splitter plate 5345 and the image light 2971 passes into the lower optics module 204 where the image is displayed to the user. At the same time, infrared light 5357 from the illuminating lights 5355 is reflected by the hot mirror so that it passes into the lower optics module 204 where it illuminates the user's eye. Portions of the infrared light 2969 are reflected by the user's eye and this light passes back through the lower optics module 204, is reflected by the hot mirror on the beam splitter plate 5345 and is captured by the camera 3280. In this embodiment, the image light 2971 is polarized while the infrared light 5357 and 2969 can be unpolarized. In an embodiment, the illuminating lights 5355 provide two different infrared wavelengths and eye images are captured in pairs, wherein the pairs of eye images are analyzed together to improve the accuracy of identification of the user based on iris analysis.

Figure 54:
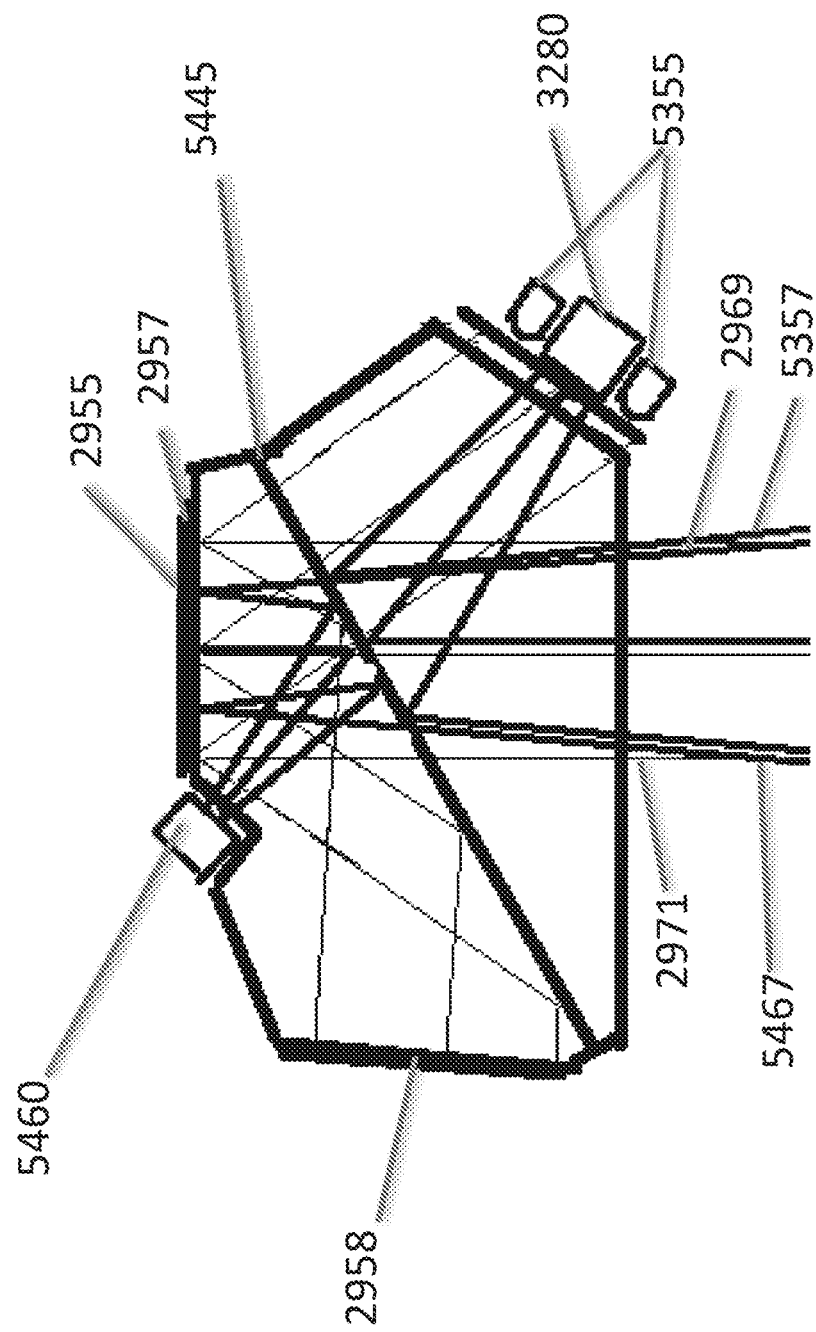
FIG. 54 illustrates an optics module in accordance with the principles of the present disclosure.

FIG. 54 shows an illustration of a further embodiment of a display system with an eye imaging system. In addition to the features of FIG. 53, this system includes a second camera 5460. Wherein the second camera 5460 is provided to capture eye images in the visible wavelengths. Illumination of the eye can be provided by the displayed image or by see-through light from the environment. Portions of the displayed image can be modified to provide improved illumination of the user's eye when images of the eye are to be captured such as by increasing the brightness of the displayed image or increasing the white areas within the displayed image. Further, modified displayed images can be presented briefly for the purpose of capturing eye images and the display of the modified images can be synchronized with the capture of the eye images. As shown in FIG. 54, visible light 5467 is polarized when it is captured by the second camera 5460 since it passes through the beam splitter 5445 and the beam splitter 5445 is a reflective polarizer on the side facing the second camera 5460. In this eye imaging system, visible eye images can be captured by the second camera 5460 at the same time that infrared eye images are captured by the camera 3280. Wherein, the characteristics of the camera 3280 and the second camera 5460 and the associated respective images captured can be different in terms of resolution and capture rate.

Figures 52A, 52B:
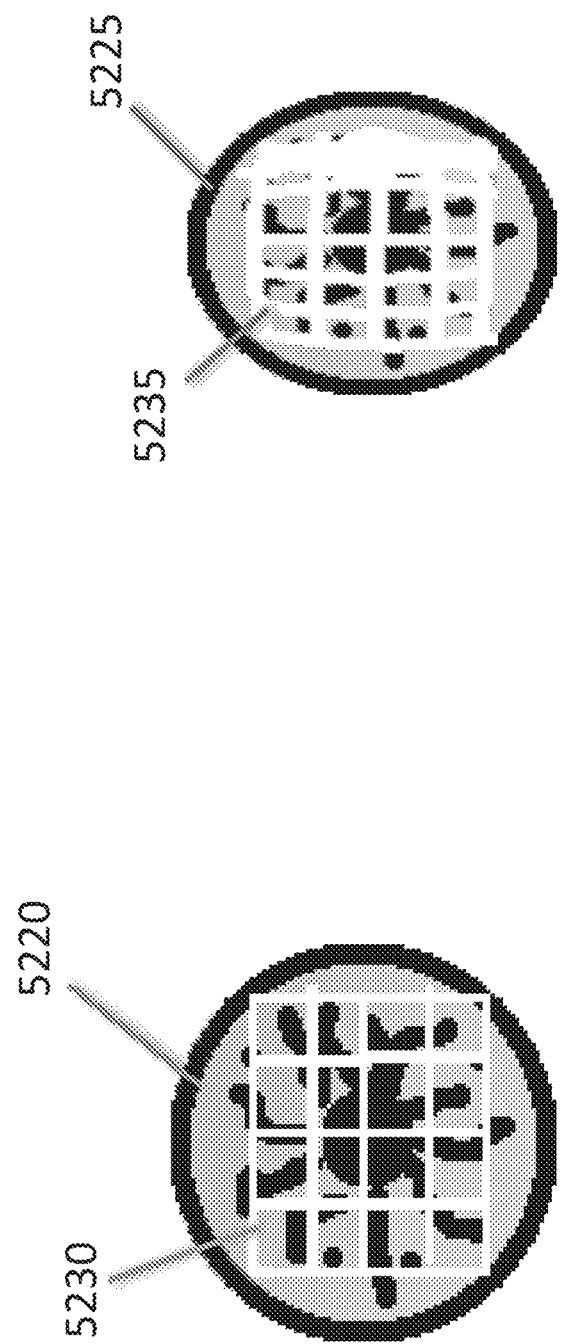
FIGS. 52a and 52b illustrate views of an eye with a structured light pattern in accordance with the principles of the present disclosure.

FIGS. 52*a* and 52*b* illustrate captured images of eyes where the eyes are illuminated with structured light patterns. In FIG. 52*a*, an eye 5220 is shown with a projected structured light pattern 5230, where the light pattern is a grid of lines. A light pattern of such as 5230 can be provided by the light source 5355 show in FIG. 53 by including a diffractive or a refractive device to modify the light 5357 as are known by those skilled in the art. A visible light source can also be included for the second camera 5460 shown in FIG. 54 which can include a diffractive or refractive to modify the light 5467 to provide a light pattern. FIG. 52*b* illustrates how the structured light pattern of 5230 becomes distorted to 5235 when the user's eye 5225 looks to the side. This distortion comes from the fact that the human eye is not spherical in shape, instead the iris sticks out slightly from the eyeball to form a bump in the area of the iris. As a result, the shape of the eye and the associated shape of the reflected structured light pattern is different depending on which direction the eye is pointed, when images of the eye are captured from a fixed position. Changes in the structured light pattern can subsequently be analyzed in captured eye images to determine the direction that the eye is looking.

Figure 55:
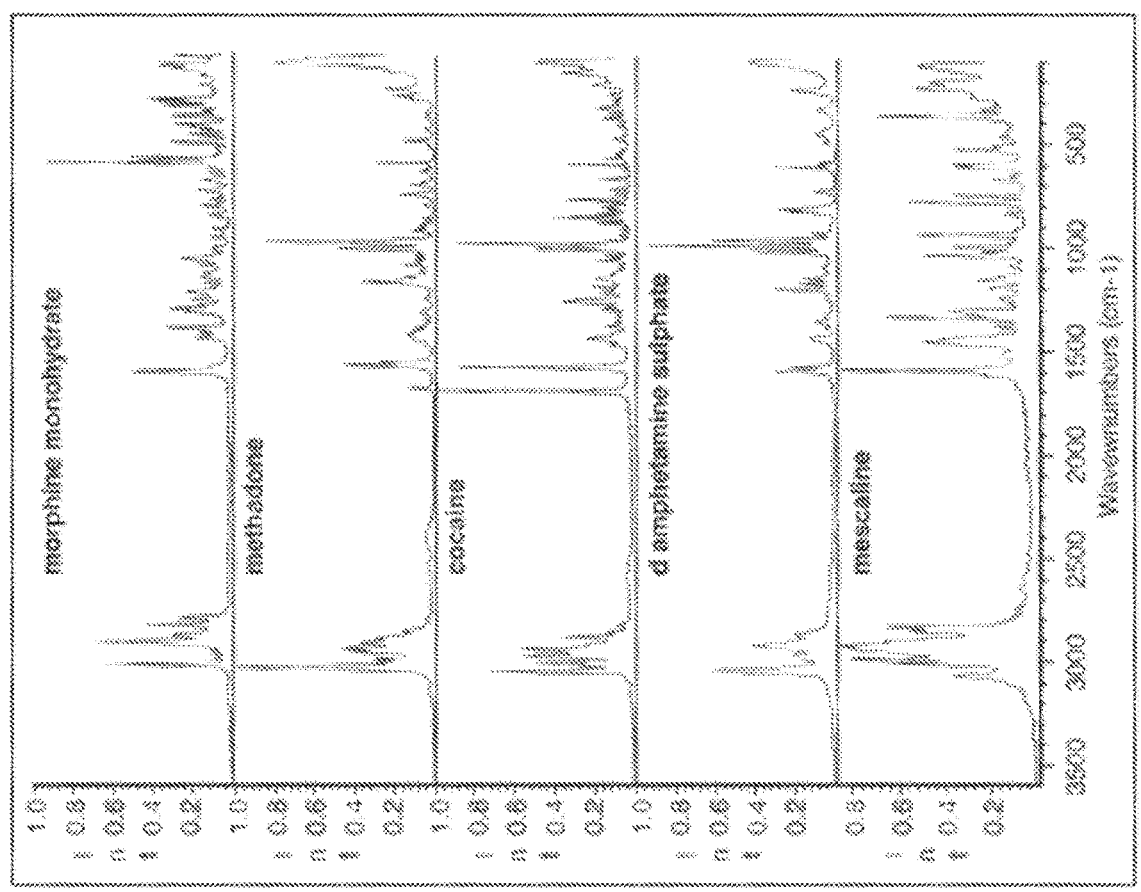
FIG. 55 shows a series of example spectrum for a variety of controlled substances as measured using a form of infrared spectroscopy.
Figure 56:
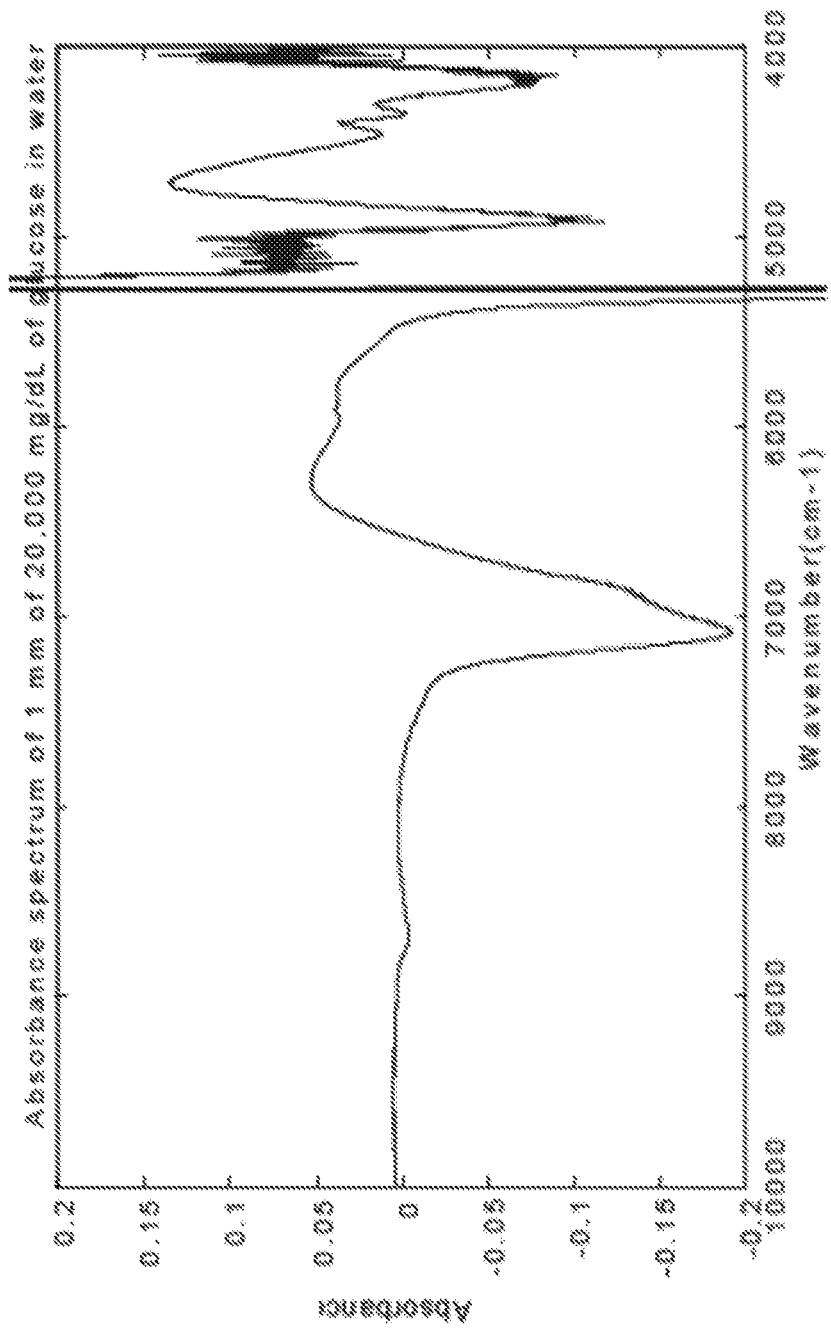
FIG. 56 shows an infrared absorbance spectrum for glucose.

The eye imaging system can also be used for the assessment of aspects of health of the user. In this case, information gained from analyzing captured images of the iris 5012 is different from information gained from analyzing captured images of the retina 5014. Where images of the retina 5014 are captured using light 5357 that illuminates the inner portions of the eye including the retina 5014. The light 5357 can be visible light, but in an embodiment, the light 5357 is infrared light (e.g. wavelength 1 to 5 microns) and the camera 3280 is an infrared light sensor (e.g. an InGaAs sensor) or a low resolution infrared image sensor that is used to determine the relative amount of light 5357 that is absorbed, reflected or scattered by the inner portions of the eye. Wherein the majority of the light that is absorbed, reflected or scattered can be attributed to materials in the inner portion of the eye including the retina where there are densely packed blood vessels with thin walls so that the absorption, reflection and scattering are caused by the material makeup of the blood. These measurements can be conducted automatically when the user is wearing the HWC, either at regular intervals, after identified events or when prompted by an external communication. In a preferred embodiment, the illuminating light is near infrared or mid infrared (e.g. 0.7 to 5 microns wavelength) to reduce the chance for thermal damage to the wearer's eye. In another embodiment, the polarizer 3285 is antireflection coated to reduce any reflections from this surface from the light 5357, the light 2969 or the light 3275 and thereby increase the sensitivity of the camera 3280. In a further embodiment, the light source 5355 and the camera 3280 together comprise a spectrometer wherein the relative intensity of the light reflected by the eye is analyzed over a series of narrow wavelengths within the range of wavelengths provided by the light source 5355 to determine a characteristic spectrum of the light that is absorbed, reflected or scattered by the eye. For example, the light source 5355 can provide a broad range of infrared light to illuminate the eye and the camera 3280 can include: a grating to laterally disperse the reflected light from the eye into a series of narrow wavelength bands that are captured by a linear photodetector so that the relative intensity by wavelength can be measured and a characteristic absorbance spectrum for the eye can be determined over the broad range of infrared. In a further example, the light source 5355 can provide a series of narrow wavelengths of light (ultraviolet, visible or infrared) to sequentially illuminate the eye and camera 3280 includes a photodetector that is selected to measure the relative intensity of the series of narrow wavelengths in a series of sequential measurements that together can be used to determine a characteristic spectrum of the eye. The determined characteristic spectrum is then compared to known characteristic spectra for different materials to determine the material makeup of the eye. In yet another embodiment, the illuminating light 5357 is focused on the retina 5014 and a characteristic spectrum of the retina 5014 is determined and the spectrum is compared to known spectra for materials that may be present in the user's blood. For example, in the visible wavelengths 540 nm is useful for detecting hemoglobin and 660 nm is useful for differentiating oxygenated hemoglobin. In a further example, in the infrared, a wide variety of materials can be identified as is known by those skilled in the art, including: glucose, urea, alcohol and controlled substances. FIG. 55 shows a series of example spectrum for a variety of controlled substances as measured using a form of infrared spectroscopy (ThermoScientific Application Note 51242, by C. Petty, B. Garland and the Mesa Police Department Forensic Laboratory, which is hereby incorporated by reference herein). FIG. 56 shows an infrared absorbance spectrum for glucose (Hewlett Packard Company 1999, G. Hopkins, G. Mauze; "In-vivo NIR Diffuse-reflectance Tissue Spectroscopy of Human Subjects," which is hereby incorporated by reference herein). U.S. Pat. No. 6,675,030, which is hereby incorporated by reference herein, provides a near infrared blood glucose monitoring system that includes infrared scans of a body part such as a foot. United States Patent publication 2006/0183986, which is hereby incorporated by reference herein, provides a blood glucose monitoring system including a light measurement of the retina. Embodiments of the present disclosure provide methods for automatic measurements of specific materials in the user's blood by illuminating at one or more narrow wavelengths into the iris of the wearer's eye and measuring the relative intensity of the light reflected by the eye to identify the relative absorbance spectrum and comparing the measured absorbance spectrum with known absorbance spectra for the specific material, such as illuminating at 540 and 660 nm to determine the level of hemoglobin present in the user's blood.

Another aspect of the present disclosure relates to collecting and using eye position and sight heading information. Head worn computing with motion heading, sight heading, and/or eye position prediction (sometimes referred to as "eye heading" herein) may be used to identify what a wearer of the HWC 102 is apparently interested in and the information may be captured and used. In embodiments, the information may be characterized as viewing information because the information apparently relates to what the wearer is looking at. The viewing information may be used to develop a personal profile for the wearer, which may indicate what the wearer tends to look at. The viewing information from several or many HWC's 102 may be captured such that group or crowd viewing trends may be established. For example, if the movement heading and sight heading are known, a prediction of what the wearer is looking at may be made and used to generate a personal profile or portion of a crowd profile. In another embodiment, if the eye heading and location, sight heading and/or movement heading are known, a prediction of what is being looked at may be predicted. The prediction may involve understanding what is in proximity of the wearer and this may be understood by establishing the position of the wearer (e.g. through GPS or other location technology) and establishing what mapped objects are known in the area. The prediction may involve interpreting images captured by the camera or other sensors associated with the HWC 102. For example, if the camera captures an image of a sign and the camera is in-line with the sight heading, the prediction may involve assessing the likelihood that the wearer is viewing the sign. The prediction may involve capturing an image or other sensory information and then performing object recognition analysis to determine what is being viewed. For example, the wearer may be walking down a street and the camera that is in the HWC 102 may capture an image and a processor, either on-board or remote from the HWC 102, may recognize a face, object, marker, image, etc. and it may be determined that the wearer may have been looking at it or towards it.

Figure 57:
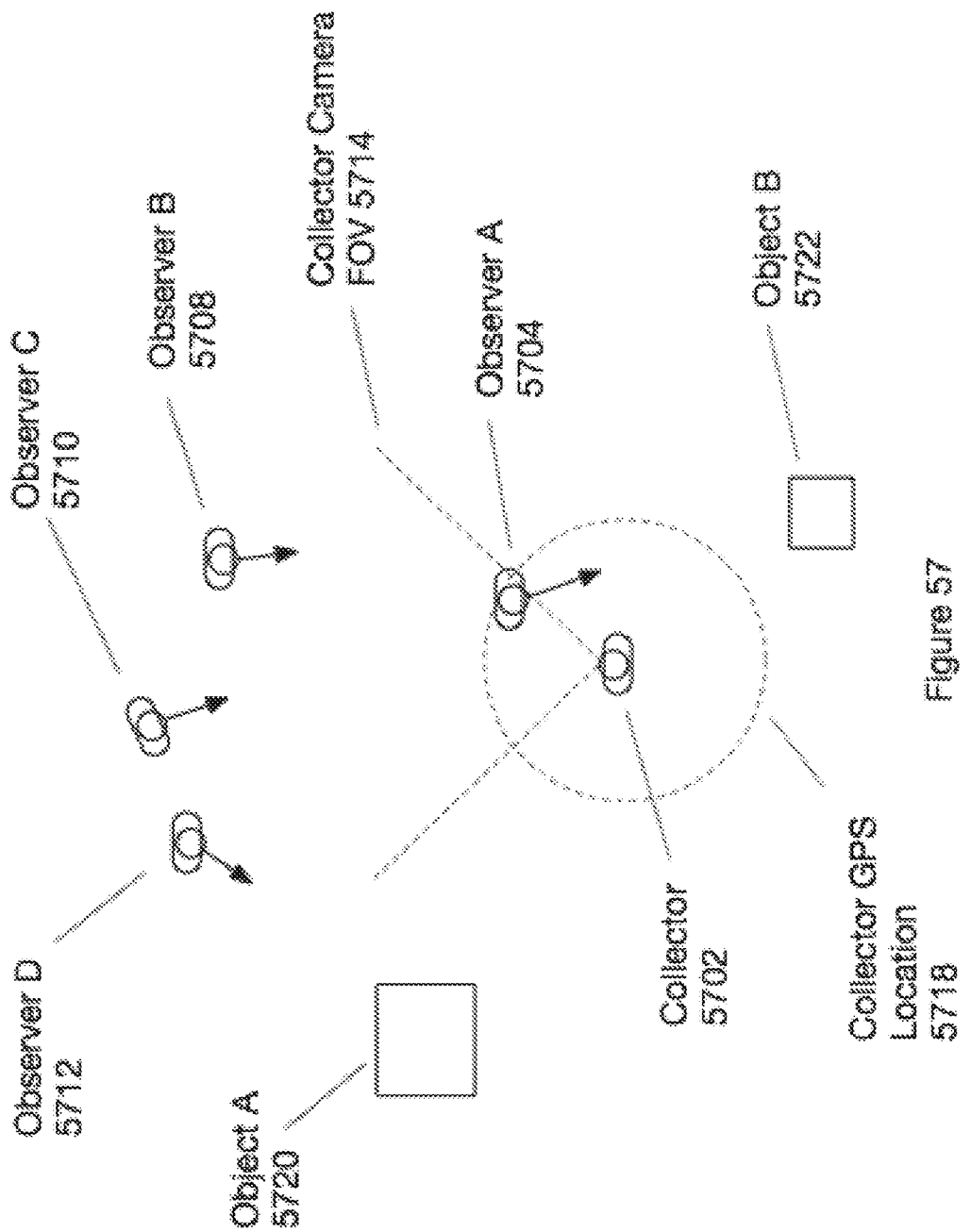
FIG. 57 illustrates a scene where a person is walking with a HWC mounted on his head.

FIG. 57 illustrates a scene where a person is walking with a HWC 102 mounted on his head. In this scene, the person's geo-spatial location 5704 is known through a GPS sensor, which could be another location system, and his movement heading, sight heading 5714 and eye heading 5702 are known and can be recorded (e.g. through systems described herein). There are objects and a person in the scene. Person 5712 may be recognized by the wearer's HWC 102 system, the person may be mapped (e.g. the person's GPS location may be known or recognized), or otherwise known. The person may be wearing a garment or device that is recognizable. For example, the garment may be of a certain style and the HWC may recognize the style and record its viewing. The scene also includes a mapped object 5718 and a recognized object 5720. As the wearer moves through the scene, the sight and/or eye headings may be recorded and communicated from the HWC 102. In embodiments, the time that the sight and/or eye heading maintains a particular position may be recorded. For example, if a person appears to look at an object or person for a predetermined period of time (e.g. 2 seconds or longer), the information may be communicated as gaze persistence information as an indication that the person may have been interested in the object.

In embodiments, sight headings may be used in conjunction with eye headings or eye and/or sight headings may be used alone. Sight headings can do a good job of predicting what direction a wearer is looking because many times the eyes are looking forward, in the same general direction as the sight heading. In other situations, eye headings may be a more desirable metric because eye and sight headings are not always aligned. In embodiments herein examples may be provided with the term "eye/sight" heading, which indicates that either or both eye heading and sight heading may be used in the example.

Figure 58:
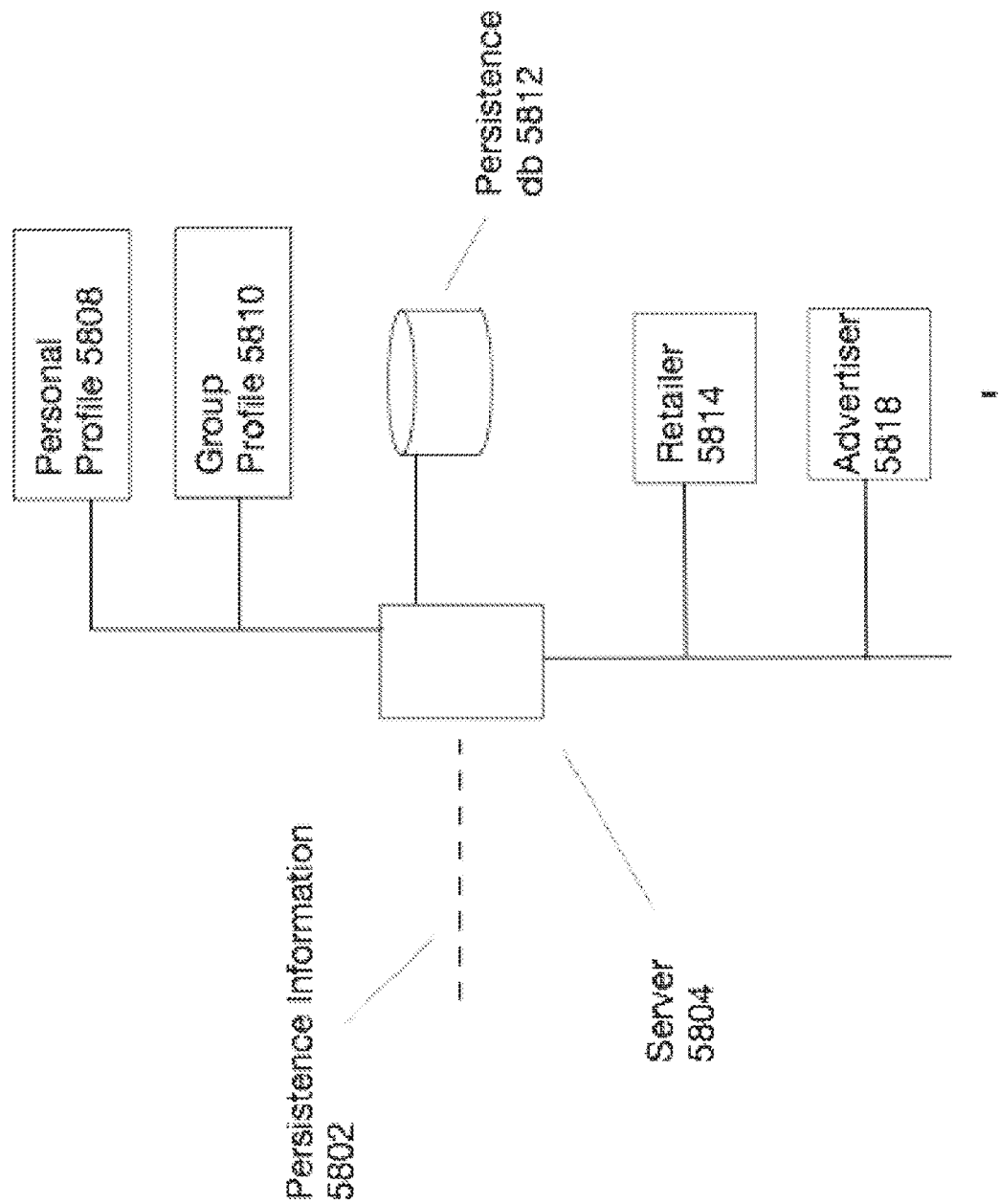
FIG. 58 illustrates a system for receiving, developing and using movement heading, sight heading, eye heading and/or persistence information from HWC(s).

FIG. 58 illustrates a system for receiving, developing and using movement heading, sight heading, eye heading and/or persistence information from HWC(s) 102. The server 5804 may receive heading or gaze persistence information, which is noted as persistence information 5802, for processing and/or use. The heading and/or gaze persistence information may be used to generate a personal profile 5808 and/or a group profile 5810. The personal profile 5718 may reflect the wearer's general viewing tendencies and interests. The group profile 5810 may be an assemblage of different wearer's heading and persistence information to create impressions of general group viewing tendencies and interests. The group profile 5810 may be broken into different groups based on other information such as gender, likes, dislikes, biographical information, etc. such that certain groups can be distinguished from other groups. This may be useful in advertising because an advertiser may be interested in what a male adult sports go'er is generally looking at as oppose to a younger female. The profiles 5808 and 5810 and raw heading and persistence information may be used by retailers 5814, advertisers 5818, trainers, etc. For example, an advertiser may have an advertisement posted in an environment and may be interested in knowing how many people look at the advertisement, how long they look at it and where they go after looking at it. This information may be used as conversion information to assess the value of the advertisement and thus the payment to be received for the advertisement.

In embodiments, the process involves collecting eye and/or sight heading information from a plurality of head-worn computers that come into proximity with an object in an environment. For example, a number of people may be walking through an area and each of the people may be wearing a head worn computer with the ability to track the position of the wearer's eye(s) as well as possibly the wearer's sight and movement headings. The various HWC wearing individuals may then walk, ride, or otherwise come into proximity with some object in the environment (e.g. a store, sign, person, vehicle, box, bag, etc.). When each person passes by or otherwise comes near the object, the eye imaging system may determine if the person is looking towards the object. All of the eye/sight heading information may be collected and used to form impressions of how the crowd reacted to the object. A store may be running a sale and so the store may put out a sign indicating such. The storeowners and managers may be very interested to know if anyone is looking at their sign. The sign may be set as the object of interest in the area and as people navigate near the sign, possibly determined by their GPS locations, the eye/sight heading determination system may record information relative to the environment and the sign. Once, or as, the eye/sight heading information is collected and associations between the eye headings and the sign are determined, feedback may be sent back to the storeowner, managers, advertiser, etc. as an indication of how well their sign is attracting people. In embodiments, the sign's effectiveness at attracting people's attention, as indicated through the eye/sight headings, may be considered a conversion metric and impact the economic value of the sign and/or the signs placement.

In embodiments, a map of the environment with the object may be generated by mapping the locations and movement paths of the people in the crowd as they navigate by the object (e.g. the sign). Layered on this map may be an indication of the various eye/sight headings. This may be useful in indicating wear people were in relation to the object when then viewed they object. The map may also have an indication of how long people looked at the object from the various positions in the environment and where they went after seeing the object.

In embodiments, the process involves collecting a plurality of eye/sight headings from a head-worn computer, wherein each of the plurality of eye/sight headings is associated with a different pre-determined object in an environment. This technology may be used to determine which of the different objects attracts more of the person's attention. For example, if there are three objects placed in an environment and a person enters the environment navigating his way through it, he may look at one or more of the objects and his eye/sight heading may persist on one or more objects longer than others. This may be used in making or refining the person's personal attention profile and/or it may be used in connection with other such people's data on the same or similar objects to determine an impression of how the population or crowd reacts to the objects. Testing advertisements in this way may provide good feedback of its effectiveness.

In embodiments, the process may involve capturing eye/sight headings once there is substantial alignment between the eye/sight heading and an object of interest. For example, the person with the HWC may be navigating through an environment and once the HWC detects substantial alignment or the projected occurrence of an upcoming substantial alignment between the eye/sight heading and the object of interest, the occurrence and/or persistence may be recorded for use.

In embodiments, the process may involve collecting eye/sight heading information from a head-worn computer and collecting a captured image from the head-worn computer that was taken at substantially the same time as the eye/sight heading information was captured. These two pieces of information may be used in conjunction to gain an understanding of what the wearer was looking at and possibly interested in. The process may further involve associating the eye/sight heading information with an object, person, or other thing found in the captured image. This may involve processing the captured image looking for objects or patterns. In embodiments, gaze time or persistence may be measured and used in conjunction with the image processing. The process may still involve object and/or pattern recognition, but it may also involve attempting to identify what the person gazed at for the period of time by more particularly identifying a portion of the image in conjunction with image processing.

In embodiments, the process may involve setting a pre-determined eye/sight heading from a pre-determined geo-spatial location and using them as triggers. In the event that a head worn computer enters the geospatial location and an eye/sight heading associated with the head worn computer aligns with the pre-determined eye/sight heading, the system may collect the fact that there was an apparent alignment and/or the system may record information identifying how long the eye/sight heading remains substantially aligned with the pre-determined eye/sight heading to form a persistence statistic. This may eliminate or reduce the need for image processing as the triggers can be used without having to image the area. In other embodiments, image capture and processing is performed in conjunction with the triggers. In embodiments, the triggers may be a series a geospatial locations with corresponding eye/sight headings such that many spots can be used as triggers that indicate when a person entered an area in proximity to an object of interest and/or when that person actually appeared to look at the object.

Figure 59:
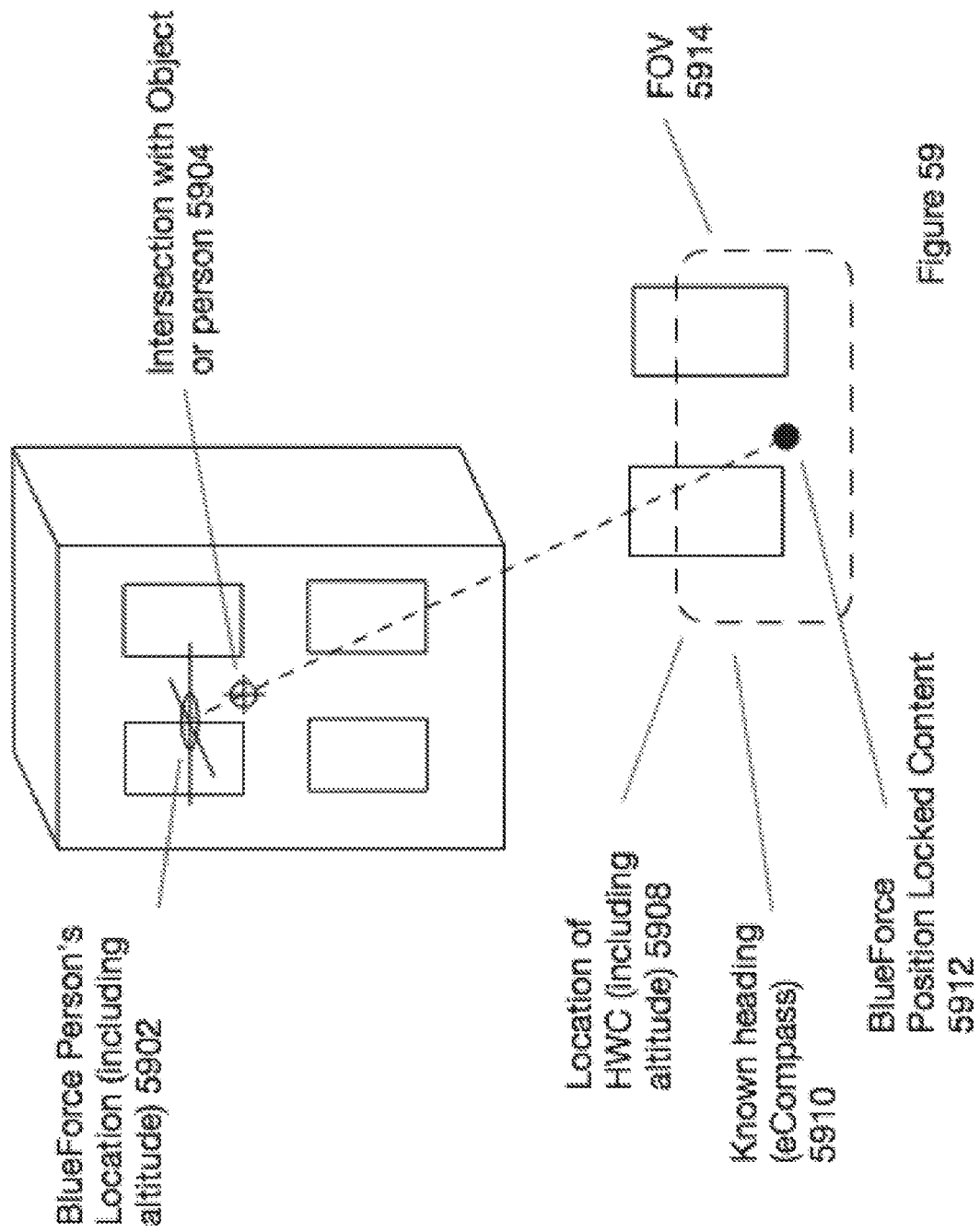
FIG. 59 illustrates a presentation technology in accordance with the principles of the present disclosure.

In embodiments, eye imaging may be used to capture images of both eyes of the wearer in order to determine the amount of convergence of the eyes (e.g. through technologies described herein elsewhere) to get an understanding of what focal plane is being concentrated on by the wearer. For example, if the convergence measurement suggests that the focal plane is within 15 feet of the wearer, than, even though the eye/sight headings may align with an object that is more than 15 feet away it may be determined that the wearer was not looking at the object. If the object were within the 15 foot suggested focal plane, the determination may be that the wearer was looking at the object. FIG. 59 illustrates an environmentally position locked digital content 5912 that is indicative of a person's location 5902. In this disclosure the term "BlueForce" is generally used to indicate team members or members for which geo-spatial locations are known and can be used. In embodiments, "Blue Force" is a term to indicate members of a tactical arms team (e.g. a police force, secret service force, security force, military force, national security force, intelligence force, etc.). In many embodiments herein one member may be referred to as the primary or first BlueForce member and it is this member, in many described embodiments, that is wearing the HWC. It should be understood that this terminology is to help the reader and make for clear presentations of the various situations and that other members of the Blueforce, or other people, may have HWC's 102 and have similar capabilities. In this embodiment, a first person is wearing a head-worn computer 102 that has a see through field of view ("FOV") 5914. The first person can see through the FOV to view the surrounding environment through the FOV and digital content can also be presented in the FOV such that the first person can view the actual surroundings, through the FOV, in a digitally augmented view. The other BlueForce person's location is known and is indicated at a position inside of a building at point 5902. This location is known in three dimensions, longitude, latitude and altitude, which may have been determined by GPS along with an altimeter associated with the other Blueforce person. Similarly, the location of the first person wearing the HWC 102 is also known, as indicated in FIG. 59 as point 5908. In this embodiment, the compass heading 5910 of the first person is also known. With the compass heading 5910 known, the angle in which the first person is viewing the surroundings can be estimated. A virtual target line between the location of the first person 5908 and the other person's location 5902 can be established in three dimensional space and emanating from the HWC 102 proximate the FOV 5914. The three dimensionally oriented virtual target line can then be used to present environmentally position locked digital content in the FOV 5914, which is indicative of the other person's location 5902. The environmentally position locked digital content 5902 can be positioned within the FOV 5914 such that the first person, who is wearing the HWC 102, perceives the content 5902 as locked in position within the environment and marking the location of the other person 5902.

The three dimensionally positioned virtual target line can be recalculated periodically (e.g. every millisecond, second, minute, etc.) to reposition the environmentally position locked content 5912 to remain in-line with the virtual target line. This can create the illusion that the content 5912 is staying positioned within the environment at a point that is associated with the other person's location 5902 independent of the location of the first person 5908 wearing the HWC 102 and independent of the compass heading of the HWC 102.

In embodiments, the environmentally locked digital content 5912 may be positioned with an object 5904 that is between the first person's location 5908 and the other person's location 5902. The virtual target line may intersect the object 5904 before intersecting with the other person's location 5902. In embodiments, the environmentally locked digital content 5912 may be associated with the object intersection point 5904. In embodiments, the intersecting object 5904 may be identified by comparing the two person's locations 5902 and 5908 with obstructions identified on a map. In embodiments the intersecting object 5904 may be identified by processing images captured from a camera, or other sensor, associated with the HWC 102. In embodiments, the digital content 5912 has an appearance that is indicative of being at the location of the other person 5902, at the location of the intersecting object 5904 to provide a more clear indication of the position of the other person's position 5902 in the FOV 5914.

Figure 60:
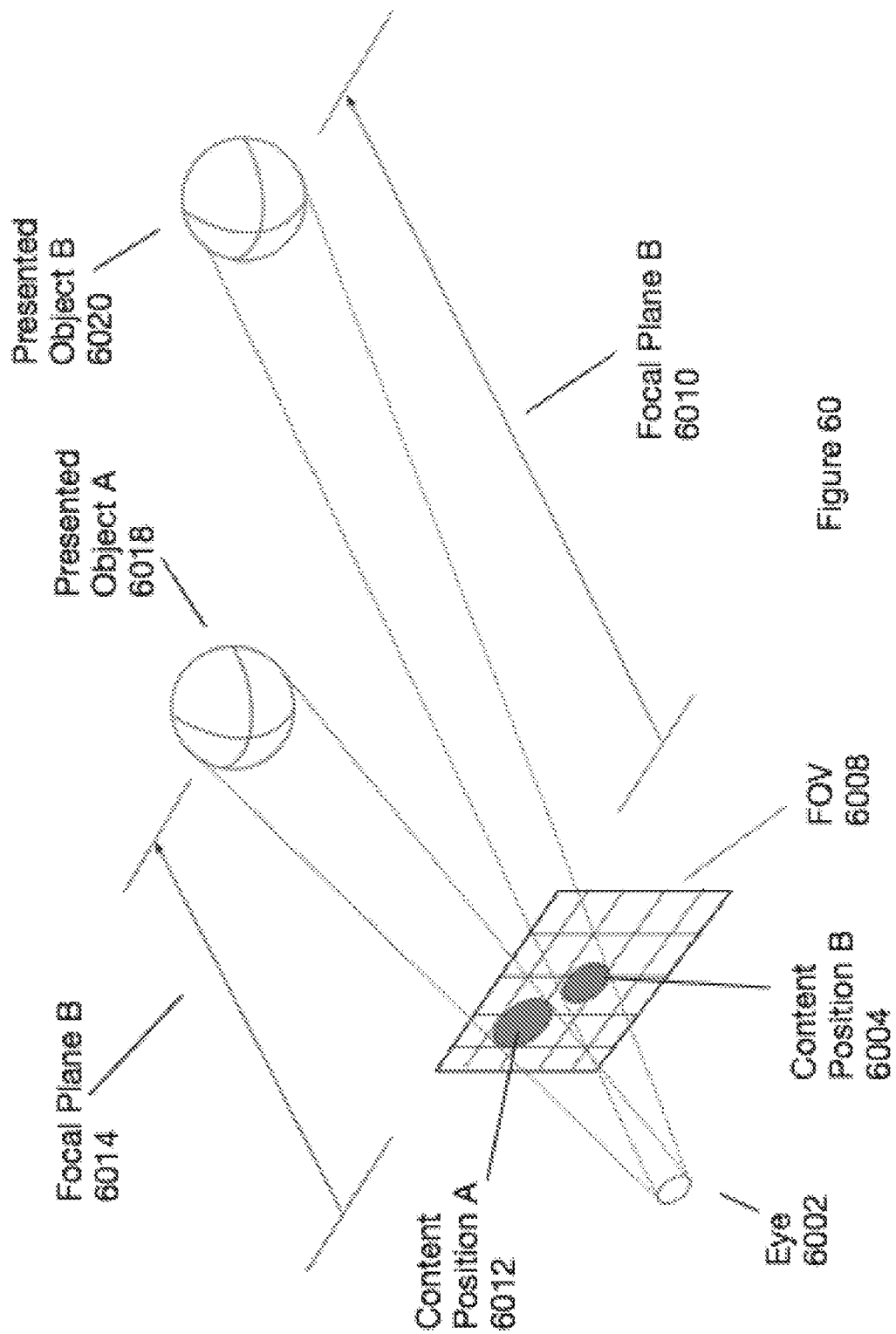
FIG. 60 illustrates a presentation technology in accordance with the principles of the present disclosure.

FIG. 60 illustrates how and where digital content may be positioned within the FOV 6008 based on a virtual target line between the location of the first person 5908, who's wearing the HWC 102, and the other person 5902. In addition to positioning the content in a position within the FOV 6008 that is in-line with the virtual target line, the digital content may be presented such that it comes into focus by the first person when the first person focuses at a certain plane or distance in the environment. Presented object A 6018 is digitally generated content that is presented as an image at content position A 6012. The position 6012 is based on the virtual target line. The presented object A 6018 is presented not only along the virtual target line but also at a focal plane B 6014 such that the content at position A 6012 in the FOV 6008 comes into focus by the first person when the first person's eye 6002 focuses at something in the surrounding environment at the focal plane B 6014 distance. Setting the focal plane of the presented content provides content that does not come into focus until the eye 6002 focuses at the set focal plane. In embodiments, this allows the content at position A to be presented without when the HWC's compass is indicative of the first person looking in the direction of the other person 5902 but it will only come into focus when the first person focuses on in the direction of the other person 5902 and at the focal plane of the other person 5902.

Presented object B 6020 is aligned with a different virtual target line then presented object A 6018. Presented object B 6020 is also presented at content position B 6004 at a different focal plane than the content position A 6012. Presented content B 6020 is presented at a further focal plane, which is indicative that the other person 5902 is physically located at a further distance. If the focal planes are sufficiently different, the content at position A will come into focus at a different time than the content at position B because the two focal planes require different focus from the eye 6002.

Figure 61:
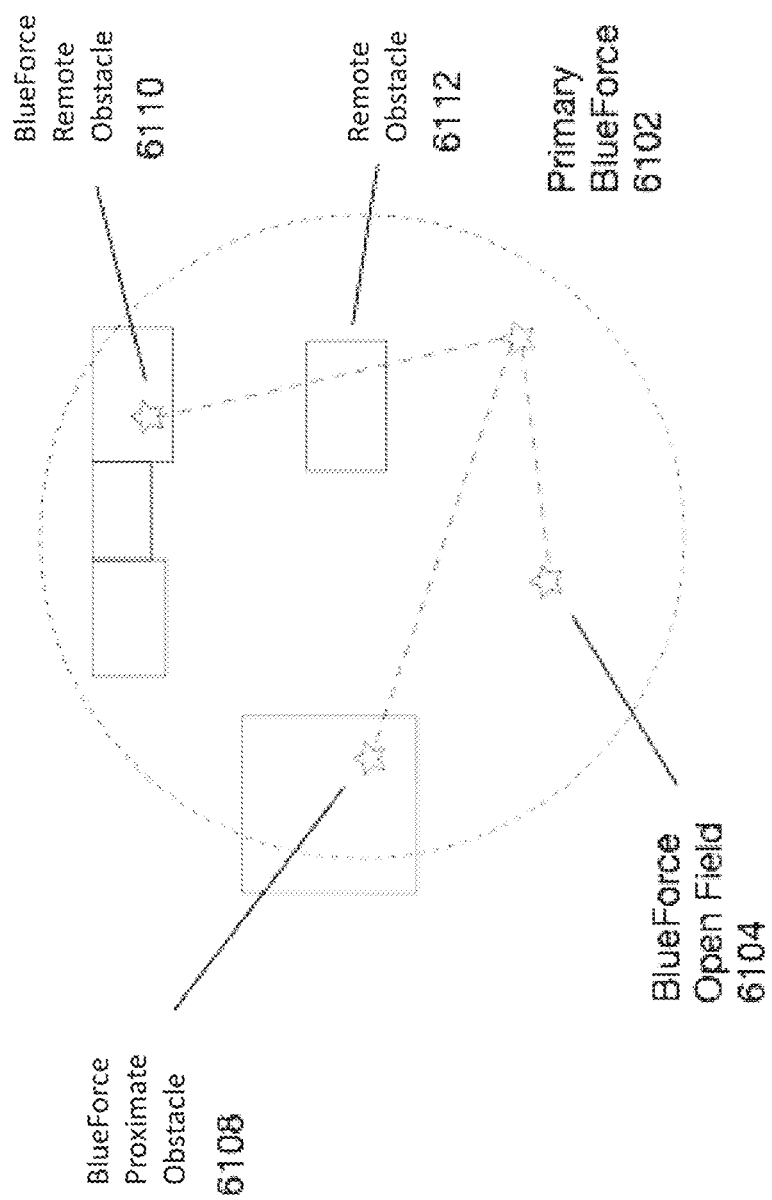
FIG. 61 illustrates a presentation technology in accordance with the principles of the present disclosure.

FIG. 61 illustrates several BlueForce members at locations with various points of view from the first person's perspective. In embodiments, the relative positions, distances and obstacles may cause the digital content indicative of the other person's location to be altered. For example, if the other person can be seen by the first person through the first person's FOV, the digital content may be locked at the location of the other person and the digital content may be of a type that indicates the other person's position is being actively marked and tracked. If the other person is in relatively close proximity, but cannot be seen by the first person, the digital content may be locked to an intersecting object or area and the digital content may indicate that the actual location of the other person cannot be seen but the mark is generally tracking the other persons general position. If the other person is not within a pre-determined proximity or is otherwise more significantly obscured from the first person's view, the digital content may generally indicate a direction or area where the other person is located and the digital content may indicate that the other person's location is not closely identified or tracked by the digital content, but that the other person is in the general area.

Continuing to refer to FIG. 61, several BlueForce members are presented at various positions within an area where the first person is located. The primary BlueForce member 6102 (also referred to generally as the first person, or the person wherein the HWC with the FOV for example purposes) can directly see the BlueForce member in the open field 6104. In embodiments, the digital content provided in the FOV of the primary BlueForce member may be based on a virtual target line and virtually locked in an environment position that is indicative of the open field position of the BlueForce member 6104. The digital content may also indicate that the location of the open field BlueForce member is marked and is being tracked. The digital content may change forms if the Blue Force member becomes obscured from the vision of the primary BlueForce member or otherwise becomes unavailable for direct viewing.

BlueForce member 6108 is obscured from the primary BlueForce member's 6102 view by an obstacle that is in close proximity to the obscured member 6108. As depicted, the obscured member 6108 is in a building but close to one of the front walls. In this situation, the digital content provided in the FOV of the primary member 6102 may be indicative of the general position of the obscured member 6108 and the digital content may indicate that, while the other person's location is fairly well marked, it is obscured so it is not as precise as if the person was in direct view. In addition, the digital content may be virtually positionally locked to some feature on the outside of the building that the obscured member is in. This may make the environmental locking more stable and also provide an indication that the location of the person is somewhat unknown.

BlueForce member 6110 is obscured by multiple obstacles. The member 6110 is in a building and there is another building 6112 in between the primary member 6102 and the obscured member 6110. In this situation, the digital content in the FOV of the primary member will be spatially quite short of the actual obscured member and as such the digital content may need to be presented in a way that indicates that the obscured member 6110 is in a general direction but that the digital marker is not a reliable source of information for the particular location of obscured member 6110.

Figure 62:
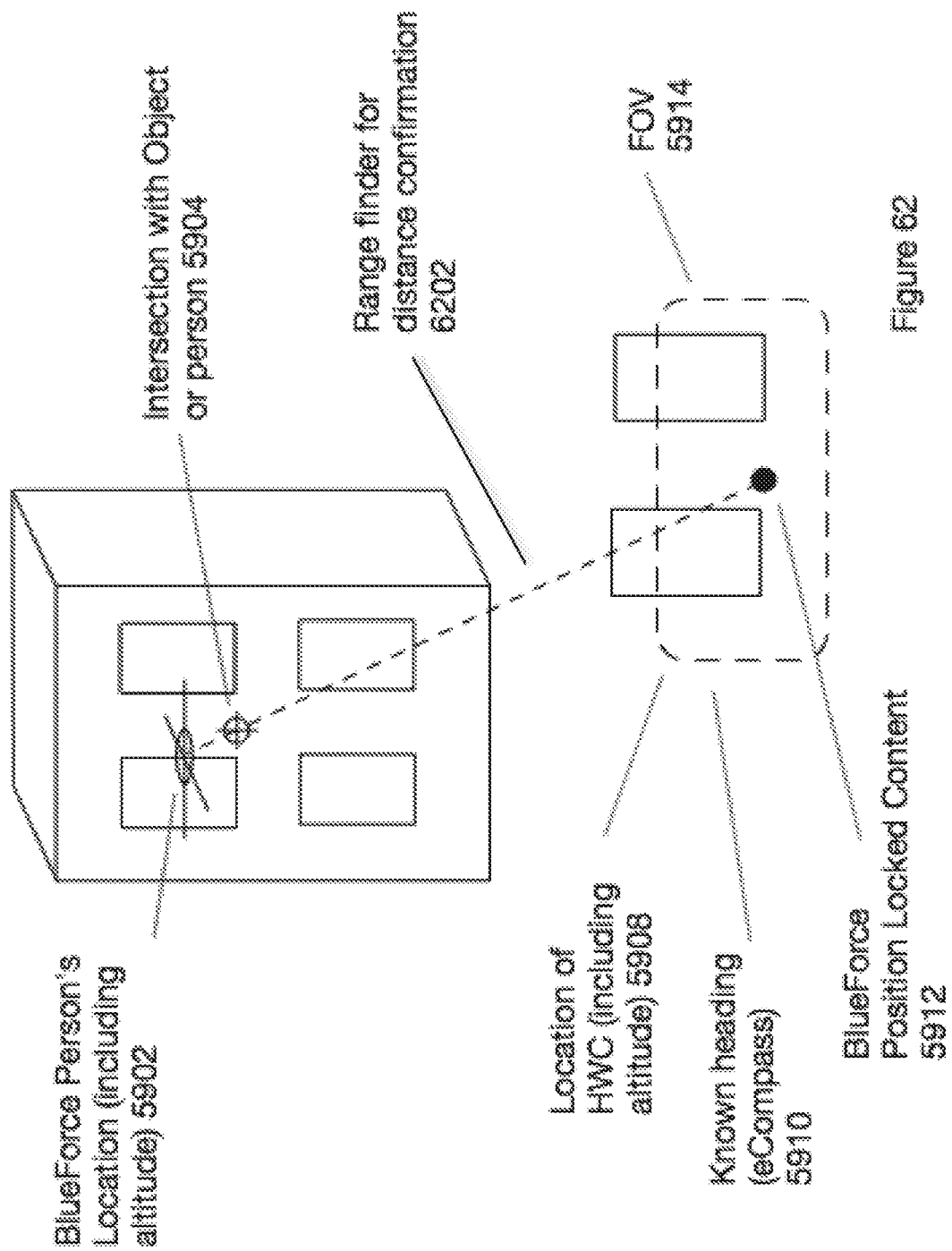
FIG. 62 illustrates a presentation technology in accordance with the principles of the present disclosure.

FIG. 62 illustrates yet another method for positioning digital content within the FOV of a HWC where the digital content is intended to indicate a position of another person. This embodiment is similar to the embodiment described in connection with FIG. 62 herein. The main additional element in this embodiment is the additional step of verifying the distance between the first person 5908, the one wearing the HWC with the FOV digital content presentation of location, and the other person at location 5902. Here, the range finder may be included in the HWC and measure a distance at an angle that is represented by the virtual target line. In the event that the range finder finds an object obstructing the path of the virtual target line, the digital content presentation in the FOV may indicate such (e.g. as described herein elsewhere). In the event that the range finder confirms that there is a person or object at the end of the prescribed distance and angle defined by the virtual target line, the digital content may represent that the proper location has been marked, as described herein elsewhere.

Figure 63:
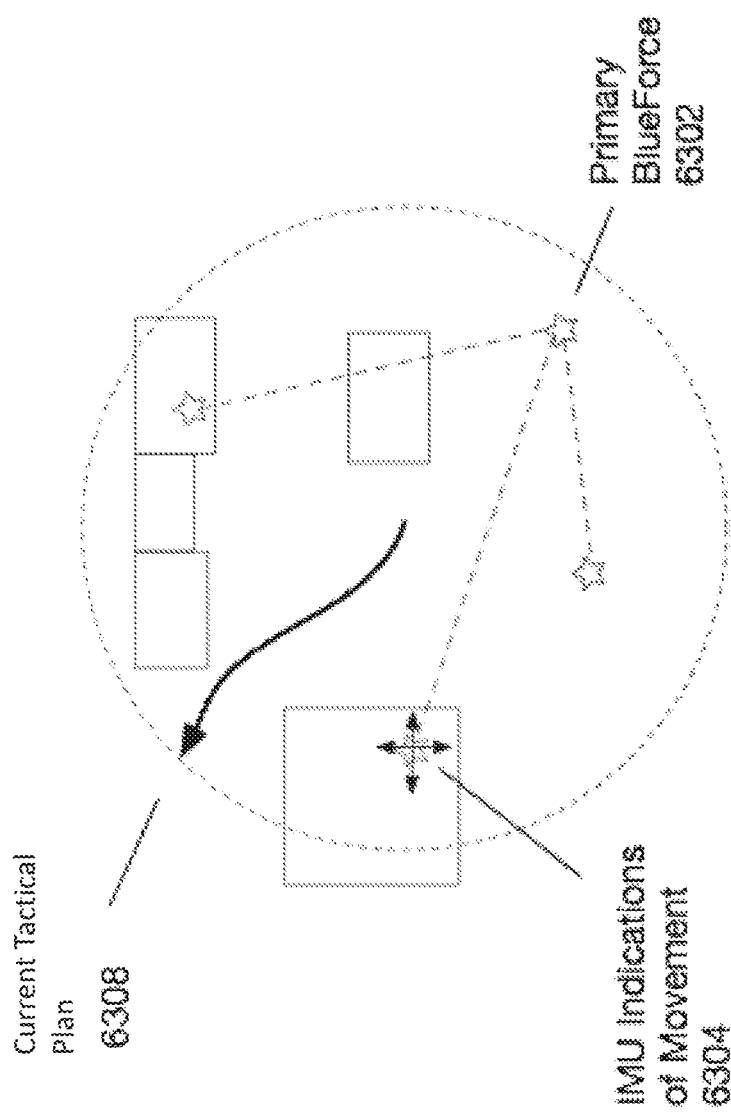
FIG. 63 illustrates a presentation technology in accordance with the principles of the present disclosure.

Another aspect of the present disclosure relates to predicting the movement of BlueForce members to maintain proper virtual marking of the BlueForce member locations. FIG. 63 illustrates a situation where the primary BlueForce member 6302 is tracking the locations of the other BlueForce members through an augmented environment using a HWC 102, as described herein elsewhere (e.g. as described in connection with the above figures). The primary BlueForce member 6302 may have knowledge of the tactical movement plan 6308. The tactical movement plan may be maintained locally (e.g. on the HWCs 102 with sharing of the plan between the BlueForce members) or remotely (e.g. on a server and communicated to the HWC's 102, or communicated to a subset of HWC's 102 for HWC 102 sharing). In this case, the tactical plan involves the BlueForce group generally moving in the direction of the arrow 6308. The tactical plan may influence the presentations of digital content in the FOV of the HWC 102 of the primary BlueForce member. For example, the tactical plan may assist in the prediction of the location of the other BlueForce member and the virtual target line may be adjusted accordingly. In embodiments, the area in the tactical movement plan may be shaded or colored or otherwise marked with digital content in the FOV such that the primary BlueForce member can manage his activities with respect to the tactical plan. For example, he may be made aware that one or more BlueForce members are moving towards the tactical path 6308. He may also be made aware of movements in the tactical path that do not appear associated with BlueForce members.

FIG. 63 also illustrates that internal IMU sensors in the HWCs worn by the BlueForce members may provide guidance on the movement of the members 6304. This may be helpful in identifying when a GPS location should be updated and hence updating the position of the virtual marker in the FOV. This may also be helpful in assessing the validity of the GPS location. For example, if the GPS location has not updated but there is significant IMU sensor activity, the system may call into question the accuracy of the identified location. The IMU information may also be useful to help track the position of a member in the event the GPS information is unavailable. For example, dead reckoning may be used if the GPS signal is lost and the virtual marker in the FOV may indicate both indicated movements of the team member and indicate that the location identification is not ideal. The current tactical plan 6308 may be updated periodically and the updated plans may further refine what is presented in the FOV of the HWC 102.

Figure 64:
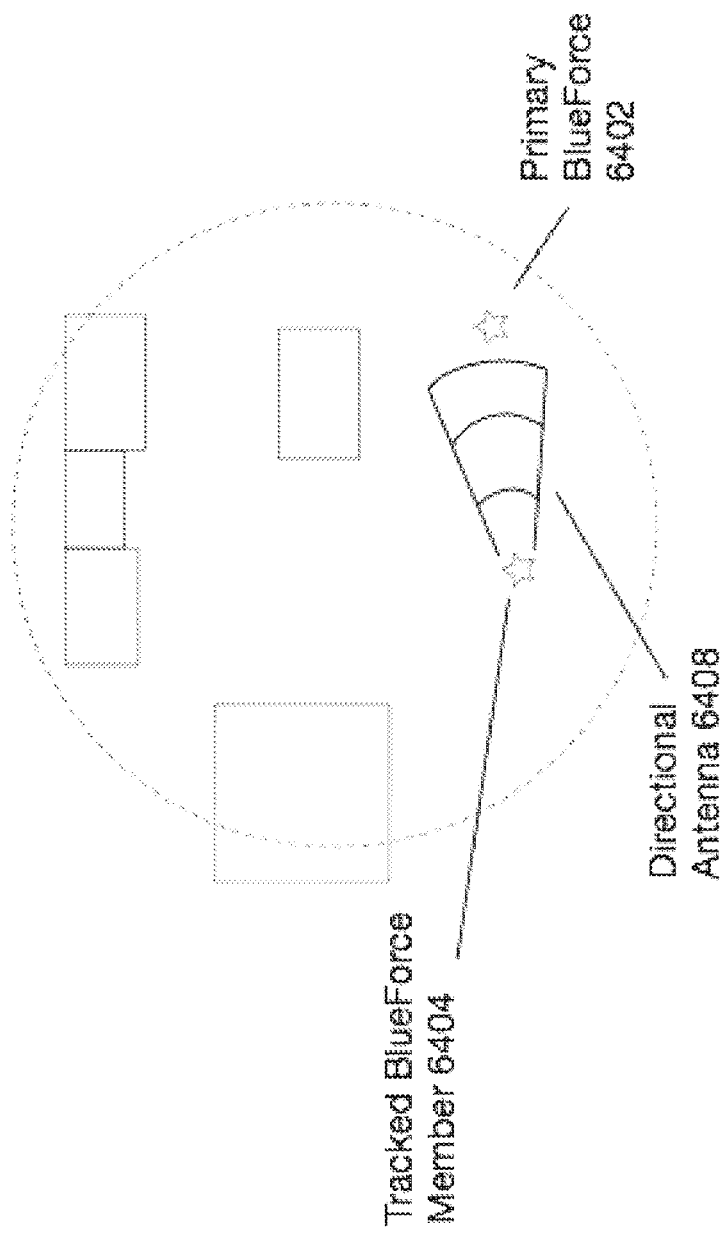
FIG. 64 illustrates a presentation technology in accordance with the principles of the present disclosure.

FIG. 64 illustrates a BlueForce tracking system in accordance with the principles of the present disclosure. In embodiments, the BlueForce HWC's 102 may have directional antenna's that emit relatively low power directional RF signals such that other BlueForce members within the range of the relatively low power signal can receive and assess its direction and/or distance based on the strength and varying strength of the signals. In embodiments, the tracking of such RF signals can be used to alter the presentation of the virtual markers of persons locations within the FOV of HWC 102.

Another aspect of the present disclosure relates to monitoring the health of BlueForce members. Each BlueForce member may be automatically monitored for health and stress events. For example, the members may have a watchband as described herein elsewhere or other wearable biometric monitoring device and the device may continually monitor the biometric information and predict health concerns or stress events. As another example, the eye imaging systems described herein elsewhere may be used to monitor pupil dilatations as compared to normal conditions to predict head trauma. Each eye may be imaged to check for differences in pupil dilation for indications of head trauma. As another example, an IMU in the HWC 102 may monitor a person's walking gate looking for changes in pattern, which may be an indication of head or other trauma. Biometric feedback from a member indicative of a health or stress concern may be uploaded to a server for sharing with other members or the information may be shared with local members, for example. Once shared, the digital content in the FOF that indicates the location of the person having the health or stress event may include an indication of the health event.

Figure 65:
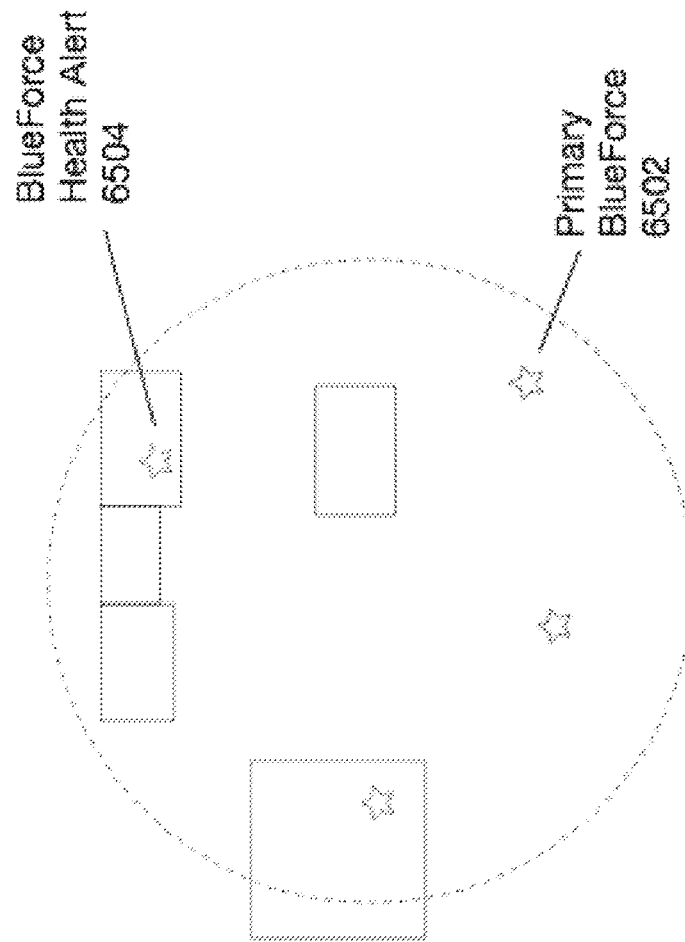
FIG. 65 illustrates a presentation technology in accordance with the principles of the present disclosure.

FIG. 65 illustrates a situation where the primary BlueForce member 6502 is monitoring the location of the BlueForce member 6504 that has had a heath event and caused a health alert to be transmitted from the HWC 102. As described herein elsewhere, the FOV of the HWC 102 of the primary BlueForce member may include an indication of the location of the BlueForce member with the health concern 6504. The digital content in the FOV may also include an indication of the health condition in association with the location indication. In embodiments, non-biometric sensors (e.g. IMU, camera, ranger finder, accelerometer, altimeter, etc.) may be used to provide health and/or situational conditions to the BlueForce team or other local or remote persons interested in the information. For example, if one of the BlueForce members is detected as quickly hitting the ground from a standing position an alter may be sent as an indication of a fall, the person is in trouble and had to drop down, was shot, etc.

Figure 66:
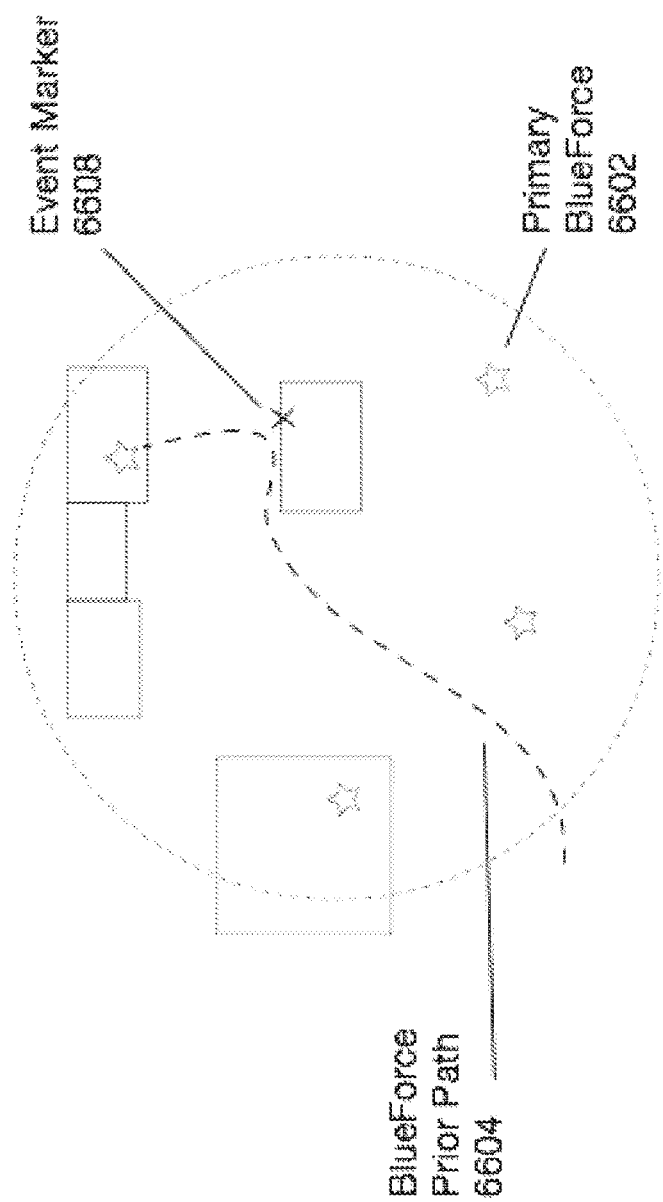
FIG. 66 illustrates a presentation technology in accordance with the principles of the present disclosure.

Another aspect of the present disclosure relates to virtually marking various prior acts and events. For example, as depicted in FIG. 66, the techniques described herein elsewhere may be used to construct a virtual prior movement path 6604 of a BlueForce member. The virtual path may be displayed as digital content in the FOV of the primary BlueForce member 6602 using methods described herein elsewhere. As the BlueForce member moved along the path 6604 he may have virtually placed an event marker 6608 such that when another member views the location the mark can be displayed as digital content. For example, the BlueForce member may inspect and clear an area and then use an external user interface or gesture to indicate that the area has been cleared and then the location would be virtually marked and shared with BlueForce members. Then, when someone wants to understand if the location was inspected he can view the location's information. As indicated herein elsewhere, if the location is visible to the member, the digital content may be displayed in a way that indicates the specific location and if the location is not visible from the person's perspective, the digital content may be somewhat different in that it may not specifically mark the location.

Turning back to optical configurations, another aspect of the present disclosure relates to an optical configuration that provides digitally displayed content to an eye of a person wearing a head-worn display (e.g. as used in a HWC 102) and allows the person to see through the display such that the digital content is perceived by the person as augmenting the see through view of the surrounding environment. The optical configuration may have a variable transmission optical element that is in-line with the person's see-through view such that the transmission of the see-through view can be increased and decreased. This may be helpful in situations where a person wants or would be better served with a high transmission see-through view and when, in the same HWC 102, the person wants or would be better served with less see-through transmission. The lower see-through transmission may be used in bright conditions and/or in conditions where higher contrast for the digitally presented content is desirable. The optical system may also have a camera that images the surrounding environment by receiving reflected light from the surrounding environment off of an optical element that is in-line with the person's see-through view of the surrounding. In embodiments, the camera may further be aligned in a dark light trap such that light reflected and/or transmitted in the direction of the camera that is not captured by the camera is trapped to reduce stray light.

Figure 67:
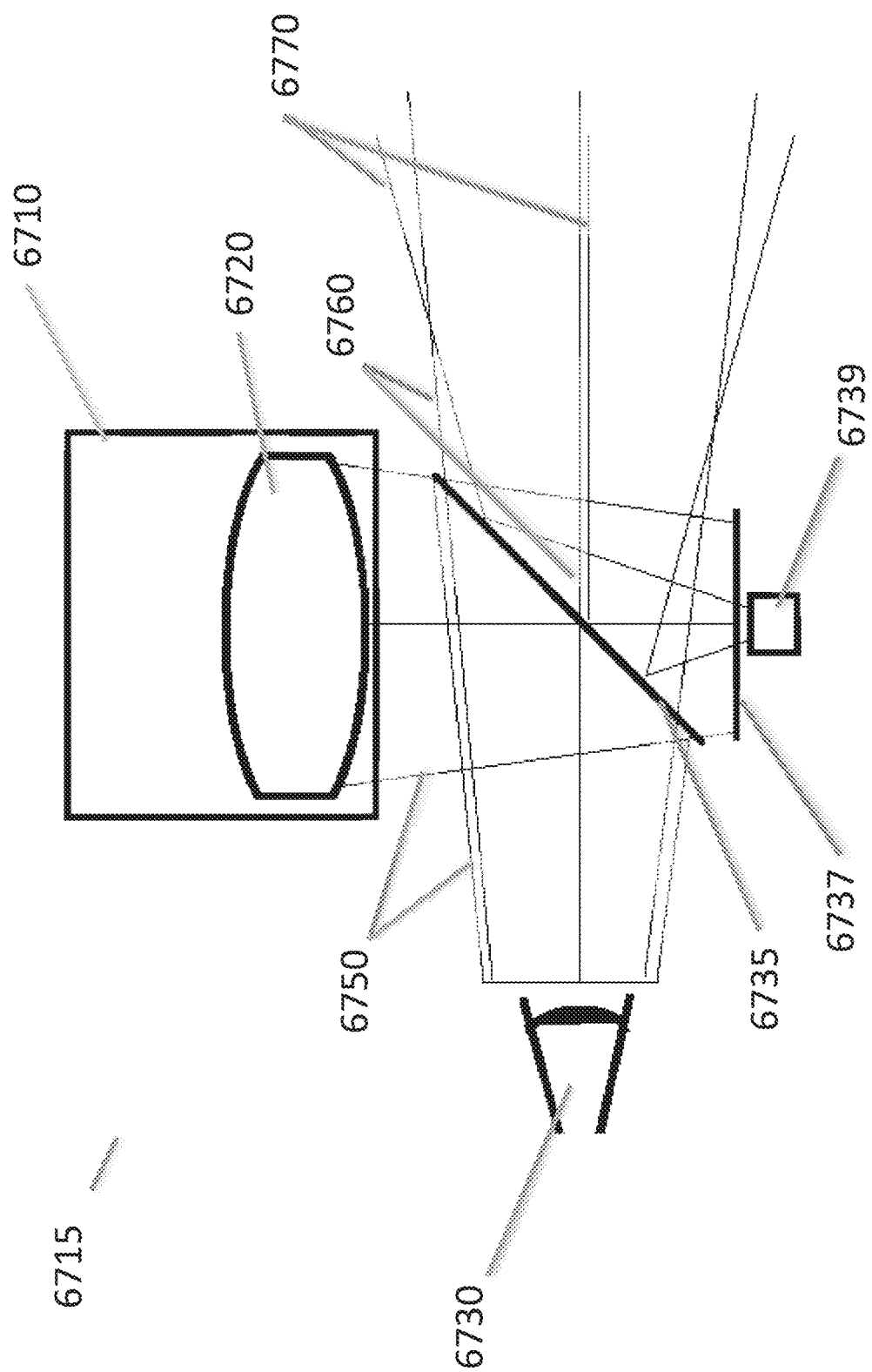
FIG. 67 illustrates an optical configuration in accordance with the principles of the present disclosure.

In embodiments, a HWC 102 is provided that includes a camera that is coaxially aligned with the direction that the user is looking. FIG. 67 shows an illustration of an optical system 6715 that includes an absorptive polarizer 6737 and a camera 6739. The image source 6710 can include light sources, displays and reflective surfaces as well as one or more lenses 6720. Image light 6750 is provided by the image source 6710 wherein, a portion of the image light 6750 is reflected toward the user's eye 6730 by a partially reflective combiner 6735. At the same time, a portion of the image light 6750 may be transmitted by the combiner 6735 such that it is incident onto the absorptive polarizer 6737. In this embodiment, the image light 6750 is polarized light with the polarization state of the image light 6750 oriented relative to the transmission axis of the absorptive polarizer 6737 such that the incident image light 6750 is absorbed by the absorptive polarizer 6737. In this way, faceglow produced by escaping image light 6750 is reduced. In embodiments, the absorptive polarizer 6737 includes an antireflection coating to reduce reflections from the surface of the absorptive polarizer 6737.

FIG. 67 further shows a camera 6739 for capturing images of the environment in the direction that the user is looking. The camera 6739 is positioned behind the absorptive polarizer 6737 and below the combiner 6735 so that a portion of light from the environment 6770 is reflected by the combiner 6735 toward the camera 6739. Light from the environment 6770 can be unpolarized so that a portion of the light from the environment 6770 that is reflected by the combiner 6735 passes through the absorptive polarizer 6737 and it is this light that is captured by the camera 6739. As a result, the light captured by the camera will have a polarization state that is opposite that of the image light 6750. In addition, the camera 6739 is aligned relative to the combiner 6735 such that the field of view associated with the camera 6739 is coaxial to the display field of view provided by image light 6750. At the same time, a portion of scene light 6760 from the environment is transmitted by the combiner 6735 to provide a see-through view of the environment to the user's eye 6730. Where the display field of view associated with the image light 6750 is typically coincident to the see-through field of view associated with the scene light 6760 and thereby the see through field of view and the field of view of the camera 6739 are at least partially coaxial. By attaching the camera 6739 to the lower portion of the optical system 6715, the field of view of the camera 6739 as shown by the light from the environment 6770 moves as the user moves their head so that images captured by the camera 6739 correspond to the area of the environment that the user is looking at. By coaxially aligning the camera field of view with the displayed image and the user's view of the scene, augmented reality images with improved alignment to objects in the scene can be provided. This is because the captured images from the camera 6739 provide an accurate representation of the user's perspective view of the scene. As an example, when the user sees an object in the scene as being located in the middle of the see-through view of the HWC, the object will be located in the middle of the image captured by the camera and any augmented reality imagery that is to be associated with the object can be located in the middle of the displayed image. As the user moves their head, the relative position of the object as seen in the see-through view of the scene will change and the position of the augmented reality imagery can be changed within the displayed image in a corresponding manner. When a camera 6739 is provided for each of the user's eyes, an accurate representation of the 3D view of the scene can be provided as well. This is an important advantage provided by the disclosure because images captured by a camera located in the frame of the HWC (e.g. between the eyes or at the corners) capture images that are laterally offset from the user's perspective of the scene and as a result it is difficult to align augmented reality images with objects in the scene as seen from the user's perspective.

In the optical system 6715 shown in FIG. 67, the absorptive polarizer 6737 simultaneously functions as a light trap for escaping image light 6750, a light blocker of the image light 6750 for the camera 6739 and a window for light from the environment 6770 to the camera 6739. This is possible because the polarization state of the image light 6750 is perpendicular to the transmission axis of the absorptive polarizer 6737 while the light from the environment 6770 is unpolarized so that a portion of the light from the environment 6770 that is the opposite polarization state to the image light is transmitted by the absorptive polarizer 6737. The combiner 6735 can be any partially reflective surface including a simple partial mirror, a notch mirror and a holographic mirror. The reflectivity of the combiner 6735 can be selected to be greater than 50% (e.g. 55% reflectivity and 45% transmission over the visible wavelength spectral band) whereby a majority of the image light 6750 will be reflected toward the user's eye 6730 and a majority of light from the environment 6770 will be reflected toward the camera 6739, this system will provide a brighter displayed image, a brighter captured image with a dimmer see-through view of the environment. Alternatively, the reflectivity of the combiner 6735 can be selected to be less than 50% (e.g. 20% reflectivity and 80% transmission over the visible wavelength spectral band) whereby the majority of the image light 6750 will be transmitted by the combiner 6735 and a majority of light from the environment 6770 will be transmitted to the user's eye 6730, this system will provide a brighter see-through view of the environment, while providing a dimmer displayed image and a dimmer captured image. As such, the system can be designed to favor the anticipated use by the user.

In embodiments, the combiner 6735 is planar with an optical flatness that is sufficient to enable a sharp displayed image and a sharp captured image, such as a flatness of less than 20 waves of light within the visible wavelengths. However, in embodiments, the combiner 6735 may be curved in which case the displayed image and the captured image will both be distorted and this distortion will have to be digitally corrected by the associated image processing system. In the case of the displayed image, the image is digitally distorted by the image processing system in a direction that is opposite to the distortion that is caused by the curved combiner so the two distortions cancel one another and as a result the user sees an undistorted displayed image. In the case of the captured image, the captured image is digitally distorted after capture to cancel out the distortion caused by the curved combiner so that the image appears to be undistorted after image processing.

In embodiments, the combiner 6735 is an adjustable partial mirror in which the reflectivity can be changed by the user or automatically to better function within different environmental conditions or different use cases. The adjustable partial mirror can be an electrically controllable mirror such as for example, the e-Transflector that can be obtained from Kent Optronics (http://www.kentoptronics.com/mirror.html) where the reflectivity can be adjusted based on an applied voltage. The adjustable partial mirror can also be a fast switchable mirror (e.g. a switching time of less than 0.03 seconds) wherein the perceived transparency is derived from the duty cycle of the mirror rapidly switching between a reflecting state and a transmitting state. In embodiments, the images captured by the camera 6739 can be synchronized to occur when the fast switchable mirror is in the reflecting state to provide an increased amount of light to the camera 6739 during image capture. As such, an adjustable partial mirror allows for the transmissivity of the partial mirror to be changed corresponding to the environmental conditions, e.g. the transmissivity can be low when the environment is bright and the transmissivity can be high when the environment is dim.

In a further embodiment, the combiner 6735 includes a hot mirror coating on the side facing the camera 6739 wherein visible wavelength light is substantially transmitted while a spectral wavelength band of infrared light is substantially reflected and the camera 6739 captures images that include at least a portion of the infrared wavelength light. In these embodiments, the image light 6750 includes visible wavelength light and a portion of the visible wavelength light is transmitted by the combiner 6735, where it is then absorbed by the absorptive polarizer 6737. A portion of the scene light 6760 is comprised of visible wavelength light and this is also transmitted by the combiner 6735, to provide the user with a see-through view of the environment. The light from the environment 6770 is comprised of visible wavelength light and infrared wavelength light. A portion of the visible wavelength light along with substantially all of the infrared wavelength light within the spectral wavelength band associated with the hot mirror, is reflected by the combiner 6735 toward the camera 6739 thereby passing through the absorptive polarizer 6737. In embodiments, the camera 6739 is selected to include an image sensor that is sensitive to infrared wavelengths of light and the absorptive polarizer 6737 is selected to substantially transmit infrared wavelengths of light of both polarization states (e.g. ITOS XP44 polarizer which transmits both polarization states of light with wavelengths above 750 nm: see http://www.itos.de/english/polarisatoren/linear/linear.php) so that an increased % of infrared light is captured by the camera 6739. In these embodiments, the absorptive polarizer 6737 functions as a light trap for the escaping image light 6750 and thereby blocking the image light 6750 that is in the visible wavelengths from the camera 6739 while simultaneously acting as a window for infrared wavelength light from the environment 6770 for the camera 6739.

By coaxially aligning the camera field of view with the displayed image and the user's view of the scene, augmented reality images with improved alignment to objects in the scene can be provided. This is because the captured images from the camera provide an accurate representation of the user's perspective view of the scene. In embodiments, the camera that is coaxially aligned with the user's view captures an image of the scene, the processor then identifies an object in the captured image and identifies a field of view position for the object, which can be compared to the displayed field of view correlated position so digital content is then displayed relative to the position of the object.

Another aspect of the present disclosure relates to an optical assembly that uses a reflective display where the reflective display is illuminated with a front light arranged to direct the illumination at angles around 90 degrees from the active reflective surface of the reflective display. In embodiments, the optical configuration is light weight, small and produces a high quality image in a head-worn see-through display.

Figure 68:
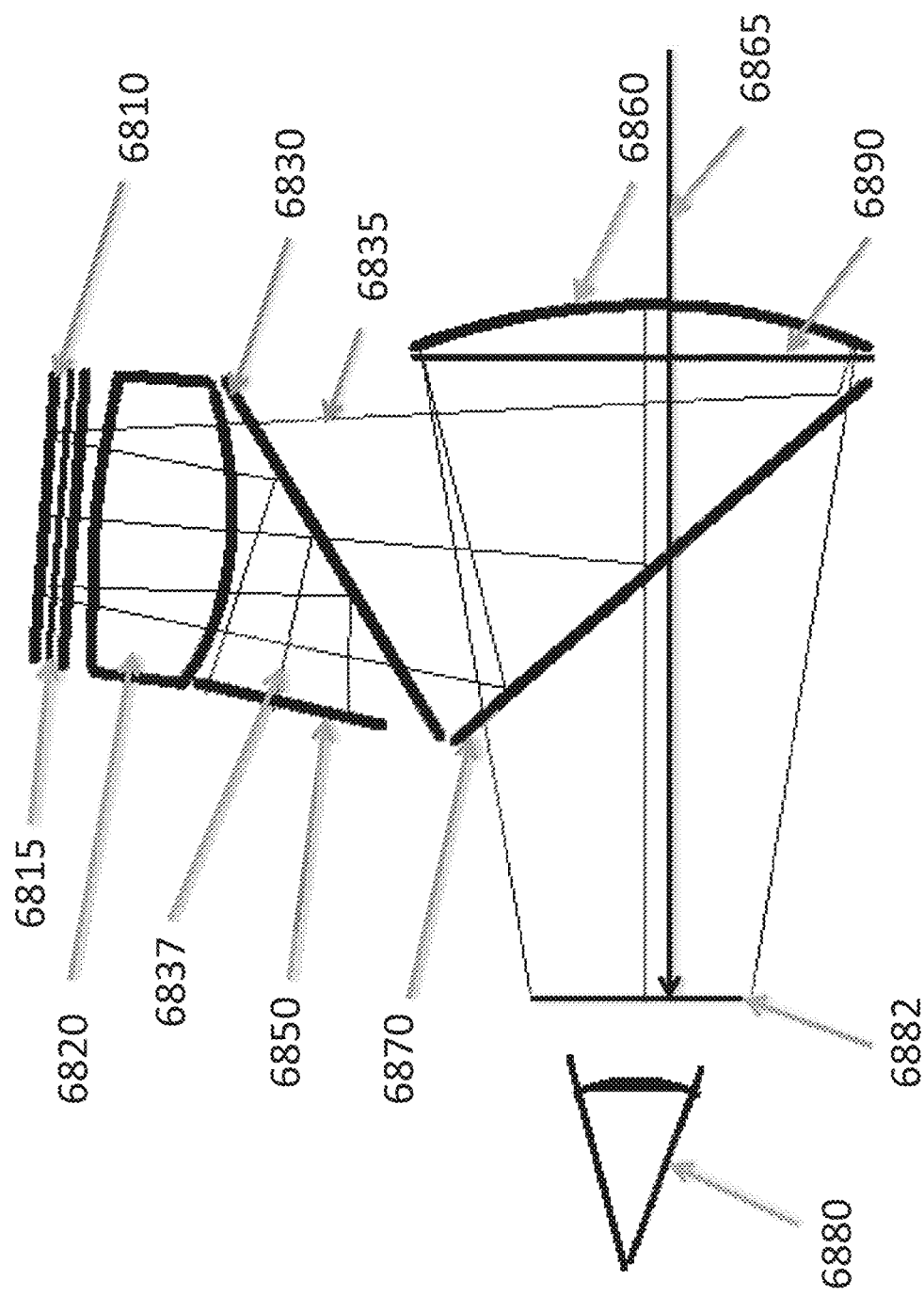
FIG. 68 illustrates an optical configuration in accordance with the principles of the present disclosure.

FIG. 68 provides a cross sectional illustration of the compact optical display assembly for a HWC 102 according to principles of the present disclosure along with illustrative light rays to show how the light passes through the assembly. The display assembly is comprised of upper optics and lower optics. The upper optics include a reflective image source 6810, a quarter wave film 6815, a field lens 6820, a reflective polarizer 6830 and a polarized light source 6850. The upper optics convert illumination light 6837 into image light 6835. The lower optics comprise a beam splitter plate 6870 and a rotationally curved partial mirror 6860. The lower optics deliver the image light to a user who is wearing the HWC 102. The compact optical display assembly provides the user with image light 6835 that conveys a displayed image along with scene light 6865 that provides a see-through view of the environment so that user sees the displayed image overlaid onto the view of the environment.

In the upper optics, linearly polarized light is provided by the polarized light source 6850. Where the polarized light source 6850 can include one or more lights such as LEDs, QLEDs, laser diodes, fluorescent lights, etc. The polarized light source 6850 can also include a backlight assembly with light scattering surfaces or diffusers to spread the light uniformly across the output area of the polarized light source. Light control films or light control structures can be included as well to control the distribution of the light (also known as the cone angle) that is provided by the polarized light source 6850. The light control films can include, for example, diffusers, elliptical diffusers, prism films and lenticular lens arrays. The light control structures can include prism arrays, lenticular lenses, cylindrical lenses, Fresnel lenses, refractive lenses, diffractive lenses or other structures that control the angular distribution of the illumination light 6837. The output surface of the polarized light source 6850 is a polarizer film to ensure that the illumination light 6837 provided to the upper optics is linearly polarized.

The illumination light 6837 provided by the polarized light source 6850 is reflected by a reflective polarizer 6830. Where the polarizer on the output surface of the polarized light source 6850 and the reflective polarizer 6830 are oriented so that their respective transmission axes are perpendicular to one another. As a result, the majority of the illumination light 6837 provided by the polarized light source 6850 is reflected by the reflective polarizer 6830. In addition, the reflective polarizer 6830 is angled so that the illumination light 6837 is reflected toward the reflective image source 6810 thereby illuminating the reflective image source 6810 as shown in FIG. 68.

The illumination light 6837 passes through a field lens 6820 and is then incident onto the reflective image source 6810. The illumination light 6837 is then reflected by the reflective image source (otherwise referred to as a reflective display herein elsewhere) 6810. Wherein the reflective image source 6810 can comprise a liquid crystal on silicon (LCOS) display, a ferroelectric liquid crystal on silicon (FLCSO) display, a reflective liquid crystal display, a cholesteric liquid crystal display, a bistable nematic liquid crystal display, or other such reflective display. The display can be a monochrome reflective display that is used with sequential red/green/blue illumination light 6837 or a full color display that is used with white illumination light 6837. The reflective image source 6810 locally changes the polarization state of the illumination light 6837 in correspondence to the pixel by pixel image content that is displayed by the reflective image source 6810 thereby forming image light 6835. Wherein if the reflective image source 6810 is a normally white display, the areas of the image light 6835 that correspond to bright areas of the image content end up with a polarization state that is opposite to the polarization state of the illumination light and dark areas of the image light 6835 end up with a polarization state that is the same as the illumination light 6837 (it should be noted that the disclosure can be used with normally black displays which provide an opposite effect on polarization in the image light). As such, the image light 6835 as initially reflected by the reflective image source 6810 has a mixed polarization state pixel by pixel. The image light 6835 then passes through the field lens 6820 which modifies the distribution of the image light 6835 while preserving the wavefront to match the requirements (such as for example, magnification and focus) of the lower optics. As the image light 6835 passes through the reflective polarizer 6830, the bright areas of the image light 6835 that have a polarization state that is opposite to the illumination light 6837 are transmitted through the reflective polarizer 6830 and the dark areas of the image light 6835 that have the same polarization state as the illumination light 6837 are reflected back toward the polarized light source 6850, as a result, the image light 6835 after passing through the reflective polarizer 6830 is linearly polarized with a single polarization state in all the pixels of the image but now with different intensities pixel by pixel. Thus the reflective polarizer 6830 acts first as a reflector for the illumination light 6837 and then second as an analyzer polarizer for the image light 6835.

As such, the optical axis of the illumination light 6837 is coincident with the optical axis of the image light 6835 between the reflective polarizer 6830 and the reflective image source 6810. The illumination light 6837 and the image light
6835 both pass through the field lens 6820, but in opposite directions. Wherein the field lens acts to expand the illumination light 6837 so it illuminates the entire active area of the reflective image source 6810 and also to expand the image light 6835 so it fills the eyebox 6882 after passing through the rest of the compact optical display system. By overlapping the portion of the compact optical display assembly associated with the illumination light 6837 with the portion of the compact optical display assembly associated with the image light 6835, the overall size of the compact optical display assembly is reduced. Given that the focal length associated with the field lens 6820 requires some space in the compact optical display assembly, the reflective polarizer 6830 and the polarized light source 6850 are located in space that would otherwise be unused so the overall size of the display assembly is more compact.

The reflective polarizer 6830 can be a relatively thin film (e.g. 80 microns) or thin plate (e.g. 0.2 mm) as shown in FIG. 68. The reflective polarizer 6830 can be a wiregrid polarizer such as is available from Asahi Kasei under the name WGF, or a multilayer dielectric film polarizer such as is available from 3M under the name DBEF. As previously described, the reflective polarizer 6830 has two functions. First, the reflective polarizer 6830 reflects the illumination light 6837 provided by the polarized light source 6850 and redirects the illumination light 6837 toward the reflective image source 6810. Second, the reflective polarizer 6830 acts as an analyzer polarizer to the image light 6835 thereby converting the mixed polarization state of the image light 6835 above the reflective polarizer 6830 to linearly polarized light with a single polarization state below the reflective polarizer 6830. While the illumination light 6837 incident on the reflective polarizer 6830 is incident on a relatively small portion of the reflective polarizer 6830, the image light 6835 is incident on the majority of the area of the reflective polarizer 6830. Consequently, the reflective polarizer 6830 extends at least across the entire area of the field lens 6820 and may extend across the entire area between the field lens 6820 and the beam splitter 6870 as shown in FIG. 68. In addition, the reflective polarizer 6830 is angled at least in the portion where the illumination light 6837 is incident to redirect the illumination light 6837 toward the reflective image source 6810. However, since reflective polarizers (such as a wiregrid polarizer) can be relatively insensitive to the incident angle, in a preferred embodiment, the reflective polarizer 6830 is a flat surface angled to redirect the illumination light 6837 toward the reflective image source 6810 wherein the flat surface extends substantially across the entire area between the field lens 6820 and the beam splitter 6870 in one continuously flat surface to make manufacturing easier. The thin film or thin plate of the reflective polarizer 6870 can be retained at the edges to position it at the desired angle and to make the surface flat.

The systems and methods described herein with respect to FIGS. 68 through 71 have a number of advantages. By avoiding grazing angles of the illumination light 6837 and the image light 6835 at all the surfaces in the compact optical display assembly, scattering of light in the assembly is reduced and as a result the contrast of the image presented to the user's eye 6880 is higher with blacker blacks. In addition, the reflective image source 6810 can include a compensating retarder film 6815 as is known to those skilled in the art, to enable the reflective image source 6810 to provide a higher contrast image with more uniform contrast over the area of the displayed image. Further, by providing an optical display assembly that is largely comprised of air, the weight of the compact optical display assembly is substantially reduced. By using coincident optical axes for the illumination light 6837 and the image light 6835 and overlapping the illumination light 6837 and image light 6835 for a substantial portion of the optical display assembly, the overall size of the compact optical display assembly is reduced. Where the coincident optical axes are provided by passing the illumination light 6837 and the image light 6835 in opposite directions through the field lens 6820. To maintain a uniform polarization state for the illumination light 6837, the field lens 6820 is made from a low birefringence material such as glass or a plastic such as OKP4 as available from Osaka Gas Chemicals. By positioning the polarized light source 6850 and the associated illumination light 6837 below the field lens 6820, and by folding the optical path of both the illumination light 6837 at the reflective polarizer 6830 and the image light 6835 at the beam splitter 6870, the overall height of the compact optical display assembly is greatly reduced. For example the overall height of the compact optical display assembly can be less than 24 mm as measured from the reflective image source 6810 to the bottom edge of the rotationally curved partial mirror 6860 for a display that provides a 30 degree diagonal field of view with a 6×10 mm eyebox.

In a preferred case, the light control structure in the polarized light source 6850 includes a positive lens, such as for example a positive Fresnel lens, a positive diffractive lens or a positive refractive lens. Wherein a positive Fresnel lens or a positive diffractive lens is preferred because they can be very thin. The illumination light 6837 is thereby focused to form a smaller area or pupil at the reflective polarizer 6830 that has a direct relationship to the area of an eyebox 6882 at the other end of the optics wherein image light 6835 is provided to the user's eye 6880 as shown in FIG. 68. Where the positive lens concentrates the illumination light 6837 from the polarized light source 6850 both in terms of intensity and angular distribution to match the etendue of the optical system and thereby fills the eyebox with image light 6835. By using the positive lens to converge the light from the polarized light source 6850 as provided to the reflective polarizer 6830 and then using the field lens 6820 to expand the illumination light 6837 to illuminate the active area of the reflective image source 6810, efficiency is improved since illumination light 6837 is substantially delivered only where needed to form image light 6835. Further, illumination light 6837 outside the pupil can be controlled by the positive lens and clipped by masked edges of the positive lens. By focusing the illumination light 6837 and clipping light outside the pupil, illumination light 6837 is prevented from impinging adjacent surfaces at grazing angles in the compact optical display assembly to reduce scattering of light and thereby increase contrast in the image provided to the user's eye 6880 by providing blacker blacks.

Figure 69:
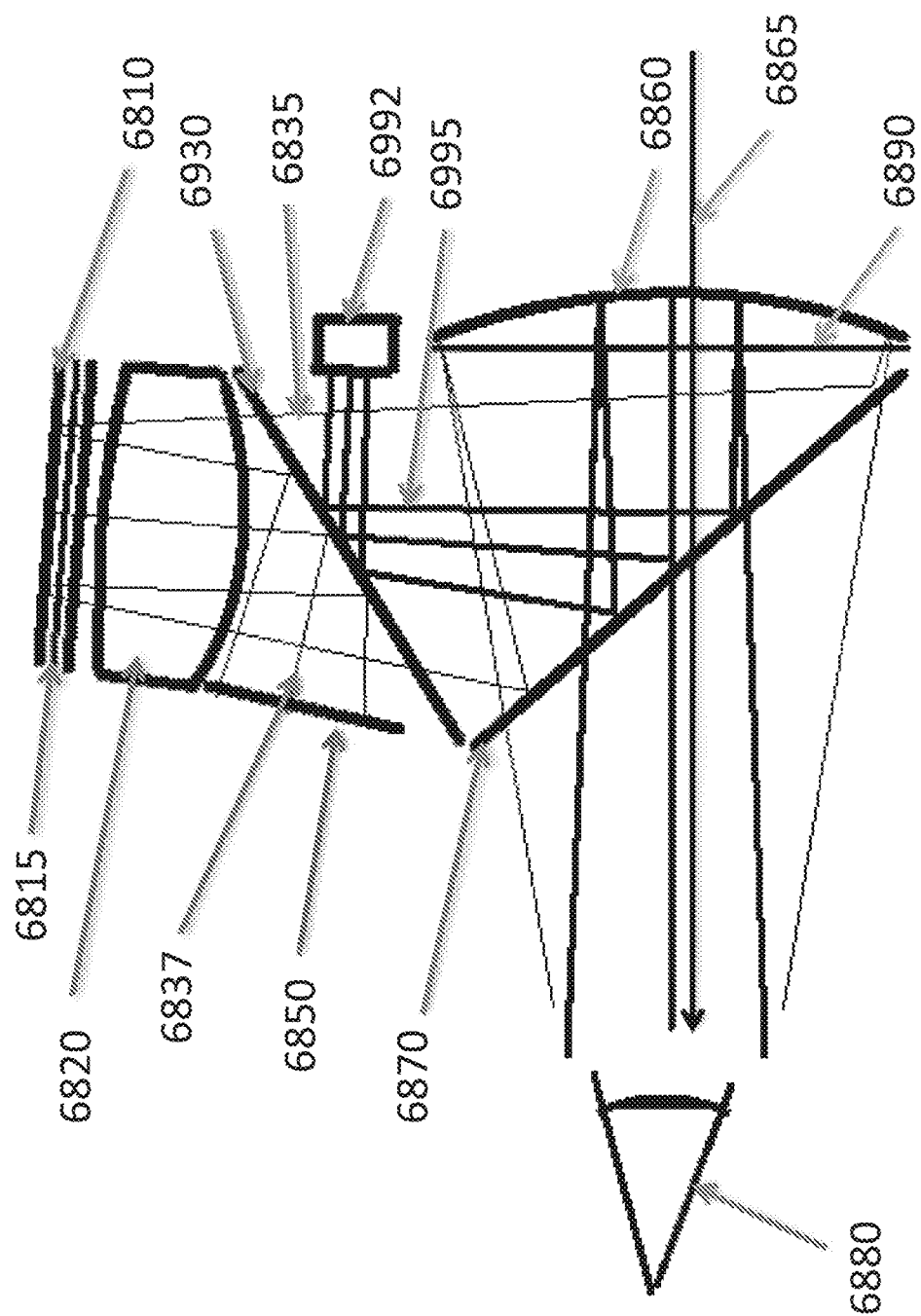
FIG. 69 illustrates an optical configuration in accordance with the principles of the present disclosure.
Figure 70:
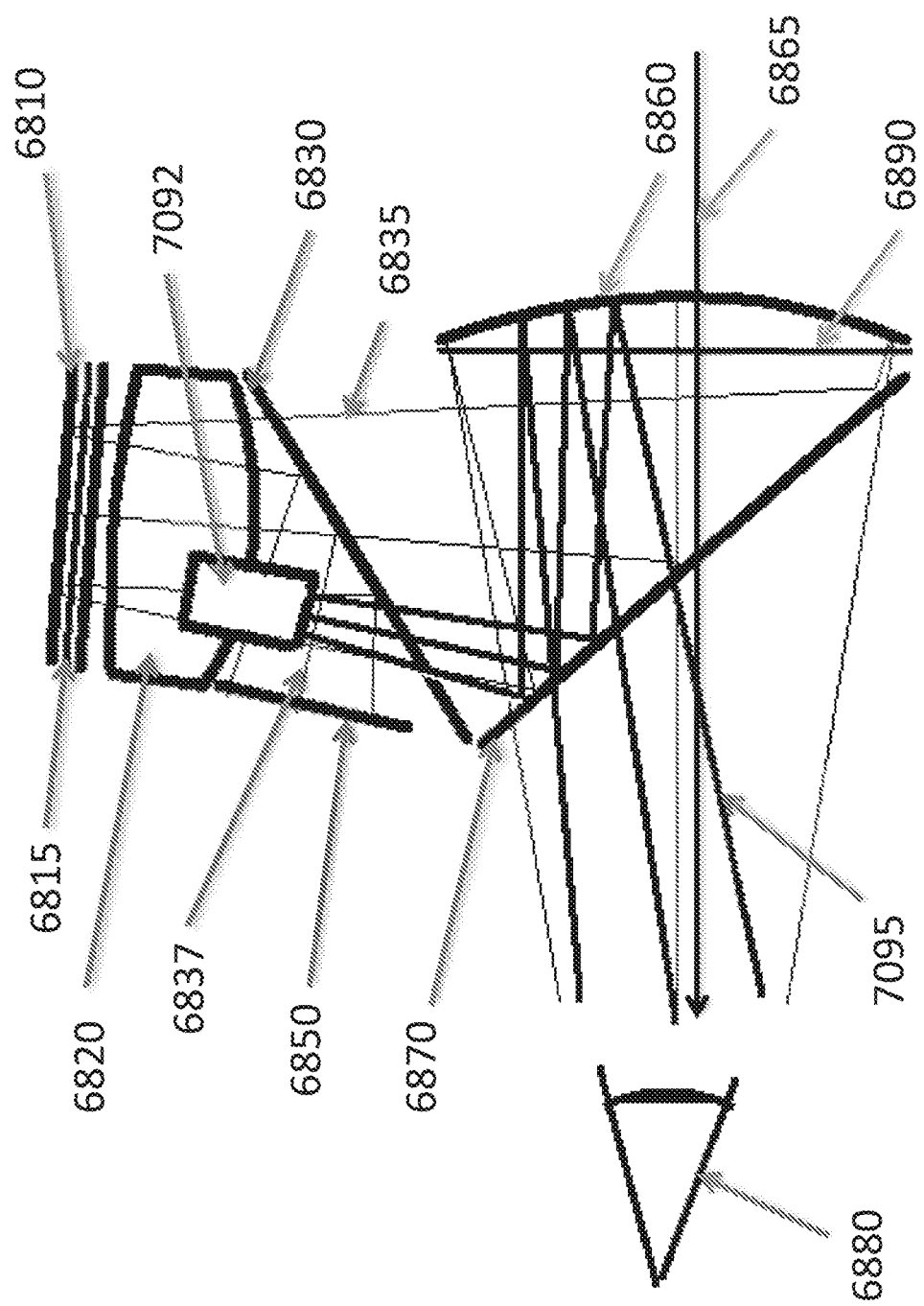
FIG. 70 illustrates an optical configuration in accordance with the principles of the present disclosure.

It should be noted that while FIGS. 68, 69 and 70 show optical layouts wherein the illumination light 6837 is provided from behind the rotationally curved partial mirror 6860, other optical layouts are possible within the disclosure. The location of the polarized light source 6850 can be changed for example to be at the side of the rotationally curved partial mirror 6860 wherein the reflective polarizer 6830 is oriented to receive the illumination light 6837 from the side. And reflect it toward the reflective image source 6810 (not shown).

In a further embodiment, the portion of the image light 6835 that is reflected back toward the polarized light source 6850 is recycled in the polarized light source 6850 to increase the efficiency of the polarized light source 6850. In this case, a diffuser and a reflective surface is provided behind the polarized light source 6850 so the polarization of the light is scrambled and reflected back toward the reflective polarizer 6830.

In yet another embodiment, another reflective polarizer is provided in the polarized light source 6850 and behind the linear polarizer previously disclosed. Wherein the respective transmission axes of the reflective polarizer and the linear polarizer are parallel to one another. The other reflective polarizer then reflects the light back into the backlight that has the polarization state that would not be transmitted by the linear polarizer. The light that is reflected back into the backlight passes through diffusers associated with the polarized light source 6850 where the polarization state is scrambled and reemitted thereby recycling the light and increasing efficiency.

In another embodiment, the system according to the principles of the present disclosure includes an eye imaging system. FIG. 69 is an illustration of a compact optical display assembly, which includes an eye imaging camera 6992 that captures an image of the user's eye 6880 that is coaxial with the displayed image provided to the user so that a full image of the user's iris can be reliably captured. The eye imaging camera 6992 is reflected into the lower optics by a reflective polarizer 6930 that includes a notch mirror coating, facing the eye imaging camera 6992, that reflects the wavelengths of light that are captured by the eye imaging camera 6992 (e.g. near infrared wavelengths) while transmitting wavelengths associated with the image light 6835 (e.g. visible wavelengths). Eye light rays 6995 shown in FIG. 69 illustrate how the field of view associated with the eye imaging camera 6992 is a relatively narrow field of view because it is multiply reflected through the lower optics to capture an image of the user's eye 6880. However, to enable the eye imaging camera 6992 to focus onto the user's eye 6880, the eye imaging camera 6992 needs to have a very near focus distance (e.g. 35 mm). In addition, the field of view and focus distance of the eye imaging camera must take into account the reducing effect of the optical power provided by the rotationally curved partial mirror 6860. To increase the efficiency of capturing the light reflected from the user's eye 6880 and thereby enable a brighter image of the eye, the rotationally curved partial mirror 6860 can be coated with a partial mirror coating that acts as a full mirror in the wavelengths being captured by the eye imaging camera 6992, for example the coating can reflect 50% of visible light associated with the image light and 90% of near infrared light associated with the eye light 6995. Where the reflections and associated changes in polarization state are similar to those associated with the image light 6835 but in the opposite order since the eye light rays 6995 are coming from the user's eye 6880. LEDs or other miniature lights are provided adjacent to the user's eye 6880 to illuminate the user's eye 6880 wherein the wavelengths associated with the LED's or other miniature lights are different than the wavelengths associated with the image light 6835 such as for example near infrared wavelengths (e.g. 850 nm, 940 nm or 1050 nm). Alternatively, the image light 6835 is used to illuminate the user's eye 6880 and a reflective polarizer 6930 with a low extinction ratio in reflection (e.g. reflective extinction ratio <15) is used so that some of the eye light rays are reflected toward the eye imaging camera 6992.

In an alternative embodiment, the reflective and partially reflective surfaces can extend laterally to the sides of the areas used for displaying an image to the user. In this case, the eye imaging camera can be located adjacent to the field lens and pointed in a direction to image the user's eye after reflecting from the beam splitter and the rotationally curved partial mirror as shown in FIG. 70. Where FIG. 70 is an illustration that shows an eye imaging camera 7092 positioned to the side of the field lens 6820 and reflective polarizer 6830. The eye imaging camera 7092 is pointed such that the field of view captured by the eye imaging camera 7092 includes the user's eye 6880 as illustrated by the eye light rays 7095. The quarter wave film 6890 is also extended laterally to change the polarization state of the eye light 7095 in the same way that the polarization state of the image light is changed so that the eye light passes through the beam splitter 6870 and quarter wave 6890, is partially reflected by the rotationally curved partial mirror 6860 and is then reflected by the beam splitter 6870 and is then captured by the eye imaging camera 7092. By positioning the eye imaging camera 7092 to the side of the field lens 6820 and reflective polarizer 6830, the complexity of the optics associated with displaying an image to the user is reduced. In addition, the space available for the eye imaging camera 7092 is increased since interferences with the display optics are reduced. By positioning the eye imaging camera 7092 adjacent to the display optics, the eye image is captured nearly coaxially with the displayed image.

Figure 71:
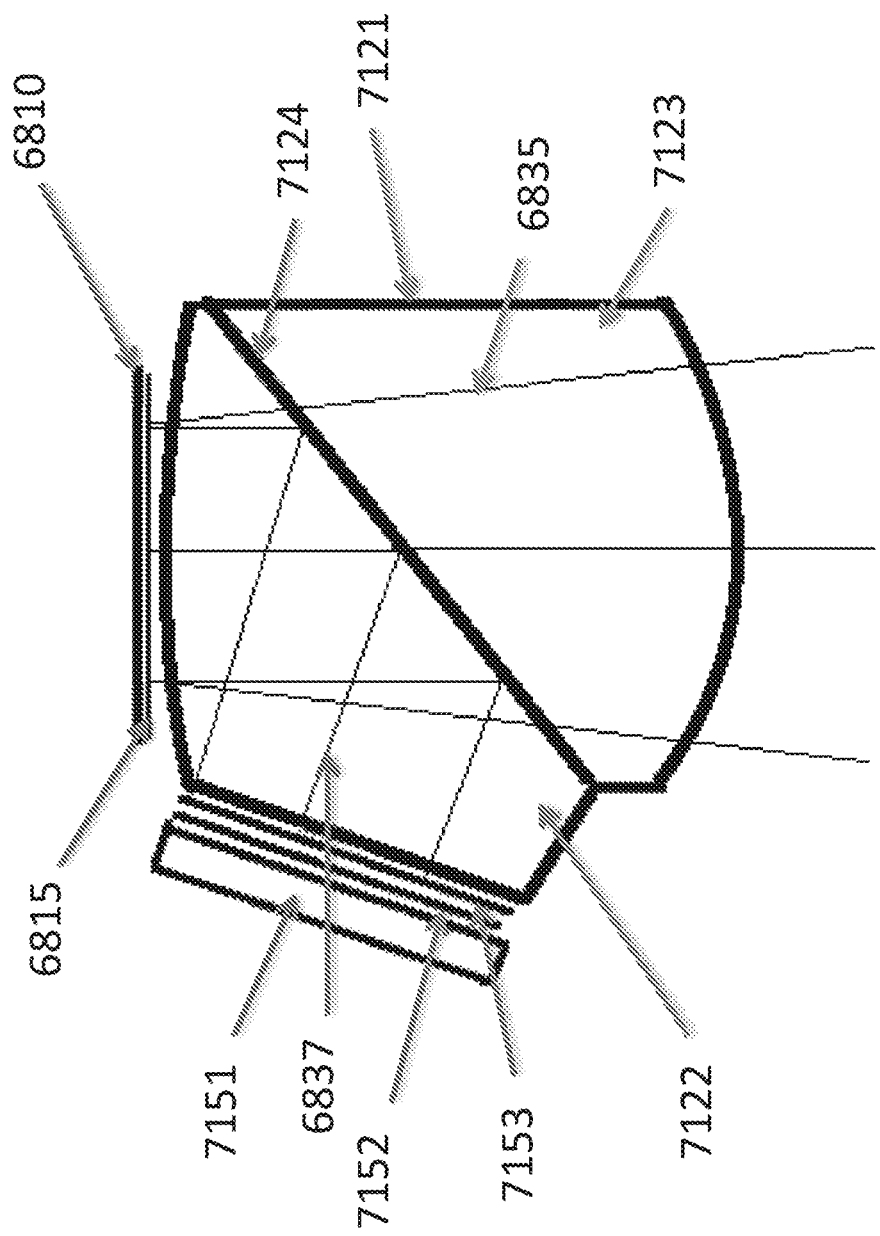
FIG. 71 illustrates an optical configuration in accordance with the principles of the present disclosure.

In a yet another embodiment, the systems according to the principles of the present disclosure include a field lens with an internal reflective polarizer and one or more surfaces with optical power. FIG. 71 is an illustration of the upper optics including a field lens 7121 comprised of upper prism 7122 and lower prism 7123. The upper prism 7122 and the lower prism 7123 can be molded to shape or grind and polished. A reflective polarizer 7124 is interposed on the flat surface between the upper prism 7122 and the lower prism 7123. The reflective polarizer 7124 can be a wiregrid polarizer film or a multilayer dielectric polarizer as previously mentioned. The reflective polarizer 7124 can be bonded into place with a transparent UV curable adhesive that has the same refractive index as the upper prism 7122 or the lower prism 7123. Typically the upper prism 7122 and the lower prism 7123 would have the same refractive index. Wherein upper prism 7122 includes an angled surface for illumination light 6837 to be provided to illuminate the reflective image source 6810. The illumination light is provided by a light source that includes lights such as LEDs, a backlight 7151, a diffuser 7152 and a polarizer 7153 as has been previously described. The lower prism 7123 includes a curved surface on the exit surface for controlling the wavefront of the image light 6835 as supplied to the lower optics. The upper prism may also include a curved surface on the upper surface next to the reflective image source 6810 as shown in FIG. 71 for manipulating the chief ray angles of the light at the surface of the reflective image source 6810. Illumination light 6837 is polarized by the polarizer 7153 prior to entering the upper prism 7122. The transmission axes of the polarizer 7153 and the reflective polarizer 7124 are perpendicular to one another so that the illumination light 6837 is reflected by the reflective polarizer 7124 so that the illumination light is redirected toward the reflective image source 6810. The polarization state of the illumination light 6837 is then changed by the reflective image source 6810 in correspondence with the image content to be displayed as previously described and the resulting image light 6835 then passes through the reflective polarizer 7124 to form the bright and dark areas associated with the image that is displayed to the user's eye 6880.

In another embodiment, the field lens 7121 of FIG. 71 comprises a polarizing beam splitter cube including two prisms, upper prism 7122 and lower prism 7123. In this case, the reflective polarizer 7124 is replaced by a coating that is polarization sensitive so that light of one polarization state (typically S polarized light for example) is reflected and light of the other polarization state is transmitted. The illumination light 6837 is then provided with the polarization state that is reflected by the coating and the image light is provided with the polarization state that is transmitted by the coating. As shown in FIG. 71, the beam splitter cube includes one or more curved surfaces in the upper prism 7122 or the lower prism 7123. The beam splitter cube can also include one or more angled surfaces where the illumination light is supplied. The angled surface can include light control structures such as a microlens array to improve the uniformity of the illumination light 6837, or a lenticular array to collimate the illumination light 6837.

In yet another embodiment, the curved surface(s) or the angled surface(s) illustrated in FIG. 71 can be molded onto a rectangularly shaped beam splitter cube by casting a UV curable material (e.g. UV curable acrylic) onto a flat surface of a beam splitter cube, placing a transparent mold with a cavity that has the desired curve onto the flat surface to force the UV curable material into the desired curve and applying UV light to cure the UV curable material. The beam splitter cube can be made of a material that has the same or different refractive index than the UV curable material.

In a further embodiment, polarization sensitive reflective coatings such as dielectric partial mirror coatings, can be used in place of reflective polarizers or beam splitters as shown in FIG. 68. In this case, the reflective films and plates that comprise the reflective polarizers 6830 and beam splitters 6870 include polarization sensitive coatings that substantially reflect light with one polarization state (e.g. S polarization) while substantially transmitting light with the other polarization state (e.g. P polarization). Since the illumination light source includes a polarizer 7153, the illumination light 6837 is one polarization state and it is not important that the reflective polarizer 7124 be sensitive to the polarization state in reflection, the polarization state just needs to be maintained and presented uniformly over the surface of the reflective image source 6810. However, it is important that the reflective polarizer 7124 be highly sensitive to polarization state in transmission (e.g. extinction ratio >200) to be an effective polarizer analyzer and to provide a high contrast image (e.g. contrast ratio >200) to the user's eye 6880.

In a further embodiment, the field lens 7121 shown in FIG. 71 can comprise a reflective polarizer 7124 with a curved surface (not shown) instead of a flat surface and wherein the reflective polarizer 7124 is not a film and instead is a polarization sensitive coating, a printed wiregrid polarizer or a molded wiregrid pattern that is then metallized. In this case, the upper prism 7122 and the lower prism 7123 are made as a matched pair with mating curved surfaces that together form the surface of the reflective polarizer. Wherein the polarization sensitive coating, the printed wiregrid or the molded wiregrid pattern are applied to the mating curved surface associated either the upper prism 7122 or the lower prism 7123 and a transparent adhesive is applied to the other mating surface to bond the upper prism 7122 and lower prism 7123 together to form the field lens 7121 with an internal curved reflective polarizer 7121.

Another aspect of the present disclosure relates to manufacturing and providing an optical element for use in a see-through computer display system. In embodiments, a lightweight low-cost and high optical quality optical element.

In a head mounted display, a beam splitter can be used to direct illuminating light from a light source toward a reflective image source such as an LCOS or a DLP. Where it is desirable to have a low weight beam splitter with a flat partially reflective surface to provide good image quality. The flat partially reflective surface is particularly important when an eye camera is provided for eye imaging that utilizes the flat partially reflective surface for directing the field of view of the eye camera toward the user's eye.

Systems and methods provide for a lightweight beam splitter comprised of molded plastic elements and an internal plate element to provide a flat partially reflective surface. Together the pieces form a triplet beam splitter optic including two molded elements and a plate element. By providing the plate element internal to the beam splitter, the matching surfaces of the molded elements do not have to be optically flat, instead the plate element provides the flat surface and an index matching material is used to join the plate element to the molded elements. All three elements can be plastic elements to reduce the weight and cost of the lightweight beam splitter. To provide a more uniform refractive effect, the molded elements and the plate element are preferentially made from plastic materials with similar refractive index and have low birefringence.

Figure 72:
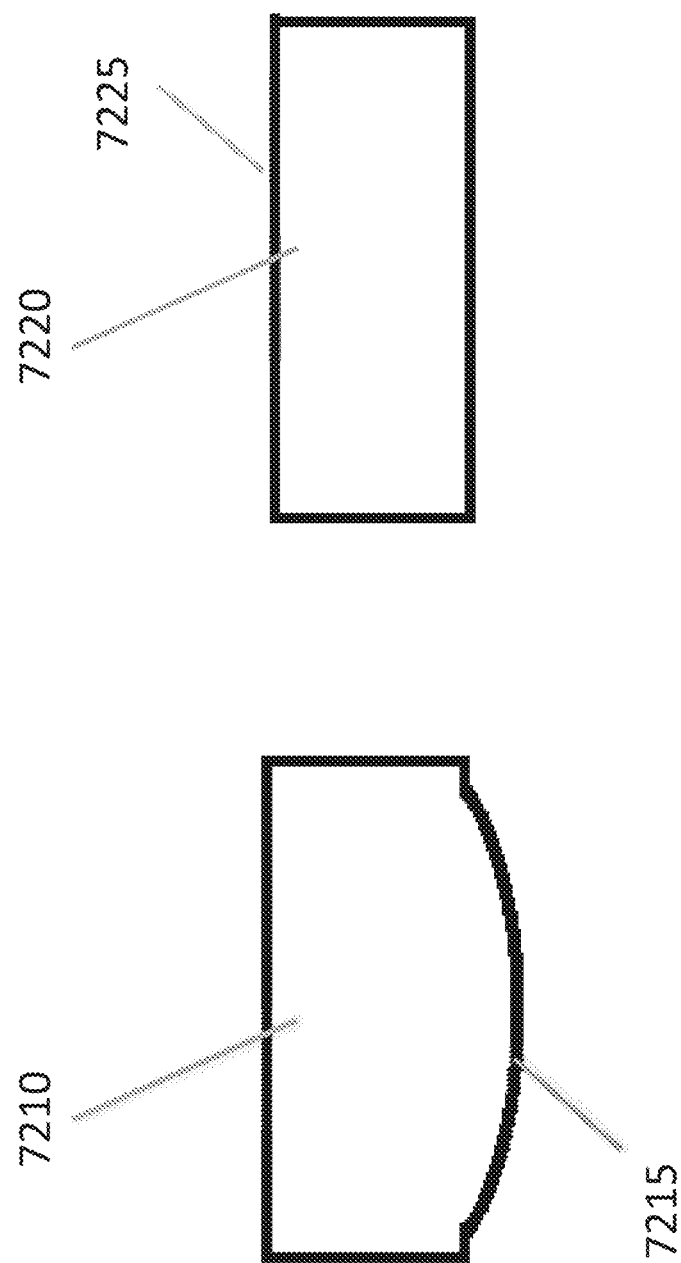
FIG. 72 illustrates an optical element in accordance with the principles of the present disclosure.

FIG. 72 shows an illustration of the two molded elements 7210 and 7220. These molded elements are molded with a relatively uniform thickness to provide uniform flow of the plastic material during molding (either injection molding, compression molding or casting) and thereby enable a low birefringence in the elements as molded. To further reduce birefringence in the molded elements as molded, materials with low viscosity and low stress optic coefficients are preferred including: OKP4 from Osaka Gas Company; Zeonex F52R, K26R or 350R from Zeon Chemical; PanLite SP3810 from Teijin.

The molded elements 7210 and 7220 can include flat surfaces and surfaces with optical power, where the surfaces with optical power can include spherical or aspheric curved surfaces, diffractive surfaces or Fresnel surfaces. Flat surfaces, diffractive surfaces or Fresnel surfaces are preferred on the surfaces associated with light that illuminates the image source and flat surfaces, spherical surfaces or aspheric surfaces are preferred on the surfaces associated with image light. Molded element 7210 is shown with a spherical or aspheric surface 7215 and molded element 7220 is shown with a flat surface 7225, however, any of the surfaces shown can be molded as flat surfaces or surfaces with optical power.

Figure 73:
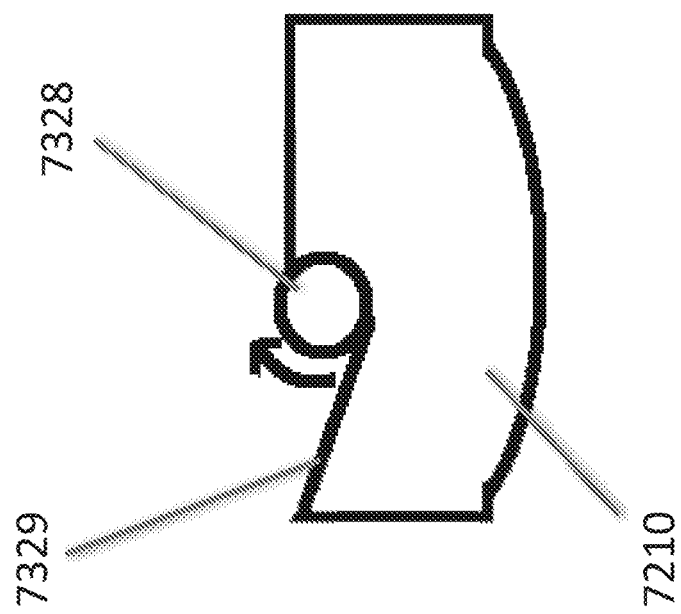
FIG. 73 illustrates an optical element in accordance with the principles of the present disclosure.

After molding the molded elements 7210 and 7220 are machined to provide matching angled surfaces. Molded element 7210 is shown in FIG. 73 where a milling cutter 7328 is shown machining angled surface 7329. FIG. 74 shows an illustration of molded elements 7210 and 7220 after they have been machined to respectively provide beam splitter elements 7430 and 7440 that are prisms. The angled surface of beam splitter elements 7430 and 7440 are machined to have matching angles. Alternatively, beam splitter elements 7430 and 7440 can be machined from sheet material or molded pucks. In either case of using machined angled surfaces or molded angled surface in the beam splitter elements, the surfaces will not be optically flat.

Figure 75:
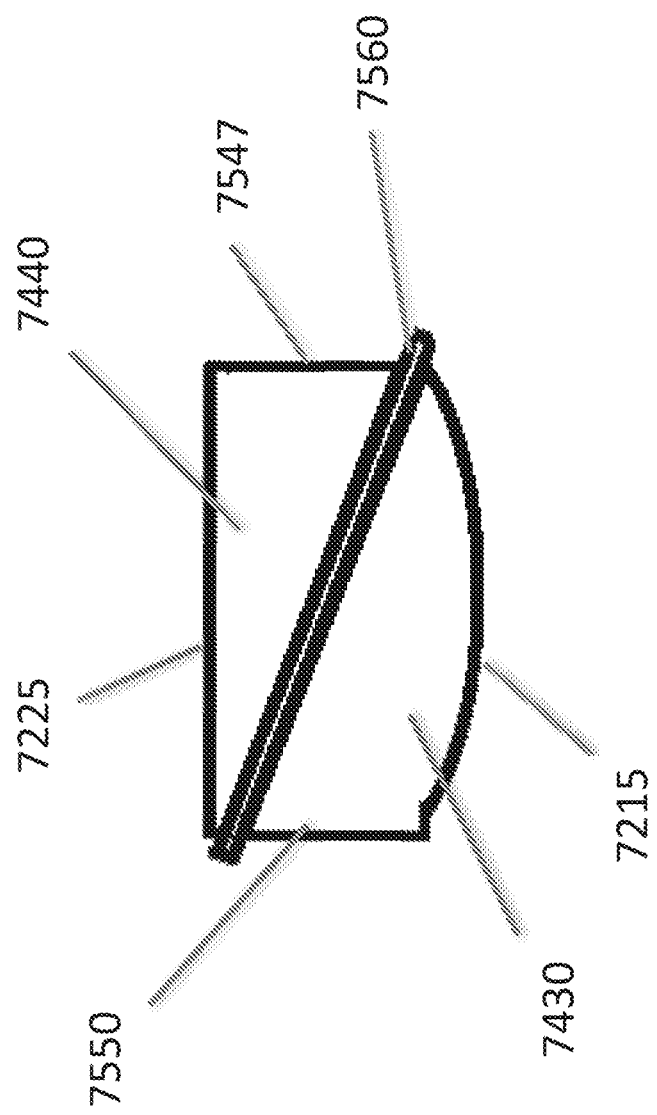
FIG. 75 illustrates an optical element in accordance with the principles of the present disclosure.

FIG. 75 shows an illustration of the assembled triplet beam splitter optic, wherein the beam splitter elements 7430 and 7440 have been assembled with a partially reflecting plate element 7560 to form a beam splitter cube. Wherein the beam splitter elements 7430 and 7440 are made from either the same material or different materials that have a very similar refractive index (e.g. within 0.05 of each other). An index matching material is used at the interfaces between the beam splitter elements and the plate element. The index matching material can be a fluid, a light curing adhesive, a moisture curing adhesive or a thermally curing adhesive. The index matching material should have a refractive index that is very similar to that of the beam splitter elements (e.g. within 0.1).

The partially reflective plate element 7560 can be a transparent plate with a partially reflective layer that is either a partially reflective coating or a laminated partially reflective film. The transparent plate is preferably a cast sheet such as cell cast acrylic that has low birefringence, or a molded plaque of a low birefringence material such as OKP4, Zeonex F52R, Zeonex K26R, Zeonex 350R or PanLite SP3810. In addition, the transparent plate should be optically flat (e.g. within 20 microns over the surface and with a surface finish of less than 15 nanometers), however optically flat surfaces are easily obtained in sheet stock. By using an index matching material at the interfaces between the beam splitter elements 7430 and 7440 and the partially reflective plate element 7560, the lack of optical flatness of the surface of the beam splitter elements 7430 and 7440 can be filled by the index matching material so that the flatness of the reflective surface is determined by the flatness of the more easily obtained partially reflective plate element 7560 thereby providing a manufacturing advantage. The partially reflective layer can be a partial mirror, a reflective polarizer or a wiregrid polarizer where the reflective polarizer can be a coating or a film and the wiregrid polarizer can be a film or a molded structure that is partially coated with a conductive layer. Where a suitable reflective polarizer film can be obtained from 3M available under the trade name of DBEFQ and a wiregrid polarizer film can be obtained from Asahi-Kasei available under the trade name of WGF. In a preferred embodiment, the transparent plate of the partially reflective plate element 7560 has a refractive index that is very similar (e.g. within 0.1) to the refractive indices of the beam splitter elements 7430 and 7440

Figure 76:
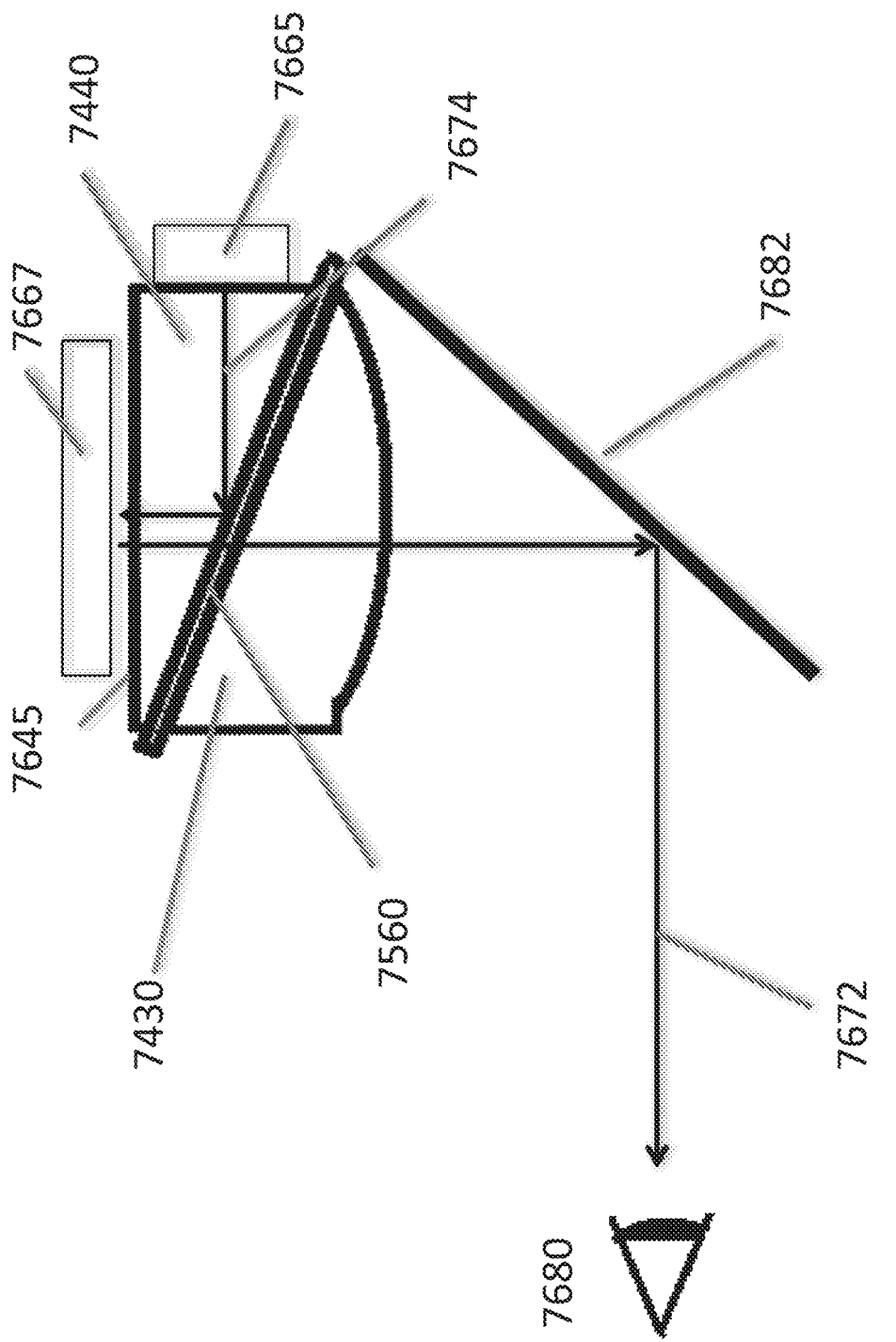
FIG. 76 illustrates an optical element in a see-through computer display in accordance with the principles of the present disclosure.

FIG. 76 shows an illustration of an optical system for a head mounted display system. The system includes a reflective display as an image source 7667, a light source 7665 that can be a white light source or a sequential color light source as appropriate for the image source 7665. Wherein the light source 7665 provides illumination light 7674 that can be polarized light provided that a quarter wave layer is associated with the image source 7667 or the partially reflecting plate element 7560 so that the polarization of the illumination light 7674 is changed before becoming image light 7672. The illumination light 7674 is reflected by a surface of the partially reflecting plate element 7560, and then reflected by the image source 7667, whereupon it passes through the partially reflective plate element 7560 thereby becoming image light 7672. The image light 7672 is then reflected by a partially reflective combiner 7682 so that the image light is directed toward the user's eye 7680 to display an image to the user while simultaneously providing a see-through view of the environment. In the optical system, an index matching material can be used at the interface between the image source 7665 and the beam splitter element 7440 sop that the surface of the beam splitter element 7440 does not have to be flat. It is contemplated by the current disclosures that the optical system may include additional lenses and other optical structures that are not shown to improve the image quality or change the form factor of the optical system.

In another embodiment, beam splitter elements 7430 and 7440 are molded directly to shape using injection molding or casting. The molded beam splitter elements are then assembled as shown in FIG. 75 as described previously herein.

Figure 77:
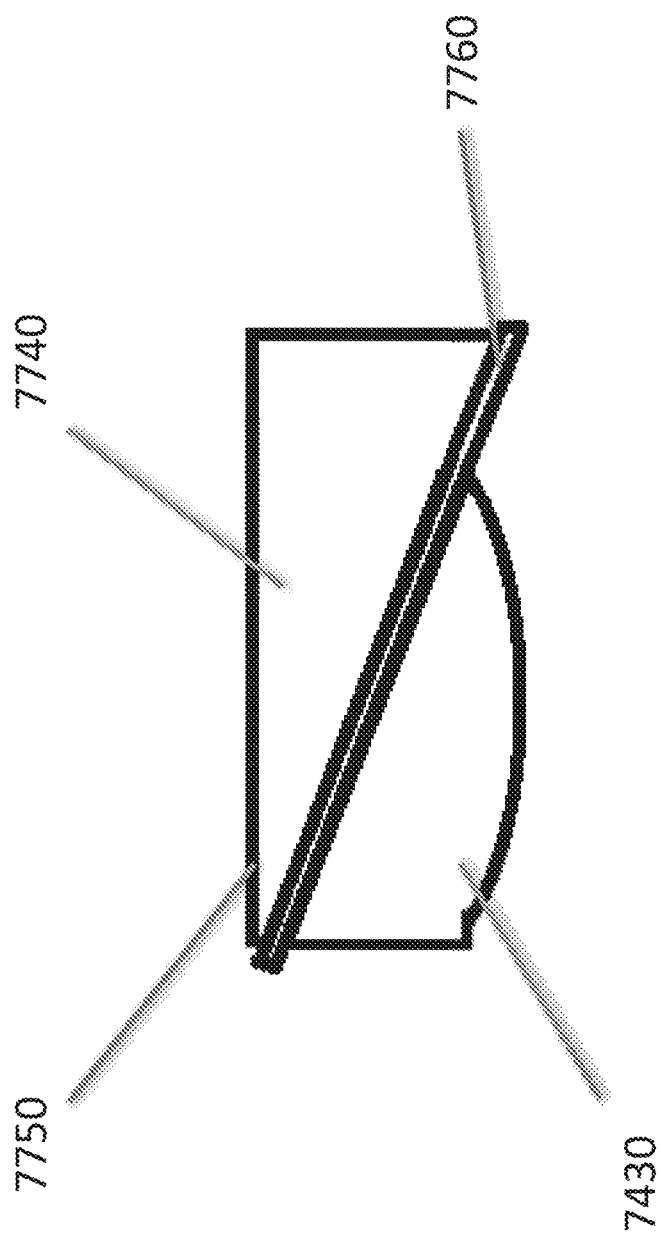
FIG. 77 illustrates an optical element in accordance with the principles of the present disclosure.
Figure 78:
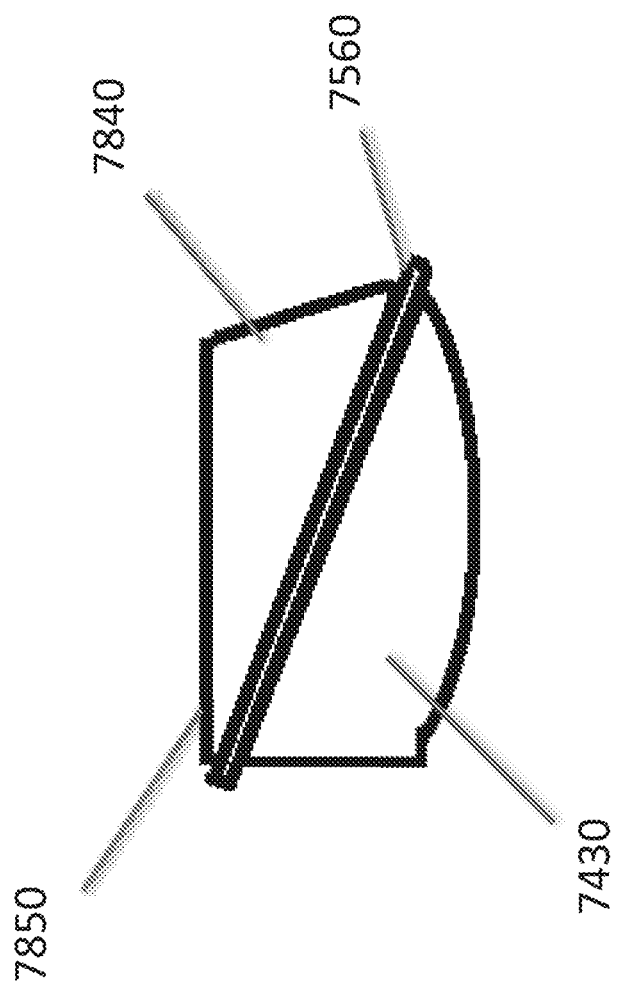
FIG. 78 illustrates an optical element in accordance with the principles of the present disclosure.

In further embodiments, surfaces of the beam splitter elements are molded or machined to have additional structures to provide further features. FIG. 77 shows an illustration of lightweight beam splitter 7750 that includes an extended partially reflective plate element 7760 and an extended beam splitter element 7740, wherein the partially reflective surface is extended to provide additional area for the illumination light 7674 to be reflected toward the image source 7665. Where having an extended partially reflective surface is particularly useful when the image source 7665 is a DLP and the illumination light 7665 must be delivered at an oblique angle. FIG. 78 shows a lightweight beam splitter 7850 that includes an entrance surface 7840 for the illumination light 7674 that is angled so the illumination light 7674 passes substantially perpendicularly through the entrance surface 7840.

In yet further embodiments, beam splitter element elements 7430 and 7440 are machined from a single molded element. Where the single molded element is designed to provide the desired optical surfaces. For example, the molded element 7210 as shown in FIG. 72 has surfaces that could be used for both surface 7215 and 7225. A series of molded elements 7210 could then be molded and some would be used to make machined beam splitter elements 7430 and some for beam splitter elements 7440. A partially reflective plate element 7560 would then be bonded with the beam splitter element 7430 and 7440 using index-matched adhesive as previously described herein. Alternatively, the single molded element 7210 could be designed with extra thickness across the dimension where the partially reflective plate element 7560 will be added, so that a single molded element 7210 could be sawn, machined or laser cut into beam splitter elements 7430 and 7440.

In another embodiment, a first molded optical element is molded in a geometry that enables improved optical characteristics including: low birefringence; more accurate replication of the optical surfaces of the mold (reduced power and irregularity deviation). The first molded optical element is then cut to a different shape wherein the cutting process leaves an optically rough surface finish. A second optical element with an optically smooth surface is then bonded to the optically rough surface of the first molded optical element using an index matched adhesive to provide a combined optical element. The index matched adhesive fills in the optically rough surface on the first molded optical element so that the optically rough surface is no longer visible and an optically smooth surface is provided in the combined optical element by the second optical element. The optical characteristics of the combined optical element are improved as compared to a directly molded optical element that has the geometry of the combined optical element. The cut surface can be flat or curved, as long as the cut surface of the first molded optical element is substantially similar to the bonding surface of the second optical element. In addition, both the first molded optical element and the second optical element can provide optical surface with independent optical features such as optical power, wedge, diffraction, grating, dispersion, filtering and reflection. For example, optically flat surfaces can be difficult to mold on plastic lenses. A lens can be molded to provide a spherically curved surface and another surface that is subsequently milled off to provide a flat surface with a rough surface finish. An optically flat sheet can then be bonded to the milled surface using an index matched adhesive to provide a combined optical element with an optically flat surface.

In yet further embodiments, surfaces of the beam splitter elements include molded or machined structures to collimate, converge, diverge, diffuse, partially absorb, redirect or polarize the illumination light 7674 or the image light 7672. In this way, the number of parts in the lightweight beam splitter is reduced and the cost and manufacturing complexity is reduced.

The multi-piece lightweight solid optic has been described in connection with certain embodiments; it should be understood that the multi-piece lightweight solid optic may be used in connection with other optical arrangements (e.g. other see-through head-worn display optical configuration described herein elsewhere).

In embodiments, the disclosure provides methods for aligning images, along with methods and apparatus for controlling light within the optics of the display assembly associated with a HMD to prevent scattering and also to trap excess light to thereby improve the image quality provided to the user.

Figure 79A:
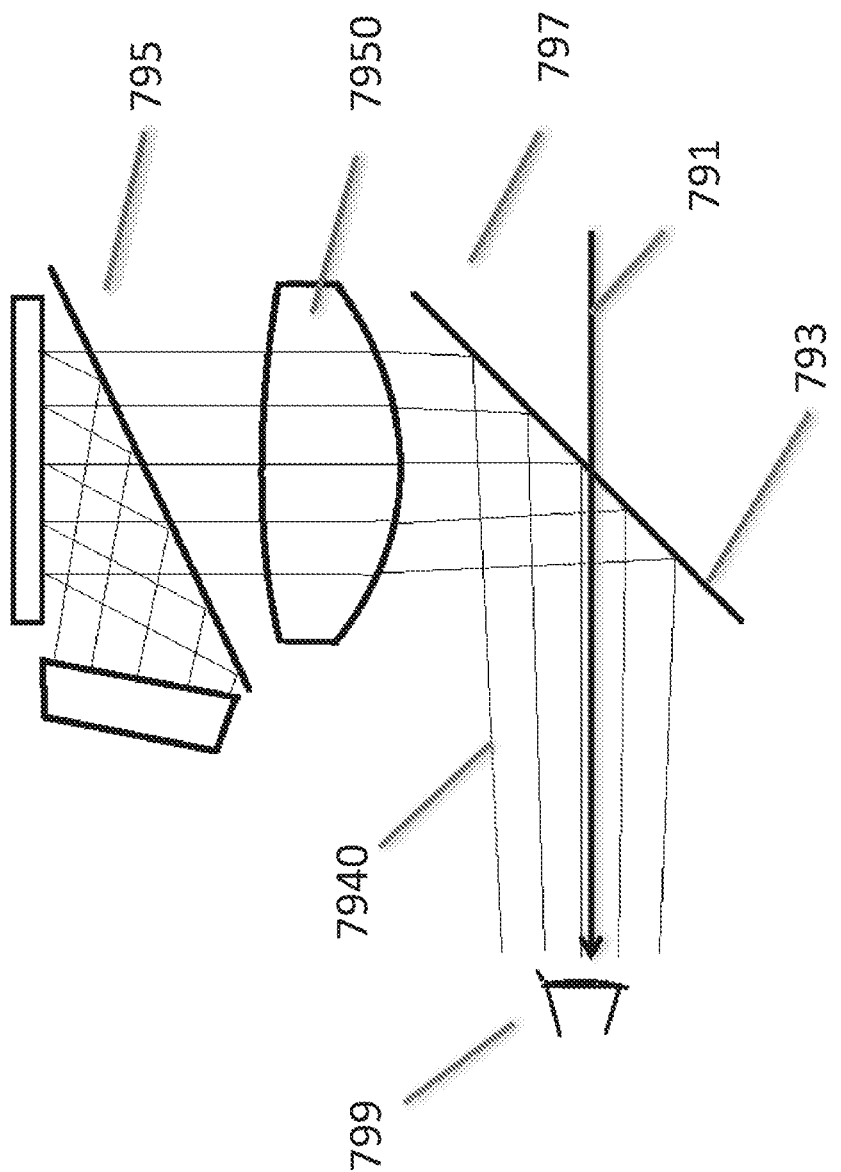
FIG. 79a illustrates a schematic of an upper optic in accordance with the principles of the present disclosure.

FIG. 79a is a schematic illustration of a cross section of a display assembly for a HMD. Wherein, the display assembly includes upper optics 795 and lower optics 797 that operate together to display an image to a user while simultaneously providing a see-through view of the environment. Aspects of the upper optics 795 will be discussed in more detail herein. The lower optics 797 can comprise optical elements to manipulate image light 7940 from the upper optics 795 and thereby present the image light 7940 to the user's eye 799. Lower optics 797 can comprise one or more lenses 7950 and a combiner 793. The combiner 793 presents the image light 7940 to the user's eye 799 while simultaneously allowing light from the environment 791 to pass through to the user's eye 799 so that the user sees the displayed image overlaid onto a view of the environment.

Figure 79:
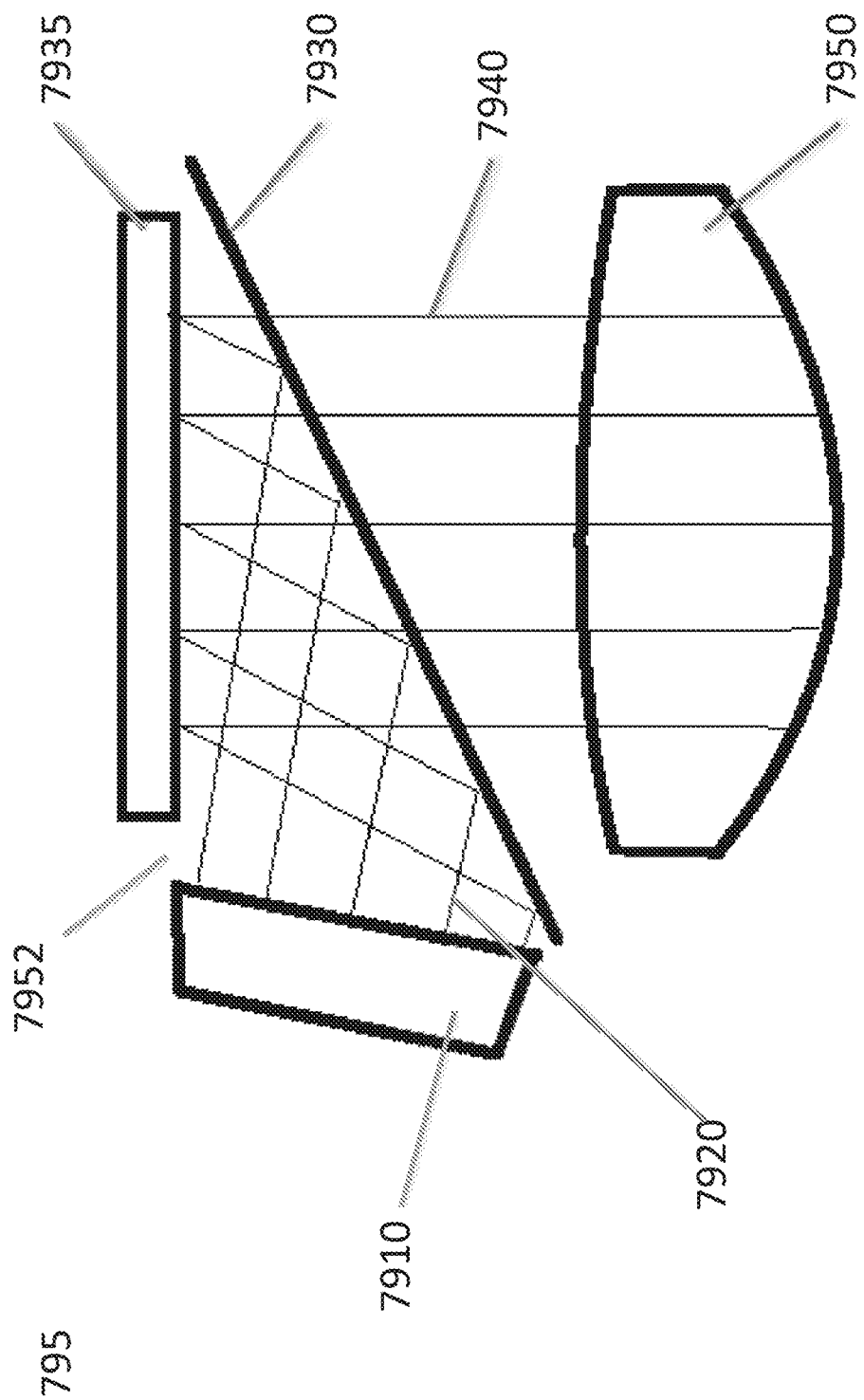
FIG. 79 illustrates a schematic of an upper optic in accordance with the principles of the present disclosure.

FIG. 79 is a schematic drawing of a cross section of the upper optics 795 for a HMD. Included are a light source 7910, a partially reflective layer 7930, a reflective image source 7935 and a lens 7950. The light source 7910 provides illumination light 7920 to the HMD. The illumination light 7920 is redirected by the partially reflective layer 7930 to illuminate the reflective image source 7935. The illumination light 7920 is then reflected by the reflective image source 7935 in correspondence with the image content in the displayed image so that it passes through the partially reflective layer 7930 and thereby forms image light 7940. The image light 7940 is optically manipulated by the lens 7950 and other optical elements (not shown) in the lower optics 797 so that a displayed image is provided to a user's eye 799. Together, the light source 7910, the partially reflective layer 7930 and the reflective image source 7935 form a frontlighted image source. Where, the reflective image source 7935 can comprise a LCOS, a FLCOS, DLP or other reflective display. FIGS. 79, 80, 82 and 83 are shown with the illumination light 7920 provided so that it is incident on the reflective image source 7935 at an oblique angle as is required for a DLP. FIGS. 84c, 84d, 85, 86, 87, 88 and 89 are shown with the illumination light 7920 provided perpendicular to the reflective image source 8535 as is required for an LCOS or FLCOS. The principles of the disclosure described herein apply to any type of reflective image source where stray reduction is needed. The light source 7910 can include light sources such as LEDs, laser diodes or other light sources (e.g. as described herein) along with various light control elements including: diffusers, prismatic films, lenticular films, Fresnel lenses, refractive lenses and polarizers. Polarizers included in the light source 7910 polarize the light exiting the light source 7910 so that the illumination light 7920 is polarized. The partially reflective layer 7930 can be a partial mirror coating on a substrate or it can be a reflective polarizer film such as a wire grid film supplied by Asahi-Kasei under the name WGF or a multi-layer polarizer film supplied by 3M under the name DBEF. When the partially reflective layer 7930 is a reflective polarizer, the illumination light 7920 is supplied as polarized light wherein the polarization axis of the illumination light 7920 is oriented relative to the polarization axis of the reflective polarizer so that the illumination light 7920 is substantially reflected. The reflective image source 7935 then includes a quarter wave retarder (e.g. a quarter wave film) so that the polarization state of the illumination light 7920 is reversed in the process of being reflected by the reflective image source 79345. This enables the reflected illumination light 7920 to then be substantially transmitted by the reflective polarizer. After passing through the partially reflective layer 7930, the light becomes image light 7940. The image light 7940 then passes into a lens 7950 which is part of the lower optics 797 or display optics which manipulates the light to provide a displayed image to the user's eye. While the partially reflective layer 7930 is illustrated as a flat surface, the inventors have contemplated that the surface may be curved, shaped, have simple or complex angles, etc. and such surface shapes are encompassed by the principles of the present disclosure.

In HMDs that provide images to both eyes of the user, it is desirable to provide the images so that they are aligned to one another. This is particularly important when the images are viewed as stereo images where the perceived alignment of the images seen with each eye is critical to achieving the perception of depth. To provide an accurate alignment of the images, an active alignment of the optics can be performed after the optics have been assembled into a rigid frame of the HMD. Where active alignment includes aligning the images for each eye to one another by moving portions of the display assembly and affixing the portions into position relative to one another. To this end, FIG. 79 shows space 7952 that extends around the reflective image source 7935 so that the reflective image source 7935 can be moved laterally and rotationally. The light source 7910 and partially reflective layer 7930 are arranged to illuminate the area that includes the reflective image source 7935 and a portion of the adjacent space 7952. As a result, the reflective image source 7935 can be moved within the space 7952 during the active alignment process without losing illumination or degrading the brightness of the displayed image. Where movements of the reflective image source 7935 during the active alignment can include movements that correspond to horizontal, vertical and rotational movements of the image provided to one eye relative to the image provided to the other eye of the user. The movements can be 0.5 mm in size for example when the reflective image source 7935 is approximately 5×8.5 mm in size (this equates to approximately 10% of the reflective image source dimension) and as such the space 7952 can be 0.5 mm wide or wider.

Figure 80:
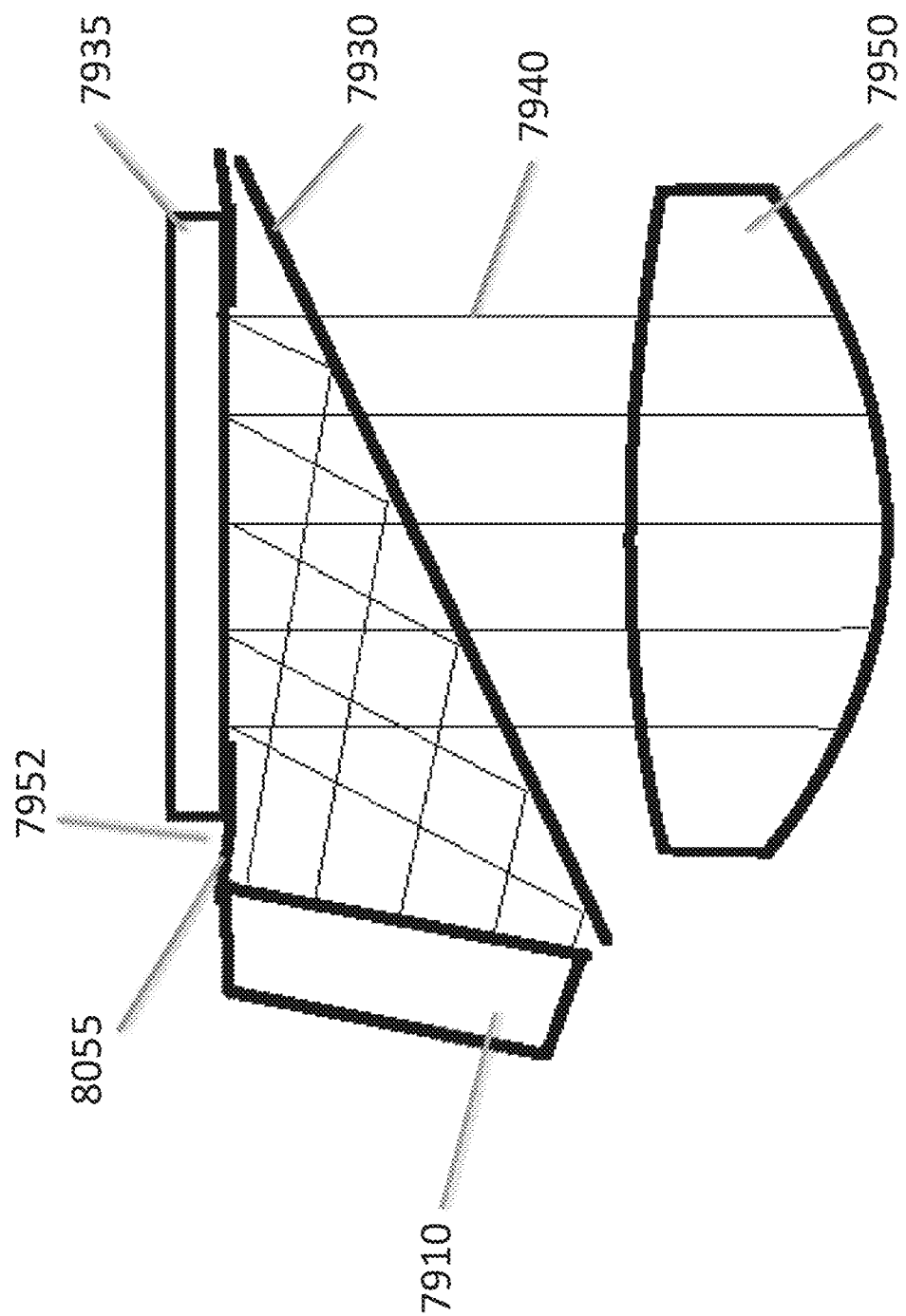
FIG. 80 illustrates a stray light control technology in accordance with the principles of the present disclosure.
Figure 81:
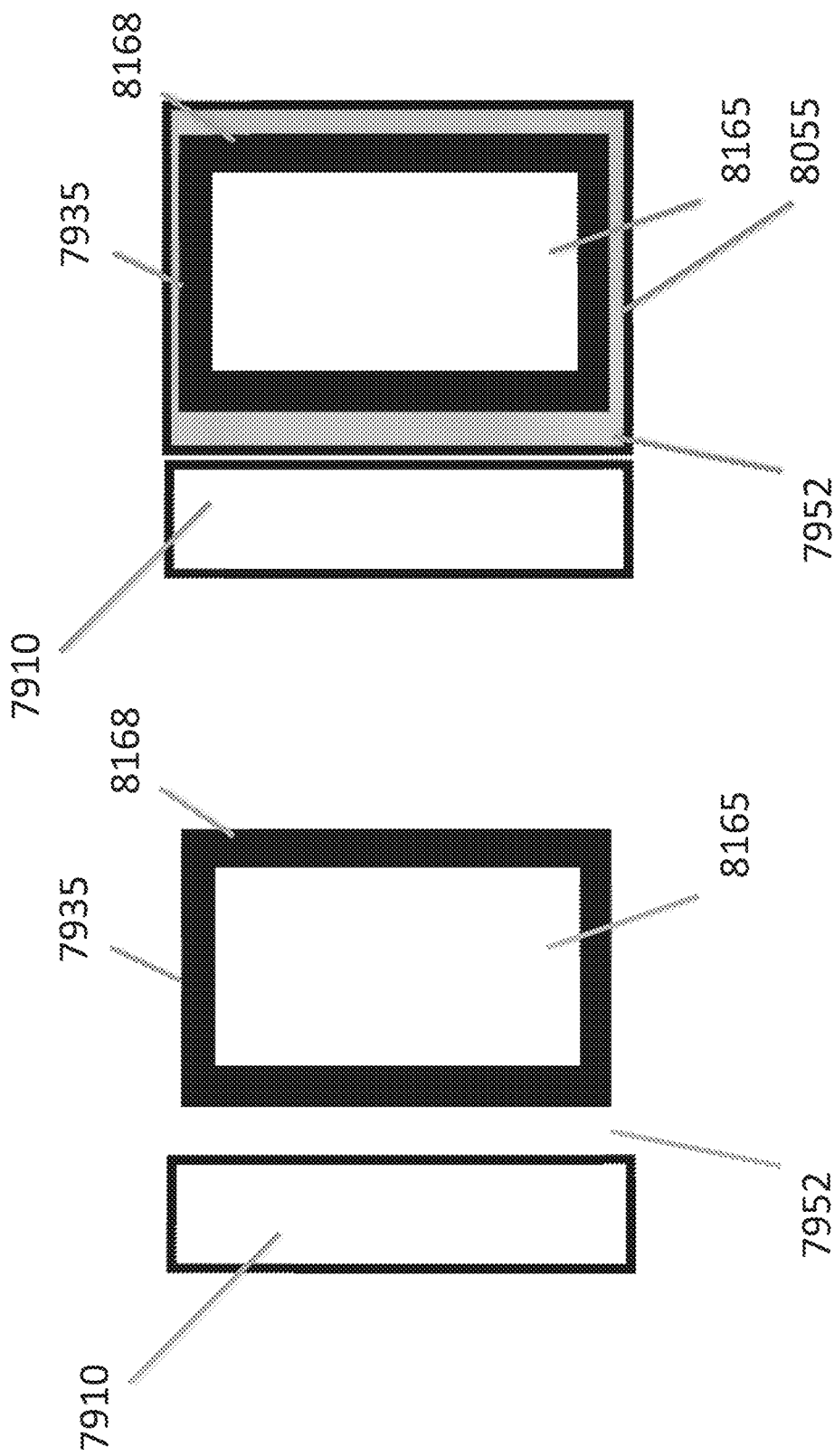
FIGS. 81a and 81b illustrate a display with a gap and masked technologies in accordance with the principles of the present disclosure.

However, by including the space 7952, in the illuminated area, visible artifacts can occur due to light scattering or reflecting from the edges of the reflective image source 7935 or from structures adjacent to the space 7952. Consequently, a mask 8055 is provided that extends from the edge of the active area of the reflective image source 7935 across the space 7952 to cover the edges of the reflective image source 7935 and structures adjacent to the space 7952 as shown in FIG. 80. The mask 8055 is black and non-reflecting so that incident illumination light 7920 is absorbed. In addition the mask 8055 is designed to not interfere with the movements of the reflective image source 7935 that occur during active alignment. To this end, the mask 8055 can be stiff (e.g. a black plastic or a black coated metal) and designed to slide under the adjacent structures such as the light source 7910, the edge of the partially reflective layer 7930 and the sides of the housing that contain the frontlight. Alternatively, the mask 8055 can be flexible (e.g. a black plastic film or a black rubber film or tape) so that it deforms when it contacts the adjacent structures. FIG. 81a shows an illustration of the reflective image source 7935, the light source 7910 and the space 7952 as viewed from above. As is typically found with image source of all kinds, there is a mask 8168 applied to the surface of the image source that surrounds the active area 8165, however this mask 8168 does not cover the space 7952. FIG. 81b shows a further illustration of the system shown in FIG. 81a wherein the mask 8055 is applied to the reflective image source 7935 so that it attaches within the mask 8168 in a way that covers the space 7952 and does not block the active area 8165.

In another embodiment, the image produced by the image source does not use all of the active display area of the image source so there is room to shift the image in an x and/or y perspective within the active display area for alignment of the content. For example, if a misalignment is observed (as indicated above) rather than physically moving the image source, or in addition to moving the image source, the image is digitally shifted in the x and/or y direction to create better combined content alignment. The originally inactive display area around the content may be referred to as a content shift buffer zone.

Figure 85:
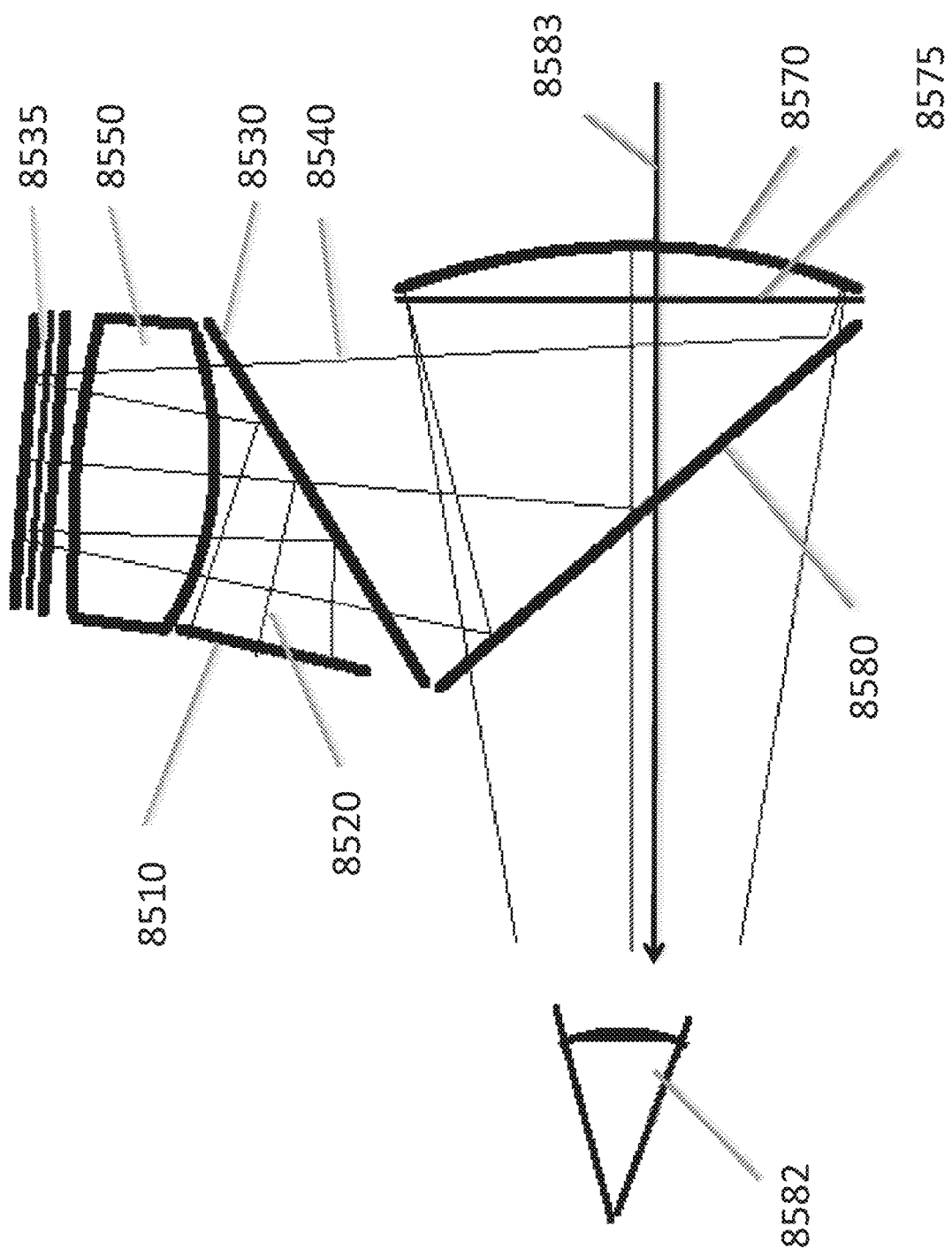
FIG. 85 illustrates an optical system adapted for a head-mounted display in accordance with the principles of the present disclosure.

In a further embodiment for aligning images in a HMD with see-through, a first image containing features is provided to one eye of the user using a display assembly similar to that shown in FIG. 79a or FIG. 85. A second image containing features in the same locations is provided to the other eye of the user. The position of at least one of the image sources is then moved within the space provided for adjustment to align the first image to the second image as seen by the user's eyes. This image alignment can also be done using cameras in place of the user's eyes.

In the case where the first and second images are smaller in size than the active area of the reflective image source, thereby leaving a digital space adjacent to the images that can be used for digital shifting of the images for further alignment adjustment. This adjustment can be used in combination with physical movements of the reflective image sources to align the first image to the second image.

Figure 82:
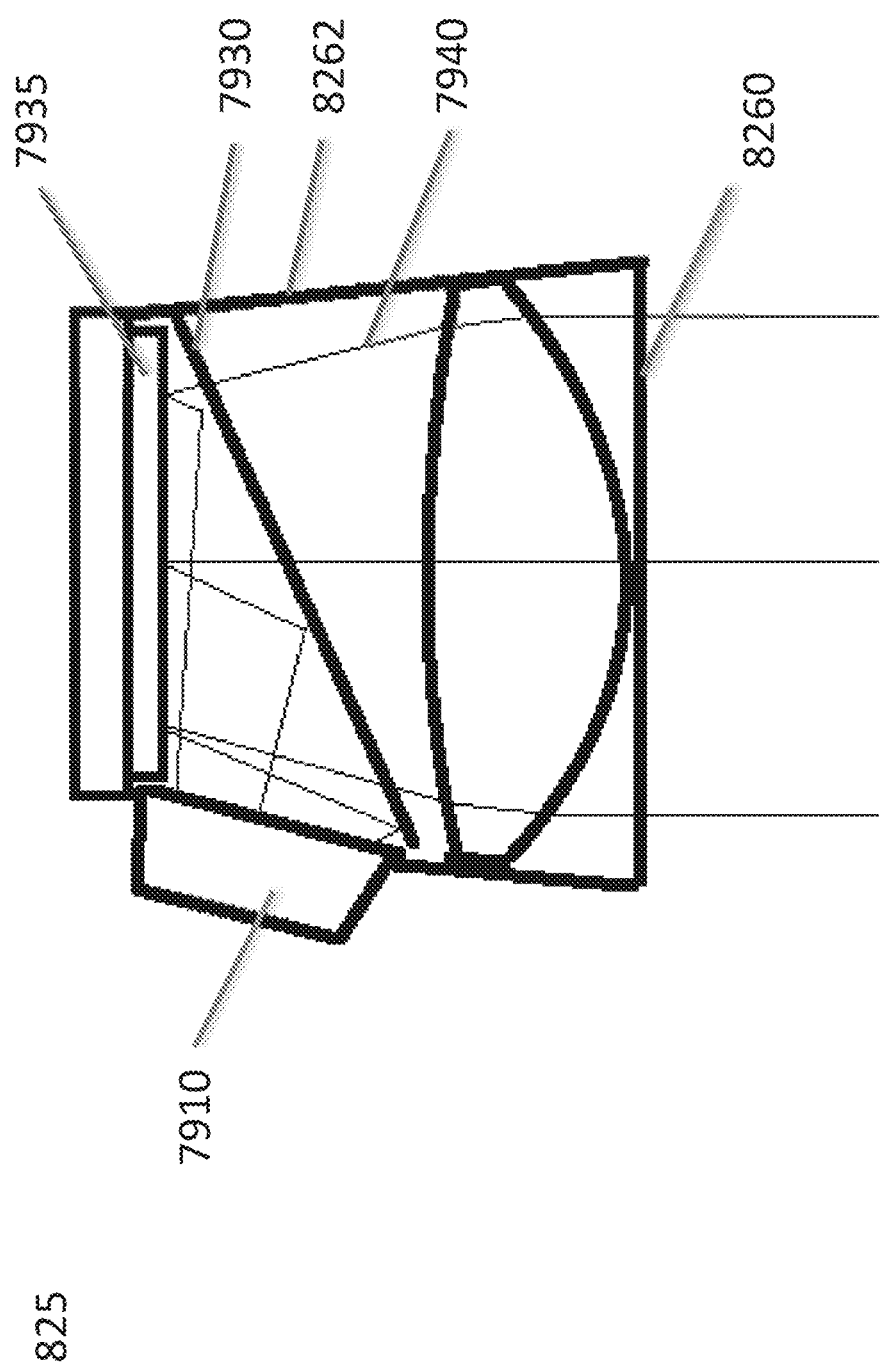
FIG. 82 illustrates an upper module with a trim polarizer in accordance with the principles of the present disclosure.

FIG. 82 is an illustration of upper optics 825 that includes the elements of upper optics 795 with the addition of a trim polarizer 8260. Where the polarization axis of the trim polarizer 8260 is oriented so the image light 7940 is transmitted to the lower optics (not shown). Light that has the opposite polarization state compared to the image light 7940 is absorbed by the trim polarizer 8260. As such, light that is scattered from surfaces such as the walls of the housing 8262 that typically has a mixed polarization state will be partially absorbed by the trim polarizer 8260. The trim polarizer 8260 can also absorb a portion of colored light caused by birefringence in the lens 7950 provided the trim polarizer 8260 is located after the lens 7950. In this case, the trim polarizer 8260 absorbs the light that has the opposite polarization state caused by the birefringence and transmits the light that has the polarization state of the image light 7940 prior to the lens 7950. In some cases, it is advantageous to change the polarization state of the image light 7940 to improve the reflection of the image light 7940 from the combiner 793 so that a half wave retarder is needed in addition to the trim polarizer 8260. For proper operation, the half wave retarder is positioned with its fast axis oriented at 45 degrees to the transmission axis of the trim polarizer 8260. In this case, it is advantageous to position the half wave retarder (not shown) below the trim polarizer 8260 so that the trim polarizer can absorb any elliptical polarization that may be present due to birefringence in the lens 7950 before the image light is acted upon by the half wave retarder. In this way, any variation in retardation with wavelength that may be present in the half wave retarder will not act to increase the elliptical polarization or act to increase color artifacts in the image light 7940 caused by birefringence in the lens 7950. In an example, the trim polarizer can be a polarizer film that is laminated to a half wave retarder film and antireflection coatings can be applied to the outer surfaces.

Figure 83:
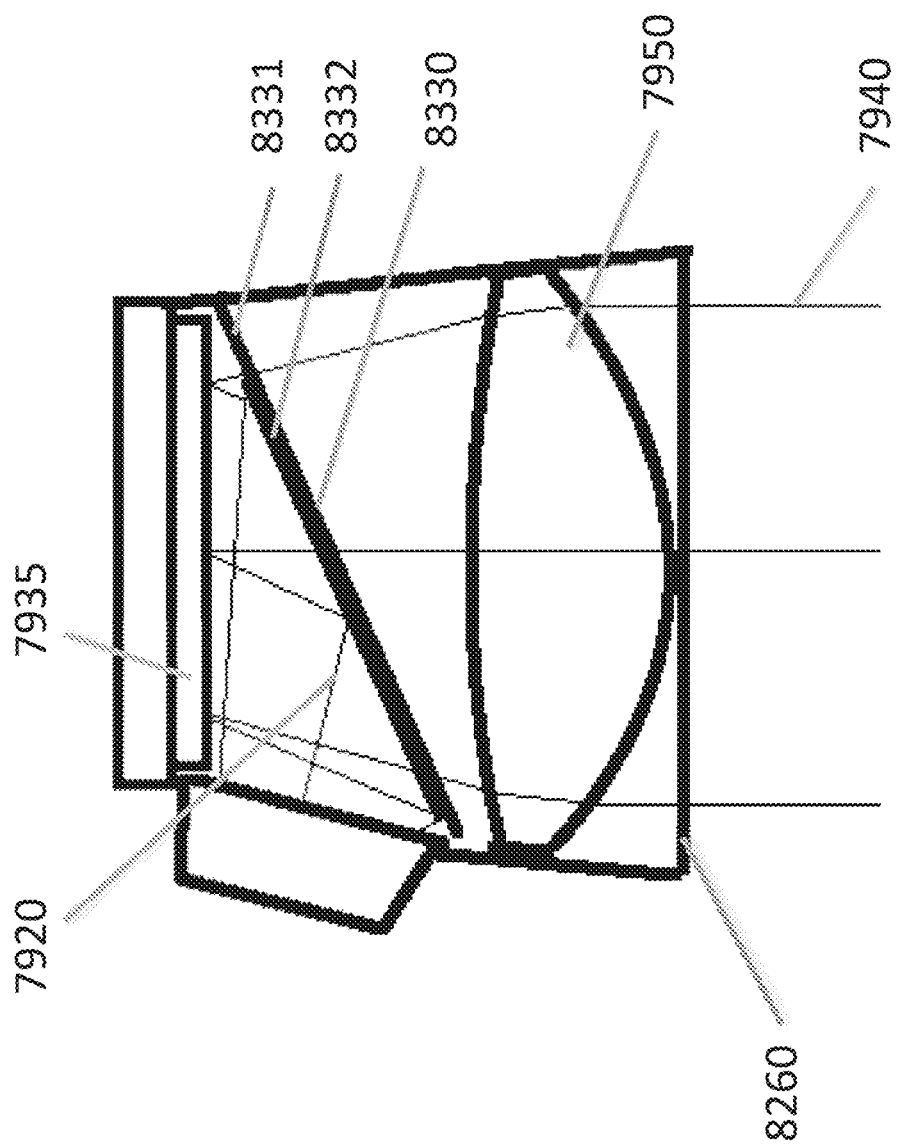
FIG. 83 illustrates an optical system with a laminated multiple polarizer film in accordance with the principles of the present disclosure.

In FIG. 83, the partially reflective layer 8330 is a laminated multiple polarizer film comprised of a reflective polarizer film 8332 laminated to an absorptive polarizer film 8331. Where, the reflective polarizer film 8332 is only big enough to reflect the illumination light 7920 that illuminates the active area 8165 of the reflective image source 7935. The absorptive polarizer film 8331 is larger than the reflective polarizer film 8332 and extends across the entire aperture between the reflective image source 7935 and the lens 7950, so that no edges of the absorptive polarizer film 83 31 are visible and all the light reflected from the reflective image source 7935 passes through the absorptive polarizer 8331. For the case when the reflective image source 7935 is an LCOS, the absorptive polarizer 8331 acts as an analyzer polarizer to only allow the polarization state of the image light to be transmitted. As such, the reflective polarizer film 8332 only covers a portion of the absorptive polarizer film 8331. The polarization axes of the reflective polarizer film 8332 and the absorptive polarizer film 8331 are aligned so that polarized light that is transmitted by the reflective polarizer film 8332 is also transmitted by the absorptive polarizer film 8331. In contrast, polarized light that is reflected by the reflective polarizer film 8332 is absorbed by the absorptive polarizer film 8331. Thereby, illumination light 7920 that is incident onto the reflective polarizer film 8332 is reflected toward the reflective image source 7935 where the polarization state is reversed so that it is transmitted by the reflective polarizer film 8332 and the absorptive polarizer film 8331 as it becomes image light 7940. At the same time, illumination light 7920 that is incident onto the absorptive polarizer film 8331 in the area surrounding the reflective polarizer film 8332 is absorbed by the absorptive polarizer film 8331. By absorbing this excess illumination light 7920, that would not illuminate the active area 8165 of the reflective image source 7935, stray light is reduced within the display assembly and the contrast in the image presented to the user's eye is increased as a result. By aligning the polarization axes of the reflective polarizer film 8332 and the absorptive polarizer film 8331, the transmission is only reduced by approximately 12%, in the regions that include both reflective polarizer film 8332 and absorptive polarizer film 8331 compared to the regions that include just absorptive polarizer film 8331. Given the location of the partially reflective layer 8330 in the optical system and the fact that it is remote from the reflective image source 7935, having local differences in transmission on the partially reflective layer 8330 comprised of a laminated multiple polarizer will have a very small effect on the brightness uniformity in the image provided to the user's eye. In addition, the fact that the partially reflective layer 8330 is remote from the reflective image source 8330 makes the edges of the reflective polarizer film 8332 indistinct as seen by the user.

Figure 84B:
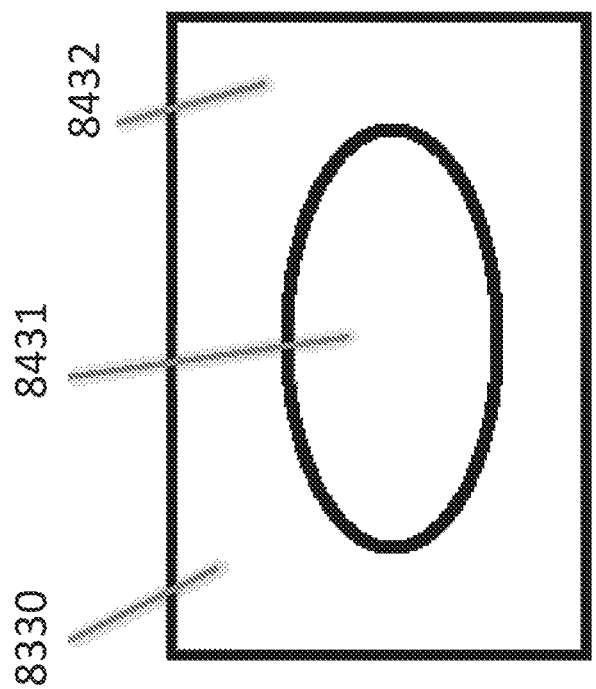
FIGS. 84a and 84b illustrate partially reflective layers in accordance with the principles of the present disclosure.
Figure 84A:
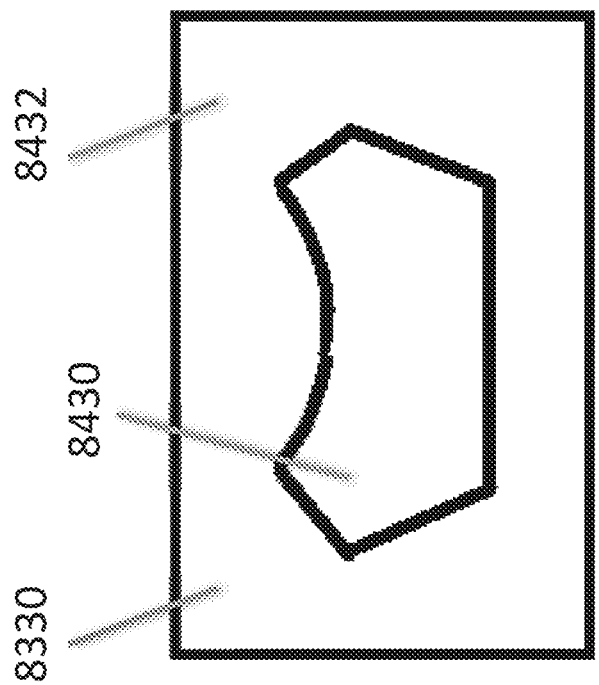

FIGS. 84a and 84b show illustrations of examples of partially reflective layers 8330, comprised of a reflective polarizer film 8430 and 8431 laminated to an absorptive polarizer film 8432. The reflective polarizer films 8430 and 8431 are cut to a shape that covers only the area where illumination light 7920 will be reflected to illuminate the active area 8165 of the reflective image source 7935. The shape required for the reflective polarizer film will vary depending on the type of frontlight. For the frontlight shown in FIG. 83 where the partially reflective layer 8330 is located adjacent to the reflective image source 7935, the shape of the reflective polarizer film 8431 will be rectangular or oval such as shown in FIG. 84b. For the frontlight included in the display assembly shown in FIG. 85 where the lens 8550 is located between the partially reflective layer 8530 and the reflective image source 8535, the influence of the illumination light 8520 passing through the lens 8550 changes the distribution of illumination light 8520 needed from the light source 8510. As a result, the illumination light 8520 can cover only a portion of the partially reflective layer 8530 and the use of a laminated multiple polarizer is advantageous. In embodiments, the reflective polarizer film can cover less than 80% of the area of the absorptive polarizer film in the laminated partially reflective layer. In further embodiments, the reflective polarizer film can cover less than 50% of the area of the absorptive polarizer film in the laminated partially reflective layer. In this case, the partially reflective layer 8530 can include a reflective polarizer film 8430 with a shape similar to that shown in FIG. 84a. In any case, the shape of the reflective polarizer film is selected in concert with the optical elements in the frontlight and display optics associated with the display assembly of the HMD.

Figure 84C:
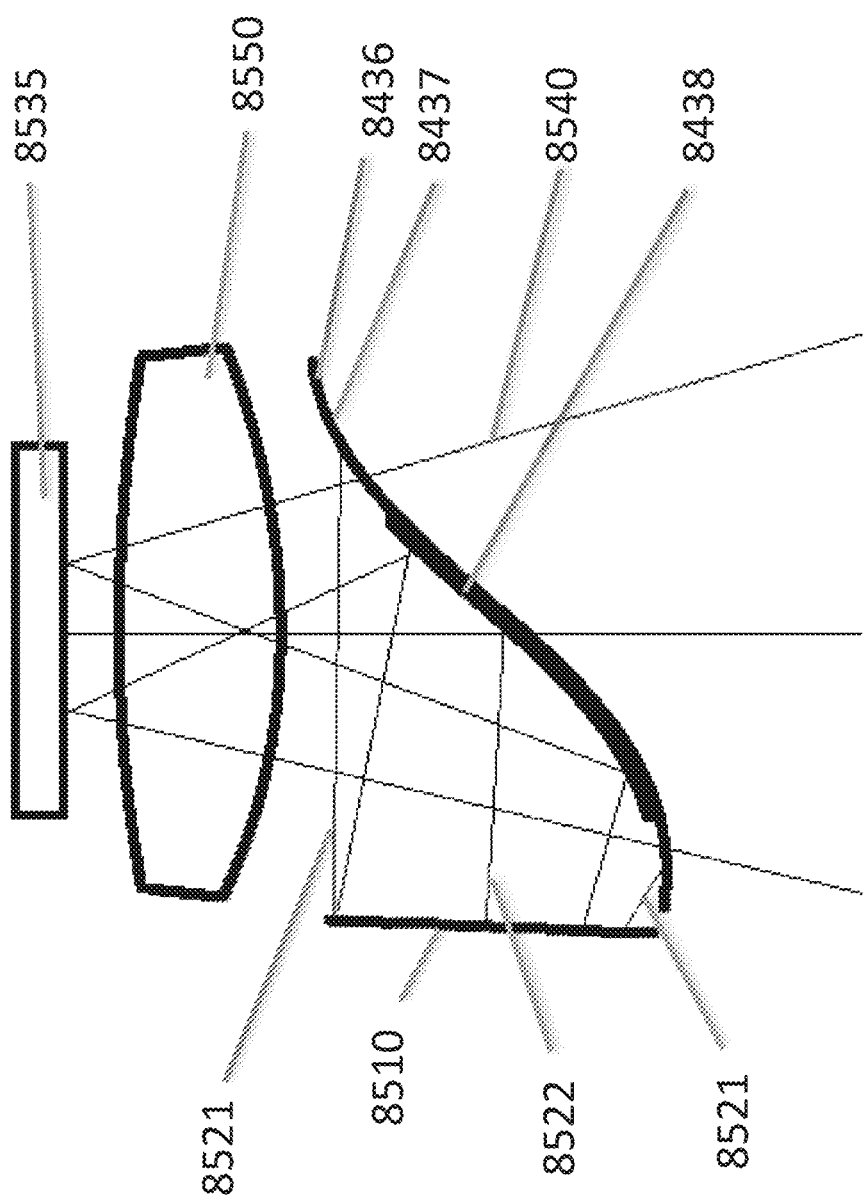
FIG. 84c illustrates a laminated multiple polarizer with a complex curve in accordance with the principles of the present disclosure.

FIG. 84c shows an example illustration of a frontlight for a display assembly similar to that shown in FIG. 85 wherein a laminated multiple polarizer film 8436 is shown with a complex curved shape that resembles an S with a central flat portion and curved ends. The laminated multiple polarizer 8436 includes a reflective polarizer film 8438 and an absorptive polarizer film 8437. Illumination light 8520 includes rays 8522 that are incident on the reflective polarizer film 8438 and rays 8521 that are incident on the absorptive polarizer film 8437. Due to the alignment of the polarization of the illumination light 8520 to the polarization axes of the reflective polarizer film 8438 and the absorptive polarizer film 8437 as previously described herein, rays 8522 are reflected by the reflective polarizer film 8438 and rays 8521 are absorbed by the absorptive polarizer film 8437. In this way, rays 8521 are prevented from contributing to stray light. It is beneficial to absorb rays 8521 since they cannot contribute to image light 8540 because if they were reflected by the laminated multiple polarizer 8436 they would be incident on the reflective image source 8535 outside of the active area 8165, and if they were transmitted by the laminated multiple polarizer 8436, they would be incident on the housing sidewalls 8262. Consequently, by absorbing rays 8521, the laminated multiple polarizer 8436 reduces stray light and thereby increases the contrast in the image displayed to the user.

Figure 84D:
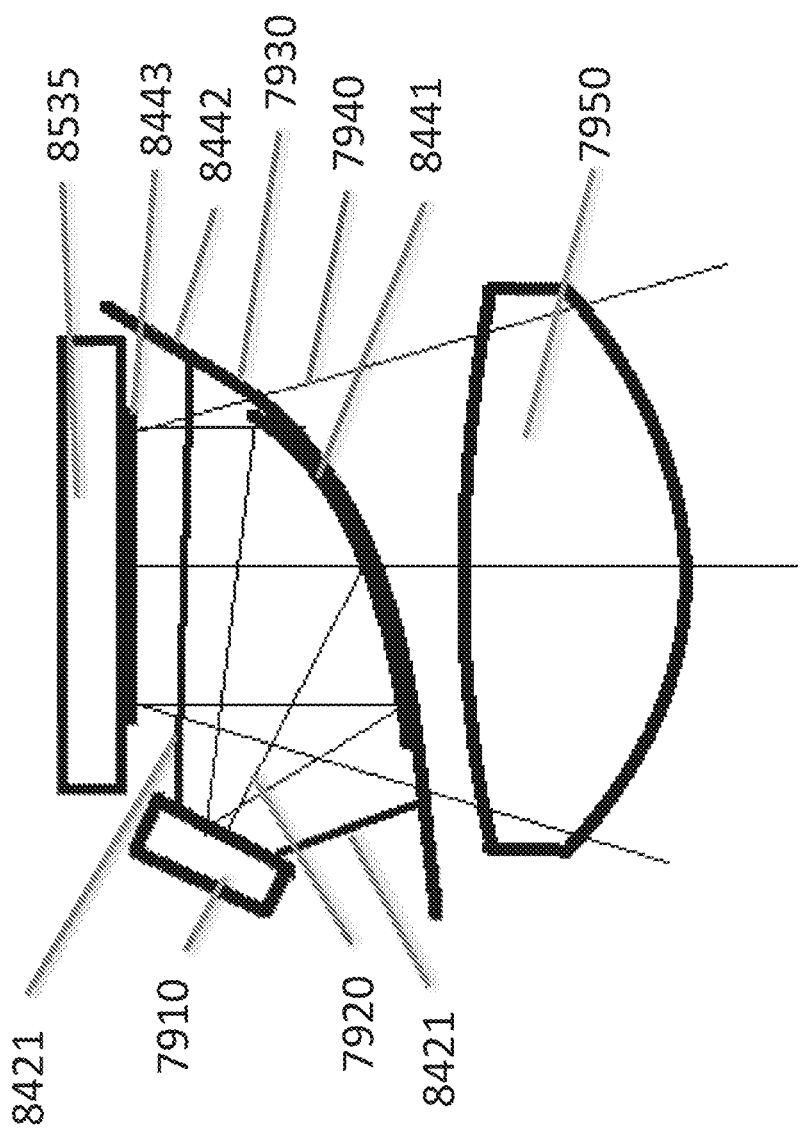
FIG. 84d illustrates a laminated multiple polarizer with a curve in accordance with the principles of the present disclosure.

FIG. 84d shows a further example illustration of a frontlight for a display assembly similar to that shown in FIG. 79 wherein the partially reflective layer 7930 comprises a laminated multiple polarizer film with a curved surface. The laminated polarizer includes an absorptive polarizer film 8442 with a laminated reflective polarizer film 8441. The reflective polarizer film 8441 is positioned in the central portion of the absorptive polarizer film 8442 where the illumination light 7920 is reflected toward the reflective image source 7935. The polarization axes of the reflective polarizer film 8441 and the absorptive polarizer film 8442 are aligned in parallel to each other and perpendicular to the polarization axis of the illumination light 7920 as provided by the polarized light source 7910. The rays 8421 of the illumination light 7920 that are incident on the partially reflective layer 7930 outside of the reflective polarizer film 8441 are absorbed by the absorptive polarizer film 8442. The reflective light source 8535 includes a quarter wave layer 8443 so that the polarization axis of the illuminating light 7920 is changed during the process of being reflected from the reflective image source 8535. As a result, the reflected illumination light 7920 is transmitted by the reflective polarizer film 8441 and the absorptive polarizer film 8442, thereby becoming image light 7940. By absorbing the rays 8421, before they are incident on external surfaces such housing walls or other optical surfaces, stray light is reduced and as a result the contrast in the image provided to the user's eye is increased. It should be noted that while FIGS. 84*c* and 84*d* show the reflective polarizer film being positioned to reduce stray light from the left and right sides as shown in the figure, the reflective polarizer can similarly be positioned to reduce stray light in the direction in and out of the paper as shown in the figure. FIGS. 84*a* and 84*b* show reflective polarizer films 8430 and 8431 positioned in a center portion of the absorptive polarizer 8432 so that stray light can be reduced in all directions. An important aspect of the disclosure is that this stray light reduction is obtained without a reduction in the brightness of the image provided to the user's eye since the reflective polarizer films 8430 and 8431 reflect illumination light over the entire area that is needed to fully illuminate the reflective image source.

FIG. 85 shows a schematic illustration of a display assembly for a HMD wherein the optical elements of the frontlight are overlapped with the display optics, as the lens 8550 is located between the partially reflective layer 8530 and the reflective image source 8535. The display assembly is then comprised of upper optics and lower optics. The upper optics include a reflective image source 8535, a lens 8550, a partially reflective layer 8530 and a light source 8510. The upper optics convert illumination light 8520 into image light 8540. As shown, the lower optics comprise a beam splitter plate 8580, a quarter wave film 8575 and a rotationally curved partial mirror 8570 (lower optics similar to those shown in FIG. 79*a* are also possible). The lower optics deliver the image light 8540 to a user's eye 8582. As previously stated herein, the display assembly provides the user with image light 8540 that conveys a displayed image along with scene light 8583 that provides a see-through view of the environment so that the user sees the displayed image overlaid onto a view of the environment.

Figure 86:
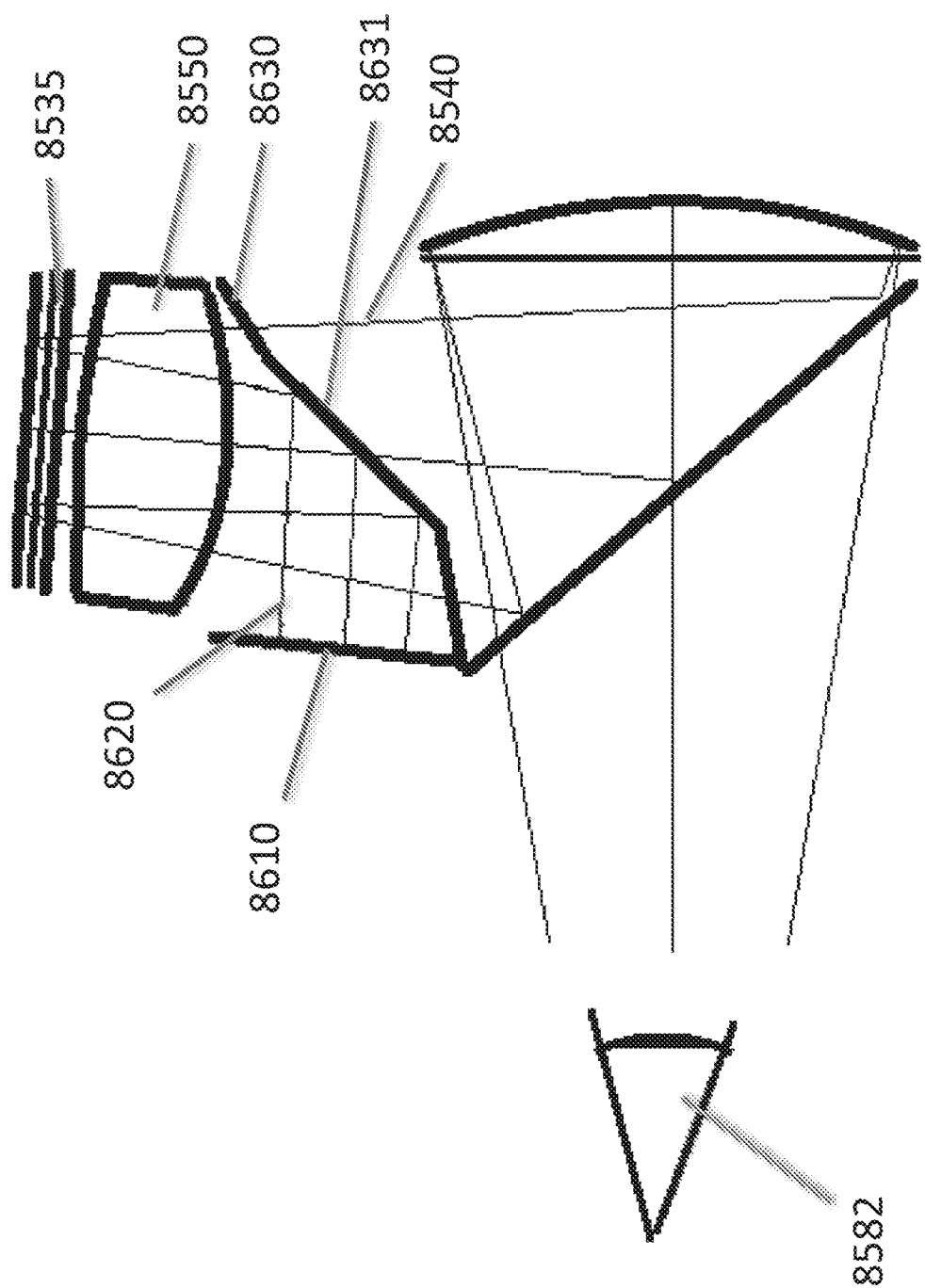
FIG. 86 illustrates an optical system adapted for a head-mounted display in accordance with the principles of the present disclosure.

FIG. 85 shows a display assembly wherein the partially reflective layer 8530 is a single flat film. However, it can be advantageous to use a segmented partially reflective layer 8630 such as is shown in FIG. 86. In this way, the angle of the central portion 8631 of the partially reflective layer 8630 can be selected to position the light source 8610 differently to reduce the clipping of illumination light 8620 by the lens 8550 or other portions of the supporting structure associated with the display assembly and thereby improve brightness uniformity in the displayed image seen by the user's eye 8582. To this end, a comparison of FIG. 85 to FIG. 86 shows that by changing the angle of the central portion of the partially reflective film, the position of the light source 8610 is moved downward and the clearance of the illumination light 8620 is increased relative to the lens 8550.

Figure 87:
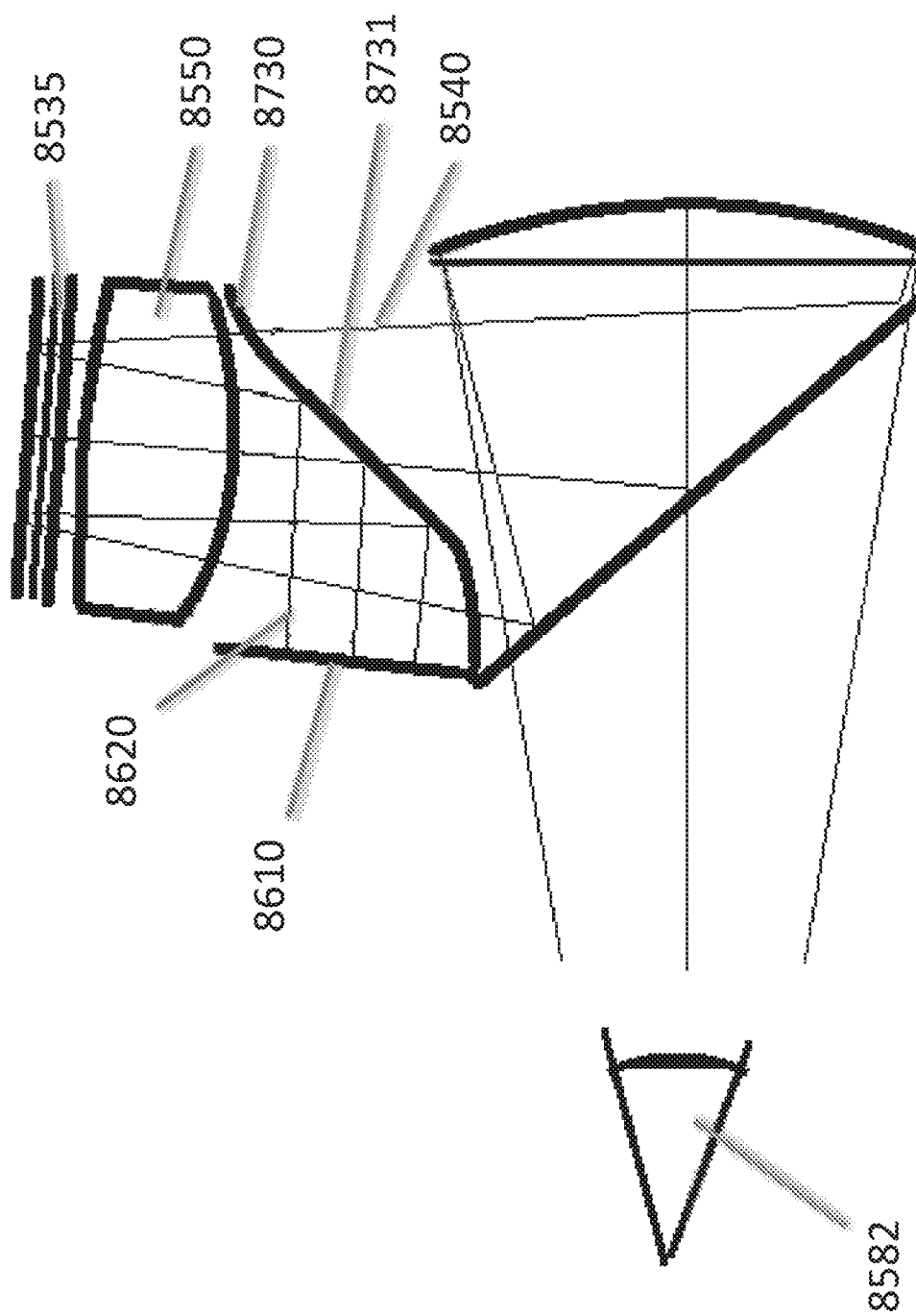
FIG. 87 illustrates an optical system adapted for a head-mounted display in accordance with the principles of the present disclosure.
Figure 88:
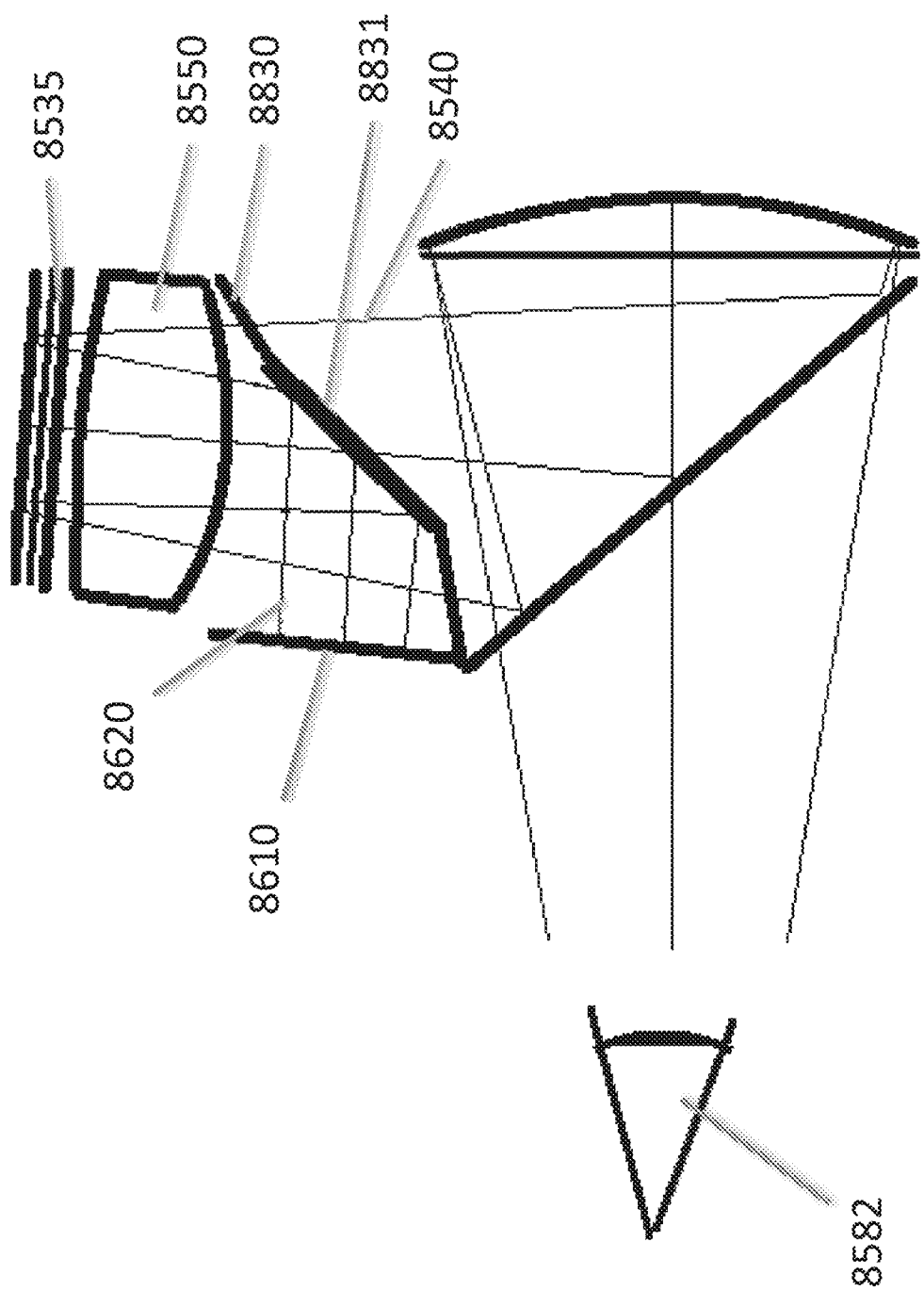
FIG. 88 illustrates an optical system adapted for a head-mounted display in accordance with the principles of the present disclosure.
Figure 89:
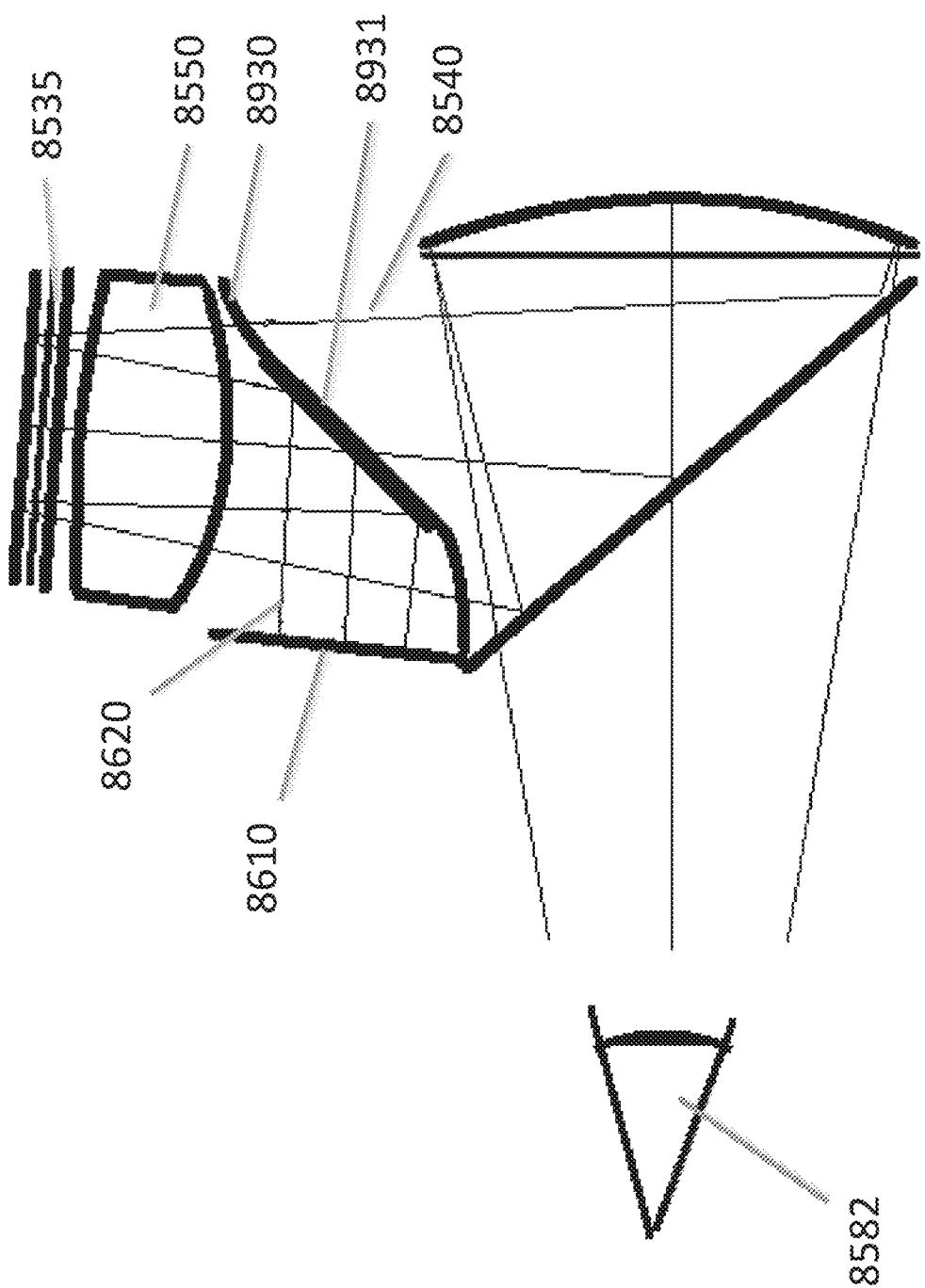
FIG. 89 illustrates an optical system adapted for a head-mounted display in accordance with the principles of the present disclosure.

Segmented partially reflective layers can be used which a variety of geometries and makeups. FIG. 86 shows a segmented partially reflective layer 8630 that includes a folded Z shape with three flat sections. FIG. 87 shows a segmented partially reflective layer that includes an S shape with a central flat section 8731 and ends that are curved similar to that shown in FIG. 84*c*. The segmented partially reflective layer can comprise a single partially reflective layer such as a reflective polarizer film or a partial mirror film. In addition, illumination light 8620 can be reflected from just the central flat section or it can be reflected from the central flat section plus one or more of the other segments of the segmented partially reflective layer. Alternatively, the partially reflective layer 8630 can comprise a multiple polarizer film to selectively provide a partially reflective layer over just the portions of the partially reflective layer that are actually needed to reflect illumination light to uniformly illuminate the reflective image source 7935 as previously described herein. FIG. 88 shows a display assembly wherein the partially reflective layer 8830 is comprised of a laminated multiple polarizer film with a central portion 8831 that includes a reflective polarizer film and the remainder of which is an absorptive polarizer as previously described herein. Where the segmented shape of the partially reflective layer 8830 is similar to that shown in FIG. 86. FIG. 89 shows a display assembly wherein the partially reflective layer 8930 is comprised of a laminated multiple polarizer film with a central portion 8931 that includes a reflective polarizer film and the remainder of which is an absorptive polarizer as previously described herein. Where the segmented shape of the partially reflective layer 8930 is similar to that shown in FIG. 87. While FIGS. 88 and 89 show the reflective polarizer film as just occupying the flat central segment of the segmented partially reflective layers 8830 and 8930 respectively, the reflective polarizer can extend into the adjacent segments as needed to reflect the illumination light 8620 in the pattern needed to uniformly illuminate the reflective image source 8535. Alternatively the segments associated with the segmented partially reflective layers 8830 and 8930 can have three dimensional shapes when the reflective polarizer portion is shaped like that shown in FIG. 84*a* to keep the reflective polarizer 8430 portion flat.

Figure 90:
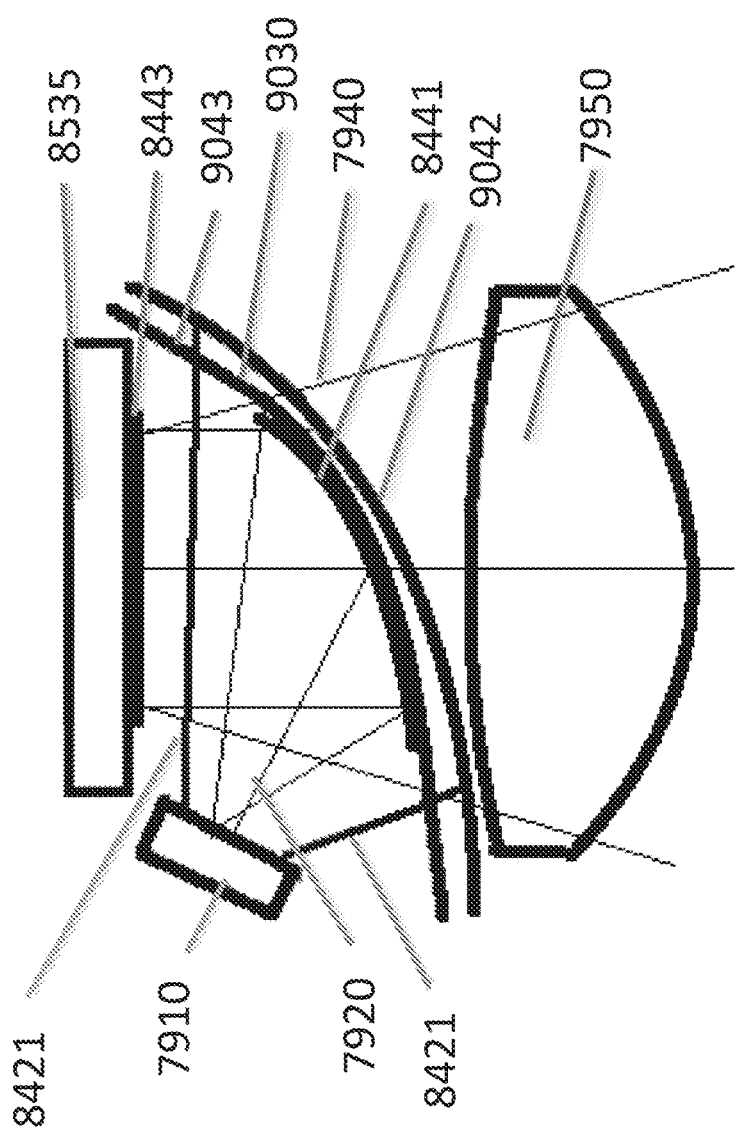
FIG. 90 illustrates an optical system adapted for a head-mounted display in accordance with the principles of the present disclosure.

In a further embodiment, the reflective polarizer film is laminated to a flexible transparent carrier film to increase the flexibility and the absorptive polarizer film is a separate layer. FIG. 90 shows a partially reflective layer 9030 comprised of a reflective polarizer film 8441 laminated to a flexible transparent carrier film 9043. Where the flexible transparent carrier film 9043 does not reflect the illumination light 7920 or change polarization state of the illumination light 7920 and as a result rays 8421 pass through the flexible transparent carrier film 9043. The purpose of the flexible transparent carrier film is to support the reflective polarizer film 8441 while allowing the partially reflective layer 9030 to be substantially as flexible as the reflective polarizer film 8441 alone. Absorptive polarizer film 9042 is then provided as a separate layer positioned adjacent to the partially reflective layer 9030. While the absorptive polarizer film 9042 can be flat or curved as needed to fit within the available space, in a preferred embodiment, the absorptive polarizer film 9042 is curved to be better positioned to absorb rays 8421 that are incident on the partially reflective layer 9030 outside of the reflective polarizer film 8441 as shown in FIG. 90.

Figure 91:
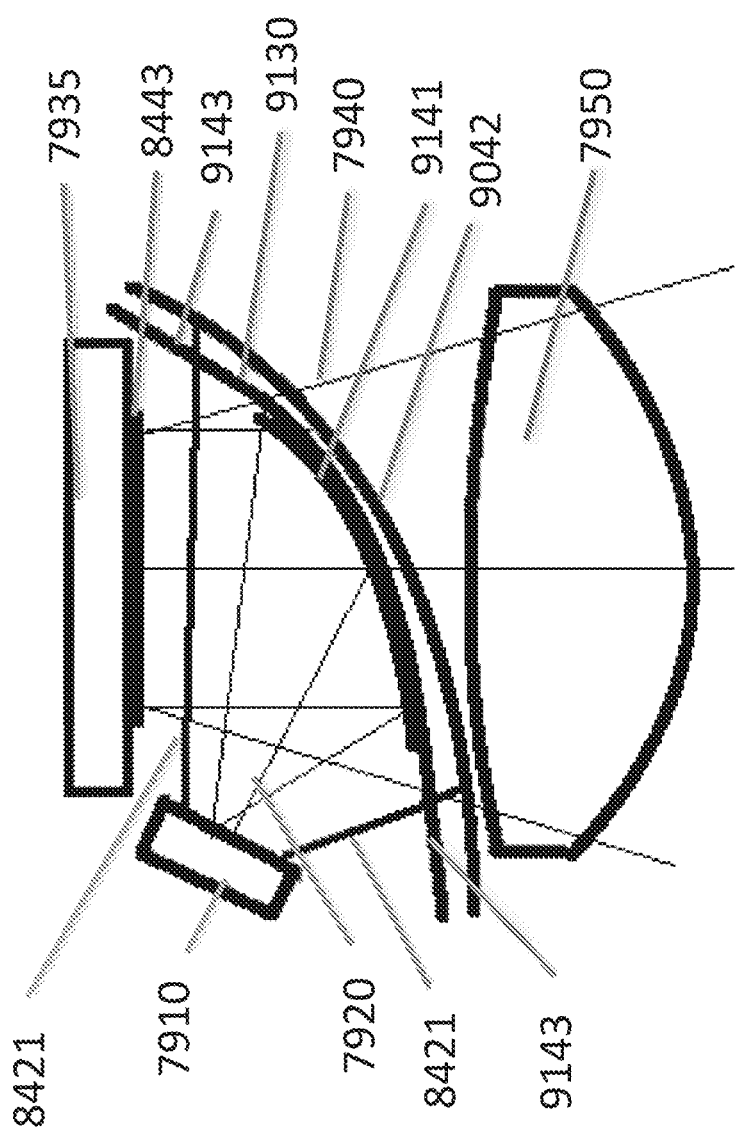
FIG. 91 illustrates an optical system in accordance with the principles of the present disclosure.

In yet another embodiment, the reflective polarizer film is modified to make the portions transparent and non-reflective where illumination light is incident that is not needed to illuminate the active area of the reflective image source and a separate absorptive polarizer is provided to absorb light that is transmitted through the non-reflective portions. FIG. 91 is an illustration of a partially reflective layer 9130 comprised of a reflective polarizer film wherein portions 9143 are modified to be transparent and non-reflective while the portion 9141 is a reflective polarizer. As such, polarized illumination light 7920 is reflected by the reflective polarizer portion 9141 and is transmitted by the modified portions 9143. An absorptive polarizer 9042 is provided as a separate layer adjacent to the partially reflective layer 9130 so that rays 8421 of the illumination light 7920 are transmitted by the modified portions 9143 and absorbed by absorptive polarizer. Wherein the transmission axis of the reflective polarizer portion 9141 is parallel aligned to the transmission axis of the absorptive polarizer 9042. The modification of the reflective polarizer film can be accomplished by etching the reflective polarizer film, when the reflective polarizer film is a wiregrid polarizer, and thereby removing the metal wires of the wiregrid in the modified portions. Alternatively the wiregrid polarizer can be masked during the metal deposition step to provide shaped portions of wire grid polarizer during manufacturing. An advantage provided by modifying the reflective polarizer film is that the flexibility of the partially reflective layer 9130 is substantially unchanged by the modification and as a result the partially reflective layer 9130 remains uniformly flexible in both the modified portions 9143 and the reflective polarizer portion 9141. Another advantage provided by using a modified reflective polarizer film is that the transition from the modified portion 9143 to the reflective polarizer portion 9141 does not include a sharp edge that can cause visible artifacts in the image provided to the user's eye due to scattering by the edge or a change in optical density from a thickness change. This embodiment can also be applied to other types of display assemblies such as for example that shown in FIG. 85.

Figure 92:
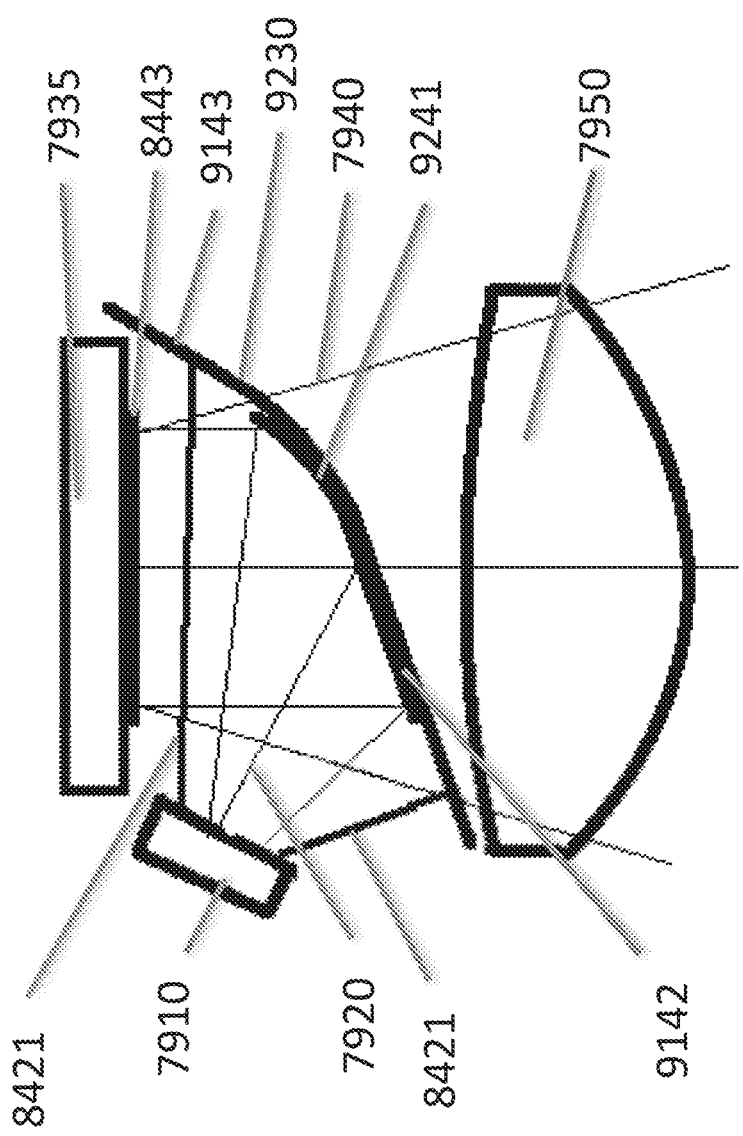
FIG. 92 illustrates an optical system in accordance with the principles of the present disclosure.

In a yet further embodiment, the partially reflective layer comprises a reflective polarizer film laminated to an absorptive polarizer and the partially reflective layer includes a flat portion and a curved portion. FIG. 92 is an illustration of a frontlight for a display assembly similar to that shown in FIG. 79*a* with the addition of a laminated partially reflective layer 9230 that has a portion that is a reflective polarizer laminated to an absorptive polarizer 9230. Where the partially reflective layer 9230 is segmented with a flat segment and a curved segment. By including a flat segment in the portion of the partially reflective layer 9230 that is a reflective polarizer 9241, the uniformity of illumination light 7920 that is reflected onto the reflective image source 7935 is improved because a larger portion of the light source 7910 is mapped to the image as can be seen in FIG. 92. Wherein when using a small scale light source and associated light control films such as diffusers, it is important to map a large portion of the light source area to avoid darker or brighter lines across the image produced by a dark or bright spot on the light source. Including a flat segment in the partially reflective layer 9230 also reduces local distortions in the image provided to the user's eye that are caused by local changes in optical path length or localized refraction due to changes in the surface angles that the light is exposed to. This embodiment can also be applied to other types of display assemblies such as for example that shown in FIG. 85.

In head mounted displays that provide a displayed image overlaid onto a see-through view of the environment, it is advantageous to have high see-through transmission both so the user can better interact with the environment and so that people in the environment can see the user's eyes so they feel more engaged with the user. It is also advantageous to have a thin optics module with low height to make the head mounted display more compact and thereby more attractive.

Figure 93:
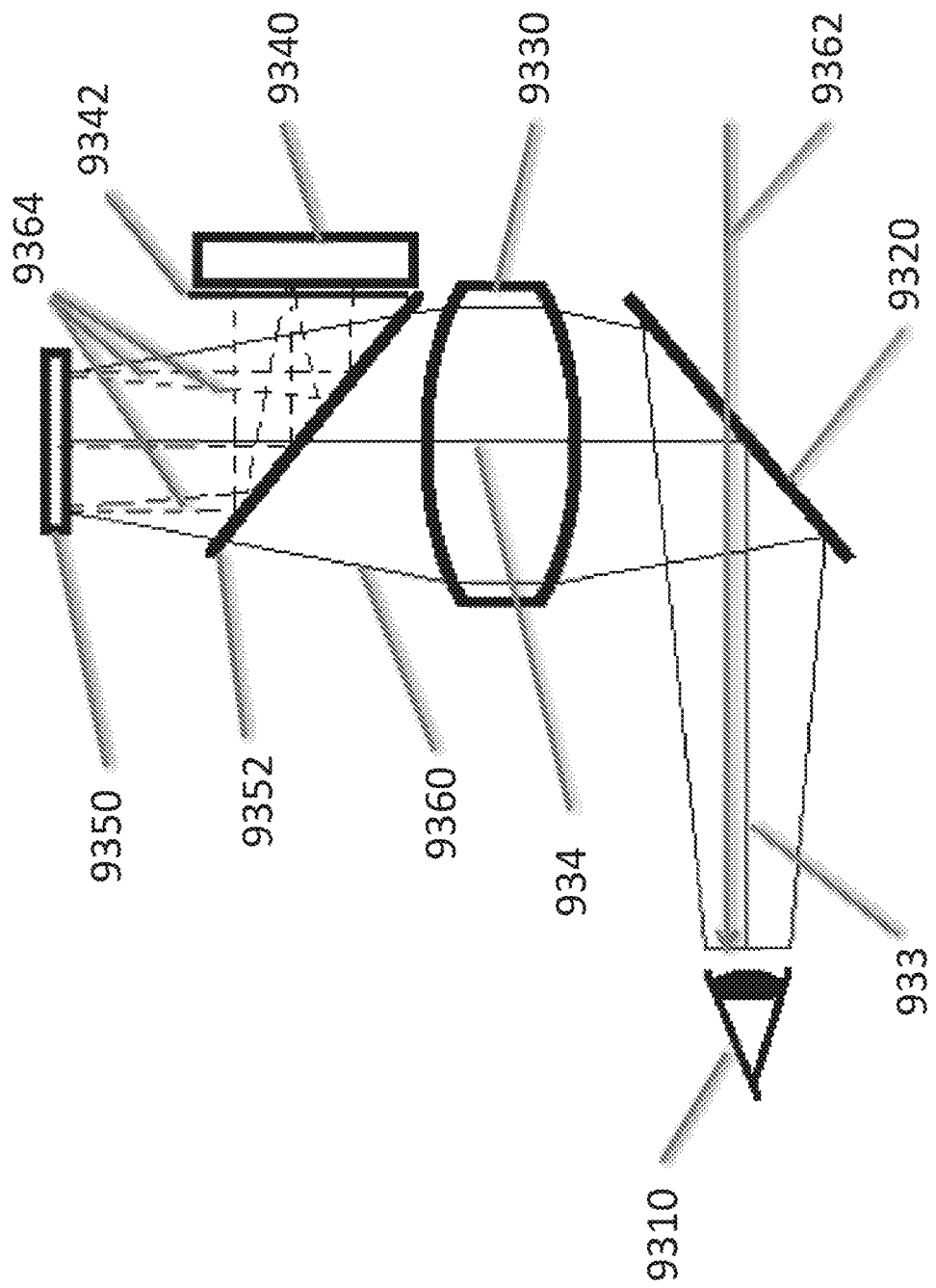
FIG. 93 illustrates an optical system in accordance with the principles of the present disclosure.

FIG. 93 shows an illustration of an optics module that provides the user with a displayed image while simultaneously providing high see-thru transmission. In this way, the user is provided with a displayed image overlaid onto a clear view of the environment. The optics module includes a combiner 9320 that can have a partial mirror coating that transmits a majority (greater than 50% transmission of visible light) of the available light from the environment, with transmission higher than 70% preferred. For example, the combiner 9320 can have a broadband partial mirror that reflects less than 30% and transmits over 70% of the entire visible wavelength band. Alternatively, the combiner 9320 can have a notch mirror coating where the reflectivity band of the notch mirror coating is matched to the wavelength bands provided by the light source 9340, where the light source 9340 can include one or more LEDs, QLEDs, diode lasers or other light source, each with narrow wavelength bands (e.g. 50 nm wide bands or less, full width half max). The notch mirror coating can provide for example, greater than 20% reflectivity (e.g. 50% reflectivity) in the wavelengths bands provided by the light source 9340 while providing greater than 80% transmission in the remaining wavelength bands in the visible. For full color images to be provided by the optics module, at least three LEDs with complimentary colors are required such as red, green and blue light or, cyan, magenta and yellow light. In a preferred embodiment, the combiner 9320 has a tristimulus notch mirror that reflects over 50% of the light within the wavelength bands provided by the light source 9340 and transmits an average of over 80% across the entire visible wavelength band. In this way, the tristimulus notch mirror coating provides improved efficiency compared to the partial mirror coating previously described. In an example, if the combiner is to provide 75% transmission of visible light from the environment 9362, the partial mirror coating will reflect only 25% of image light 9360 so that 75% of the image light will be transmitted through the combiner and will not contribute to the brightness of the image provided to the user's eye 9310. In contrast, a tristimulus notch mirror coating can be used to reflect over 50% of the image light 9360 over the wavelengths of light provided by the LEDs in the light source 9340 while transmitting over 90% of the remaining wavelengths of visible light that are not provided by the LEDs so that the average transmission over the entire range of visible light is over 75%. Consequently, the tristimulus notch mirror is twice as efficient as the partial mirror in terms of the ability to reflect image light 9360 toward the user's eye 9310.

To enable the optics module to operate with a combiner 9320 as shown in FIG. 93, image light 9360 is provided to a lens 9330 which focuses the image light 9360 at the user's eye 9310. Wherein lens 9330 is shown as a single lens element for simplicity, but multiple lens elements are also possible. The image light 9360 is provided from illumination light 9364 that comes from the light source 9340. Where, the illumination light 9364 is reflected by a beam splitter 9352 toward a reflective image source 9350. The image source 9350 can be a liquid crystal on silicon display (LCOS), a ferroelectric liquid crystal display (FLCOS) or other such reflective display. A polarizer 9342 can be associated with the light source 9340 to provide polarized illumination light 9364. The beam splitter 9352 can then be a reflective polarizer that is oriented to substantially reflect the polarized illumination light 9364. The image source 9350 changes the polarization state of the illumination light 9364 when the light is reflected by the image source 9350 to form image light 9360 that has a polarization state that is opposite to that of the illumination light 9364. By changing the polarization state of the illumination light 9364 to the polarization state of the image light 9360, the image light 9360 can then be transmitted by the reflective polarizer of the beam splitter 9352. It is important to note that the image light 9360 is polarized to enable a folded illumination system and not because polarized light is required by the combiner 9320. In fact, to provide a transmission of light from the environment 9362 that is greater than 50%, the combiner 9320 cannot include a polarizer.

Figure 94:
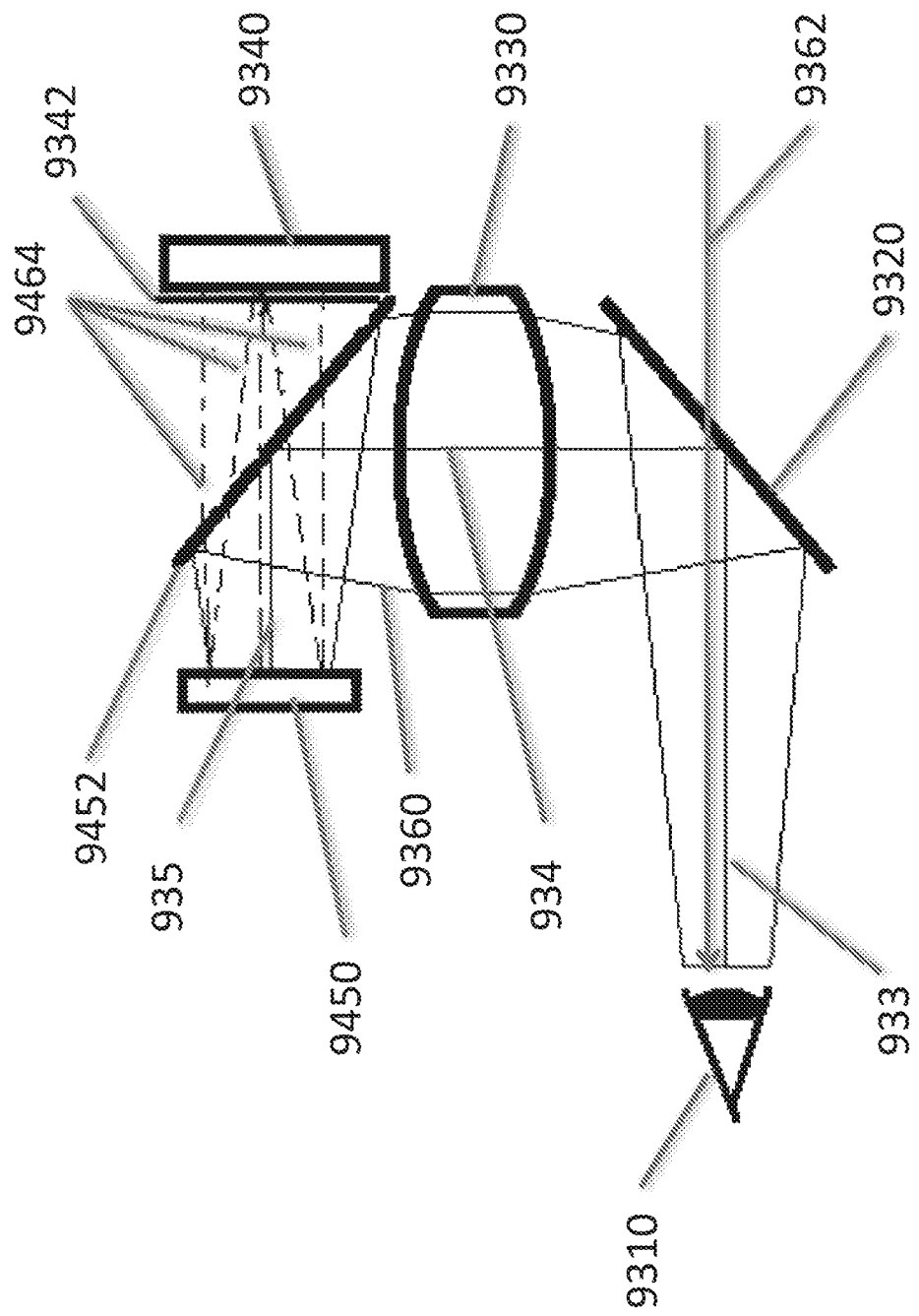
FIG. 94 illustrates an optical system in accordance with the principles of the present disclosure.

FIG. 94 is an illustration of an optics module than includes multiply folded optics to reduce the overall height of the optics module. In this case, illumination light 9464 is transmitted by the beam splitter 9452 so that it passes directly toward the image source 9450 wherein the beam splitter 9452 is a reflective polarizer and the light source 9340 includes a polarizer 9342 that is oriented so the transmission axis of the polarizer 9342 is parallel to the transmission axis of the beam splitter 9452. The illumination light 9464 is then reflected and changed in polarization state by the image source 9450 so that the image light 9360 with its changed polarization state is reflected by beam splitter 9452 toward the lens 9330. As can be seen by comparing FIG. 93 to FIG. 94, the overall height of the optics module shown in FIG. 94 is substantially reduced.

Figure 95:
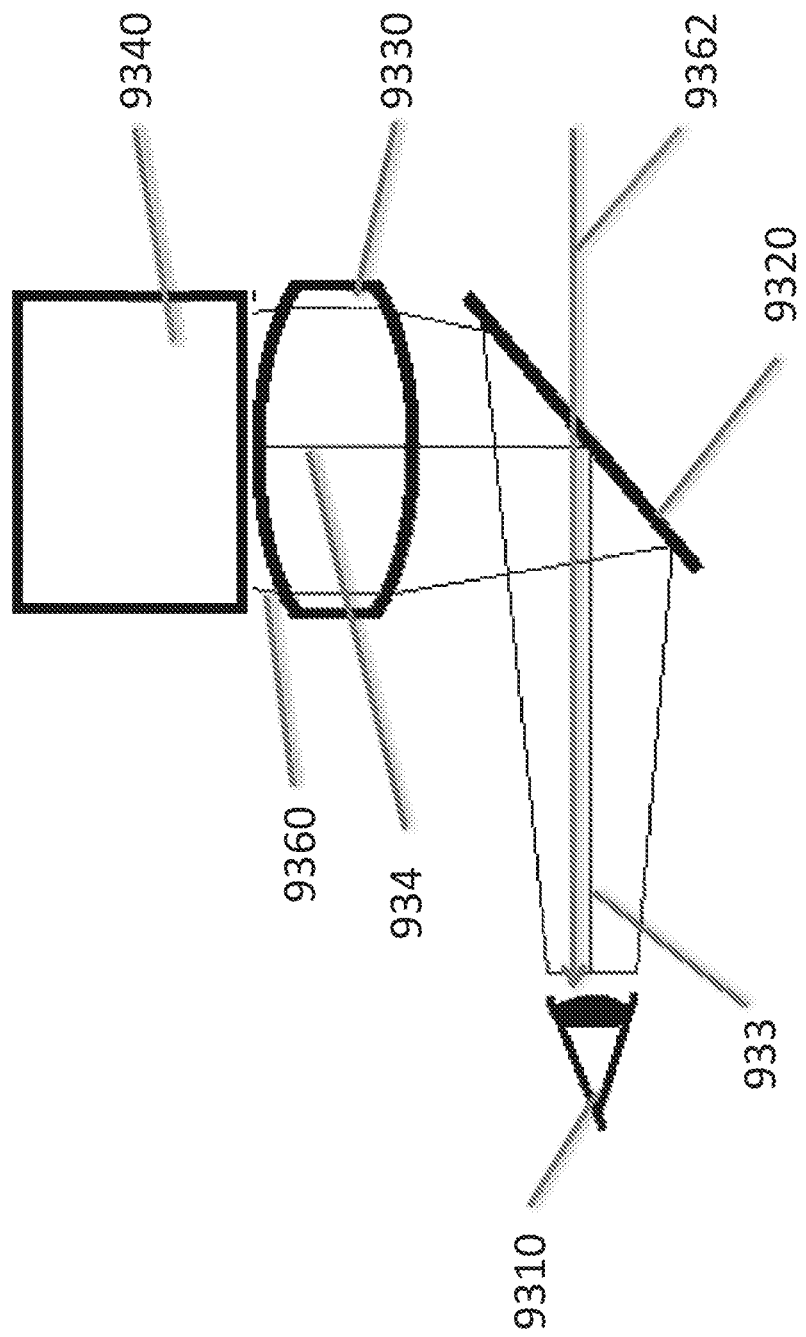
FIG. 95 illustrates an optical system in accordance with the principles of the present disclosure.
Figure 96:
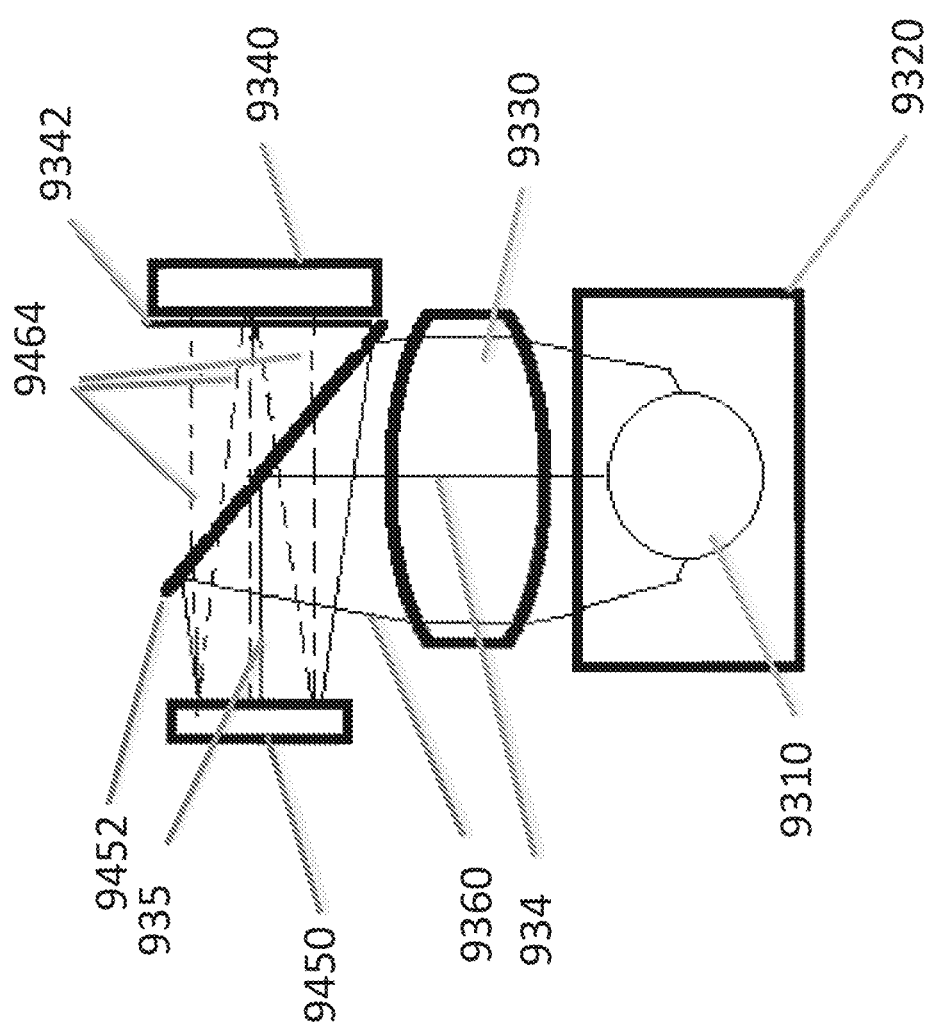
FIG. 96 illustrates an optical system in accordance with the principles of the present disclosure.

However, the orientation of the additional fold in the optical path of the image light 9360 in the optics module of FIG. 94 increases the thickness of the optics module, where thickness is defined as the distance from the closest back surface of the optics module that is nearest to the user's eye to the farthest front surface of the optics module that is farthest from the user's eye. FIGS. 95 and 96 show illustrations of an optical module where the added fold in the optical path of the image light 9360 is oriented perpendicular to the fold shown in FIG. 94. In this case, the optics module in FIGS. 95 and 96 is wider but thinner than that shown in FIG. 94. FIG. 95 shows the optics module from the side and FIG. 96 shows the optics module from the position of the user's eye 9310. As such, in the multiply folded optics shown in FIGS. 95 and 96, optical axis 935 associated with the illumination light 9464 is perpendicular to both the optical axis 934 associated with the image light 9360 as it passes through the lens 9330 and the optical axis 933 associated with the image light 9360 as it proceeds toward the user's eye 9310 in the eyebox. In the case of a head mounted display, it can be very important to have a thin optics module because a thick optics module can cause the head mounted display to stick outward from the user's forehead, which can be uncomfortable and unattractive. Thus, the multiply folded optics module shown in FIGS. 95 and 96 are shorter and thinner than the optic module shown in FIG. 93. The optics module shown in FIGS. 95 and 96 is wider than the optics module shown in FIG. 93, but in a glasses configuration of the head mounted display, wider optics modules can be better fit into the glasses frames than taller or thicker optics modules.

A further advantage that is provided by an optics module that includes multiply folded optics is that twists can be introduced at the fold surfaces to modify the orientation of different portions of the optics module relative to each other. This can be important when the optics module needs to fit into a thin curved glasses frame, a visor or a helmet where the increased width associated with the upper portion of the multiply folded optics module can make it more difficult to fit into structures that are not parallel to the combiner. In this case, the upper portion including for example (based on FIG. 96), the light source 9340, the polarizer 9342, the beam splitter 9452 and the image source 9450, can be twisted relative to the lower portion including the lens 9330 and the combiner 9320. Where to avoid distortion of the image due to the compound angles between the fold surfaces, a twist of the upper portion about the axis 934 must be combined with a corresponding twist of the lower portion about the axis 933. In this way, the effects of the increased width of the upper portion of the multiply folded optics can be reduced when fitting the optics module into a curved structure such as glasses frames, a visor frame or a helmet structure.

Figure 99:
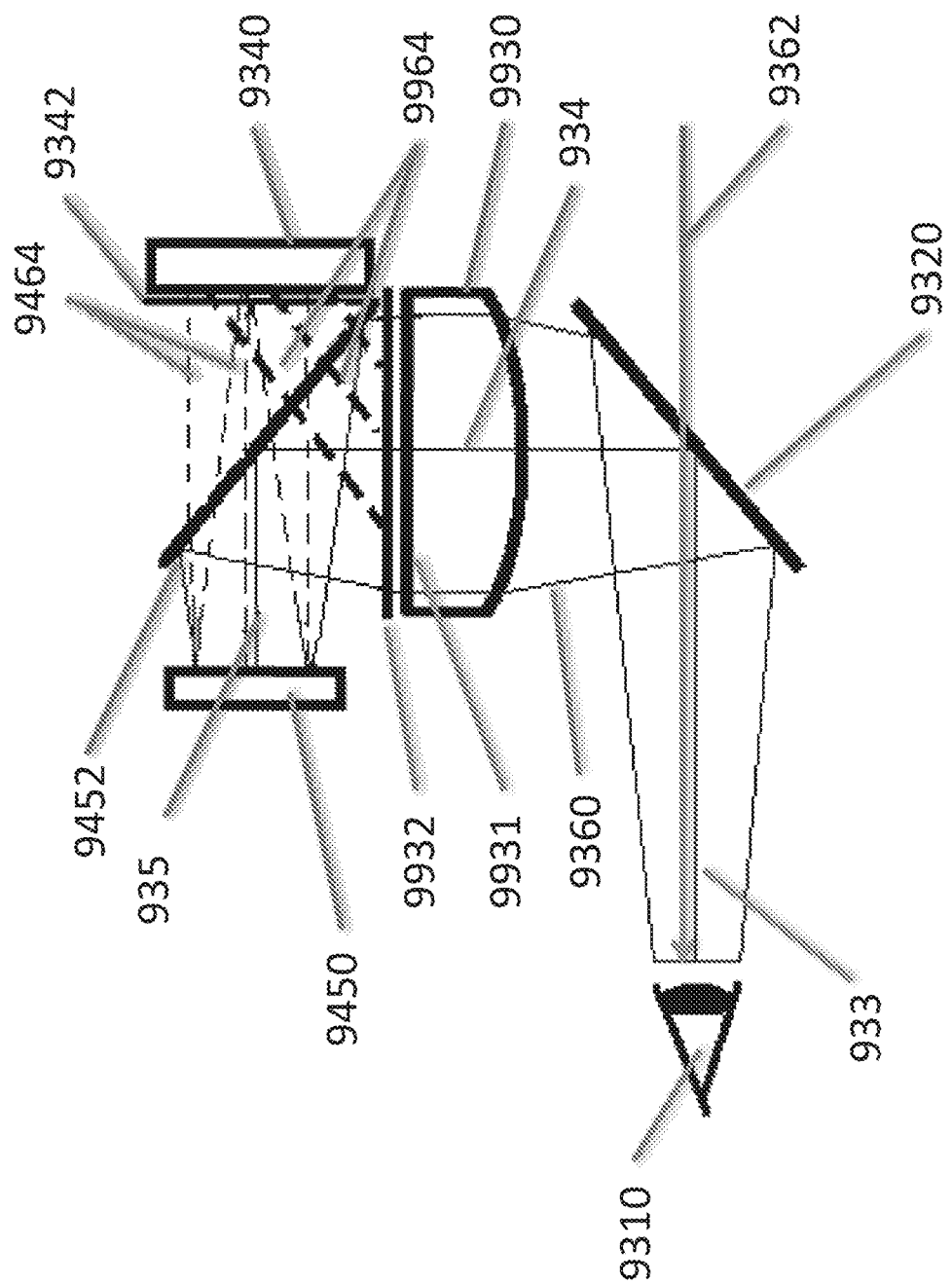
FIG. 99 illustrates an optical system in accordance with the principles of the present disclosure.

FIG. 99 shows a further embodiment wherein the lens 9930 includes a diffractive surface 9931 to enable a more compact and shorter optical design with reduced chromatic aberration. Where the diffractive surface 9931 can be comprised of a series of small annular sections of a refractive lens curve such as for example in a Fresnel lens. The diffractive surface 9931 can be flat as shown in FIG. 99 or it can have a base curve to provide additional optical power. The diffractive surface 9931 can be a single order diffractive or a multiple order diffractive. To reduce scattering of wide angle illumination light 9964 that could be incident on the diffractive surface 9931, an absorptive polarizer 9932 is provided and is oriented with its transmission axis perpendicular to the transmission axis of the reflective polarizer of the beam splitter 9452. In this way, illumination light 9964 that is transmitted by the beam splitter 9452 in the direction that would cause it to be incident on the diffractive surface 9931 is absorbed by the absorptive polarizer 9932 before it can be scattered by the diffractive surface 9931. At the same time, image light 9360 has a polarization state that is opposite to that of the illumination light 9964 so that it is reflected by the beam splitter 9452 and transmitted by the absorptive polarizer 9932 as it passes into the lens 9930.

Figure 100:
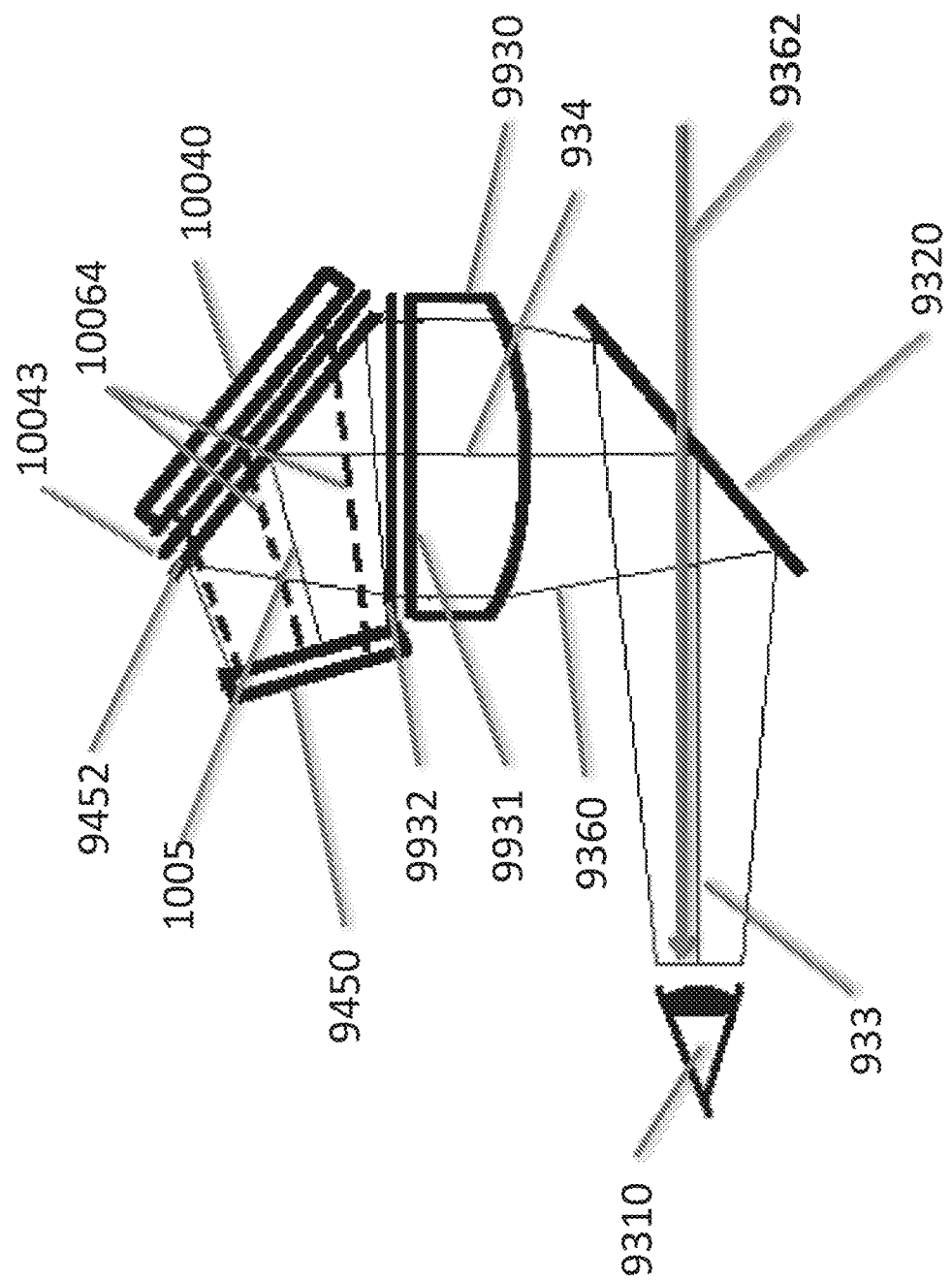
FIG. 100 illustrates an optical system in accordance with the principles of the present disclosure.

FIG. 100 shows an illustration of an optics module that includes a reduced angle between the beam splitter 9452 and the lens 9930 to reduce the overall height of the optics module. The fold angle of the image light 9360 (the deflection angle between 934 and 1005) is then more than 90 degrees and as a result, the upper edge of the beam splitter is closer to the lens 9330 thereby providing a reduced overall height of the optics module.

Figure 101:
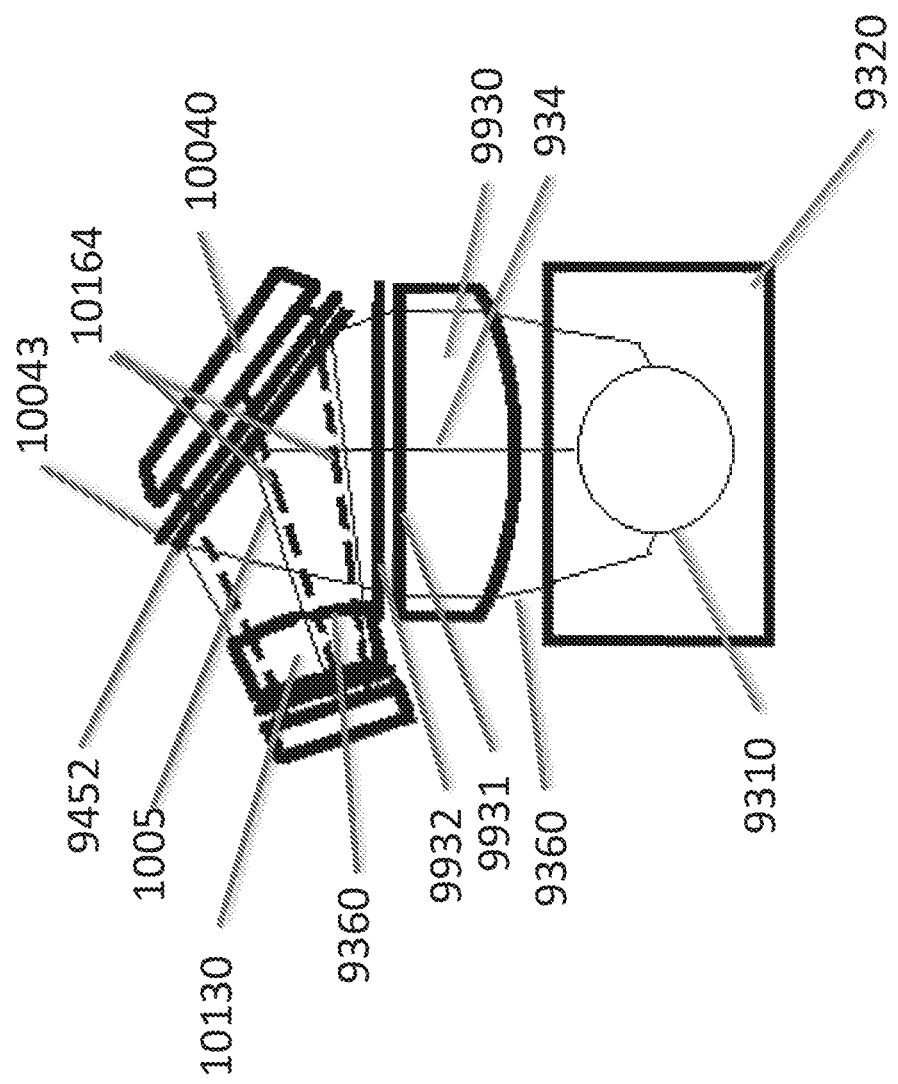
FIG. 101 illustrates an optical system in accordance with the principles of the present disclosure.

FIG. 100 also shows a compact planar light source 10040 comprised of a thin edge-lit backlight similar to what is provided in displays used in displays for mobile devices like cellphones. The compact planar light source 10040 is positioned directly behind the beam splitter 9452 to reduce the overall size of the optics module. The compact planar light source can include a light guide film or light guide plate with an edge lit light such as one or more LEDs and a reflector on the side opposite the beam splitter 9452. The compact planar light source can include a polarizer so the illumination light 10064 is polarized as previously described herein. To direct the illumination light 10064 toward the image source 9450 for improved efficiency, a turning film 10043 is positioned between the compact planar light source 10040 and the beam splitter 9452. A 20 degree prismatic turning film can be obtained for example, from Luminit 103C (Torrance, Calif.) under the name DTF. To obtain greater degrees of turning, such as 40 degrees, multiple layers of turning film 10043 can be stacked together provided they are oriented such that the turning effect is additive. A diffuser layer (not shown) can be used in addition to the turning film 10043 to reduce artifacts such as linear shadows that can be associated with prismatic structures that are typically associated with turning films 10043. FIG. 101 shows an illustration of an optics module as seen from the position of the user's eye, which is similar to that shown in FIG. 100 but with a perpendicular orientation of the added fold in the image light 10164 to reduce the thickness of the optics module as previously described herein. As in the optics module shown in FIGS. 95 and 96, the multiply folded optics shown in FIG. 101 have an optical axis 1005 associated with the illumination light 10164 that is perpendicular to both the optical axis 934 associated with the image light

9360 as it passes through the lens 9330 and the optical axis 933 associated with the image light 9360 as it proceeds toward the user's eye 9310 in the eyebox. As a result, the optics module of FIG. 101 is thinner and shorter than the optics module of FIG. 93. FIG. 101 also includes a field lens 10130 to improve the optical performance of the optics module. The addition of this second lens element is possible because of the change in fold orientation so that the field lens 10130 does not increase the thickness of the optics module, instead the added length of the optical path from the field lens 10130 occurs in the width of the optics module where space is more readily available in the head mounted display.

Figure 102:
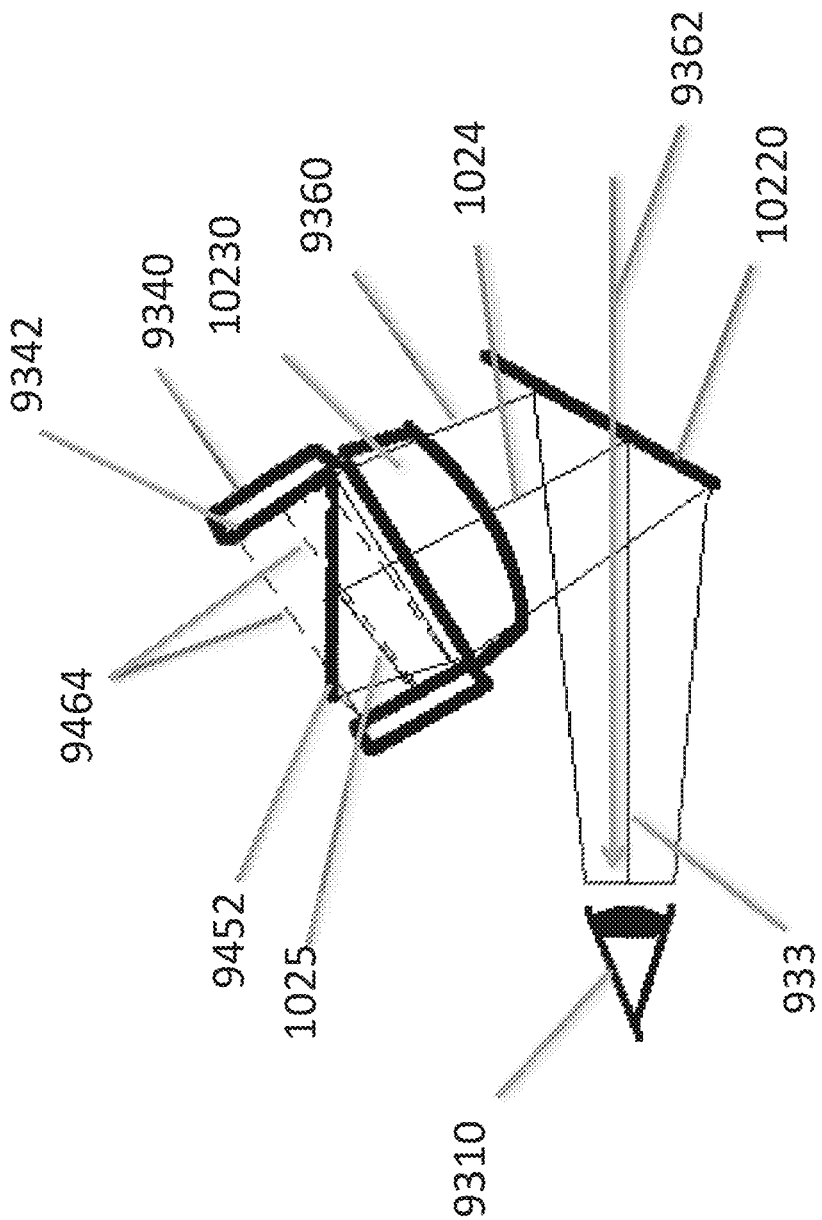
FIG. 102 illustrates an optical system in accordance with the principles of the present disclosure.

FIG. 102 shows an illustration of an optics module similar to that shown in FIG. 99 but with a different orientation of the upper portion of the optics module relative to the combiner so that the combiner 10220 can be more vertical. This rearrangement of the elements within the optics module can be important to achieve a good fit of the head mounted display onto the user's face. By making the combiner 10220 more vertical, the optics module can be made to have less interference with the user's cheekbones.

Figure 103:
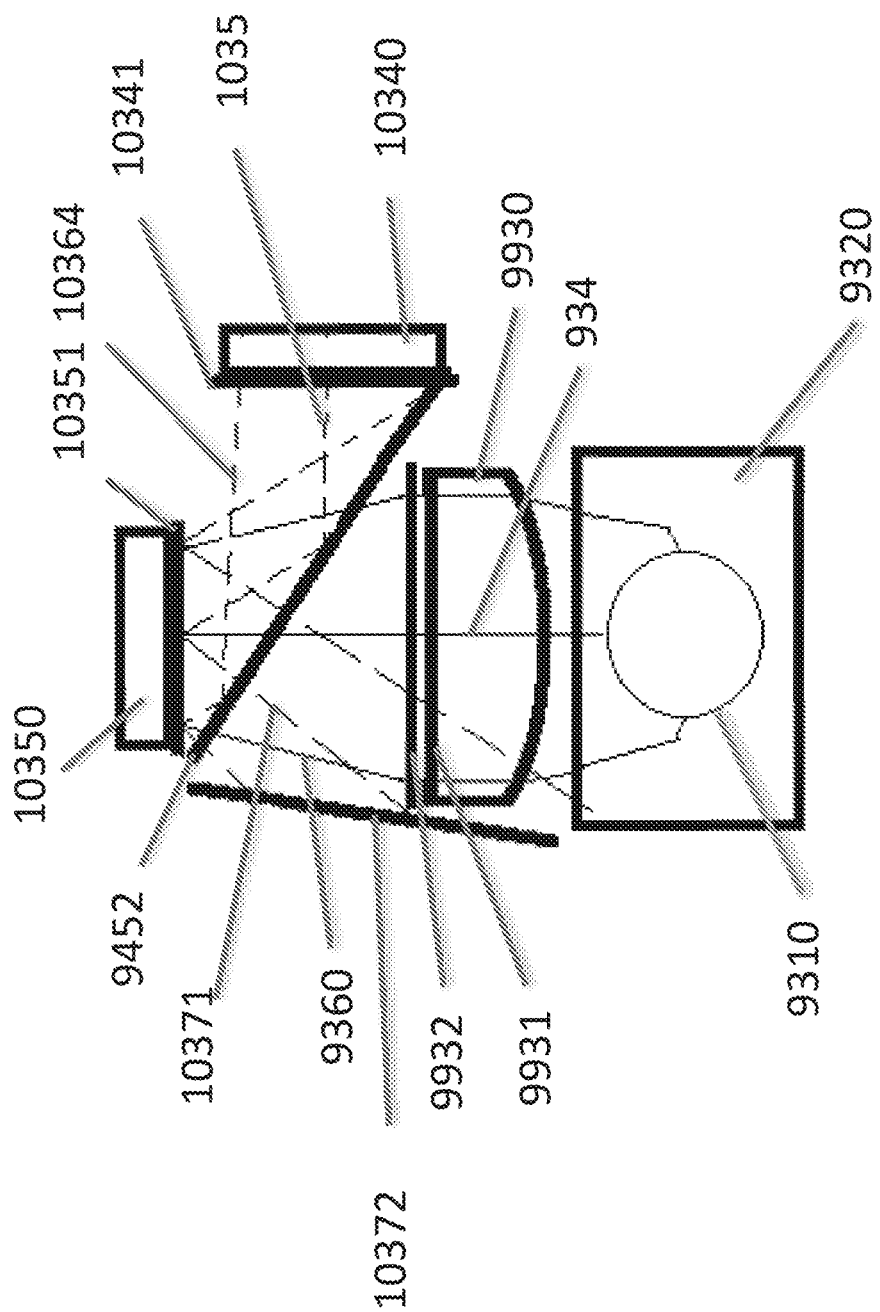
FIGS. 103, 103a and 103b illustrate optical systems in accordance with the principles of the present disclosure.
Figure 103A:
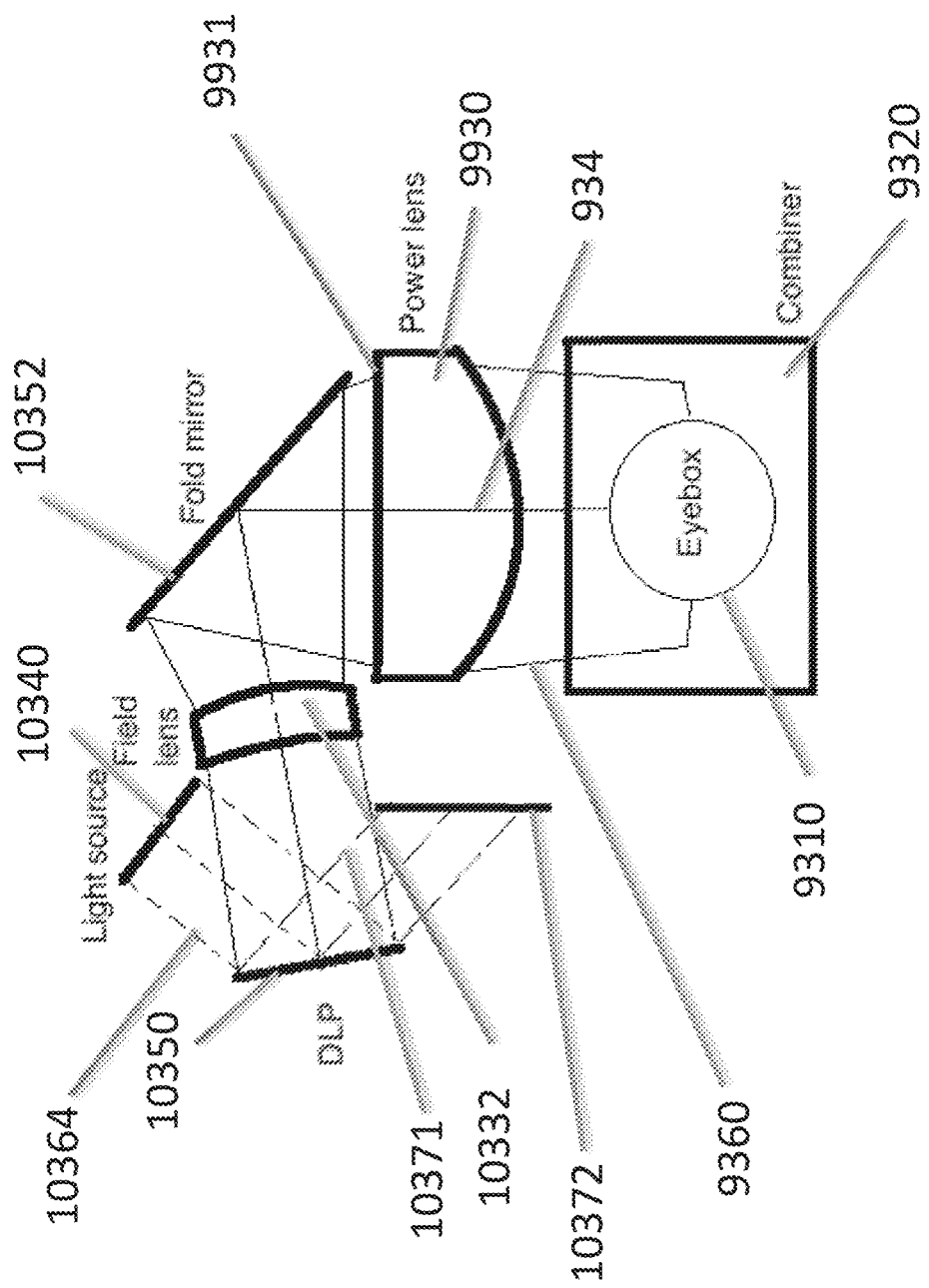
Figure 103B:
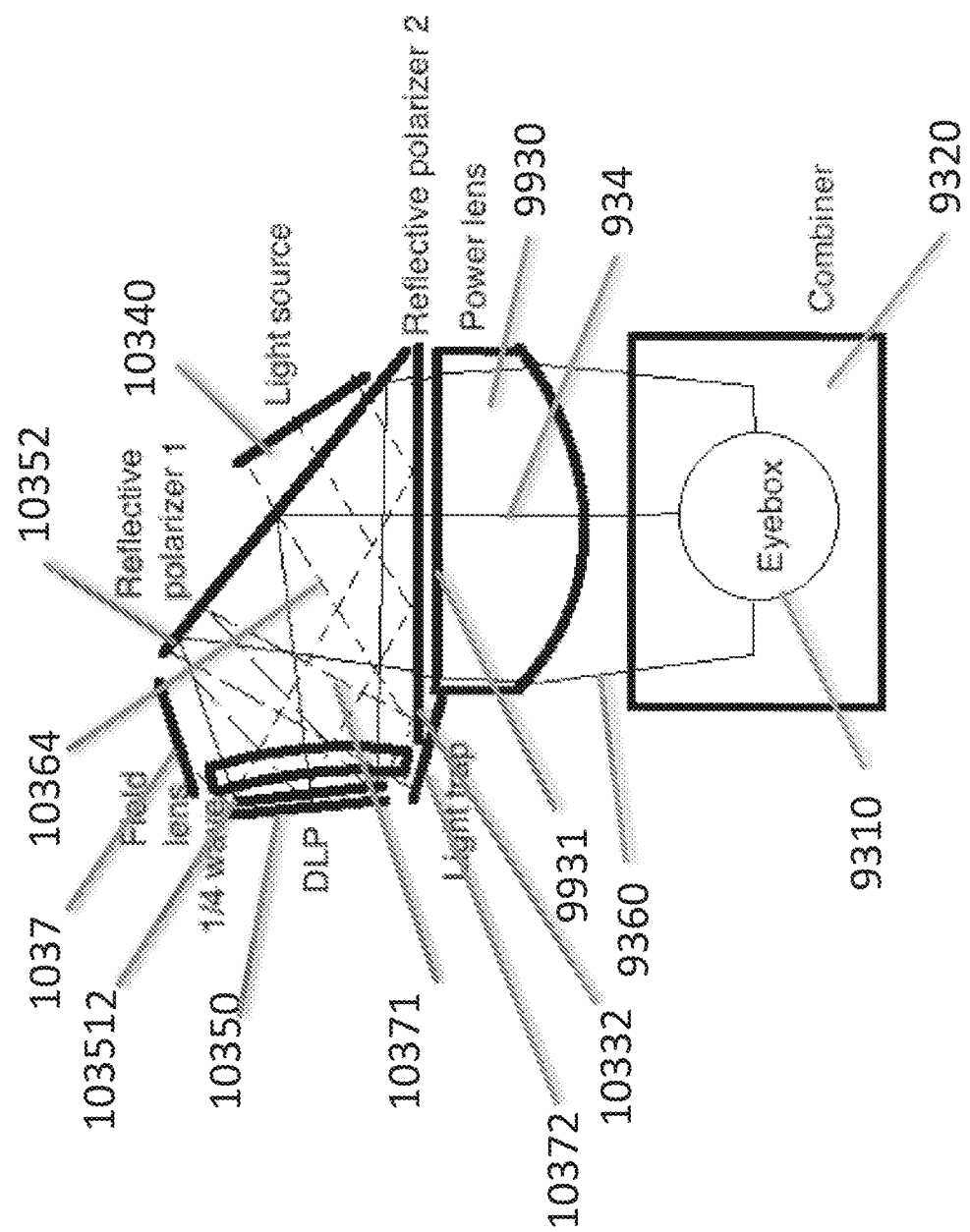

FIGS. 103, 103*a* and 103*b* show illustrations of optics modules as seen from the position of the user's eye, that include multiply folded optics and digital light projector (DLP) image sources 10350. In this case, the illumination light 10364 is provided at an oblique angle to the image source 10350 as required by the micromirrors in the DLP, to reflect image light 9360 along the optical axis 934 of the lens 9930. Where, in the case of a DLP image source 10350, image light 9360 is comprised of on-state light reflected by on-state micromirrors in the DLP image source 10350 along optical axis 934, in correspondence to the brightness of pixels in the image to be displayed to the user's eye 9310 in the eyebox. The micromirrors in the DLP image source 10350 also reflect off-state light 10371 to the side of the optics module in correspondence to the dark image content and as a result, a light trap 10372 is provided in the optics module to absorb light 10371. The light trap 10372 can be a black absorptive surface or a textured black surface. The purpose of the light trap 10372 is to absorb incident light 10371 and thereby reduce stray light and subsequently improve the contrast of the image displayed to the user's eye 9310. As previously described in other embodiments herein, the light source 10340 is provided to the side of the optics module with a multiply folded optical path to reduce the overall thickness and height of the optics module. FIG. 103 provides the DLP image source 10350 at the top of the optics module so that the image light 9360 proceeds straight along the optical axis 934, through the lens 9930 and down to the combiner 9320 where the image light is reflected toward the user's eye 9310 located in the eyebox. A polarizer 10341 is provided with the light source 10340 so that polarized illumination light 10364 is reflected by the beam splitter 9452 to illuminate the DLP image source 10350. Where, the beam splitter 9452 in this case, is a reflective polarizer that is aligned with the polarizer 10341 so that the polarized illumination light 10364 is reflected by the beam splitter 9452 and image light 9360 is transmitted by the beam splitter 9452. A quarter wave film 10351 is located adjacent to the surface of the DLP image source 10350 so that the polarization state of the image light 9360 is opposite to that of the illumination light 10364 after being reflected by the DLP image source 10350. The light source 10340 and the reflective polarizer 9452 are angularly arranged so that the illumination light 10364 is incident onto the DLP image source 10350 at the oblique angle required so that the image light 9360 when reflected by the on-state pixels in the DLP image source 10350 proceeds along the optical axis 934 of the lens 9930. A field lens (similar to 10130 as shown in FIG. 101) or other lens elements may be included in the optics of FIG. 103 but is not shown, in which case, the illumination light 10364 and the image light 9360 may pass thru the field lens or other lens elements in opposite directions.

FIG. 103*a* is an illustration of another optics module with a multiply folded optical path that includes a DLP image source 10350 and is shown from the position of the user's eye. The light source 10340 is again provided to the side of the optics module to reduce the thickness of the optics module. In this case, the light source 10340 is provided on the same side of the lens 9930 and combiner 9320, as the DLP image source 10350. Lens 9930 can optionally include one or more diffractive surfaces 9931. The light source 10340 directly illuminates the DLP image source 10350 where the illumination light 10364 is incident on the DLP image source 10350 at an oblique angle so that the image light 9360, after being reflected by the on-state micromirrors in the DLP image source 10350, proceeds along the folded optical axis 934. At least one light trap 10372 is also provided to absorb light 10371 that is reflected from off-state micromirrors in the DLP and thereby improve the contrast of the displayed image as seen by the user. A field lens 10332 is provided between the DLP image source 10350 and the fold mirror 10352. The illumination light L64 in this case can be unpolarized light whereupon the fold mirror 10352 can be comprised of a full mirror coating (e.g. a coating that reflects the entire visible light spectrum) on a substrate. The field lens 10332 can be a single lens element as shown in FIG. 103*a* or it can include multiple lens elements as needed. The field lens 10332 is designed to provide a large air gap between the field lens 10352 and the DLP image source 10350, so that the illumination light 10364 can be introduced to the optics module to directly illuminate the active area associated with the DLP image source 10350. By using unpolarized illumination light 10364, the optics module shown in FIG. 103*a* has improved efficiency over the optics module with DLP image sources 10350 shown in FIGS. 103 and 103*b*.

FIG. 103*b* is an illustration of another optics module with multiply folded optical path that includes a DLP image source 10350 and is shown from the position of the user's eye 9310 in the eyebox. As in the optics modules shown in FIGS. 103 and 103*a*, the optics module of FIG. 103*b* has the light source 10340 positioned at the side of the optics module to reduce the height and thickness of the optics module. The DLP image source 10350 is positioned opposite the light source 10340 however in this embodiment they do not share an optical axis. The illumination light 10364 passes through the beam splitter 10352, which in this case can be a first reflective polarizer. A second reflective polarizer 10332 is positioned adjacent to the lens 9930 so that the illumination light 10364 is reflected toward the DLP image source 10350. To reflect the illumination light 10364, the first reflective polarizer (beam splitter 10352) and the second reflective polarizer 10332 are oriented with perpendicular transmission axes. A quarter wave film 10351 (or quarter wave coating on the DLP cover glass) is provided adjacent to the DLP image source 10350 so that the polarization state of the illumination light 10364 is changed upon reflection from the DLP image source 10350 as it becomes image light 9360. As a result, the polarization of the illumination light 10364 is opposite to that of the image light 9360. Consequently, the illumination light 10364 is transmitted by the beam splitter 10352 and reflected by the second reflective polarizer 10332, while the image light 9360 is reflected by the beam splitter 10352 and transmitted by the second reflective polarizer 10332. The light source 10340 is oriented relative to the second reflective polarizer 10332 so that it is reflected at an oblique angle relative to the DLP image source 10350 as required to provide image light 9360 reflected from on-state micromirrors in the DLP image source 10350 along the folded optical axis 934. The second reflective polarizer 10332 can be extended beyond the lens 9930 to provide the required oblique angle to fully illuminate the DLP image source 10350 as shown in FIG. 103b. Because the light source 10340 is located behind the beam splitter 10352, which is a reflective polarizer, the light source 10340 does not affect the image light 9360 and as a result, the light source 10340 can be a different size and orientation than the beam splitter 10352. One or more light traps 10372 are provided to absorb light 10371 that is reflected from off-state micromirrors in the DLP image source 10350 and thereby improve the contrast of the displayed image. In this case, the light trap 10372 can be positioned under the second reflective polarizer 10332 because the polarization state of the light 10371 is such that it is reflected by the beam splitter 10352 and transmitted by the second reflective polarizer 10332. The combined orientation of the light source 10340, the beam splitter 10352 and the DLP image source 10350 provides an optics module that is relatively thin and relatively short compared to optics modules where the image source or the light source are positioned above the fold mirror or beam splitter (e.g. such as the optics module shown in FIG. 103).

Figure 97:
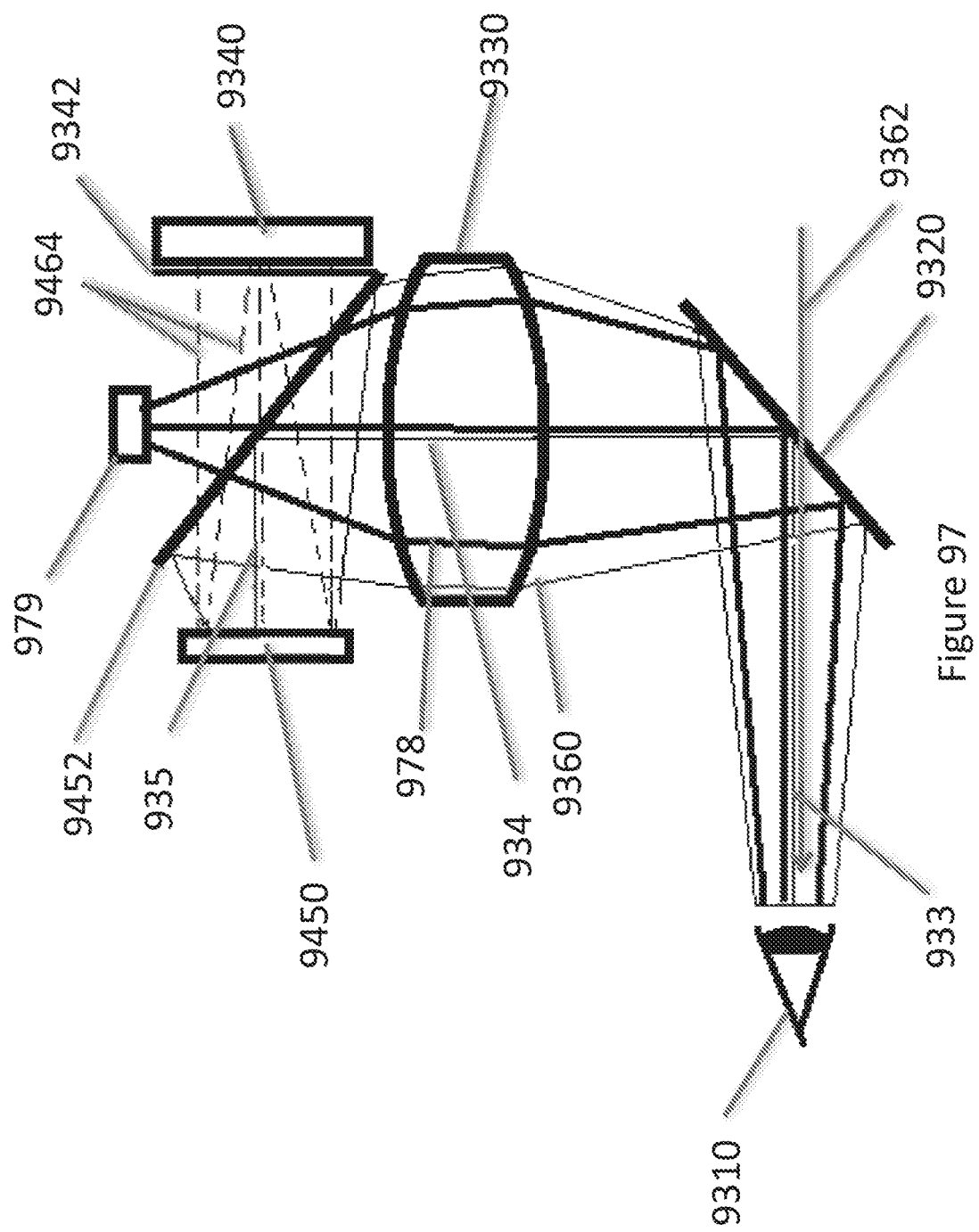
FIG. 97 illustrates an optical system in accordance with the principles of the present disclosure.
Figure 98:
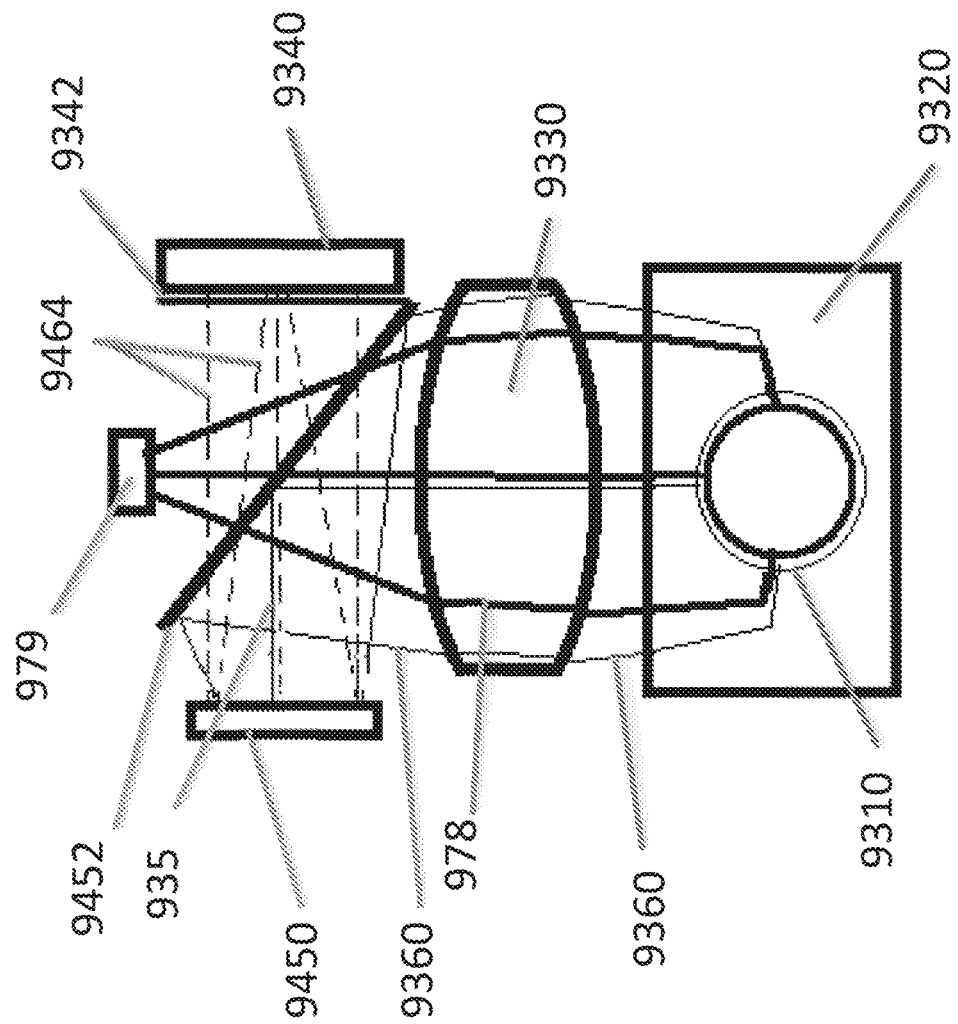
FIG. 98 illustrates an optical system in accordance with the principles of the present disclosure.

FIGS. 97 and 98 show illustrations of optics modules similar to those shown in FIG. 94 but with the addition of an eye imaging camera 979 for capturing images of the user's eye 9310 during use. In these cases, the light source 9340 and image source 9450 are positioned opposite one another so that the eye imaging camera 979 can be positioned directly above the lens 9340 so that the optical axis 934 is shared between the optics module and the eye imaging camera 979. By sharing a common optical axis, the eye imaging camera 979 can capture an image of the user's eye 9310 that has a perspective from directly in front of the user's eye 9310. Image light 9360 can then be used to illuminate the user's eye 9310 during image capture. A portion of the light reflected from the user's eye 9310, which can be unpolarized, passes through the beam splitter 9452 before being captured by the eye imaging camera 979. Because the eye imaging camera 979 is located above the beam splitter 9452, if the beam splitter 9452 is a reflective polarizer, the polarization state of the image light 9360 will be opposite to that of the light 978 captured by the eye imaging camera 979. The eye imaging camera 979 can be used to capture still images or video. Where video images can be used to track movements of the user's eye when looking at displayed images or when looking at a see-through view of the environment. Still images can be used to capture images of the user's eye 9310 for the purpose of identifying the user based on patterns on the iris. Given the small size of available camera modules, an eye imaging camera 979 can be added to the optics module with little impact on the overall size of the optics module. Additional lighting can be provided adjacent to the combiner 9320 to illuminate the user's eye. The additional lighting can be infrared, so the user can simultaneously view images displayed with visible light. If the additional lighting is infrared, the eye camera 979 must be capable of capturing images at matching infrared wavelengths. By capturing images of the user's eye from the perspective of directly in front of the user's eye, undistorted images of the user's eye can be obtained over a wide range of eye movement.

FIG. 120 shows an illustration of another embodiment of an eye imaging camera associated with the optics module shown in FIG. 101, however the eye imaging camera can be similarly included in optics modules such as those shown in FIGS. 99, 100, 103, 103b. These optics modules include absorptive polarizers 9932 to reduce stray light as previously disclosed herein. These optics modules can also include a diffractive surface 9931, but the diffractive surface 9931 is not required for the operation of the eye imaging camera 979. In this embodiment, the polarization state of the image light 9360 is the same as that of the light that is reflected by the user's eye and captured by the eye imaging camera 979 since they both pass through the absorptive polarizer 9932. In this embodiment, the eye imaging camera 979 is positioned adjacent to the beam splitter 9452 and the compact planar light source 10040 and between the beam splitter and the field lens 10130. The optical axis 12034 of the light reflected by the eye is then angled somewhat relative to the optical axis 934 of the image light 9360, so that the center of the user's eye 9310 and the associated eyebox are within the field of view of the eye imaging camera 979. In this way, the eye imaging camera 979 captures images of the user's eye from nearly directly in front and only slightly to the side of the user's eye 9310 as shown in FIG. 120. While FIG. 120 shows the eye imaging camera 979 positioned adjacent to an end of the beam splitter 9452, it is also possible to position the eye imaging camera 979 adjacent to a side of the beam splitter 9452. The advantage of this embodiment is that the eye imaging camera 979 is provided with a simple optical path so that high image quality is possible in the captured images of the user's eye 9310. It should be noted that the optics associated with the eye imaging camera must take into account the effect of the lens 9930 since the light reflected by the user's eye 9310 that is captured by the eye imaging camera passes through the lens 9930. Also, the addition of the eye imaging camera 979 does not substantially increase the volume of the optics module as can be seen by comparing FIG. 120 to FIG. 101.

FIG. 121 shows an illustration of a further embodiment of an optics module that includes an eye imaging camera 979. Similar to the embodiment shown in FIG. 120, this optics module also includes an absorptive polarizer 9932 to reduce stray light and a diffractive surface 9931 may be included, but is not required. In this embodiment, the eye imaging camera 979 is positioned between the beam splitter 9452 and the field lens 10130 and pointed towards the beam splitter 9452. In this way, light reflected by the user's eye 9310 is reflected upwards by the combiner 9320, passes through the lens 9930 and the absorptive polarizer 9932 and then is reflected laterally toward the eye imaging camera 979 by the beam splitter 9452. The light captured by the eye imaging camera 979 is thereby the same polarization state as the image light 9360, so that it is reflected by the beam splitter 9452 and transmitted by the absorptive polarizer 9932. The light reflected by the user's eye 9310 can be unpolarized as initially reflected by the user's eye 9310, however, after passing through the absorptive polarizer 9932, the light becomes polarized with the same polarization state as the image light 9360. An advantage of this embodiment is that it is even more compact than the embodiment shown in FIG. 120. This arrangement of the eye imaging camera 979 is also possible in the optics modules shown in FIGS. 99, 100, 103, 103a and 103b.

In the embodiments shown in FIGS. 120 and 121, the user's eye 9310 and the associated eyebox can be illuminated by image light 9360 or an additional light source can be provided for example, by an LED positioned adjacent to the combiner 9320. Where the LED can provide visible light or infrared light, provided the eye imaging camera can capture at least a portion of the wavelengths of light provided by the LED.

In an alternative embodiment for the optics module shown in FIG. 103a, the light source 10340 provides polarized illumination light 10364 and the fold mirror 10352 is a reflective polarizer plate so that an eye camera (not shown) can be positioned above the fold mirror 10352 and along the optical axis 934 for capturing images of the user's eye 9310 similar to that shown in FIGS. 97 and 98. The eye camera and the optics module then share a common optical axis 934 so that images of the user's eye 9310 are captured from directly in front of the eye. In this arrangement, the polarization state of the image light 9360 is opposite to that of the light captured by the eye camera because the image light 9360 is reflected by the fold mirror 10352 and the light captured by the eye camera is transmitted by the fold mirror 10352.

Figure 104:
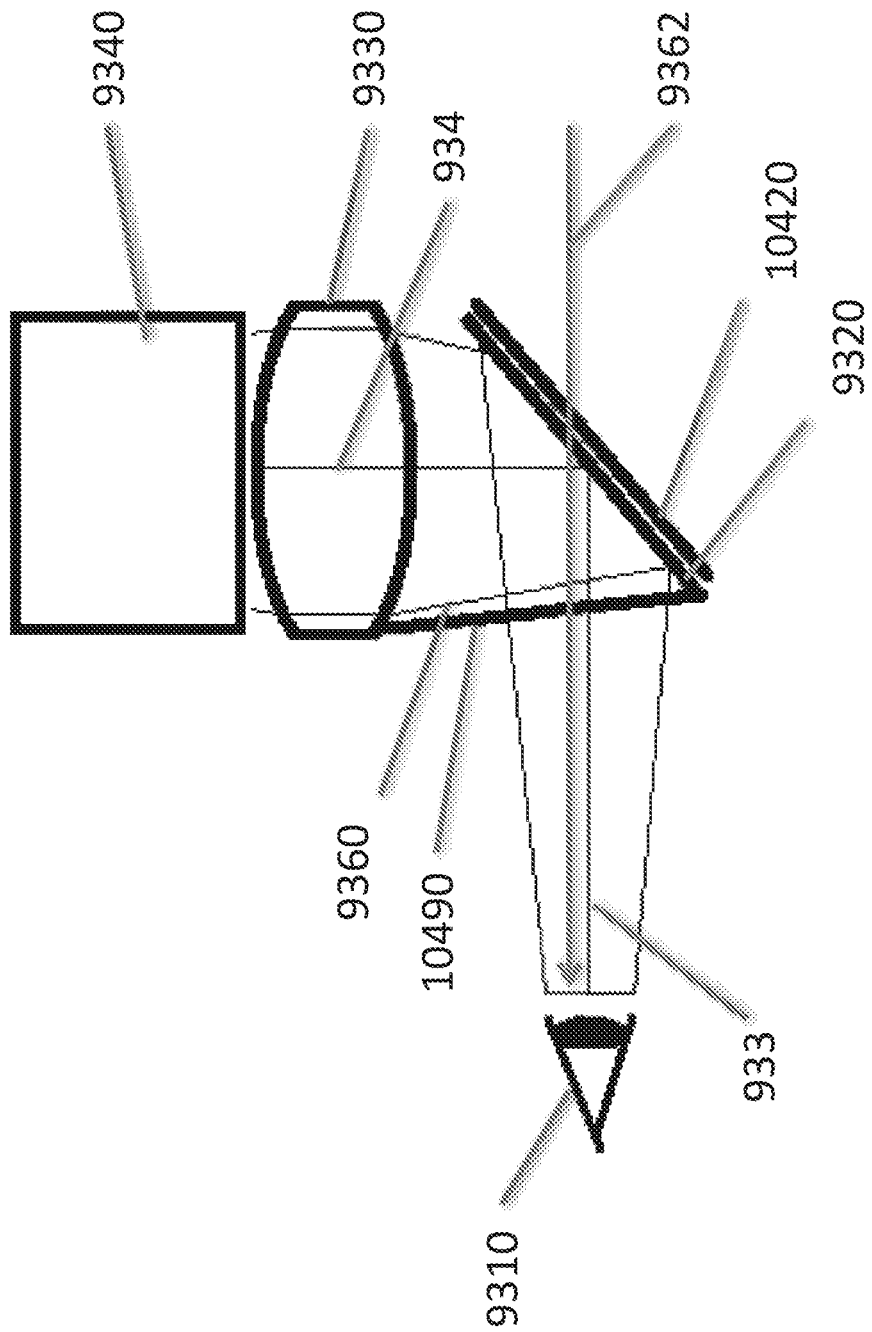
FIG. 104 illustrates an optical system in accordance with the principles of the present disclosure.
Figure 105:
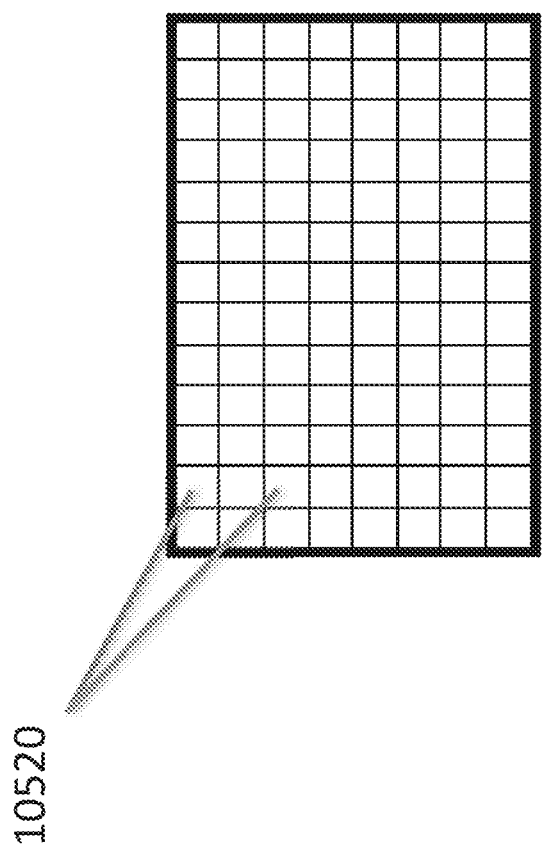

FIG. 104 shows an illustration of the optics module of FIG. 95 with the additional element of a controllable light blocking element to improve contrast in portions of the displayed image and also to improve the appearance of opacity in displayed objects such as augmented reality objects. Where the controllable light blocking element can operate by absorbing the incident light or scattering the incident light as provided, for example, by an electrochromic element, a polymer stabilized liquid crystal or a ferroelectric liquid crystal. Examples of suitable light blocking elements includes: 3G Switchable Film from Scienstry (Richardson, Tex.); Switchable Mirror or Switchable Glass from Kent Optronics (Hopewell Junction, N.Y.). The controllable light blocking element 10420 is shown in FIG. 104 as being attached to the lower surface of the combiner 9320 so that it doesn't interfere with the displayed image while blocking see-thru light from the environment 9362. Provided the combiner 9320 is flat, the addition of controllable light blocking elements 10420 adjacent to the combiner 9320 is easily done either by attaching directly to the combiner or attaching to the sidewalls of the optics module housing. The controllable light blocking element 10420 can have a single area that can be used to block a selectable portion of the see-through light from the environment over the entire combiner 9320 area thereby enabling a selectable optical density. Alternatively the controllable light blocking element 10420 can provide an array of areas 10520, as shown in FIG. 105, that can be separately selectably controlled to block portions of the combiner 9320 area that correspond to areas in the displayed image where high contrast areas of the image are located. FIG. 105 shows an illustration of an array of separately controllable light blocking elements 10520. FIGS. 106a, 106b and 106c are illustrations of how the array of separately controllable light blocking elements 10520 can be used. FIG. 106a shows how the array of separately controllable light blocking elements 10520 can be put into blocking modes in areas 10622 and non-blocking modes in areas 10623. Where the blocking mode areas 10622 correspond to areas where information or objects are to be displayed such as is shown in the corresponding areas in the illustration of FIG. 106b. FIG. 106c shows what the user sees when the image of FIG. 106b is displayed with the array of controllable light blocking elements 10520 used in light blocking modes 10622 and non-blocking modes 10623. The user then sees the displayed information or objects overlaid onto a see-through view of the environment, but in the areas where information of objects are displayed, the see-through view is blocked to improve the contrast of the displayed information or object and provide a sense of solidness to the displayed information or objects.

In addition, FIG. 104 shows a rear optical element 10490 that can be a protective plate or a corrective optic. The protective plate can be connected to sidewalls and other structural elements to stiffen the positioning of the combiner 9320 and to prevent dust and dirt from getting onto the inner surface of the combiner 9320. The corrective optics can include a prescriptive optic, which includes the ophthalmic prescription (optical power and astigmatism for example) of the user to improve the viewing experience.

Head mounted displays provide the user with freedom to move their head while watching displayed information. See-through head mounted displays also provide the user with a see-through view of the environment whereupon the displayed information is overlaid. While head mounted displays can include various types of image sources, image sources that provide sequential color display typically provide higher perceived resolution relative to the number of pixels in the displayed images because each pixel provides image content for each of the colors and the image perceived by the user as a displayed full color image frame is actually the sum of a series of rapidly displayed sequential color subframes. For example, the image source can sequentially provide subframe images comprised of a red image, a green image and then a blue image that are all derived from a single full color frame image. In this case, full color images are displayed at an image frame rate that includes a series of at least three sequentially colored subframes that are displayed at a subframe rate which is at least 3× the image frame rate. Sequential color images sources include reflective image sources such as LCOS and DLP.

The color breakup that occurs with a sequential color display occurs because the different color subframe images that together provide the user with a full color frame image are displayed at different times. The inventors realized that with sequential color display in a head mounted display, when there is movement of the head-mounted display or movement of the user's eyes, such that the user's eyes do not move in synch with the displayed image that under such movement conditions the perceived locations of each of the sequential color image subframes are different within the user's field of view. This can happen when the user moves his head and the user's eyes do not follow the same trajectory as the head mounted display, which can be due to the user's eyes moving in a jerky trajectory as the eyes pause to look at an object in the see-through view of the environment. Another way this can happen is if an object passes through the see-through view of the environment and the user's eyes follow the movement of the object. Due to this difference in perceived locations within the user's field of view, the user sees the sequential color images slightly separated at the edges of objects. This separation of colors at the edge of objects is referred to as color breakup. Color breakup may be easily perceived during certain movements because the sequential colors are vividly colored in areas where they do not overlap one another. The faster the user moves their head or the faster the user's eyes move across the display field of view, the more noticeable the color breakup becomes, because the different color subframe images are separated by a greater distance within the field of view. Color breakup is particularly noticeable with see-through head mounted displays, because the user can see the environment and the user's eyes tend to linger on objects seen in the environment as the user turns his head. So even though the user may turn his head at a steady rotational rate, the user's eye movement tends to be jerky and this creates the conditions where color breakup is observed. As such there are two different conditions that tend to be associated with color breakup: rapid head movement and rapid eye movement.

It is important to note that when the user is not moving his head and the head mounted display is not moving on the user's head, color breakup will not be observed because the subframe images are provided at the same positions within the field of view of the user's eyes. Also, if the user were to move his head and the user moves his eyes in synch with the head movement, color breakup will not be observed. So movement of the head mounted display is indicative of conditions that can lead to color breakup and is also indicative of the degree of color breakup that can occur if the user moves his eyes relative to the movement of the head mounted display. Color breakup is less of an issue with head mounted displays that do not have see-through to the environment, because only the displayed image content is visible to the user and it moves in synch with the movement of the head mounted display. Color breakup is also not an issue if a monochrome image is displayed with a monochrome light source (i.e. there are no sequential color subframes, instead there are only single color frames) since all the displayed images are comprised of the same color. Thus, color breakup is an issue that is most noticeable with head mounted displays that provide a see-through view of the environment.

Systems and methods according to the principles of the present disclosure reduce color breakup and thereby improve the viewing experience provided by a head-mounted display with see-through when the user is moving through the environment.

In embodiments, systems and methods are provided where the head-mounted display detects the speed of movement of the head-mounted display and in response, the resolution of the image is reduced or the bit depth of the image is reduced, while the image frame rate at which the image is displayed and the associated subframe rate are correspondingly increased. In this way, the bandwidth associated with the display of the image can be maintained constant, in spite of the frame rate being increased. Where, by increasing the frame rate associated with the display of images, the time between the display of each sequential color subframe image is reduced and as a result the visually perceived separation between the sequential color images is reduced. Similarly the image frame rate can be reduced while the subframe rate is increased by increasing the number of subframes displayed for each image frame.

In further embodiments, systems and methods are provided where the sequential color subframe images are shifted laterally or vertically relative to one another by a number of pixels that corresponds to the detected movement of the head mounted display. In this way, the color sequential subframe images are displayed to the user such that they are visually overlaid on top of each other within the displayed field of view. This compensates for separation between subframes and thereby reduces color breakup.

In yet another embodiment, systems and methods are provided where an eye-imaging camera in the head-mounted display is used to track the movement of the user's eyes. The movement of the head-mounted display may be simultaneously measured. An accommodation in the presentation may then be made to reduce color breakup. For example, the resolution of the images and the frame rate may be changed or the image frame rate can be reduced while increasing the subframe rate, in correspondence to the difference in movement of the user's eyes and the movement of the head mounted display. As another example, the subframes may be shifted to align the subframes in correspondence to the determined difference in movement between the user' eyes and the head mounted display. As a further example, the color saturation of the content may be reduced to reduce the perception of color breakup due to the fact that the colors, while positionally separated as perceived by the user, are not as separated in color space. In yet a further example, the content could be converted to monochrome imagery which is displayed as a single color image (e.g. white) during the detected movement so that color breakup is not visible.

FIG. 107 shows an example of a full color image 10700 that includes an array of pixels, including portions of red, green and blue pixels. For sequential color display, three subframe images are created that are each comprised of only one color, such as only red or only green or only blue. Those skilled in the art will recognize that sequential color images that together provide a perceived full color image can also be comprised of subframes of cyan, magenta and yellow. These subframe images are rapidly displayed in sequence to the user on the head-mounted display so that the user perceives a full color image that combines all three colors. With a reflective display such as an LCOS or a DLP, the subframe images are displayed by changing the reflective display to provide the respective image content associated with the particular subframe image and then illuminating the reflective display with the associated color light, so the light is reflected to provide the subframe image to the optics of the head-mounted display and from there to the user's eye.

If the subframe images are accurately aligned with each other, then the full color image perceived by the user will be full color out to the edges of the image and there will be no color breakup. This is what is typically seen by the user of a head-mounted display when the head-mounted display is stationary on the user's head and the user is not moving his eyes. However, if the user moves his head or the head-mounted display moves on the user's head (such as due to vibration) and the user's eyes are not moved in unison with the displayed image, the user will perceive the subframe images to be laterally (or vertically) offset relative to one another as shown by illustrations 10802 and 10804 in FIGS. 108A and 108B. The perceived amount of lateral offset between the displayed subframe images is related to the speed of movement of the head-mounted display and the time between the display of the sequential subframe images, which is also known as subframe time or 1/subframe rate. The lateral shifting between subframe images, that is perceived by the user, is the color breakup and color breakup is perceived as fringes of color at the edges of objects. When the user moves his head (or eyes) quickly and the subframe rate is slow, color breakup can be substantial as illustrated in FIG. 108A. If the user moves his head slowly or the subframe rate is higher, the color breakup is less as illustrated in FIG. 108B. If the color breakup is less than one pixel, in digital imaging, in lateral shifting, the user will perceive there to be no color breakup.

Display frame rate in a head-mounted display is typically limited by either the bandwidth of the processor and associated electronics or by the power required to drive the processor and associated electronics, which translates into battery life. The bandwidth required to display images at a given frame rate is related to the number of frames displayed in a period of time and the number of pixels in each frame image. As such, simply increasing the frame rate to reduce color breakup is not always a good solution as it requires a higher bandwidth which the processor or associated electronics may not be able to support and power usage will be increased thereby reducing battery life. Instead, systems and methods in accordance with the principles of the present disclosure provide a method of display wherein the number of pixels in each subframe image is reduced thereby reducing the bandwidth required to display each subframe image while simultaneously increasing the subframe rate by a corresponding amount to maintain bandwidth while reducing color breakup. This embodiment is suitable for situations wherein subframe images can be provided with different numbers of pixels and different frame rates. For example, it would be suitable in camera and display systems where the capture conditions can be changed to provide images with a lower resolution that can then be displayed with a faster subframe rate. Static images such as text or illustrations can be displayed with a lower frame rate and a faster subframe rate to reduce color breakup since the image content doesn't change quickly. Alternatively, images can be modified to be displayed at lower resolution (fewer pixels) with a faster frame rate or subframe rate to reduce color breakup.

FIG. 109 shows an illustration of the timing of a sequential color image comprised of sequential display of a red subframe image 10902 followed by a green subframe image 10904 followed by a blue subframe image 10908 in a repeating process. As long as the subframes together are displayed at a full color image frame rate that is greater than approximately 24 frames/sec, such that the sequential color subframes are displayed at a subframe rate of greater than 72 subframes/sec, the human eye will perceive full color moving images without flicker. This condition is suitable for displaying a video image without color breakup when the head-mounted display is stationary or moving relatively slowly. However, if the user moves his head such that the head-mounted display moves rapidly, color breakup will occur. This color breakup occurs because rapid head movements are typically a reaction of the user to something occurring in the environment (e.g. a loud noise) so that the user's eyes are searching the environment during the rapid head movement, which leads to jerky eye movements and substantial color breakup.

Movement of the head-mounted display can be detected by an inertial measurement unit, which can include accelerometers, gyro sensors, magnetometers, tilt sensors, vibration sensors, etc. Where only the movements within the plane of the display field of view (e.g. x and y movements and not z movement) are important for detecting conditions where color breakup may occur. If the head-mounted display is detected to be moving above a predetermined threshold where color breakup is predicted to occur (e.g. greater than 9 degrees/sec), in embodiments, the resolution of the images may be reduced (thereby reducing the number of pixels in the images and effectively making each pixel larger within the display field of view) and the subframe rate may be correspondingly increased. Note that the subframe rate can be increased without changing the image frame rate by increasing the number of subframes that are displayed sequentially, for example six subframes could be displayed for each image frame wherein the sequential color subframe images are each displayed twice. By increasing the number of subframes displayed for each image frame, the subframe rate can be increased without having to increase the image frame rate, which can be more difficult to change because the image frame rate is typically provided by the source of the image content such as in a movie. FIG. 110 shows an illustration of a faster subframe rate, wherein the display time for each subframe, 11002, 11004, and 11008 is reduced and the time between display of each sequential subframe is also reduced. FIG. 110 shows a subframe rate that is approximately twice as fast as that shown in FIG. 109. The associated image frame rate can be twice as fast in FIG. 110 as compared to FIG. 109, where both the image frame rate and the subframe rate are doubled. Alternatively, as previously described, the image frame rate can be unchanged between FIGS. 109 and 110, where only the subframe rate is doubled to reduce color breakup. To enable the bandwidth associated with the display of the images shown in FIG. 110 to be approximately the same as the bandwidth associated with the display of subframe images shown in FIG. 109, the resolution (number of pixels in each subframe image) is reduced by approximately a factor of two.

While reducing the resolution of the displayed subframe images in correspondence to an increase in the subframe rate may seem to degrade the image quality perceived by the user, the human eye is not capable of perceiving high resolution when there is substantial movement. As such, color breakup is more visible than a reduction in the resolution of the image when the eye is moving. Consequently, the systems and methods of the present disclosure trade reduced image resolution for increased image frame rate to reduce color breakup without a perceptible loss in resolution, and bandwidth is thereby maintained. This technique can be used, for example, to reduce color breakup by a factor of up to 16, where the resolution of the displayed image is reduced to 1/16th the original resolution and the frame rate of the displayed image is increased by 16×.

In another embodiment of the disclosure, when movement of the head-mounted display is detected, the subframe images associated with a full color frame image are digitally shifted relative to one another in a direction counter to the detected direction of movement and with an amount that corresponds to the detected speed of movement. This effectively compensates for the perceived offset between the displayed subframe images that causes color breakup. The digital shifting is applied only to the subframes that together comprise a full color frame image. This is different from typical digital image stabilization wherein full color frame images are digitally shifted relative to one another to compensate for movement as described, for example, in United States patent publication 2008/0165280. By applying the digital shifting to the subframes that constitute a single full color frame image, the amount of digital shifting required to reduce color breakup is typically only a few pixels even when the detected movement speed is high, this is in contrast to typical digital image stabilization where fast movements result in accumulating shifts of the frame image so that the image effectively moves outside of the display field of view or the amount of digital stabilization that can be applied is limited. FIGS. 111*a* and 111*b* illustrate this embodiment. FIG. 111*a* shows how sequentially displayed subframe images, 11102, 11104, and 11108 would be perceived by the user when there is substantial movement, wherein the different colors associated with the subframes are separately visible along the edges of objects, evenly spaced across the field of view in the direction of movement. In contrast, FIG. 111*b* shows how the visibility of the subframes is changed when the subframes are digitally shifted to compensate for the detected movement and thereby reduce the separation between the subframes across the field of view, and as a result the user perceives a series of full color frame images 11120 with reduced color breakup. As shown in FIG. 111*b*, the full color frame images are not image stabilized or digitally shifted in response to the detected movement.

In embodiments, movement direction and speed of the head-mounted display is detected by the IMU sensor immediately prior to the display of each full color frame image. If the movement speed is above a predetermined threshold, the sequentially displayed color subframes associated with each full color frame are digitally shifted relative to one another so that they are displayed in an aligned position within the display field of view. The magnitude of the shift corresponds to the speed of the detected movement and the direction of the shift is counter to the detected direction of movement.

In an example, the movement of the head-mounted display is detected immediately prior to display of a first subframe associated with a full color frame image. The first subframe associated with the full color frame image can then be displayed without a shift. The second subframe can be shifted by an amount and direction that compensates for the movement that occurs between the display of the first and second subframes and then is displayed. The third subframe can be shifted by an amount and direction that compensates for the movement that occurs between the display of the first subframe and the third subframe and is then displayed. The movement of the head-mounted display is then detected again to determine the shifts to be applied to the subframes associated with the next full color frame image. Alternatively, the subframes can be shifted by an amount that compensates for a portion of the movement that occurs between the subframes.

In a further example, the direction and speed of movement of the head-mounted display is detected immediately prior to the display of a reference subframe. Subsequent subframes are then shifted to compensate for movement that occurs between the time the reference subframe is displayed and the time that the subsequent subframe is displayed. Wherein the time that the reference subframe is displayed and the time that the subsequent subframe is displayed may be up to 5 frame times.

An advantage of this embodiment is illustrated by examining the effective frame rates associated with the color breakup and the blur of the image. If the full color image is displayed with an image frame rate of 60 frames/sec, the subframes would typically be displayed at a subframe rate of 180 frames/sec to provide three subframes for each image frame. The described system and method effectively shifts the subframes so that they are positioned on top of one another, so the color breakup is reduced to an amount that corresponds to 180 frames/sec. At the same time, the blur perceived by the user between image frames corresponds to 60 frames/sec since each of the subframes is derived from the same full color frame image.

In further embodiments, the digital shifting of the subframes that is based on detected movement immediately prior to the display of each full color frame image can be combined with digital image stabilization that is applied between the full color frame images.

In yet further embodiments, the method of digital shifting of subframes is combined with the method of increasing frame rate with a simultaneous reduction in image resolution. These two methods of reducing color breakup operate on different aspects of the image processing associated with displaying an image in a head mounted display, as such they can be independently applied in either order in the image processing system associated with the processor.

In yet another embodiment, the head mounted display includes a camera for detecting the eye movements of the user (e.g. as described herein) relative to the movement of the head mounted display. The eye camera can be used to measure the speed of eye movement and the direction of eye movement. In embodiments, the resolution of eye cameras can be relatively low (e.g. QVGA or VGA) so that the frame rate can be relatively high (e.g. 120 frames/sec) without introducing bandwidth limitations. The detected eye movements relative to the head-mounted display can be used to determine when to apply methods to reduce color breakup including, for example, increasing the frame rate and digitally shifting the subframes as has been previously described herein. For example, if the detected eye movement is above a predetermined angular speed, the resolution of the displayed images can be reduced and the subframe rate can be increased. In another example, the detected eye movement can be used to determine the amount and direction of digital shifting applied to subframes within an image frame prior to display of the subframes. In yet another example, measured eye movements can be used in combination with detected movements of the head-mounted display to determine the amount and direction of digital shifting applied to subframes within an image frame prior to display of the subframes. The amount and direction of digital shifting applied to the subframes can be in correspondence to the difference between the detected movements of the head mounted display and the detected eye movements of the user. Where the detection of a condition where the user's eye is moving one direction and the head mounted display is moving in an opposing direction represents a situation where particularly bad color breakup can occur. In this case, combined methods for reducing color breakup are advantageous.

In another yet further embodiment, when movement of the head-mounted display or eye movement is detected above a predetermined threshold, the images are changed from color sequentially displayed full color images to monochrome images. The monochrome images can be comprised of combined image content from each of the color sequential subframes associated with each full color image frame. Where the monochrome images can be grey scale or luma images wherein the luma code values (Y) for each pixel can be calculated for example as given in Equation 1 below as taken from http://en.wikipedia.org/wiki/Grayscale and as referenced to the CIE 1931 standard for digital photography:

$$Y = 0.2126R + 0.7152G + 0.0722B \qquad \text{Equation 1}$$

where R is the red code value for the pixel, G is the green code value for the pixel and B is the blue code value for the pixel. Alternatively, monochrome images can be comprised of single color images such as the green subframe image, and this image can be displayed either with a single color or preferably with simultaneous application of all the sequential colors (e.g. red, green and blue) so that the applied illumination onto the reflective image source is white light and as a result, the displayed image appears as a grey scale image.

Several more specific examples are provided below.

Example 1

For a 26 deg display field of view and a 1280 pixel horizontally wide image, a pixel occupies 0.020 deg within the display field of view. If the frame rate of the full color images is 60 Hz, with three color sequential subframes images, the subframe time is 0.006 sec. The rotational speed of the head mounted display needed to produce one pixel of color breakup is then 3.6 deg/sec. If the number of horizontal pixels in the display field of view is reduced to 640 pixels and simultaneously the frame rate of the full color images is increased to 120 Hz, with three color sequential subframes images, the subframe time is reduced to 0.003, the size of a pixel is increased to 0.041 deg and the rotational speed to produce one pixel of color breakup is 14.6 deg/sec.

Example 2

For a 26 deg display field of view and a 1280 pixel horizontally wide image, a pixel is 0.020 deg within the display field of view. If the smallest size that the user can detect for color breakup is one pixel wide, then a rotational speed of over 3.6 deg/sec is required if the subframe rate is 180 Hz, before color breakup is detected by the user. Even though the color breakup is an analog effect, the user's eye does not have the resolution to detect the color fringes that are present during movement below this speed. So below this rotational speed, color breakup management is not required.

Example 3

For a 26 deg display field of view and a 1280 pixel horizontally wide image, a pixel is 0.020 deg within the display field of view. If the user can detect color breakup as small as one pixel wide, then a rotational speed of 3.6 deg/sec will require a shift of the subframes relative to each other of one pixel if the subframe rate is 180 Hz, to align the subframes so that color breakup is not visible to the user. If the user rotates their head at 15 deg/sec, then the subframes will require a shift of 4 pixels relative to one another to align the subframes so that color breakup is not visible. If the image frame begins with the display of the red subframe image, then no digital shifting is required for the red subframe image. A 4 pixel shift is required for the green subframe image. And, an 8 pixel shift is required for the blue subframe image. The next red subframe associated with the next image frame would then be effectively shifted 12 pixels relative to the previous red subframe within the field of view.

Each of the color breakup reduction technologies described herein may be used in combination with each of the other color breakup reduction technologies.

The inventors appreciated that fitting see-through computer displays into certain head-worn form factors is a challenge, even when reduced in size as described herein. A further advantage that is provided by an optics module that includes multiply folded optics is that twists can be introduced at the fold surfaces to modify the orientation of different portions of the optics module relative to each other. This can be important when the optics module needs to fit into a thin curved glasses frame, a visor or a helmet where the increased width associated with the upper portion of the multiply folded optics module can make it more difficult to fit into structures that are not parallel to the combiner. As such, another aspect of the present disclosure relates to twisting certain optical components within the see-through computer display such that the optical components better fit certain form factors (e.g. glasses) yet continue to perform as high quality image displays. In embodiments, optics systems with dual mirror systems to fold the optical path (e.g. optical systems described herein with respect to FIGS. 6, and 93 through 106) are provided such that the image production module (e.g. upper module), which includes a first image light reflective surface, is turned about a first optical axis leading from the upper module to the lower module and in a direction to fit the upper module more compactly into a frame of a head-worn computer. At the same time, to avoid distorting the image provided to the eye of the user, the image delivery optics (e.g. lower module), which includes a second image light reflective surface, is turned about a second optical axis that leads to the user's eye and in the opposite direction relative to the image, thereby introducing a compound angle between the first image light reflective surface and the second image light reflective surface. Provided that the first and second optical axes are perpendicular to one another in the non-twisted state, the distortion in the image associated with the twist about the first axis is compensated by a twist of the same angular magnitude about the second axis so that the image presented to the eye of the user is undistorted by the twisting.

FIG. 112 illustrates a head-worn computer with see-through displays in accordance with the principles of the present disclosure. The head-worn computer has a frame 11202 that houses/holds the optics modules in position in front of the users eyes. As illustrated in FIG. 112, the frame 11202 holds two sets of optical modules 11204 and 11208 each of which have upper and lower optics modules. Optics module 11204 is non-twisted and is presented to illustrate the difficulty in fitting the non-twisted version into the frame. One will note that the dotted box, which represents the outer bounds of the optics module 11204 doesn't fit within the bounds of the frame 11202. Fitting optics module 11204 into the frame 11202 would normally require that the frame 11202 become thicker, from front to back, which would lead to more offset of the glasses form factor from the face of the user, which is less desirable and is less compact. In contrast, optics module 11208 is a twisted optics module, where the upper module is twisted (or rotated) to better fit into the confines of the frame 11202 as shown in FIG. 112. FIG. 113 shows a more detailed illustration of the twists imparted within multiply folded optics in optics module 11208. Upper module 11214 is twisted relative to the lower module 11218 along optical axis 934 to better fit into the frame 11202, It is this twist which enables optics module 11208 to better fit within the frame 11202 as shown in FIG. 112 and as a result frame 11202 can be thinner and more compact than if non-twisted optics modules were used. To avoid distorting the image provided to the user, a second twist is required to introduce a compound angle between the first reflecting surface 11225 in the upper module 11214 and second reflecting surface 11226 in the lower optics module 11218. The second twist is imparted to the second reflecting surface about the optical axis 933 and in an opposite direction relative to the image from the twist in the upper module 11214. In this way, the effects of the increased width of the upper portion of the multiply folded optics can be reduced when fitting the optics module into a curved structure such as glasses frames, a visor frame or a helmet structure. Where it is preferred, but not required that the optical axis 934 be perpendicular to the optical axis 933 so that the magnitude of the angular twist imparted to the first reflecting surface 11225 can be the same as the twist imparted to the second reflecting surface 11226 to provide an image to the user's eye that is not distorted due to the twisting.

Another aspect of the present disclosure relates to the configuration of the optics and electronics in a head-worn frame such that the frame maintains a minimal form factor to resemble standard glasses. In embodiments, a see through optical display with multiply folded optics to provide a reduced thickness (e.g. as described herein) may be mounted in the frame. In embodiments, the multiply folded optical configuration may be twisted at the fold surfaces (e.g. as described herein) to better fit the optics into the frame. In embodiments, the electronics that operate the displays, processor, memory, sensors, etc. are positioned between, above, below, on a side, etc. of the optical modules and oriented to provide a reduced thickness in the frame to match the thickness of the optics. Orienting the board can be particularly important when the board includes large components that limit the width of the board, such as for example the processor chip. For example, an electronics board or components on the electronics board may be mounted in a vertical orientation between and/or above the optical modules to reduce the thickness of the electronics board as mounted into the frame. In another configuration the board may be mounted between the optical modules at a height near the top of the optical modules to minimize the height of the glasses frame. In yet another configuration the board may be mounted such that it extends over the optical modules to minimize the thickness of the frame. In further embodiments, the board may be mounted in an angled configuration to enable the thickness and height of the frame to be reduced simultaneously. In embodiments, the electronics may be divided between multiple boards. For example, a longer board over a shorter board where the space between the optical modules is used for the lower board. This configuration uses some of the space between the eyes for some of the electronics.

FIG. 114 illustrates a top view and front view of a configuration including optical modules 11208, electronics board 11402 and a heat sink 11404. The board 11402 is mounted in a vertical orientation to maintain a thin frame portion that sits across the user's brow. As illustrated, the optical modules 11208 include upper modules 11214 and a second reflecting surface 11226 in front of the user's eye. The upper module may have a flat reflecting surface and the upper 11214 may be turned or twisted with respect to the second reflecting surface 11226 as described herein. The second reflecting surface 11226 may be a partial mirror, notch filter, holographic filter, etc. to reflect at least a portion of the image light to the eye of the user while allowing scene light to transmit through to the eye.

FIG. 115 illustrates a front view of a configuration that includes optics illustrated in FIG. 114; however, the electronics board 11402 is mounted in the space between the optical modules at a height that is similar to the height of the optical modules. This configuration reduces the overall height of the frame.

FIG. 116 illustrates a front view of a configuration that includes optics illustrated in FIGS. 114 and 115. The electronics layout in this configuration is done with multiple boards, 11402, 11602 and 11604. The multiple board configuration allows the boards to be thinner from front to back thereby enabling the brow section of the frame to be thinner. A heat sink 11404 (not shown in FIG. 116) may be mounted on the front face between the optical modules. This configuration also causes the heat to be drawn in a direction away from the user's head. In embodiments, the processor, which is a main heat generator in the electronics, is mounted vertically (e.g. on board 11604) and the heat sink 11404 may be mounted in front such that it contacts the processor. In this configuration, the heat sink 11404 causes heat to spread to the front of the device, away from the user's head. In other embodiments, the processor is mounted horizontally (e.g. on board 11602 or 11402). In embodiments, the board(s) maybe tilted (e.g. 20 degrees) from front to back to create an even thinner brow section.

Another aspect of the present disclosure relates to concealing the optical modules such that a person viewing the user does not clearly see the optical modules, electronics or boards. For example, in configurations described herein, the optical modules include lenses that hang below the top of the brow section of the head-worn device frame and the electronics board(s) hang down as well so that the see-through view is partially blocked. To conceal these features and thereby provide the head worn computer with the appearance of conventional glasses, an outer lens may be included in the glasses frame so that it covers a portion of the frame that contain the optical modules or electronics, and the outer lens may include a progressive tint from top to bottom. In embodiments, the tint may have less transmission at the top for concealment of a portion of the frame that includes the optical modules or electronics board while having higher transmission below the concealment point such that a high see-through transmission is maintained.

Aspects of the present disclosure provide multiply folded optics to reduce the thickness of the optics modules along with vertically oriented or angled electronics to reduce the mounted thickness of the electronics and progressively tinted outer lenses to conceal a portion of the optics or electronics. In this way, a head worn computer is provided with a thinner form factor and an appearance of conventional glasses.

Another aspect of the present disclosure relates to an intuitive user interface mounted on the HWC 102 where the user interface includes tactile feedback to the user to provide the user an indication of engagement and change. In embodiments, the user interface is a rotating element on a temple section of a glasses form factor of the HWC 102. The rotating element may include segments such that it positively engages at certain predetermined angles. This facilitates a tactile feedback to the user. As the user turns the rotating element it 'clicks' through its predetermined steps or angles and each step causes a displayed user interface content to be changed. For example, the user may cycle through a set of menu items or selectable applications. In embodiments, the rotating element also includes a selection element, such as a pressure-induced section where the user can push to make a selection.

FIG. 117 illustrates a human head wearing a head-worn computer in a glasses form factor. The glasses have a temple section 11702 and a rotating user interface element 11704. The user can rotate the rotating element 11704 to cycle through options presented as content in the see-through display of the glasses. FIG. 118 illustrates several examples of different rotating user interface elements 11704a, 11704b and 11704c. Rotating element 11704a is mounted at the front end of the temple and has significant side and top exposure for user interaction. Rotating element 11704b is mounted further back and also has significant exposure (e.g. 270 degrees of touch). Rotating element 11704c has less exposure and is exposed for interaction on the top of the temple. Other embodiments may have a side or bottom exposure.

As discussed above, a specially designed lens may be used to conceal portions of the optics modules and/or electronics modules. FIG. 119 illustrates an embodiment of one such lens 11902. Two lenses, 11902 are illustrated with Base 6 and 1.3 mm thickness but other geometries with, for example, different curvatures and thicknesses can be used. The lenses 11902 are shaped to look like conventional glasses lenses with features including magnetic mounting attachment and special tinting in portions of the lenses 11902 where opaque structures such as electronics are located behind the lenses.

The lenses 11902 includes blind holes 11904 for the mounting of a magnetic attachment system (not shown). The magnetic attachment system may include magnets, magnetic material, dual magnets, opposite polarization magnets, etc. such that the lenses 11902 can be removed and remounted to the head-worn computer (e.g. HWC 102). In the magnetic attachment system, the lenses 11902 are held by magnetic force into the frame of the HWC. The magnets can be inserted into the blind holes 11904 or inserted into the frame of the HWC in corresponding matching positions. As long as either the lens 11902 or the matching position on the frame of the HWC includes a magnet and the other position has a similar sized piece of magnetic material or another magnet oriented to attract the lens 11902 and hold it in the frame of the HWC. To this end, the frame of the HWC can provide guidance features to position the lens 11902 in front of the optics modules in the HWC. Where the guidance features can be a ridge or flange that the lens is seated in so the lens 11902 cannot move laterally when held in place by the magnetic attachment system. In this way, the function of the magnetic attachment system is simply to hold the lenses 11902 in place, while the guidance features position the lenses 11902. The guidance features can be robustly made to hold the lenses 11902 in place when dropped or subjected to impact even when the force provided by the magnetic attachment system is relatively low, so that the lenses 11902 can be easily removed by the user for cleaning or replacement. Where easy replacement enables a variety of lenses with different optical features (e.g. polarized, photochromic, different optical density) or different appearance (e.g. colors, level of tinting, mirror coating) to be changed out by the user as desired.

FIG. 119 also illustrates an example of how the lens 11902 may be tinted to conceal or at least partially conceal certain optical components (e.g. the non-see-through components or opaque components) such as, electronics, electronics boards, auxiliary sensors such as an infrared camera and/or other components. As illustrated, the blind holes 11904 may also be concealed or at least partially concealed by the tinting. As illustrated in FIG. 119, a top portion 11908, approximately 15 mm as illustrated, may be more heavily tinted (e.g. 0 to 30% transmission) or mirrored to better conceal the non-see through portions of the optics and other components. Below the top portion 11908, the lens 11902 may have a gradient zone 11909 where the tinting level gradually changes from top to bottom and leads into the lower zone 11910. The lower zone 11910 includes the area where the user primarily views the see-through surrounding and this zone may be tinted to suit the viewing application. For example, if the application requires a high see through, the lower zone 11910 may be tinted, between 90% and 100% transmissive. If the application requires some see-through tint, than the lower area may be more heavily tinted or mirrored (e.g. 20% to 90%). In embodiments, the lower area 11910 may be a photochromic layer, an electrochromic layer, a controllable mirror or other variable transmission layer. In embodiments, the entire lens or portions thereof may have a variable transmission layer such as a photochromic layer, electrochromic layer, controllable mirror, etc. In embodiments, any of the areas or whole lens 11902 may include polarization.

Another aspect of the present disclosure relates to cooling the internal component through the use of micro-holes sized such they are large enough to allow gas to escape but small enough to not allow water to pass through (e.g. 25 µm, 0.2 mm, 0.3 mm, etc.). The micro-holes may be included in a heat sink, for example. The heat sink, or other area, may be populated with hundreds or thousands of such micro-holes. The micro-holes may be laser cut or CNC holes, for example, that are small enough to keep large droplets of water out of the device but allow air to exchange through the heat sink. Besides increasing surface area of the heat sink, they also have matching holes on the underside of the frame to enable convective cooling where cool air is pulled in from the bottom as the heat raises from the top, like a chimney and as such, the heat sink with the micro-holes is preferably located on the top or side of the frame of the HWC. In embodiments, the micro-holes are aligned in the troughs formed by the fins on the top of the heat sink. This causes the exiting air to flow through the troughs thereby increasing the heat transfer from the fins. In embodiments, the micro-holes may be angled such that the length of the hole in the heat sink material is increased and the air flow can be directed away from the head of the user. In addition, the micro-holes may be of a size to cause turbulence in the air flow as it passes through the micro-holes. Where, turbulence substantially increases the heat transfer rate associated with the air flow through the heat sink. In embodiments, the heat management system of the HWC 102 is passive, including no active cooling systems such as fans or other energized mechanical cooling systems to force air flow through the micro-holes. In other embodiments, the heat management system includes energized mechanical cooling, such as a fan or multiple fans or other systems to force air movement through the HWC and the micro-holes.

Another aspect of the present disclosure relates to finding items in the surrounding environment based on similarity to items identified. Augmented reality is often rigidly defined in terms of what is included and how it is used, it would be advantageous to provide a more flexible interface so people can use augmented reality to do whatever they want it to do. An example is to use the HWC camera, image analysis and display to designate items to be found. FIG. 122 shows an illustration of an image 12210 of a scene containing an object that the user would like the HWC to assist in looking for the object as the user moves through the environment. In this example, the user has circled the object 12220 that is being looked for, where in this case the object is a cat. The HWC then analyses the circled region of the image for shapes, patterns and colors to identify the target to be searched for. The HWC then uses the camera to capture images of the scene as the user moves about. The HWC analyses the images and compares the shapes, patterns and colors in the captured images of the scene and compares them to the shapes, patterns and colors of the target. When there is a match, the HWC alerts the user to a potential find. The alert can be a vibration, a sound or a visual cue in an image displayed in the HWC such as a pointer, a flash or a circle that corresponds to the location of the potential find in the scene. This method provides a versatile and flexible augmented reality system wherein an item is described visually and a command of "find something like this" is given to the HWC. Examples of ways to identify an object to be searched for include: circle an item in a previously captured image that is stored on the HWC (as shown in FIG. 122); point to an item in a physical image held in front of the camera in the HWC; point to an item in the live image provided by the camera in the HWC and viewed in the see-through display of the HWC, etc. Alternately, text can be input to the HWC with a command of "find wording like this", e.g. a street sign or an item in a store and the HWC can then search for the text as the user moves through the environment. In another example, the user can indicate a color with a command of "find a color like this". The camera used to search for the item can even be a hyperspectral camera in HWC to search for the item using infrared or ultraviolet light to thereby augment the visual search that the user is conducting. This method can be extended to any pattern that the user can identify for the HWC such as sounds, vibrations, movements, etc. and the HWC can then use any of the sensors included in the HWC to search for the identified pattern as the target. As such the finding system provided by the disclosure is very flexible and can react to any pattern that can be identified by the sensors in the HWC, all the user has to do is provide an example of the pattern to look for as a target. In this way the finding system assists the user and the user can do other things while the HWC looks for the target. The finding system can be provided as an operating mode in the HWC where the user selects the mode and then inputs the pattern to be used as the search target by the HWC. Examples of items that can be searched for include: household objects, animals, plants, street signs, weather activity (e.g. cloud formations), people, voices, songs, bird calls, specific sounds, spoken words, temperatures, wind direction shifts as identified by wind sound relative to the compass heading, vibrations, objects to be purchased, brand names in stores, labels on items in a warehouse, bar codes or numbers on objects and colors of objects to be matched. In a further embodiment, the rate of searching (e.g. how often an analysis is conducted) can be selected by the user or the rate can be automatically selected by the HWC in response to the rate of change of the conditions related to the target. In a yet further embodiment, the sensors in the HWC include a rangefinder or a camera capable of generating a depth map to measure the distance to an object in an image captured by the camera. The HWC can then analyze the image along with the distance to determine the size of the object. The user can then input the size of the object to the finding system as a characteristic of the target pattern to enable the HWC to more accurately identify potential finds.

Another aspect of the present disclosure relates to assisting a person in reading text that is presented in a physical form, such as a book, magazine, on a computer screen or phone screen, etc. In embodiments, the camera on the HWC can image the page and the processor in the HWC can recognize the words on the page. Lines, boxes, or other indicators may be presented in the HWC to indicate which words are being captured and recognized. The user would then be viewing the page of words through the see-through display with an indication of which words have been recognized. The recognized words can then be translated or converted from text that is then presented to the user in the see-through display. Alternately, the recognized words can be converted from text to speech, which is then presented to the user through the head worn speakers, headphones, visual displays, etc. This gives the user a better understanding of the accuracy associated with the text recognition relative to the translated text or converted speech.

In a further aspect of the disclosure, a magnetic attachment structure is provided for the combiner to enable the combiner to be removable. In the optics associated with a HWC 102 such as for example the optics shown in FIG. 6, it is important that the combiner 602 be accurately positioned and rigidly held below the frame of the HWC and the upper optical module 202 located inside the frame. At the same time, the combiner 602 can become damaged so that it needs to be replaced, or it may need to be cleaned periodically so that it is advantageous for the combiner to be removable. FIG. 123 shows an illustration of a cross section of a single combiner 12360 with the magnetic attachment structure as shown from the side to show the angle of the combiner 12360. FIG. 124 shows an illustration of two combiners 12360 with magnetic attachment structures attaching the combiners 12360 to the frame of the HWC 12350 as shown from the front of the HWC. The combiner 12360 has two or more pins 12365 that are attached to the combiner 12360 such that the pins have parallel axes. The pins 12365 are shown as being inserted into holes drilled through the combiner 12365 and attached in place with adhesive such as UV cured adhesive. The pins 12365 are made of a magnetic material such as for example 420 stainless steel. The pins 12365 extend into parallel bores in the frame of the HWC 12350 so that the combiner 12360 is fixedly held in place relative to the frame of the HWC 12350. The attachment and bend of the pins 12365 establish the angle between the combiner 12360 and the optics in the frame of the HWC 12350. A magnet 12370 is bonded into the frame of the HWC 12350 such that the pin 12365 attracted by the magnet 12370 and thereby the pin 12365 and the attached combiner 12360 are held in place relative to the frame of the HWC 12350. The magnet 12370 is selected so that the force exerted by the magnet 12370 onto the pin 12365 is strong enough to hold the combiner 12360 in place during normal use, but weak enough that removal of the combiner 12350 is possible by the user. By having the pins 12365 and associated bores parallel, the combiner 12350 can be easily removed for cleaning, or replaced if damaged. To provide a more rigid and repeatable connection between the combiner 12360 and the frame of the HWC 12350, the pins can fit into an extended tight bore in the frame of the HWC 12350. In addition, the pins 12365 can include a flange as shown that seats onto an associated flat surface of the frame of the frame 12350 or a flat surface of the magnet 12370 to further establish the angle of the combiner 12360 and the vertical position of the combiner 12360. In a preferred embodiment, the magnet 12370 is a ring magnet and the pin 12365 extends through the center of the ring magnet. The magnet 12370 can also be included in an insert (not shown) that further includes a precision bore to precisely align and guide the pin 12365. The insert can be made of a hardened material such as a ceramic to provide a bore for the pin 12365 that is resistant to wear during repeated removal and reinstallation of the combiner 12360. The pins can be accurately positioned within the combiner through the use of a jig that holds the pins and the combiner. The holes for the pins in the combiner are then made larger than the pins so there is a clearance to allow the combiner and pins to be fully positioned by the jig. An adhesive such as a UV curing adhesive is then introduced to the holes and cured in place to fasten the pins to the combiner in a position that is established by the jig. In a further embodiment, the combined structure of the pins 12365 and the combiner 12350 are designed to break if subjected to a high impact force, to thereby protect the user from injury. Where the pin 12365 or the combiner are designed to break at a previously selected impact force that is less than the impact force required to break the frame of the HWC 12350 so that the combiner 12350 with the attached pins 12365 can be simply replaced when damaged. In yet a further embodiment, by providing a method for easily replacing the combiners 12360, different types of combiners can also be provided to the user such as: polarized combiners, combiners with different tints, combiners with different spectral properties, combiners with different levels of physical properties, combiners with different shapes or sizes, combiners that are partial mirrors or combiners that are notch mirrors, combiners with features to block faceglow as previously described herein.

In typical computer display systems, automatic brightness control is a one dimensional control parameter; when the ambient brightness is high, the display brightness or light source is increased, when the ambient brightness is low, the display brightness or light source is decreased. The inventors have discovered that this one-dimensional paradigm has significant limitations when using see-through computer displays. Aspects of the present disclosure relate to improving the performance of the head-worn computer by causing it to understand the relative brightness of the content to be presented in addition to understanding the brightness of the surrounding environment and to then adjust the brightness of the content, based on both factors, to create a viewing experience that has the appropriate viewability.

An aspect of the present disclosure relates to improving the viewability of content displayed in a see-through head-worn display. Viewability involves a number of factors. The inventors have discovered that, in addition to image resolution, contrast, sharpness, etc., the viewability of an image presented in a see-through display is effected by (1) the surrounding scene that forms the backdrop for the image, and (2) the relative or apparent brightness of the image displayed. If the user, for example, is looking towards a bright scene, the viewability of the presented content may be washed out our or hard to see if the display settings are not altered and, in the event that the content itself is relatively low in brightness (e.g. the content has a lot of dark colors or black areas in it), it may continue to be washed out unless the content is also altered. In this situation, the brightness of the display may be increased even higher than what would normally be required in a dark environment in order to compensate for the dark content of the image. As an additional example, if the user is looking towards a dark scene, the presented content may be perceived by the user as overly bright and washing out the scene, or making it hard to interact with the scene if the display settings are not altered. In addition, if the content itself is relatively bright (e.g. mainly light colors or areas of white content), the content may require further alteration to obtain the proper viewability. In this situation, the display brightness may be decreased further than if it were only dependent on the environmental lighting conditions to make the viewability of the content appropriate. In embodiments, the head-worn computer is adapted to measure the scene that forms the backdrop for the presented content, understand the relative brightness of the content itself (i.e. the innate content brightness) to be presented and then adjust the presentation of the content based on the scene brightness and the innate content brightness to achieve a desired content viewability.

While embodiments herein use the terms "content brightness" and "display brightness" in the context of altering the viewability of the content, it should be understood that the step of making the alteration in content and/or display in response to meeting a viewability need may include causing the system to leave the image content alone and increase the light source brightness of the display, use the available light and increase the digital brightness of the image content by adjusting the parameters of the entire display using the display driver, adjust the actual content that is being displayed, etc. The viewability adjustment may be made by adjusting a lighting system used to illuminate a reflective display (e.g. changing the pulse width modulation duty cycle of the LEDs, changing the power delivered to the lighting system, etc.), changing the brightness settings of an emissive display, changing an aspect of how the display presents all content by adjusting settings in the display driver or changing an aspect of the content its self through image processing (e.g. changing brightness, hue, saturation, color value (e.g. red, green, blue, cyan, yellow, magenta, etc.) exposure, contrast, saturation, tint, etc.), of the all the content, select regions of the content, types of content which may be shown at the same time but have innate differences in visibility regardless of location, etc.

To improve the viewing experience for a user when viewing content in a see-through head-worn display, the visual interaction between the displayed image and the see-through view of the environment must be considered. The viewability of a given displayed image is highly dependent on a variety of attributes such as its size, color, contrast and brightness as well as the perceived brightness as seen by the user. Where the color and brightness of the displayed image can be determined by the pixel code values within the digital image (e.g. average pixel code). Alternatively, the brightness of the displayed image can be determined from the luma of the displayed image (see "Brightness Calculation in Digital Image Processing", Sergey Bezryadin et. al., Technologies for Digital Fulfillment 2007, Las Vegas, Nev.). Other attributes of the displayed image can be calculated based the code value distributions in the image similar to the brightness. Depending on the mode of operation, the type of activity the user is engaged in and a perceived brightness of the image being displayed, it may be important for the displayed image to match the see-through view of the environment, contrast with the see-through view of the environment, or blend into the see-through view of the environment. The content adjustment may be based on the perceived user need in addition to the scene that will form the backdrop for the content. Embodiments provide methods and systems to automatically adjust viewability of the image depending on, for example:

1. the percent of the display field of view that is covered by displayed content, (where in a see-through head worn display the portions of the displayed image that are black are seen as portions with no displayed content and instead the user is provided with a see-through view of the environment in that portion);

2. a brightness metric of image being displayed (e.g. hue, saturation, color, individual color contribution (e.g. red content, blue content, green content) average brightness, highest brightness, lowest brightness, statistically calculated brightness (e.g. mean, median, mode, range, distribution concentration), etc.);

3. sensor feedback indicative of a user use scenario (e.g. the amount of motion measured by sensors in the IMU in the head-worn display used to determine that the user is stationary, walking, running, in a car, etc.);

4. the operating mode of the head-worn display (which can be selected by the user or automatically selected by the head-worn display based on for example: the environmental conditions, the GPS location, the time or date, indicated or determined user scenario).

5. the type of content (e.g. still pictures (e.g. either high or low contrast, monochrome or color such as icons or markers), moving pictures (e.g. either high or low contrast, monochrome or color such as scrolling icons on our launcher or a bouncing marker), video content (e.g. where location and intensity of pixels are varying such as a bouncing and blinking marker, other normal types of video content like Hollywood movies, step by step tutorials or your last run down the ski slope recorded on your glasses), text (e.g. small, large, monochrome, outlined, blinking, etc.), etc.; and/or 6. a user use scenario (e.g. a predicted scenario based on sensor feedback, based on an operating application, based on a user setting) such as sitting still in a safe location such as your living room and viewing a movie (e.g. where it might not need to defeat ambient), walking around and getting notifications or viewing turn by turn directions (e.g. where it might depend on the amount of display covered but probably best to match ambient), driving in a car and erasing the blind spots such as vertical pillars (e.g. where it may need to match ambient), driving in a car and trying to display HUD data over the external illumination (e.g. where it may need to defeat ambient), getting instructions on repairing and engine (e.g. where some areas need to defeat ambient such as pages in the service manual and some need to match such as augmented overlays where you still need to see what you're working on), etc.

For example, in a night vision mode using the camera with a live feed to the head-worn display, sensors associated with the head-worn display indicate that the user is moving at a speed and with an up and down movement that indicates jogging. As a result, the head-worn display can automatically determine that the displayed images should be provided with a brightness that provides good viewing without regard to the see-through view of the surrounding environment since it is too dark for the user to see a see-through view of the environment. In addition, the head-worn display may switch the displayed image from full color to a monochrome image such as green where the human eye is more sensitive and the human eye responds faster.

In another example of a mode, the brightness of the displayed image is increased relative to the see-through view of the surrounding environment when eye tracking is being used in a user interface. In this embodiment, the type of user interface being used determines the brightness of the displayed image relative to the brightness of the see-through view of the surrounding environment. In this way, the see-through view is made to be dimmer than the displayed image so that the see-through view is made less noticeable to the user. By making the see-through view less noticeable to the user, the user can more easily move his eyes to control the user interface without being distracted by the see-through view of the surrounding environment. This approach reduces the jittery eye movement that is typically encountered when using eye tracking in a head mounted display that also provides the user a see-through view of the environment. FIG. 126 is a chart that shows the brightness (L*) perceived by the human eye relative to a measured brightness (luminance) of a scene. In this chart, it can be readily seen that the human eye has a non-linear response to luminance wherein the eye is more sensitive to differences at lower levels and less sensitive to differences at higher levels. In embodiments, the displayed image can be provided with an average brightness that is perceived as being 2× or more brighter than the average brightness of the see-thru view of the environment (i.e. L* of the displayed image is 2× the L* of the see-thru view) when using a mode that includes eye tracking control of a user interface.

Further, the displayed image can be changed in response to the average color, hue or spatial frequency of the environment surrounding the user. In this case, a camera in the head-worn display can be used to capture an image of the environment that includes a portion of the see-through field of view as seen by the user. Attributes of the captured image of the environment can then be digitally analyzed as previously described herein to calculate attributes for the displayed image. In this case, the attributes of the captured image of the environment can include an average brightness, a color distribution or spatial frequency of the see-through view of the environment. The calculated attribute of the environment can then be compared relative to attributes of the image being displayed to determine how distracting the see-through view will be versus the type of displayed image being displayed. The attributes of the displayed image can then be modified in terms of color, hue or spatial frequency to improve the viewability in the head-worn display with see-through. This comparison of image content versus see-through view and the associated modification of the displayed image can be applied within large blocks of the field of view or within small localized blocks of the field of view comprised of only a few pixels each such as may be required for some types of augmented reality objects. Wherein the captured image of the environment that is used to calculate the attributes of at least a portion of the see-through view of the environment provided to the user does not have to be the same resolution as the displayed image. In a further embodiment, a brightness sensor or a color sensor included in the head-worn display can be used to measure the average brightness or average color within a portion of the see-through field of view of the environment. By using a dedicated sensor for measuring brightness or color, the calculation of the attribute in the see-through view of the environment can be provided with little processing power thereby reducing the power required and increasing the speed of the calculation.

It has often been said that color is very subjective and there are several reasons for this including things like dependencies on ambient lighting of the environment, the proximity of other colors and whether you are using one eye or two. To compensate for these effects, the head-worn display may measure the color balance and intensity of the ambient light either with a light sensor or with a camera to infer how colors of objects in the environment will appear, then the color of the displayed image can be modified to improve viewability in the head-worn display with see-through. In the case of augmented reality objects, viewability can be improved by rendering the augmented reality object so that it better contrasts with the environment for example for a marker, or the so that it blends into the environment for example when viewing architectural models. To this end, light sensors can be provided to determine the brightness and color balance of the ambient lighting in front of the user or from other directions in the environment such as above the user. In addition, objects in the environment can be identified that typically have standard colors (e.g. stop signs are red) and these colors can be measured in a captured image to determine the ambient lighting color balance.

Color perception by the human eye gets even more complicated at the extremes of very bright and very dark, because the human eye responds non-linearly. For example in direct sunlight, colors begin to wash out as nerves in the brain begin to saturate and lose the ability to detect subtle differences in color. On the other hand, when the environment is dim, the contrast perceived by the human eye decreases. As such, when bright conditions are detected, colors can be enhanced in the displayed image. When dim conditions are detected, the contrast in the displayed image can be enhanced to provide a better viewing experience for the user. Where contrast can be enhanced by digitally sharpening the image, increasing the code value differences between adjacent areas in the digital image or by adding a narrow line comprised of a complimentary color around the edge of displayed objects.

In dim conditions, color sensitivity of the human eye varies by color as well, so that blue colors look brighter than red colors. As a result, in dim viewing conditions, the color of objects changes toward the blue. Consequently, when the displayed image is provided as a dim image such as for example when using the head-worn display in dim lighting where viewability of both the displayed image and the see-through view are important, the color balance of the image can be shifted to be more red to provide a more accurate color rendition of the displayed image as perceived by the user. If the image is displayed as a very dim image, the image can be further changed to a monochrome red to better preserve the user's night vision.

In embodiments, the head-worn display uses sensors or a camera to determine the brightness of the surrounding environment. The type of image to be displayed is then determined and the brightness of the image is adjusted in correspondence with the type of image and the operating mode of the head-worn display. The combined brightness, comprised of the brightness of the see-through view in combination with the brightness of the displayed image, is determined. The operating zone of the human eye is then determined based on the combined brightness and the known sensitivity of the human eye as shown in FIG. 125. Attributes of the image (e.g. color balance, contrast, color of objects, size of text) are then adjusted to improve viewability in correspondence to the determined operating zone, the type of image and the operating mode.

FIG. 125 shows a chart of the sensitivity of the human eye versus brightness as provided in Chapter 2.1 page 38 in the book by Gonzalez, R. C. and Woods, R. E., "Digital Image Processing Second Edition", copyright 2002, Prentice Hall Inc ISBN 0-201-18075-8 and also available at http://users.dcc.uchile.cl/~jsaavedr/libros/dip_gw.pdf. As can be seen, the sensitivity is quite non-linear. To make this non-linearity easier to understand, the chart has been broken up into four zones.

Zone 1: Top end of Photopic vision (glare limit) where relative differences in brightness are less noticeable and colors shift to red. Sharpness of focus is good with contracted pupil but glare inside the eye starts to obscure details.

To improve viewability, the displayed image is modified to increase contrast and increase green and/or blue.

Zone 2: Standard range of color vision where cones dominate in the human eye. Color perception is basically uniform and brightness perception follows a standard Gamma curve. Maximum sharpness possible due to small pupil and manageable levels of brightness. Viewability is good with standard brightness and color.

Zone 3: Transition zone from cones to rods for primary sensitivity. Color perception becomes non-linear as the red cones lose sensitivity faster than blue and green. Contrast perception is reduced due to flattening response to changes in brightness. Focus sharpness also begins to reduce with larger pupils, especially in older eyes that aren't as capable of adapting freely. Viewability is improved by increasing font and object sizes for legibility and reducing blue and green colors while increasing red and increasing contrast.

Zone 4: Bottom end of scotopic vision where rods dominate for sensitivity and motion is more apparent than content. Viewability is improved by changing the displayed images to eliminate high spatial frequency such as small text and instead provide iconography and use motion or blinking to increase visibility of critical items.

In a further embodiment, changes in operating mode are considered. So that if the user changes operating mode, the displayed image is modified in correspondence to the mode change and the environmental conditions to improve viewability. This can be a temporary state as the user's eyes adapt to the new operating mode and the associated change in viewing conditions. For example, if the display settings were based on darker ambient conditions than are detected when the head-worn display wakes up, the brightness of the displayed image is modified to match the environmental conditions to avoid hurting the user's eyes. In another example, an entertainment mode is used and the brightness of the displayed image is slowly increased from the environmental conditions up to level for best viewability of a video with saturated color and high sharpness (Zone 2). In yet another example, if the displayed image includes a limited area of icons or white on black text for nighttime viewing, the brightness is reduced before showing a photo or white background page to account for the increased perception of brightness.

In a yet further embodiment, an eye camera is used to determine which portion of the displayed image that the user is directly looking at and attributes of the displayed image are adjusted in correspondence to the brightness of that portion of the displayed image. In this way, the attributes of the image are adjusted in correspondence to the portion of the image that the user's eye is reacting to. This approach recognizes that the human eye adapts very quickly to local changes in brightness within the area that the eye is looking. When the brightness increases rapidly such as when a light is turned ON in a dark room, the pupil diameter can decrease by 30% in 0.4 sec as shown in studies by Pamplona (Pamplona, V. F., Oliveira, M. M., and Baranoski, G. V. G. 2009, Photorealistic models for pupil light reflex and iridal pattern deformation, ACM Trans. Graph. 28, 4, Articles 106 (August 2009), 12 pages). As a result, the user's eye can rapidly adapt to local changes in brightness as the user moves his eye to look at different portions of the displayed image or different portions of the see-through view of the surrounding environment. In order to provide a more consistent perceived brightness for different portions of the displayed image, systems or methods in accordance with the principles of the present disclosure adjust the overall brightness of the displayed image in correspondence to the local brightness of the portion of the displayed image or the local brightness of the portion of the see-through view that the user's eye is looking at. In this way, changes in the size of the pupil of the user's eye are reduced and the user is then provided with a more consistent brightness distribution within a displayed image. Wherein the portion of the displayed image or the portion of the see-through view that the user's eye is looking at is determined by analyzing images of the user's eye that have been captured by the eye camera. The eye camera can be used in a video mode to capture images of the user's eye continuously and the captured images are then analyzed continuously to track the position of the user's eye over time. The position of the user's eye within the captured images of the eye is correlated to the portion of the displayed image or the portion of the see-through view that the user is looking at. The overall brightness of the displayed image can then be adjusted in correspondence to the local brightness of the portion of the displayed image or the portion of the see-through view that the user's eye is looking at. The rate of adjustment of the overall brightness of the displayed image can be further correlated to the measured diameter of the pupil of the user or to the measured change in diameter of the pupil of the user as determined from analysis of the captured images of the user's eye.

In a yet further embodiment, adjustments to attributes of the overall image can be made based on the local attributes of the portion of the displayed image or the portion of the see-through view that the user's eye is looking at. The adjusted attributes of the displayed image can include: color, color balance, contrast, sharpness, spatial frequency and resolution. Where the eye camera is used to capture images of the user's eye, which are then analyzed to determine the portion of the displayed image or the portion of the see-through view that the user's eye is looking at. The portion of the displayed image or the portion of the see-through view that the user's eye is looking at is then analyzed to determine the relative intensity of the attribute. Adjustments are then made to the overall displayed image in correspondence to the local intensity of the attribute in the area that the user's eye is looking at to improve viewability. Where a camera in the head-worn display can be used to capture images of the surrounding environment that at least partly correspond to the see-through view provided to the user's eye.

In embodiments, the head-worn computer has an outward facing camera to capture a scene in front of the person wearing the head-worn computer. The camera and image processing used to determine the area in the surrounding scene that will be used for brightness and/or color consideration in the process of adjusting the displayed content may take a number of forms. For example:

- Camera positioned to capture forward facing scene—the brightness measure would consider the captured scene and determine a relevant brightness and/or color. For example, the entire scene average color/brightness may be considered, a bright or color saturated portion may be considered, a dark area may be considered, etc.;
- The forward facing camera may have a field of view larger than that of the see-through display's field of view and image processing may be used to assess the overlapping areas such that a captured image brightness and/or color may be representative of the see-through display's field of view brightness and/or color;
- The forward facing camera may have a field of view similar to that of the see-through display's field of view such that a captured image brightness and/or color may be representative of the see-through display's field of view brightness and/or color;
- The forward facing camera may have a narrow field of view to better target a scene directly in front of the user;
- The forward facing camera may be a mechanically movable camera that follows the eye-position (e.g. as determined through eye-imaging as described herein) to capture a scene that follows the user's eyes;
- The forward facing camera may have a wide field of view to capture the scene. Once the image is captured, a segment of the image may be identified as being the segment that the user is looking towards (e.g. in accordance with eye imaging information) then the brightness and/or color in that segment may be considered;
- An object in the captured scene image may be identified (e.g. as determined based on eye-imaging and position determination) and the object may be considered; and
- An object in the captured scene image may be identified as an object for which the displayed content is going to relate (e.g. an advertisement to be associated with a store) and the object's brightness and/or color may be considered.

In a further embodiment, the present disclosure provides a method for improving the alignment of a displayed image to the see-through view of the surrounding environment. The method can also be used for correlating eye tracking to where the user is looking in the see-through view of the surrounding environment. This is an important feature for making adjustments to attributes in the displayed image when the adjustments are based on local attributes in the portion of the see-through view that the user is looking at. The adjustment process can be used for each user using the head-worn display to improve the viewing experience for different individuals and compensate for variations in eye position or head shape between individuals. Alternatively, the adjustment process can be used to fine-tune the viewing experience for a single individual to compensate for different positioning of the head-worn display on the user head each time the user uses the head-worn display. The method can also be important for improving the accuracy of positioning of augmented reality objects. The method includes using an externally facing camera in the head-worn display to capture an image of the surrounding environment that includes at least a portion of the user's field of view of the see-through view of the surrounding environment. A visible marker such as for example, a cross, is provided in a corner of the captured image to provide a first target image. The first target image is then displayed to the user so the user simultaneously sees the displayed image of the surrounding environment from the first target image overlaid onto the see-through view of the surrounding environment. The user looks at the visible marker and then uses eye tracking control to move the displayed image to the position where the portion of the displayed image adjacent to the visible marker is aligned with objects in the see-through view of the environment. Where eye tracking controls include an eye camera to determine the movements of the user's eye and blinks of one or both eyes (head movements can be used in conjunction with eye controls in the user interface) which are used to in a user interface to input control inputs. A second image of the surrounding environment is then captured and a visible marker is provided in a corner to provide a second target image wherein the visible marker in the second target image is positioned in a corner that is opposite to the visible marker in the first target image. The second target image is then displayed to the user. The user then looks at the visible marker in the second target and uses eye control to move the displayed image to align objects in the second target image that are adjacent to the visible marker with objects in the see-through view of the environment. During the period when the user is viewing the first and second target images, it is important that the user not move their head relative to the environment. The displayed image is then adjusted in correspondence with the relative amounts that the first and second target images had to be moved to align portions of the displayed image with corresponding portions of the see-through view of the surrounding environment.

FIG. 127 shows an example of an illustration of a see-through view of the surrounding environment with an outline showing the display field of view 12723 being smaller than the see-through field of view 12722 as is typical.

FIG. 128 shows an illustration of a captured image of the surrounding environment which can be a substantially larger field of view than the displayed image so that a cropped version of the captured image of the environment can be used for the alignment process.

FIG. 129a shows an illustration of a first target image 12928 and FIG. 129b shows an illustration of a second target image 12929, wherein the target images 12928 and 12929 each include visible markers 12926 and 12927 in opposite respective corners.

FIG. 130 shows an illustration of a first target image 12928 overlaid onto a see-through view wherein the first target image 12928 has been moved using eye tracking control to align the portion of the first target image that is adjacent to the visible marker 12926 in relation to corresponding objects in the see-through view. Note that objects in the displayed image are shown in FIG. 130 to be smaller in overall size compared to the see-through view before being adjusted to improve alignment, but it is also possible that the overall size could be larger before adjustment.

FIG. 131 shows an illustration of a second target image 12929 overlaid onto a see-through view wherein the second target image 12929 has been moved using eye tracking control to align the portion of the second target image that is adjacent to the visible marker 12927 in relation to corresponding objects in the see-through view. The movements needed to align the first target image 12928 and the second target image 12929 are then used to determine adjustments to the displayed image so that the accuracy of the alignment of the displayed image field of view 12723 with the see-through field of view 12722 is improved. Where the determined adjustments to the displayed image can include adjustments in overall size, cropping of the image and vertical and horizontal position of the displayed image within the displayed image field of view 12723. By adding at least one more visible marker to the target images and using at least one more step to position the target images relative to the see-through view of the environment, rotational adjustments can be determined to further improve the alignment of the displayed image to the see-through view of the environment. A separate figure showing an illustration of the displayed image sized and aligned to match the see-through view of the surrounding environment is not shown because it would look like FIG. 127. The determined adjustments can then be used to improve the alignment of other displayed images to the see-through view of the surrounding environment so that areas in the displayed image can be mapped to the corresponding areas in the see-through view that would be located behind the displayed image when viewed in the head-worn display. The determined adjustments can also be used to map the movements of the user's eye to areas in the see-through view of the environment as captured in images of the surrounding environment from the externally facing camera, so that it can be determined where the user is looking in the surrounding environment. Further, by analyzing a captured image of the environment, it can be determined what the user is looking at in the surrounding environment.

In a yet further embodiment, eye tracking controls are used by the user to adjust the size of the displayed image and adjust the position of the displayed image to match the see-through view of the surrounding environment. In this method, an image of the surrounding environment is captured by the externally facing camera in the head-worn display. The image of the surrounding environment is then displayed to the user within the displayed image field of view 12723 so the user simultaneously sees the displayed image of the surrounding environment overlaid onto the see-through view of the surrounding environment. The user then uses eye tracking controls to perform two adjustments to the displayed image to improve the alignment of the displayed image of the surrounding environment with the see-through view of the surrounding environment. The first adjustment is to adjust the size of the displayed image of the surrounding environment in relation to the size of the see-through view of the surrounding environment. This adjustment can be performed by the user, for example by a long blink of the eye to begin the adjustment, followed by a sliding movement of the eye to increase or decrease the size of the displayed image. Another long blink ends the resizing process. The second adjustment is to position the displayed image to improve the alignment of the displayed image of the surrounding environment with the see-through view of the surrounding environment. This adjustment can be performed by the user for example, by a long blink of the eye to begin the adjustment followed by a sliding directional movement of the eye to indicate the movement to align the displayed image to the see-through view of the environment. This adjustment process can be performed for one eye at a time so that the displayed images for the left and right eyes can be positioned independently for improved viewing of stereo images. The determined adjustments are then used with other displayed images to improve the alignment of the other displayed images to the see-through view of the environment and to determine the mapping of the see-through view as seen behind the displayed image in the head-worn display. The determined adjustments can also be used to map the movements of the user's eye to areas in the see-through view of the environment as captured in images of the surrounding environment from the externally facing camera, so that it can be determined where the user is looking in the surrounding environment. Further, by analyzing a captured image of the environment, it can be determined what the user is looking at in the surrounding environment.

While some of the embodiments above have been described in connection with the use of eye tracking input for display content control and adjustment, it should be understood that an external user interface may be used in conjunction with or instead of eye-tracking control. For example, when the displayed content is presented in the field of view of the head-worn display, a touch pad, joy stick, button arrangement, etc. may be used to align the content with the surrounding environment.

In embodiments, the displayed content may be color adjusted depending on the scene background that will be behind the displayed content in the see-through display to compensate for the color of the scene background such that the displayed content appears to be properly color balanced. For example, if the scene background over which the displayed content will be overlaid is red (e.g. a red brick wall), the displayed content may be adjusted to reduce its red content because some of the scene's red content will be seen through the displayed content and hence contribute to the red content in the displayed content.

In embodiments, the displayed content may be adjusted as described herein (e.g. to blend or be distinguished from the scene as viewed through the see-through display) by adjusting a color and/or intensity of light produced by a lighting system adapted to light a reflective display, adjusting the image content through software image processing, adjusting an intensity of one or more colors of an emissive display, etc.

In embodiments, the see-through scene brightness and/or color may be based on an average see-through brightness and/or color of the scene as viewed through the display or otherwise proximate the head-worn display, a brightness and/or color of an object apparently in view through the see-through display, an eye heading (e.g. eye position based on eye imaging as described herein), compass heading, etc.

The inventors have discovered that, in head-worn displays that include multiply folded optics, it can be advantageous to use a solid prism with an included fold surface to improve image quality and enable a more compact form factor. They have also discovered that manufacturing of the solid prism by molding can be challenging due to sink marks, which often appear on planar surfaces. In addition, providing the illumination light into the solid prism at the required angle requires special considerations. Imaging of the user's eye can be an important feature in head-worn displays for user identification and as a user interface. Eye imaging apparatus are provided herein for a variety of head-worn displays.

An aspect of the present disclosure relates to a solid prism with improved manufacturability along with design modifications that enable illumination light to be effectively supplied into the solid prism at the required angle to illuminate the image source.

An aspect of the present disclosure relates to a solid prism with a fold surface platform, wherein an optically flat fold surface is mounted on the prism's fold surface platform such that the fold surface maintains a high optical flatness that minimizes aberrations in the prism's fold surface platform.

An aspect of the present disclosure relates to providing additional optical features in the solid prism that are used for capturing images of the user's eye with an eye imaging camera.

An aspect of the present disclosure relates to providing a solid prism with a fold surface, wherein the solid prism includes shaped input and/or output surfaces that act as optical power producing optical systems.

An aspect of the present disclosure relates to a solid prism with optical power producing surfaces with an additional power lens above the combiner such that the physical size of the power lens above the combiner is reduced thereby reducing the overall size of the optical system.

An aspect of the present disclosure relates to a solid prism with an optically powered surface at the image light-receiving end of the optical path from the display, wherein an additional optically powered field lens is positioned between the display and the optically powered surface to further increase the optical power of the optical system.

An aspect of the present disclosure relates to a solid prism with a fold surface that includes optically powered input and/or output surfaces and material selection amongst related optical materials that are adapted to reduce lateral color aberrations and thereby improve image quality provided to the user.

An aspect of the present disclosure relates to an angled backlight assembly that redirects illumination light toward an image source through the inclusion of a prism film, wherein the prism is positioned on the side of the backlight so that it acts like a Fresnel wedge.

An aspect of the present disclosure relates to a stray light management system adapted to manage stray light produced by a prism film used in a backlighting system, wherein the prism film causes significant stray light and an analyzer polarizer film is positioned in an image light optical path to absorb such stray light.

An aspect of the disclosure relates to an emissive display system that projects image light into a solid prism with a fold surface for delivery of the image light to the user's eye.

An aspect of the present disclosure relates to projecting illuminating light through a portion of the display optics and towards a combiner surface, wherein the illuminating light reflects off the combiner surface and directly towards an eye of the user to thereby illuminate the eye for eye imaging. In embodiments, the display optics includes a solid prism and a light source is mounted above the fold surface of the solid prism.

An aspect of the present disclosure relates to capturing eye images directly from the combiner, wherein the eye-imaging camera is mounted above the combiner. In embodiments, an eye light is positioned at the top edge of the combiner so the eye is illuminated directly.

An aspect of the present disclosure relates to a surface applied to the combiner, wherein the surface is applied outside of the field of view of the see-through display and adapted to reduce stray light reflections from reflecting off the combiner and towards an eye of the user.

An aspect of the present disclosure relates to a surface applied to the combiner, wherein the surface is adapted to reflect infrared light and pass visible light such that visible stray light reflections towards the user's eye are minimized and such that infrared light from an infrared light source is reflected towards the user's eye. The infrared reflections may then be used for eye imaging.

An aspect of the present disclosure relates to eye imaging through a waveguide optic adapted to transmit image light and to be see-through for a user's view of the surroundings, wherein the eye imaging camera is positioned to receive eye images through the waveguide optic such that the image is captured from a position in front of the user's eye.

An aspect of the present disclosure relates to eye imaging by capturing reflected light off of an outer surface of a waveguide optic adapted to transmit image light and to be see-through for a user's view of the surroundings.

FIG. 132 shows an illustration of multiply folded optics for a head worn display that includes a solid prism 13250. Where the solid prism 13250 includes a planar surface 13254 (i.e. a first fold surface) that is reflective to redirect the image light 13230 and thereby provide a first fold to the optical axis 13235 to enable the multiply folded optics to be more compact than optics which do not include this fold. As shown in FIG. 132, a second fold of the optical axis 13235 is provided in the lower portion of the multiply folded optics where the image light 13230 is reflected by the combiner 13210 (i.e. a second fold surface) so the image light 13230 is directed into the eyebox 13220 where the user's eye is located as has been previously described herein. The planar surface 13254 can be a full mirror so that all of the image light 13230 is reflected, wherein the image source 13260 must be a self-luminous image source such as an OLED or a backlit image source such as an LCD so that the image light 13230 is provided directly by the image source 13260. However if the image source 13260 is a reflective image source such as a LCOS, FLCOS or DLP illumination light must be supplied which is then reflected by the image source 13260 to provide image light 13230. In the case where the reflective image source is an LCOS or FLCOS, where illumination light is needed at a high incidence angle, the planar surface 13254 can be a partial mirror so that illumination light can be provided from a light source located behind the planar surface 13254 and pointed at the image source 13260. In the case where the reflective image source is a DLP, where illumination light is needed at an angle commensurate with the mirror angles, the planar surface 13254 may be extended, or an additional surface may be provided, such that light can be provided from a light source located behind the planar surface 13254 or the additional surface. In embodiments, a first advantage provided by the solid prism 13250 is that the cone angle of the image light 13230 is reduced inside the solid prism 13250 thereby extending the optical path length so that a fold can be provided to the optical axis 13235 thereby enabling a more compact size of the multiply folded optics. A second advantage of the solid prism 13250 is that the planar surface 13254 provides an internal reflection so that dust cannot collect on the reflective surface. A third advantage of the solid prism 13250 is that stray light is easier to control by blackening the external surfaces that do not need to transmit light.

In addition to folding the optical axis 13235 by reflecting off the planar surface 13254, the solid prism 13250 can also provide optical power since the input and output surfaces 13252 can be curved. FIG. 132 shows two surfaces 13252 that have optical power. By providing some of the optical power needed in the multiply folded optics, the power lens 13240 doesn't need to provide as much optical power and as a result, the power lens 13240 is thinner and the overall size of the multiply folded optics is thereby reduced. A field lens 13270 can also be provided to act in conjunction with the solid prism 13250 and the power lens 13240. By selecting the materials of the field lens 13270, the solid prism 13250 and the power lens 13240 to be different in terms of refractive index and Abbe number (combining flint and crown glass properties as is known by those skilled in the art), the lateral color aberration in the image light 13230 provided to the eyebox 13220 can be substantially reduced thereby improving the sharpness of the image as perceived by the user particularly in the corners of the image.

In the multiply folded optics, the surfaces (13254 and 13210) that fold the optical axis 13235 are preferentially optically flat (e.g. flatness better than 10 microns) to maintain the wavefront of the image light 13230 and thereby provide a high quality image to the user. These surfaces can be tilted relative to the optical axis 13235 to compensate for twists of the upper portion of the optics (extending from the image source 13260 to the bottom surface of the solid prism) relative to the lower portion of the optics (extending from the power lens to the eyebox) as has been described previously herein.

Manufacturing of a plastic solid prism 13250 by molding can be difficult, because the solid prism 13250 has non-uniform thickness and it can include curved surfaces and flat surfaces. Injection molding of curved surfaces requires a different process setup than that required for injection molding flat surfaces. In particular, optically flat surfaces can be very difficult to injection mold without sink marks when the thickness of plastic under the flat surface is not uniform as is the case for the solid prism 13250. To overcome this difficulty, the present disclosure provides a separate reflective plate 13275 that is used to establish an improved flat surface 13254. The reflective plate 13275 can be manufactured using a sheet manufacturing process so that a high degree of optical flatness is provided. In a preferred embodiment, the reflective plate 13275 is a glass plate that has been coated to provide reflectivity. Where the coating can be a full mirror if the image source 13260 is a self-luminous display or it can be a partial mirror if the image source 13260 is a reflective display. In a further preferred embodiment, the reflective plate 13275 includes a glass plate with a reflective polarizer such as a Proflux wire grid polarizer by Moxtek (Orem, Utah) so that light of one polarization state is reflected and light of the opposite polarization state is transmitted.

The reflective plate 13275 can be bonded to the planar surface 13254 of the solid prism 13250 using a transparent adhesive that has a refractive index that is very similar (within for example +/−0.05) to that of the solid prism material (also known as index matched). By matching the refractive index of the adhesive to the refractive index of the solid prism 13250, the interface between the solid prism material and the adhesive becomes optically invisible. In this way, the adhesive can fill in any spaces between the reflective plate 13275 and the planar surface 13254 of the solid prism 13250 that are caused by sink marks, scratches, grooves or other non-flatness of the planar surface of the solid prism. The flatness of the planar surface as molded on the solid prism 13250 is then not important to the optical performance of the multiply folded optic, and instead the flatness of the reflective plate 13275 determines the a new flat surface 13254 with improved flatness. In this way, the manufacturing of the solid prism 13250 becomes easier and less expensive because the planar surface 13254 does not have to be an optically flat surface as molded (or otherwise manufactured) and the manufacturing process used to make the solid prism 13250 can be optimized for the powered surfaces 13252. In addition, by bonding the reflective surface of the reflective plate 13275 to the planar surface 13254, the optically flat reflective surface is protected from being damaged during the further assembly process of the multiply folded optics.

FIGS. 133*a*, 133*b* and 133*c* show illustrations of steps associated with bonding the reflective plate 13275 to the solid prism 13250. As shown in FIG. 133*a*, the solid prism 13250 is mounted for bonding so that the planar surface 13254 is approximately horizontal. A drop 13377 of relatively low viscosity (e.g. 200 centipoise) transparent adhesive is then applied to the flat surface 13254. Where the adhesive is selected to have a refractive index that is very similar to the material of the solid prism 13250 so that the adhesive and the solid prism are index matched. The reflective plate 13275 is then brought into contact with the drop 13377 as shown in FIG. 133*b*. The adhesive is then allowed to wick across the interface between the reflective plate 13275 and the planar surface 13254 until the entire interface is covered by the adhesive as shown in FIG. 133*c*. Importantly, in embodiments, no pressure is applied to the reflective plate 13275 during the bonding process so that the reflective plate 13275 is not distorted and the optical flatness of the reflective plate 13275 is maintained. The drop 13377 used is relatively small so the interface is covered without adhesive oozing out at the edges. The adhesive is then cured, by waiting the appropriate length of time, applying heat or applying UV light as appropriate for the adhesive. In a preferred embodiment, a UV curing adhesive is used to provide a rapid cure. The advantage of bonding the reflective plate 13275 to the solid prism 13250 is that the adhesive can fill any sink marks that may be present on the planar surface of the prism so that the surface of the reflective plate 13275 establishes a planar surface 13254 with improved flatness and a desired level of reflectivity to reflect the image light 13230. Since the adhesive is index matched to the material of the solid prism 13250 the image light 13230 passes from the solid prism 13250 through the layer of adhesive to the surface of the reflective plate 13275 without disturbing the wavefront of the image light 13230 so that high image quality is maintained.

FIG. 134 shows an illustration of multiply folded optics for a reflective image source with a backlight assembly positioned behind the reflective plate 13275. Where, as shown in FIG. 134, the reflective plate 13275 is a partial mirror that transmits at least a portion of the light from the backlight to illuminate the image source 13260 and then reflects at least a portion of the image light 13230. In a preferred embodiment, the reflective plate 13275 is a reflective polarizer that transmits one polarization state while reflecting the opposite polarization state. In this case, the illumination light 13432 is provided with a first polarization state (for example P polarization) and the image light 13230 is a second polarization state (for example S polarization). This change in polarization state occurs in the bright areas of the displayed image when the illumination light 13432 is reflected by the image source 13260 if the image source 13260 is for example a normally white LCOS. As a result, image light 13230 in the bright areas of the displayed image are reflected by the reflective polarizer of the reflective plate 13275 and image light in the dark areas of the displayed image is transmitted by the reflective polarizer, so that image light of only the second polarization state passes into the lens 13240. The backlight assembly includes a prism film 13477 to deflect, at least a portion of the illumination light 13432 provided by the light guide 13480, toward the image source

13260. Where the prism film 13477 can be a turning film such as DTF provided by Luminit Corporation (Torrance, Calif.) or alternatively the prism film can be a brightness enhancement film such as Vikuiti BEF4-GT-90 provided by 3M (St. Paul, Minn.). A diffuser film 13478 is also included in the backlight assembly to provide the desired cone angle of light within the illumination light 13432. A light source 13479 is also included in the backlight assembly to provide light to the light guide 13480, where the light source 13479 can be one or more LEDs. The light source 13479 can provide white light or sequential color illumination (e.g. a repeating sequence of red then blue then green illumination, or cyan then magenta then yellow illumination) depending on whether the reflective image source includes a color filter array or not.

In a solid prism 13250, the angle that the illumination light 13432 can be provided at is limited by refraction effects at the interface where the light enters the solid prism 13250. As an example, following Snell's law for refraction across an interface $n1 \sin 81 = n2 \sin 82$ to provide illumination light 13432 inside the solid prism with the approximately 30 degree angle from the interface normal that is shown in FIG. 134, the light from the backlight assembly would have to be provided to the interface at approximately 50 degrees if the prism material has a refractive index of 1.5. Where n1 is the refractive index of the first medium where the light is coming from, 01 is the angle of the light relative to the surface normal in the first medium, n2 is the refractive index of the second medium where the light is going and 02 is the angle of the light relative to the surface normal in the second medium. Providing illumination light 13432 with a 50 degree angle from the backlight assembly can be difficult as turning films are not available that deflect light by such a large angle. To reduce refraction effects, a prism film 13477 is used as a Fresnel wedge with the smooth side bonded to the reflective plate 13275 and the prism structure pointed toward the backlight assembly. FIG. 135 shows an illustration of a prism film 13477 bonded to a reflective plate 13275, where the prism film 13477 shown is a brightness enhancement film with linear prismatic surfaces oriented at approximately 45 degrees to the interface (thereby forming linear prisms with a 90 degree included angle) and an optically clear adhesive 13578 such as 8142KCL available from 3M (St. Paul, Minn.) used to bond the prism film 13477 to the reflective plate 13275. It should be noted that this orientation with the prismatic structure pointed toward the light source is opposite to the orientation typically used for a brightness enhancement film, which is typically used to collimate light in a backlight. Instead, with the orientation shown in FIG. 135, following Snell's Law as previously described herein, the 45 degree surfaces of the brightness enhancement film split the incoming light into two cones of light (illustrated in FIG. 13 Sa as light 13532 and 13533) with respective deflection angles of approximately +/−17 degrees inside the prism film 13477 relative to the incident illumination light from the diffuser which is approximately perpendicular to the plane of the light guide 13480 and the plane of the reflective plate 13275. Importantly, the prism film provides a substantially reduced amount of light between the two cones of light. Where the cone angle of the light within each of the cones of light is determined by the cone angle of the diffuser 13478. The deflection angle of the illumination light 13432 can be modified by adding a turning film (not shown) on top of the prism film, where the turning film changes the angle of the illumination light provided to the prism film 13477. Typical turning film such as the DTF film available from Luminit (Torrance, Calif.) provides a 20 degree deflection of light. The illumination light is then incident onto one surface of the prism film at 65 degrees and 25 degrees on the other surface of the prism film. The two cones of illumination light inside the prism film have deflection angles of +28 and −8 degrees relative to the incident illumination light from the diffuser which is approximately perpendicular to the plane of the light guide 13480 and the plane of the reflective plate 13275. Since the prism film 13477 is bonded to the reflective plate 13275 and the reflective plate is bonded to the solid prism 13250, the angle of light inside the prism film 13477 is essentially maintained into the solid prism 13250, provided the refractive indices of the prism film 13477, the reflective plate 13275 and the solid prism 13250 are reasonably similar. In this way, the system deflects the illumination light 13432 provided by the backlight assembly in a direction that directs the illumination light 13432 toward the image source 13260. The image source 13260 is thereby illuminated by the light guide 13480 in a way that allows the multiply folded optics to have a more compact form factor as provided by the multiple folds of the optical axis 13235. In manufacturing, the prism film 13477 can be bonded to the reflective plate 13275 either before or after the reflective plate 13275 is bonded to the solid prism 13250.

FIG. 135a shows an illustration of multiply folded optics in which the two cones of illumination light 13532 and 13533 provided by the prism film 13477 are shown. While illumination light D32 illuminates the image source 13260, illumination light 13533 is a form of stray light in the multiply folded optics that must be controlled to provide high contrast image light 13230 to the eyebox 13220 so that the user experiences a high contrast image. The advantage provided by the prism film 13477 is that approximately half of the illumination light (13532) is deflected toward the image source 13260 while the other half of the illumination light (13533) is deflected in a direction where stray light can be controlled and little light is provided between 13532 and 13533 where control of stray light is more difficult. FIG. 135a includes an analyzer polarizer 13582 to absorb the portion of light 13533 from the backlight that is not used to illuminate the image source 13260. Analyzer polarizer 13582 is shown positioned between the power lens 13240 and the combiner 13210, however, the analyzer polarizer 13582 could also be positioned in the gap between the solid prism 13250 and the power lens 13240. The analyzer polarizer 13582 is oriented with its transmission axis so that light with the polarization state of the bright areas of the image light is transmitted and light with the polarization state of the dark areas of the image light and the illumination light 13533 is absorbed. As such, the analyzer polarizer provides a dual purpose by reducing stray light associated with the illumination light 13533 and associated with image light in the dark areas of the image.

In multiply folded optics with a solid prism, additional optical elements can be added for imaging the eye of the user for the purpose of eye tracking in a user interface or eye identification for security purposes. FIGS. 136, 137 and 138 show illustrations of different embodiments of additional optical elements included in the solid prism for imaging the eye of the user. FIGS. 136 and 137 show illustrations of various views of an optical element 13612 attached to the side of the solid prism 13250 such that eye camera 13610 can image the user's eye in the eyebox 13220. The optical element 13612 is shown as a single lens surface angled relative to optical axis 13235 to provide a field of view that includes light 13613 reflected from the user's eye. In this way, the light 13613 reflected from the user's eye is multiply folded in a way that is similar to the image light 13230. However, the optical element 13612 can include more than one lens surface and more than one lens element to improve the resolution of the eye imaging. FIG. 137 shows how the optical element 13612 can be positioned adjacent to surfaces 13252 on the solid prism 13250. With the optical element 13612 positioned as shown in FIGS. 136 and 137, the eye camera 13610 is provided with a field of view that includes light 13613 reflected by the eye and the field of view associated with the optical element 13612 tends to extend to the upper portion of the user's eye. Where the user's eye can be passively illuminated by image light 13230 or actively illuminated by additional lights (not shown) adjacent to the eyebox 13220 or adjacent to the optical element 13612. The additional lights can be infrared lights provided the eye camera 13610 can capture infrared images of the user's eye. FIG. 138 shows an illustration of another solid prism 13250 with an optical element 13812 positioned adjacent to the top of the solid prism 13250 to enable the eye camera 13814 to image the eyebox 13220. In this case, the optical element 13812 is attached to the solid prism 132450 and designed to provide a field of view that includes light 13813 that is reflected from the user's eye. The light 13613 is reflected by the user's eye and captured by the eye camera 13814 following a singly folded path. Where the field of view associated with the optical element 13812 being positioned as shown in FIG. 138 tends to extend to the side of the user's eye. In both of the embodiments shown for eye imaging in FIGS. 136, 137 and 138, the optical elements 13612 and 13812 are designed to take into account the fact that the light reflected by the user's eye passes through the power lens 13240 and at least a portion of the solid prism 13250. From a manufacturing perspective, the optical elements 13612 and 13812 can be made as attachments to the solid prism 13250 or made as an integral part of the solid prism 13250 that is molded along with the other surfaces of the solid prism 13250.

In a further embodiment, eye imaging is included for the multiply folded optics shown in FIG. 132. FIG. 139 shows an illustration of an eye imaging system for multiply folded optics in which the image source is a self-luminous display such as for example an OLED or a backlit LCD. In this case, the reflective plate 13275 is a partial mirror that is bonded to the planar surface 13254 of the solid prism 13250 as previously described herein. Alternatively a partial mirror coating can be applied directly to the planar surface 13254, provided the planar surface 13254 is optically flat. The partial mirror then reflects a portion of the image light 13230 thereby redirecting it toward the lens 13240 and the combiner 13210 where the image light 13230 is reflected a second time and thereby redirected toward the user's eye to provide an image to the eyebox 13220. Simultaneously, a portion of the light 13923 reflected by the user's eye is transmitted by the partial mirror and captured by an eye camera 13922. Where, the user's eye can be passively illuminated by the image light 13230 and additional active illuminating light 13913 can be provided by an eye light 13912 to illuminate the user's eye. In a preferred embodiment, the eye light 13912 provides infrared illuminating light 13913 and the eye camera 13922 is sensitive to infrared light, in this way the illuminating light 13913 doesn't interfere with the images displayed to the user by the image light 13230. In a further preferred embodiment, the partial mirror is a cold mirror that reflects a majority of visible light (e.g. greater than 80% of visible light, 400-700 nm) and transmits a majority of infrared light (e.g. greater than 80% of infrared light 800-1000 nm). In a yet further preferred embodiment, the combiner is at least partially coated with a hot mirror coating that reflects infrared light and transmits visible light. Wherein for example, the hot mirror coating can reflect greater than 80% of the infrared light provided by the eye light and transmit greater than 50% of the visible light associated the see-through view of the surrounding environment. By including a cold mirror on the planar surface or the reflective plate 13275 along with a hot mirror on the combiner 13210, losses of the light 13923 reflected by the user's eye can be reduced thereby enabling bright images to be captured of the user's eye and reducing power needed for active illumination of the user's eye by the eye light 13912.

FIGS. 140a and 140b show illustrations of folded optics with a combiner 14010 that redirects image light 13230 that has been provided by upper optics 1406 that includes an image source and associated optics. A camera 14022 is provided for imaging the user's eye 1408 when positioned adjacent to the eyebox 13220. An eye light 14012 is provided to provide illuminating light 14013 that is reflected by the combiner 14010 and thereby directed toward the user's eye 1408. Where, the camera 14022 is positioned to one side of the upper optics 1406 so that light 14023 reflected by the user's eye is reflected by the combiner 14010 and captured by the camera 14022. As previously described herein, the eye light 14012 can provide infrared illuminating light 14013 (e.g. 850 nm) and the combiner 13220 can include a hot mirror coating to reflect the majority of the infrared illuminating light 14013, while providing a see-through view of the surrounding environment. The eye light 14012 can be positioned to one side of the upper optics 1406 and preferably the eye light 14012 is positioned adjacent to the camera 14022 so that the illuminating light 14013 causes light 14023 to be reflected from the user's eye with a distribution that can be efficiently captured by the camera 14022. For example, the eye light 14012 can be positioned on an adjacent side of the upper optics 1406, as in FIGS. 140a and 140b where the eye light 14012 is shown positioned on the back side of the upper optics 1406 so the illuminating light is reflected by the combiner back toward the user's eye 140b and the camera 14022 is shown on the left side of the upper optics 1406, but other arrangements are also possible. In a preferred embodiment, the eye light 14012 is a small LED that is mounted on the lower front edge of the upper optics 1406 and pointed directly back toward the user's eye 1408.

In embodiments, the combiner 14010 includes a surface that prevents visible light reflections outside of the field of view. The surface may include an anti-reflective coating and it may only be applied outside of the field of view. This arrangement can be useful in preventing environmental stray light from reflecting into the user's eyes. Without such a surface, light from the environment may reflect off of the combiner surface and into the user's eye.

FIGS. 141a and 141b show illustrations of folded optics that include a waveguide 14132 with an angled partially reflective surface 14135 and a powered reflective surface 14136. Where an image source 14153 provides image light 14130 that is reflected by reflective plate 14175 so that the image light 14130 is conveyed by the waveguide 14132 to the partially reflective surface 14135 where it is transmitted to the powered reflective surface 14136 where it is condensed and reflected back toward the partially reflective surface 14135. The partially reflective surface then reflects and redirects the image light so that the image light 14130 is provided to the user's eye 1408. In the embodiment shown in FIG. 141*a*, an eye light 14112 is positioned adjacent to one end of the waveguide 14132 so that illuminating light 14113 is directed at the user's eye 1408. A camera 14122 is positioned behind the reflective plate 14175 wherein the reflective plate reflects at least a portion of the image light 14130 and transmits at least a portion of the light 14123 that is reflected by the user's eye 1408. Wherein the reflective plate 14175 can be a partially reflecting mirror, a reflective polarizer or in a preferred embodiment the reflective plate 14175 is a cold mirror that reflects visible light and transmits infrared light (e.g. the cold mirror reflects greater than 80% of visible light, 400 to 700 nm, and transmits greater than 80% of the infrared light provided by the eye light, 800 to 1000 nm). It will be noted that in some cases the reflective plate can be replaced by a coating applied directly to the underlying planar surface of the waveguide 14132 provided the planar surface is optically flat. As previously described herein, eye light 14112 can provide infrared illuminating light 14113 provided the camera 14122 is sensitive to infrared. By positioning the camera 14122 behind the angled reflective plate 14175, the image light 14130 and the light 14123 reflected by the user's eye 1408 can be coaxial so that images captured of the user's eye 1408 are from a perspective directly in front of the user. FIG. 141*b* shows another embodiment in which the eye light 14112 is positioned adjacent to the camera 14122 so that the illuminating light 14113 is transmitted by the reflective plate 14175 and conveyed by the waveguide 14132 in a manner similar to the image light 14130 so that it is redirected toward the user's eye 1408.

FIGS. 142*a* and 142*b* show illustrations of folded optics for a head-worn display that include waveguides 14232 with at least one holographic optical element 14242 and image source 14253. In this embodiment, the image source 14253 provides image light 14230 to the waveguide 14232 (not shown) so that the holographic optical element 14242 can redirect the image light 14230 at approximately 90 degrees towards the user's eye 1408. A camera 14222 is provided to capture images of the user's eye 1408. An eye light 14212 provides illumination light 14213 to the user's eye 1408. Light 14223 is reflected by the user's eye 1408 and is captured by the camera 14222. As shown in FIG. 142*a*, the eye light 14212 is positioned to one side of the waveguide 14232 and adjacent to the camera 14222. A hot mirror coating with its reflection spectrum matched to the infrared spectrum provided by the eye light 14212, is applied to at least a portion 14224 of the waveguide 14232 so that the majority of light 14223 is reflected toward the camera 14222 and a bright see-through view of the surrounding environment is provided simultaneously. FIG. 142*b* shows an illustration of similar folded optics for a head-worn display in which the waveguide 14232 is positioned at an angle to the user's eye 1408 to provide a closer fit of the folded optics to the user's head. In this case the holographic optical element 14242 is designed to redirect the image light 14230 at approximately 110 degrees to the waveguide and towards the user's eye 1408. The camera 14222 is then positioned at the end of the waveguide 14232 that is opposite to the image source 14253 to enable the angle between the light 14223 reflected from the user's eye 1408 and the illumination light 14213 to be reduced. In this way an image of the user's eye 1408 with more uniform brightness can be captured by the camera 14222. As previously described herein, at least a portion 14224 of the waveguide 14232 can be a hot mirror to reflect a majority of the light 14223 reflected by the user's eye 1408 while a bright see-through view of the surrounding environment is provided simultaneously.

FIG. 143 shows an illustration of folded optics for a head-worn display in which the illumination light is injected into the waveguide and redirected by the holographic optical element so that the user's eye is illuminated. Eye light 14312 is positioned at one end of the waveguide 14232 so that the illumination light 14313 can be injected into the waveguide 14232 and conveyed along with the image light 14230 to the holographic optical element 14242. The holographic optical element 14242 then redirects the image light 14230 and the illumination light 14313 towards the user's eye 1408. The holographic optical element 14242 must then be capable of redirecting both the image light 14230 and the illumination light 14313, where the image light 14230 is visible light and the illumination light 14313 can be infrared light. Light 14223 reflected by the user's eye is then reflected by the waveguide surface and captured by the camera 14222. A hot mirror coating with its reflection spectrum matched to the infrared spectrum provided by the eye light 14212, is applied to at least a portion 14224 of the waveguide 14232 so that the majority of light 14223 is reflected toward the camera 14222 and a bright see-through view of the surrounding environment is provided simultaneously. The advantage of this design is that the illumination lighting system including eye light 14312 can be made more compact. FIG. 144 shows an illustration of folded optics for a head-worn display that is similar to the system shown in FIG. 143 where a series of angled partial mirrors 14442 are included in the waveguide instead of a holographic optical element. In this case, illumination light 14413 is injected into the waveguide 14432 along with image light 14230 provided by the image source 14253. The illumination light 14413 and the image light 14230 are conveyed by the waveguide 14432 to the series of angled partial mirrors 14442 which redirect the illumination light 144134 and image light 14230 towards the user's eye 1408. Light 14223 reflected by the user's eye 1408 is reflected by a hot mirror coating applied at least to a portion 14224 of the waveguide 14432 wherein the reflection spectrum of the hot mirror is matched to the infrared spectrum of the illumination light 144134 provided by the eye light 14212. The advantage of this design is that the illumination lighting system is compact and the series of angled partial mirrors can be easily made to operate on both the visible image light 14230 and the infrared illumination light 14413.

When using a head-worn display for augmented reality applications, particularly when the head-worn display provides a see-through view of the surrounding environment, it can be important to be able to change the focus depth that the displayed image is presented at. It is also important to present stereo images at the proper vergence distance to provide the intended perception of depth to the user. Where focus distance is the distance the user's eye must be focused at to view a sharp image and vergence distance is the distance the user's two eyes come together to view the same spot in an image or on a real object. Within a stereo image, objects intended to be perceived to be at different depths are presented with a rendered lateral shift between the relative locations of the object within the left and right images, which is known as disparity. The rendering of typical stereo imagery as viewed in theaters or on televisions is mostly directed at disparity mapping of objects to create the 3D effect because the focus distance is limited to the theater screen or television (see the paper "Nonlinear disparity mapping for stereoscopic 3D", M. Lang, A. Hornung, O. Wang, S. Poulakos, A. Smolic, M. Gross, ACM Transactions on Graphics (Impact Factor:3.73). July 2010; 29. DOI: 10.1145/1833349.1778812). To make the stereo viewing experience more comfortable for the user, the vergence distance associated with viewing an augmented reality object should closely match the focus distance associated with the same augmented reality object thereby enabling the augmented reality object to more closely resemble a real object as seen by the user of the head-worn display. The systems and methods in accordance with the principles of the present disclosure provide methods of changing the focus distance and vergence distance associated with augmented reality objects and imagery viewed in a head-worn display in ways that more closely match real objects in a see-through view of the surrounding environment.

The focus distance of an image displayed in any head-worn display is determined by the elements in the optics of the head-worn display. The focus distance of the image can be changed by changing the elements in the optics, or by changing the relative positioning of some of the elements in the optics. The vergence distance associated with stereo images is determined by the lateral positioning of the images within the field of view of the user's left and right eyes. The vergence distance can be changed by laterally shifting the left and right images relative to one another within the user's fields of view either by repointing the left and right optics thereby establishing a different point of convergence between the left and right optics or by digitally shifting the displayed images within the display fields of view. To provide a stereo viewing experience of augmented reality objects that more closely resemble the viewing experience associated with a real object, it is important that the focus distance match the vergence distance for augmented reality objects in displayed stereo images in a head-worn display within the limitations of the user's eyes. Given that augmented reality objects are often positioned at different distances within stereo images and as different augmented reality activities are conducted at different distances, the inventors have discovered that methods are needed to change focus distance with a corresponding change in vergence distance within all types of head-worn displays.

FIG. 145 shows an illustration of a beam splitter based optical module for a head-worn display (shown from the side and from the eye position) that includes upper optics 14510 and a combiner 14520. Wherein the upper optics 14510 include an image source, a light source and one or more lens elements. The combiner 14520 is a beam splitter that reflects a portion of the image light associated with the displayed image toward the user's eye while also allowing light from the surrounding environment to be transmitted so that the user sees the displayed image overlaid onto a see-through view of the surrounding environment. FIG. 146 shows an illustration of an optical module for a head-worn display (also shown from the side and from the eye position) that has been modified to change the focus distance by adding a focus shift element 14625. Where the focus shift element 14625 is a thin lens with optical power. For example, the focus shift element 14625 required to change the focus distance from infinity to 1 meter needs to provide −1 diopter of optical power. As such the focus shift element 14625 can be a refractive lens such as a portion of an ophthalmic lens, which is 1 to 1.5 mm thick. Alternatively, the focus shift element 14625 can be a Fresnel lens, which can be thinner than a refractive lens. By positioning the focus shift element 14625 above the combiner 14520, the optical power of the focus shift element 14625 only acts on the displayed image and does not change the see-through view of the surrounding environment. This method can be used in any type of optics for a head-worn display (e.g. projected optics with a see-through combiner, holographic image projection with a see-through combiner, see-through optics with a see-through waveguide, TIR wave guide, etc.) wherein space is available to insert a focus shift element with optical power into the optical path such that the focus distance is changed without changing the see-through view. In the event that the upper optics 14510 utilize polarized image light, a polarization control element 14515 can be included to modify the polarization state of the image light. Where the polarization control element can include one or more of the following: a polarizer to cut unwanted polarization states, a retarder such as a quarter wave film to change the image light to circularly polarized or a half wave film to change the polarization state.

For the case where the user's eyes are not capable of focusing at the focus distance associated with the displayed image, a corrective lens element can be provided behind the optics module to improve the sharpness of the displayed image as perceived by the user. In this case, the corrective lens element is based on the user's ophthalmic prescription and the corrective lens element improves the view for the user of both the displayed image and the see-through view of the surrounding environment. FIG. 146a shows an illustration of a side view of an optics module that includes a corrective lens element 14624. The corrective lens element 14624 can have a positive optical power or a negative optical power as required by the user for viewing the displayed image at the focus distance. In addition, the corrective lens element can also include astigmatism and wedge as included in the user's ophthalmic prescription. Corrective lens elements 14624 for the left and right eyes can be connected to each other to provide a corrective unit that is attached and aligned to the optics module or frame of the head-worn display with either a built-in interpupillary spacing or a flexible interpupillary spacing. Alternatively, the left and right corrective lens elements 14624 can be separate and be attached and aligned individually to the optics module or frame of the head-worn display. For example, for applications where the displayed image is presented with a focus distance and vergence distance of 0.6 meters so that augmented reality objects or information can be provided for a task performed at arm's length, the focus shift element 14625 could have an optical power of −1.6 diopter and could provide only optical power and the corrective lens element 14624 could have an optical power of +2 diopters and also provide correction for astigmatism and wedge per the user's ophthalmic prescription. Where a +2 diopter corrective lens element 14624 would be a fairly typical prescription for reading glasses for a person of approximately 55 years old and as such would enable the person to view objects and images clearly that are positioned at arm's length. The corrective lens element 14624 shown in FIG. 146a is a refractive lens, but other types of lenses are also possible, such as Fresnel lenses.

While lenses with fixed optical power are shown for the focus shift elements 14625 and the corrective lens element 14624, lenses with adjustable optical power can also be used. Adjustable lenses using sliding lens elements (see U.S. Pat. No. 3,305,294) or liquid injection can be obtained for example from Adlens located in Oxford, United Kingdom: https://www.adlens.com/. Electrically adjustable lenses can also be used as corrective lenses such as: liquid crystal lenses available from LensVector (Sunnyvale, Calif.) or liquid lenses available from Varioptic (Lyon, France).

In addition, the optical modules can be mounted in the frame of the head-worn display such that they are slightly pointed toward one another (also known as toe-in) to provide a convergence distance. Thus, the convergence distance is established by the structural setup of the optics in the head-worn display and vergence distance can be adjusted by lateral digital shifting of similar portions of the left and right images that are displayed to create disparity for a portion of an image. The convergence distance then establishes the baseline vergence distance perceived by the user for stereo images that are rendered without disparity. To provide an improved stereo viewing experience, the convergence distance associated with the structural setup of the optics must be taken into account when rendering the disparity associated with displayed objects in stereo images. This is particularly important in a head-worn display system wherein the focus distance and vergence distance are matched for augmented reality objects in stereo images. As such the rendering of stereo images that were originally rendered for viewing in a theater, may need to be adjusted for improved viewing in a head-mounted display. The convergence distance can also be used to establish the perceived distance to the entire image if the stereo image is rendered without disparity, this can be useful for applications such as a head-worn computer wherein the desktop screen associated with the computer is perceived to be at a distance that is established by the convergence distance. However, the convergence distance cannot be too close to the user since the left and right images will experience opposing versions of keystone distortion. For example, a convergence distance of 2.4 meters can be provided by pointing the optics modules towards' each other by 0.75 degrees if the user's eyes are separated by approximately 63.5 mm. The inventors have discovered that 0.75 degrees of toe-in results in a negligible level of keystone distortion. Closer convergence distances require larger angles of toe-in and as such the keystone distortion between the left and right images degrades the perceived sharpness in the corners of a stereo image. This keystone distortion can be compensated for by rendering the left and right images with matching and opposite levels of keystone predistortion.

FIG. 14 7 shows an illustration of left and right optics modules that are connected together in a chassis 14727 where the illustration is shown from behind the chassis 14727 where the user's eyes would be. The chassis 14727 allows the optics modules to be built as a separate unit that is assembled into a head-worn display. By making the chassis 14727 structurally stiff, the optics modules can be physically aligned relative to one another and the focus distance and convergence distance can be checked and adjusted as necessary prior to being assembled into the head-worn display thereby providing additional manufacturing flexibility.

FIG. 147 also shows the focus shift elements 14625 for the left and right optics modules connected in a focus shift element pair 14731. By connecting the focus shift elements 14625 together, it is easier to add a pair of focus shift elements when needed for augmented reality imaging at different distances. The connection between the focus shift elements 14625 in a focus shift element pair 14731 can be rigid as shown in FIG. 147 or flexible to enable the focus shift element pair 14731 to adjust to different spacing between the left and right optics modules with chassis' that have different widths for user's with different spacing between their eyes. Where focus shift elements 14625 with various optical powers are used to provide displayed images with different focus distances for augmented reality activities that require the image to be displayed at different working distances. The focus shift elements 14625 can also be different for the left and right eye to provide different focus distances for the left and right eyes. Focus shift elements 14625 can also be provided without optical power so that they function as a protective window for the upper optics 14510.

In the simplest form, a mode change associated with changing the focus distance and vergence distance, can be accomplished by the user inputting information and selecting options through a user interface such as buttons or a graphical user interface. Confirmation of the mode change can then be provided to the user on the displayed image such as for example a colored box around the edge of the display field of view or a message stating "Mode change initiated for arm's length display". In a more automatic mode change, a sensor 14730 can be provided that senses the focus shift element pair 14731 so that the images can be automatically presented with a lateral shift that provides a different vergence distance that matches the focus distance provided by the focus shift elements 14625. The sensor 14730 can simply sense whether a focus shift element pair 14731 is present or not. Alternatively, the sensor 14730 can detect a code (e.g. a barcode) on the focus shift element pair 14731 that corresponds to the optical power or focus distance provided by the focus shift elements 14625 so that the displayed images can be automatically digitally shifted laterally to provide a matching vergence distance. The sensor can be located in the center as shown in FIG. 147, but other locations are also possible such as to one side. The code can be on one of the optical surfaces or on the edge of the focus shift element 14625 and the sensor 14730 can be oriented in a corresponding fashion to read the code. If the focus shift elements 14625 are not connected in a focus shift element pair 14731, then two sensors 14730 can be provided with one sensor 14731 on each side. When a focus shift element 14625 is detected, the displayed image can be automatically changed in response to the change in operating mode that is implied by the detected presence of a focus shift element 14625. In addition to the lateral shift to change the vergence distance as previously discussed herein, other changes can be made to the presentation of the displayed image when a focus shift element is present including: the size, the magnification, the format (e.g. 4:3 instead of 16:9), the color, the contrast, the dynamic range or the resolution. Where these changes to the image, are done to improve the viewing experience for the user when operating at different display distances such as in augmented reality activities. Changes in magnification and format are particularly important with this mode change as the lateral shift of the image to change the vergence distance results in some clipping of the available display field of view and the optical power associated with the focus shift element 14625 changes the overall optical power of the display optics.

FIGS. 148 and 149 show how displayed images can be digitally shifted laterally within the display field of view to change the vergence distance seen by the user. FIG. 148 shows the left and right images, 14841 and 14843 respectively, as provided at the nominal vergence distance within the left and right display fields of view, 14840 and 14842 respectively. Where the nominal vergence is established by the alignment of the optics modules relative to one another in the head-worn display. The nominal vergence distance can be for example, infinity wherein the optical axes of the left and right display fields of view would be parallel to each other. In a preferred embodiment, the optical axes of the left and right display fields of view (14840 and 14842) are toed-in by approximately 0.75 degrees each, so that the nominal vergence distance is established at approximately 2.4 meters for a typical user with an interpupillary spacing between their eyes of 63.5 mm. FIG. 149 shows how the left and right images 14941 and 14943 are shifted laterally towards each other within the left and right display fields of view 14940 and 14942 respectively, to provide a shorter vergence distance. By shifting the left and right images 14941 and 14943 towards each other, the user's eyes must be pointed towards each other somewhat to view the left and right images 14941 and 14943 as a stereo pair with a shorter vergence distance. For improved comfort when viewing the stereo pair, the focus distance should be matched to the vergence distance. In shifting the left and right images 14941 and 14943 laterally, portions of the left and right display fields of view (shown as 14945 and 14946) become unusable for stereo imaging since those areas do not overlap in the user's field of view. As such, the usable size of the left and right display fields of view 40 and 14942 is reduced when the head-worn display is used with a vergence distance other than the nominal vergence distance. The advantage of doing a digital shift of the left and right images 14941 and 14943 to provide a different vergence distance is that switching from the nominal vergence distance to a different vergence distance can be done without having to change the physical setup of the optics modules in the head-worn display. To reduce the clipping of the display field of view, extra pixels can be used on the image source that are not normally used to display images when operating in a mode where lateral shifting of the image is required. For example an image source with 1310×768 pixels can normally be used to display images that have 1280×720 pixels so that additional pixels around the edge are only used when the displayed image is digitally shifted to change the vergence distance. Due to vignetting, the brightness of the portion of the displayed image that is displayed with the pixels around the edge may need to be increased.

As previously mentioned herein, changes in focus distance can also be provided by changing the relative positioning of some of the elements in the optics. FIGS. 150a and 150b show a mechanism for moving the image source 15040 relative to one or more lens elements 15012 in the upper optics 14510 to provide a change in the focus distance of the displayed image. Where typically moving the image source 15040 upward as shown in FIG. 150b moves the focus distance further away and vice versa. The mechanism shown includes an upper wedge 15042 and a lower wedge 15043 along with solenoids 15035 and 15036 that respectively act on cores 15037 and 15038. Where cores 15037 and 15038 are made of ferromagnetic materials and are attached to the lower wedge 15043. Solenoids 15035 and 15036 include cylindrical windings of conductive wiring so that when an electrical current is applied to the wiring, the respective core 15037 or 15038 is drawn into the solenoid and the attached lower wedge thereby is moved to one side or the other. the solenoids are fixed in position relative to the housing of the upper optics 14510. As the lower wedge 15043 is moved laterally, the upper wedge 15042 is moved up and down along with the image source 15040 which is attached to the upper wedge 15042. Consequently, when a current is applied to the solenoid 15035, the lower wedge 15043 is moved to the left as shown in FIG. 150b, and as a result, the upper wedge 15042 is moved upward along with the image source 15040 and the focus distance is increased. Similarly, when a current is applied to the solenoid 15036, the lower wedge 15043 is moved to the right as shown in FIG. 150a, the upper wedge 15042 is moved downward along with the image source 15040 and the focus distance is decreased. By using upper and lower wedges 15042 and 15043 with a relatively shallow wedge angle (e.g. 5 to 15 degrees), the wedges tend to stay in place when the current to the solenoid is turned 0150. Opposing permanent magnets (not shown) can be added to the wedges 15042 and 15043 to increase the friction between the wedges and thereby assist in holding the wedges in place when the current to the solenoids is turned 0150. In this way, the power required to operate the solenoids (15035 and 15036) can be very small even if a relatively large current is required to generate enough force to move the lower wedge 15043. By alternating the application of current to solenoids 15035 and 15036, the focus distance can be alternately switched between two focus distances such between a 2.4 meter focus distance and a 0.6 meter focus distance. This method of changing the focus distance can be used with any optics that use a micro display at a focus plane of optics such as waveguide based optics or beam splitter cube based optics. This arrangement may also be used with a pulsed application of current to the solenoids 15035 and 15038 to cause a stepped change in wedge position and an associated stepped change in focus distance that spans over a continuous range, multiple stepped range, etc. In addition, guidance to the movement of the image source 15040 can be provided by sliding pins that pass through the upper wedge 15042 or an associated structure (not shown), where the pins allow vertical movement and prevent lateral movement.

FIGS. 151a and 151b show illustrations of upper wedge 15042 and lower wedge 15043 from the position of the image source 15040. As shown, the wedges 15042 and 15043 comprise rectangular structures with their centers removed like a window frame so that illumination light and image light can pass through the wedges (15042 and 15043) to enable an image to be displayed. This is important when the mechanism to move the image source 15040 is positioned below the image source 15040 (along the optical path of the image light). FIG. 151a corresponds to the wedge positioning shown in FIG. 150a and FIG. 151b corresponds to the wedge positioning shown in FIG. 150b. The advantage of the layout shown in FIGS. 150a and 150b is that the wedges 15042 and F43 and other pieces in the mechanism do not increase the overall height of the upper optics 14510.

In an alternate embodiment (not shown) the mechanism for moving the image source 15040 is positioned above the image source 15040 and then the wedges (15042 and 15043) can be solid wedges or have portions of the center removed to enable wires to connect to the image source 15040. The advantage of positioning the wedges and other pieces of the mechanism above the image source 15040 is that the image source can be positioned closer to the lens elements 15012 which can be important in some optical designs.

In another embodiment, the wedges (15042 and 15043) can be transparent and can cover the entire aperture of the image source 15040. The transparent wedges (f15042 and 15043) can operate as previously described to move the image source 15040. In addition, as the wedges move laterally, the combined optical thickness of the two wedges is a function of the relative wedge position in the area that covers the active area of the image source 15040. This is due to the fact that the transparent wedges have a higher index of refraction than the air that they are replacing. Because the wedges are matched in slope, the combined optical thickness of the area where the wedges are overlapped is uniform. As such, changes in the combined optical thickness of the overlapped wedges contributes to changes in the focus distance.

To further improve the repeatability of the movement of the image source 15040 and the upper wedge 15042 when the lower wedge 15043 moves, spring clips can be used to apply a force to the image source 15040 or the upper wedge 15042 to insure contact is maintained between the surfaces. FIG. 152 shows an illustration of spring clips 15250 and 15252 applying a force to an image source 15040 where the image source 15040 is attached to the upper wedge 15042. The spring clips 15250 and 15252 are attached to the housing of the upper optics 14510 using screws 15253, ultrasonic welding, adhesive or other connecting systems. To reduce lateral movement of the image source 15040 as the lower wedge 15043 is moved, one or both of the spring clips 15250 and 15252 can be connected to the image source 15040 or the upper wedge 15042. In this way, vertical movement (as shown) is allowed for changing the focus distance by flexing the spring clips 15250 and H52, while lateral movement is not allowed due to the higher stiffness of the spring clips in the lateral direction particularly if both spring clips 15250 and 15252 are connected to the image source 15040 or upper wedge 15042.

In another embodiment, the movement of the lower wedge 15043 is controlled by an electric motor and a lead screw instead of solenoids. Where the electric motor is connected to the housing of the optics module and a lead screw or core is connected to the lower wedge 15043. The electric motor can be a conventional rotating motor, a linear motor, a vibrating piezoelectric motor, an induction motor, etc. The electric motor can also be controlled to move the lower wedge 15043 different distances to provide various focus distances. The electric motor can be a stepper motor in which the number of steps determines the distance of movement. Sensors can also be provided to detect the movement of the lower wedge, lead screw or core to improve the accuracy of the movement and associated accuracy of the focus distance change.

In yet another embodiment, the movement of the lower wedge 15043 is provided by a manually operated knob (not shown). The knob is connected to a lead screw that is threaded into the lower wedge 15043. The user turns the knob to move the lower wedge and thereby affect a change in the focus distance. This can be used for fine tuning of the sharpness of the displayed image as well for changing the focus distance to match a given vergence distance or to match the focus distance to the distance to a real object in the see-through view of the surrounding environment.

In a further embodiment, the corrective lens element 14624 can include a mechanism (not shown) to enable the corrective lens element 14624 to slide upward or swing to the side, to thereby move out of the display field of view while still being attached to the head-worn display. In this way, the corrective lens element 14624 can be readily available for use with the head-worn display. This can be useful as the corrective acts simultaneously on both the displayed image and the see-through view of the surrounding environment. There can be times when the user would want to be able to change the focus distance of the displayed image or change the focus of the see-through view of the surrounding environment depending on the activity that he is engaged in and having a readily available corrective lens element 14624 would enable that. In particular, a corrective lens may be needed by the user when operating at extreme focus distance such as arm's length or nearer, or at infinity. In embodiments, the corrective lens 14624 may be manually or automatically shifted into position.

In a yet further embodiment, eye cameras are included in the left and right optics modules to determine where the relative direction the user's eyes are looking. This information can then be used to determine the portion of the displayed image the user is looking at. The focus distance can then be adjusted to match the vergence distance associated with augmented reality objects in that portion of the displayed image. The focus distance is then automatically adjusted as the user moves his eye to different augmented reality objects or different portions of augmented reality objects within the displayed image. Alternatively the eye cameras can be used to determine the vergence of the user's eyes and thereby determine the distance that the user is looking at in the see-through view of the surrounding environment. The focus distance or vergence distance can then be adjusted in correspondence to the distance the user is looking at. Where the focus distance or vergence distance can be automatically adjusted to either match the distance the user is looking at in the see-through view of the surrounding environment or to be at a different distance so the displayed image doesn't interfere with the user's view of the surrounding environment.

FIGS. 153a, 153b and 154 shows illustrations of example display optics that include eye imaging. FIGS. 153a and 153b show display optics that include upper optics 14510 and a combiner 14520 to provide image light 15370 to an eyebox 15366 where the user's eye would be positioned when viewing a displayed image overlaid onto a see-through view of the surrounding environment. An eye camera 15364 is provided on the side of the upper optics 14510 and angled towards the combiner 14520 to capture light 15368 from the user's eye in the eyebox 15366 as reflected by the combiner 14520. One or more LEDs 15362 are provided adjacent to the upper optics 14510 and pointed to provide illuminating light 15367 to the eyebox 15366 and the user's eye either directly or as reflected from an optical surface such as the combiner 14520, when the head-worn display is being used by a user. Where the LED's 15362 can provide infrared light 15367, provided the eye camera 15364 is sensitive to infrared light.

FIG. 154 shows an illustration of display optics viewed from above, that include projection optics 15410, a waveguide 15415 and holographic optical elements 15417 and 15413. The projection optics 15410 can include one or more optical elements 15412 to modify the image light 15470 as required to couple the image light 15470 into the holographic optical element 15413 and into the waveguide 15415. The optical elements 15412 can change the wavelengths of the image light 15470, change the format of the image light 15470, change the size of the image light 154 70 or predistort the image light 154 70 as needed to enable the image light 154 70 to be presented to the user's eye 15466 in the desired format with reduced distortion. The optical elements 15412 can include: refractive lenses, diffractive lenses, toroidal lenses, freeform lenses, gratings or filters. Where the holographic optical element 15413 deflects image light 15470 that has been provided by the projection optics 15410 into the waveguide 15415 where it is transported to the holographic optical element 15417. The holographic optical element 15417 then deflects the image light 15470 toward the user's eye 15466 where the displayed image is viewed as an image overlaid onto a see-through view of the surrounding environment. An eye camera 15464 is provided for capturing images of the user's eye, as reflected by a surface of the waveguide, when the head-worn display is being used by a user. One or more LEDs 15462 are provided adjacent to the waveguide 15415 to illuminate the user's eye 15466 either directly or reflected from a surface of the waveguide and thereby increase the brightness of the captured images of the user's eye 15466. Where the LED's 15362 can provide infrared light, provided the eye camera 15364 is sensitive to infrared light.

To improve the efficiency of the eye imaging systems shown in FIGS. 153a, 153b and 154, coatings can be applied to the surface that reflects light from the eye toward the eye camera. The coating can be a hot mirror coating that reflects infrared light and transmits visible light. In this way, the eye camera can capture bright images of the user's eye while simultaneously providing the user with a bright see-through view of the surrounding environment.

The eye camera (15364 or 15464) can include autofocus to automatically adjust a focus setting of the eye camera when the user's eye is in a different positions such as when the head-worn display is positioned differently on the user's head or when a different user is using the head-worn display. Where the autofocus adjusts the relative position of lens elements or adjusts the optical power associated with adjustable lens elements in the optics associated with the eye camera to provide a higher contrast in the images of the user's eye. In addition, the autofocus can automatically adjust focus when corrective lenses 14624 are present and thereby compensate for the corrective lenses 14624. In this case, metadata saved with the images of the user's eye records the relative focus setting of the eye camera (15364 or 15464) and changes in the metadata can be used to determine whether a corrective lens 14624 is present or not. If a corrective lens 14624 is present, adjustments to the focus distance of the display optics can be made that take into account the presence of the corrective lens 14624.

Images of the user's eyes can be used to determine the viewing direction the user is looking by determining the relative position of the user's pupil within the eyebox or within the field of view of the eye camera 15364. From this information the relative direction that the left and right eyes are looking can be determined. This relative direction information can be used to identify which portion of the displayed image the user is looking at. By comparing the relative direction of the user's left and right eyes within simultaneously captured images, the difference in relative direction between the left and right eyes and the interpupillary distance between the user's eyes can be used to determine the vergence viewing distance that the user is looking at. The vergence viewing distance can be used to determine the focus distance and vergence distance needed in the displayed image to provide the user with a sharply focused augmented reality object in the displayed image. The determined vergence viewing distance can also be compared to the vergence distance associated with the portion of the displayed image that the user is looking at, to determine whether the user is looking at the displayed image or the see-through view of the surrounding environment. Adjustments can be made to the focus distance and vergence distance for different portions of the displayed image to present the user a sharply focused image in the portion of the image that the user is looking at or present the user with a blurry image in the portion of the image that the user is looking at as needed for the mode of operation or use case. Where digital blurring of portions of the image can be used to make portions of the image appear to have a focus distance that is closer or farther away than the portions of the image that left with sharp imagery. In addition, the vergence viewing distance can be compared with the disparity associated with the portion of a stereo image that the user is looking at. The disparity of the stereo image can then be adjusted locally at the portion of the image the user is looking at or scaled over the entire stereo image to present the user with adjusted stereo depth over the entire image.

The head-worn display can include an inertial measurement unit to determine the location, movement and gaze direction of the head-worn display. Where the inertial measurement unit can include: a location determining system such as GPS, an electronic compass to determine gaze direction in the compass directions, accelerometers and gyroscopes to determine movements and a tilt sensor to determine a vertical gaze direction. Comparing the viewing direction determined from the images of the user's eyes to the gaze direction determined by the inertial measurement unit can allow a compass heading to be determined for the direction the user is looking. Combining the determined location with the compass heading of the direction the user is looking can allow objects in the surrounding environment to be identified that the user is looking at. This identification can be further improved by comparing the vergence viewing distance and the compass heading for the direction the user is looking with objects in the surrounding environment known to be that distance and direction from the user. This type of determination can be important for augmented reality and the display of augmented reality objects relative to real objects.

To enable the focus distance to be adjusted as the user moves his eyes around the field of view, the focus viewing distance must be determined rapidly and a fast focus adjustment system is required. Vergence and disparity within the stereo images must be adjusted in correspondence to the determined changes in focus viewing distance. A response time of 0.033 sec or less is typically required for imaging modifications within head-worn display systems to prevent the user's viewing experience from being adversely affected by latency such as the user experiencing nausea (see the paper "Tolerance of Temporal Delay in Virtual Environments" R. Allison, L. Harris, M. Jenkin, U, Jasiobedzka, J. Zacher, I149E Virtual Reality 2001, March 2001, p 247-254, ISBN 0-7695-0948-7). When a person's gaze changes from a far object to a near object, the human eye can change vergence viewing distance quickly while the focus adjusts more slowly. To enable this, a fast frame rate (e.g. 60 frames/sec or greater) is needed for capture of images of the user's eyes and the images need to have high contrast to enable fast image analysis to determine the relative positions of the user's eyes. The user's viewing direction and the focus viewing distance can then be determined to further determine where and what the user is looking at. A fast focus distance adjustment system is then needed to adjust the focus distance in 0.5 sec or less as the user moves his eyes.

FIGS. 153a, 153b, 154 show display optics that include a focus distance adjustment module 15360 in the upper optics 14510 and projection optics 15410 respectively. Where the focus distance adjustment modules 15360 can provide fast mechanisms for moving the position of the image source relative to the remaining lens elements thereby changing the focus distance of the displayed image. It is important to realize that focus adjustment modules can be used in any type of display optics for head-worn displays (e.g. wedge waveguides, waveguides with multiple reflective strips, holographic projection systems, (with the exception of laser scanning projection systems because they are not focused) because the movement of the image source relative to the other display optics to adjust the focus distance is fundamental to display optics and as such the focus adjustment modules are broadly useable in head-worn displays.

FIGS. 155a, 155b, 156a, 156b, 157a, 157b, 158a, 158b, 159a and 159b show illustrations of focus adjustment modules 15360 with mechanisms that can provide fast focus distance adjustment. To be effective for fast focus distance adjustment in a head-worn display, the focus adjustment modules 15360 need to be fast, quiet, provide approximately 0.5 mm travel, compact, provide guidance to maintain alignment between the image source 15040 and the remaining optics without tilt, controllable over the focus distance range, low cost and low weight.

In a preferred embodiment, to provide a change in focus distance without changing the size of the displayed image, display optics are provided that are telecentric at the image source. Where telecentric display optics provide parallel light ray bundles so that the area of the image source that is imaged by the display optics remains constant regardless of changes in the distance between the image source and the remaining optics as required to change the focus distance for the displayed image. In certain embodiments the image source is reflective and the illumination light provided by the illumination source may be telecentric as well. Where, telecentric illumination light can be provided by an illumination source that is at least the same size as the image source and provides a wider cone of light where only the telecentric portion of the cone is reflected by the image source. Thus, telecentric display optics at the image source provide an improved viewing experience for augmented reality, particularly when rapid changes to focus distance are being provided as the user moves their eyes around the field of view. Under this use case scenario, using non-telecentric display optics at the image source would result in displayed augmented reality objects that changed slightly in size each time the user moved their eyes and nausea would likely result. In contrast, by using telecentric display optics, focus distance can be comfortably changed continuously as the user moves their eyes around the field of view. FIG. 161 provides an illustration of an example of non-telecentric display optics where the rays bundles of the image light 16150 are converging as the image light 16150 proceeds from the image source 15040 toward the display optics including the powered prism 16140. As a result, if the image source 15040 is moved closer to the powered prism 16140, the lens 16145 and combiner 16150 in the display optics, the image appears to get smaller when viewed by the user from the position of the eyebox 16155 and vice versa. In contrast, FIG. 162 shows an illustration of example telecentric optics including for example powered prism 16240 and lens 16245 wherein the ray bundles of the image light 16250 are parallel to each other. Consequently as the image source 15040 is moved closer or farther from the powered prism 16140, the image remains the same size in the displayed image as viewed by the user from the eyebox 16155.

FIGS. 155*a*, 155*b*, 156*a*, 156*b*, 157*a*, 157*b*, 158*a* and 158*b* show actuators and guidance mechanisms positioned between the image source and the remaining optics. Each of the figured 155, 156, 157, and 158 illustrate different mechanisms in two states. In contrast, FIGS. 159*a* and 159*b* show actuators and guide mechanisms positioned between the image source 15040 and the top of the housing for the focus adjustment module 15360. Any of the actuators and guidance mechanisms shown can be used in either position with some modifications (not shown). The choice of where to position the actuators and guidance mechanisms depends on where space is available in the display optics and the housing for the head-worn display. If the space for the actuators and guidance mechanisms is limited in the display optics, the actuators and guidance mechanisms are positioned above the image source as shown in FIGS. 159*a* and 159*b*. However, by positioning the actuators and guidance mechanisms above the image source, the height of the display optics can be substantially increased. Therefore in a preferred embodiment, multiply folded (also known as compound folded) display optics are included so the actuators and guidance mechanisms can be positioned adjacent to the image source, and as a result, the height of the display optics is reduced. FIG. 160 shows an illustration of an example of multiply folded optics as viewed from the eye position, wherein the optical axis is folded to the side in the upper optics 16010 to reduce the height of the upper optics 16010. The image source 15040 is then positioned to the side of the upper optics 16010 and the image source 15040 is approximately vertical instead of horizontal. Where in the example folded optics shown in FIG. 160 are included, one or more lenses 16012, a fold mirror 16013 that redirects image light 15370 from the upper optics 16010 toward a combiner 14520, that redirects the image light toward the eyebox 15366 and the user eye. In the folded optics shown in FIG. 160, the fold mirror 16013 is a reflective polarizer so that a backlight 16014 can be positioned behind the fold mirror 16013 to provide P polarized illumination light 16071 that illuminates a reflective image source in the focus adjustment module 15360 such as an LCOS. In reflecting the illumination light 16071, the image source 15040 changes the polarization state from P to S, thereby providing S polarized image light 15370, which is reflected by the fold mirror 16013. By using multiply folded optics, the focus adjustment module 15360 including actuators and guidance mechanisms can be positioned to one side of the upper optics 16010 where more space can be available in the frame of the head-worn display. Alternatively, the fold mirror can be included in a prism as shown in FIGS. 161 and 162, that can also include surfaces with optical power to further reduce the size of the display optics. As a result, multiply folded display optics provide the advantage of enabling a more compact head-worn display when the display optics include focus adjustment modules 15360.

Figure 155A:
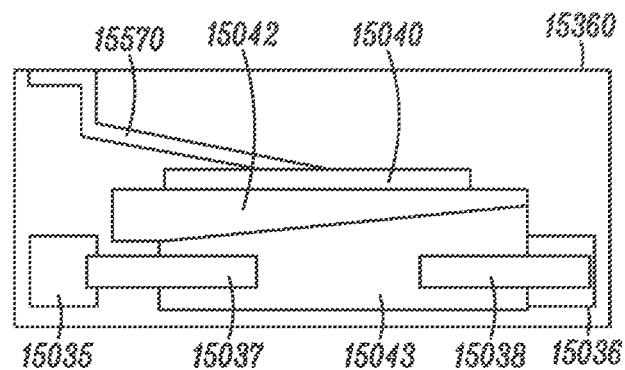
Figure 155B:
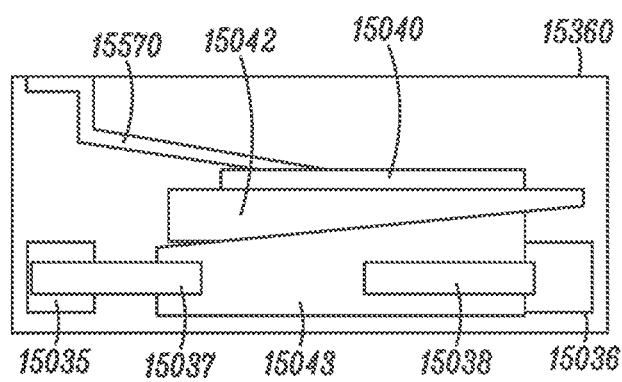

FIGS. 155*a* and 155*b* show an illustration of a focus adjustment module that includes a set of wedges 15042 and 15043 as actuators, wherein the lower wedge 15043 moves laterally to move the image source 15040 vertically (as shown) to change the position of the image source 15040 relative to the remaining optics comprising lens elements 15012 or lens elements 15412. Solenoids 15035 and 15036 are provided to act on ferromagnetic cores 15037 and 15038 respectively, where the cores 15037 and 15038 are attached to the lower wedge 15043. Because the wedges 15042 and 15043 are positioned between the image source 15040 and the remaining optics of display optics, the wedges 15042 and 15043 are made with a center window as shown in FIGS. 151*a* and 151*b* so that light can pass from the remaining optics to the image source 15040. Applying an electrical current to solenoid 15035 will attract core 15037 and cause the lower wedge 15043 to move to the left, thereby causing the upper wedge 15042 and the attached image source 15040 to move downward which decreases the focus distance as shown in FIG. 155*a*. Similarly, applying an electrical current to solenoid 15036 will attract core 15038 and cause the lower wedge 15043 to move to the right, thereby causing the upper wedge 15042 and the attached image source 15040 to move upwards which increases the focus distance as shown in FIG. 155*b*. A leaf spring 15570 has been provided to apply a force against the upper wedge 15042 or image source 15040 so that the wedges are help in alignment during the movement of the wedges. The leaf spring can also be attached to the housing of the focus adjustment module 15360 and to the image source 15040 or the upper wedge 15042 to prevent lateral movement of the image source during movement of the wedges, thereby providing guidance to the image source during focus adjustments.

Figure 156A:
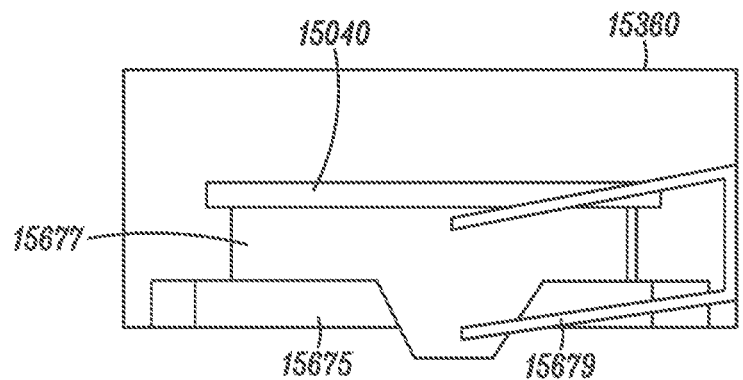
Figure 156B:
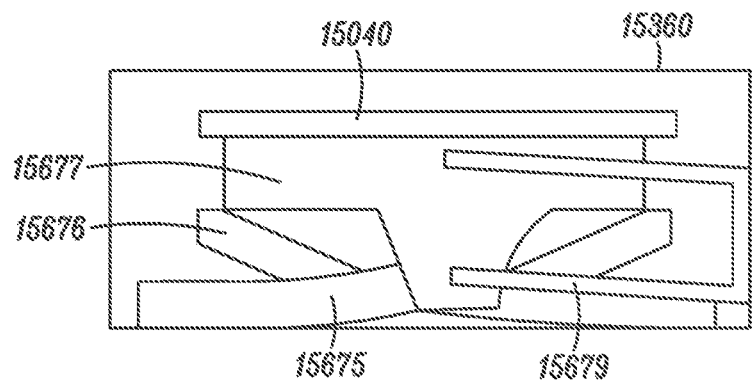

FIGS. 156a and 156b show illustrations of a focus adjustment module 15360 that includes a pair of bimorph piezoelectric actuators 15675 and M76 to move the image source 15040 for focus adjustments. Where a bimorph piezoelectric actuator is comprised of two laminated strips of piezoelectric material arranged so that when a voltage is applied to the two strips, one side of the bimorph contracts while the other side of the bimorph expands, thereby causing the actuator to go from flat to curved. Bimorph piezoelectric actuators are advantageous for use in a focus adjustment module 15360 because they are fast acting, compact and they can provide much more displacement than piezoelectric stack actuators. With the bimorph piezoelectric actuators 15675 and 15676 shown in FIGS. 156a and 156b, one end is attached to the housing of the focus adjustment module 15360 and the other end pushes on a carrier 15677 that is attached to the image source 15040. FIG. 156a shows a flat state for the bimorph piezoelectric actuators 15675 and 15676, while FIG. 156b shows a curved state for the bimorph piezoelectric actuators 15675 and 15676. Where the carrier 15677 supports the image source 15040 around the edge and the center portion of the carrier is removed to form a window so that light including illumination light and image light, can pass from the image source 15040 to the remaining optics as previously described herein for wedges 15042 and 15043. When a voltage is applied to the two bimorph piezoelectric actuators 15675 and 15676, both of the actuators 15675 and 15676 curl upwards thereby causing the carrier 15677 and attached image source 15040 to move upwards as shown in FIG. 156b and the focus distance then increases. If more voltage is applied the bimorph piezoelectric actuators 15675 and 15676 will curl more. When the voltage is removed, the bimorph piezoelectric actuators 15675 and 15676 to return to a flat state, as shown in FIG. 156a and the focus distance decreases. The actuators are shown arranged to lift opposite corners of the carrier to provide a vertical lifting force. If a faster response is desired in the movement from the curved state shown in FIG. 156b to the flat state shown in FIG. 156a, the voltage applied to the bimorph piezoelectric actuators can be reversed in sign for a short period of time. However, if the reversed voltage is applied for a long enough time for the actuators 15675 and 15676 to reach steady state, the actuators will curve in the reverse direction which will cause the carrier 15677 and the attached image source 15040 to be lifted somewhat. In addition, as shown in FIGS. 156a and 156b, a four bar linkage 15679 has been provided. Wherein the four bar linkage 15679 is attached to the sidewall of the housing of the focus adjustment module 15360 and to four points on the carrier 15677. The function of the four bar linkage 15679 is to provide guidance of the carrier 15677 and attached image source 15040 so that the image source 15040 doesn't move laterally or tilt relative to the remaining optics so that alignment is maintained during movements associated with focus adjustments. The four bar linkage 15679 shown in FIGS. 156a and 156b is a thin metal or plastic structure with flexible fingers that extend from the sidewall attachment to the attachment points on the carrier 15679. The flexibility of the fingers allows for unimpeded vertical movement while preventing lateral movement. The carrier 15677 is designed to provide attachment points that are spaced apart vertically as shown thereby enabling the fingers of the four bar linkage 15679 to prevent tilt of the carrier and attached image source during vertical movement. The four bar linkage 15679 can be further designed to be a leaf spring so that a slight downward force is applied to the carrier 15677 to ensure that the carrier 15677 remains in contact with the bimorph piezoelectric actuators 15675 and 15676 during focus adjustments. The advantage of this arrangement of the bimorph piezoelectric actuators is that a large displacement can be provided for a larger focus adjustment. In embodiments, the linkage 15679 may have a stop at an upper position to more accurately stop the translation of the carrier 15677 in an upper position. In embodiments, a stop may be otherwise positioned to create an upper boundary for the carrier. In further embodiments, the voltage applied to the bimorph piezoelectric actuators can be reversed to cause the bimorph piezoelectric actuators to bend in the opposite direction (not shown) and thereby extend the useable displacement range for focus adjustment.

Figure 157A:
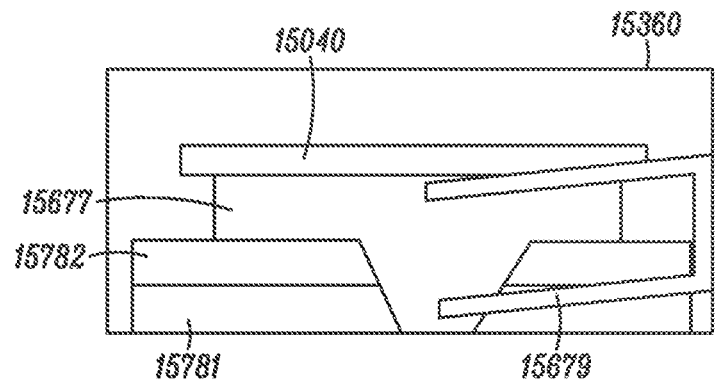
Figure 157B:
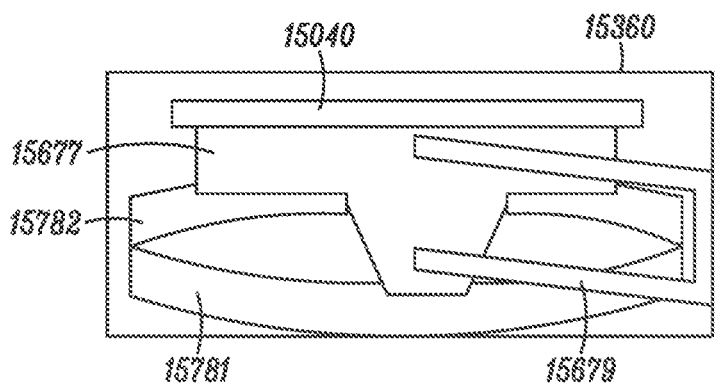

FIGS. 157a and 157b show illustrations of another version of a focus adjustment module 15360 that includes bimorph piezoelectric actuators 15781 and 15782. In this case, the lower bimorph piezoelectric actuator 15781 is attached in the middle to the lower surface of the housing of the focus adjustment module 15360 and the upper bimorph piezoelectric actuator 15782 is attached in the middle to the lower surface of the carrier 15677. The ends of the upper bimorph piezoelectric actuator 15782 and the lower bimorph piezoelectric actuator 15781 are attached together. FIG. 157a shows the flat state wherein no voltage is applied to the bimorph piezoelectric actuators 15781 and 15782. When a voltage is applied to the bimorph piezoelectric actuators 15781 and 15782, they both change to a curved state, which causes the carrier 15677 and the image source to move vertically thereby increasing the focus distance. As more voltage is applied, the curve of the actuators 15781 and 15782 becomes more pronounced and the movement of the carrier 15677 and the change in focus distance is increased. The advantage this arrangement of the bimorph piezoelectric actuators 15781 and 15782 is that a larger lifting force and faster movement can be provided, but the displacement is less. Consequently, the bimorph piezoelectric actuators 15781 and 15782 are arranged back-to-back so they curl in opposite directions when a voltage is applied thereby doubling the displacement of the carrier for a given voltage. The use of more than two bimorph piezoelectric actuators (e.g. four bimorph piezoelectric actuators) in a stack is possible. As previously described herein, a four bar linkage is provide to guide the movement of the carrier 15677 and attached image source 15040 to prevent lateral movement or tilt during focus adjustments.

Figure 158A:
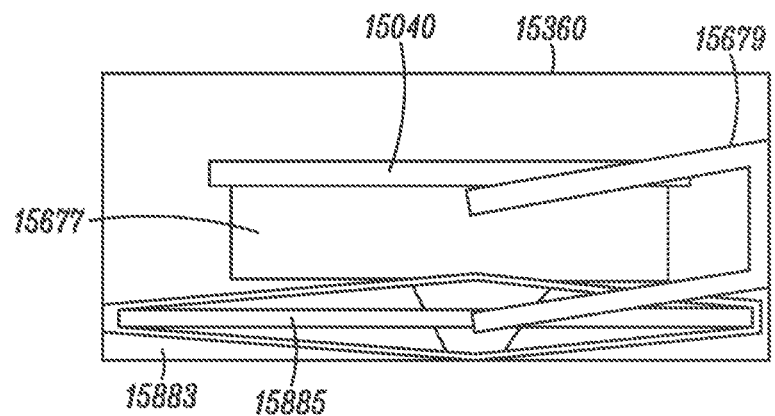
Figure 158B:
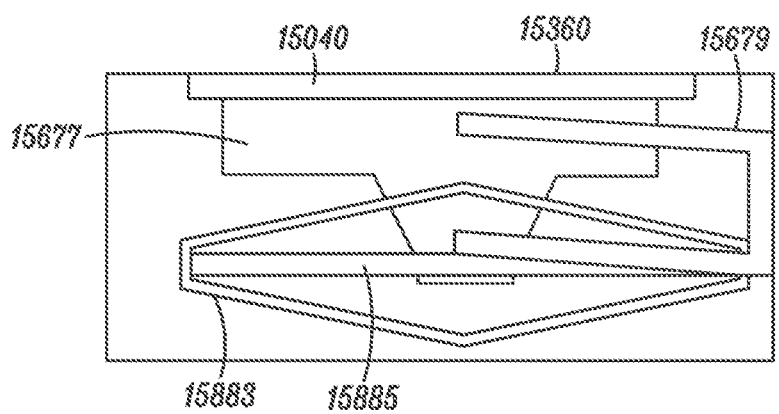
Figure 159A:
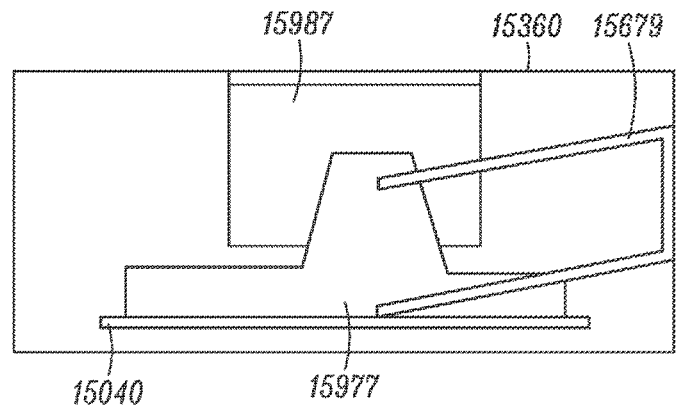
Figure 159B:
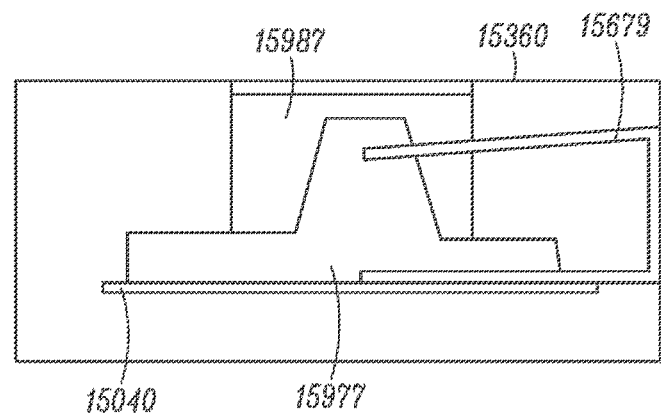

FIGS. 158a and 158b show illustrations of a focus adjustment module 15360 that includes one or more scissors jack actuator actuators 15883. Where the scissors jack actuator includes a frame that flexes so that the upper point moves further upward as a center shaft 15885 shortens. In this way, the frame of the scissors jack actuator 15883 acts as a displacement amplifier so that the movement of the carrier 15677 is greater than the change in length of the center shaft 15885. FIG. 158a shows the state when the center shaft 15885 is long, thereby causing the upper point to be lower and the carrier 15677 that sits on the scissors jack actuator 15883 to be lower and as a result the focus distance is nearer to the user. FIG. 158b shows the state when the center shaft 15885 is short, thereby causing the upper point to be higher and the carrier 15677 that sits on the scissors jack actuator 15883 to also be higher and as a result the focus distance is farther from the user. The center shaft 15885 can be a variety of devices that effectively change the distance between the ends of the scissors jack actuator 15883 for example, the center shaft 15885 can be a piezoelectric stack actuator that is actuated with an applied voltage or a screw that is actuated manually by turning by hand or actuated electrically by an electric motor. In any case, the scissors jack actuator 15883 pushes on the carrier 15677 to lift the image source 15040 thereby increasing the focus distance. As previously described herein, a four bar linkage 15679 can be provided to guide the carrier during focus adjustments to preserve the alignment of the image source 15040 relative to the remaining optics in the upper optics 14510. Piezoelectric stack actuators can provide very fast and precise movements so that if a piezoelectric stack is used as the center shaft 15885, very fast and precise focus adjustments can be provided by a focus adjustment module 15360 if it includes a piezoelectric stack actuator with a scissors jack actuator 15883.

FIGS. 159a and 159b show illustrations of focus adjustment modules 15360 with voice coil motor actuators 15987. As previously described herein, in this case the image source 15040 is shown positioned below the actuator and the guidance mechanisms. A carrier 15977 is attached to the image source 15040 to support the image source 15040 and provide attachment points for the four bar linkage 15679. Where the four bar linkage 15679 provides guidance to the carrier 15977 and attached image source 15040 during movement associated with focus adjustments. The outer portion of the voice coil motor 15987 is attached to the upper surface (as shown) of the housing of the focus adjustment module 15360 and the inner portion is attached to the carrier 15977. FIG. 159a shows the relative positions of the components when no voltage is applied to the voice coil motor 15987. As shown, in FIG. 159a, the inner portion of the voice coil motor 15987 is extended so that the carrier is in a lower position thereby providing a decreased focus distance. FIG. 159b shows the relative positions of the components when a voltage is applied to the voice coil motor 15987. Under these conditions as shown in FIG. 159b, the inner portion of the voice coil motor 15987 is retracted so that the carrier is in a raised position thereby providing an increased focus distance. As more voltage is applied to the voice coil motor 15987, the inner portion of the voice coil motor 15987 is retracted further thereby providing a greater change in focus distance. A spring (not shown) can be included in the focus adjustment module 15360 to apply a force to the carrier to decrease the time for the carrier to move back to the position shown in FIG. 159a when the voltage is removed from the voice coil motor 15987. The spring can also assist in holding the carrier 15977 in the position shown in FIG. 159a to provide a default focus setting when no power is applied to the voice coil motor 15987 to thereby provide a low power operating mode.

A position measurement device (not shown) can be added to any of the focus adjustment modules 15360 shown in FIGS. 155a, 155b, 156a, 156b, 157a, 157b, 158a, 158b, 159a and 159b to measure the relative position of the image source. The position measurement device can then provide a measurement that can be used in a control system for focus distance that can be a closed loop control system to improve the accuracy and repeatability of focus distance adjustments.

In a yet further embodiment, the position of the image sources 15040 in the left and right optics modules can be adjusted in alignment step to provide a reliable convergence distance. Where the alignment step includes positioning the chassis C27 in a jig that is aligned with a target located in front of the jig and at the desired convergence distance. A matched image is then displayed on the image source 15040 and the image source 15040 is moved to align the displayed to the target as viewed through the optics module. The advantage of adjusting the position of the image source 15040 in an alignment step is that the effects of variations in the dimensions of the chassis 14727, upper optics 14510 and combiner 14520 can be compensated for to provide a reliable convergence distance in a manufacturing environment.

In another embodiment, one or more of the following elements can be connected to provide a removable assembly, including: the focus shift element, the combiner and the corrective lens element. This can provide a more easily replaceable assembly which can be changed when damage occurs, when the use case changes or the user changes. In particular, it is useful to change the focus shift element and the corrective lens element at the same time when changing from a use case where the vergence viewing distance changes from a longer distance to a shorter distance and vice versa. As in this use case, one or the other of the vergence viewing distances may be beyond what the user's eyes can comfortable focus at. For example, if the user is near sighted then a corrective is needed when the vergence viewing distance is longer and not needed when the vergence viewing distance is shorter.

The inventors have discovered that when world-locked digital content shifts out of the field of view of a user's head-worn see-through computer display it can create a less than optimal experience. When the user's turns his head away from the point in the world where the digital content is locked, for instance, the digital content shifts towards the side of the field of view. As the user turns his head even further, the content shifts out of the field of view and abruptly cuts off at the edge of the field of view. The abruptness of the change in appearance and the ultimate complete loss of the content once the head turns far enough does not create a natural impression of the content being fixed in the real world. Normally, when viewing an actual object in our environment, the object stays visually present, even if slightly present, until we shift our vision completely away from the object. An object that is shifted to the side of our direct line of sight vision may be slightly blurry do to the nature of our vision (i.e. foviated vision), but it remains present to some extent. In a typical see-through head-worn display the field of view has a limited area (e.g. width and height). Typically, one can see through to the environment outside of the field of view so it seems odd when the content begins and ultimately disappears from the user's vision when the user can still see into the environment where the content was once present and locked.

An aspect of the present disclosure relates to generating a smooth transition of world-locked augmented reality content that is shifting out of a see-through field of view. In embodiments, the world-locked content is modified to appear less apparent to the user as the content shifts towards the edge of the field of view. This may take the form of de-focusing, blurring, reducing the resolution, reducing the brightness, reducing the sharpness, reducing the contrast, etc. of the content as it is shifted towards the edge. The content may decrease in appearance gradually as it approaches the edge such that as it shifts past the edge its appearance is minimal or non-existent such that it appears to have gradually disappears from the user's sight. This may work particularly well in a system that has a field of view that is large enough to accommodate sharp content in the middle of the field of view but large enough such that the user does not use the edges very much. For example, in a system with a horizontal field of view of 60 degrees, the outer 10 degrees on both sides may be used as a transitional area where world-locked content is managed to reduce its appearance in preparation for its disappearance from the field of view.

In one embodiment of a system for generating a smooth transition of world-locked augmented reality content that is shifting out of a see-through field of view, a head-worn see-through display that includes a see-through optical element mounted such that it is positioned in front of a user's eye when the head-worn see-through display is worn by the user also includes a processor that is adapted to present digital content in a field of view on the see-through optical element. The digital content may have a position within the field of view that is dependent upon a position in the surrounding environment. The processor may be further adapted to modify an appearance of the content as the content approaches an edge of the field of view such that the content appears to disappear as the content approaches the edge of the field of view. The appearance modification may be a change in the content's brightness, a change in the content's contrast, a change in the content's sharpness, or a change in the content's resolution. The processor may include a display driver or an application processor. The processor may be further adapted to generate a secondary field of view (e.g. through an additional optical system as described herein) in which the user views presented digital content and through which the user sees the surrounding environment, the processor further adapted to transition the content from the field of view to the secondary field of view. In this further adaptation, the appearance of the content in the secondary field of view may be diminished as compared to the appearance of the content in the field of view. In this further adaptation, the secondary field of view may have a lower resolution than a resolution of the field of view, and may be generated by one of reflecting image light onto a combiner that directs the image light directly to an eye of the user or towards a culminating partial mirror that reflects the image light to an eye of the user, an OLED that projects light onto a combiner, an LED array that projects light onto a combiner, or an edge lit LCD that projects light onto a combiner. In this further adaptation, the secondary field of view may be presented by a see-through panel positioned directly in front of an eye of the user, wherein the see-through panel is mounted on a combiner and/or vertically. The see-through panel may be an OLED or an edge lit LCD. The processor may be further adapted to predict when the content is going to approach the edge of the field of view and to base the appearance transition at least in part on the prediction. The prediction may be based at least in part on an eye-image.

In embodiments, the prediction that the content is going to approach and/or go past the edge of the field of view may be determined based on a compass in the head-worn computer (e.g. monitoring the compass heading as compared to the world-locked position for the content), movement of the content within the field of view (e.g. monitoring where the content is within the field of view and monitoring a direction and speed of its movement towards an edge), eye position (e.g. monitoring eye position and movement as an indication of how the head-worn computer may move. There are times when the eyes shift prior to the head turning and the eye shift may provide the indication that the content appearance should be managed), and/or a combination of these techniques.

In one embodiment of a system for prediction based transition of world-locked content, a head-worn see-through display may include a see-through optical element mounted such that it is positioned in front of a user's eye when the head-worn see-through display is worn by the user and a processor adapted to present digital content in a field of view on the see-through optical element, wherein the digital content has a position within the field of view that is dependent upon a position in the surrounding environment. The processor may be further adapted to predict when the digital content is going to shift out of the field of view due to a positional change of the head-worn see-through display and to modify the appearance of the content as the content approaches an edge of the field of view such that the content appears to disappear as the content approaches the edge of the field of view. The prediction may be based on a compass heading indicative of a forward facing direction of the head-worn see-through display or a tracked eye movement of the user, wherein the tracked eye movement is indicative that the user is going to turn the user's head. The appearance modification may be a change in the content's brightness, a change in the content's contrast, a change in the content's sharpness, or a change in the content's resolution. The processor may include a display driver or an application processor. The processor may be further adapted to generate a secondary field of view in which the user views presented digital content and through which the user sees the surrounding environment, the processor further adapted to transition the content from the field of view to the secondary field of view. In this further adaptation, the appearance of the content in the secondary field of view may be diminished as compared to the appearance of the content in the field of view. In this further adaptation, the secondary field of view may have a lower resolution than a resolution of the field of view, and may be generated by one of reflecting image light onto a combiner that directs the image light directly to an eye of the user or towards a culminating partial mirror that reflects the image light to an eye of the user, an OLED that projects light onto a combiner, an LED array that projects light onto a combiner, or an edge lit LCD that projects light onto a combiner. In this further adaptation, the secondary field of view may be presented by a see-through panel positioned directly in front of an eye of the user, wherein the see-through panel is mounted on a combiner and/or vertically. The see-through panel may be an OLED or an edge lit LCD. The processor may be further adapted to predict when the content is going to approach the edge of the field of view and to base the appearance transition at least in part on the prediction. The prediction may be based at least in part on an eye-image.

FIG. 163A illustrates an abrupt change in appearance of content 16302 in the field of view of a see-through display. FIG. 163B illustrates a managed appearance system where the content is reduced in appearance as it enters a transitional zone 16304 near the edge of the field of view.

An aspect of the present disclosure relates to a hybrid see-through display system where a high quality display system presents content to a field of view that is centered on the user's straight forward line of sight and another lower quality system is used to present content outside of the straight forward line of sight. The content appearance transition may then be managed in part in the center field of view and in the extended field of view. The extended field of view may have more than one section as well, such that imagery may be presented in a near edge portion and lighting effects are presented further out.

To illustrate, a front lit reflective display, emissive display, holographic display (e.g. as described herein) may be used to present high quality content in a 40 degree field of view and another display system may be used to present content or visually perceptive effects from the edge of the 40 degree point (or overlapping or with a gap) out to some other point (e.g. 70 degrees). In embodiments, the outer field of view coverage (generally referred to as the "outer display") may operate through an optical system in an upper module, proximate the main field of view display system, and the optical path may include folds (e.g. as generally described herein). In other embodiments, the outer display may be a direct system where, for example, the image light or effects light is generated and directed to the combiner. For example, a display may be mounted above the combiner and arranged to direct lighting effects directly to the combiner.

In embodiments, the outer display may be included within the main display. For example, the lensing system in the upper module may be adapted to generate high quality content in the middle but then lower quality toward the edges of a larger field of view. In this system, there may be only one display (e.g. LCoS, OLED, DLP, etc.) and the content towards the edge of the display may be managed to effect the appearance transition.

FIG. 164 illustrates a hybrid field of view that includes a centered field of view 16402 for the presentation of sharp and transitional content and an extended field of view 16404 that is positioned at or near or overlapping with an edge of the centered field of view 16402 and adapted to provide lower appearance content and/or lighting effects that assist in the transition of the world locked content as it shifts out of the center field of view 16402.

FIG. 165 illustrates a hybrid display system where the main, centered, field of view is generated with optics in an upper module 16502 (e.g. as described herein elsewhere) and the extended field of view is generated with a display system mounted 16504 above the combiner and providing image content and/or lighting effects in the extended area. In embodiments, the extended field of view display 16504 may include an OLED, edge lit LCD, LED, or other display and the display may include micro-lenses, macro-lens, or other optics to properly align and focus the light. In embodiments, the extended field of view may include a single lighting element, such as an LED, line or elements, array of elements, etc.

In yet other embodiments, the extended field of view area may be created by mounting a see through display on the combiner. For example, a see-through OLED display, edge lit LCD, etc. may be mounted in the extended field of view area and controlled to produce the transitional images and/or lighting effects.

In embodiments, a head-worn see-through display may be adapted to transition content to an extended FOV with reduced display resolution. The head-worn see-through display may include a see-through optical element mounted such that it is positioned in front of a user's eye when the head-worn see-through display is worn by the user and a processor adapted to present digital content in a main field of view on the see-through optical element in which a user views presented digital content and through which the user sees a surrounding environment, the processor further adapted to present digital content in an extended field of view in which the user views presented digital content and through which the user sees the surrounding environment. The main field of view may have a higher resolution than the extended field of view; and the processor further adapted to present a world-locked positioned digital content in the main field of view and transition the presentation of the world-locked positioned digital content to the extended field of view as the head-worn display changes position causing the world-locked positioned digital content to transition out of the main field of view. The processor may include display driver or an application processor. The extended field of view has a resolution that generates a substantial blur to content as compared with the content as presented in the main field of view. The extended field of view may be generated by reflecting image light onto a combiner that directs the image light directly to an eye of the user, by reflecting image light onto a combiner that directs the image light towards a culminating partial mirror that reflects the image light to an eye of the user, by an OLED that projects light onto a combiner, by an LED array that projects light onto a combiner, by an edge lit LCD that projects light onto a combiner, or by a see-through panel positioned directly in front of the eye of the user. The panel may be mounted on a combiner or vertically and may be an OLED or edge lit LCD. The processor may be further adapted to predict when the content is going to approach the edge of the field of view and to base the appearance transition at least in part on the prediction. The prediction may be at least in part based on an eye-image.

FIGS. 166A-166D illustrate examples of extended display, or extended image content optic, configurations. As illustrated, the extended display configuration may be adapted to produce extended content and/or lighting effects around each side of the center display, on multiple sides of the center display or on one side of the center display.

FIG. 167 illustrates another optical system that uses a hybrid optical system that includes a main display optical system 16502 and an extended field of view optical system 16504. In this embodiment, both optical systems project image light, extended image light, and/or lighting effects to a combiner that reflects the light to a forward culminating partial mirror, which in turn reflects the light towards the wearer's eye.

In yet further embodiments, the extended field of view display may be provided by a see-through display positioned in front of the user's eye such that the user looks directly through the see-through display. For example, a see-through OLED display or edge lit transparent LCD display may be positioned on either side of the combiner as illustrated in figures C and E or on either side of a waveguide or other display system (e.g. as illustrated in figures Ba, Sb, Be, 141a, 141b, 142a, 142b, 143, and 144).

In embodiments, a head-worn see-through display may be adapted to provide an extended FOV for large content. The head-worn see-through display may include a see-through optical element mounted such that it is positioned in front of a user's eye when the head-worn see-through display is worn by the user, and a processor adapted to present digital content in a main field of view on the see-through optical element in which a user views presented digital content and through which the user sees a surrounding environment, the processor adapted to present digital content in an extended field of view in which the user views presented digital content and through which the user sees the surrounding environment. The main field of view may have a higher resolution than the extended field of view. The processor may be further adapted to present a first portion of the digital content in the main field of view and a second portion of the digital content in the extended field of view. For example, when the digital content is too large to fit in the main field of view, the processor may create a soft transition between the first portion of the digital content in the main field of view and the second portion of the digital content in the extended field of view such that it does not appear to be abruptly cut off at the edge of the main field of view. The processor may be adapted to generate a soft appearance towards the edges of the main field of view. The processor may modify how pixels towards an edge of the display render content. The head-worn display of may further include a display driver that modifies how pixels towards an edge of the head-worn display render content. The head-worn display may have pixels towards an edge of the head-worn display that render content differently than pixels towards a center portion of the head-worn display. The pixels towards the edge may have less gain than the pixels towards the center portion of the head-worn display. The pixels towards the edges of the main field of view may be altered digitally through a content transition algorithm. The extended field of view may be generated by reflecting image light onto a combiner that directs the image light directly to an eye of the user, by reflecting image light onto a combiner that directs the image light towards a culminating partial mirror that reflects the image light to an eye of the user, by an OLED that projects light onto a combiner, by an LED array that projects light onto a combiner, by an edge lit LCD that projects light onto a combiner, or by a see-through panel positioned directly in front of the eye of the user. The panel may be mounted on a combiner or vertically. The see-through panel may be an OLED or an edge lit LCD. The processor may be further adapted to predict when the content is going to approach an edge of the field of view and to base the appearance transition at least in part on the prediction. The prediction may be at least in part based on an eye-image.

In embodiments, a head-worn see-through display may be adapted to adjust content for transition to an extended FOV. The head-worn see-through display may include a see-through optical element mounted such that it is positioned in front of a user's eye when the head-worn see-through display is worn by the user and a processor adapted to present digital content in a main field of view in which a user views presented digital content and through which the user sees a surrounding environment. The processor may be further adapted to present digital content in an extended field of view in which a user views presented digital content and through which the user sees the surrounding environment. The main field of view may have a higher resolution than the extended field of view. The processor may be further adapted to present digital content in the main field of view and reduce an appearance of the content as the content approaches an edge of the main field of view. The processor may yet be further adapted to further reduce the appearance of the content when the content is presented in the extended field of view. The processor may gradually reduce the appearance of the content in the extended field of view the closer the content gets to an edge of the extended field of view. The content may be substantially not apparent when the content is at the edge of the extended field of view. The appearance reduction may be a reduction in the content's brightness, a reduction in the content's contrast, a reduction in the content's sharpness, or a reduction in the content's resolution. The extended field of view may be generated by reflecting image light onto a combiner that directs the image light directly to an eye of the user, by reflecting image light onto a combiner that directs the image light towards a culminating partial mirror that reflects the image light to an eye of the user, by an OLED that projects light onto a combiner, by an LED array that projects light onto a combiner, by an edge lit LCD that projects light onto a combiner, or by a see-through panel positioned directly in front of the eye of the user. The panel may be mounted on a combiner or vertically. The see-through panel may be an OLED or an edge lit LCD. The processor may be further adapted to predict when the content is going to approach an edge of the field of view and to base the appearance transition at least in part on the prediction. The prediction may be at least in part based on an eye-image.

FIGS. 168A-168E illustrate various embodiments where a see-through display panel 16802 (e.g. OLED, edge lit transparent LCD display) is positioned directly in front of the user's eye in the head-worn computer to provide the extended and/or overlapping field of view in a hybrid display system. FIG. 168A illustrates a system where the extended field of view is provided by the transparent display panel 16802 mounted on or near the combiner optic. In this embodiment, the see-through display panel 16802 is mounted on or near the back of the combiner such that it does not interfere with the center display system that reflects image light off the combiner directly to the user's eye. FIG. 168B illustrates a hybrid display system where the see-through extended field of view display panel 16802 is positioned vertically proximate the combiner. FIG. 168C illustrates a hybrid display system where the see-through extended field of view display panel 16802 is mounted vertically in front of a curved partial mirror of the main field of view display.

FIGS. 168D and 168E illustrate hybrid display systems from the rear (i.e. user's view). FIG. 168D illustrates a system where the see-through extended field of view display panel 16802 surrounds the main field of view see-through display. FIG. 168E illustrates a system where the extended field of view see-through display panel 16802 is on the sides of the main field of view display system. It should be understood that the inventors envision that the extended field of view display panel may be configured in a number of different ways to provide the extension on one or more sides of the main field of view and in a balanced (i.e. similar extension on more than one side) or unbalanced (i.e. more or less extension on one or more sides) configuration. It should also be understood that the inventors envision that the extended field of view may overlap the main field of view, appear adjacent to the main field of view, have a gap between the main field of view and the extended field of view, etc., depending on the specific needs of the situation.

While the configurations described herein with respect to the extended field of view have been illustrative of creating a system where smooth transitioning of world-locked content, these configurations may further be used to create additional lighting effects and or shadowing effects for content displayed in the main field of view. For example, in a configuration where the extended field of view see-through display overlaps the main field of view, the extended field of view system may provide a backdrop for content displayed in the main field of view. The backdrop may be a lighting effect, for example, that is behind the content or near the content to provide context to the content. The backdrop may be a non-lighting effect where the pixels of the see-through display (e.g. the pixels of a see-through LCD) are changed to be opaque or less transparent to provide a dark back drop behind the content or adjacent the content (e.g. to form the appearance of a shadow). In such embodiments, the extended field of view system may overlap the main field of view and the extended field of view system may or may not extend past the edges of the main field of view.

In embodiments, a head-worn see-through display may be adapted to provide a hybrid multi-FOV display. In an aspect, an optical system of a head-worn see-through display may include a main image content optic for the production of center-eye image content, an extended image content optic for the production of off-center-eye image content, and a combiner positioned to present content to a user and through which the user views a surrounding environment, wherein each of the main image content optic and extended image content optic are positioned to project their respective image light to the combiner, which reflects the respective image light to a user's eye. The combiner may directly reflect the respective image light to the user's eye. The combiner may indirectly reflect the respective image light to the user's eye, wherein the combiner may reflect the respective image light towards a collimating partial mirror. The center-eye image content and the off-center-eye image content may pass through at least one fold in the optical system before reflecting off of the combiner. The extended image content optic may be mounted directly above the combiner such that the off-center-eye image content is directly projected to the combiner. The optical system may further include a processor adapted to coordinate a smooth disappearing transition of world-locked content as the content moves from a field of view of the main image content optic to a field of view of the extended image content optic and to an edge of the field of view of the extended image content optic. The extended image content optic may be an OLED, an LCD display, an array of LEDs, linear, two-dimensional, or curved. The extended image content optic may generate lighting effects corresponding to image content. The extended image content optic may include a lens system to modify the projection. The lens system may include an array of micro lenses.

In embodiments, a head-worn see-through display may be a hybrid display with a see-through panel. In an aspect, a head-worn see-through display may include a main image content display adapted to produce image light and project the image light in a direction to be reflected by a see-through combiner such that it reaches an eye of a user, and a secondary image content display, wherein the secondary image content display is a see-through panel positioned directly in front of the eye of the user and used to augment the visual experience delivered by the main image content display. The secondary display may provide content or effects in an area outside of a main field of view that is produced by the main image display. The area outside may be adjacent to the main field of view, surrounding the main field of view, or overlapping with the main field of view. The secondary display may provide content or effects in an area overlapping a main field of view produced by the main image display. The secondary display may be mounted on a combiner adapted to reflect image light to an eye of the user or may be mounted vertically outside of an image light optical path established by the main image display. The head-worn display may further include a processor that is adapted to track an eye position of the user, the processor further adapted to alter a position of content as presented in the secondary display. The altered position may substantially maintain an alignment of the main image display and the secondary image display from the user's perspective as the user's eye moves. The see-through panel may be an OLED or an edge lit LCD.

In embodiments, a head-worn see-through display may be adapted to blend types of content. In an aspect, a head-worn see-through display may include a field of view generated by an image display, wherein a user views digital content in the field of view and sees through the field of view to view a surrounding environment, and a processor adapted to generate two types of content, wherein the two types of content are presented in the field of view. The first type of content may be world-locked content with a field of view position that is dependent on a place in the surrounding environment, wherein an appearance of the first type of content is diminished as it approaches an edge of the field of view. The second type of content may not be world-locked, wherein the second type of content maintains a substantially constant appearance as it approaches the edge of the field of view. The diminished appearance may include a reduction in resolution, a reduction in brightness, a reduction in contrast, regulated by a display driver, regulated by an application processor, or regulated by altered pixels of a display that generates the field of view. The head-worn display may further include a secondary field of view generated by the image display in which the user views presented digital content and through which the user sees the surrounding environment, the processor further adapted to transition the content from the field of view to the secondary field of view. The appearance of the content in the secondary field of view is diminished as compared to the appearance of the content in the field of view. The secondary field of view may have a lower resolution than a resolution of the field of view. The secondary field of view may be generated by reflecting image light onto a combiner that directs the image light directly to an eye of the user, reflecting image light onto a combiner that directs the image light towards a culminating partial mirror that reflects the image light to an eye of the user, an OLED that projects light onto a combiner, an LED array that projects light onto a combiner, an edge lit LCD that projects light onto a combiner, or a see-through panel positioned directly in front of the eye of the user. The panel is mounted on a combiner or vertically. The see-through panel is an OLED or an edge lit LCD. The processor may be further adapted to predict when the content is going to approach the edge of the field of view and to base the appearance transition at least in part on the prediction. The prediction may be at least in part based on an eye-image.

In embodiments, a head-worn see-through display may be adapted to adjust an FOV alignment. The head-worn see-through display may include a hybrid optical system adapted to produce a main see-through field of view for the presentation of content with high resolution and a secondary see-through field of view for the presentation of content with lower resolution, wherein the main and secondary fields of view are presented proximate one another, a processor adapted to adjust the relative proximity of the main and the secondary fields of view, and an eye position detection system adapted to detect a position of an eye of a user, wherein the processor adjusts the relative proximity of the main and secondary fields of view based on the position of the eye of the user. The secondary field of view may be produced on a see-through OLED panel positioned directly in front of the eye of the user, on a see-through edge lit LCD panel positioned directly in front of the eye of the user, or on a see-through combiner positioned directly in front of the eye of the user. The relative proximity may be a horizontal proximity or a vertical proximity. The relative proximity may define a measure of overlap between the main and secondary fields of view or a measure of separation between the main and secondary fields of view. The eye position detection system may image the eye from a perspective substantially in front of the eye, as a reflection off a see-through optic in a region including the main field of view, or as a reflection off a see-through optic in a region including the secondary field of view.

When using head mounted displays (HMDs) (e.g. as part of an HWC 102) for purposes such as augmented reality imaging, it is desirable to provide a wide field of view (e.g. 60 degrees). However, in viewing a wide field of view with a head mounted display it should be recognized that viewing an image with a head mounted display is different than viewing an image on a rigidly mounted screen in the environment (e.g. a television mounted on the wall or a movie theater screen). With a head mounted display, as the user moves their head, the head mounted display and its associated display field of view moves as well in relation to the surrounding environment. This makes it difficult for the user of an HMD to view the edge or corner of an image that is displayed with a wide field of view because head movements do not assist the user, eye movements alone must be used to view the corner of the image. To improve the viewing experience when using an HMD to view images displayed with a wide field of view, the relationship between eye movement and head movement that a person uses when viewing the surrounding environment should be substantially replicated. For example, a viewer would normally turn his head, at least somewhat, when viewing an image with a wide field of view on a rigidly mounted screen such as in a movie theater when looking towards an edge of the movie screen, as opposed to only moving his eyes towards the edge. The inventors have discovered that certain accommodations have to be made to provide comfortable and intuitive viewing of the areas towards the outer edges of a wide field of view in an HMD system. In embodiments, the content being displayed in the wide field of view may not necessarily be world-locked (i.e. where the position of the content in the field of view is dependent on an object's position in the environment such that the content appears to the user as positionally connected to the environment) but may still include a process that shifts a position of the presented content based on a position or motion of the user's eye or head.

Because a head mounted display is worn on the head of the user, compactness is important to provide a comfortable viewing experience. Compact optical system typically include short focal length optics with low f # to reduce the physical size. Optics with these characteristics generally require a wide cone angle of light from the image source. Where wide cone angles are associated with image sources that emit image light from their front surfaces as, for example, in small displays or microdisplays such as: OLED, backlit LCD, etc. These displays can emit unpolarized or polarized image light. The optical system receives the image light from the image source and then manipulates the image light to form a converging cone of image light that forms an image at the eye of the user with an associated wide field of view. To enable the user to simultaneously interact with the displayed image and the surrounding environment, it is advantageous to provide an undistorted and bright see-thru view of the surrounding environment along with a bright and sharp displayed image. However, providing an undistorted and bright see-thru view and a bright and sharp displayed image can be competing requirements, especially when a wide field of view image is being provided.

For the purpose of viewing augmented reality imagery, it can be desirable to provide a wide field of view of 50 degrees or greater. However, the design of compact optics with a wide field of view that is suitable for use in a compact head mounted display can be challenging. This is further complicated by the fact that the human eye is only capable of high resolution in a very narrow portion of the field of view known as the fovea and a much lower resolution at the periphery of the field of view. To observe the whole area of a high resolution image, a person must move their eyes over a wider field of view.

The inventors have discovered that optical systems are needed that provide high transparency to the surrounding environment to provide an undistorted and bright view of the surrounding environment while also displaying bright and sharp images over a wide display field of view. To provide a comfortable viewing experience, the optical system should take into account how the user moves their eyes and their head to view the environment. This is particularly important when the user is viewing augmented reality imagery.

Systems and methods in accordance with the principles of the present disclosure provide an HMD which displays images with wide fields of view overlaid onto a see-through view of the surrounding environment, with an improved see-through view and a high contrast displayed image. An optical system is provided that includes upper optics comprised of an emissive image source (e.g. OLED, backlit LCD, etc.), one or more lenses and a stray light trap, and non-polarized lower optics comprised of a planar angled beam splitter and a curved partial mirror. The emissive image source provides image light comprised of one or more narrow spectral bands of image light. Wherein, one or more of the reflective surfaces on the beam splitter and the curved partial mirror is treated to reflect a majority of incident light within the narrow spectral bands and transmit a majority of incident light within the visible band thereby providing a bright displayed image and a bright see-through view of the surrounding environment (e.g. using a tri-stimulus mirror on the beam splitter).

A stray light trap is also provided to enable higher contrast images to be displayed in concert with a high transmission view of the surrounding environment. Where the stray light can come from various sources including: see-through light from the surrounding environment; image light that has been reflected back into the optics by the curved partial mirror; or light from below that has passed through the beam splitter. By trapping this stray light, the contrast of the displayed image as seen by the user is greatly improved.

A display operating mode is also provided for improved viewing of wide field of view images wherein the displayed image is laterally shifted within the display field of view in correspondence to movements of the user's head. Wherein the lateral shifting of the displayed image is triggered by detecting an eye movement followed by a head movement in the same direction. The displayed image is then laterally shifted in correspondence to and in an opposite direction to ensuing head movements. The purpose of this mode is to enable the user to view peripheral portions of the image without having to move their eyes to the full extent of the wide displayed field of view. Thereby the user views the wide field of view of the displayed image through a combination of eye movement and head movement to obtain a more comfortable viewing experience.

Systems and methods in accordance with the principles of the present disclosure provide a head worn display with a high transmission see-through view of the surrounding environment and a high contrast displayed image that is overlaid onto the see-through view of the surrounding environment. In this way, the systems and methods provide a head worn display that is well suited for use with augmented reality imagery because the user is provided with a bright and sharp displayed image while still being able to easily view the surrounding environment. The systems and methods also provide a wide field of view with a sharpness that corresponds to the acuity distribution of the human eye when typical eye movement and head movement is taken into consideration. Where the wide field of view head mounted display can provide a displayed field of view for example at least +/−25 degrees (50 degree included angle). In addition, compact optics are provided with reduced thickness to improve a compact form factor of the head worn display. Operating modes are provided that take into account the viewing conditions of the head worn display where the display is attached to the user's head.

FIG. 169 shows a cross sectional illustration of an example optics assembly 16900 for a head worn display. The optics assembly 16900 include upper optics 16903 comprised of an emissive image source 16910, one or more lenses 16920 and a light trap 16930, and lower optics 16907 comprised of an angled beam splitter 16950 and a curved partial mirror 16960. The emissive image source 16910 provides image light 16940, with image content, that is optically manipulated by the lenses 16920 and the curved partial mirror 16960 to form a wide field view that is presented to a user's eye in the eyebox 16970. Where the eyebox is defined as the region wherein the user's eye can see the displayed image. The optics are folded to make the optics assembly 16900 more compact, so that the optics have a first optical axis 16946 that extends perpendicularly from the emissive image source 16910. The angled beam splitter 16950 redirects a portion of the image light 16940 by reflection so that the image light 16940 passes out along a second optical axis 16943. The curved partial mirror 16960 reflects a portion of the image light 16940 so that it passes back along the second optical axis 16943 and towards the eyebox 16970. Simultaneously, scene light 16973 from the surrounding environment is transmitted by the curved partial mirror 16960 and the angled beam splitter 16950 to provide a see-through view of the surrounding environment to the eyebox 16970. As such the curved partial mirror 16960 acts as a combiner wherein the user sees the displayed image provided by the image light 16940 overlaid onto the see-through view of the surrounding environment provided by the scene light 16973.

The emissive image source 16910 can be any type of luminous display that doesn't require supplemental light to be applied (e.g. a transmissive front light as described herein elsewhere) within the upper optics 16903 including: an OLED, a backlit LCD, a micro-sized LED array, a laser diode array, edgelit LCD or a plasma display. Typically an emissive display provides image light with narrow wavelength bands of light within the visible range. For example, for a full color display the bands can include a red, green and blue band with full width halfmax (FWHM) wavelengths of 615-635, 510-540 and 450-470 nm respectively. In addition, the emissive image source 16910 provides a wide cone of image light (e.g. 100 or more degrees). There are a number of advantages associated with using an emissive image source 16910 that has a wide cone angle in that, the optical system can be designed with a shorter focal length and a faster f #(e.g. 2.5 or faster) which enables the optics to be much more compact. In addition, by eliminating the need for an illumination system to apply light to the front surface of the image source such as is typically required for a reflective image source like an LCOS or a DLP, the overall size of the upper optics can be reduced substantially.

In embodiments, to provide a high transmission (e.g. greater than 50% transmission of scene light to the eye) see-through view of the surrounding environment, the lower optics are a non-polarized design, wherein the optical surfaces allow some portion of unpolarized visible light to be transmitted. This is to avoid the greater than 50% losses of light that occur when an absorptive polarizer or reflective polarizer is used in transmission along the optical path of scene light 16973. Instead, the reflective surfaces on the angled beam splitter 16950 and the curved partial mirror 16960 are treated to be partially reflective. Where the partially reflective treatment can be a base partial mirror that has a relatively uniform level of reflectivity across the entire visible range, or the partially reflective treatment can be a notch mirror that provides higher levels of reflectivity in one or more narrow wavelength bands within the visible range that have been selected to match the output bands of the emissive image source and higher levels of transmission in the wavelengths between the narrow wavelength bands (e.g. as described herein elsewhere). The partially reflective treatment can be a coating such as a multilayer coating, a phase matched nanostructure or a film such as a multilayer film or a coated film that has partial mirror properties or notch mirror properties.

By using non-polarized lower optics 16907 in the portion of the optics where a see-through view of the surrounding environment is provided, there is an added benefit in that chromatic aberrations are avoided when viewing a polarized image source in the environment such as a liquid crystal television or computer monitor or natural sources like clouds and reflections that could be very distracting to the user. These chromatic aberrations typically take the form of rainbow patterns with bright colors that can be very distracting to the head worn experience. The chromatic aberrations are caused by interference between the polarized light of the polarized image source and any polarizers or circular polarizers that are present in the see-through portion of the optics. As a result, the systems and methods described provide non-polarized optics in the see-through portion of the optics to enable the user to view polarized image sources such as liquid crystal computer monitors without being exposed to rainbow patterns while wearing a head worn display.

With a high transmission see-through view of the surrounding environment, a high level of scene light 16973 passes through the lower optics on the way to the eyebox 16970. This opens up the possibility for a loss of contrast in the displayed image due to stray light from a portion of the scene light 16973 being reflected by the angled beam splitter 16950 back to the emissive image source 16910, and also from a portion of the image light 16940 being reflected by the angled beam splitter 16950 back toward the emissive image source 16910. The combined stray light from the portions of the scene light 16973 and the image light 16940 being reflected back to the emissive image source 16910 is then scattered off of the sidewalls in the upper optics 16903 and reflected by the surface of the emissive image source 16910 so that it joins the image light 16940 that is presented to the eyebox 16970 for viewing by the user. Since this stray light does not have image content, the net effect is that the contrast in the displayed image is reduced. To reduce the stray light from these two sources, a light trap 16930 is provided.

FIG. 170 shows an illustration of the light trap 16930 operating to reduce stray light. The light trap 16930 is comprised of a sandwich structure including quarter wave films 17032 and 17034 on either side of a linear polarizer film 17033. The sandwich structure can be loosely connected or laminated together with adhesive layers. The light trap 16930 functions by allowing unpolarized image light 17025 from the emissive image source 16910 to pass through quarterwave film 17032, which doesn't affect the image light 17025 because it is unpolarized. The image light 17025 then passes through the polarizer 17033, which causes the image light to become linearly polarized. The linearly polarized image light then passes through quarterwave film 17034, which causes the image light to become circularly polarized image light 17026. A portion of the circularly polarized image light 17026 is reflected toward the curved partial mirror 16960 by the angled beam splitter 16950, while another portion of the circularly polarized image light is transmitted by the angled beam splitter 16950 to become faceglow. The curved partial mirror 16960 reflects a portion of the circularly polarized image light 17026 back toward the angled beam splitter 16950 while transmitting apportion that becomes eyeglow. From the circularly polarized image light 17026 that passes back toward the angled beam splitter 16950, a portion is transmitted to the eyebox 16970 and a further portion is reflected by the angled beam splitter 16950 so that it passes toward the emissive image source 16910. However when the returning circularly polarized image light 17026 passes through the quarterwave film 17034, it is transformed into linearly polarized light with the opposite polarization orientation compared to the image light 17025 so that the polarizer 17033 absorbs the returning light. As such the portion of the image light that is reflected back toward the emissive image source 16910 can be essentially eliminated by the light trap 16930 considering that typical absorptive polarizers absorb approximately 99.99% of light with the opposite polarization state.

Scene light 17045 is unpolarized and is transmitted by the curved beam splitter 16960. When the unpolarized scene light 17045 encounters the angled beam splitter 16950, a portion is transmitted toward the eyebox 16970 to provide a see-through view of the environment and a portion is reflected toward the emissive image source 16910. The unpolarized scene light 17045 passes through the quarterwave film 17034 unchanged. As the scene light passes through the polarizer 17033 it becomes polarized light. The scene light then becomes circularly polarized scene light 17046 as it passes through quarterwave film 17032. The circularly polarized scene light 17046 is reflected by the surface of the emissive image source 16910. This returning circularly polarized scene light 17046 is transformed into polarized scene light with an opposite polarization state when it passes back through quarterwave film 17032, which is then absorbed by the polarizer 17033.

The net effect of the light trap 16930 is that stray light from returning image light and scene light is essentially eliminated and as a result, the contrast in the displayed image is greatly increased. This is particularly important when using the head worn display in a bright environment where the incoming scene light 17045 can be substantial. By using a light trap 16930 with a sandwich structure comprised of quarterwave films 17032 and 17034 on either side of a linear polarizer film 17033, stray light from unpolarized light 17025 and 17045 coming in opposing directions can be effectively trapped. The effect on the portion of the image light 17025 that is reflected by the angled beam splitter 16950, is reflected by the curved partial mirror 16960 and is transmitted by the angled beam splitter 16950 so that it becomes the displayed image that is viewed by the user, is that this image light 16940 is circularly polarized light. In addition, since the image light 17025 passes through a polarizer film 17033, there is a reduction in brightness of approximately 50%. However the increase in contrast is much higher, so that the perceived image quality of the displayed image is greatly improved especially in a bright environment. The inventors have performed measurements of the effectiveness of such a light trap positioned above an OLED display surrounded by a black textured plastic frame. Wherein the quarter wave film was selected to have a retardation level that provides excellent extinction of the stray light after it passes through the quarterwave film twice without imparting a color bias to the remaining stray light. The result was that light reflected from the OLED display surface was reduced by 117× and light reflected from the black textured plastic was reduced by 6×.

The light trap 16930 can also be simplified to be a circular polarizer by eliminating one of the quarter wave films. In this case, the light trap 16930 works on only one of the unpolarized stray light sources. If quarterwave film 17032 is eliminated, the light trap 16930 traps only stray light from the image light 17025 and the scene light 17046 reflected back toward the image source 16910 is then polarized. Alternately, if quarterwave film 17034 is eliminated, the light trap 16930 traps only stray light from the scene light 17045 and the image light 17026 is then polarized.

In an alternative embodiment, the light trap 16930 can be positioned on the surface of the image source 16910. The light trap can be a polarizer 17033 sandwiched between quarter wave films 17032 and 17034 to trap stray light from both scene light 17045 and image light 17025 that is reflected back toward the image source 16910. By positioning the light trap 16930 directly on the surface of the image source 16910, stray light from scene light 17045 is trapped very efficiently because birefringence in the lenses 16920 don't affect the polarization state of the circularly polarized scene light 17046. As such, the light trap 16930 can be a circular polarizer that is positioned on the image source 16910 with the quarter wave film of the circular polarizer against the surface of the image source 16910 to trap just the stray light associated with the scene light 17045 as previously described herein. The light trap 16930 can be sized to cover the surface of the image source 16910 in addition to covering adjacent reflective portions of the image source package or the adjacent housing to trap stray light associated with reflected light from these surfaces.

To trap stray light from image light 17025 that is reflected back toward the image source 16910, a second circular polarizer (e.g. comprised of polarizer 17033 and quarter wave film 17034) can be positioned between the lenses 16920 and the lower optics, wherein the quarter wave film 17034 of the second circular polarizer is positioned to face the lower optics. The polarization axis of the first circular polarizer should be aligned with the polarization axis of the second circular polarizer to transmit the most image light 17025. This second circular polarizer provides an efficient light trap for stray light from image light 17025 that is reflected by the partial mirror 16960 and the angled beam splitter 16950 back toward the image source 16910. However, if a first and second circular polarizer are included, birefringence in the lenses 16920 in the upper optics will affect the brightness uniformity and contrast uniformity of the image seen by the user. This is because the image light 17025 will be polarized by the first circular polarizer, the image light will then pass through the lenses 16920 where any birefringence present will cause portions of the image light to become elliptically polarized. The elliptically polarized image light will then pass through the second circular polarizer where the elliptically polarized portions of the image light will be filtered in correspondence to the degree of elliptical polarization present. If the lenses 16920 have low birefringence (e.g. <50 nm retardation), using two circular polarizers will provide an image with barely noticeable degradation of brightness uniformity and contrast uniformity, however if the birefringence is high then the brightness uniformity and contrast uniformity will be noticeably degraded.

Table 1, below, shows a comparative analysis of a variety of non-polarized partially reflective treatments for the angled beam splitter 16950 and the curved partial mirror 16960 where all the numbers are presented in terms of % of the image light 17025 emitted by the image source 16910. This analysis shows the effects of using notch mirror treatments compared to base partial mirror (i.e. a partial mirror that reflects all visible wavelengths substantially equally) treatments on the angled beam splitter 16950 and the curved partial mirror 16960 along with the effects of the light trap 16930. Phase matched nano-structures that reflect narrow wavelength bands of light can be provided as an embossed film or as a molded in structure on an optical surface, to provide a notch mirror treatment, but they are not shown in 515-535 nm for green, 615-635 nm for red) and transmit the remaining visible light at 95%. Case 2 includes triple notch mirror treatments to the angled beam splitter 16950 and the curved partial mirror 16960 along with a light trap 16930. Case 3 includes a base partial mirror treatment on the curved partial mirror 16960 and a triple notch mirror treatment on the angled beam splitter 16950 along with a light trap 16930. Case 4 includes a base partial mirror treatment on the angled beam splitter 16950 and a triple notch mirror treatment on the curved partial mirror 16960 along with a light trap 16930. Case 5 includes base partial mirror treatments on both the angled beam splitter 16950 and the curved partial mirror 16960 along with a light trap 16930.

| Case Number | 1 | 2 | 3 | 3 | 5 |
|---|---|---|---|---|---|
| Coating on beam splitter | Tristim notch mirror | Tristim notch mirror | Tristim notch mirror | Simple partial mirror | Simple Partial mirror |
| Coating on curved partial mirror | Tristim notch mirror | Tristim notch mirror | Simple partial mirror | Tristim notch mirror | Simple partial mirror |
| Quarterwave/polarizer sandwich trap for light reflected back to display | No | Yes | Yes | Yes | 20 |
| Beam splitter reflectivity image light (%) | 50 | 50 | 60 | 30 | 75 |
| Beam splitter transmission overall (%) | 83 | 83 | 80.6 | 65 | 27 |
| Curved partial mirror image light reflectivity (%) | 80 | 80 | 33 | 75 | 67 |
| Curved partial mirror overall transmission (%) | 75.8 | 75.8 | 62 | 77 | 15 |
| Reflectivity of display panel (%) | 15 | 15 | 15 | 15 | 15 |
| Image light to the eye | 20.0 | 8.4 | 3.3 | 6.1 | 1.8 |
| See-thru light to the eye | 62.9 | 62.9 | 50.0 | 50.1 | 50.3 |
| Eyeglow | 10.0 | 4.2 | 16.9 | 3.2 | 5.6 |
| Faceglow | 50.0 | 21.0 | 16.8 | 27.3 | 31.5 |
| Light from below reflected toward eye | 12.0 | 12.0 | 14.4 | 30.0 | 20.0 |
| Image light back to panel | 20.0 | 0.00084 | 0.000499 | 0.000284 | 0.00005 |
| See-thru light with image light wavelengths back to panel | 10.0 | 4.2 | 15.6 | 3.2 | 5.6 |
| See-thru light with image light wavelengths to eye | 20.1 | 20.1 | 31.0 | 25.2 | 50.3 |
| Ratio image light to eye/image light back to panel | 7 | 10000 | 667 | 21667 | 37500 |
| Ratio image light to eye/See-thru light with image light wavelengths back to panel and reflected back into system | 13 | 13333 | 14194 | 130000 | 20896 |

Table 1. In this analysis, the reflectivities of the angled beam splitter 16950 and the curved partial mirror 16960 have been chosen to deliver at least 50% "See-through light to the eye" (this is scene light 16973 that reaches the eyebox 16970) with at least 20% "See-through light at the wavelengths of the image light", which takes into account the narrow band of reflectivity provided by any notch mirror treatments on the reflective surfaces. Case 1 includes triple notch mirror treatments (also known as a tristimulus notch mirror for reflecting narrow bands of red, green and blue light) to the angled beam splitter 16950 and the curved partial mirror 16960 and it does not include a light trap 16930. In this analysis, the notch mirror was assumed to reflect at a selected reflectivity % within a 20 nm wide band for each color (for example the triple notch mirror can provide high reflectivity in the following bands: 450-470 nm for blue, The effects of the light trap 16930 on image contrast can be seen in the two rows at the bottom of Table 1 that relate to image contrast as shown by ratios of the "Image light to the eye", which represents the displayed image brightness, divided by the "light back to the image source" where the light back to the image source comes from either the image light being reflected back to the image source or from scene light being reflected back to the image source. In both sets of numbers, the ratio is dramatically higher (1000× or more) in Cases 2-5 where there is a light trap 16930 compared to Case 1 where there is not a light trap. The light loss produced by having a light trap can also be seen in the numbers for the "Image light to the eye" wherein Case 1 shows approximately 2× higher numbers indicating a brighter displayed image.

The effects of the notch mirror treatments on the numbers for the "Image light to the eye" (image light 16940) and "See-through light to the eye" (scene light 16973) can be seen by comparing Cases 2-4 which have various combinations of tristimulus notch mirror treatments to Case 5 which has base partial mirror treatments on the angled beam splitter 16950 and the curved partial mirror 16960. The tristimulus notch mirror treatment on one or both reflective surfaces increases the portion of image light 16940 that is delivered to the eyebox 16970 while also increasing the portion of scene light 16973 that is provided to the eye. Using base partial mirror treatments on both the angled beam splitter 16950 and the curved partial mirror 16960 reduces the efficiency of the optics to deliver image light to the user's eye by a factor of approximately 2× to 4.5×. It should be noted that if either the angled beam splitter 16950 or the curved partial mirror 16960 included a polarizer (absorptive or reflective), only about 42% of the scene light would be transmitted to the user's eye based on typical transmission % of unpolarized light by polarizers. And if one of the surfaces is a polarizer and the other is a 50% partial mirror, only about 21% of the scene light would be transmitted to the user's eye.

Other light losses are also shown by the numbers in Table 1. "Eyeglow" is the portion of image light 16940 that is transmitted by the curved partial mirror 16960. "Faceglow" is the portion of image light that is transmitted downward by the angled beam splitter 16950. The determination of which Case is better in terms of eyeglow and faceglow for a given head worn display will depend on whether there are other controls present to mitigate eyeglow or faceglow. If there are eyeglow controls present, then Case 3 may be the best choice because the faceglow is lower. If there are faceglow controls present than Case 4 may be the best choice because it has lower eyeglow.

In general, Case 2 with tristimulus notch mirror treatments on both the angled beam splitter 16950 and the curved partial mirror 16960 has a good combination of characteristics for providing a bright and high contrast image to the user's eye along with a high see-through transmission. This is because Case 2 has relatively good numbers for efficiency for delivering image light to the eye, high transmission see-through, low eyeglow, low faceglow, acceptable see-through at the wavelengths of the image light and excellent contrast.

Tristimulus notch mirror treatments can be obtained that reflect S polarized light more than P polarized light. However, given the narrow bands of reflection provided by the tristimulus notch mirror treatment, the transmitted portion of the light can be substantially non-polarized and as such still provide transmission of scene light that is over 50% and provide a view of polarized light sources that do not contain chromatic aberrations such rainbows. Under this scenario, Case 4 can be more efficient for delivering image light to the eye and providing high see-through transmission.

In many uses cases, such as for example augmented reality imaging, it is desirable to use a head mounted display that provides a wide field of view, e.g. greater than 40 degrees. However it can be difficult to design any type of optics that provide uniformly high MTF for a uniformly sharp image over the entire wide field of view. As a result, the optics can be very complicated and the physical size of the optics can become unsuitably large for use in a head mounted display. To avoid this problem, it is important to understand the acuity of the human eye in the peripheral portions of the field of view and to understand the angular range of eye movement typically used before a person moves their head.

FIG. 172 shows a chart of the acuity of a typical human eye relative to the angular position in the field of view (S. Anderson, K Mullen, R Hess; "Human peripheral spatial resolution for achromatic and chromatic stimuli: limits imposed by optical and retinal factors", Journal of Physiology (1991), 442, pp 47-64). The fovea at the center of the human eye provides very high acuity over an angular range of approximately 2 degrees. The acuity then drops off rapidly as the angular position in the field of view (also known as eccentricity) increases. In addition, the chromatic acuity is substantially lower than the achromatic acuity. As shown in FIG. 172, the achromatic acuity goes from approximately 50 cycles/degree at the fovea to 5 cycles/degree at 15 degrees and the chromatic acuity goes from approximately 30 cycles/degree at the fovea to 3 cycles/degree at 15 degrees. FIG. 173 shows a chart of the typical acuity of the human eye vs the eccentricity in a simplified form that highlights the dropoff in acuity with eccentricity along with the difference between achromatic acuity and chromatic acuity.

However, the acuity of the eye that is experienced by the user has to take into account the rapid movements of the eye within the field of view. These rapid movements of the eye effectively expand the high acuity portion of the field of view seen by the user. In an augmented reality application, movement of the head by the user must also be taken into account. When the user perceives an object near the edge of the eye's field of view, the user first moves their eyes toward the object and then moves their head. These combined movements enable the user to view a wider field of view while also making it more comfortable to view an object at the edge of the field of view by reducing the angular movement of the eyes. Human's tend to only move their eyes a limited amount before they move their head. FIGS. 174A and 174B show typical examples of eye movements and head movements given in charts showing angular movements in radians vs time for a variety of situations (A Doshi, M Trivedi; "Head and eye gaze dynamics in visual attention and Context Learning", 2009 IEEE, 978-1-4244-3993-5/09, pp 77-84). As seen in the data given in the lower panel of FIG. 174A, the user's head tends to move quickly after an eye movement to recenter the eye within the field of view so that the head and the eye have the same angle. FIG. 174B shows the converse situation in which the head moves first followed by an eye movement. Angular disparities between the eye and the head tend to be limited to less than approximately 0.25 radians (which is equal to approximately 15 degrees) except for very brief excursions. This is different from a head movement that occurs when a person reacts to a sound wherein the eyes and the head move together with minimal disparity, as in the top panel of FIG. 174A. If the user wants to look at an object that is more than approximately 15 degrees from the direction the head is pointed, the user will first move their eyes and then move their head, as seen in the lower panel of FIG. 174A, to reduce the angular disparity between the eyes and the head to less than 15 degrees to look at the object. This relationship between the movement of the eyes and the movement of the head is important to take into account when designing and operating a head worn display with a wide display field of view. Based on the acuity of the human eye and the movement of the eye relative to the movement of the head, sharp images with high resolution and high contrast are needed within the central +/−15 degree to +/−20 degree portion of the display field of view to provide the user with an image that is perceived as sharp and high contrast. This is the central region of the display field of view wherein the user will move their eyes to look at the image with the fovea. Outside of this region of the display field of view, the displayed image does not have to be as sharp because the user will not typically look directly at that region of the display field of view. Instead for example, to view an augmented reality object that is located 30 degrees from the center of the displayed field of view, the user will move their eyes approximately 15 degrees toward the object and then turn their head the remaining 15 degrees toward the object. If the augmented reality object is world locked (i.e. where the object is displayed in a constant position relative to real objects in the surrounding environment), as the user moves their head, the augmented reality object will move toward the center of the displayed field of view and as such it will move into the central sharp region of the display field of view.

FIG. 175 is a chart that shows the effective relative achromatic acuity, compared to the acuity of the fovea, provided by a typical human eye within the eye's field of view when the movement of the eye is included. Within the +/−15 degree portion of the field of view that is viewed with the fovea by moving the eyes, the relative acuity is equal to that provided by the fovea. Beyond the portion of the field of view that is viewed with the fovea, the acuity decreases at the rate associated with eccentricity in the eye as shown in FIG. 173. This acuity chart corresponds to the sharpness distribution that needs to be provided by a head worn display with a wide field of view. As long as the displayed image is provided with a relative sharpness that is above the acuity distribution shown in FIG. 175, the human eye will perceive the displayed image to be uniformly sharp. This is because when an image is presented with a field of view that is wider than the portion of the field of view that can be comfortably viewed by the fovea, the acuity of the eye is substantially decreased. For example, based on the acuity chart in FIG. 175, an image can be presented with a central sharp zone that is +/−15 degree to a +/−20 degree in size and as long as the image sharpness decreases to no less than 20% of the sharpness of the sharp zone by approximately +/−25 degrees, the image will be perceived by the user as being uniformly sharp. FIG. 176 is a chart that shows the minimum design MTF vs angular field position needed to provide a uniformly sharp looking image in a wide field of view displayed image. In this figure the design MTF is given as a spatial modulation at 20% MTF relative to Nyquist, where Nyquist MTF is 100% and reduced MTF is less. The chart shows a uniform design MTF of 100% Nyquist across the central sharp zone (+/−15 degrees) and a rapidly decreasing design MTF in the peripheral zone (greater than 15 degrees). By providing a reduced design MTF in the outer portions of the angular field, the optics can be greatly simplified, thereby reducing cost and reducing the overall size of the optics.

FIG. 177 is a chart that shows the relative MTF needed to be provided by the display optics for a wide field of view display to provide a sharpness that matches the acuity of the human eye in the peripheral zone of the display field of view, wherein the resolvable sharpness for optics is determined to be the spatial frequency at which the MTF is 20%. In the figure, simple two point MTF curves (100% MTF and 20% MTF) are shown for a variety of angular field positions in the display field of view: 0 to 15 degrees (this is the top right curve), 20 degrees, 25 degrees, 30 degrees, 35 degrees, 40 degrees, 45 degrees and 50 degrees (this curve is the bottom left curve). These curves show the minimum MTF (from FIG. 176) that needs to be provided across the display field of view to match the acuity of the human eye. As can be seen, this result shows that the MTF for wide field of view optics can drop off substantially in the outer portions of the display field of view. For example, the MTF of the wide field of view optics can be above 20% at the Nyquist frequency of the image source in the central sharp zone while the MTF can be much lower in the peripheral zone, such as 2% or 20% at ½ the Nyquist frequency. It should also be noted that since the chromatic acuity of the human eye is lower than the achromatic acuity, substantial lateral color (e.g. 5 pixels or more at 25 degrees) can be present in the peripheral regions of the wide field of view displayed image and the lateral color will not be noticeable. Thus, lateral color in the peripheral regions of the displayed wide field of view image contribute more to reducing the perceived sharpness of the image but the low acuity of the eye in the peripheral regions makes the loss in sharpness imperceptible. Similarly, the low acuity of the human eye in the peripheral regions makes distortion less perceptible in the peripheral regions. The combination of the loss of acuity and reduction in chromatic acuity that makes distortion less noticeable all add together to a reduce need for image quality in the peripheral regions of the display field of view.

As an example, FIG. 171 shows an illustration of a simple optical system that provides a 60 degree display field of view (i.e. +/−30 degrees from center). This includes an emissive image source 16910, a single lens element 16920, an angled beam splitter 16950 and a curved partial mirror 16960 as previously described herein. The optical system provides a displayed image to eyebox 16970 with a displayed field of view of approximately 60 degrees included angle. Simultaneously, the user is provided with a see-through view of the surrounding environment through the angled beam splitter 16950 and the curved beam splitter 16960, wherein the see-through field of view can be larger than the display field of view by enabling a view of the surrounding environment through areas adjacent to or extensions of the angled beam splitter 16950 and the curved partial mirror 16960. FIG. 178 shows a modeled MTF curve associated with the optical system of FIG. 171 wherein MTF curves for a variety of different angular positions within the display field of view are shown. The MTF curve for the 15, 6 degree position (expressed in horizontal, vertical degrees within the field of view) in the display field of view is indicated with an arrow in FIG. 178, where it can be seen that the 15 degree MTF curve ends at 20% MTF at the Nyquist point for the image source which in this case corresponds to the right hand end of the spatial frequency axis or 75 cycles/mm. The MTF curves below the indicated 15.6 degree MTF curve are 30 degree MTF curves. For the 30 degree points in the display field to have the same perceived sharpness as the 15 degree point in the display field, according to FIG. 176 the 30 degree MTF curve needs to be have at least 20% MTF at 7.5 cycles/mm (10% of Nyquist). It can be seen that all of the 30 degree MTF curves shown in FIG. 178 are easily above 20% MTF at 7.5 cycles/mm point, so as such the image will be perceived as sharp in the peripheral regions by the human eye, when limited movements of the human eye are considered. Thus, even though the MTF curves shown in FIG. 178 corresponding to the peripheral angular positions in the display field of view do not meet the Nyquist performance conditions for this display of 20% MTF at 75 cycles/mm, the peripheral points in the field of view will still be perceived by the user as providing the same level of sharpness as that provided by the central angular points in the field of view.

FIG. 179 is an illustration of a resolution chart wherein the sharpness of the image has been reduced by blurring the peripheral portion of the image to simulate an image from optics that provide a central sharp zone of +/−15 degrees with a peripheral zone that is less sharp. Looking directly at different portions of the image, it is can be seen that the outer portions 179100 are much less sharp than the central zone 17920. However, if the image is viewed at a distance where the central zone 17920 between the vertical bars occupies approximately +/−15 degrees in the viewer's field of view, the image will appear to be uniformly sharp to the outer edge as long as the viewer keeps their gaze inside the inner edge of the vertical bars.

As a result, the systems and methods described herein in accordance with the principles of the present disclosure can be used to design any type of optics for head mounted displays with a wide field of view including optics with a beam splitter, optics with a waveguide or projected optics with a holographic optical element, wherein a central sharp zone is provided that delivers a level of MTF that corresponds to the acuity of the fovea and a peripheral zone adjacent to the central sharp zone that provides a reduced level of sharpness in correspondence to the acuity of the human eye when limited movement of the eye is considered. In embodiments, the central sharp zone comprises a +/−15 degrees about the optical axis (30 degree included angle) and the peripheral zone extends beyond the central sharp zone to the edge of the field of view of the displayed image. The MTF in the central sharp zone should be above 20% at the Nyquist level of the display to provide a sharp image. The MTF in the peripheral zone can reduce with increasing angle at a rate that is less than the decrease in acuity of the human eye as the eccentricity increases. For example, if the peripheral zone extends from +/−15 degrees to +/−30 degrees (60 degree included angle), the MTF can be as low as 10% of the Nyquist spatial modulation at 20% MTF. By limiting the angular zone where high MTF is required and reducing the design MTF in the peripheral zone, the optics can include fewer elements and simpler elements with lower cost materials, thereby reducing the overall cost of the optics, in addition, the optics can be made more compact to enable the wide field of view optics to better fit into the head mounted display. This effect is shown by the compact optics shown in FIG. 171 which as previously stated herein provide a 60 degree field of view while including a single plastic field lens, a beam splitter and a curved partial mirror. Wherein the treatments for the beam splitter and the curved partial mirror have been discussed previously herein to provide high see-through with a non-polarized lower to eliminate rainbows when looking at a polarized light source. And in addition, a light trap can be added to the compact optics to increase contrast as also discussed previously herein.

The systems and methods described herein in accordance with the principles of the present disclosure can be used for making compact optics for a head mounted display with a wide display field of view that has improved contrast and has a high transparency for the see-through view of the surrounding environment. By using an emissive display, the need for a frontlight is eliminated thereby reducing the space between the emissive image source and the lower optics. By limiting the high MTF zone to a central sharp zone surrounded by a lower MTF peripheral zone, the number of lens elements required to display a wide field of view is reduced, thereby also reducing the size of the optics. As shown in FIG. 171, a 60 degree field of view is possible with only one or two lens elements in the upper. As a result, the height of the optics can be reduced.

In embodiments, the emissive image source 16910 and the angular size of the display field of view are selected so that a single pixel in the emissive image source 16910 subtends an angle in the displayed image that is smaller than the achromatic acuity of the fovea of the human eye, so that black and white portions of displayed images don't have a pixelated look when viewed by the user. This provides the user with an image that has smooth lines and curves without the jagged look produced when individual black and white pixels can be resolved. For example, based on the data shown in FIGS. 172 and 173, the human eye has an achromatic acuity of approximately 50 cycles/degrees, for adjacent black and white pixels to not be separately resolvable in the sharp zone of a displayed image that includes 1920×1080 pixels (1080p), the displayed field of view should be less than 38×22 degrees or 43 degrees diagonal.

In embodiments, the emissive image source 16910 and the angular size of the display field of view are selected so that a single pixel in the emissive image source 16910 subtends an angle in the displayed image that is smaller than the chromatic acuity of the human eye, so that colored portions of displayed images don't have a pixelated look when viewed by the user. This provides the user with an image that has smooth lines and curves on colored areas without the jagged look produced when individual colored pixels can be resolved. For example, based on the data shown in FIGS. 172 and 173, the human eye has a chromatic acuity of approximately 30 cycles/degrees, for adjacent colored pixels to not be separately resolvable in the sharp zone of a displayed image that includes 1920×1080 pixels, the displayed field of view should be less than 64×36 degrees or 73 degrees diagonal.

In embodiments, the emissive image source 16910 and the angular size of the display field of view are selected so that the subpixels (typically each full color pixel includes adjacent red, green and blue subpixels, and the relative brightness of the subpixels together determine the perceived color of the pixel) that makeup each pixel in the emissive image source subtend an angle that is smaller than can be resolved by the human eye so that each pixel appears to be comprised of a single color and the subpixels are not visible to the user. This provides the user with an image is comprised of consistent blocks of colors without the speckled look that can be perceived when individual subpixels can be resolved. For example, based on the data shown in FIGS. 172 and 173, the human eye has an achromatic acuity of approximately 50 cycles/degrees, for the subpixels to not be resolvable in an image that includes 1920×1080 pixels, the displayed field of view is less than 115×64 degrees or 131 degrees diagonal.

In embodiments, the optics include a telecentric zone in the image light optical path wherein lens elements can be moved relative to one another to affect a change in focus distance without changing the magnification of the displayed image. Changes in focus distance can be accomplished in a variety of ways in a head mounted display by changing the spacing between optical elements. For example, focus adjustments can be accomplished by moving the image source in relation to the remainder of the optical system. However, in a display system with a wide field of view, the image light 16940 emitted by the emissive image source 16910 must be expanded in area to fill the area of the curved partial mirror 16960 which establishes the angular size of the display field of view as seen from the eyebox 16970 as shown in FIG. 171. To this end, the ray bundles between the emissive image source 16910 and the lens element 16920 are rapidly diverging (e.g. a 100 degree or more included angle). Because of the diverging ray bundles emitted by the emissive image source 16910, any change in spacing between the emissive image source 16910 and the lens element 16920 done to change the focus distance or focus quality is accompanied by a change in the visual size of the displayed image seen by the user. In a head mounted display that is presenting augmented reality imagery, particularly when focus adjustments are done automatically as the user moves or as augmented reality objects move, it is important that the visual size of the augmented reality objects be consistent with the movements to provide comfortable viewing conditions for the user. Changes in the visual size of displayed image can also cause the image to be clipped by portions of the housing that are adjacent to the optics so that the edges of the displayed image are not viewable from the eyebox or the effective size of the eyebox is reduced. As such, the ability to makes changes in the focus distance for the displayed image or portions of the displayed image without changing the visual size of the image is an important feature for a head mounted display that is used to display augmented reality imagery. The telecentric zone can be provided in a number of locations within the optics such as between lenses in the upper optics or between the upper and lower optics. FIG. 171 shows a telecentric zone 17140 between the upper and lower optics where the central rays in each ray bundle are parallel. Within this telecentric zone 17140, focus adjustments can be made by moving the lens element 16920 and emissive image source 16910 as a first unit relative to a second unit comprised of the angled beam splitter 16950 and curved partial mirror 16960 to change the focus. As an example, for the optics shown in FIG. 171, a reduction in spacing between the upper optics 16903 and lower optics 16907 of 0.5 mm can provide a change in focus distance from infinity to 1 meter (this is the same as adding 1 diopter corrective lens behind the optics). This ability to adjust focus distance can be used to fine tune the sharpness of the displayed image for the user or to change the apparent distance that the displayed image is presented to the user. Where changes in the apparent distance of the displayed image can be used for augmented reality use cases where the displayed image is presented at a distance that matches an object in the environment or at a specific distance such as at arm's length.

Manual mechanisms such as screws or cams can be positioned to change the space in the telecentric zone by moving the relevant optical elements. Where manual adjustments are useful for adjusting focus during manufacturing or to enable users to fine tune focus for their ophthalmic power prescription. Electronic actuators can be mounted to automatically adjust the spacing in the telecentric zone for augmented reality applications or for mode changes that include a change in focus distance.

In embodiments, a telecentric zone may not be provided or it may be only nearly telecentric and focal plane adjustments may be made by moving optical elements and also adjusting, digitally, the content to compensate for a magnification effect caused by the shifting elements in the non-telecentric zone.

In embodiments, a mode for viewing a wide angle displayed image (e.g. greater than 50 degrees included angle) with a head mounted display of any type is provided wherein the image is moved laterally within the display field of view in correspondence to a detected eye movement followed by a head movement by the user. This mode mimics the experience of sitting in the front row of a movie theater where to view the wide angle movie image, the viewer cannot comfortably view the whole movie screen with eye movement alone and instead must move their eyes along with their head to see the peripheral areas of the movie screen. To enable this mode, the head worn display requires apparatus for detecting eye movements that are associated with the optics assembly 16900, along with an inertial measurement unit to detect head movement. As such, the mode detects the desire of the user to view a peripheral portion of the displayed image with the portion of the eye's field of view that has higher acuity, by detecting a movement of the eye followed by a movement of the head in the same direction.

The displayed image is then moved laterally across the display field of view in a direction that is opposite to the detected movements of the eye and head, wherein the magnitude and speed of the lateral movement correspond to the magnitude and speed of the detected movements of the eye and head. This lateral movement of the displayed image within the display field of view provides the user with an improved view of the peripheral portion of the displayed image by moving the peripheral portion of the displayed image into the central sharp zone of the display field of view and moving the peripheral portion of the displayed image into a position where the user's eye is relatively centered. In addition, the lateral movement of the displayed image within the display field of view can be limited to that needed to center the edge of the displayed image within the display field of view. This mode addresses the fact that it is uncomfortable for a user to move their eyes beyond an angle of approximately 15 to 20 degrees relative to their head for more than a short period of time and since head mounted displays are attached to the user's head, eye movement is the only way to visually look at different portions of the display field of view. This makes it difficult for a user of a head worn display to comfortably view an image that has a visual size of larger than a 30 to 40 degrees included angle. The disclosed mode overcomes this limitation, by detecting when the user would like to view a peripheral portion of a displayed image and then laterally moving the displayed image within the display field of view to a position where the peripheral portion of the displayed image can be more comfortably viewed and where the peripheral portion of the displayed image is displayed with improved sharpness and higher contrast.

By triggering the lateral movement of the displayed image within the display field of view based on the detection of a combined eye movement in a direction followed by a head movement in the same direction, the mode is different from a world locked or body locked presentation of the displayed image in which lateral movement of the image occurs in correspondence to head movement regardless of eye movement. A description of body locking of virtual objects in a head worn display is provided for example in US Patent Publication 2014204759. In embodiments, the lateral movement of the displayed image is limited within the display field of view to that required to position the edge of the displayed image in the center of the display field of view or some other comfortable point within the field of view. Another example wherein lateral movement of the image would not be wanted is when the user only momentarily looks towards an edge or corner (e.g. a warning light is blinking in the corner of the image and the user simply moves their eye momentarily to verify the blinking light). In this case, the user does not move their head and as a result lateral movement of the image is not triggered and the displayed image remains stationary within the display field of view.

After an eye movement above a predetermined threshold has been detected followed by a head movement in the same direction, the displayed image is laterally moved (note that the method can also be used in a corresponding way for transverse or radial movements of the displayed image within the display field of view) across the display field of view in correspondence to and in an opposite direction to the detected angular movement of the user's head. Eye movements can be detected for example with an eye camera (e.g. as disclosed herein elsewhere) that captures images of the user's eye while viewing the displayed image or by detecting changes in electric fields associated with the eye. Angular movements of the user's head can be detected relative to the world, relative to the user's body through a motion sensor (e.g. IMU), etc. Fixing the displayed image in relation to the environment is good for viewing a wide angle image when the user is sitting or standing still. Fixing the displayed image in relation to the user's body is good for viewing a wide angle image when the user is walking, running or riding in a vehicle. Angular movements of the user's head relative to the environment can be measured by, for example, either an inertial measurement unit in the head worn display or by image tracking of objects in the environment with a camera in the head worn display. Angular movement of the user's head relative to the user's body can be measured by a downward facing camera that can for example, capture images of a portion of the user's body. The images of the portion of the user's body are then analyzed to detect relative changes that can be used to detect movements of the user's head relative to the user's body. Alternatively, two inertial measurement units can be used to detect movements of the user's head relative to the user's body, wherein one is attached to the head worn display and one is attached to the user's body and differential measurements are used to determine movements of the user's head relative to the user's body. After an eye movement above the threshold has been detected and a movement of the user head above a threshold has been detected as following the eye movement, lateral movement of the displayed image across the display field of view is begun. The speed of the lateral movement of the displayed image is in correspondence to and in an opposite direction to the ensuing detected head movement. The lateral movement of the displayed image continues until either the edge of the displayed image reaches the center of the display field of view or the eye is detected to be looking at the center of the display field of view (or within a predetermined threshold of the center of the display field of view) thereby indicating that the peripheral portion of the image that the user wanted to look at has been reached.

FIGS. 180 and 181 are illustrations that show how the image is shifted within the display field of view as the user moves their head. Note that the user's head is shown to the side of the image, because the image is actually presented to the user inside the head worn display. FIG. 180 shows an image 18055 centered within the display field of view and the user's head pointed straight ahead 18050. FIG. 181 shows the user's head pointed to the side 18150 and as a result, the image 18155 is shifted within the display field of view in a direction that is opposed to the movement of the user's head, thereby leaving a blank portion 18130 where there is now no image content to display. In FIG. 182, the blank portion of the display field of view 18230 where the image has been shifted away from is displayed as a dark region to enable the user to see-through to the surrounding environment in the blank portion. However, in different use cases it may be advantageous to display the blank portion as a neutral gray or a color.

In embodiments, the user of a wide field of view head mounted display is provided with an option to select the size (e.g. angular size) of displayed images associated with different images or applications. The displayed image is then resized to provide the selected angular image size for display to the user. For instance in a movie viewing mode, the user may choose the displayed image to be approximately 30 degrees in size which mimics the experience of sitting in the back row of a movie theater where it is comfortable for the user to view the entire displayed image with eye movements alone. Alternately, the user may choose the displayed image to be 50 degrees in size which mimics the experience of sitting in the front row of a movie theater where the displayed image needs to be viewed with a combination of eye movements and head movements with image shifting as previously described herein to comfortably view the entire displayed image. FIG. 183 shows an illustration of a wide display field of view 18360, wherein a user can choose to display a smaller field of view 18365 for a given image or application (e.g. a game) to improve the personal viewing experience. Where the smaller field of view 18365 enables the user to view the image or application without having to move their eyes as much to see the entire image.

In embodiments, the display format is selected to have a narrow vertical field of view relative to the horizontal field of view to enable the thickness of the optics to be reduced as measured across the lower optics. Due to the angled orientation of the angled beam splitter 16950 in the lower optics, the vertical field of view in the displayed image is directly proportional to the thickness of the optics assembly. For a given display field of view as measured along the diagonal of the display field of view, reducing the vertical field of view and thereby increasing the format ratio of the displayed image enables the thickness of the optics assembly to be reduced. For example, for a 16:9 format image with a 50 degree diagonal field of view the thickness 18410 of the optical assembly 18415 can be approximately 17 mm as shown illustratively in FIG. 184. If the format of the displayed image is increased to 30:9 with a 50 degree diagonal field of view, the thickness 18510 of the optical assembly 18515 can be approximately 10 mm as shown illustratively in FIG. 185. This represents approximately a 40% reduction in thickness of the optical assembly provided by changing to a higher format ratio. FIG. 186 shows a 30:9 format field of view 18620 and a 22:9 format field of view 18625, wherein the two fields of view have the same vertical field of view and different horizontal field of view. By using a higher format ratio, a wide field of view can be displayed for use with augmented reality imagery in a relatively thin head mounted display to improve the form factor of the head mounted display. The high format ratio can be obtained by using a high format ratio emissive display or by using a normal format ratio emissive display (e.g. 4:3, 16:9 or 22:9) and then using portions of the upper and lower regions of the emissive display. For example, the head mounted display can include a 1080p emissive display which has 1920×1080 pixels and a 30:9 image can be displayed by using 1920×576 pixels on the emissive display. A thin optics assembly would then be provided which was only capable of displaying an image comprised of the 576 pixels in the vertical direction, but the optics can display an image comprised of up to 1920 pixels horizontally. In the event that an image with a different format is to be displayed, it would be resized to fit the available display space (e.g. a 16:9 format image could be displayed as a 1024×576 pixel image). In a preferred embodiment, the display field of view has a format ratio that is greater than 22:9. By having a format ratio such as 30:9, the center portion can be used for displaying 22:9 image such as a movie, while the areas 18627 outside the 22:9 display field of view can be used for displaying auxiliary information that doesn't need to be as easily viewable or be presented with high resolution such as battery life, time, temperature, directional heading, whether new emails or texts are available.

In another embodiment, the central sharp zone of the display can be used to display different types of images than the outer peripheral zone. For example, the central sharp zone can be used to display 22:9 or 16:9 movie images that are resized to fit the number of pixels contained in the central sharp zone. The outer peripheral zone can then be used like a second display where other types of information are displayed that can be viewed at a lower resolution for a short period of time so that the uncomfortable eye position required is acceptable.

In yet another embodiment, the information displayed in the outer peripheral zone is rendered differently compared to the central sharp zone. This can include using larger font letters, higher contrast settings or different colors to make the information presented in the outer peripheral zone more easily viewable.

In a further embodiment, the displayed image is adjusted in correspondence to changes in the focus distance. To enable a measurement of the focus distance, a sensor may be provided to measure the distance between optical elements that are used to change the focus distance such as between the image source 16910 and the lens elements 16920 or between the lens elements 16920 and the lower optics. Wherein the displayed image can be digitally adjusted to be larger or smaller to compensate for magnification that may occur if the light rays between optical elements is not telecentric. The displayed image can also be digitally adjusted for distortion that may occur as the optical elements are moved to change the distance between the optical elements in accomplishing a change in focus distance. Where the change in focus distance may be associated with an augmented reality operating mode such as a mode where the focus distance needs to be at a specific distance such as for example at arm's length to allow the user to interact with displayed augmented reality objects.

In a yet further embodiment, the optical assembly is designed to provide telecentric light to an optical surface that includes a triple notch mirror treatment to reduce the angular extent of the incident light and thereby improve the performance of the triple notch mirror. Where the telecentric light can be incident onto the angled beam splitter or onto the curved partial minor. This embodiment can be particularly important when the head worn display provides a wide field of view because triple notch mirror are designed to be used at a specific angle with a limited angular distribution around the specific angle. By providing telecentric light to the triple notch mirror, the color uniformity and brightness uniformity can be improved. In a further improvement, the wide angle displayed image can be rendered to compensate for radially based color and brightness rolloff by radially increasing the digital brightness (e.g. radially increase the code values and associated luma in the image) and radially changing the color balance (e.g. color rendering) in the image. In this way, the user is provided with an image that is perceived to have uniform brightness and uniform color in spite of angular limitations of the triple notch mirror treatment affecting the displayed image over the wide display field of view.

Another aspect of the present disclosures relates to managing stray light in a see-through computer display system. Displays which are capable of generating large fields of view typically emit light in a very broad cone of angles. Therefore, it would be common for some of the light that is generated to not be going in a useful direction for contributing to image light and this extra light could show up in the forward part of the module towards the partial mirror. Unfortunately, with a partial mirror system using polarized or un-polarized light, this high angle light is prone to making its way into the user's eye.

FIG. 187 illustrates a polarization scheme in a see-through computer display system. Image light 18702 is produced by a display (not shown in FIG. 187) and transmitted to an optical system that is positioned in front of the eye of a user. FIG. 187 also illustrates an artifact light path 18704. The artifact light is light that is transmitted into the see-through portion of the optical system at a position and/or angle that it forms stray light that does not contribute to a high quality image.

FIG. 187 also illustrates how the artifact light 18704 and image light 18704 act at each of several surfaces 18708, 18710, 18712, and 18714. As is illustrated in this example, the artifact light 18704 first hits the surface detailed at 18807. The artifact light 18704 hits the quarter wave film at a high angle, causing it to efficiently reflect off the surface instead of transmitting through the film. The light maintains its polarization state and gets directed down towards the lower part of the optic.

Image light 18702, on the other hand, is coming in at close to a normal incidence angle, as detailed at 18714, so it mostly transmits through the polarization film 18718, which converts the image light 18702 to a circularly polarized state. When the circularly polarized light reaches the partial mirror 18720, it is reflected back towards the quarter wave surface 18718 but with the reverse rotation. As this light transmits back through the quarter wave surface 18718 it is converted to linearly polarized light of the opposite orientation as it entered the first time.

The artifact light 18704 reaches the lower region of the polarized beam splitter, as illustrated in detailed section 18710, in the same orientation as the beam splitter is configured to reflect, then the light reflects back towards the front partial mirror and quarter wave assembly in the same polarization state.

After bouncing off of the angled beam splitter at 18710 the artifact light 18704 comes back and hits the quarter wave film 18722 at an angle which is closer to normal so it primarily transmits through the quarter wave film 18722 and converts to a circularly polarized state. When the circularly polarized light reaches the partial mirror 18724, it is reflected back towards the quarter wave film 18722 but with the reverse rotation. As this light transmits back through the quarter wave film 18722 it is converted to linearly polarized light of the opposite orientation as it entered the first time. Due to the curved surface of the partial mirror, the light exiting the front assembly is now heading upwards towards the viewer's eye.

The artifact light, after reflecting from detailed area 18712 now has the correct polarization to transmit through the reflective beam splitter 18722 and secondary polarizer. Due to the light coming from the lower portion of the mirror it creates a partial copy of the image generated by the display and places this image below the main display field of view or even worse, potentially overlapping the field of view of the primary image light. The image light returning to this surface from the partial mirror also has the correct polarization state to transmit through the beam splitter. Note: The angles of the image light transmitting through this surface are limited to the angular field of view of the intend virtual image where the light coming from the very lowest portion of the mirror is there to fill in the lower portion eyebox at the flatter angle of the display field of view compared to primarily the steeper angles of the artifact light.

FIG. 188 illustrates an embodiment that manages artifact light (e.g. as described in connection with FIG. 187). To prevent high angle light from becoming a problem in a folded display system, the image source (not shown in FIG. 188) can generate polarized light or be filtered to be polarized, and then the light can rotated with a quarter wave retarder to be circularly polarized. The lower optics can then be designed to use the behavior of reflected circular polarized light to prevent the high angle stray light from getting to the user's eye.

Referring to detailed section 18822, the circularly polarized image light 18824 is projected down towards the polarized beam splitter 18810 and through a quarter wave film 18804 placed against the polarized beam splitter 18810 to rotate the circular polarized light into the linear state that will reflect off of the polarized beam splitter 18804. As the reflected linearly polarized light transmits back through the quarter wave film 18804 it is again rotated into a circular polarization state. Ideally, the quarter wave film 18804 is laminated to the polarized beam splitter 18810 to eliminate ghost images from partial reflections that surfaces of the quarter wave film could generate by eliminating the air gap between the surfaces and aligning any ghosts with the image light so they overlap enough to not be visible.

Image light coming towards the partial mirror 18814 from the beam splitter 18810 is in a circularly polarized state. When the circularly polarized light reflects off the partial mirror, it is reflected back towards the quarter wave film 18804 but with the reverse rotation direction to behave differently when it gets back towards the beam splitter 18810, as illustrated in detail section 18814.

Continuing with the interactions at section 18814, when the artifact light 18802 comes down onto the partial mirror 18818 at a steep angle from above, it will interface with the partial mirror before interacting with the beam splitter. This means when the direction of circular rotation reverses from the reflection the light will be in correct direction to pass through the beam splitter 18810 instead of reflecting.

The circular polarized light returning from the curved partial mirror 18818 will have a reflected circular state with the opposite direction as its orientation before the reflection. Therefore, when both the image light and the artifact light leave the partial mirror 18818 they will interact with the quarter wave film 18804 and become linearly polarized in the correct direction to pass through the polarized beam splitter 18810. In the case of the image light in detailed section 18822, the angles are designed so that the light will reach the user's eye but for the artifact light in detailed section 18812 the angles are very steep and so the light will escape out the lower portion of the module and avoid reaching the user's eye.

In embodiments, the curved mirror may be a reflector or partial mirror and may include mirrors of various percentages for reflection and transmission efficiency optimized for various wavelengths based on the display brightness and color characteristics as well as the expected ambient conditions. They can be fabricated with many technologies including metalized coatings, multi layer dielectric coatings, laminated or insert molded multi layer polymer films, and/or other types of surface and/or volumetric gratings and/or holograms.

Another aspect of the present inventions relates to configurations for see-through computer displays using OLED display panels (e.g. as described here and otherwise herein) or other display panels that can be curved. As described herein with respect to at least FIG. 169, an OLED panel may be used to produce image light in a see-through computer display system. In embodiments, the OLED panel may be curved to produce different performance, as compared to a flat panel.

FIG. 189 illustrates a see-through optical system 18900 that includes a curved OLED display panel 18902. In this embodiment, the OLED panel 18902 is curved in a convex manner with respect to the top lens surface of lens system 16920. This creates a system where the OLED emission surface approximates the top curved surface of the lens system 16920. This enables a system the distance between the OLED emission surface and the top of the lens is a constant, or approximating a similar distance over the OLED emission surface. The configuration may include a curved surface of the OLED and/or top lens surface do not approximate each other. For example, the curved surfaces may be similar but not the same, may be opposite, may be different, etc.

An aspect of the optical configuration disclosed in connection with at least FIG. 169 shows that the MTF in the FOV changes across the FOV. The fall off in MTF is detailed herein elsewhere. A change in MTF can be achieved by curving the OLED to better match the shape of the top lens surface. The curved configuration, along with the other optical elements of the design, can produce a higher MTF over a wider portion of the FOV. In other embodiments, the curve of the OLED panel is convex with respect to the lower optical elements. This enables a design that provides optical power and/or cause the projection cone of image light to have a greater spread, which can be used to reduce color separation, produce a different FOV, enable the use of smaller lens(es) in the system, etc.

In other embodiments, the curved OLED, or other panel technology may be curved in a convex shape with respect to the lower lens. The upward curve at the ends of the panel may be an effective way to generate a wider beam angle (e.g. as measured by a collection of the pixels primary cone angle directions). A wider beam angle can be used to reduce the power needed in lens components, correct the color produced towards the edges of the field of view, etc. Compact optical figurations (e.g. folded) that use flat panels, as described in connection with FIG. 169 for example, can produce reduced MTF towards the edges of a wide field of view and can also cause color shifting to occur towards the edges. The color shift, and reduced MTF, may be a result of causing the outer edges of the image light to be forced into a large beam angle to achieve the wide field of view. In embodiments, the convexly curved panel can generate a wider cone angle and minimize the color shift and the MTF drop off.

In embodiments, a shaped micro-channel optic could be used in connection with a flat or shaped panel (e.g. 0 LED display panel) to create the desired shape to the emission surface.

Another aspect of the present disclosure relates to integration of a display panel in a see-through computer display, wherein the display panel includes an IR emitter(s) and/or IR receivers, wherein the system is adapted to image the eye of a user from a front-of-the-eye perspective.

In embodiments, a display panel may include IR emitter(s) interwoven amongst the visible light emitters (e.g. 0 LED panel, LED panel, LCoS panel, DLP panel, etc.). In embodiments, the display panel may include IR receivers interwoven amongst the visible light emitters. In embodiments, the display panel may include both IR emitter(s) and IR receivers. Such systems may be used in connection with imaging an eye of a user (e.g. the iris, pupil, retina). Pixel density in display panels is high and as a result can produce high resolution of images produced. The inventors have appreciated that IR receivers and/or IR emitter(s) can be interwoven within the high density visible pixels such that eye imaging from a perspective in front of the user eye. The IR, whether emitted or received, may be communicated through the optics that are positioned and adapted to communicate visible image light, which reaches the eye from a front perspective. The frontal perspective can be important when imaging the eye as this perspective gives the best image of the eye and its iris, retina, and other areas of the eye.

In embodiments, many IR receivers are interwoven in the display panel such that enough eye image data can be gathered and associated to produce an image with enough data to understand the aspect of interest in the eye. In embodiments, the IR receivers and/or emitters may be clustered in a center area of the display panel to increase the light and or data collection points in the area of interest. The area of interest may be other than the center of the display and the clustering or area(s) may be tailored as such. For example, the IR eye-imaging system(s) may be mapped into an area around a central area of the display panel. This may be done such that the center of an image produced by the panel is high resolution and an area around the center area is lower resolution due to the interweaving of IR systems in the visible pixels.

Another aspect of the present disclosure relates to a head-worn computer system that includes dual cameras with zoom capabilities that provide a stereo view of a target. The stereo view may be provided by providing two separate captured views of the target, as captured by the dual cameras, as an overlay in a see-through computer display mounted in the head-worn computer. In embodiments, the dual cameras are separated and each one may be mounted proximate to one of the eyes of the user. The separation should be enough such that the two perspective captured views of the target generate a stereoscopic 3D view of the target. In embodiments, the zoom may be controlled by an interface mounted on the head-worn computer (e.g. a capacitive touch surface, swipe surface, rotary dial, button(s)), an external device (e.g. finger mounted UI, wand), gesture(s), voice). In embodiments, the dual cameras may be arranged such that their respective fields of view overlap at a distance such that they both image a same portion of the target. The overlap allows the two images to be presented in the see-through display fields of view where the same portion of the imaged target is presented to the user's two eyes for a combined 3D view of the target. In embodiments, the head-worn system may include an eye-imaging system that monitors where the user is looking, the vergence of the eyes, the focal plane the user is viewing, etc. In embodiments, the dual cameras may have wide fields of view such that the two separate images overlap over a distance covering a wide range of focal planes. In embodiments, the dual cameras may be stabilized (e.g. optically, mechanically, etc.). In embodiments, the dual cameras may have adjustable direction to change the distance of overlap between the cameras. In embodiments, the vergence of the eyes may be used to determine the focal plane that the user is focused on and the captured images may be shifted or otherwise processed to change the portion of overlap to correspond with the focal plane of interest.

FIG. 190 illustrates a head-worn computer 102 with two zoom cameras 19002a and 19002b. In embodiments, the zoom cameras 19002 are positioned to have overlapping fields of view at a distance of less than approximately eight feet. Generally speaking, people see in stereo vision within approximately eight feet. As the focal plane goes beyond approximately eight feet, people's vision is not generally stereo. In embodiments, the dual cameras may be arranged to overlap at a distance further than approximately eight feet. For example, a person may use the zoom feature to capture the face of someone further away. The image capture may be used to then present content to the user. In embodiments, the zoomed capture is not necessarily presented to the user as the capture may be used for photo or video analysis. For example, the zoom feature may be used to identify a person (e.g. through facial or eye attribute recognition) that is far away. Once recognized, information relating to the identified person may be presented to the user (e.g. visually, through audio, through haptics, etc.).

There are many uses for a head-worn computer with stereo zoom cameras. Surgeons and other medical professionals, for example, can use the system to magnify an area of the body for inspection or during a procedure. The captured images from the dual cameras can be presented in two see-through computer displays mounted in the head-worn computer such that the magnified area appears to overlay the see-through view of the body. The zoom can be easily altered during inspection or a procedure making the process more effective. Various lighting conditions can also be generated to irradiate the body to further highlight areas of the body. For example, the body may be irradiated with a visible color (e.g. blue, red, green) such that those color(s) are highlighted. The body may also be irradiated with non-visible light (e.g. UV, IR) and the dual cameras may be adapted to capture the non-visible light. This arrangement provides for magnified images in the see-through display that are irradiated with the non-visible light. The images could be processed to convert the non-visible reflections that are captured into visible colors so the user can see a highlighted magnified image.

A system with dual cameras can also be used to capture faces for 3D facial recognition. The system may also capture images of another person's eyes for iris recognition. The zoom may also be used to capture the eyes or facial features of someone that is further away. If the dual cameras, or one of the two, is focused at infinity, the camera may be used to capture an image of a person's features from a distance. A long distance captured image can be useful in remotely identifying people.

In embodiments, the zoom level of each of the dual zoom cameras 19002 may be synchronized such that they maintain the same level of zoom. This can be useful when capturing images of the target 19004 and presenting the two captured images/videos simultaneously in two separate see-through display systems. This generates a good 3D image/video of the target for the user. Setting both of the dual cameras at the same zoom level can help with depth sensing as well.

In embodiments, the zoom level of each of the two cameras may be set at two separate levels. This can be useful in generating a combined image (e.g. combined in the user's mind when seeing the two separate images in a see-through computer display) that is formed from the separate zoom levels. For example, it can generate a sharp image with a background blur for a depth effect. It can also be used to capture from both cameras but only displaying the image captured from one camera at a time. This can provide an instantaneous change in zoom by switching which camera capture is presented. The switch can happen very quickly (e.g. as compared to a mechanical shift in camera elements) by causing the processor to switch which capture to present.

In embodiments, the dual cameras may be synchronized to capture at the same time.

In embodiments, the dual cameras may be each adapted to capture different spectra. For example, one camera may capture UV, IR, VIS, or subsections of any spectra and the other camera would capture different spectra. The two images could then be fused to present a combined image.

Although embodiments of HWC have been described in language specific to features, systems, computer processes and/or methods, the appended claims are not necessarily limited to the specific features, systems, computer processes and/or methods described. Rather, the specific features, systems, computer processes and/or and methods are disclosed as non-limited example implementations of HWC.

All documents referenced herein are hereby incorporated by reference.

What is claimed is:

1. A wearable head device, comprising:
a transmissive display configured to present a first view at a first zoom level; and
a first camera configured to capture an image at a second zoom level different from the first zoom level,
wherein the transmissive display is further configured to present at least a portion of the image captured by the first camera at the second zoom level, concurrent with presenting the first view at the first zoom level.

2. The wearable head device of claim 1, wherein the second zoom level is greater than the first zoom level.

3. The wearable head device of claim 1, wherein the second zoom level is lesser than the first zoom level.

4. The wearable head device of claim 1, wherein the first zoom level is unity.

5. The wearable head device of claim 1, wherein the first zoom level and the second zoom level comprise a first optical zoom level and a second optical zoom level, respectively.

6. The wearable head device of claim 1, wherein the first zoom level and the second zoom level comprise a first digital zoom level and a second digital zoom level, respectively.

7. The wearable head device of claim 1, further comprising:
a second camera,
wherein:
the first camera and the second camera are configured to capture a stereo image at the second zoom level, and
presenting at least a portion of the image captured by the first camera at the second zoom level comprises presenting the captured stereo image.

8. The wearable head device of claim 7, wherein the transmissive display comprises a left eye display and a right eye display,
wherein:
the first camera is further configured to capture a left eye component of the stereo image,
the second camera is further configured to capture a right eye component of the stereo image,
the left eye display is configured to present the left eye component to a left eye, and
the right eye display is configured to present the right eye component to a right eye.

9. The wearable head device of claim 1, further comprising:
a second camera configured to capture a second image at a third zoom level different from the second zoom level.

10. The wearable head device of claim 9, wherein the transmissive display is further configured to present at least a portion of the second image, concurrent with presenting the first view and the image captured by the first camera.

11. A wearable head device, comprising:
a transmissive display configured to present a first view having a first depth of field; and
a first camera configured to capture an image having a second depth of field different from the first depth of field,
wherein the transmissive display is further configured to present at least a portion of the image captured by the first camera having the second depth of field, concurrent with presenting the first view having the first depth of field.

12. The wearable head device of claim 11, further comprising:
a second camera configured to capture a second image having a third depth of field different from the second depth of field,
the transmissive display is further configured to present at least a portion of the second image, concurrent with presenting the first view and the image captured by the first camera.

13. A method comprising:
presenting, by a transmissive display of a wearable head device, a first view at a first zoom level;
capturing, by a first camera, an image at a second zoom level different from the first zoom level,
presenting, by the transmissive display, at least a portion of the image captured by the first camera at the second zoom level, concurrent with presenting the first view at the first zoom level.

14. The method of claim 13, wherein the second zoom level is greater than the first zoom level.

15. The method of claim 13, wherein the second zoom level is lesser than the first zoom level.

16. The method of claim 13, wherein the first zoom level is unity.

17. The method of claim 13, wherein the first zoom level and the second zoom level comprise a first optical zoom level and a second optical zoom level, respectively.

18. The method of claim 13, wherein the first zoom level and the second zoom level comprise a first digital zoom level and a second digital zoom level, respectively.

19. The method of claim 13, further comprising:
capturing, by the first camera and a second camera, a stereo image at the second zoom level;
wherein presenting at least a portion of the image captured by the first camera at the second zoom level comprises presenting the captured stereo image.

20. The method of claim 19, further comprising:
capturing, by the first camera, a left eye component of the stereo image,
capturing, by the second camera, a right eye component of the stereo image,
presenting, by a left eye display of the transmissive display, the left eye component to a left eye, and
presenting, by a right eye display of the transmissive display, the right eye component to a right eye.

21. The method of claim 13, further comprising:
capturing, by a second camera, a second image at a third zoom level different from the second zoom level.

22. The method of claim 21, further comprising:
presenting, by the transmissive display, at least a portion of the second image, concurrent with presenting the first view and the image captured by the first camera.

23. A method comprising:
- presenting, by a transmissive display of a wearable head device, a first view having a first depth of field;
- capturing, by a first camera, an image having a second depth of field different from the first depth of field,
- presenting, by the transmissive display, at least a portion of the image captured by the first camera having the second depth of field, concurrent with presenting the first view having the first depth of field.

24. The method of claim 23, further comprising:
- capturing, by a second camera, a second image having a third depth of field different from the second depth of field; and
- presenting, by the transmissive display, at least a portion of the second image, concurrent with presenting the first view and the image captured by the first camera.

* * * * *